United States Patent
Malia et al.

(10) Patent No.: US 11,227,446 B2
(45) Date of Patent: Jan. 18, 2022

(54) SYSTEMS, METHODS, AND GRAPHICAL USER INTERFACES FOR MODELING, MEASURING, AND DRAWING USING AUGMENTED REALITY

(71) Applicant: Apple Inc., Cupertino, CA (US)

(72) Inventors: Joseph A. Malia, San Francisco, CA (US); Praveen Sharma, San Francisco, CA (US); Mark K. Hauenstein, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/030,209

(22) Filed: Sep. 23, 2020

(65) Prior Publication Data

US 2021/0097768 A1 Apr. 1, 2021

Related U.S. Application Data

(60) Provisional application No. 62/965,710, filed on Jan. 24, 2020, provisional application No. 62/907,527, filed on Sep. 27, 2019.

(51) Int. Cl.
*G06T 15/00* (2011.01)
*G06T 19/00* (2011.01)
*G06F 3/0481* (2013.01)

(52) U.S. Cl.
CPC ........ *G06T 19/006* (2013.01); *G06F 3/04815* (2013.01); *G06F 3/04817* (2013.01); *G06T 2200/24* (2013.01)

(58) Field of Classification Search
CPC .................................................. G06T 19/006
See application file for complete search history.

(56) References Cited

U.S. PATENT DOCUMENTS 9,678,651 B2 6/2017 Moha et al.
9,767,606 B2 9/2017 Kapinos et al.
(Continued)

OTHER PUBLICATIONS

Invitation to Pay Additional Fees, dated Jan. 19, 2021, received in International Patent Application No. PCT/US2020/052641, which corresponds with U.S. Appl. No. 17/030,209, 15 pages.
(Continued)

*Primary Examiner* — Charles Tseng
(74) *Attorney, Agent, or Firm* — Morgan, Lewis & Bockius LLP

(57) ABSTRACT

A computer system captures, via one or more cameras, information indicative of the physical environment, including respective portions of the physical environment that are in a field of view. The respective portions of the physical environment include a plurality of primary features of the physical environment and secondary features of the physical environment. After capturing the information indicative of the physical environment, the system displays a user interface, including concurrently displaying graphical representations of the plurality of primary features that are generated with a first level of fidelity to the corresponding plurality of primary features of the physical environment, and one or more graphical representations of secondary features that are generated with a second level of fidelity to the corresponding one or more secondary features of the physical environment, where the second level of fidelity is lower than the first level of fidelity.

42 Claims, 259 Drawing Sheets

(56) References Cited

U.S. PATENT DOCUMENTS

| | | |
|---|---|---|
| 2011/0107270 A1 | 5/2011 | Wang et al. |
| 2011/0216167 A1 | 9/2011 | Katz et al. |
| 2011/0279445 A1* | 11/2011 | Murphy .............. G06F 3/04842 |
| | | 345/419 |
| 2012/0249741 A1 | 10/2012 | Maciocci et al. |
| 2013/0044128 A1 | 2/2013 | Liu et al. |
| 2013/0215230 A1 | 8/2013 | Miesnieks et al. |
| 2014/0071130 A1 | 3/2014 | Piemonte |
| 2014/0125668 A1* | 5/2014 | Steed ...................... G06T 15/50 |
| | | 345/426 |
| 2016/0026253 A1 | 1/2016 | Bradski et al. |
| 2016/0189426 A1 | 6/2016 | Thomas et al. |
| 2017/0021273 A1* | 1/2017 | Rios ...................... G06T 19/006 |
| 2017/0132841 A1* | 5/2017 | Morrison ............ G06K 9/00671 |
| 2018/0204385 A1* | 7/2018 | Sarangdhar ............ G08C 17/02 |
| 2019/0065027 A1 | 2/2019 | Hauenstein et al. |
| 2019/0180512 A1 | 6/2019 | Fedosov et al. |
| 2020/0005538 A1* | 1/2020 | Neeter ...................... G06T 7/70 |
| 2020/0098140 A1 | 3/2020 | Jagnow et al. |
| 2021/0174596 A1 | 6/2021 | Zhang et al. |

OTHER PUBLICATIONS

International Search Report and Written Opinion, dated Mar. 12, 2021, received in International Patent Application No. PCT/US2020/052641, which corresponds with U.S. Appl. No. 17/030,209, 21 pages.

Office Action, dated Apr. 30, 2021, received in U.S. Appl. No. 17/030,209, 28 pages.

Office Action, dated Aug. 13, 2021, received in U.S. Appl. No. 17/202,233, 19 pages.

* cited by examiner

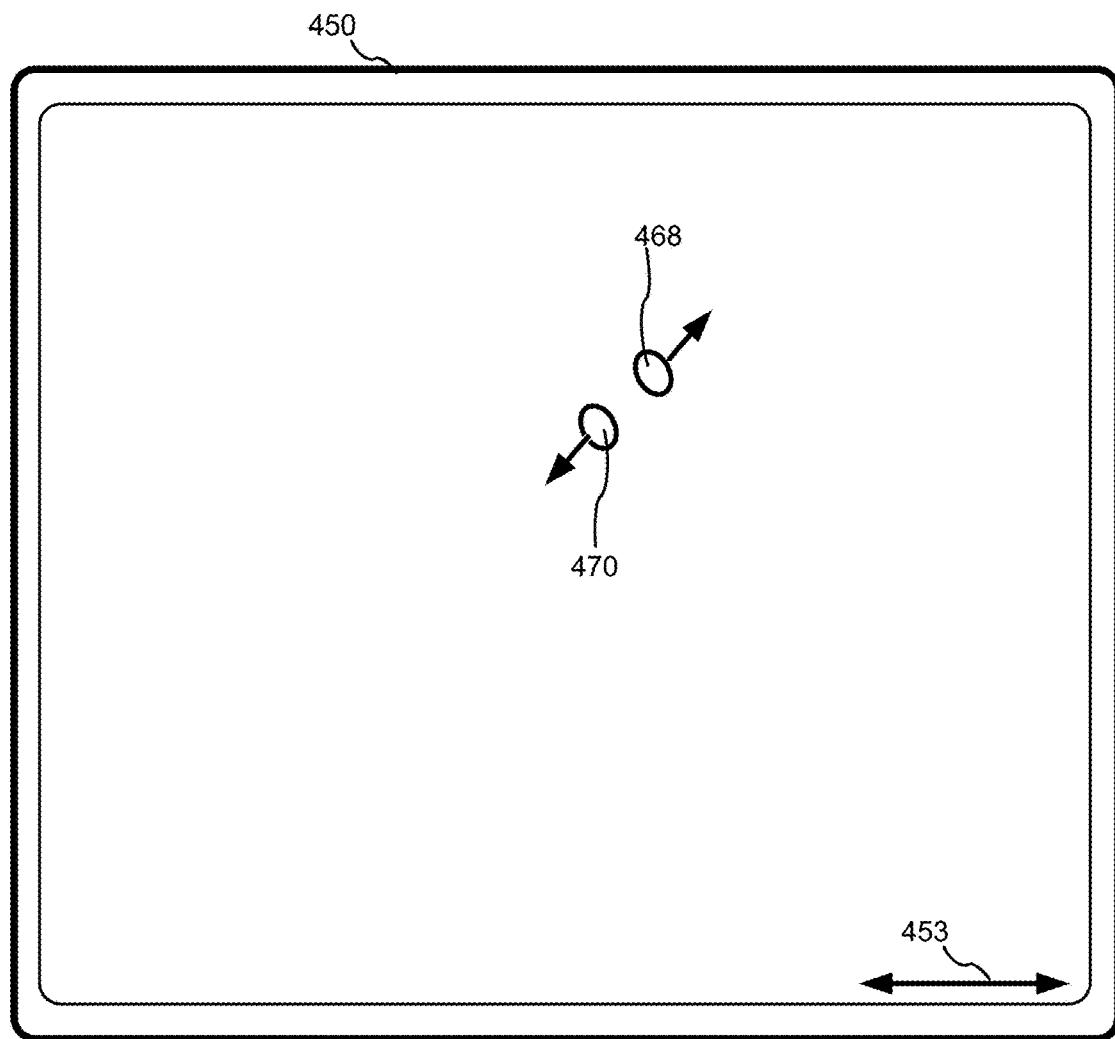
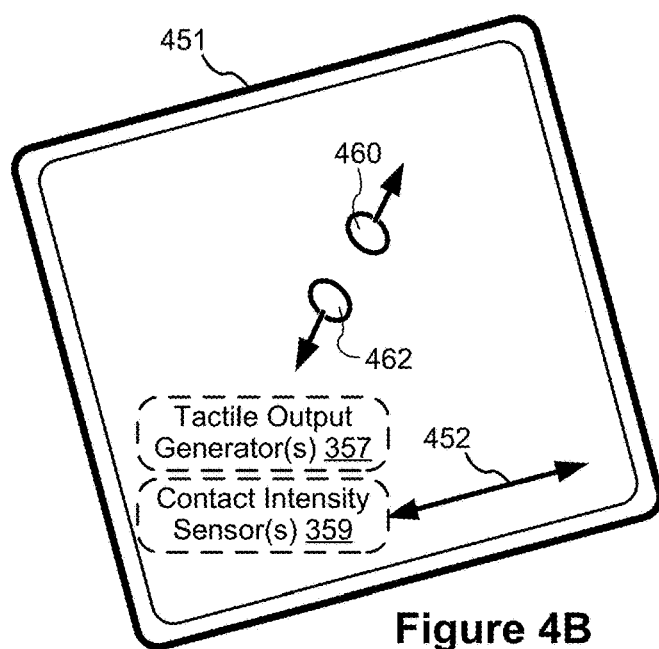
Figure 4B

← 700

---

712 the first orthographic view of the physical environment based on the captured representation of the one or more portions of the physical environment is a simplified orthographic view, wherein the simplified orthographic view simplifies an appearance of the representation of the one or more portions of the physical environment.

---

714 identifying one or more walls, one or more floors, and/or one or more ceilings in the physical environment, and edges of features of the physical environment; wherein the first orthographic view of the physical environment includes representations of the identified one or more walls, floors, ceilings, and features, represented by lines of projection that are displayed perpendicular to the identified one or more walls, floors, ceilings, and features.

---

716 the first orthographic view is based on a first perspective, and the method includes: after displaying the first orthographic view of the physical environment based on the captured representation of the one or more portions of the physical environment, receiving, via the input device, a second user input corresponding to a second activatable user interface element for requesting display of a second orthographic view of the physical environment; and in response to receiving the second user input, displaying the second orthographic view of the physical environment based on the captured representation of the one or more portions of the physical environment, wherein the second orthographic view is based on a second perspective that is distinct from the first perspective

---

718 the captured representation of the field of view includes one or more edges that each form a respective angle with an edge of the captured representation of the field of view and the one or more edges that each form a respective angle with an edge of the captured representation of the field of view correspond to one or more edges that are displayed parallel to an edge of the first orthographic view.

---

720 the captured representation of the field of view includes at least one set of edges that form an oblique angle; and the at least one set of edges that form an oblique angle in the captured representation of the field of view correspond to at least one set of perpendicular edges in the orthographic view.

812 plurality of primary features of the physical environment include one or more walls and/or one or more floors

---

814 the primary features of the physical environment include one or more doors and/or one or more windows

---

816 the one or more secondary features of the physical environment include one or more pieces of furniture.

---

818 the one or more graphical representations of the one or more secondary features that are generated with the second level of fidelity to the corresponding one or more secondary features of the physical environment include one or more icons representing the one or more secondary features

---

820 the one or more graphical representations of the one or more secondary features include respective three-dimensional geometric shapes outlining respective regions in the user interface that correspond to physical environment occupied by the one or more secondary features of the physical environment

---

822 the one or more graphical representations of the one or more secondary features include predefined placeholder furniture

---

824 the one or more graphical representations of the one or more secondary features include computer aided design (CAD) representations of the one or more secondary features

---

826 the one or more graphical representations of the one or more secondary features are partially transparent

828 the one or more secondary features include one or more building automation devices, and the one or more graphical representations of the one or more secondary features include graphical indications that the graphical representations correspond to the one or more building automation devices 830 in response to receiving an input at a respective graphical indication that corresponds to a respective building automation device, displaying at least one control for controlling at least one aspect of the respective building automation device

---

832 in response to receiving an input at a respective graphical indication that corresponds to a respective building automation device, displaying at least one control for controlling at least one aspect of the respective building automation device the user interface is a first user interface that includes a first view of the physical environment and a first user interface element, wherein the first view of the physical environment is displayed in response to activation of the first user interface element;

the user interface includes a second user interface element, wherein a second view of the physical environment, different from the first view, is displayed in response to activation of the second user interface element; and the user interface includes a third user interface element, wherein a third view of the physical environment, different from the first view and from the second view, is displayed in response to activation of the third user interface element

918 the representation of the physical environment corresponds to a first view of the physical environment, and the method includes: in accordance with a determination that the virtual object is at a respective position in the representation of the physical environment such that one or more portions of the virtual object overlap with one or more representations of respective physical objects in the physical environment and correspond to physical space in the physical environment that, from the first view of the physical environment, is occluded by the one or more respective physical objects, changing an appearance of the one or more portions of the virtual object that overlap with the one or more representations of respective physical objects 920 the representation of the physical environment corresponds to a first view of the physical environment, and the method includes: in response to detecting the first input that corresponds to the virtual object, display an outline around the virtual object, including: while continuing to display the outline around the virtual object, in accordance with a determination that the virtual object is at a respective position in the representation of the physical environment such that one or more portions of the virtual object overlap with one or more representations of respective physical objects in the physical environment and correspond to physical space in the physical environment that, from the first view of the physical environment, is occluded by the one or more respective physical objects, forgoing displaying the one or more portions of the virtual object that overlap with the one or more representations of respective physical objects 922 ceasing to detect the first input; in response to ceasing to detect the first input, in accordance with a determination that the first input ceased to be detected while the virtual object is at a respective position, in the representation of the physical environment, that corresponds to physical space in the physical environment that at least partially overlaps with the first physical space of the first physical object, moving the virtual object to a position in the representation of the physical environment that corresponds to a physical space in the physical environment near the first physical object that does not overlap with the first physical space of the first physical object

924 after the virtual object moves by the second amount, less than the first amount, through at least the subset of the one or more positions that correspond to physical space in the physical environment that at least partially overlaps with the first physical space of the first physical object, in accordance with a determination that the movement of the first input meets a distance threshold, moving the virtual object through the first physical space of the first physical object

---

926 in accordance with the determination that the movement of the first input corresponds to a request to move the virtual object through one or more positions, in the representation of the physical environment, that correspond to physical space in the physical environment that at least partially overlaps with the first physical space of the first physical object: in accordance with a determination that the first input meets a velocity threshold and that the first input corresponds to a request to move the virtual object to a respective position that corresponds to physical space in the physical environment that does not overlap with the first physical space of the first physical object, moving the virtual object through the one or more positions that correspond to physical space in the physical environment that at least partially overlaps with the first physical space of the first physical object to the respective position

---

928 in accordance with the determination that the movement of the first input corresponds to a request to move the virtual object through one or more positions, in the representation of the physical environment, that correspond to physical space in the physical environment that at least partially overlaps with the first physical space of the first physical object: in accordance with a determination that the first input does not meet the velocity threshold and/or that the first input corresponds to a request to move the virtual object to a respective position that corresponds to physical space in the physical environment that does not overlap with the first physical space of the first physical object, forgoing movement of the virtual object through the one or more positions that correspond to physical space in the physical environment that at least partially overlaps with the first physical space of the first physical object to the respective position.

938 displaying, in the representation of the physical environment, light from a light source that changes a visual appearance of the representation of the first physical object and the virtual object; in accordance with a determination that the virtual object is at a position in the representation of the physical environment that corresponds to physical space in the physical environment that is between the light source and the first physical object, displaying a shaded region over at least a portion of the representation of the first physical object; and in accordance with a determination that the first physical object is between the light source and the physical space that corresponds to the position of the virtual object in the representation of the physical environment, displaying a shaded region over at least a portion of the virtual object 940 displaying, in the representation of the physical environment, light from a light source that changes a visual appearance of the representation of the first physical object and the virtual object; in accordance with a determination that the virtual object is at a position in the representation of the physical environment that corresponds to physical space in the physical environment that is in the path of light from the light source, increasing a brightness of a region of the virtual object

942 the representation of the physical environment includes a representation of a second physical object that occupies a third physical space in the physical environment and has a second respective object property, and the method includes: while detecting a respective input that corresponds to a request to move the virtual object in the representation of the physical environment relative to the representation of the second physical object, at least partially moving the virtual object in the representation of the physical environment based on movement of the respective input, wherein: in accordance with a determination that the movement of the respective input corresponds to a request to move the virtual object through one or more positions, in the representation of the physical environment, that correspond to physical space in the physical environment that at least partially overlaps with the third physical space of the second physical object: at least partially moving the virtual object through at least a subset of the one or more positions that correspond to physical space in the physical environment that at least partially overlaps with the third physical space of the second physical object; and displaying one or more changes in a visual appearance of at least a portion of the representation of the second physical object that corresponds to the at least partial overlap with the virtual object 944 displaying the one or more changes in the visual appearance of at least the portion of the representation of the second physical object that corresponds to the at least partial overlap with the virtual object is based on one or more object properties of the second physical object in the physical environment

1012 after receiving the input corresponding to the request to annotate the portion of the first representation, and before displaying the annotation on the portion of the displayed second representation of the second media: displaying a first animated transition from display of the first representation of the first media to display of a first representation of a three-dimensional model of the physical environment represented in the first representation of the first media and that represents one or more annotations displayed at least partially in the first representation of the first media; and displaying a second animated transition from display of the first representation of the three-dimensional model to display of a second representation of the three dimensional model of the physical environment represented in the second representation of the second media and that represents one or more annotations displayed at least partially in the second representation of the second media; and displaying a third animated transition from display of the second representation of the three-dimensional model to display of the second representation of the second media (A)

1018 After receiving the input corresponding to the request to annotate the portion of the first representation, and before displaying the annotation on the portion of the displayed second representation of the second media: receiving an input corresponding to selection of the second media; and in response to receiving the input corresponding to selection of the second media, displaying a respective representation of the second media; wherein displaying the annotation on the portion of the second representation of the second media is performed after receiving the input corresponding to selection of the second media.

---

1020 after displaying the annotation on the portion of the first representation that corresponds to the first portion of the physical environment, receiving an input that corresponds to a request to view a live representation of the physical environment; in response to receiving the input that corresponds to a request to view a representation of a current state of the physical environment: displaying the representation of the current state of the physical environment; and in accordance with a determination that the representation of the current state of the physical environment corresponds to at least the first portion of the physical environment, displaying the annotation on a portion of the representation of the current state of the physical environment that corresponds to the first portion of the physical environment, wherein the annotation is displayed with one or more of a position, orientation, or scale that is determined based on the physical environment as represented in the representation of the current state of the physical environment

---

1022 the first representation and the second representation are displayed concurrently; the input corresponding to a request to annotate a portion of the first representation includes movement of the input; and in response to receiving the input, concurrently: modifying a first representation of the annotation in the portion of the first representation that corresponds to the first portion of the physical environment at least partially based on the movement of the input; and modifying a second representation of the annotation in the portion of the second representation that corresponds to the first portion of the physical environment at least partially based on the movement of the input.

1024 a portion of the annotation is not displayed on the second representation from the second media

---

1026 while displaying the second representation from the second previously-captured media, receiving a second input corresponding to a request to annotate a portion of the second representation that corresponds to a second portion of the physical environment; in response to receiving the second input, displaying a second annotation on the portion of the second representation that corresponds to the second portion of the physical environment, the second annotation having one or more of a position, orientation, or scale that is determined based on the physical environment after receiving the second input, displaying the second annotation on a portion of the first representation of the first media that corresponds to the second portion of the physical environment.

---

1028 At least a portion of the second annotation is not displayed on the first representation of the first media

Figure 10E

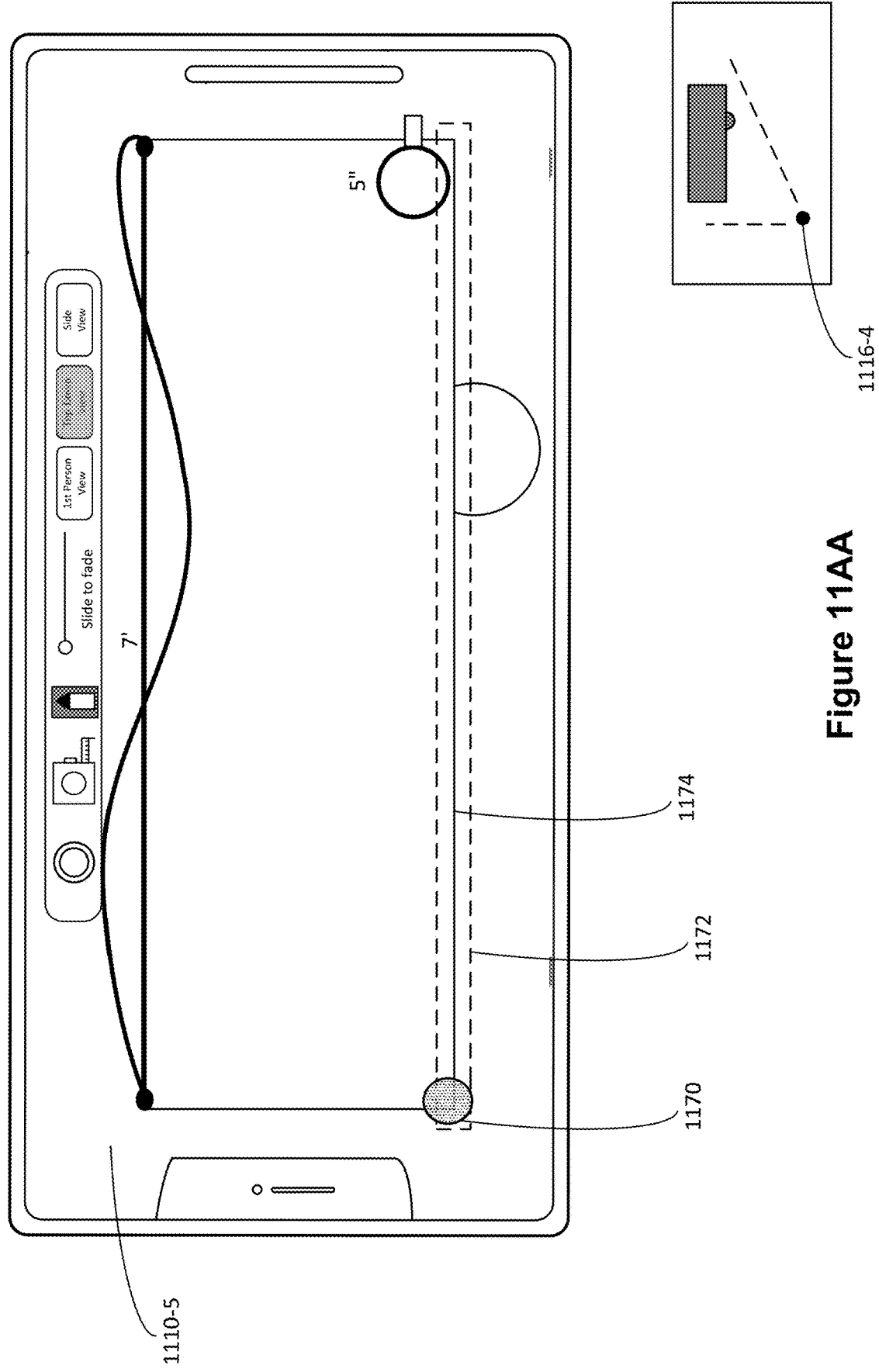

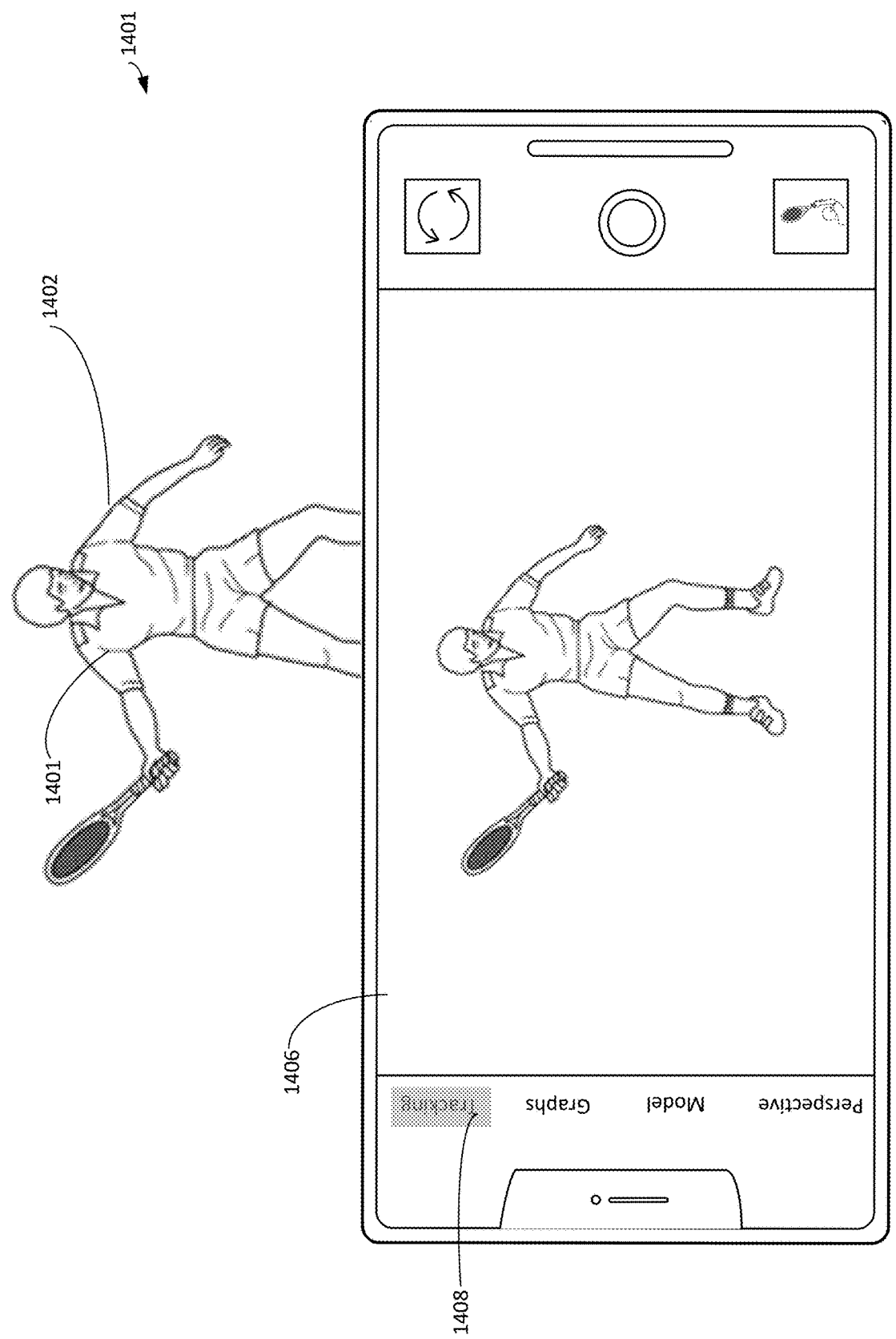
Figure 1400

1520 The first representation of the field of view of the one or more cameras is a first type of view;
    receive a second input corresponding to a request to display a second representation of the field of view of the one or more cameras that is a second type of view that is different from the first type of view; and
    in response to receiving the second input:
        display, via the display generation component, an animated transition from the first representation of the field of view of the one or more cameras to the second representation of the field of view of the one or more cameras; and
        display, via the display generation component, the second representation of the field of view of the one or more cameras, including displaying the first annotation in the second representation of the field of view of the one or more cameras, wherein the first annotation is displayed at a location in the second representation of the field of view of the one or more cameras that corresponds to a location at which the first annotation is displayed in the first representation of the field of view of the one or more cameras > 1522 While displaying a respective representation that is a respective type of view other than the first type of view, receive, via the input device, a second drawing input that corresponds to a request to add a second annotation to the respective representation of the field of view;
>     in response to receiving the second drawing input, display, in the respective representation of the field of view of the one or more cameras, the second annotation along a path that corresponds to movement of the second drawing input; and
>     after receiving the second drawing input, display, in the first representation of the field of view of the one or more cameras, the second annotation along a path that corresponds to the movement of the second drawing input 1524 Receive a third input corresponding to a request to display a third representation of the field of view of the one or more cameras that is a third type of view that is different from the first type of view; and
    in response to receiving the third input, display the third representation that is the third type of view based on one or more detected edges in the field of view 1526 The edge of the physical object is a curved edge

Figure 15B

1614 Receive one or more second inputs corresponding to a request to display, in the representation of the first previously-captured media item, a second representation of a second measurement corresponding to a second respective portion of the physical environment captured in the first media item; and
   in response to receiving the one or more second inputs corresponding to the request to display the second representation of the second measurement in the representation of the first previously-captured media item:
      cease to display the first representation of the first measurement and the first label;
      display, via the display generation component, the second representation of the second measurement over at least a portion of the representation of the first previously-captured media item that corresponds to the second respective portion of the physical environment captured in the representation of the first media item; and
      display, via the display generation component, a second label corresponding to the second representation of the second measurement that describes the second measurement based on depth data associated with the first previously-captured media item

---

1616 The one or more first inputs include an input corresponding to a request to add a measurement point at a respective location over the representation of the first previously-captured media item that is indicated by a placement user interface element displayed over the representation of the first previously-captured media item, wherein the placement user interface element is displayed at a predefined location relative to the display generation component;
   in response to receiving a display-transformation input corresponding to a request to perform one or more transformations of the representation of the first previously-captured media item:
      concurrently with maintaining display of the placement user interface element at the predefined location relative to the display generation component, display, via the display generation component, the one or more transformations of the representation of the first previously-captured media item in accordance with the display-transformation input

---

1618 The first representation of the first measurement corresponds to a first dimension of an object in the physical environment captured in the first media item;
   after receiving the one or more first inputs, display one or more indications of measurements corresponding to one or more additional dimensions of the object based on depth data associated with the first previously-captured media item

Figure 16B

1620 Display, via the display generation component, a respective visual indicator associated with a respective portion of the physical environment that includes respective depth information 1622 In response to receiving an input corresponding to a request to display a representation of a second previously-captured media item:
    display, via the display generation component, the representation of the second previously-captured media item, including:
        in accordance with a determination that the second previously-captured media item is associated with depth information corresponding to at least a portion of the first respective portion of the physical environment, display at least a portion of the first representation of the first measurement over the at least a portion of the first respective portion of the physical environment captured in the second previously-captured media item 1624 Receive one or more inputs corresponding to a request to perform one or more transformations of the portion of the representation of the first previously-captured media item over which the first representation of the first measurement is displayed; and
    in response to receiving the one or more inputs corresponding to the request to perform one or more transformations of the portion of the representation of the first previously-captured media item:
        perform the one or more transformations of at least the portion of the representation of the first previously-captured media item; and
        in accordance with a determination that the one or more transformations performed in response to receiving the one or more inputs decrease a size of the portion of the representation of the first previously-captured media item to a size that is below a threshold size, cease to display the first label corresponding to the first representation of the first measurement 1626 Receive an input corresponding to a request to enlarge the portion of the representation of the first previously-captured media item over which the first representation of the first measurement is displayed; and
    in response to receiving the input corresponding to the request to enlarge the portion of the representation of the first previously-captured media item over which the first representation of the first measurement is displayed:
        enlarge the representation of the first previously-captured media item, including the portion over which the first representation of the first measurement is displayed; and
        in accordance with a determination that the displayed portion of the enlarged representation of the first previously-captured media item is enlarged above a predefined enlargement threshold, cease to display the first label

Figure 16C

> 1628 The first label corresponding to the first representation of the first measurement is displayed in a predetermined portion of the display generation component > 1630 The one or more first inputs include selection of a representation of an object in the representation of the first previously-captured media item, and the first representation of the first measurement includes one or more measurements of the object
>
>> 1632 The one or more first inputs include one input, and displaying the first representation of the first measurement over at least the portion of the representation of the first media item includes displaying a plurality of respective representations of measurements of a plurality of dimensions of an object over a portion of the representation of the first media item that includes a representation of the object > 1634 Receive an input corresponding to a request to display an orthographic view of the physical environment; and
>     in response to receiving the input corresponding to the request to display an orthographic view of the physical environment, display, via the display generation component, the orthographic view of the physical environment, including displaying, in the orthographic view, a representation of the first measurement at a location in the orthographic view that corresponds to the first respective portion of the physical environment > 1636 While displaying the first representation of the first measurement over at least a portion of the representation of the first previously-captured media item that corresponds to the first respective portion of the physical environment captured in the representation of the first media item, receive an input corresponding to a request to display an exploded view of an object in the physical environment; and
>     in response to receiving the input corresponding to the request to display an object of the physical environment in an exploded view, display, via the display generation component, a plurality of sub-components of the object separated from each other by more space than the sub-components are separated from each other in the physical space

Figure 16D

1638 Display, via the display generation component, a representation of at least a portion of a respective physical environment that is in a field of view of the one or more cameras, wherein the representation of the portion of the respective physical environment that is in the field of view of the one or more cameras is associated with depth information corresponding to at least the portion of the respective physical environment;

while displaying the representation of the portion of the respective physical environment that is in the field of view of the one or more cameras, receive, via the one or more input devices, one or more third inputs corresponding to a request to display, in the representation of the portion of the respective physical environment that is in the field of view of the one or more cameras, a third representation of a third measurement corresponding to a respective portion of the respective physical environment; and in response to receiving the one or more third inputs corresponding to the request to display the third representation of the third measurement in the representation of the portion of the respective physical environment that is in the field of view of the one or more cameras:

display, via the display generation component, the third representation of the third measurement over at least a portion of the representation of the portion of the respective physical environment that is in the field of view of the one or more cameras that corresponds to the respective portion of the respective physical environment; and display, via the display generation component, a third label corresponding to the third representation of the third measurement that describes the third measurement based on the depth data that is associated with the representation of the portion of the respective physical environment that is in the field of view of the one or more cameras 1640 Displaying the representation of at least the portion of the respective physical environment includes updating the representation of the portion of the respective physical environment that is in the field of view of the one or more cameras to include representations of respective portions of the physical environment that are in the field of view of the one or more cameras as the field of view of the one or more cameras moves; and while updating the representation of the portion of the respective physical environment that is in the field of view of the one or more cameras, display, in the representation of the portion of the respective physical environment that is in the field of view of the one or more cameras, one or more indications of respective measurements corresponding to one or more physical objects that are in the field of view of the one or more cameras as the field of view of the one or more cameras moves

Figure 16E

1710 Display an animated transition from the representation of the first previously-captured media item to the representation of the second previously-captured media item that is determined based on a difference between the first viewpoint of the first previously-captured media item and the second viewpoint of the second previously-captured media item (A)

1714 Displaying the animated transition includes gradually fading one or more visual properties of the representation of the first previously-captured media item

1716 The difference between the first viewpoint and the second viewpoint includes forward or backward movement from the first viewpoint to the second viewpoint, and displaying the animated transition includes simulating movement along a vector that extends from the first viewpoint to the second viewpoint at least in part by rescaling the representation of the first previously-captured media item while progressively ceasing to display the representation of the first previously-captured media item and progressively displaying the representation of the second previously-captured media item

1718 The difference between the first viewpoint and the second viewpoint includes rotation from the first viewpoint to the second viewpoint, and displaying the animated transition includes rotating and/or skewing the representation of the first previously-captured media item from a first view associated with the first viewpoint of the representation of the first previously-captured media item to a second view associated with the second viewpoint of the representation of the second previously-captured media item

1720 The difference between the first viewpoint and the second viewpoint includes lateral movement from the first viewpoint to the second viewpoint, and displaying the animated transition includes shifting the representation of the first previously-captured media item laterally by an amount based on the lateral movement from the first viewpoint to the second viewpoint

Figure 17B

1712 In accordance with a determination that the one or more properties of the second previously-captured media item do not meet the proximity criteria with respect to the one or more corresponding properties of the first previously-captured media item:
   display the representation of the second previously-captured media item without displaying an animated transition from the representation of the first previously-captured media item to the representation of the second previously-captured media item that is determined based on a difference between the first viewpoint of the first previously-captured media item and the second viewpoint of the second previously-captured media item (B)

1722 The determination that the one or more properties of the second previously-captured media item do not meet the proximity criteria with respect to the one or more corresponding properties of the first previously-captured media item includes a determination that an amount of time between a time of capture of the first previously-captured media item and a time of capture of the second previously-captured media item is greater than a predefined threshold amount of time

1724 The determination that the one or more properties of the second previously-captured media item do not meet the proximity criteria with respect to the one or more corresponding properties of the first previously-captured media item includes a determination that a first camera session in which the first previously-captured media item was captured is different from a second camera session in which the second previously-captured media item was captured

1726 The determination that the one or more properties of the second previously-captured media item do not meet the proximity criteria with respect to the one or more corresponding properties of the first previously-captured media item includes a determination that a distance between a location of capture of the first previously-captured media item and a location of capture of the second previously-captured media item is greater than a predefined threshold distance

1728 The determination that the one or more properties of the second previously-captured media item do not meet the proximity criteria with respect to the one or more corresponding properties of the first previously-captured media item includes a determination that an amount of spatial overlap between the first physical environment represented in the first previously-captured media item and the second physical environment represented in the second previously-captured media item is less than a predefined threshold amount of spatial overlap

Figure 17C

1730 In accordance with a determination that one or more first additional media items have been captured at one or more first locations in the first physical environment, display, in the representation of the first previously-captured media item, one or more first indicators indicating the one or more first locations in the first physical environment; and in accordance with a determination that one or more second additional media items have been captured at one or more second locations in the second physical environment, display, in the representation of the second previously-captured media item, one or more second indicators indicating the one or more second locations in the second physical environment 1732 While displaying the representation of the first previously-captured media item, display a virtual object over a portion of the representation of the first previously-captured media item corresponding to a portion of the first physical environment; and in response to receiving the input corresponding to the request to display the representation of the second previously-captured media item:

in accordance with a determination that the portion of the first physical environment is included in the second physical environment, display the virtual object over a portion of the representation of the second previously-captured media item corresponding to the portion of the first physical environment; and in accordance with a determination that the portion of the first physical environment is not included in the second physical environment, forgo displaying the virtual object over the representation of the second previously-captured media item 1734 Displaying the animated transition from the representation of the first previously-captured media item to the representation of the second previously-captured media item includes transforming the virtual object displayed over the portion of the representation of the first previously-captured media item in accordance with one or more transformations of the first previously-captured media item 1736 The first previously-captured media item and the second previously-captured media item are two consecutively-captured media items in a time series, and the input corresponding to the request to display the representation of the second previously-captured media item is a swipe gesture on a respective input device of the one or more input devices 1738 The first previously-captured media item was captured by a first user and the second previously-captured media item was captured by a second user

Figure 17D

1814 Displaying the representation of the field of view that includes the representation of the first subject includes displaying a virtual model corresponding to the first subject 1816 The first anchor point is one of a plurality of anchor points on the first subject, the virtual model includes a plurality of corresponding virtual anchor points, and displaying the virtual model corresponding to the first subject includes displaying the virtual model such that the virtual anchor points on the virtual model correspond respectively to the plurality of anchor points on the first subject 1818 The displayed representation of the field of view is based on a first perspective of the one or more cameras;
concurrently with displaying the representation of the field of view based on the first perspective of the one or more cameras and updating the representation of the field of view over time based on the changes in the field of view, display a second view that corresponds to a second perspective of the physical environment that is different from the first perspective of the one or more cameras, wherein the second view includes a second representation of the first subject and a second annotation corresponding to at least a portion of the path of the anchor point in the physical environment

Figure 18B

SYSTEMS, METHODS, AND GRAPHICAL USER INTERFACES FOR MODELING, MEASURING, AND DRAWING USING AUGMENTED REALITY

RELATED APPLICATIONS

This application claims priority to U.S. Provisional Application Ser. No. 62/965,710, filed Jan. 24, 2020 and U.S. Provisional Application Ser. No. 62/907,527, filed Sep. 27, 2019, each of which is hereby incorporated by reference in its entirety.

TECHNICAL FIELD

This relates generally to computer systems for virtual/augmented reality, including but not limited to electronic devices for modeling and annotating physical environments and/or objects using virtual/augmented reality environments.

BACKGROUND

Augmented and/or virtual reality environments are useful for modeling and annotating physical environments and objects therein, by providing different views of the physical environments and objects therein and enabling a user to superimpose annotations such as measurements and drawings on the physical environment and objects therein and to visualize interactions between the annotations and the physical environment and objects therein. But conventional methods of modeling and annotating physical environments and objects using augmented and/or virtual reality are cumbersome, inefficient, and limited. In some cases, conventional methods of modeling and annotating physical environments and objects using augmented and/or virtual reality are limited in functionality. In some cases, conventional methods of modeling and annotating physical environments and objects using augmented and/or virtual reality require multiple separate inputs (e.g., a sequence of gestures and button presses, etc.) to achieve an intended outcome (e.g., through activation of numerous displayed user interface elements to access different modeling, measurement, and/or drawing functions). In some cases, conventional methods of modeling and annotating physical environments and objects using augmented and/or virtual reality are limited to real-time implementations; in other cases, conventional methods are limited to implementations using previously-captured media. In some embodiments, conventional methods of modeling and annotating physical environments and objects provide only limited views of physical environments/objects and of interactions between virtual objects and the physical environments/objects. In addition, conventional methods take longer than necessary, thereby wasting energy. This latter consideration is particularly important in battery-operated devices.

SUMMARY

Accordingly, there is a need for computer systems with improved methods and interfaces for modeling, measuring, and drawing using virtual/augmented reality environments. Such methods and interfaces optionally complement or replace conventional methods for modeling, measuring, and drawing using virtual/augmented reality environments. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for modeling, measuring, and drawing using virtual/augmented reality are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, in addition to virtual/augmented reality-based modeling, measurement, and drawing functions, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system with a display generation component, an input device, and one or more cameras that are in a physical environment. The method includes capturing, via the one or more cameras, a representation of the physical environment, including updating the representation to include representations of respective portions of the physical environment that are in a field of view of the one or more cameras as the field of view of the one or more cameras moves. The method includes, after capturing the representation of the physical environment, displaying a user interface that includes an activatable user interface element for requesting display of a first orthographic view of the physical environment. The method includes receiving, via the input device, a user input corresponding to the activatable user interface element for requesting display of a first orthographic view of the physical environment; and, in response to receiving the user input, displaying the first orthographic view of the physical environment based on the captured representation of the one or more portions of the physical environment.

In accordance with some embodiments, a method is performed at a computer system with a display generation component, an input device, and one or more cameras that are in a physical environment. The method includes capturing, via the one or more cameras, information indicative of the physical environment, including information indicative of respective portions of the physical environment that are in a field of view of the one or more cameras as the field of view of the one or more cameras moves. The respective portions of the physical environment include a plurality of primary features of the physical environment and one or more secondary features of the physical environment. The method includes, after capturing the information indicative of the physical environment, displaying a user interface, including concurrently displaying: graphical representations of the plurality of primary features that are generated with a first level of fidelity to the corresponding plurality of primary features of the physical environment; and one or more graphical representations of secondary features that are generated with a second level of fidelity to the corresponding one or more secondary features of the physical environment, wherein the second level of fidelity is lower than the first level of fidelity.

In accordance with some embodiments, a method is performed at a computer system with a display generation component and one or more input devices. The method includes displaying, via the display generation component: a representation of a physical environment, wherein the representation of the physical environment includes a representation of a first physical object that occupies a first physical space in the physical environment and has a first respective object property; and a virtual object at a position in the representation of the physical environment that corresponds to a second physical space in the physical environment that is distinct from the first physical space. The method includes detecting a first input that corresponds to the virtual object, wherein movement of the first input corresponds to a request to move the virtual object in the representation of the physical environment relative to the representation of the first physical object. The method includes, while detecting the first input, at least partially moving the virtual object in the representation of the physical environment based on the movement of the first input. In accordance with a determination that the movement of the first input corresponds to a request to move the virtual object through one or more positions, in the representation of the physical environment, that correspond to physical space in the physical environment that is not occupied by a physical object with the first respective object property, at least partially moving the virtual object in the representation of the physical environment includes moving the virtual object by a first amount. In accordance with a determination that the movement of the first input corresponds to a request to move the virtual object through one or more positions, in the representation of the physical environment, that correspond to physical space in the physical environment that at least partially overlaps with the first physical space of the first physical object, at least partially moving the virtual object in the representation of the physical environment includes moving the virtual object by a second amount, less than the first amount, through at least a subset of the one or more positions that correspond to physical space in the physical environment that at least partially overlaps with the first physical space of the first physical object.

In accordance with some embodiments, a method is performed at a computer system having a display generation component and one or more input devices. The method includes displaying, via the display generation component, a first representation of first previously-captured media, wherein the first representation of the first media includes a representation of a physical environment. The method includes, while displaying the first representation of the first media, receiving an input corresponding to a request to annotate a portion of the first representation that corresponds to a first portion of the physical environment. The method includes, in response to receiving the input, displaying an annotation on the portion of the first representation that corresponds to the first portion of the physical environment, the annotation having one or more of a position, orientation, or scale that is determined based on the physical environment. The method includes, after receiving the input, displaying the annotation on a portion of a displayed second representation of second previously-captured media, wherein the second previously-captured media is distinct from the first previously-captured media, and the portion of the second representation corresponds to the first portion of the physical environment.

In accordance with some embodiments, a method is performed at a computer system having a display generation component, an input device, and one or more cameras that are in a physical environment. The method includes displaying, via the display generation component, a first representation of a field of view of the one or more cameras, and receiving, via the input device, a first drawing input that corresponds to a request to add a first annotation to the first representation of the field of view. The method includes, in response to receiving the first drawing input: displaying, in the first representation of the field of view of the one or more cameras, the first annotation along a path that corresponds to movement of the first drawing input; and, after displaying the first annotation along the path that corresponds to the movement of the first drawing input, in accordance with a determination that a respective portion of the first annotation corresponds to one or more locations within a threshold distance of an edge of a physical object in the physical environment, displaying an annotation that is constrained to correspond to the edge of the physical object.

In accordance with some embodiments, a method is performed at a computer system with a display generation component and one or more input devices. The method includes displaying, via the display generation component, a representation of a first previously-captured media item. The representation of the first previously-captured media item is associated with (e.g., includes) depth information corresponding to a physical environment in which the first media item was captured. The method includes, while displaying the representation of the first previously-captured media item, receiving, via the one or more input devices, one or more first inputs corresponding to a request to display, in the representation of the first previously-captured media item, a first representation of a first measurement corresponding to a first respective portion of the physical environment captured in the first media item. The method includes, in response to receiving the one or more first inputs corresponding to the request to display the first representation of the first measurement in the representation of the first previously-captured media item: displaying, via the display generation component, the first representation of the first measurement over at least a portion of the representation of the first previously-captured media item that corresponds to the first respective portion of the physical environment captured in the representation of the first media item, based on the depth information associated with the first previously-captured media item; and displaying, via the display generation component, a first label corresponding to the first representation of the first measurement that describes the first measurement based on the depth information associated with the first previously-captured media item.

In accordance with some embodiments, a method is performed at a computer system with a display generation component and one or more input devices. The method includes displaying, via the display generation component, a representation of a first previously-captured media item that includes a representation of a first physical environment from a first viewpoint. The method includes receiving, via the one or more input devices, an input corresponding to a request to display a representation of a second previously-captured media item that includes a representation of a second physical environment from a second viewpoint. The method includes, in response to receiving the input corresponding to the request to display the representation of the second previously-captured media item, in accordance with a determination that one or more properties of the second previously-captured media item meet proximity criteria with respect to one or more corresponding properties of the first previously-captured media item, displaying an animated transition from the representation of the first previously-captured media item to the representation of the second previously-captured media item. The animated transition is based on a difference between the first viewpoint of the first previously-captured media item and the second viewpoint of the second previously-captured media item.

In accordance with some embodiments, a method is performed at a computer system having a display generation component and one or more cameras. The method includes displaying, via the display generation component, a representation of a field of view of the one or more cameras. The representation of the field of view includes a representation of a first subject that is in a physical environment in the field of view of the one or more cameras, and a respective portion of the representation of the first subject in the representation of the field of view corresponds to a first anchor point on the first subject. The method includes, while displaying the representation of the field of view: updating the representation of the field of view over time based on changes in the field of view. The changes in the field of view include movement of the first subject that moves the first anchor point, and, while the first anchor point moves along a path in the physical environment, the respective portion of the representation of the first subject corresponding to the first anchor point changes along a path in the representation of the field of view that corresponds to the movement of the first anchor point. The method includes displaying, in the representation of the field of view, an annotation corresponding to at least a portion of the path of the respective portion of the representation of the first subject corresponding to the first anchor point.

In accordance with some embodiments, a computer system (e.g., an electronic device) includes (and/or is in communication with) a display generation component (e.g., a display, a projector, a head-mounted display, a heads-up display, or the like), one or more cameras (e.g., video cameras that continuously, or repeatedly at regular intervals, provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, cause the computer system to perform or cause performance of the operations of any of the methods described herein. In accordance with some embodiments, a graphical user interface on a computer system that includes (and/or is in communication with) a display generation component, one or more cameras, one or more input devices, optionally one or more pose sensors, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes (and/or is in communication with) a display generation component, one or more cameras, one or more input devices, optionally one or more pose sensors, optionally one or more sensors to detect intensities of contacts with the touch-sensitive surface, optionally one or more tactile output generators, and means for performing or causing performance of the operations of any of the methods described herein. In accordance with some embodiments, an information processing apparatus, for use in a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, includes means for performing or causing performance of the operations of any of the methods described herein.

Thus, computer systems that have (and/or are in communication with) a display generation component, one or more cameras, one or more input devices, optionally one or more pose sensors, optionally one or more sensors to detect intensities of contacts with the touch-sensitive surface, and optionally one or more tactile output generators, are provided with improved methods and interfaces for modeling, measuring, and drawing using virtual/augmented reality, thereby increasing the effectiveness, efficiency, and user satisfaction with such computer systems. Such methods and interfaces may complement or replace conventional methods for modeling, measuring, and drawing using virtual/augmented reality.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an example user interface for a multifunction device with a touch-sensitive surface that is separate from the display in accordance with some embodiments.

FIGS. 7A-7B are flow diagrams of a process for providing different views of a physical environment in accordance with some embodiments.

FIGS. 8A-8C are flow diagrams of a process for providing representations of a physical environment at different levels of fidelity to the physical environment in accordance with some embodiments.

FIGS. 9A-9G are flow diagrams of a process for displaying modeled spatial interactions between virtual objects/annotations and a physical environment in accordance with some embodiments.

FIGS. 10A-10E are flow diagrams of a process for applying modeled spatial interactions with virtual objects/annotations to multiple media items in accordance with some embodiments.

FIG. 15A-15B are flow diagrams of a process for scanning a physical environment and adding annotations to captured media items of the physical environment in accordance with some embodiments.

FIG. 16A-16E are flow diagrams of a process for scanning a physical environment and adding measurements corresponding to objects in captured media items of the physical environment in accordance with some embodiments.

FIG. 17A-17D are flow diagrams of a process for transitioning between a displayed media item and a different media item selected by a user for viewing in accordance with some embodiments.

FIG. 18A-18B are flow diagrams of a process for viewing motion tracking information corresponding to a representation of a moving subject in accordance with some embodiments.

DESCRIPTION OF EMBODIMENTS

As noted above, augmented reality environments are useful for modeling and annotating physical environments spaces and objects therein, by providing different views of the physical environments and objects therein and enabling a user to superimpose annotations such as measurements and drawings on the physical environment and objects therein and to visualize interactions between the annotations and the physical environment and objects therein. Conventional methods of modeling and annotating with augmented reality environments are often limited in functionality. In some cases, conventional methods of modeling and annotating physical environments and objects using augmented and/or virtual reality require multiple separate inputs (e.g., a sequence of gestures and button presses, etc.) to achieve an intended outcome (e.g., through activation of numerous displayed user interface elements to access different modeling, measurement, and/or drawing functions). In some cases, conventional methods of modeling and annotating physical environments and objects using augmented and/or virtual reality are limited to real-time implementations; in other cases, conventional methods are limited to implementations using previously-captured media. In some embodiments, conventional methods of modeling and annotating physical environments and objects provide only limited views of physical environments/objects and of interactions between virtual objects and the physical environments/objects. The embodiments disclosed herein provide an intuitive way for a user to model and annotate a physical environment using augmented and/or virtual reality (e.g., by enabling the user to perform different operations in the augmented/virtual reality environment with fewer inputs, and/or by simplifying the user interface). Additionally, the embodiments herein provide improved feedback that provide the user with additional information about and views of the physical environment and interactions with virtual objects and information about the operations being performed in the augmented/virtual reality environment.

The systems, methods, and GUIs described herein improve user interface interactions with virtual/augmented reality environments in multiple ways. For example, they make it easier to model and annotate a physical environment, by providing options for different views of the physical environment, presenting intuitive interactions between physical and virtual objects, and applying annotations made in one view of the physical environment to other views of the physical environment.

Figure 7A:
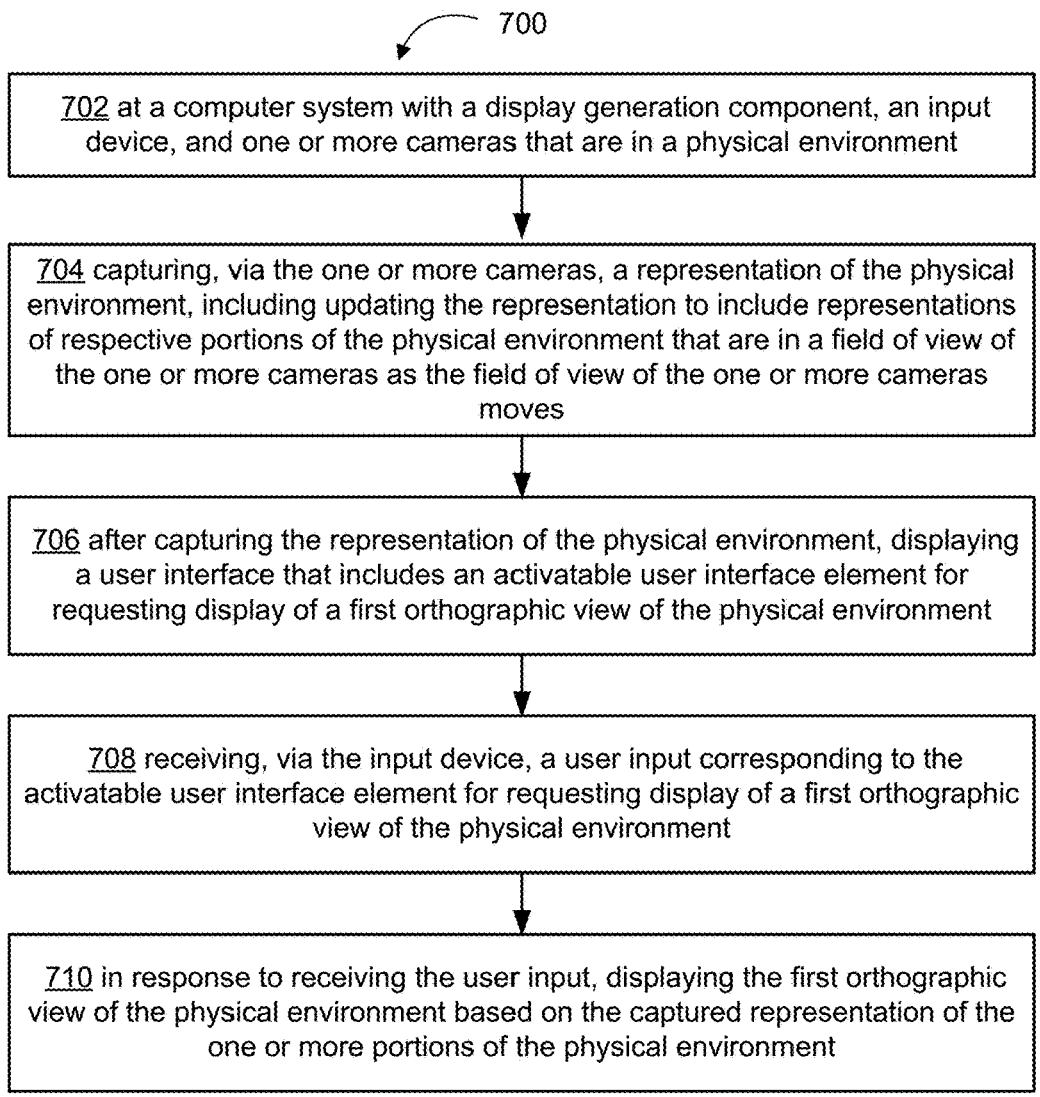
Figure 8A:
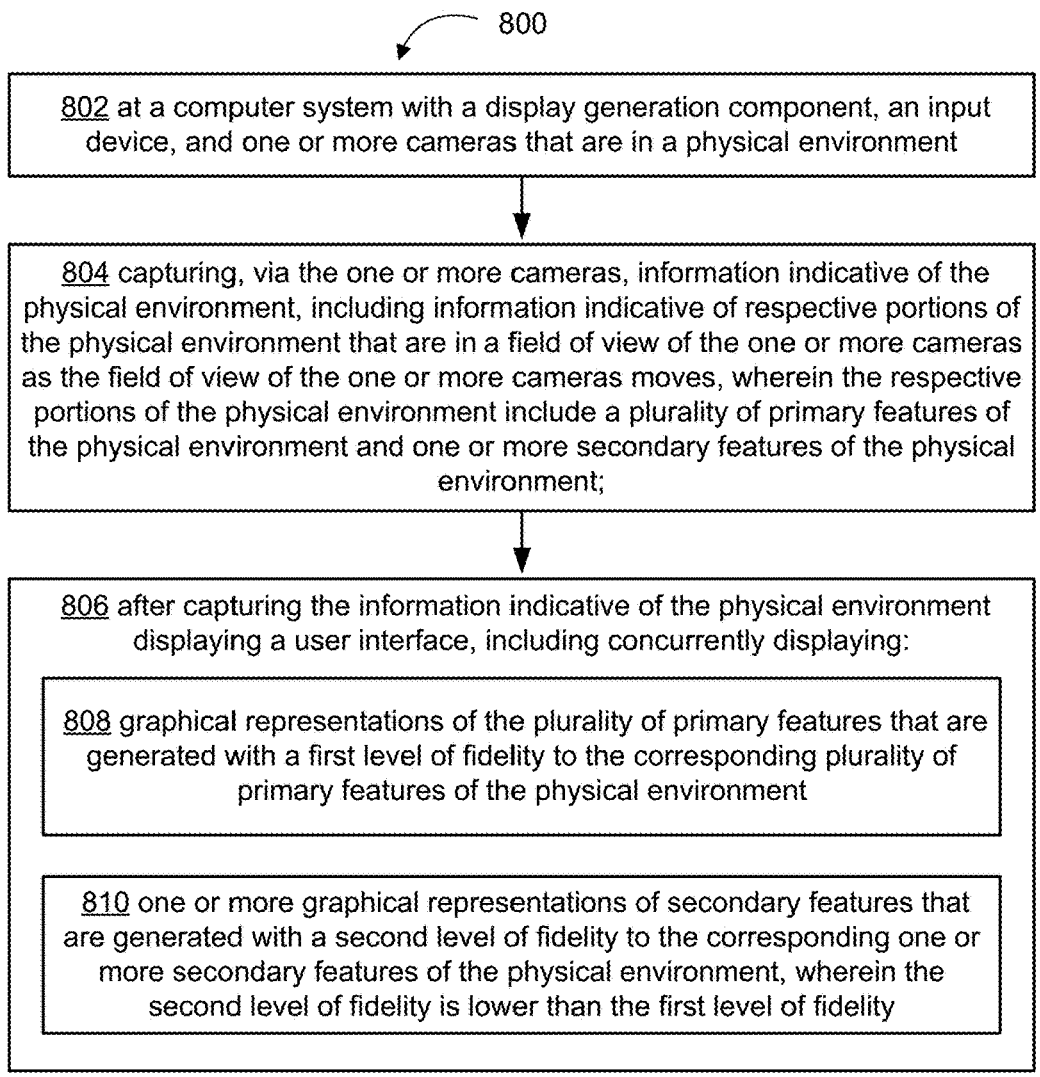
Figure 9A:
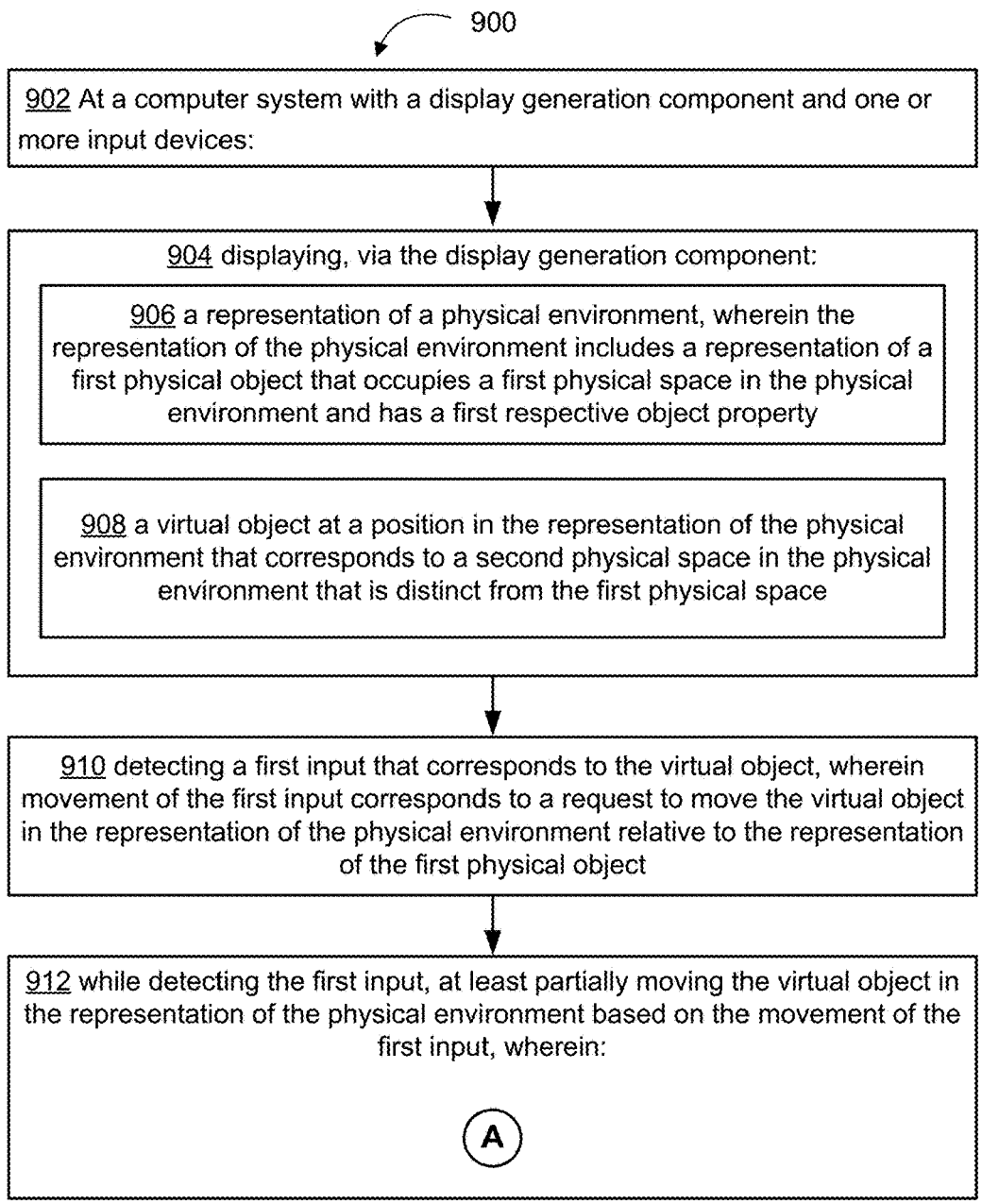
Figure 9B:
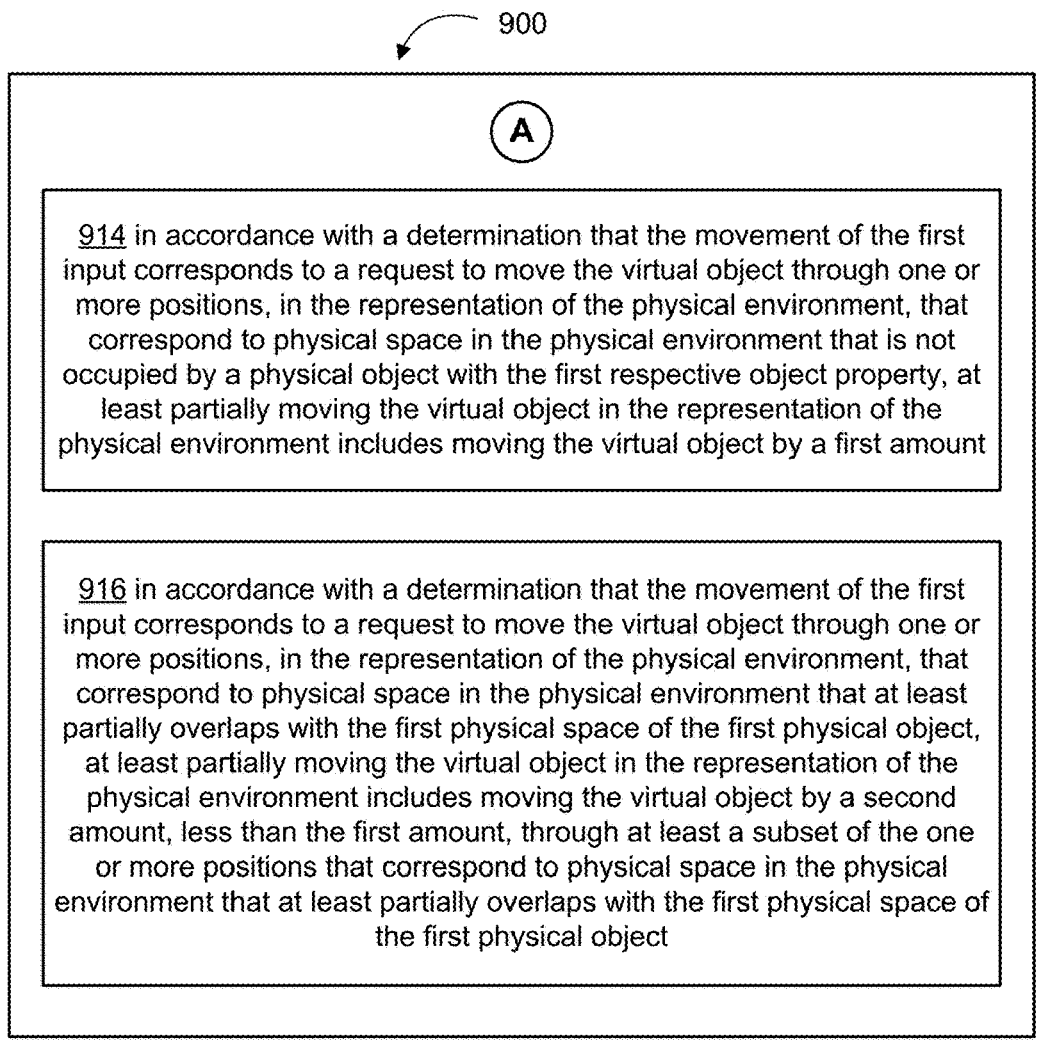
Figure 9E:
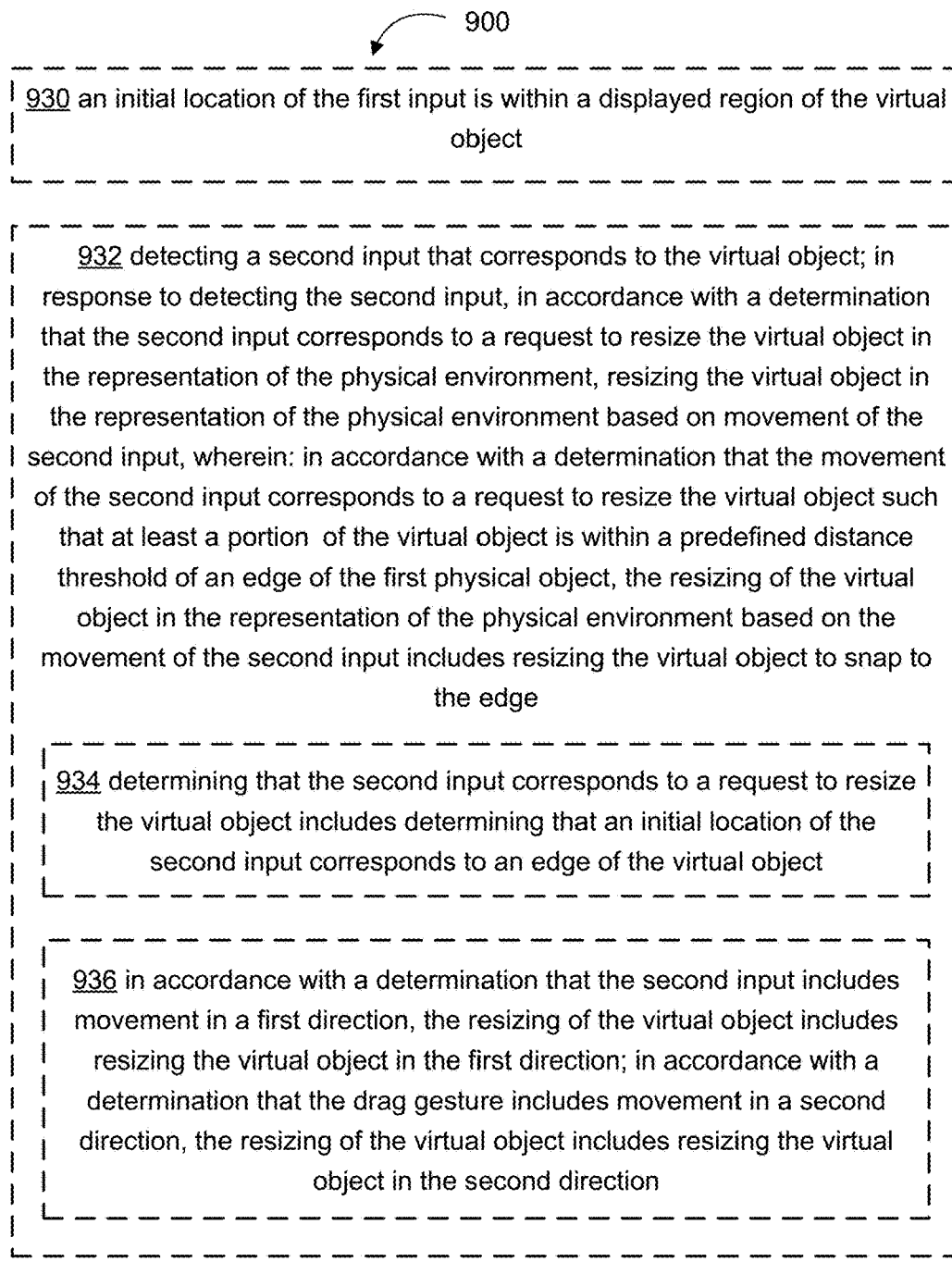
Figure 10A:
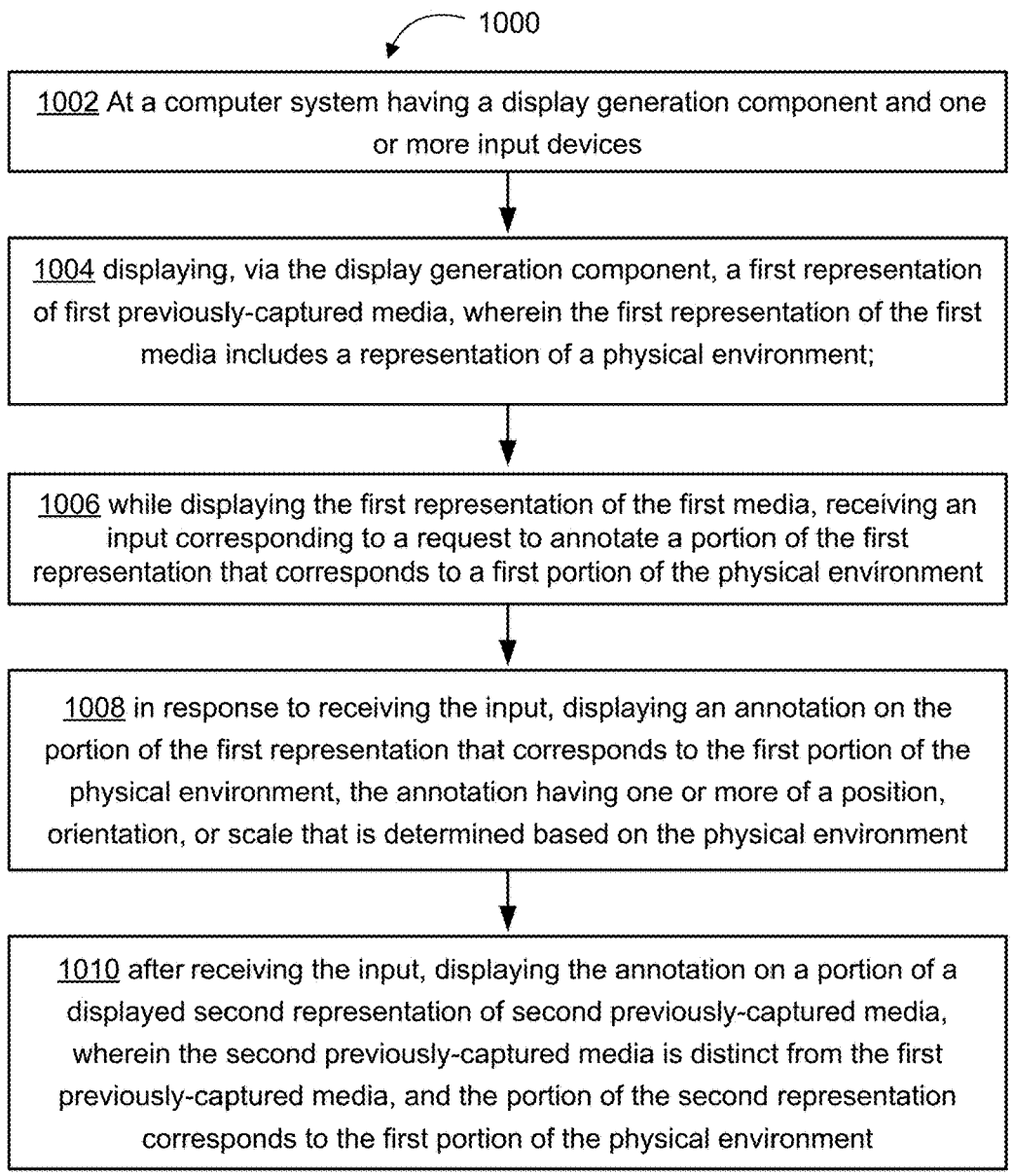
Figure 10C:
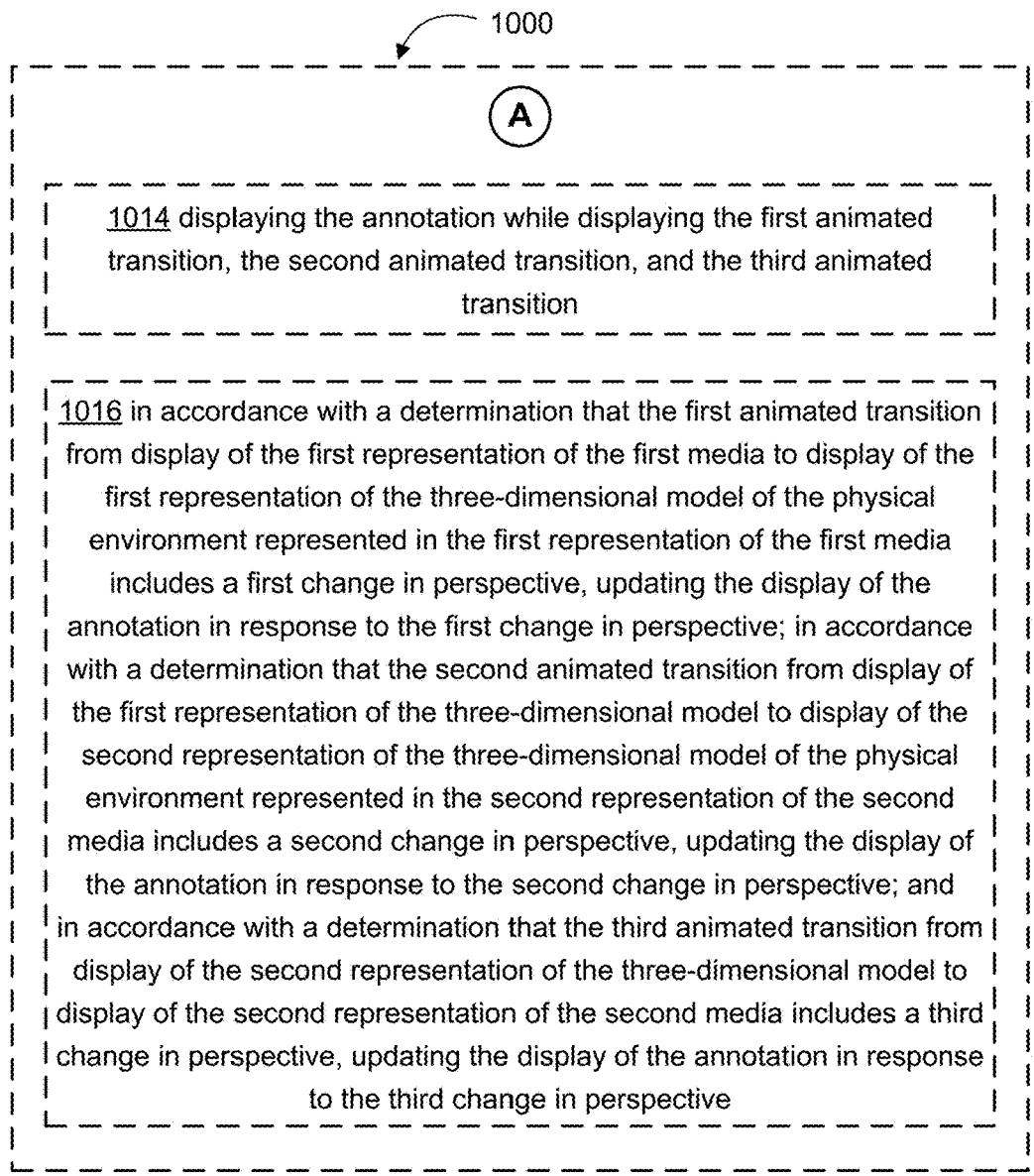
Figure 18A:
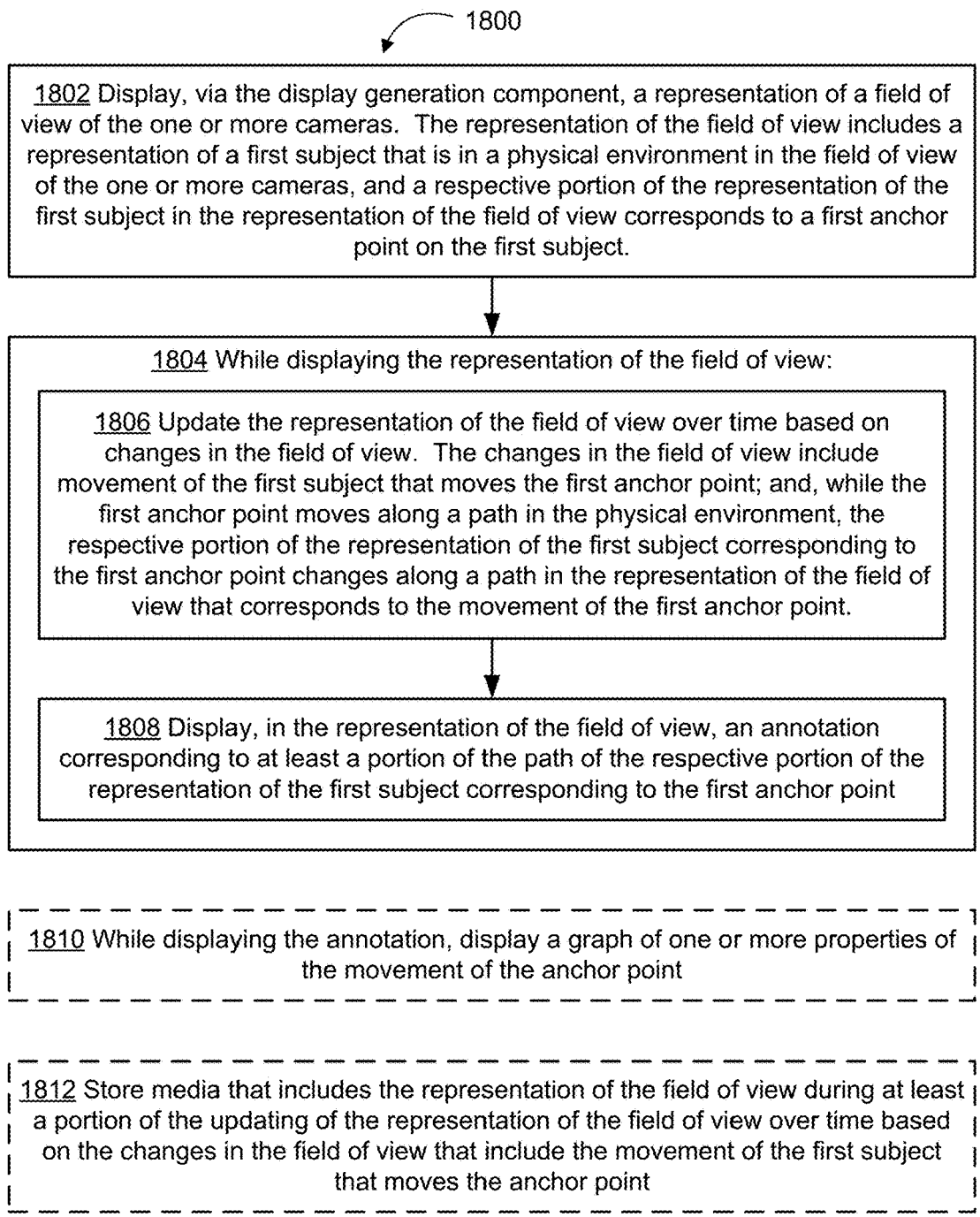

Below, FIGS. 1A-1B, 2A-2B, and 3A-3C provide a description of example devices. FIGS. 4A-4B, 5A-5LL, and 6A-6T illustrate example user interfaces for interacting with and annotating augmented reality environments and media items. FIGS. 7A-7B illustrate a flow diagram of a method of providing different views of a physical environment. FIGS. 8A-8C illustrate a flow diagram of a method of providing representations of a physical environment at different levels of fidelity to the physical environment. FIGS. 9A-9G illustrate a flow diagram of a method of displaying modeled spatial interactions between virtual objects/annotations and a physical environment. FIGS. 10A-10E illustrate a flow diagram of a method of applying modeled spatial interactions with virtual objects/annotations to multiple media items. FIGS. 11A-11JJ illustrate example user interfaces for scanning a physical environment and adding annotations to captured media items of the physical environment. FIGS. 12A-12RR illustrate example user interfaces for scanning a physical environment and adding measurements corresponding to objects in captured media items of the physical environment. FIGS. 13A-13HH illustrate example user interfaces for transitioning between displayed media items and different media items selected by a user for viewing. FIGS. 14A-14SS illustrate example user interfaces for viewing motion tracking information corresponding to a representation of a moving subject. FIGS. 15A-15B illustrate a flow diagram of a method of scanning a physical environment and adding annotations to captured media items of the physical environment. FIGS. 16A-16E illustrate a flow diagram of a method of scanning a physical environment and adding measurements corresponding to objects in captured media items of the physical environment. FIGS. 17A-17D illustrate a flow diagram of a method of transitioning between displayed media items and different media items selected by a user for viewing. FIGS. 18A-18B illustrate a flow diagram of a method of viewing motion tracking information corresponding to a representation of a moving subject. The user interfaces in FIGS. 5A-5LL, 6A-6T, 11A-11JJ, 12A-12RR, 13A-13HH, and 14A-14SS are used to illustrate the processes in FIGS. 7A-7B, 8A-8C, 9A-9G, 10A-10E, 15A-15B, 16A-16E, 17A-17D, and 18A-18B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both contacts, but they are not the same element, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Computer systems for virtual/augmented reality include electronic devices that produce virtual/augmented reality environments. Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touch-pads), are, optionally, used. It should also be understood that, in some embodiments, the device is not a portable communications device, but is a desktop computer with a touch-sensitive surface (e.g., a touch-screen display and/or a touchpad) that also includes, or is in communication with, one or more cameras.

In the discussion that follows, a computer system that includes an electronic device that has (and/or is in communication with) a display and a touch-sensitive surface is described. It should be understood, however, that the computer system optionally includes one or more other physical user-interface devices, such as a physical keyboard, a mouse, a joystick, a wand controller, and/or cameras tracking the position of one or more features of the user such as the user's hands.

The device typically supports a variety of applications, such as one or more of the following: a gaming application, a note taking application, a drawing application, a presentation application, a word processing application, a spreadsheet application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed by the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
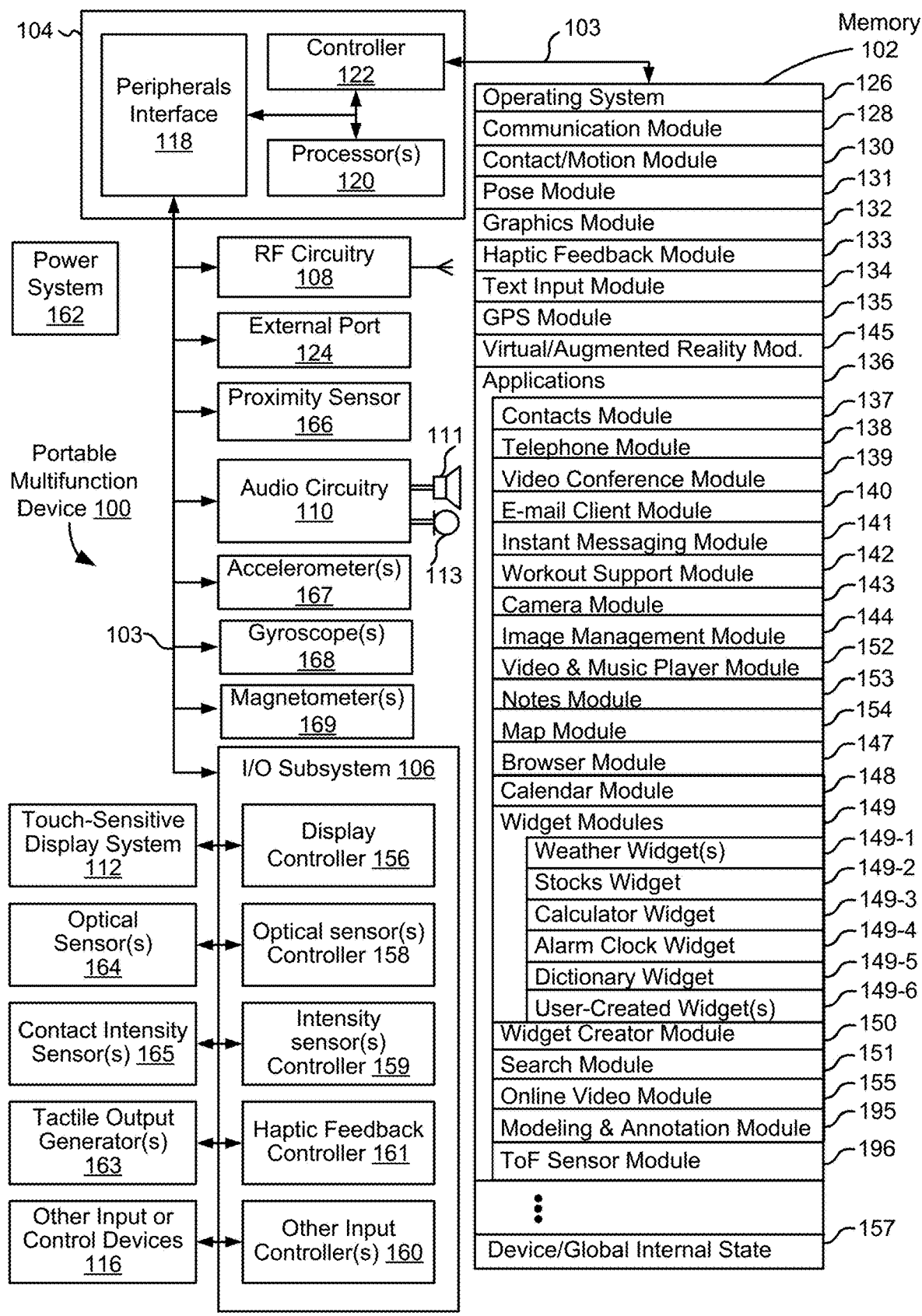
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164 (e.g., as part of one or more cameras). Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. In some embodiments, tactile output generator(s) 163 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the pose (e.g., position and orientation or attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's pose (e.g., location and/or attitude).

Operating system 126 (e.g., iOS, Android, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif. In some embodiments, the external port is a USB Type-C connector that is the same as, or similar to and/or compatible with the USB Type-C connector used in some electronic devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture)

and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Pose module 131, in conjunction with accelerometers 167, gyroscopes 168, and/or magnetometers 169, optionally detects pose information concerning the device, such as the device's pose (e.g., roll, pitch, yaw and/or position) in a particular frame of reference. Pose module 131 includes software components for performing various operations related to detecting the position of the device and detecting changes to the pose of the device.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Virtual/augmented reality module 145 provides virtual and/or augmented reality logic to applications 136 that implement augmented reality, and in some embodiments virtual reality, features. Virtual/augmented reality module 145 facilitates superposition of virtual content, such as a virtual user interface object, on a representation of at least a portion of a field of view of the one or more cameras. For example, with assistance from the virtual/augmented reality module 145, the representation of at least a portion of a field of view of the one or more cameras may include a respective physical object and the virtual user interface object may be displayed at a location, in a displayed augmented reality environment, that is determined based on the respective physical object in the field of view of the one or more cameras or a virtual reality environment that is determined based on the pose of at least a portion of a computer system (e.g., a pose of a display device that is used to display the user interface to a user of the computer system).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154;
online video module 155
modeling and annotation module 195; and/or
time-of-flight ("ToF") sensor module 196.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

In conjunction with touch-sensitive display system 112, display controller 156, contact module 130, graphics module 132, camera module 143, image management module 152, video & music player module 152, and virtual/augmented reality module 145, modeling and annotation module 195 includes executable instructions that allow the user to model physical environments and/or physical objects therein and to annotate (e.g., measure, draw on, and/or add virtual objects to and manipulate virtual objects within) a representation (e.g., live or previously-captured) of a physical environment and/or physical objects therein in an augmented and/or virtual reality environment, as described in more detail herein.

In conjunction with camera module 143, ToF sensor module 196 includes executable instructions for capturing depth information of a physical environment. In some embodiments, ToF sensor module 196 operates in conjunction with camera module 143 to provide depth information of a physical environment.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touch-sensitive surface. In some other embodiments, the menu button is a physical push button or other physical input control device instead of a touch-sensitive surface.

Figure 1B:
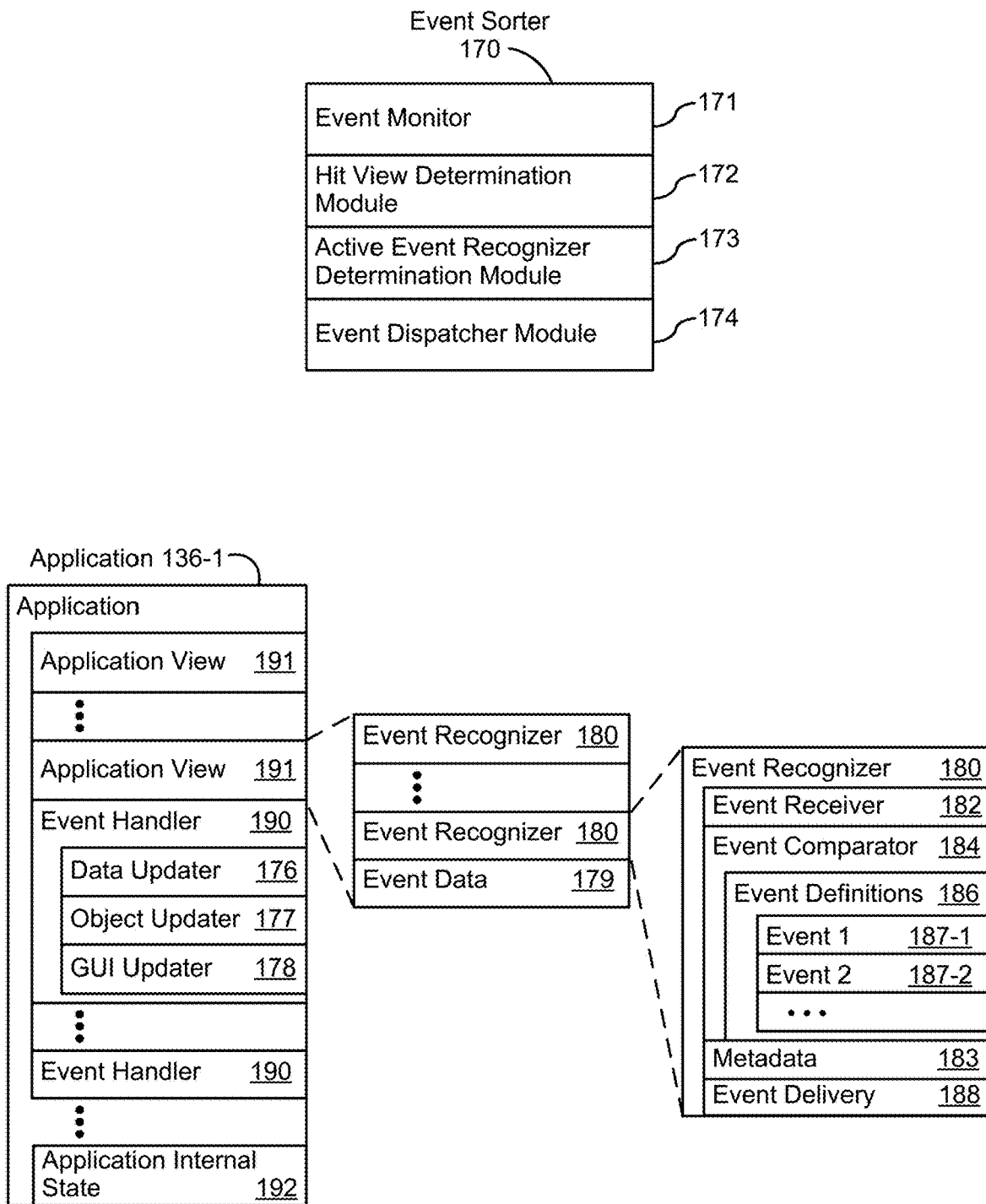
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current pose (e.g., position and orientation) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; inputs based on real-time analysis of video images obtained by one or more cameras; movement of the device; oral instructions; detected eye movements; biometric inputs; and/or any combination thereof are optionally utilized as inputs corresponding to sub-events which define an event to be recognized.

Figure 2A:
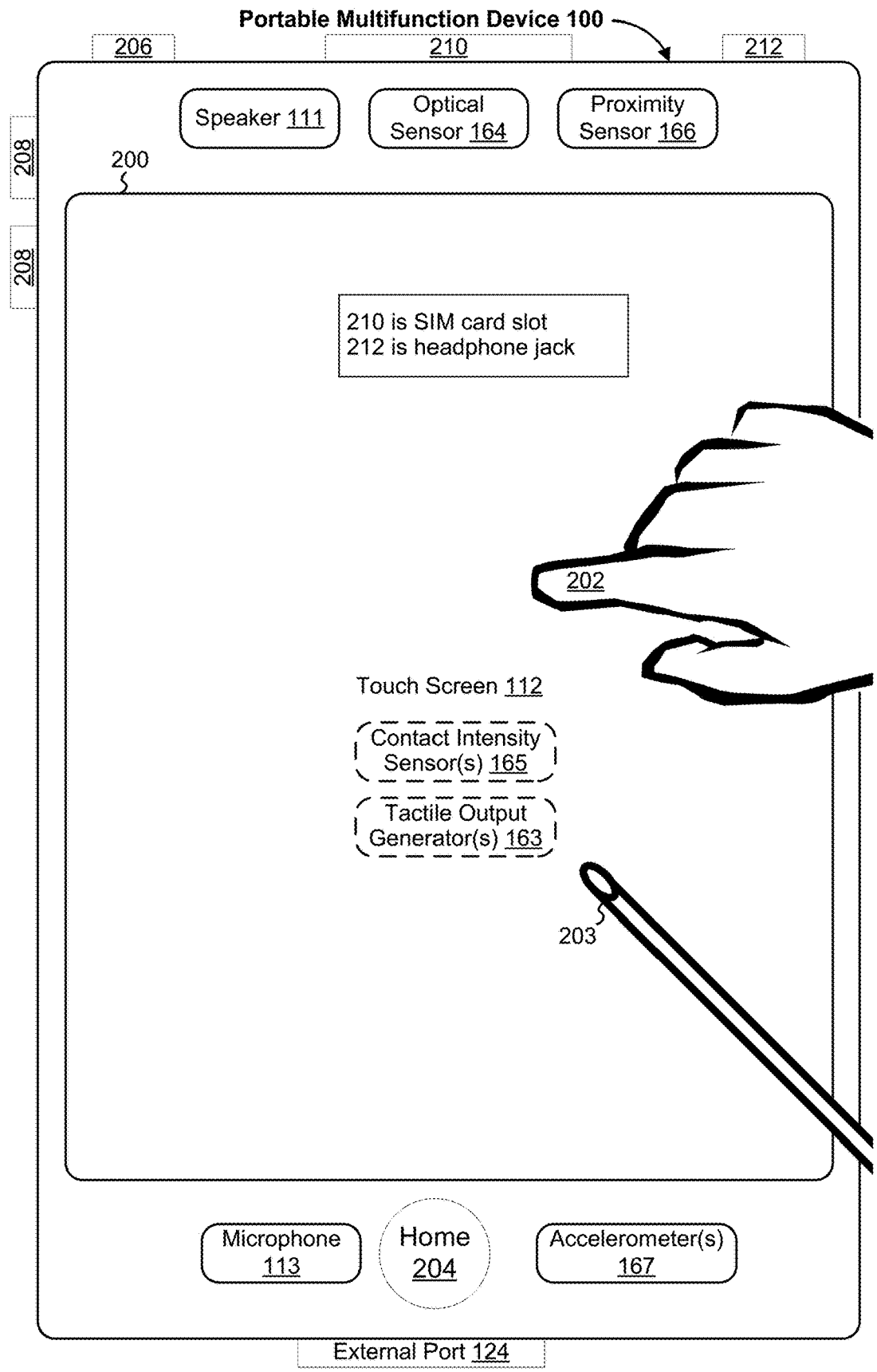
FIG. 2A illustrates a portable multifunction device having a touch screen in accordance with some embodiments.

FIG. 2A illustrates a portable multifunction device 100 (e.g., a view of the front of device 100) having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

Figure 2B:
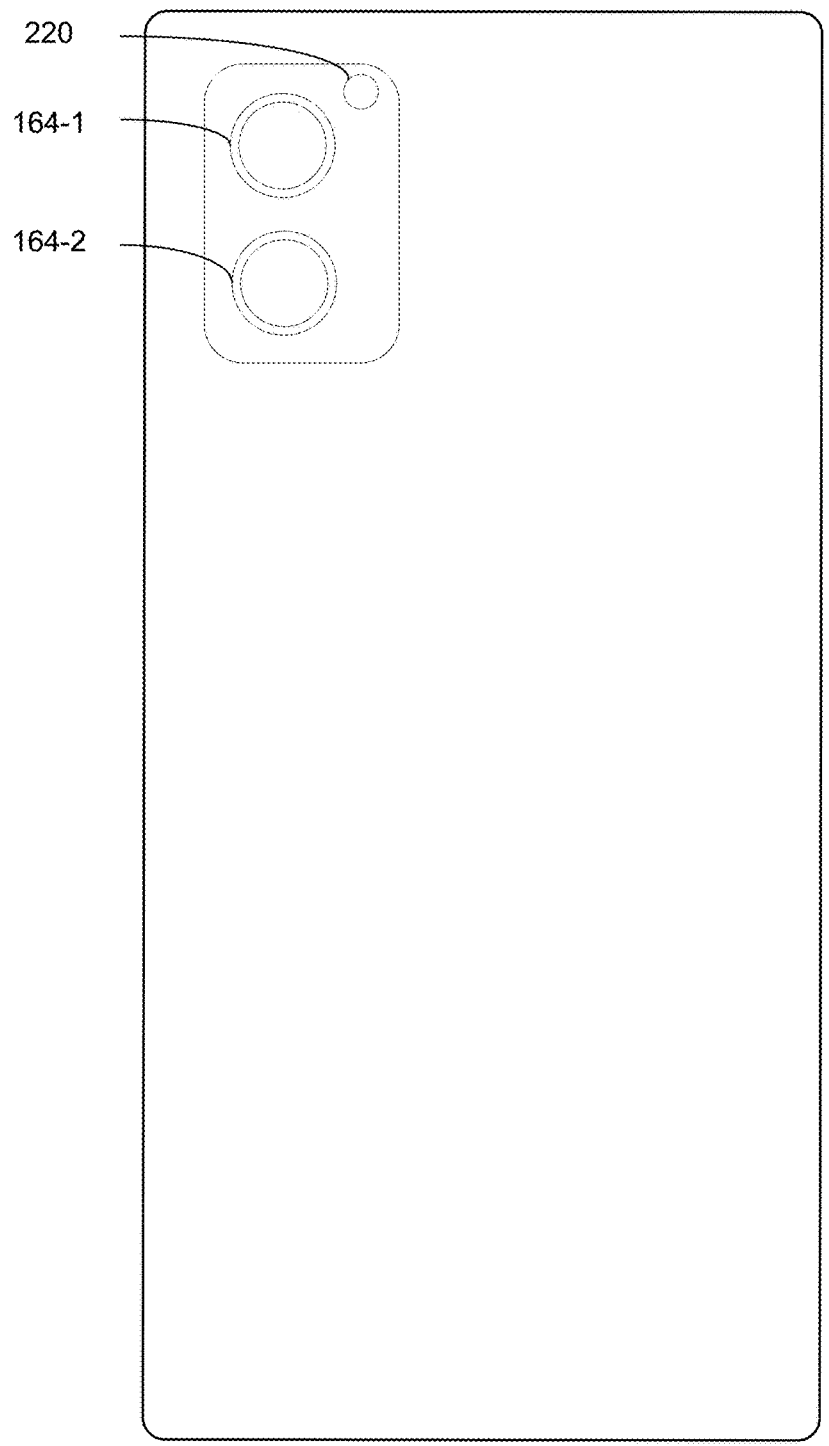
FIG. 2B illustrates a portable multifunction device having optical sensors and a time-of-flight sensor in accordance with some embodiments.

FIG. 2B illustrates a portable multifunction device 100 (e.g., a view of the back of device 100) that optionally includes optical sensors 164-1 and 164-2, and time-of-flight ("ToF") sensor 220. When optical sensors (e.g., cameras) 164-1 and 164-2 concurrently capture a representation of a physical environment (e.g., an image or a video), the portable multifunction device can determine depth information from the disparity between the information concurrently captured by the optical sensors (e.g., disparities between the captured images). Depth information provided by (e.g., image) disparities determined using optical sensors 164-1 and 164-2 may lack accuracy, but typically provides high resolution. To improve the accuracy of depth information provided by the disparity between images, time-of-flight sensor 220 is optionally used in conjunction with optical sensors 164-1 and 164-2. ToF sensor 220 emits a waveform (e.g., light from a light emitting diode (LED) or a laser), and measures the time it takes for the reflection(s) of the waveform (e.g., light) to return back to ToF sensor 220. Depth information is determined from the measured time it takes for the light to return back to ToF sensor 220. A ToF sensor typically provides high accuracy (e.g., accuracy of 1 cm or better with respect to measured distances or depths), but may lack high resolution. Therefore, combining depth information from a ToF sensor with depth information provided by (e.g., image) disparities determined using optical sensors (e.g., cameras) provides a depth map that is both accurate and has high resolution.

Figure 3A:
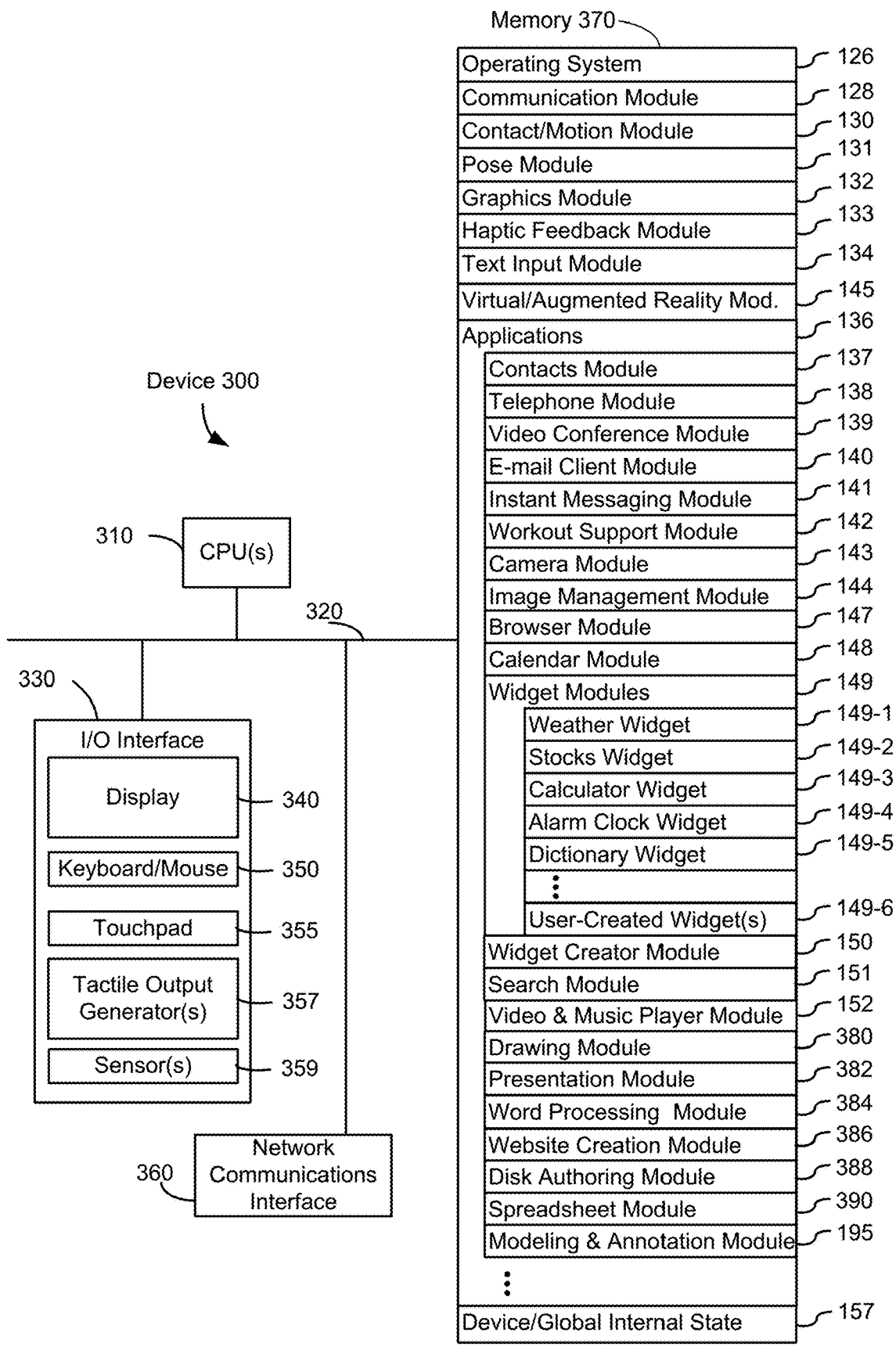
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., optical, acceleration, proximity, touch-sensitive, and/or contact intensity sensors similar to analogous sensors described above with reference to FIG. 1A, and optionally a time-of-flight sensor 220 described above with reference to FIG. 2B). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, web site creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
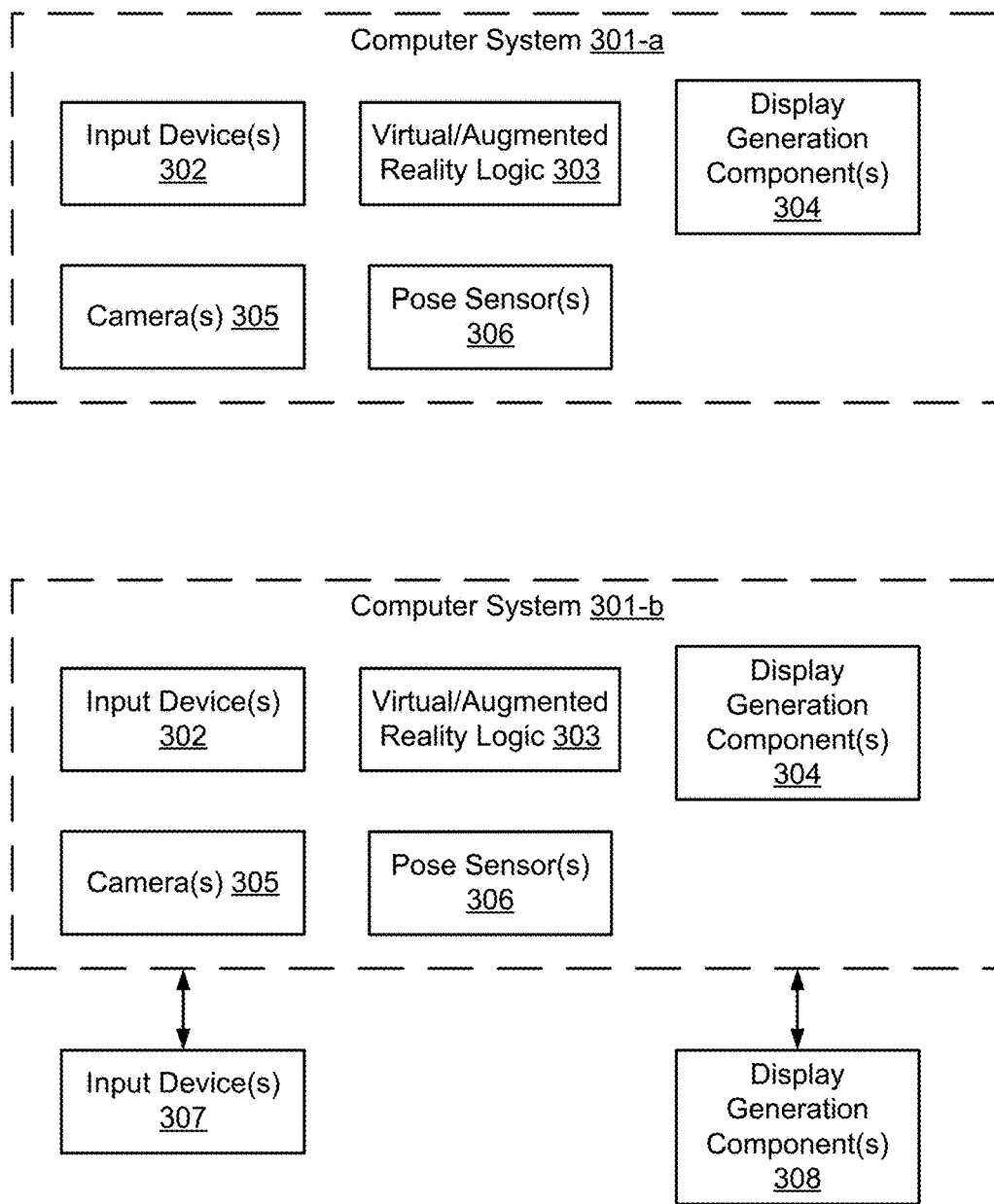
FIGS. 3B-3C are block diagrams of example computer systems in accordance with some embodiments.
Figure 3C:
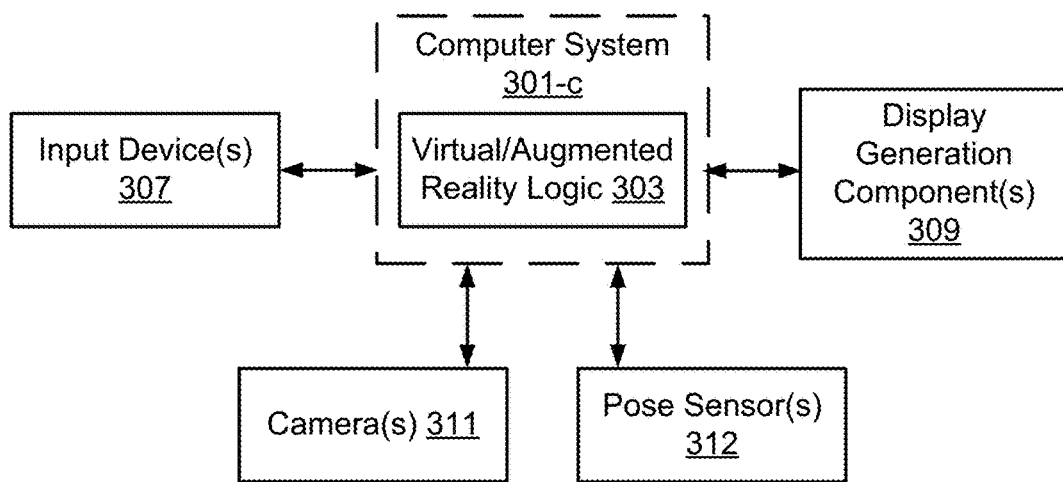

FIGS. 3B-3C are block diagrams of example computer systems 301 in accordance with some embodiments.

In some embodiments, computer system 301 includes and/or is in communication with:
  input device(s) (302 and/or 307, e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands);
  virtual/augmented reality logic 303 (e.g., virtual/augmented reality module 145);
  display generation component(s) (304 and/or 308, e.g., a display, a projector, a head-mounted display, a heads-up display, or the like) for displaying virtual user interface elements to the user;
  camera(s) (e.g., 305 and/or 311) for capturing images of a field of view of the device, e.g., images that are used to determine placement of virtual user interface elements, determine a pose of the device, and/or display a portion of the physical environment in which the camera(s) are located; and
  pose sensor(s) (e.g., 306 and/or 311) for determining a pose of the device relative to the physical environment and/or changes in pose of the device.

In some computer systems, camera(s) (e.g., 305 and/or 311) include a time-of-flight sensor (e.g., time-of-flight sensor 220, FIG. 2B) for capturing depth information as described above with reference to FIG. 2B.

In some computer systems (e.g., 301-*a* in FIG. 3B), input device(s) 302, virtual/augmented reality logic 303, display generation component(s) 304, camera(s) 305; and pose sensor(s) 306 are all integrated into the computer system (e.g., portable multifunction device 100 in FIGS. 1A-1B or device 300 in FIG. 3 such as a smartphone or tablet).

In some computer systems (e.g., 301-*b*), in addition to integrated input device(s) 302, virtual/augmented reality logic 303, display generation component(s) 304, camera(s) 305; and pose sensor(s) 306, the computer system is also in communication with additional devices that are separate from the computer system, such as separate input device(s) 307 such as a touch-sensitive surface, a wand, a remote control, or the like and/or separate display generation component(s) 308 such as virtual reality headset or augmented reality glasses that overlay virtual objects on a physical environment.

In some computer systems (e.g., 301-*c* in FIG. 3C), the input device(s) 307, display generation component(s) 309, camera(s) 311; and/or pose sensor(s) 312 are separate from the computer system and are in communication with the computer system. In some embodiments, other combinations of components in computer system 301 and in communication with the computer system are used. For example, in some embodiments, display generation component(s) 309, camera(s) 311, and pose sensor(s) 312 are incorporated in a headset that is either integrated with or in communication with the computer system.

In some embodiments, all of the operations described below with reference to FIGS. 5A-5LL and 6A-6T are performed on a single computing device with virtual/augmented reality logic 303 (e.g., computer system 301-*a* described below with reference to FIG. 3B). However, it should be understood that frequently multiple different computing devices are linked together to perform the operations described below with reference to FIGS. 5A-5LL and 6A-6T (e.g., a computing device with virtual/augmented reality logic 303 communicates with a separate computing device with a display 450 and/or a separate computing device with a touch-sensitive surface 451). In any of these embodiments, the computing device that is described below with reference to FIGS. 5A-5LL and 6A-6T is the computing device (or devices) that contain(s) the virtual/augmented reality logic 303. Additionally, it should be understood that the virtual/augmented reality logic 303 could be divided between a plurality of distinct modules or computing devices in various embodiments; however, for the purposes of the description herein, the virtual/augmented reality logic 303 will be primarily referred to as residing in a single computing device so as not to unnecessarily obscure other aspects of the embodiments.

In some embodiments, the virtual/augmented reality logic 303 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on a display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the virtual/augmented reality logic 303).

In some embodiments, both a display and a touch-sensitive surface are integrated with the computer system (e.g., 301-a in FIG. 3B) that contains the virtual/augmented reality logic 303. For example, the computer system may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2A).

In some embodiments, a touch-sensitive surface is integrated with the computer system while a display is not integrated with the computer system that contains the virtual/augmented reality logic 303. For example, the computer system may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computer system may be a portable multifunction device 100 (e.g., a smartphone, PDA, tablet computer, etc.) with a touch screen (e.g., 112 in FIG. 2A) connected (via wired or wireless connection) to a separate display (e.g., a computer monitor, television, etc.).

In some embodiments, a display is integrated with the computer system while a touch-sensitive surface is not integrated with the computer system that contains the virtual/augmented reality logic 303. For example, the computer system may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computer system may be a portable multifunction device 100 (e.g., a smartphone, PDA, tablet computer, etc.) with a touch screen (e.g., 112 in FIG. 2A) connected (via wired or wireless connection) to a separate touch-sensitive surface (e.g., a remote touchpad, another portable multifunction device with a touch screen serving as a remote touchpad, etc.).

In some embodiments, neither a display nor a touch-sensitive surface is integrated with the computer system (e.g., 301-c in FIG. 3C) that contains the virtual/augmented reality logic 303. For example, the computer system may be a stand-alone computing device 300 (e.g., a set-top box, gaming console, etc.) connected (via wired or wireless connection) to a separate touch-sensitive surface (e.g., a remote touchpad, a portable multifunction device, etc.) and a separate display (e.g., a computer monitor, television, etc.).

In some embodiments, the computer system has an integrated audio system (e.g., audio circuitry 110 and speaker 111 in portable multifunction device 100). In some embodiments, the computing device is in communication with an audio system that is separate from the computing device. In some embodiments, the audio system (e.g., an audio system integrated in a television unit) is integrated with a separate display. In some embodiments, the audio system (e.g., a stereo system) is a stand-alone system that is separate from the computer system and the display.

Attention is now directed towards embodiments of user interfaces ("UI") that are, optionally, implemented on portable multifunction device 100.

Figure 4A:
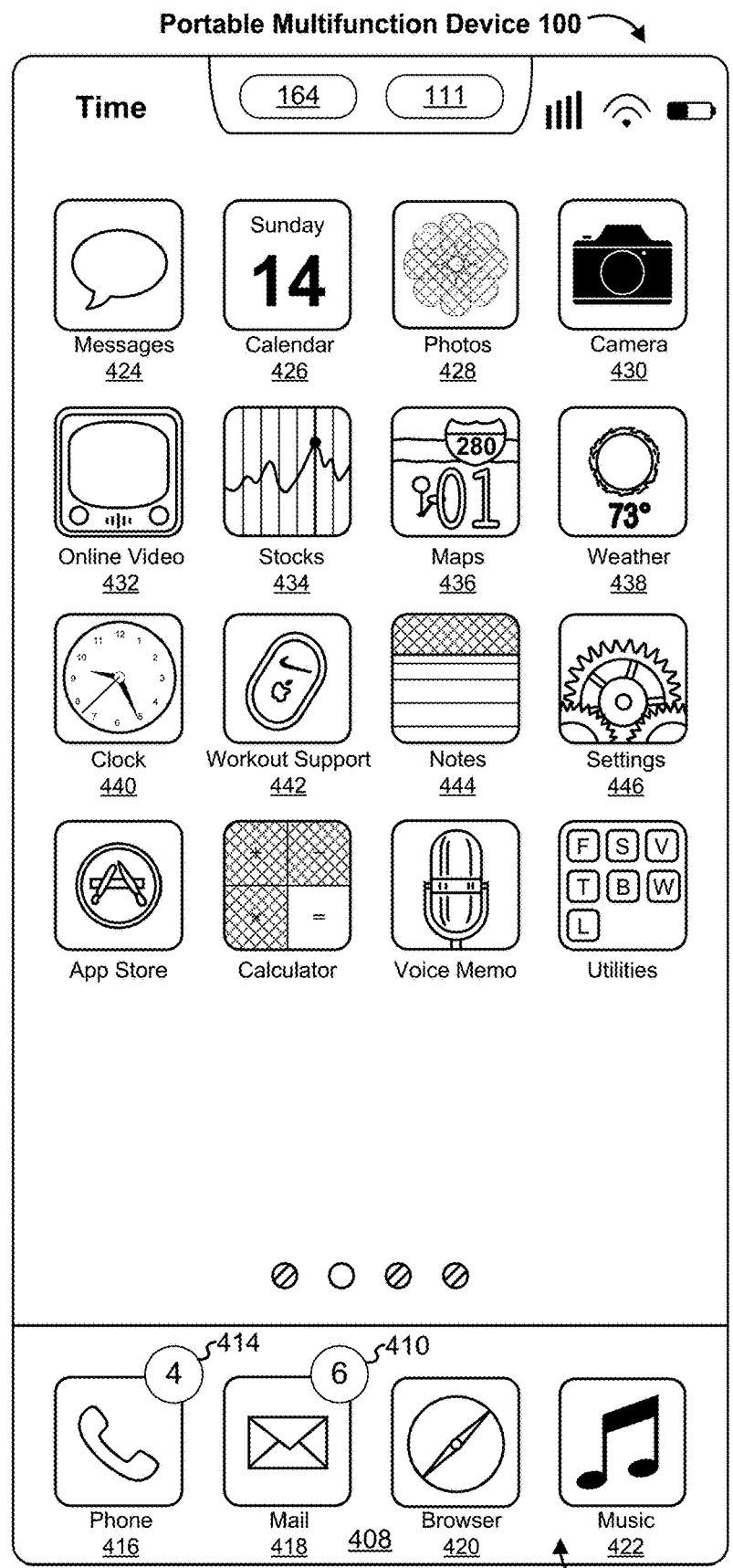
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, labeled "Music"; and
Icons for other applications, such as:
  Icon 424 for IM module 141, labeled "Messages";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";

Icon 436 for map module 154, labeled "Maps";
Icon 438 for weather widget 149-1, labeled "Weather";
Icon 440 for alarm clock widget 149-4, labeled "Clock";
Icon 442 for workout support module 142, labeled "Workout Support";
Icon 444 for notes module 153, labeled "Notes"; and
Icon 446 for a settings application or module, labeled "Settings," which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device). In some embodiments, a focus indicator (e.g., a cursor or selection indicator) is displayed via the display device to indicate a current portion of the user interface that will be affected by inputs received from the one or more input devices.

User Interfaces and Associated Processes

Attention is now directed towards embodiments of user interfaces ("UI") and associated processes that may be implemented on a computer system (e.g., an electronic device such as portable multifunction device 100 (FIG. 1A) or device 300 (FIG. 3A), or computer system 301 (FIGS. 3B-3C)) that includes (and/or is in communication with) a display generation component (e.g., a display, a projector, a head-mounted display, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, and optionally one or more tactile output generators.

FIGS. 5A-5LL and 6A-6T illustrate example user interfaces for interacting with and annotating augmented reality environments and media items in accordance with some embodiments. The user interfaces in these figures are used to illustrate the processes described below, including the processes in FIGS. 7A-7B, 8A-8C, 9A-9G, 10A-10E, 15A-15B, 16A-16E, 17A-17D, and 18A-18B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5A:
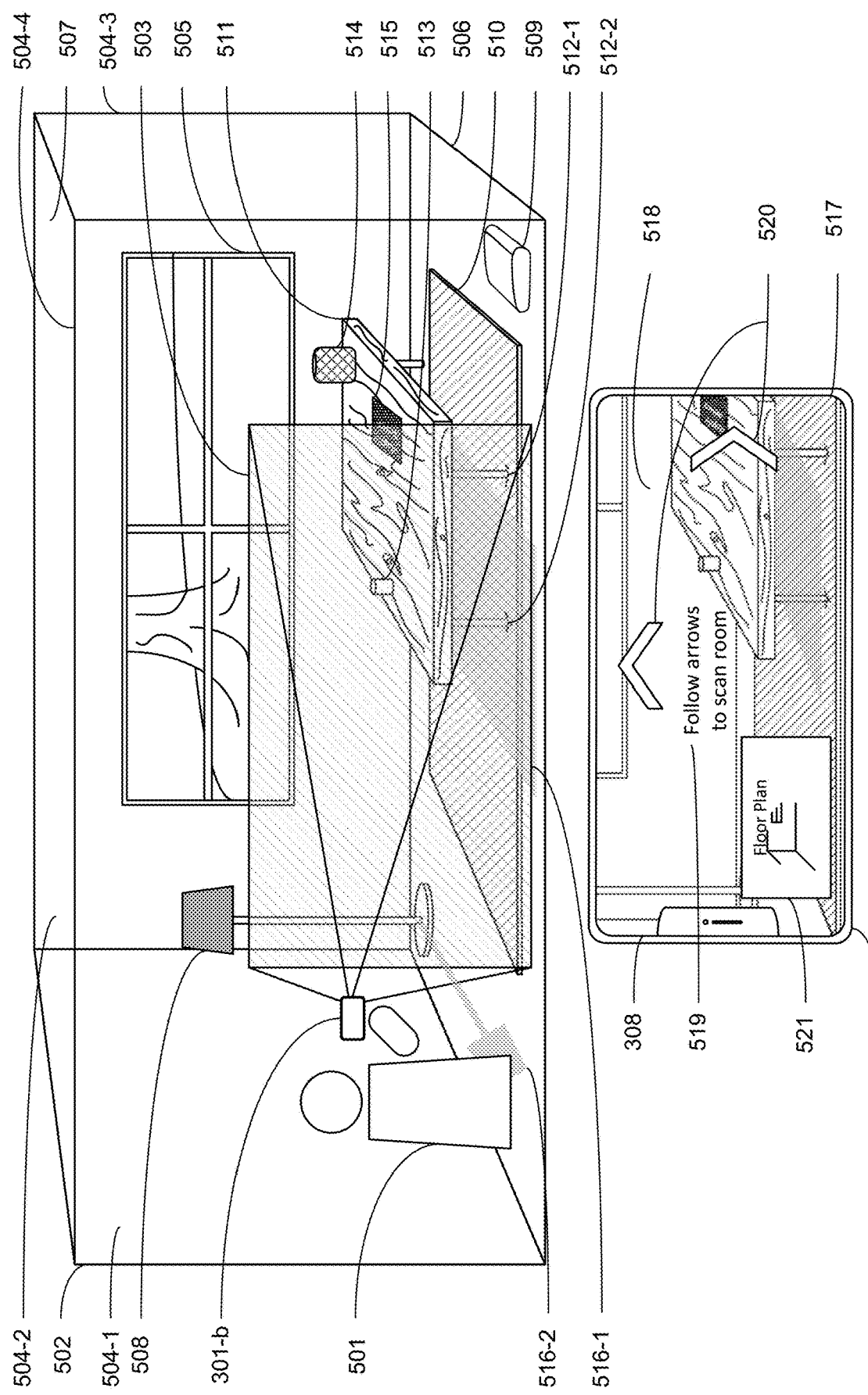
FIGS. 5A-5LL illustrate example user interfaces for interacting with augmented reality environments in accordance with some embodiments.
Figure 5B:
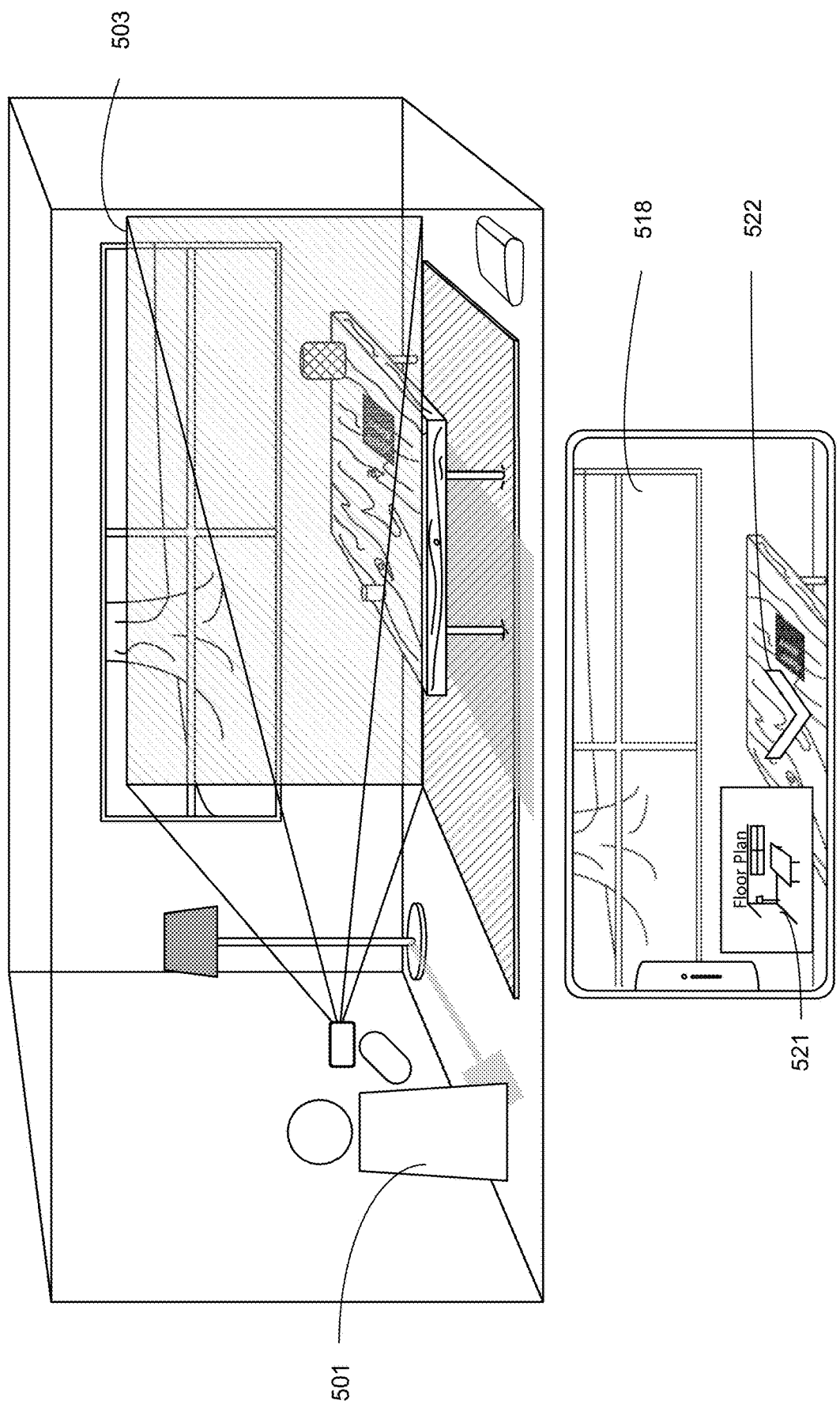
Figures 1, 5C:
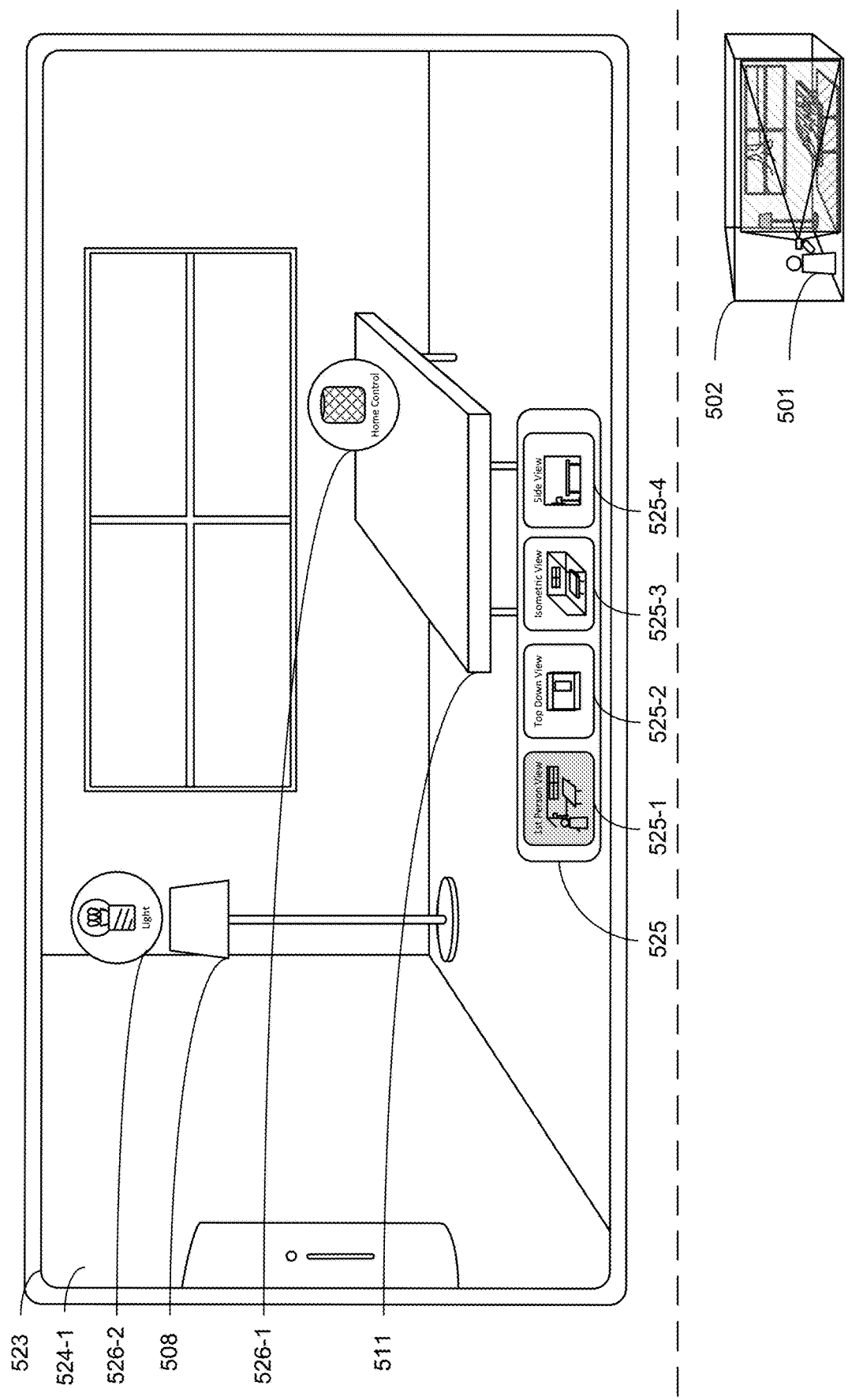
Figures 2, 5C:
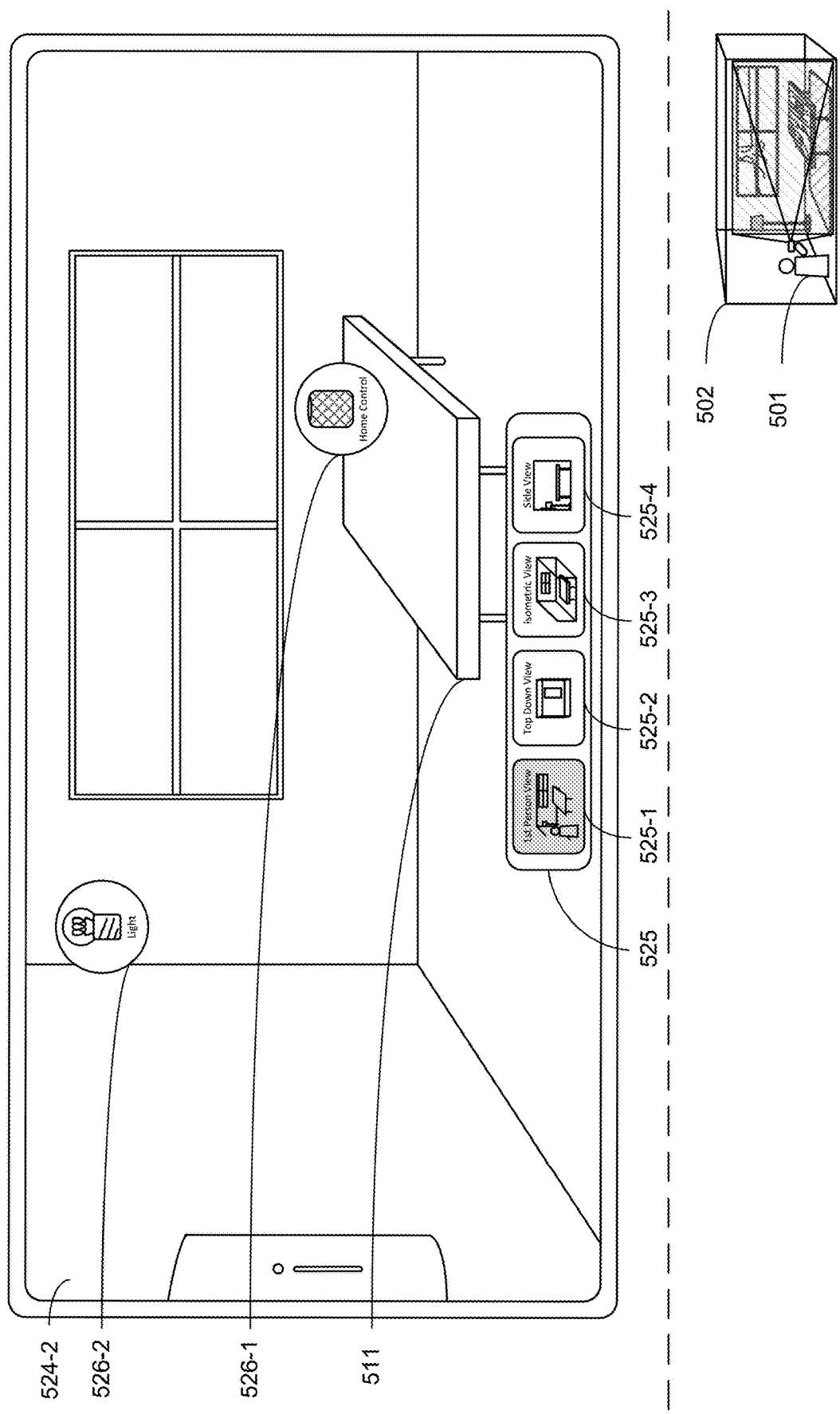
Figures 3, 5C:
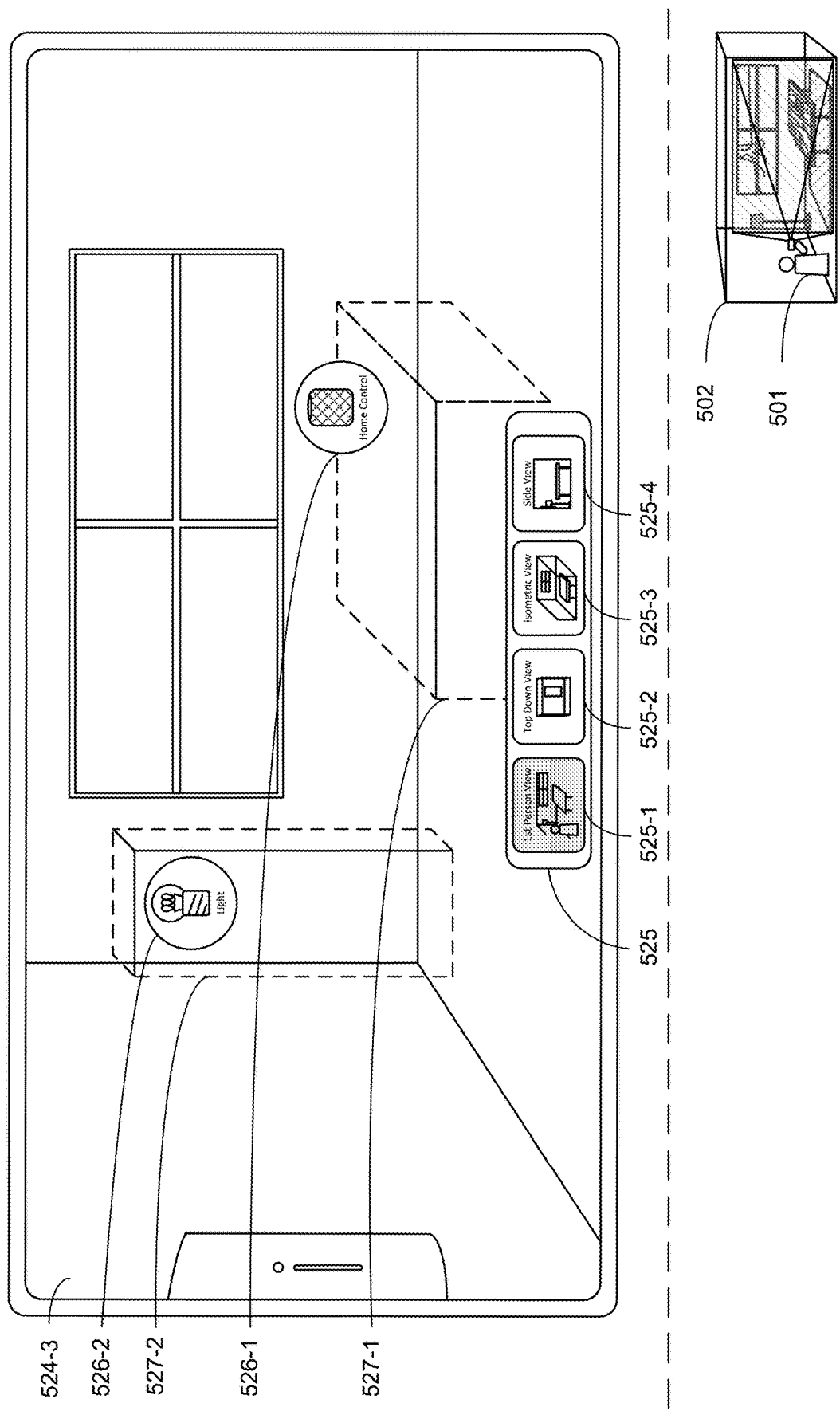
Figures 4, 5C:
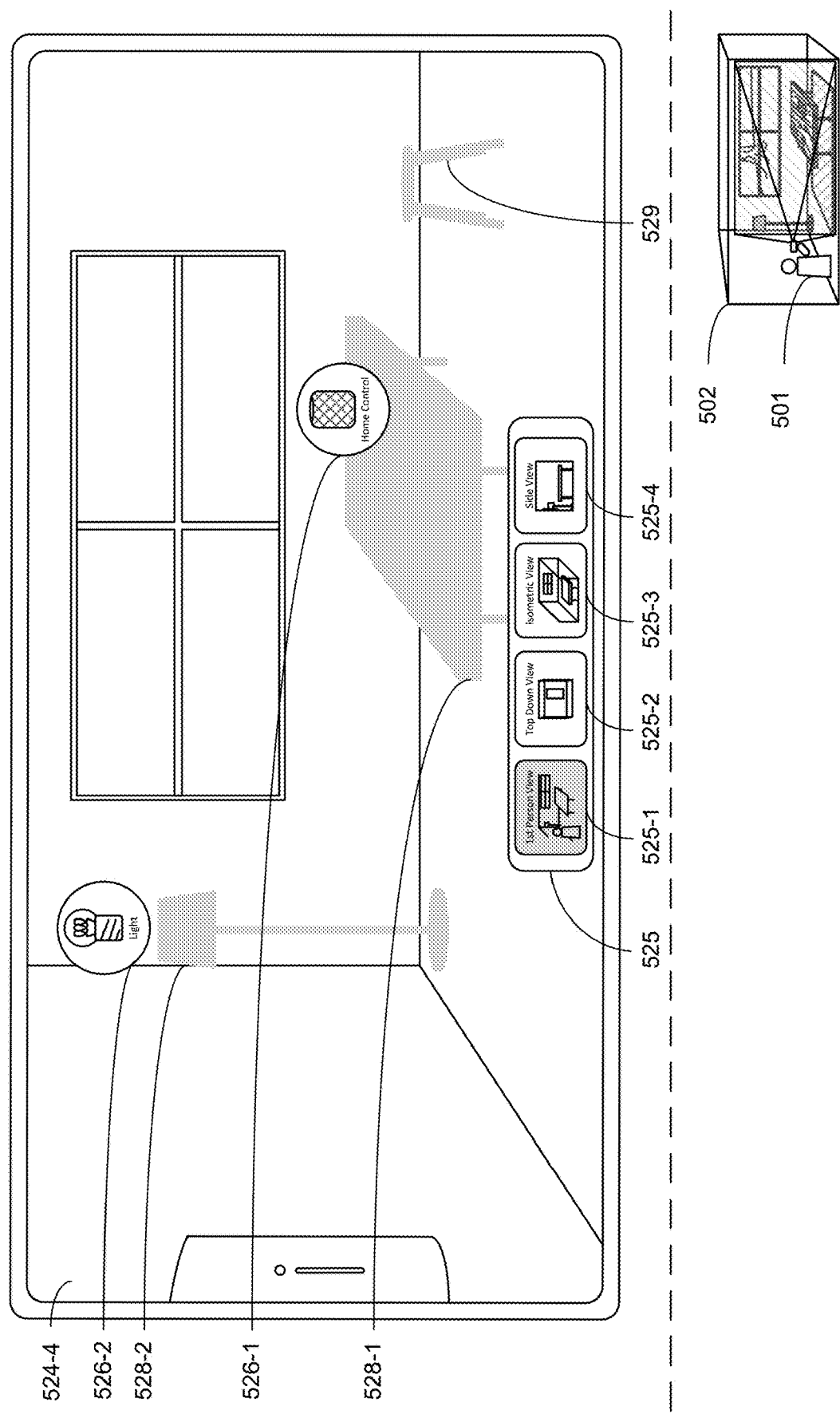
Figure 5D:
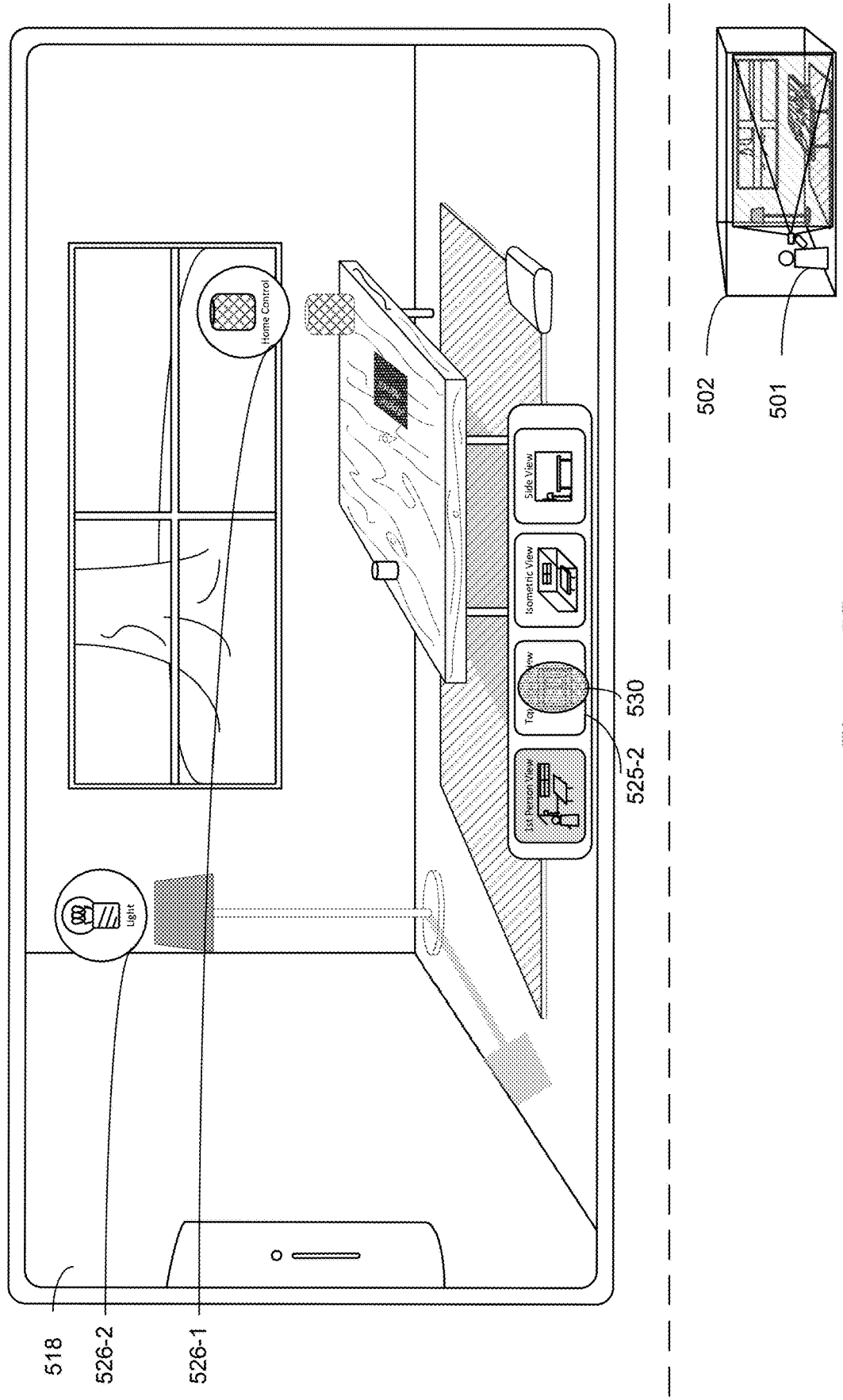
Figure 5E:
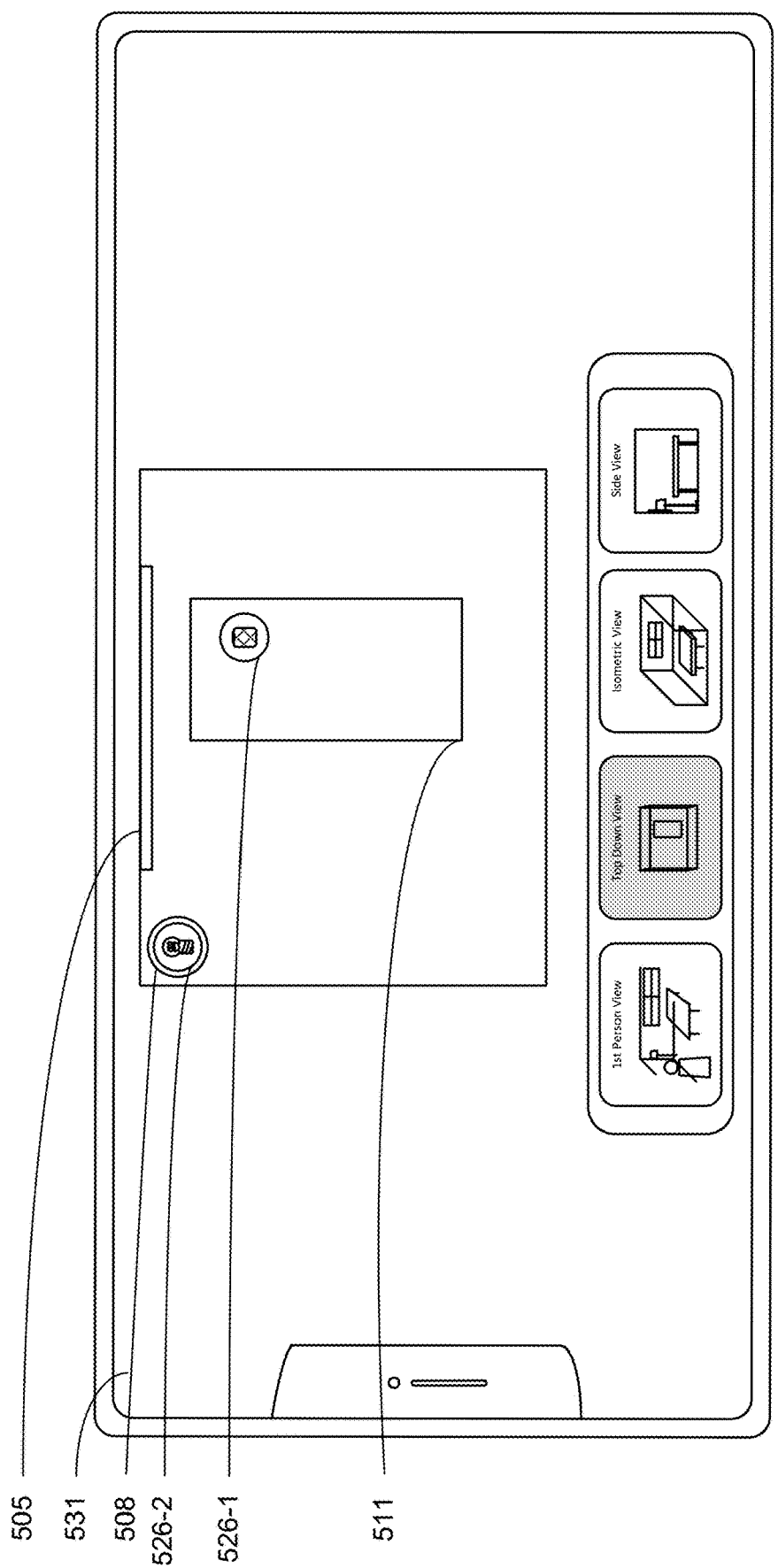
Figure 5F:
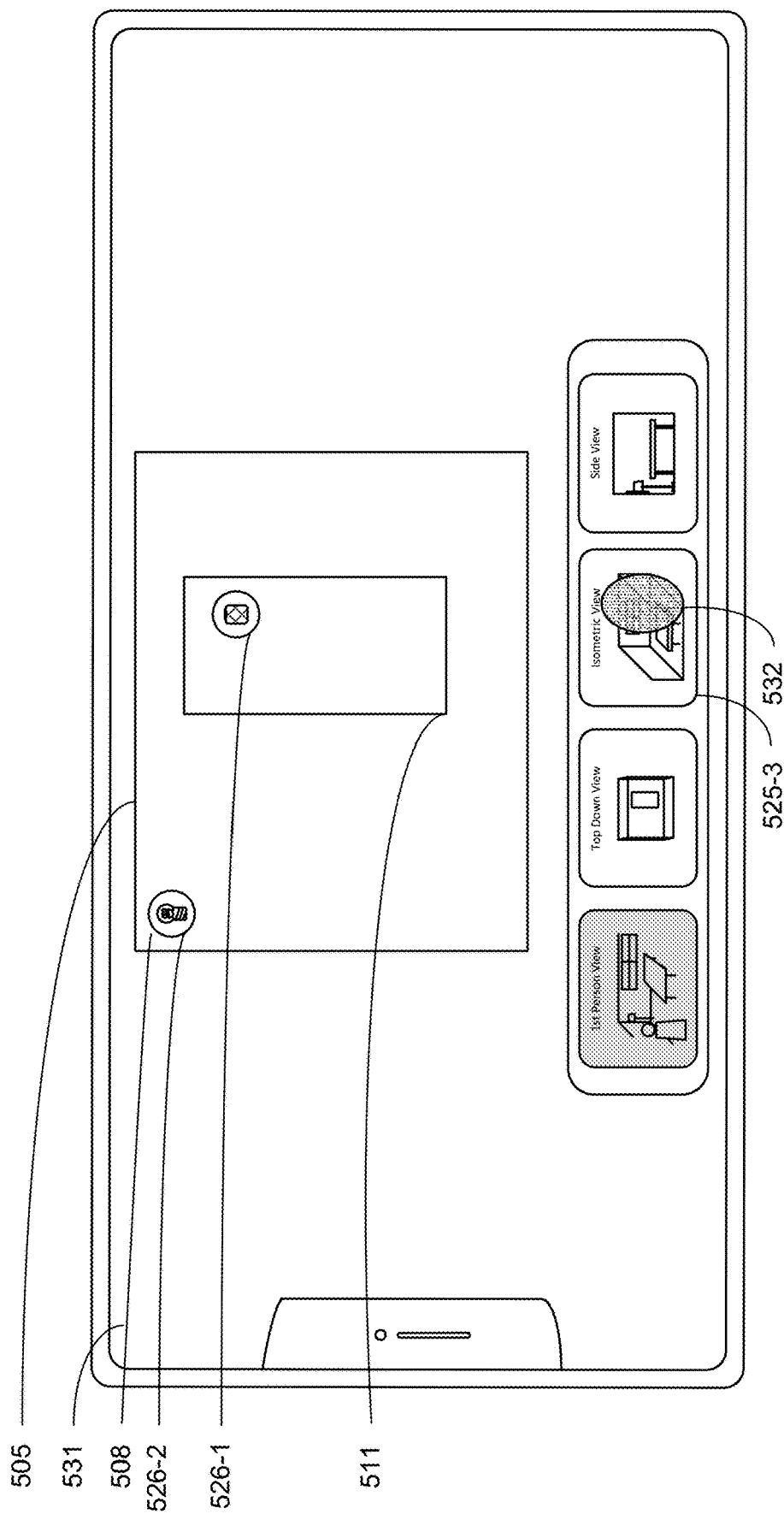
Figure 5G:
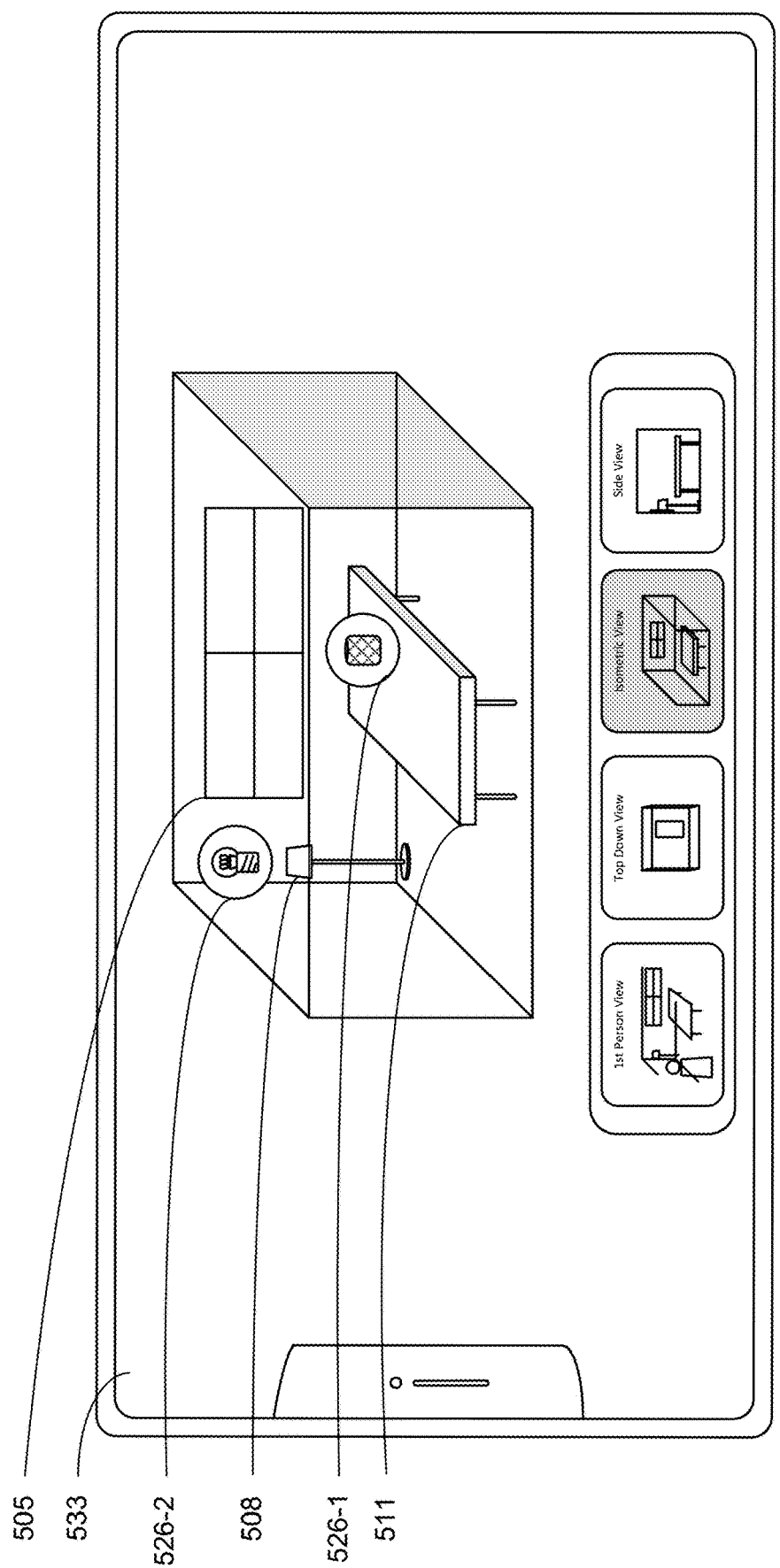
Figure 5H:
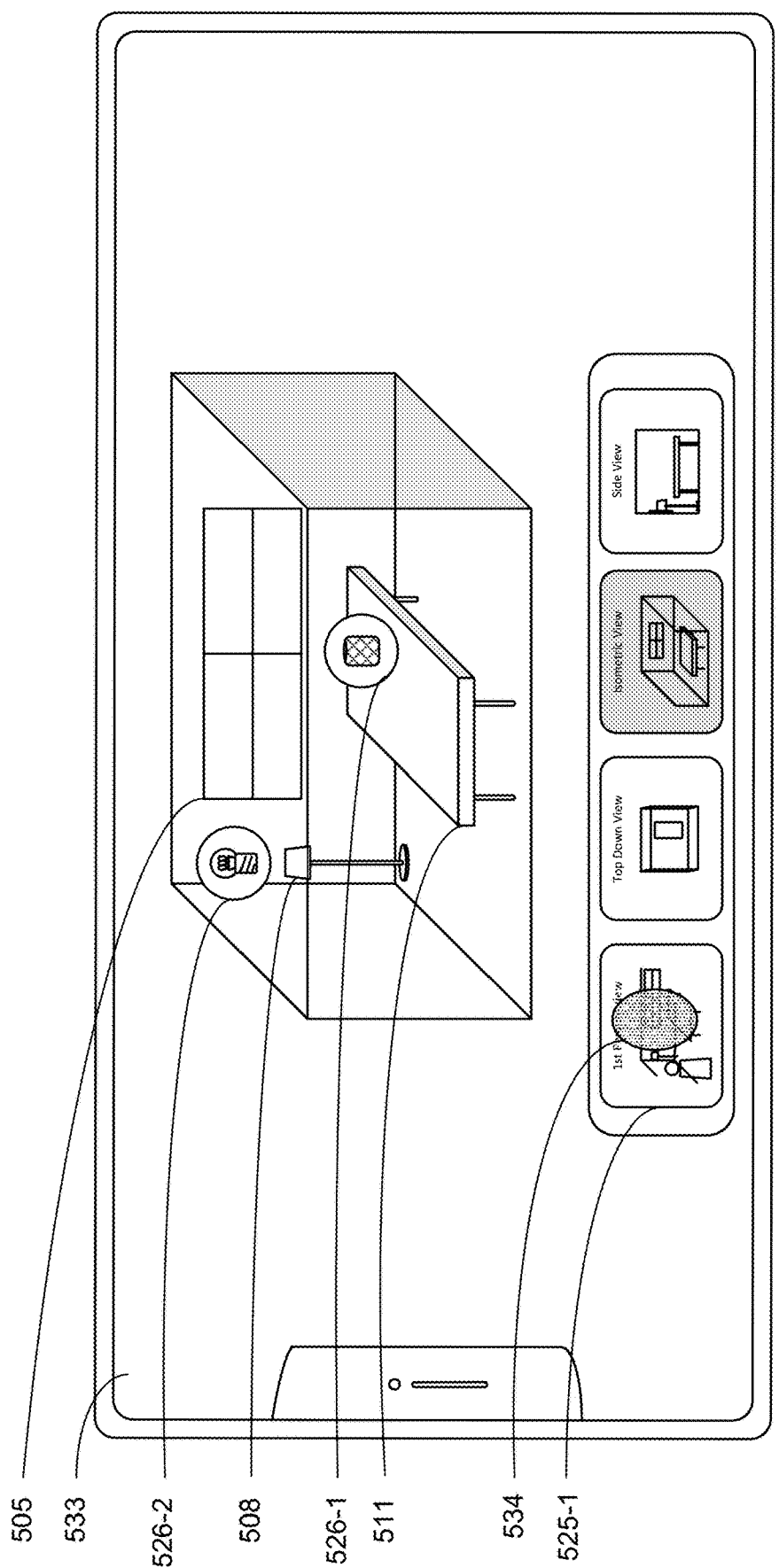
Figure 5I:
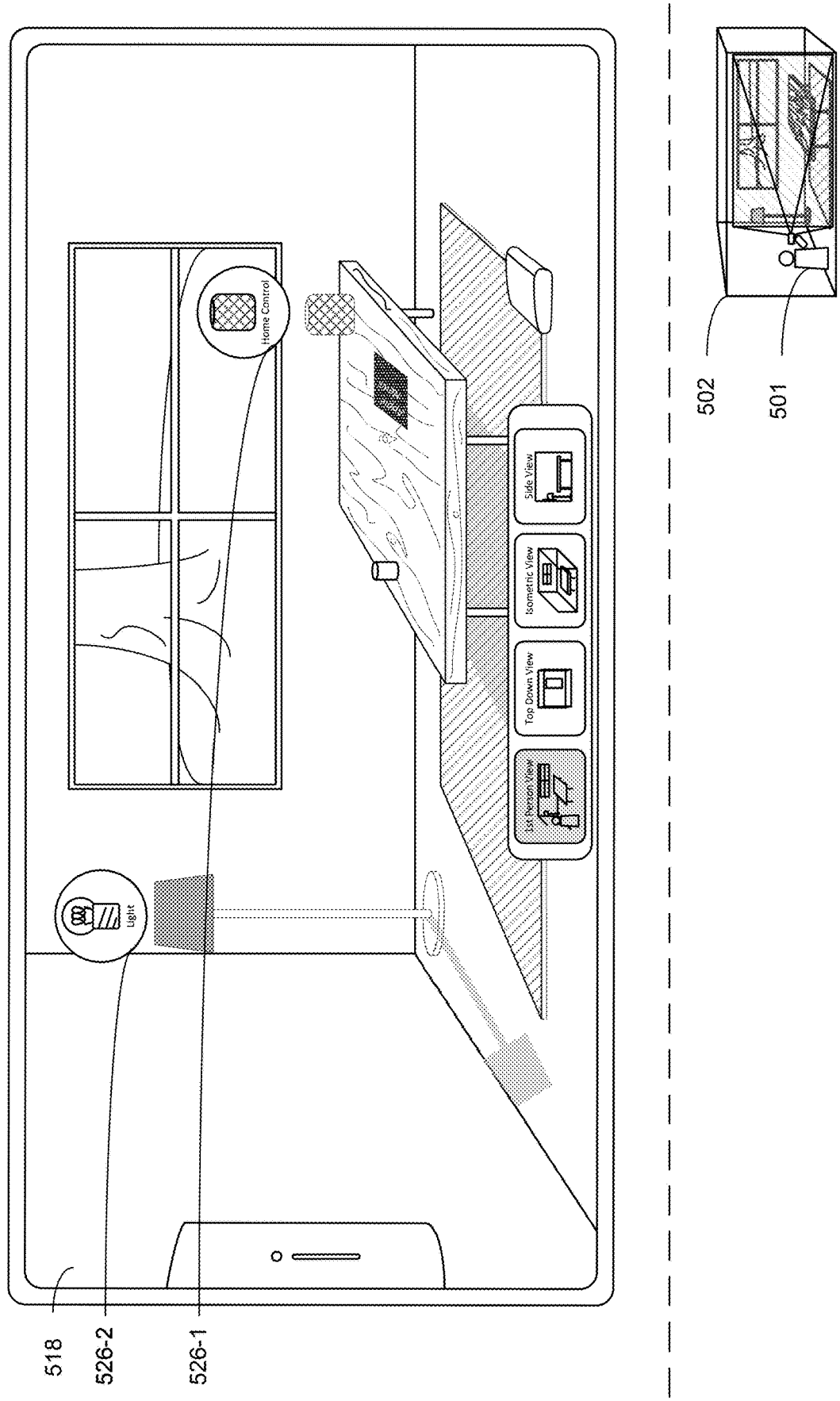

FIGS. 5A to 5LL illustrate a user scanning a room via cameras 305 (shown in FIG. 3B) on a computer system 301-b. These cameras (optionally in combination with a time-of-flight sensor such as time-of-flight sensor 220, FIG. 2B) acquire depth data of the room, that is used for creating a three dimensional representation of the scanned room. The scanned room may be simplified by removing some non-essential aspects of the scanned room or the user may add virtual objects to the scanned room. The three dimensional depth data is also used to enhance interactions with the scanned environment (e.g., resisting overlap of virtual objects with real world objects in the room). Also to enhance the realism of the virtual objects, the virtual objects can cause a deformation of real world objects (e.g., a virtual bowling 559 deforming a pillow 509/558 as shown in FIG. 5II-5KK, and described below).

FIG. 5A illustrates a user 501 performing a scan of a room 502 via cameras 305 of computer system 301-b. To illustrate that the computer system 301-b is scanning the room, a shaded region 503 is projected onto the room 502. The room 502 is includes a plurality of structural features (e.g., walls and windows) and non-structural features. The room 502 contains 4 bounding walls 504-1, 504-2, 504-3, and 504-4. Wall 504-2 includes a window 505, which shows a view of an area outside of the room 502. Additionally, the room 502 also includes a floor 506, and a ceiling 507. The room 502 also includes a plurality of items that rest on the floor 506 of the room 502. These items include a floor lamp 508, a pillow 509, a rug 510, and a wooden table 511. Also illustrated in the room 502 is the wooden table 511 causing indentations 512-1 and 512-2 on the rug 510. The room also includes a cup 513, a smart home control device 514, and a magazine 515 all resting on top of the wooden table 511. Furthermore, natural lighting let in through the window 505 results in shadows 516-1 and 516-2 that are cast on the floor 506 and the rug 510, respectively.

FIG. 5A also illustrates the display generation component 308 of computer system 301-b that the user 501 is currently seeing while scanning the room 502. The display 308 shows a user interface 517 that shows a live representation 518 (sometimes herein called a live view representation) of what the cameras 305 are currently capturing. The user interface 517 also includes instructions 519 and/or directional markers 520 for instructing the user as to what portions of the room need to still be scanned. In some embodiments, user interface 517 also includes a "Floor Plan" visualization 521 to indicate to the user which portions of the room 502 have been scanned. This "Floor Plan" visualization 521 shown is an isometric view, but orthographic views, or tilted top-down views may be shown instead. In some embodiments, more than one view may be shown.

FIG. 5B illustrates the user 501 still performing the scan of the room 502, but now placing the computer system 301-b in a different orientation (e.g., the user 501 is following the scanning instructions 519 and directional markers 520 and moving the device up and to the right). To signify this change in position, the shaded region 503 is now oriented according to how much the device has moved. Since the device has moved, the live representation 518 is also updated to show the new portion of the room 502 that is currently being scanned. Additionally, the "Floor Plan" visualization 521 is now updated to show the new portions of the room 502 that have been scanned. The "Floor Plan" visualization 521 also aggregates all the portions that have been scanned thus far. Finally, a new directional marker 522 is displayed, which illustrates to the user what portion of the room needs to be scanned next.

In response to the room 502 being scanned a simplified representation of the room is shown. A simplified representation is a representation of the room 502 or other physical environment that has some of the detail removed from features, and does not show non-essential non-structural features (e.g., a cup). Multiple levels of simplification may be possible, and FIGS. 5C-1, 5C-2, 5C-3, and 5C-4 represent examples of some of those simplifications.

FIG. 5C-1 illustrates computer system 301-b displaying a user interface 523 that includes a simplified representation of the room 524-1. The portion of the room 502 that is displayed in the simplified representation of the room 524-1 corresponds to the user's orientation of the device in the room 502. The orientation of the user 501 in the room 502 is shown in the small user orientation depiction. If the user 501 were to change their orientation of the computer system 301-b, then the simplified representation of the room 524-1 would also change. The user interface 523 includes three controls in a control region 525, where each control adjusts the view of the room 502. The controls are described below:

"1st Person View" control 525-1, which when selected orients the displayed representation of the room in a first-person view, so as to mimic what the user is seeing in their orientation in the room. The device's placement in the room controls what is shown.

"Top-Down View" control 525-2, which when selected orients the displayed representation of the room in a top down view. In other words, the user interface will display a bird's eye view (e.g., a top down orthographic view).

"Isometric view" control 525-3, which when selected orients the displayed representation of the room in an isometric view.

"Side View" control 525-4, which when selected displays a flattened orthographic side view of the environment. Although this mode switches to an orthographic side view it may also be another control for changing the view to another orthographic view instead (e.g., another side view, or a bottom view).

Although FIGS. 5C-1, 5C-2, 5C-3, and 5C-4 depict a first-person view, it should be understood that the simplification can occur any other view displayed by the device (e.g., an orthographic view, and/or an isometric view).

In FIG. 5C-1 within the simplified representation of the room 524-1 a plurality of items are not shown in comparison to what was scanned in the room 502 in FIGS. 5A-5B. In this simplified representation of the room 524, the pillow 509, the rug 510, the cup 513, magazine 514 are all removed. However, some larger non-structural features remain, such as the floor lamp 508, and the wooden table 511. These remaining larger non-structural features are now shown without their texture. Specifically, the lampshade color of the floor lamp 508 is removed, the wooden table 511 no longer shows its wood grain, and the window 505 no longer shows the view of the area outside of the room. In addition, detected building/home automation objects and/or smart objects are displayed as icons in the simplified representation of the room 524-1. In some instances the icons replace the detected object altogether (e.g., the "Home Control" icon 526-1 replacing the home control device 514). However, it is also possible to concurrently display the icon for a detected building/home automation object and/or smart object and the corresponding object (e.g., the floor lamp 508 and the corresponding smart light icon 526-2 are concurrently displayed in FIG. 5C-1). In some embodiments, while one object and its corresponding automation or smart object are concurrently displayed, for another object (e.g., also in view of computer system 301-*b*'s camera(s) 305), only the corresponding automation or smart object is displayed. In some embodiments, predefined criteria are used to determine whether to replace an object with its corresponding automation or smart object, or to display both concurrently. In some embodiments, the predefined criteria depend in part on a selected or determined level of simplification.

FIG. 5C-2 displays another simplified representation of the room 524-2 with a plurality of items removed. The difference between simplified representation of the room 524-2, and the simplified representation of the room 524-1, is that the floor lamp 508 is no longer displayed. However, the icon corresponding to the detected building/home automation object and/or smart object (e.g., the smart-light icon 526-2) is still displayed.

FIG. 5C-3 displays another simplified representation of the room 524-3 with all of the items removed. Bounding boxes are placed in the simplified representation of the room 524-3 instead to illustrate large non-structural features. Here, a bounding box for the wooden table 527-1 and a bounding box for the floor lamp 527-2 are shown. These bounding boxes illustrate the size of these non-structural features. The icons corresponding to the detected building/ home automation objects and/or smart object (e.g., the "Home Control" icon 526-1 and the smart-light icon 526-2) are still displayed.

FIG. 5C-4 displays another simplified representation of the room 524-4 with the larger non-structural features being replaced with computer aided design ("CAD") representations. Here, a CAD representation for the wooden table 528-1 and a CAD representation for the floor lamp 528-2 are shown. These CAD representations illustrate a computerized rending of some of the non-structural features. In some embodiments, CAD representations are only shown when the computer system 301-*b* identifies the non-structural objects as an item that corresponds with a CAD representation. The icons corresponding to the detected building/ home automation objects and/or smart object (e.g., the "Home Control" icon 526-1 and the smart-light icon 526-2) are still displayed. FIG. 5C-4 also illustrates a CAD chair 529, which is an example of placeholder furniture. In some embodiments, placeholder furniture is placed in one or more rooms (e.g., one or more otherwise empty rooms), in order to virtually "stage" the one or more rooms.

FIG. 5D shows the live representation 518 that displays what is shown in the room 502 based on the position of the user. If the user is to move the computer system 301-*b*, what is shown will change according to such movement (e.g., as shown in FIGS. 5KK-5LL). The live representation 518 is not a simplified view and shows all the texture captured by the cameras 305. FIG. 5D, also illustrates a user input 530 over the "Top-Down View" control 525-2. In this example, icons corresponding to the detected building/home automation objects and/or smart object (e.g., the "Home Control" icon 526-1 and the smart-light icon 526-2) are displayed, in an augmented reality representation of the live view. FIG. 5E illustrates the response to the user input 530 over the "Top-Down View" control 525-2. FIG. 5E illustrates the top-down view of the simplified representation of the room 531. Unlike the FIGS. 5C-1 to 5C-4 (and the live representation 518 shown in FIG. 5D), the simplified representation of the room 531 is displayed agnostically with respect to the user's 501 orientation in the room 502. In this orthographic top down view of the simplified representation of the room 531, representations of the window 505, the floor lamp 508, and the wooden table 511 are all still displayed, but in a "Top-Down View." In addition, icons (e.g., the same icons as shown in the augmented reality representation of the live view) corresponding to the detected building/home automation objects and/or smart object (e.g., the "Home Control" icon 526-1 and the smart-light icon 526-2) are displayed. Although the top-down view is shown without texture (e.g., representations of objects in the room are displayed without texture), it should be appreciated that in other embodiments this top-down view includes representations of objects with texture.

FIG. 5F shows the same top-down view of the simplified representation of the room 531 as the one shown in FIG. 5E. FIG. 5F, however, illustrates a user input 532 over the "Isometric View" control 525-3. FIG. 5G illustrates an isometric view of the simplified representation of the room 533. Unlike the FIGS. 5C-1 to 5C-4 (and the live representation 518), the isometric view of the simplified representation of the room 533 is displayed agnostically with respect to (e.g., independent of) the user's 501 orientation in the room 502. In this orthographic isometric view of the simplified representation of the room 533, the representations of the window 505, the floor lamp 508, and the wooden table 511 are all still displayed but in an isometric view. In addition, icons (e.g., the same icons as shown in the augmented reality representation of the live view) corresponding to the detected building/home automation objects and/or smart object (e.g., the "Home Control" icon 526-1 and the smart-light icon 526-2) are displayed. Although the isometric view is shown without texture, it should be appreciated that in other embodiments the isometric view includes representations of objects with texture.

FIG. 5H shows the same isometric view of the simplified representation of the room 533 as the one shown in FIG. 5G. FIG. 5H, however, illustrates a user input 534 over the "1st Person View" control 525-1. In response, FIG. 5I shows the live representation 518 that displays what is shown in the room 502 based on the position of the user 501.

Figure 5J:
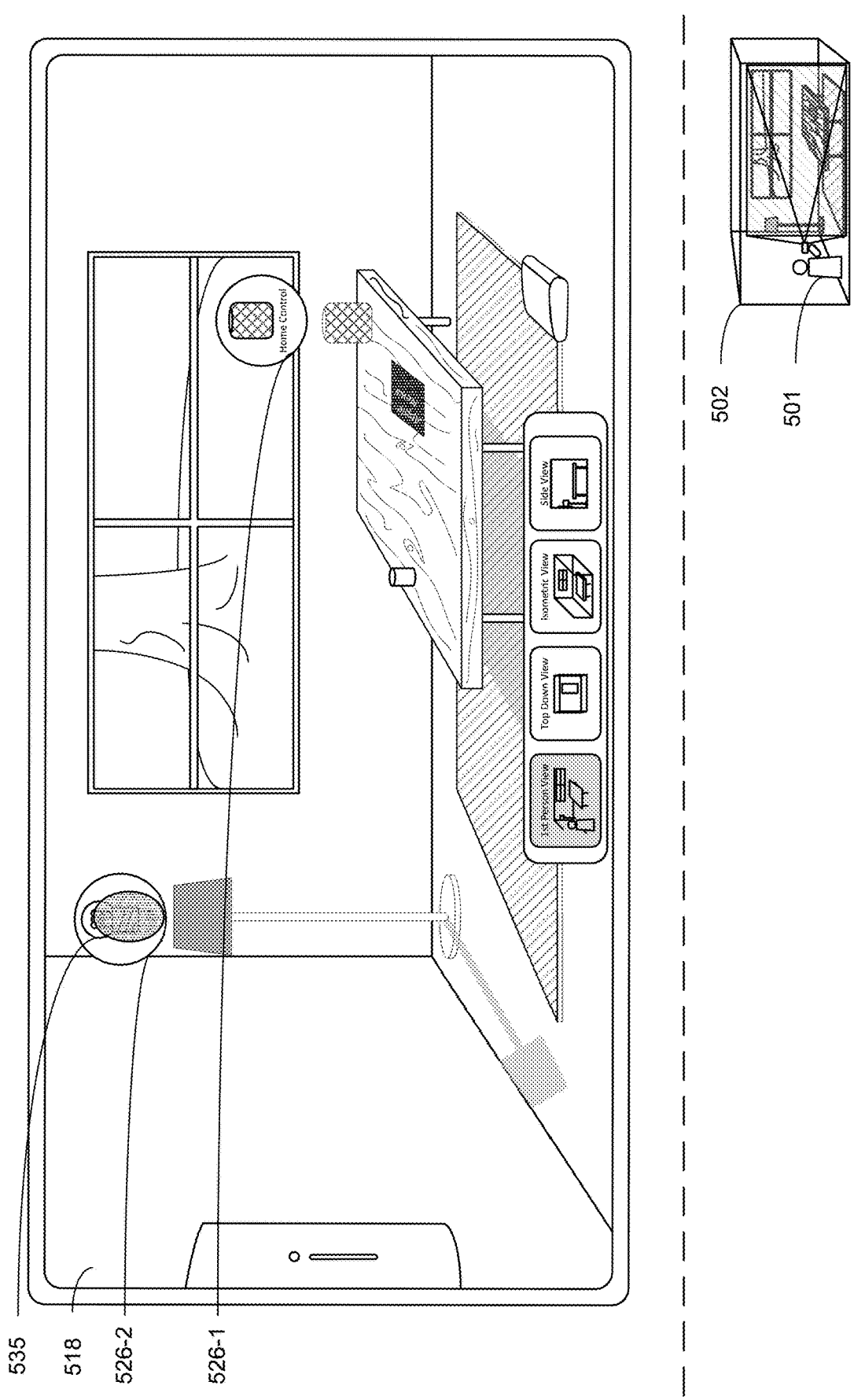
Figure 5K:
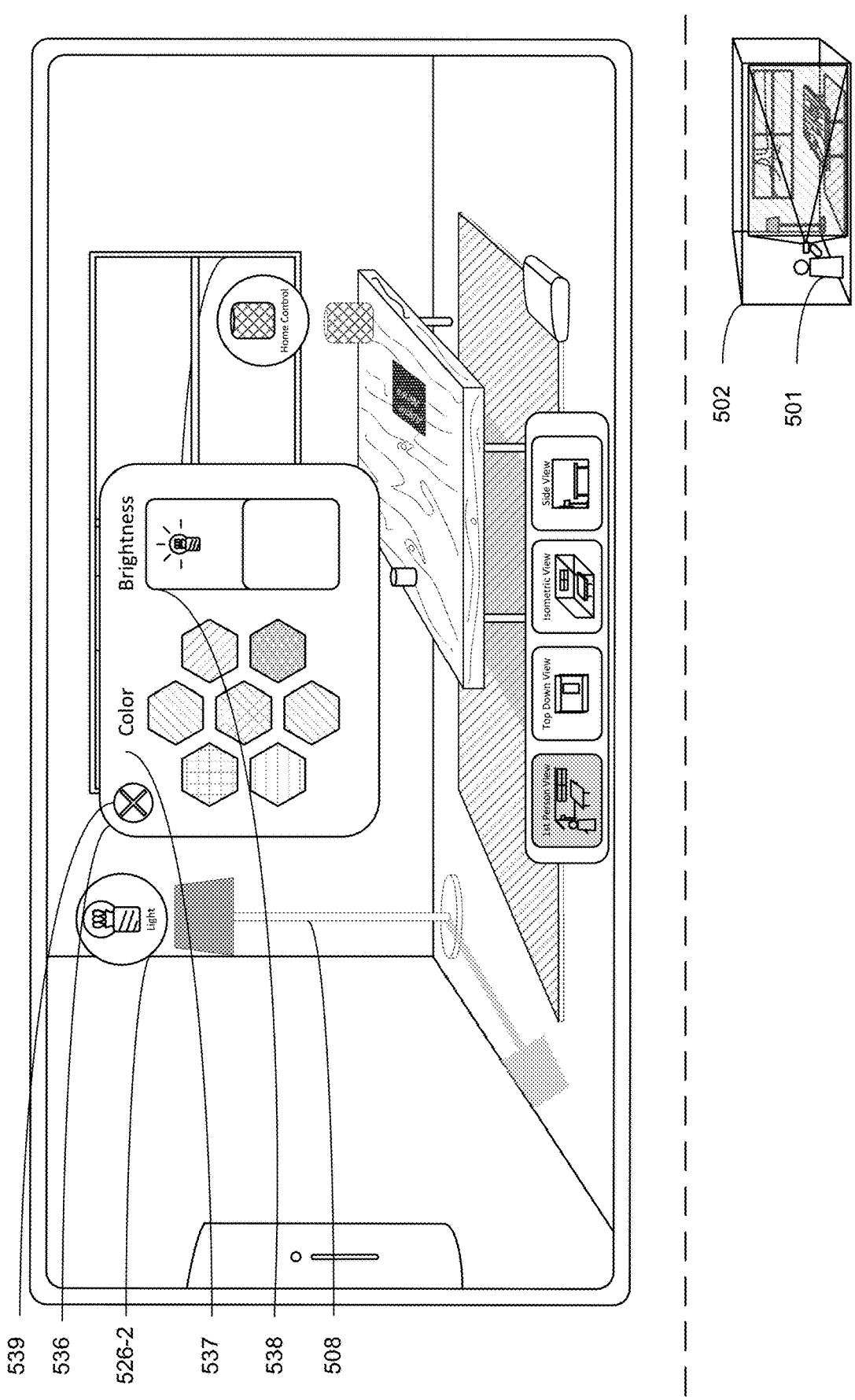

FIG. 5J shows a user input 535 over the smart-light icon 526-2 in the live representation 518. FIG. 5K shows the resulting user interface in response to the user input 535 (e.g., a long press) over the smart-light icon 526-2. In some embodiments, a tap on the smart-light icon 526-2 turns the smart-light on or off, whereas a different input gesture, such as a long press, results in display of a light control user interface 536, which includes color controls 537 for adjusting the color of the light output by the floor lamp 508, or brightness controls 538 for controlling the brightness of the light output by the floor lamp 508, or both (as shown in FIG. 5K). The color controls 537 include a plurality of available colors the user can select for the light in the floor lamp 508 to emit. Additionally, light control user interface optionally includes an exit user interface element 539, shown in this example in the top left corner of the light control user interface 536.

Figure 5L:
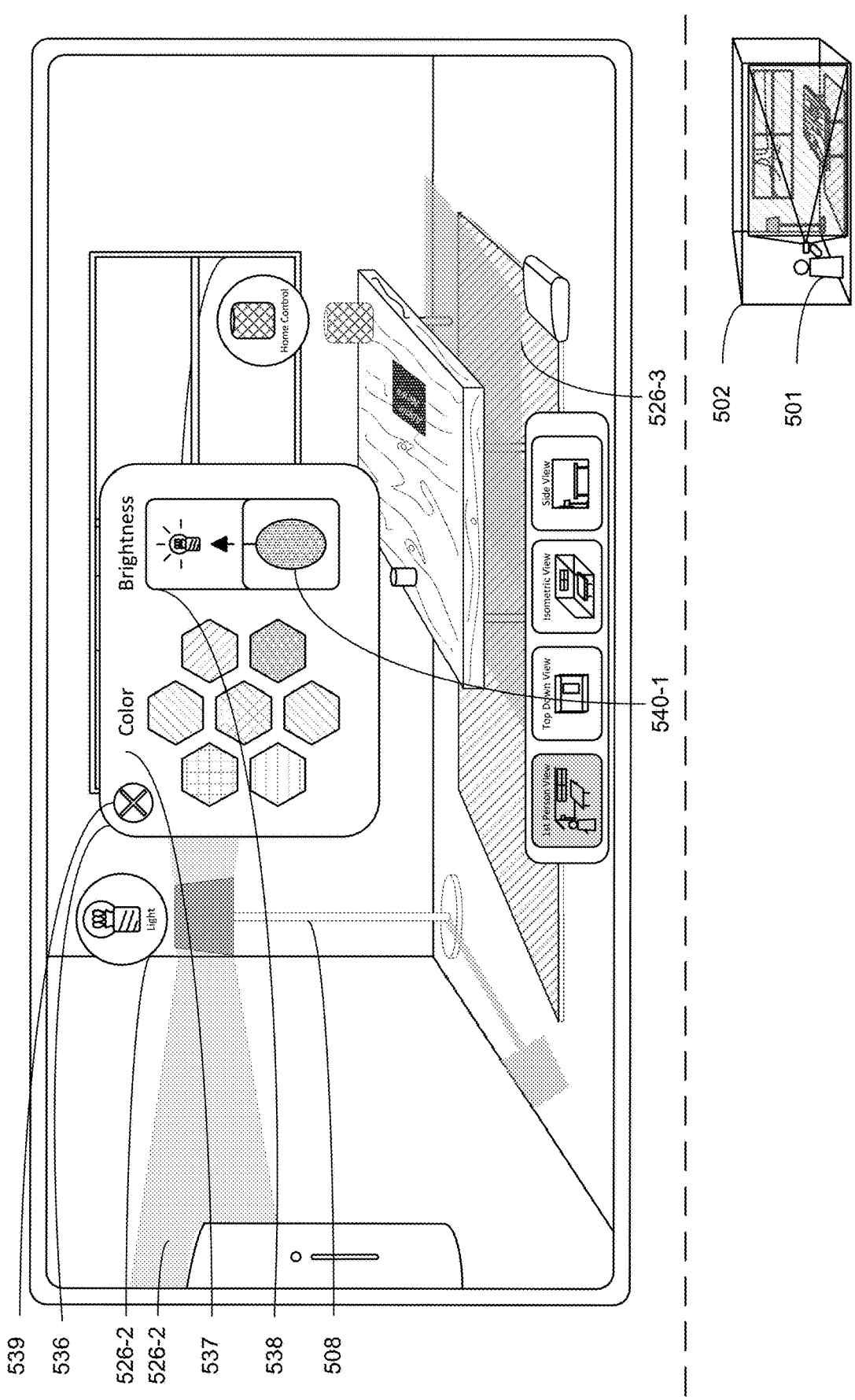

FIG. 5L shows a dragging user input 540-1 (e.g., a dragging gesture) beginning over the brightness controls 538 in the light control user interface 536. In response to the dragging input the brightness of light is increased. In FIG. 5L, this is represented by the shadow 516-3 and 516-4 caused by the lampshade interfering with the emitting light from the floor lamp 508, and the wooden table 511 interfering with the emitting light from the floor lamp 508, respectively.

Figure 5M:
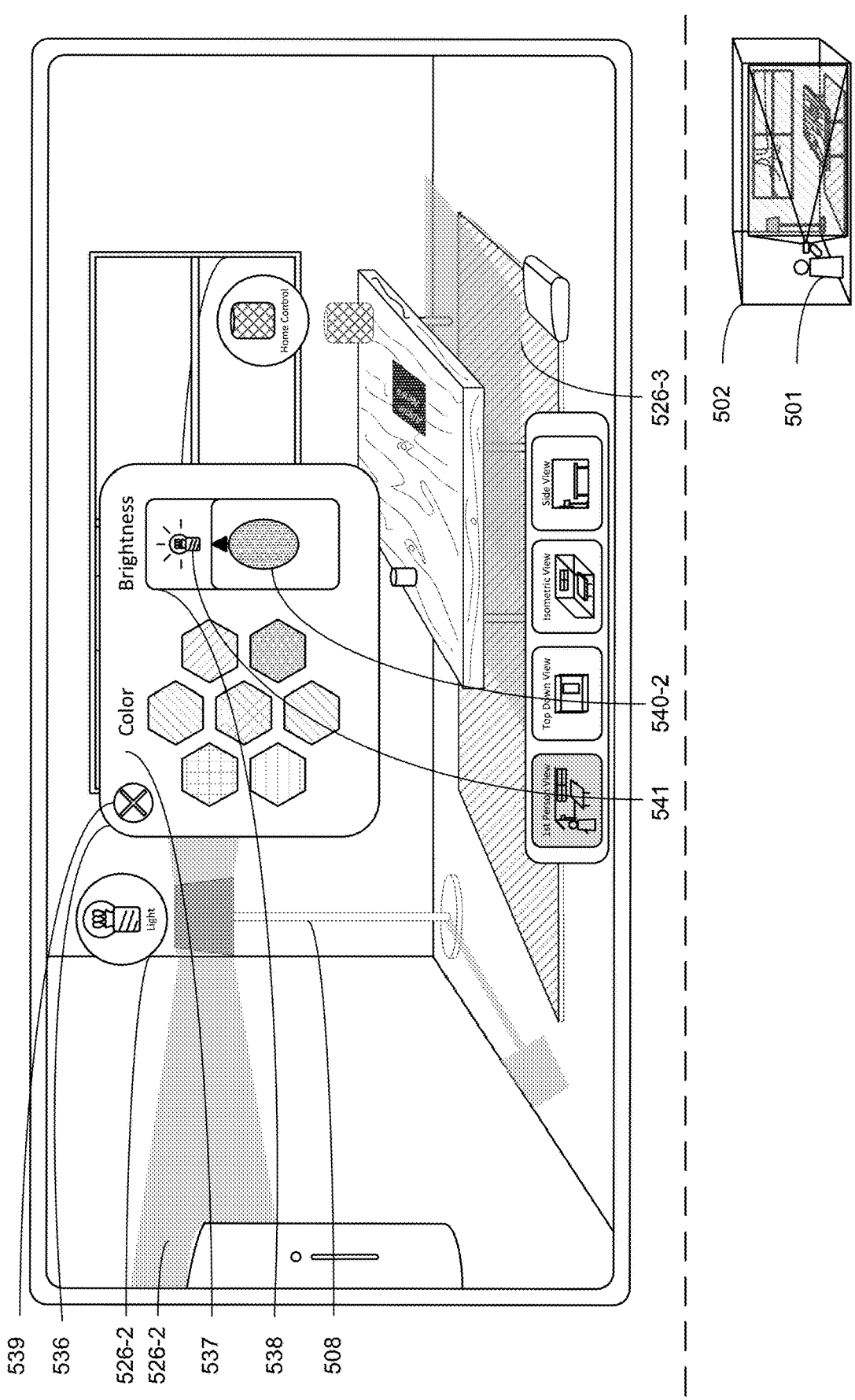
Figure 5N:
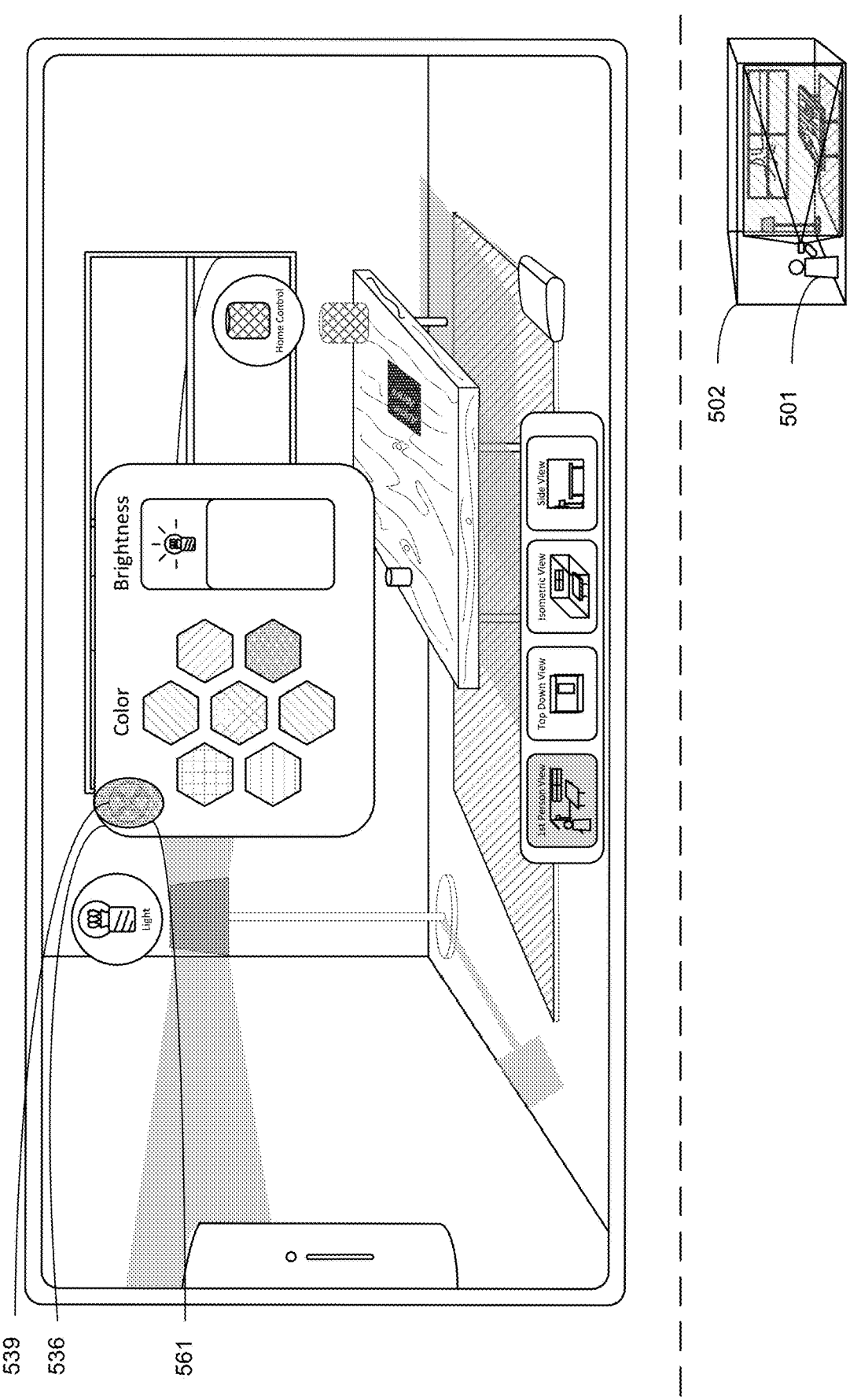
Figure 50:
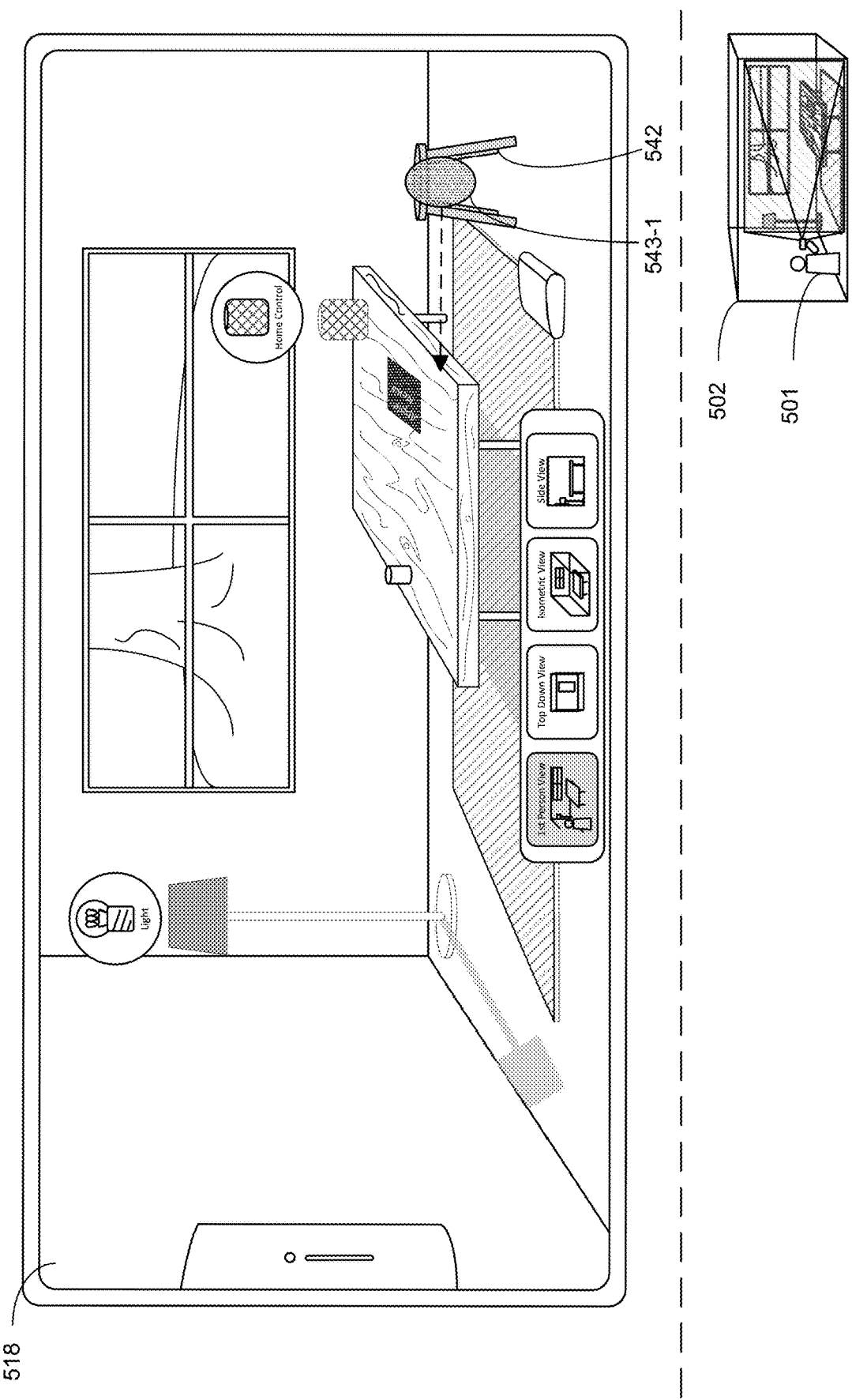

FIG. 5M shows the dragging user input 540-1 continuing to a second location 540-2 on the brightness control. In response to the dragging user input being at the second location 540-2, the brightness of the light in the floor lamp 508 increases. Additionally, the lightbulb symbol 541 also updates to show that it is emitting a brighter light. FIG. 5N illustrates an input 561 on the exit user interface element 539, which dismisses the light control user interface 536, as shown in FIG. 5O.

FIGS. 5O-5R show an interaction of a virtual object interacting with representations of real world objects. As discussed above, the cameras 305 on computer system 301-b, optionally in combination with a time-of-flight sensor, are capable of recording depth information, and because of this, the computer system 301-b can cause virtual objects to resist moving into real world objects. The following discussion of FIGS. 5O-5R show a virtual object resisting (e.g., the input moves at a different rate than the rate at which the virtual object moves into a real world object) entering into the space of a real world object. Throughout the discussion of FIGS. 5O-5Z below, the virtual stool 542 is to be understood to be an example of a virtual object, and the real world wooden table 511/544 is an example of a real world object.

FIG. 5O also shows an example of a virtual object, in this case a virtual stool 542, added to the live representation 518 of room 502. FIG. 5O also illustrates beginning a dragging gesture 543-1 for moving the virtual object (e.g., virtual stool 542) within the live representation 518. The virtual stool 542 is shown without texture for explanation purposes, but it should be appreciated that in some embodiments one or more instances of virtual furniture is displayed, in a live representation or other representation, with texture.

Figure 5P:
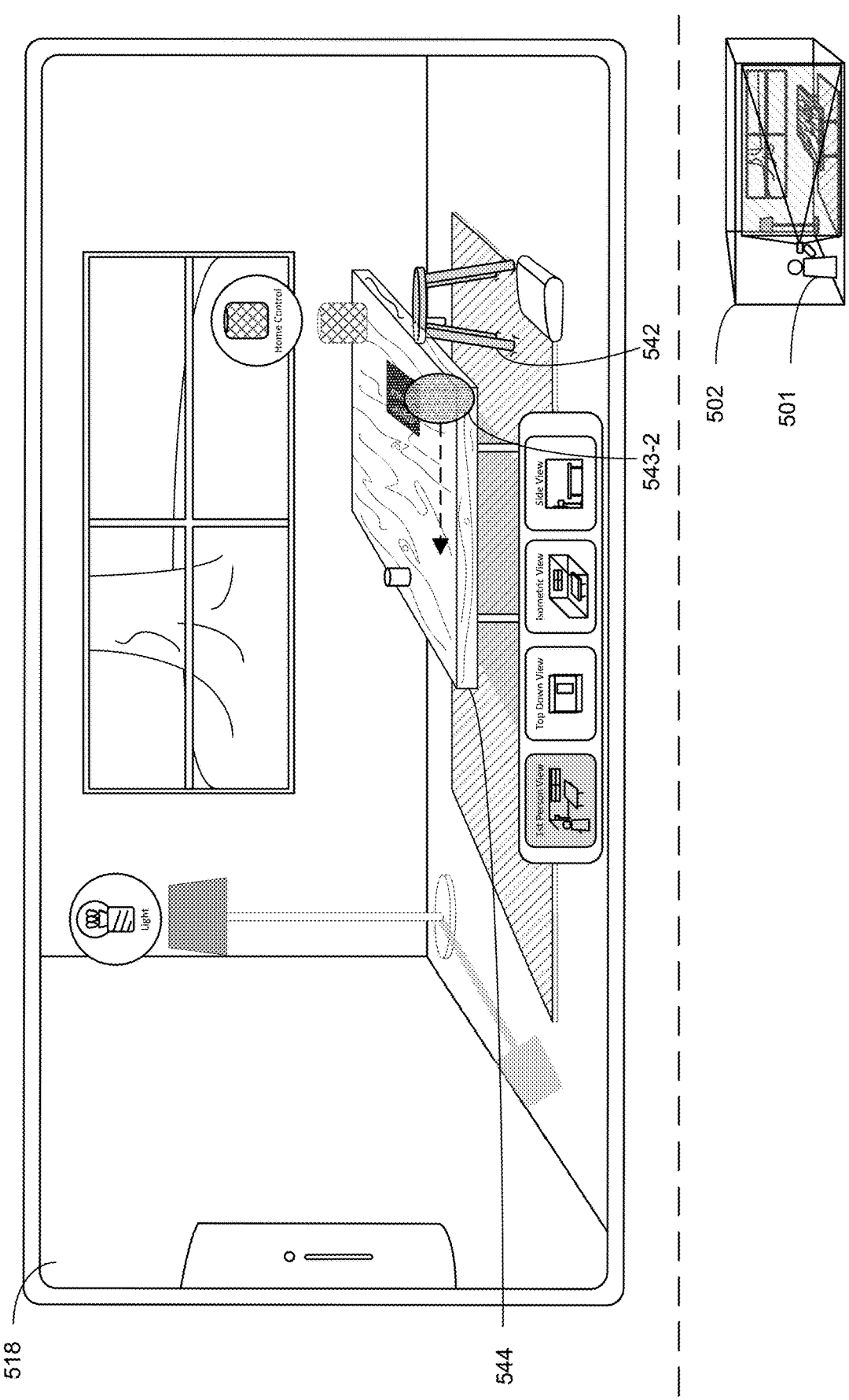

FIG. 5P shows the input continuing 543-2 into a representation of the wooden table 544, which corresponds to the real world wooden table 511. FIG. 5P shows the virtual stool 542 beginning to enter into the representation of the wooden table 544. When the virtual stool 542 begins to enter representation of the wooden table 544, the input 543-2 no longer moves at the same rate as the virtual stool 542 does (e.g., the virtual stool moves at a slower rate than the input). The virtual stool 542 now overlaps with the representation of the wooden table 544. When the virtual object (e.g., virtual stool 542) overlaps with representation of a real world object (e.g., table 544), a portion of the virtual object (e.g., virtual stool 542) disappears, or, alternatively, is shown in a translucent deemphasized state, or in a further alternative, an outline of the portion of the virtual object that overlaps with the representation of the real world object is displayed.

Figure 5Q:
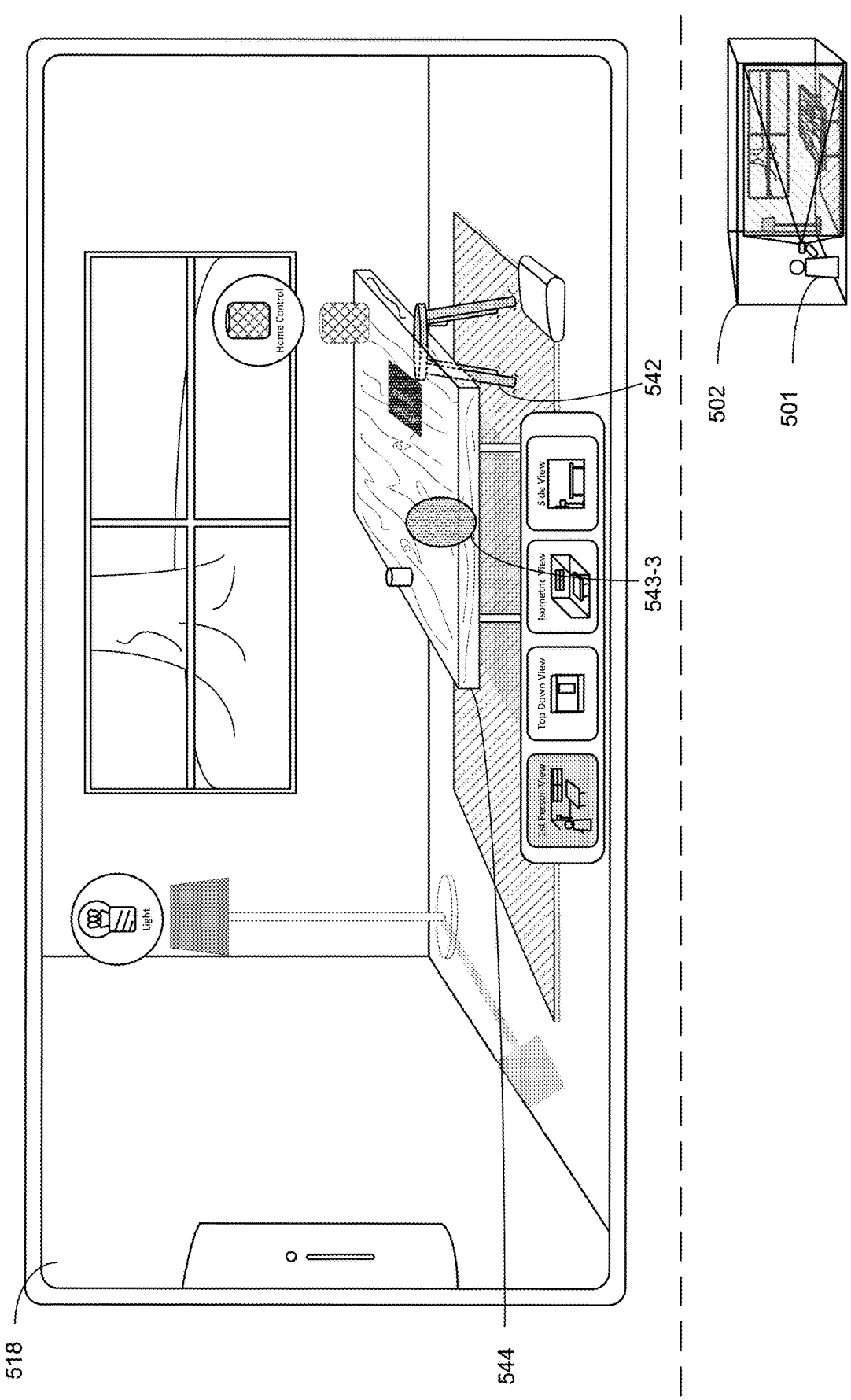

FIG. 5Q shows the input continuing 543-3, but the virtual stool 542 again not moving at the same rate as the input 543-3 moves. The virtual stool 542 will not pass a certain threshold into the representation of the wooden table 544. In other words, at first the virtual object (e.g., virtual stool 542) will resist movement into the representation of the real world object (e.g., wooden table 544) (e.g., allowing some overlap), but then after a certain amount of overlap is met, the input's movement no longer causes the virtual object (e.g., virtual stool 542) to move.

Figure 5R:
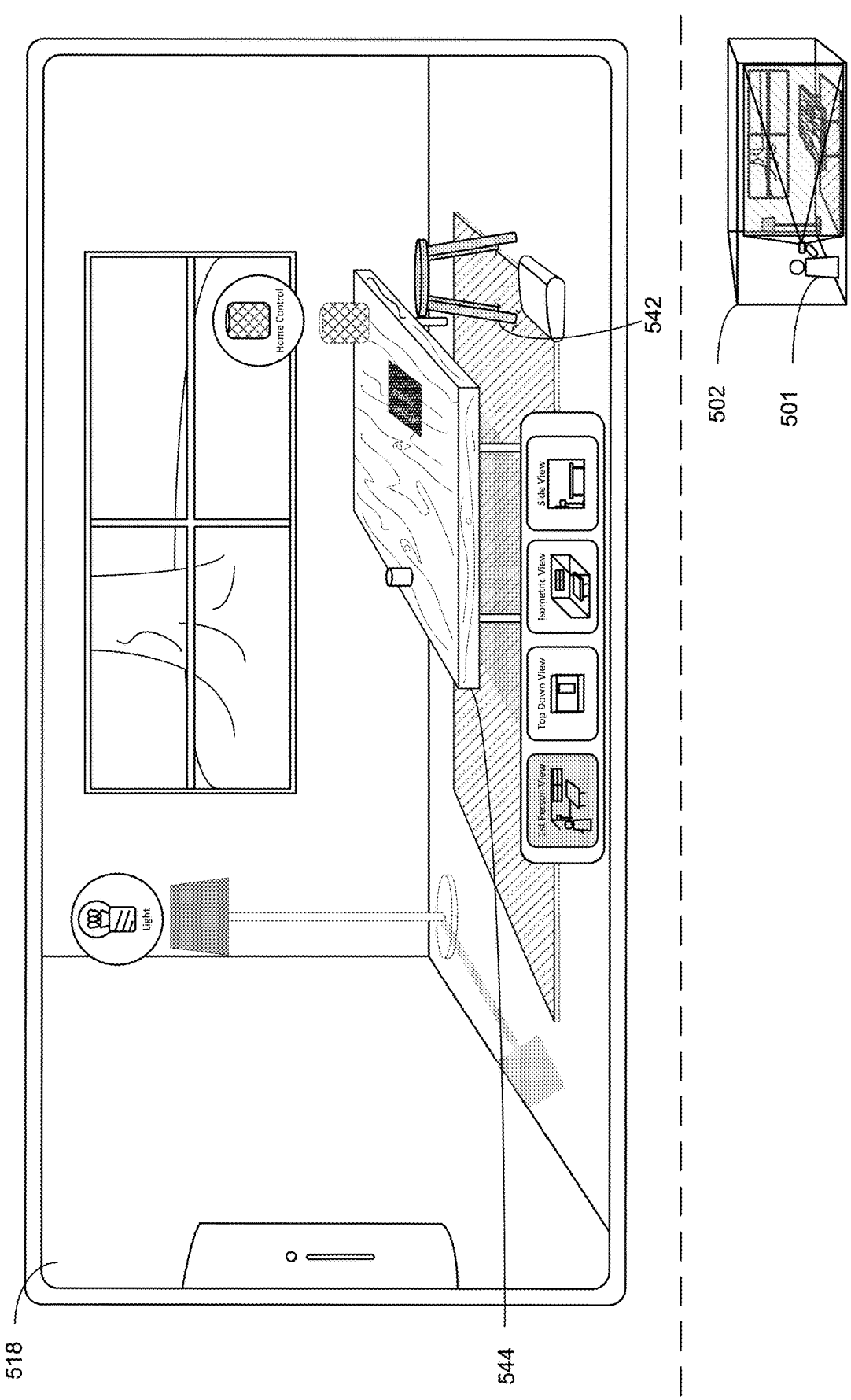

FIG. 5R shows the input no longer being received, and in response to the input no longer being received, the virtual object (e.g., virtual stool 542) will appear in a location away from the real world object (e.g., table) that no longer results in overlap.

Figure 5S:
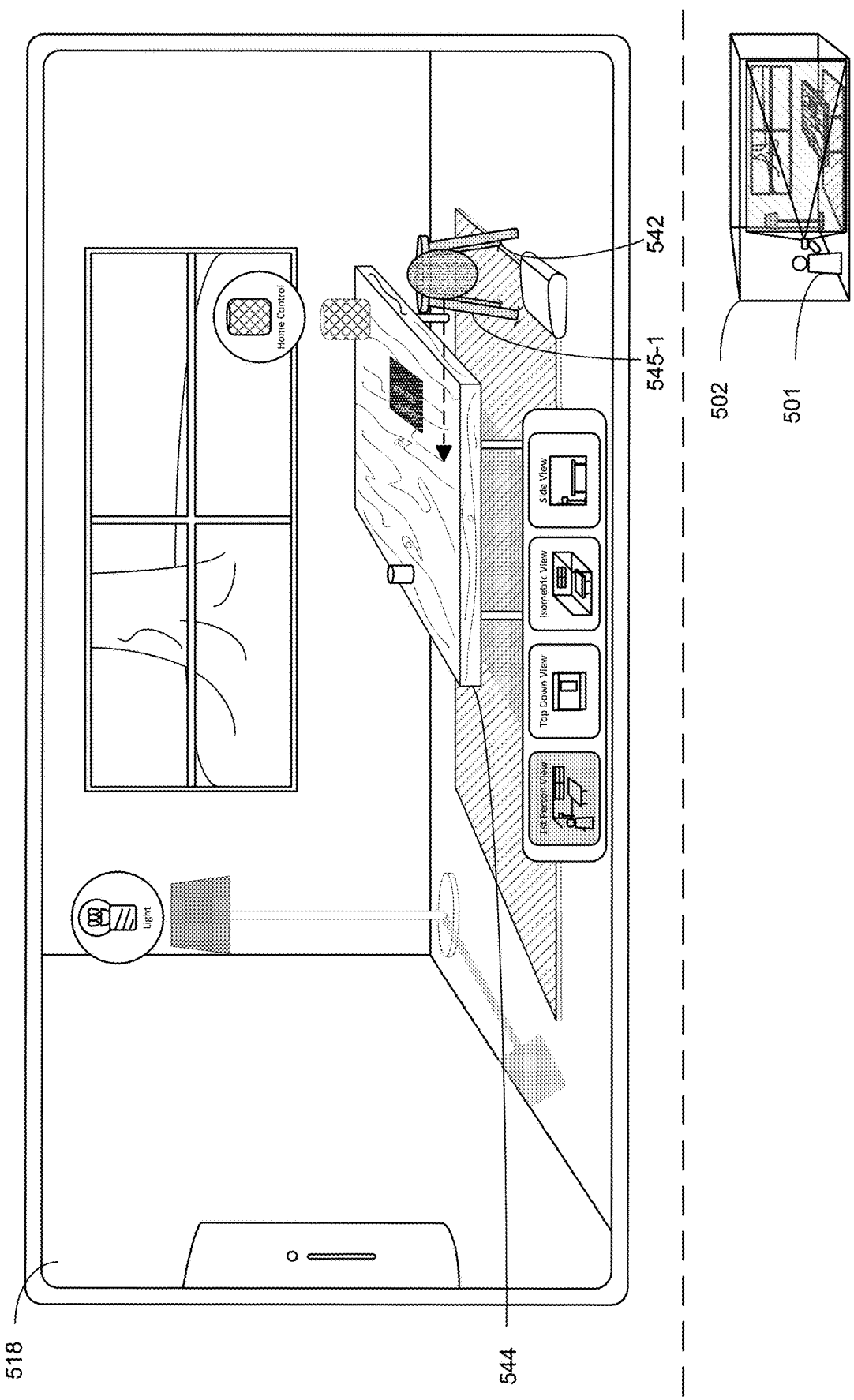

FIG. 5S shows another dragging input 545-1, different from the one previously shown in FIG. 5O to FIG. 5R. Unlike the previous gestures the following sequence of gestures shows, that if the user drags far enough on the virtual object (e.g., virtual stool 542), the virtual object (e.g., virtual stool 542) will snap through the representation of the real world object (e.g., wooden table 544). FIGS. 5S to 5V represent such an interaction. However, like the previous dragging input, the virtual stool 542 moves where the input moves, unless the input causes an overlap with the representation of a real world object (e.g., the representation of the wooden table 544).

Figure 5T:
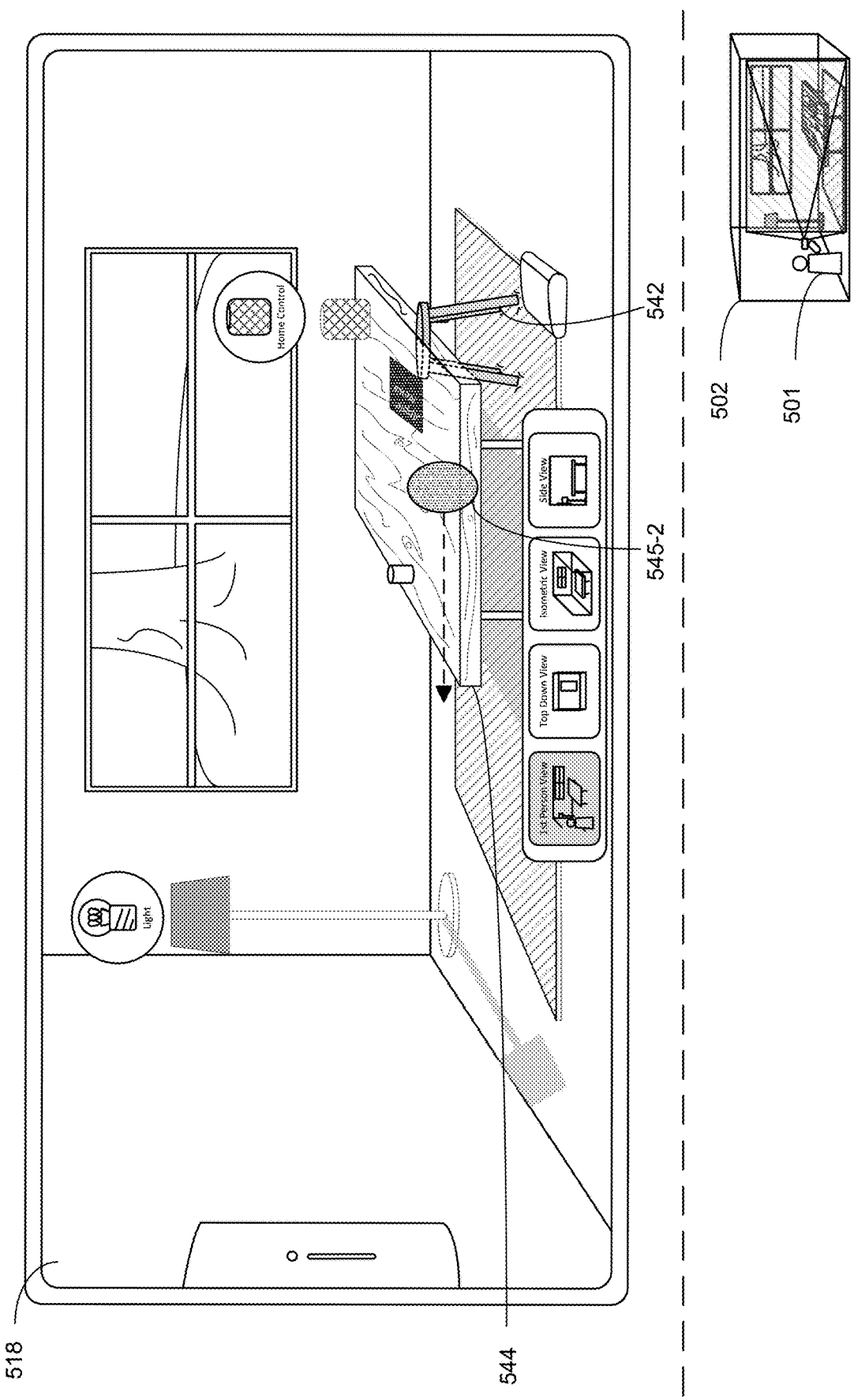

FIG. 5T shows the input continuing 545-2 into a representation of the wooden table 544. FIG. 5T shows the virtual object (e.g., virtual stool 542_ beginning to enter into the representation of the real world object (e.g., wooden table 544). When the virtual stool 542 begins to enter representation of the wooden table 544, the input 545-2 no longer moves at the same rate as the virtual stool 542 does (e.g., the virtual stool moves at a slower rate than the input). The virtual stool 542 now overlaps with the representation of the wooden table 544. As described above, when the virtual stool 542 overlaps with table 544, a portion of the virtual stool 542 disappears, or, alternatively, is shown in a translucent deemphasized state, or in a further alternative, an outline of the portion of the virtual object that overlaps with the representation of the real world object is displayed.

Figure 5U:
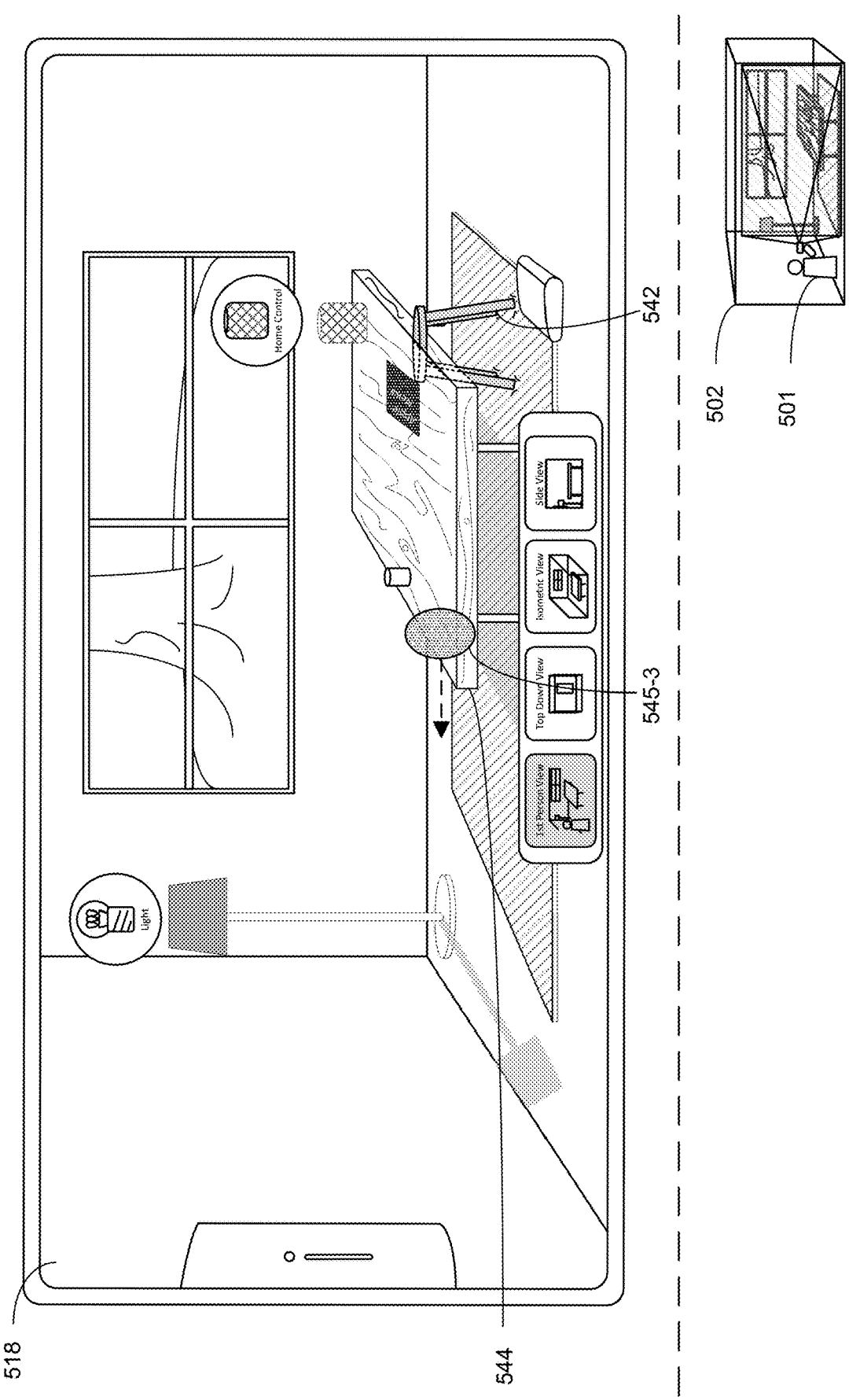

FIG. 5U shows the input continuing 545-3, but the virtual stool 542 again not moving at the same rate as the input 545-3 moves. The virtual stool 542 will not pass a certain threshold into the representation of the wooden table 544. In other words, at first the virtual stool 542 will resist movement into the representation of the wooden table 544 (e.g., allowing some overlap), but then after a certain amount of overlap is met, the input's movement no longer causes the virtual stool 542 to move.

Figure 5V:
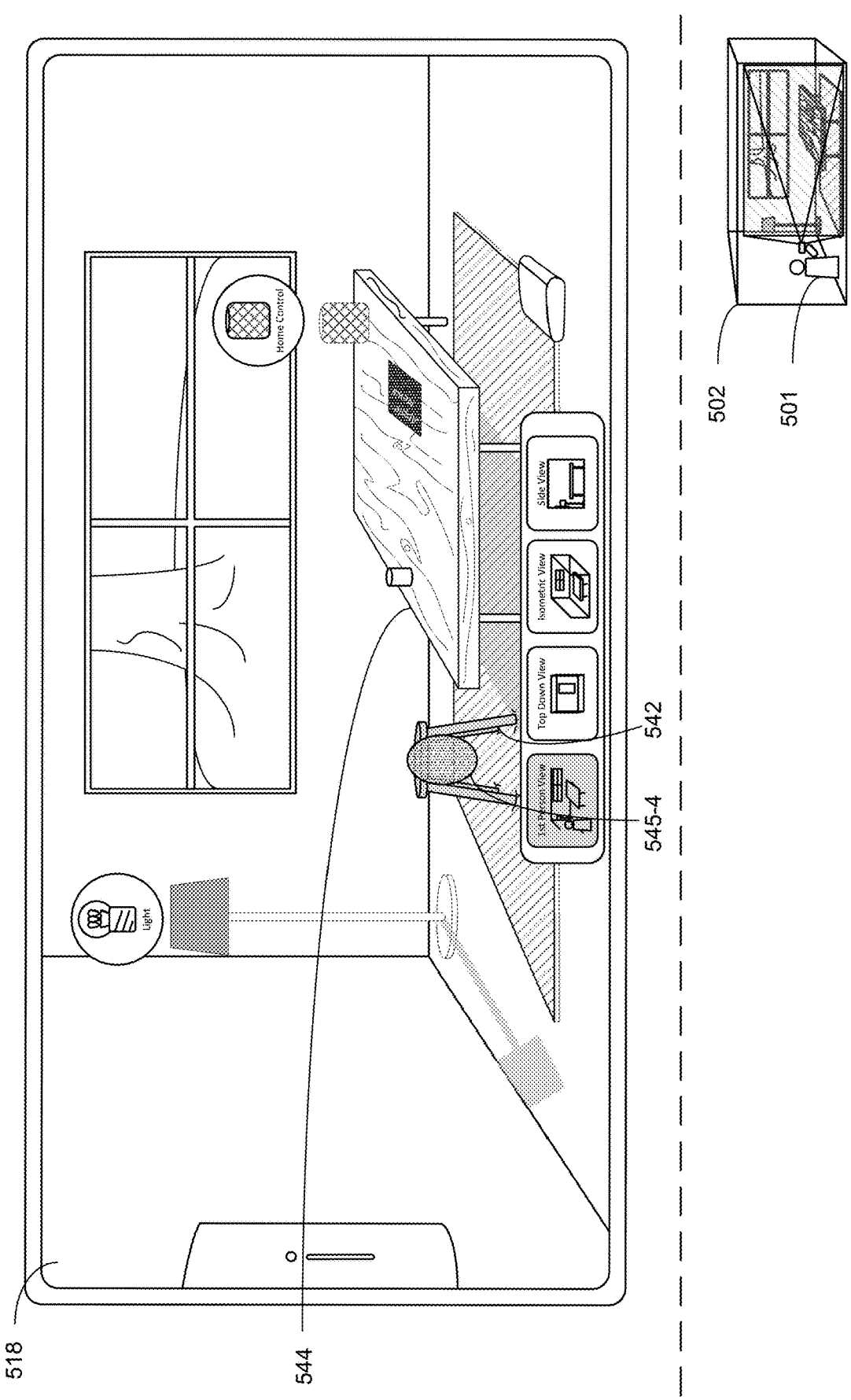

FIG. 5V shows the input 545-4 meeting a threshold distance (and also not interfering with any other real world objects). In response to meeting the threshold distance past the representation of the real world object (e.g., wooden table 544) (and not interfering with any other real world objects), snapping the virtual object (e.g., virtual stool 542) through the representation of the real world object (e.g., wooden table 544). When the virtual object (e.g., virtual stool 542 snaps through the representation of the real world object (e.g., wooden table 544), the virtual object (e.g., virtual stool 542) aligns itself with the input 545-4.

Figure 5W:
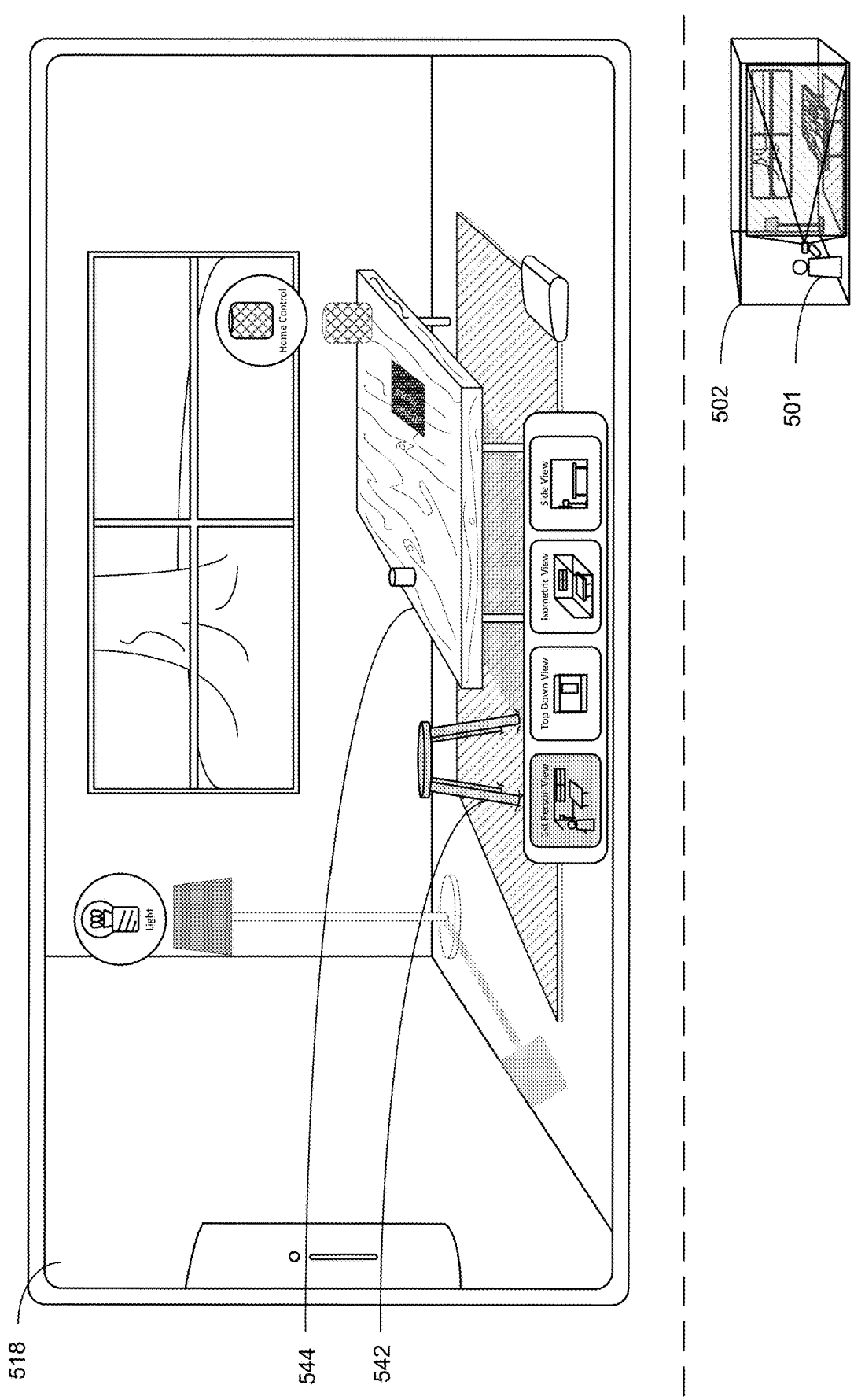

FIG. 5W shows the virtual object (e.g., virtual stool 542) now residing in the snapped location (e.g., where the liftoff occurred after the meeting the distance threshold past the representation of the real world object (e.g., wooden table 544)).

Figure 5X:
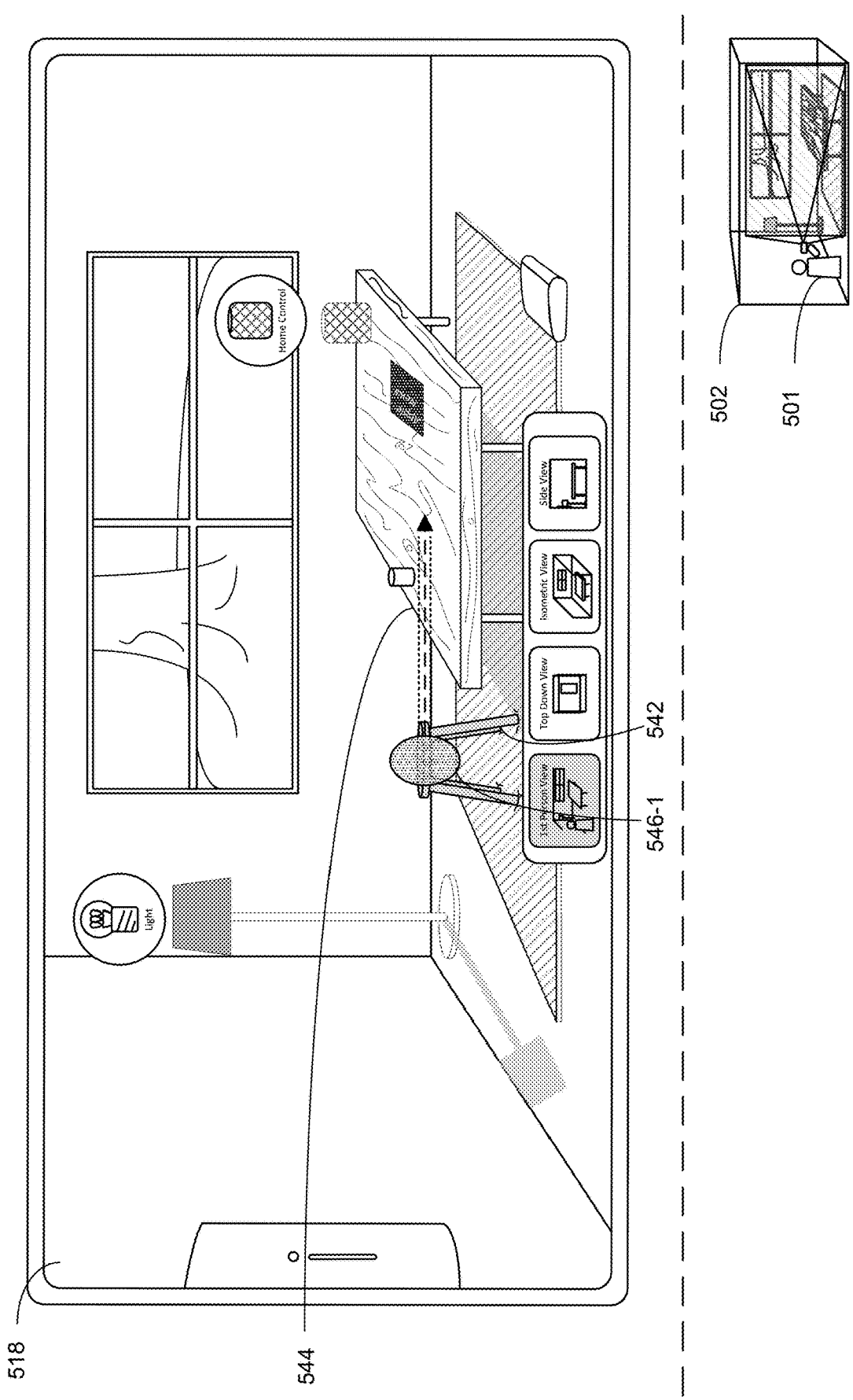

FIG. 5X shows another dragging input 546-1, different from the one previously shown in FIG. 5S to FIG. 5W. Unlike the previous gestures the following sequence of gestures shows, that if the user drags fast enough (e.g., either a high rate of acceleration, and/or a higher velocity) on the virtual object (e.g., virtual stool 542), the virtual object (e.g., virtual stool 542) will snap through the representation of the real world object (e.g., wooden table 544). FIGS. 5S to 5V show such an interaction. However, like the previous dragging input, the virtual object (e.g., virtual stool 542) moves where the input moves, unless the input causes an overlap with a real world object or item (e.g., the representation of the wooden table 544).

Figure 5Y:
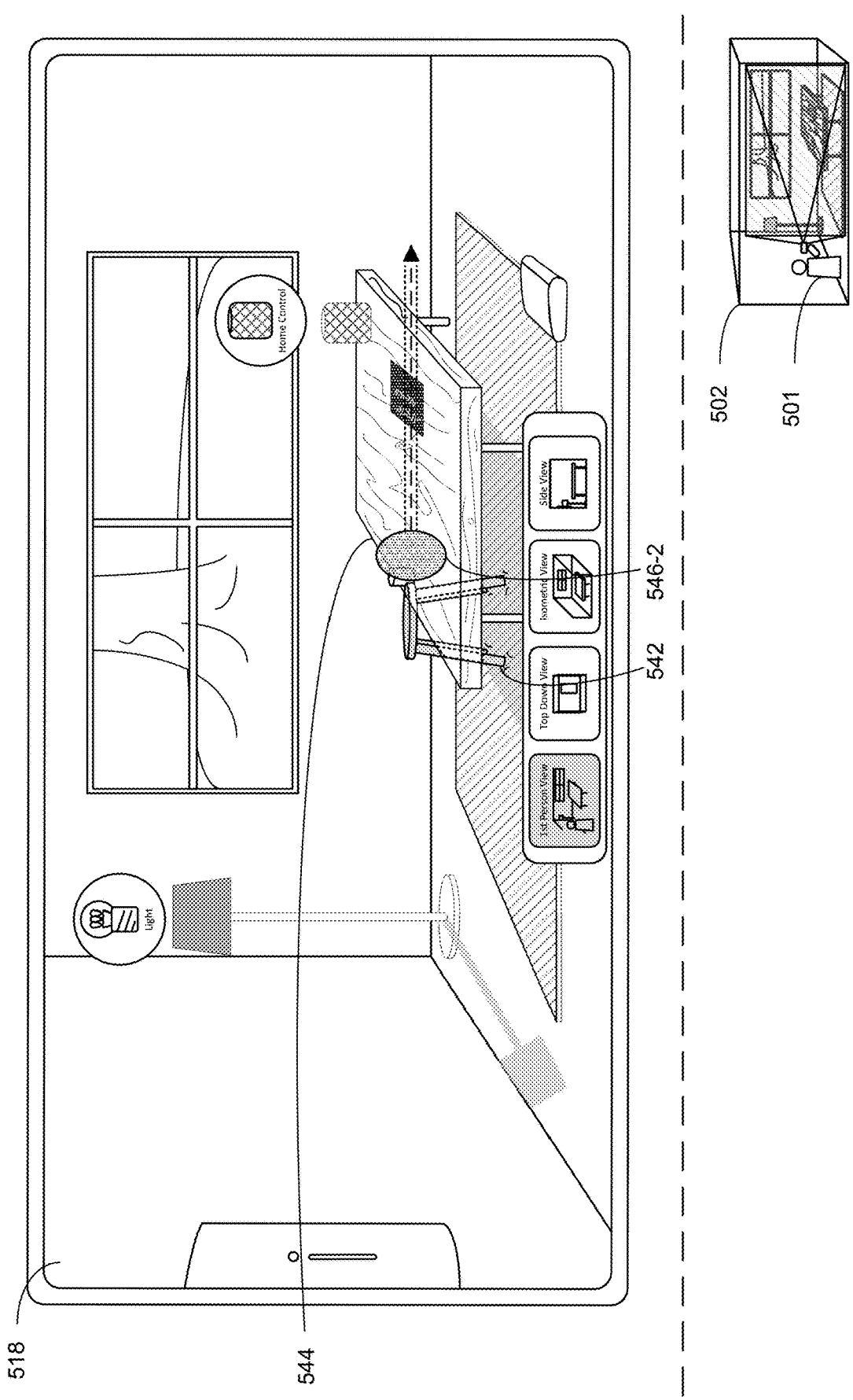

FIG. 5Y shows the input continuing 546-2 into a representation of the wooden table 544. FIG. 5Y shows the virtual stool 542 beginning to enter into the representation of the wooden table 544. When the virtual stool 542 begins to enter representation of the wooden table 544, the input 546-2 no longer moves at the same rate as the virtual stool 542 does (e.g., the virtual stool moves at a slower rate than the input). The virtual stool 542 now overlaps with the representation of the wooden table 544. When the virtual stool 542 overlaps with table, a portion of the virtual stool 542 disappears (or is shown in a translucent deemphasized state), however an outline of the virtual stool 542 will remain.

Figure 5Z:
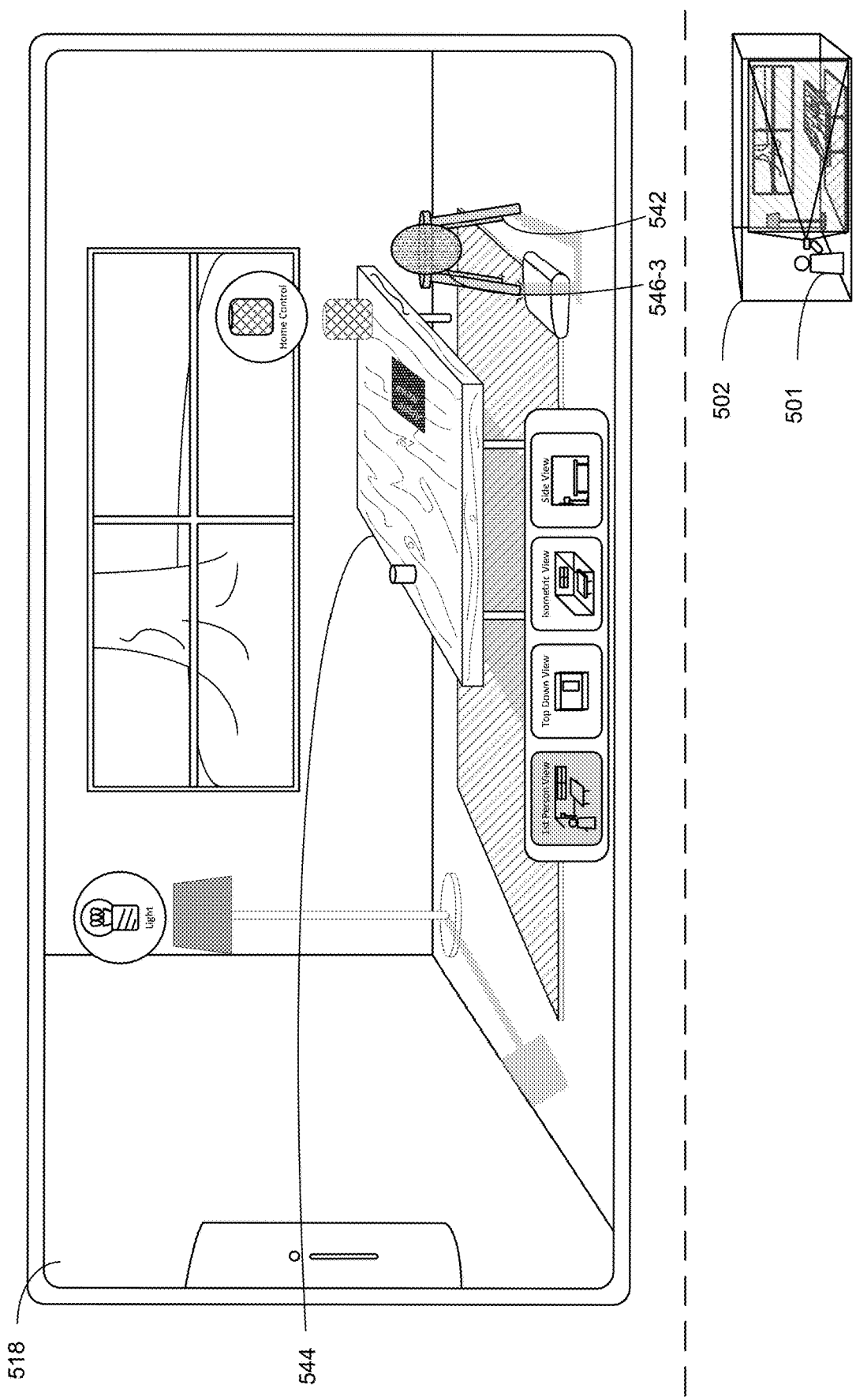
Figure 5A:
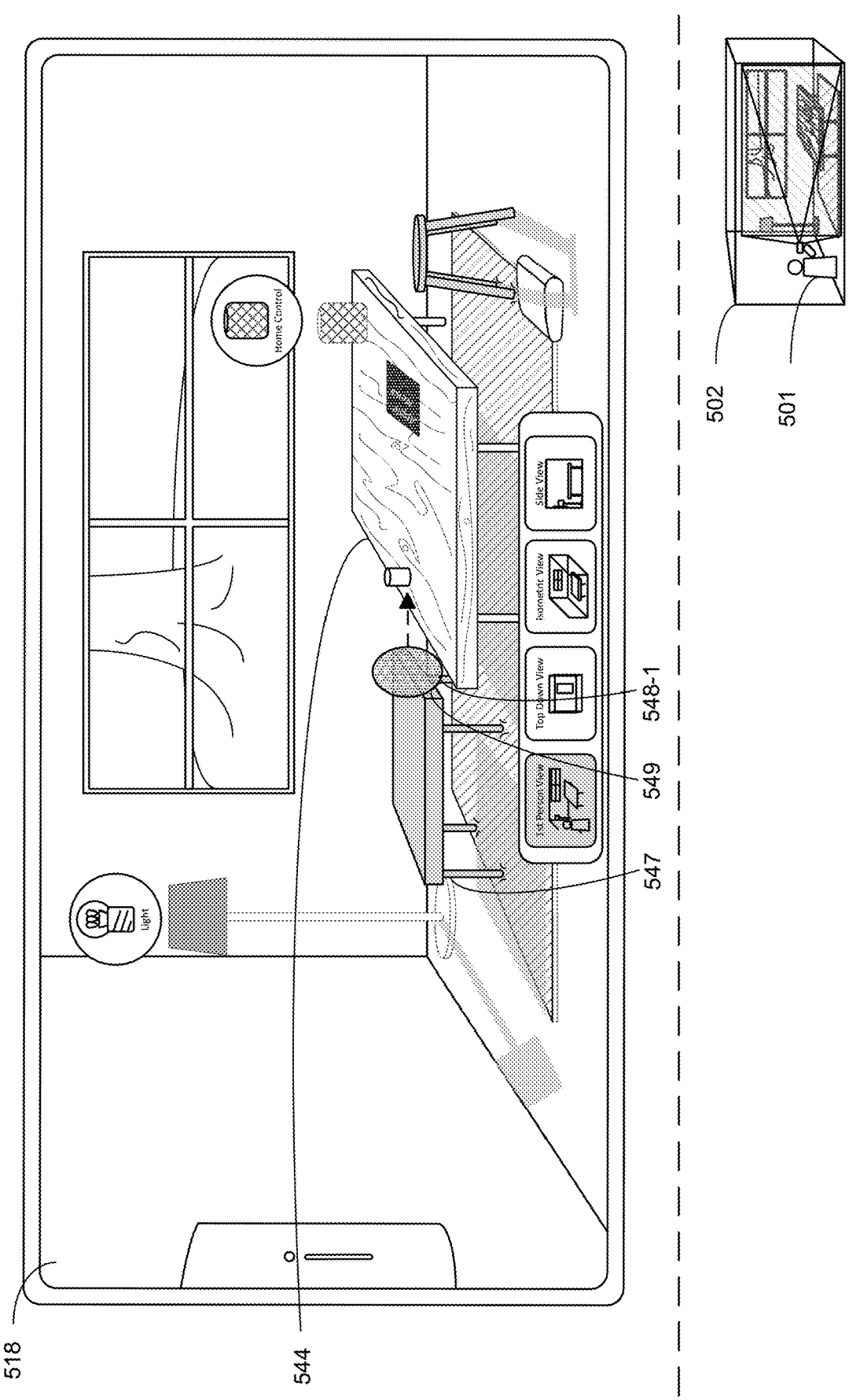
Figure 5B:
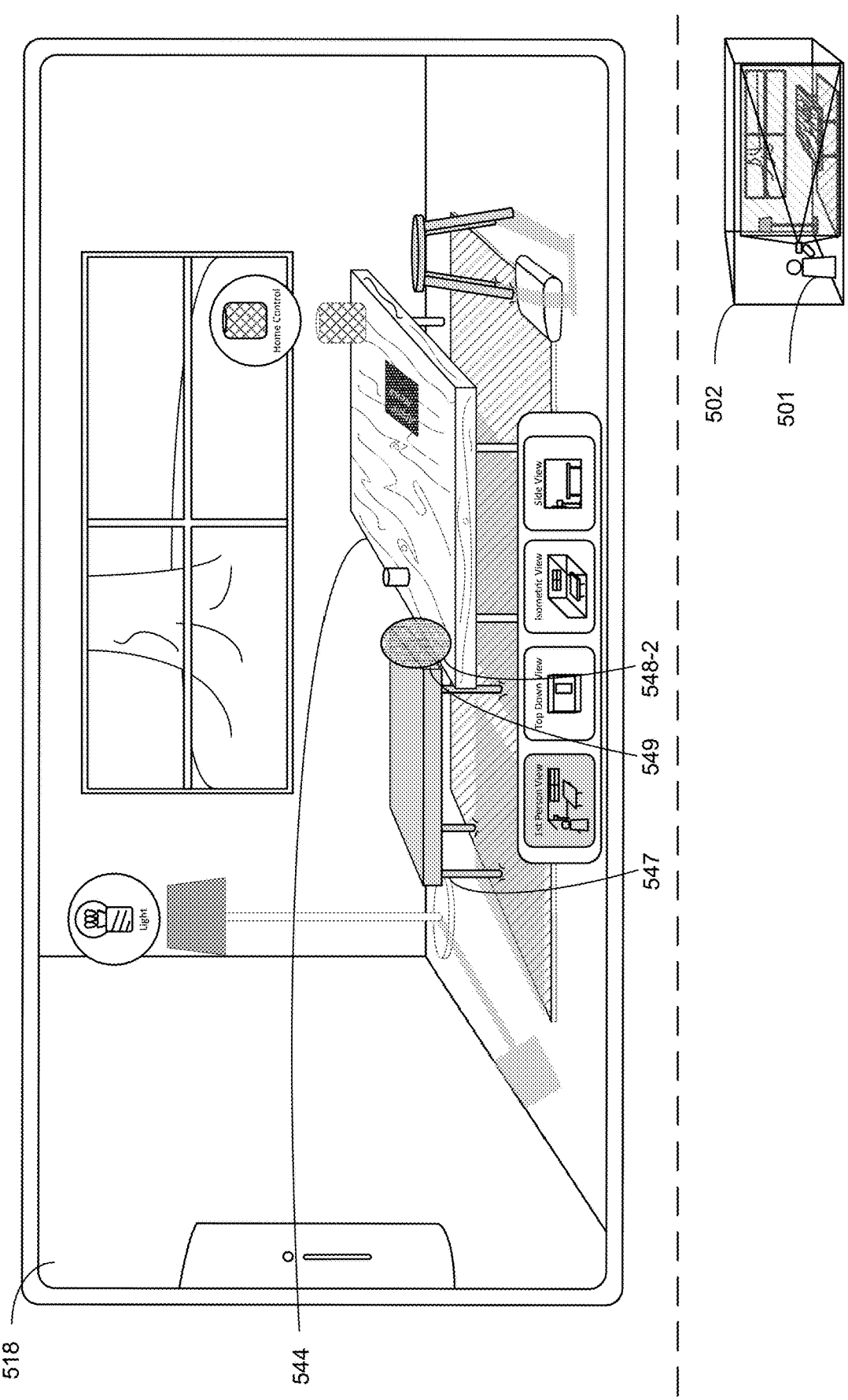
Figure 5C:
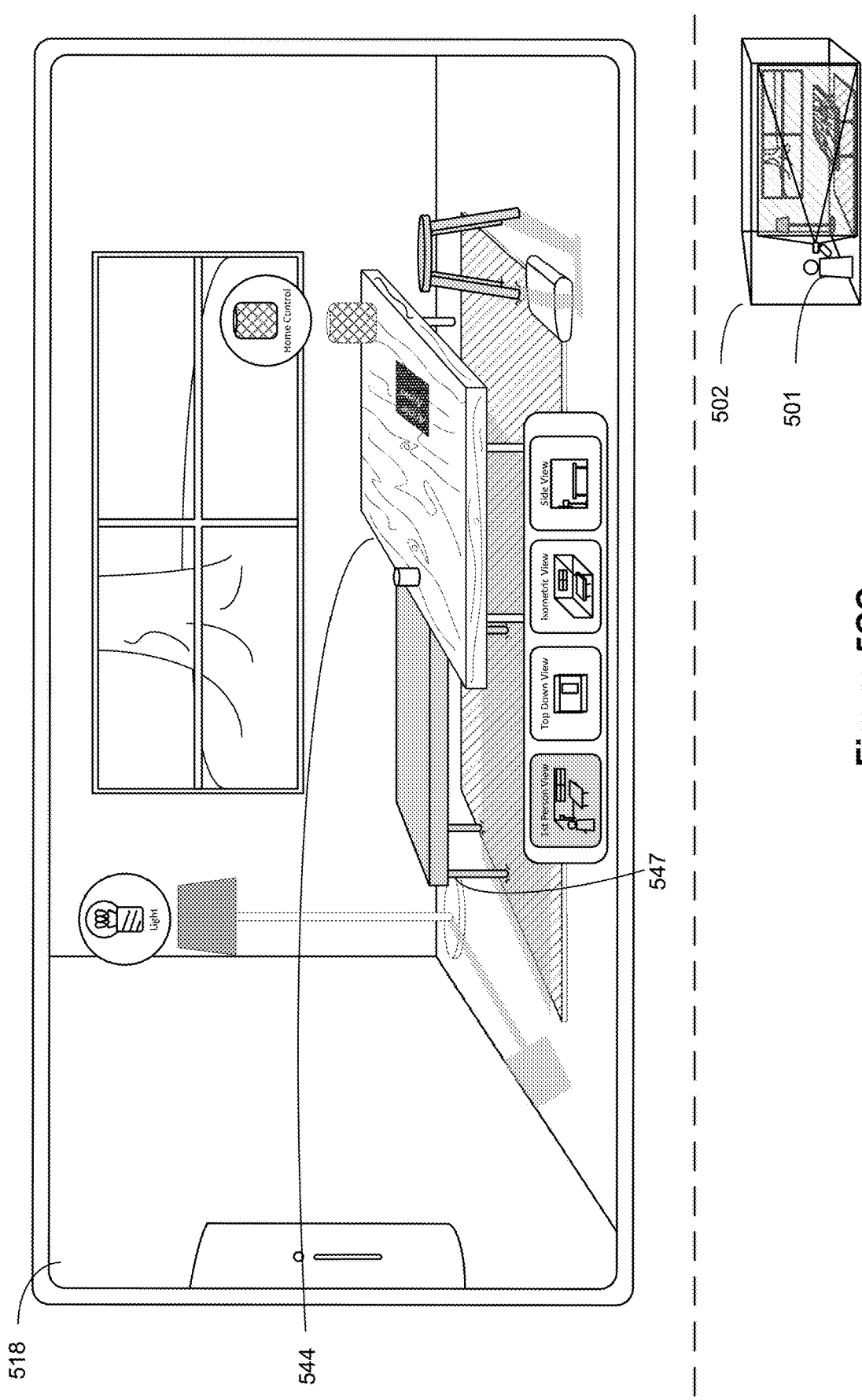
Figure 5D:
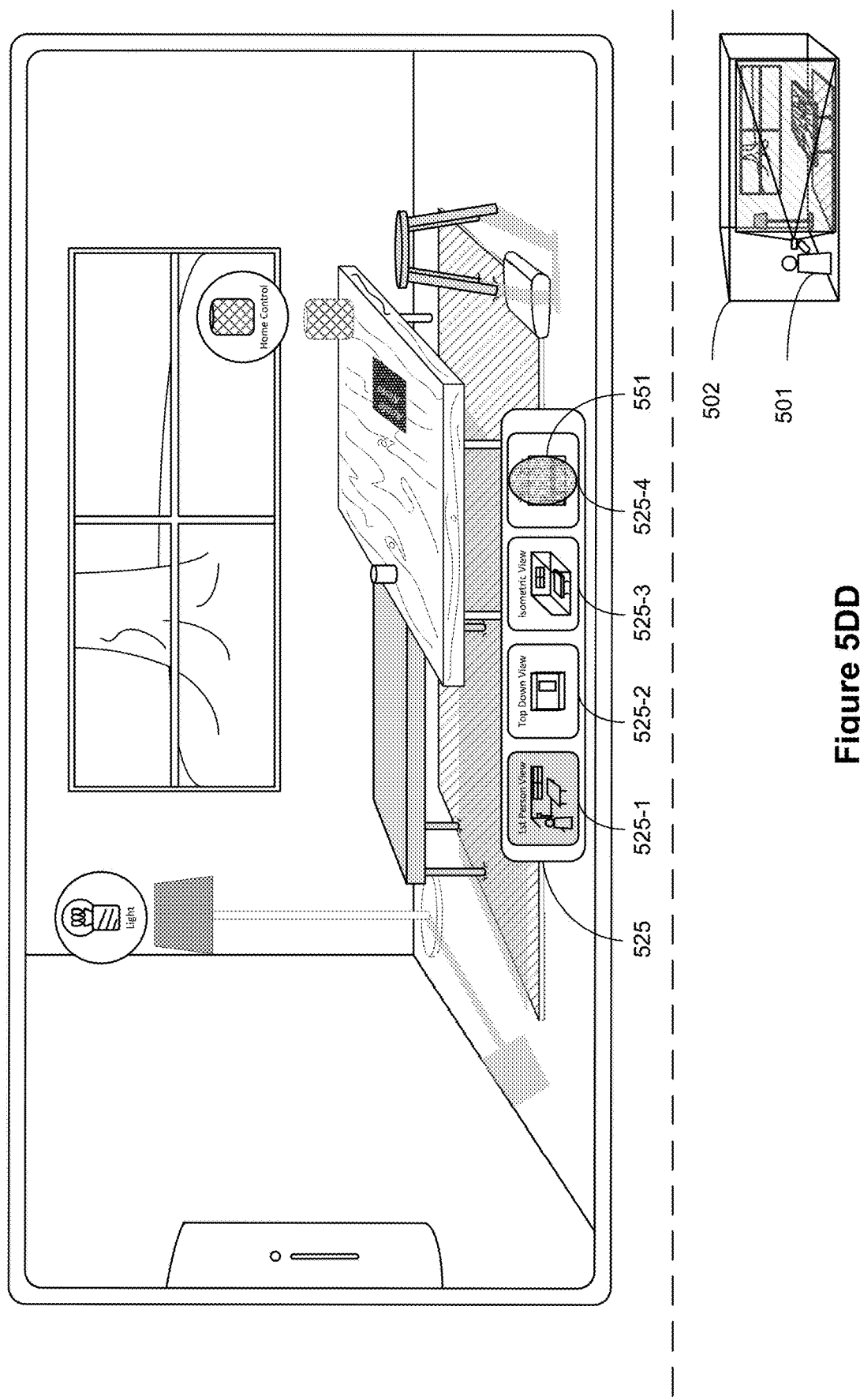
Figure 5E:
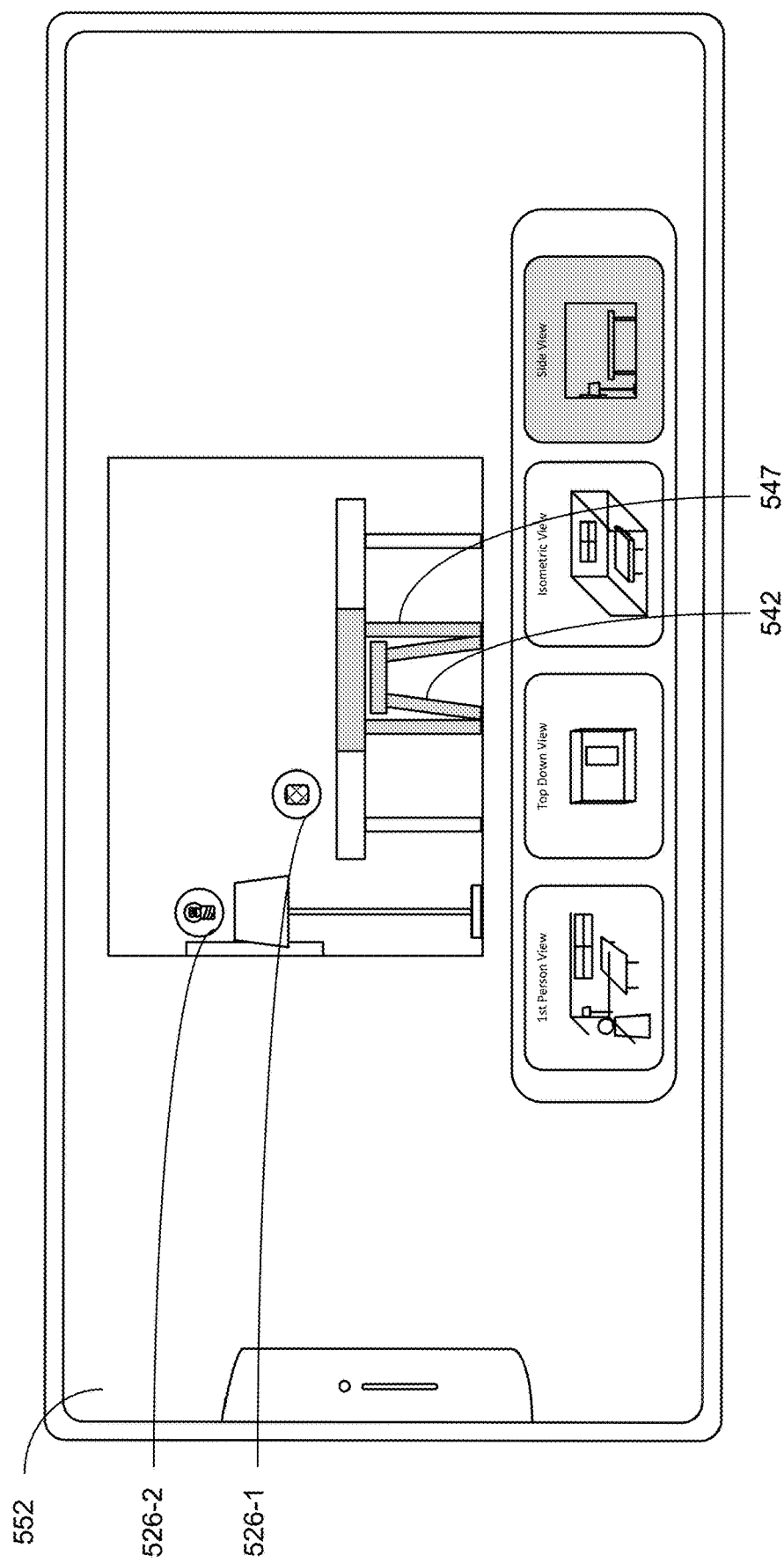
Figure 5F:
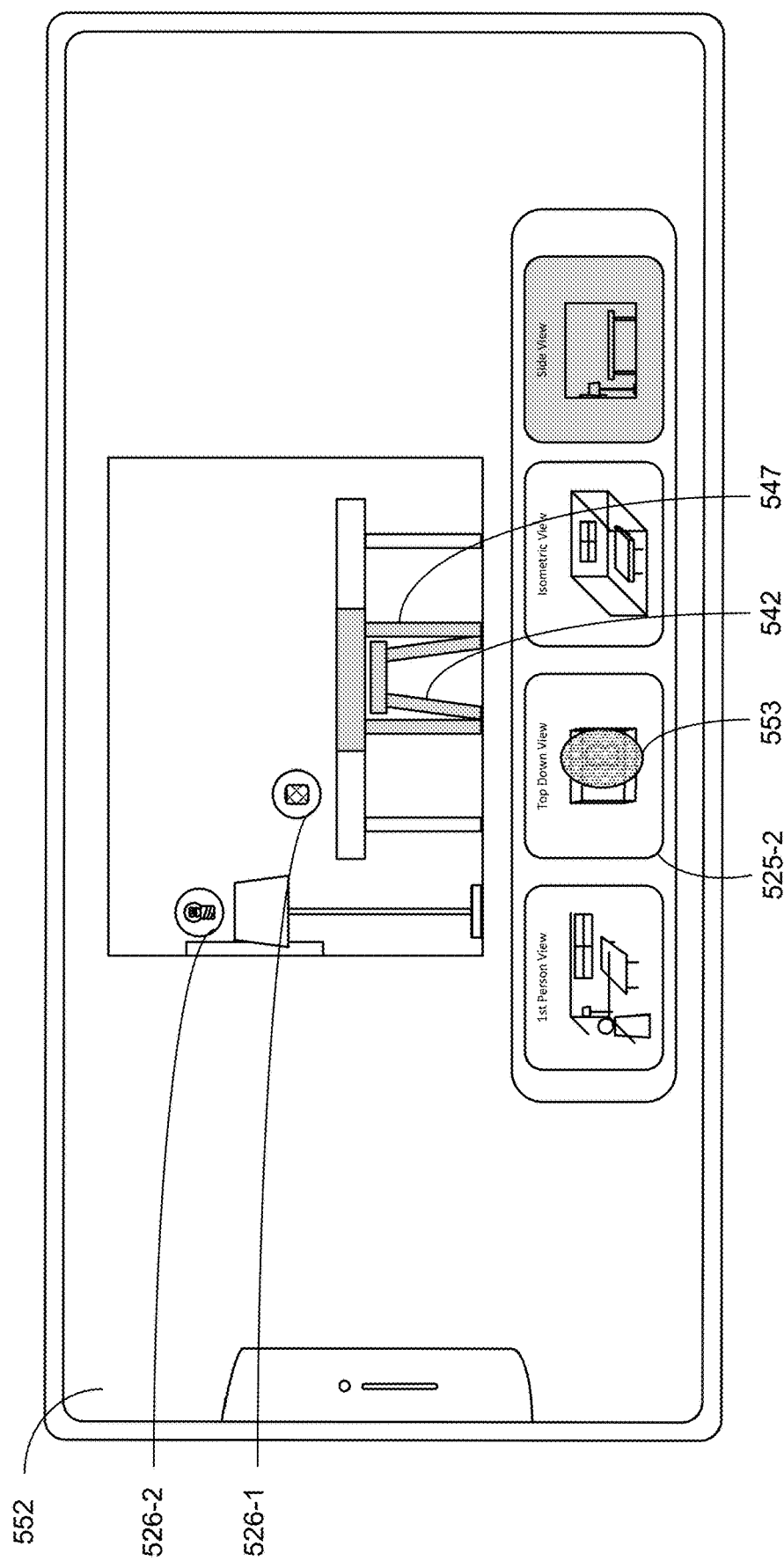
Figure 5G:
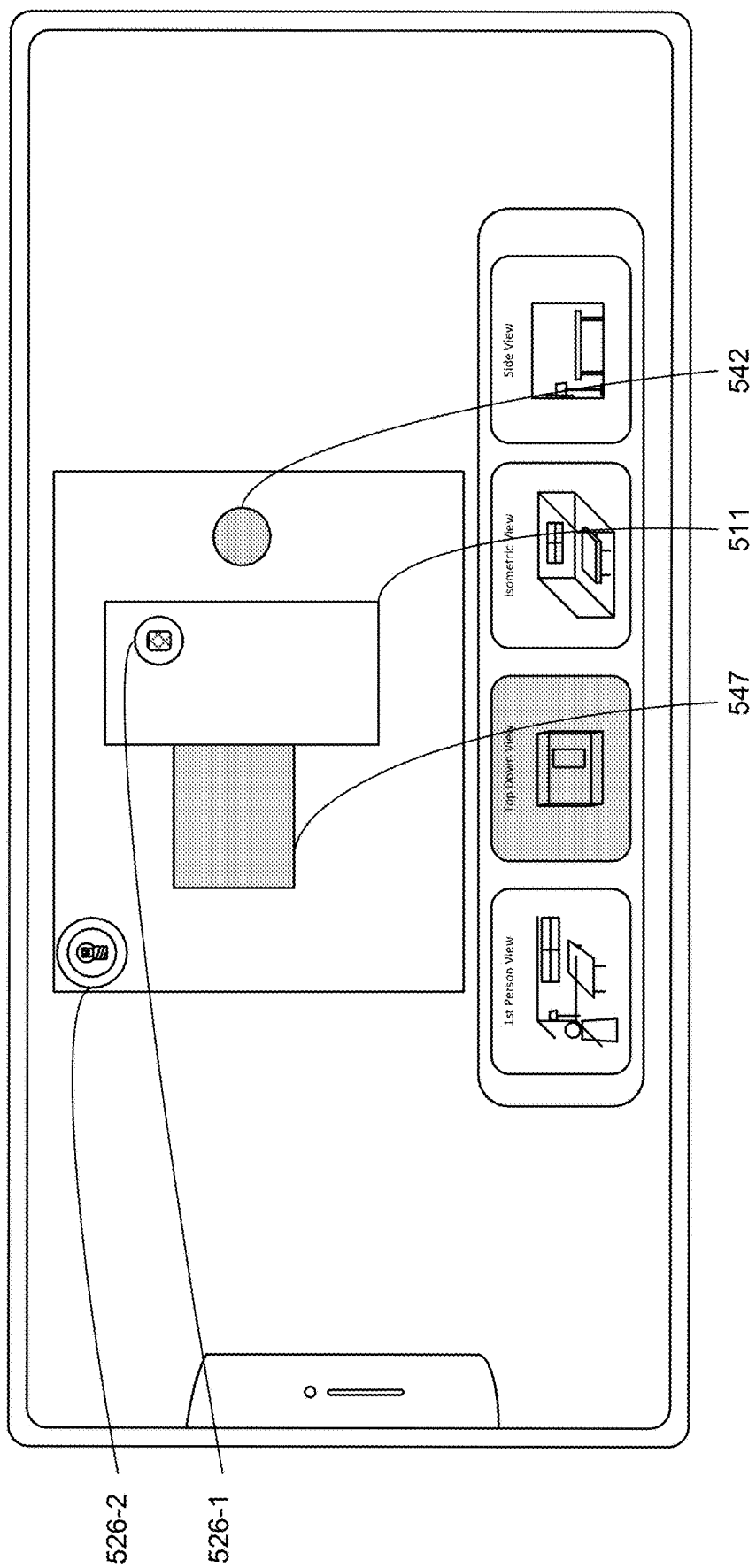
Figure 5H:
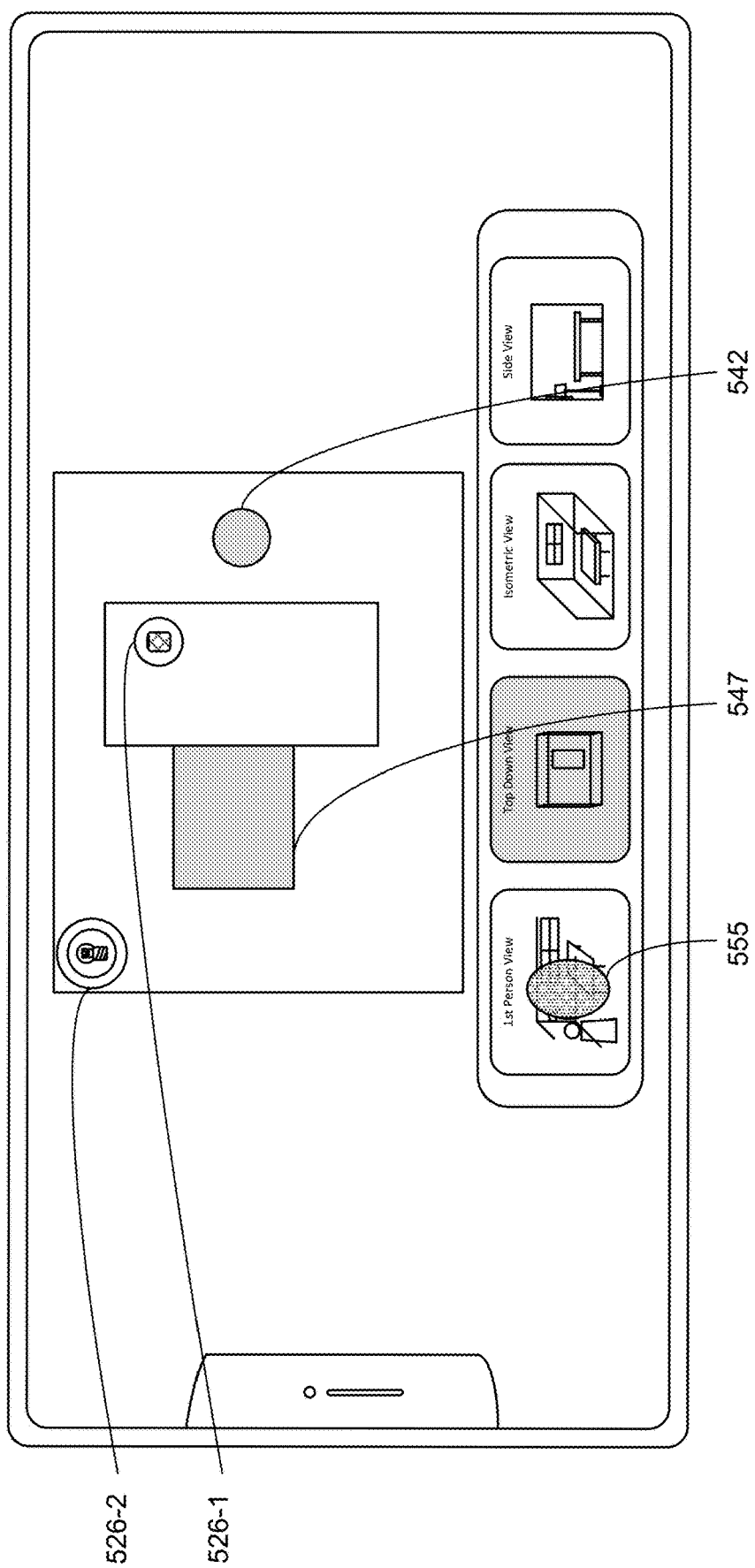
Figure 5I:
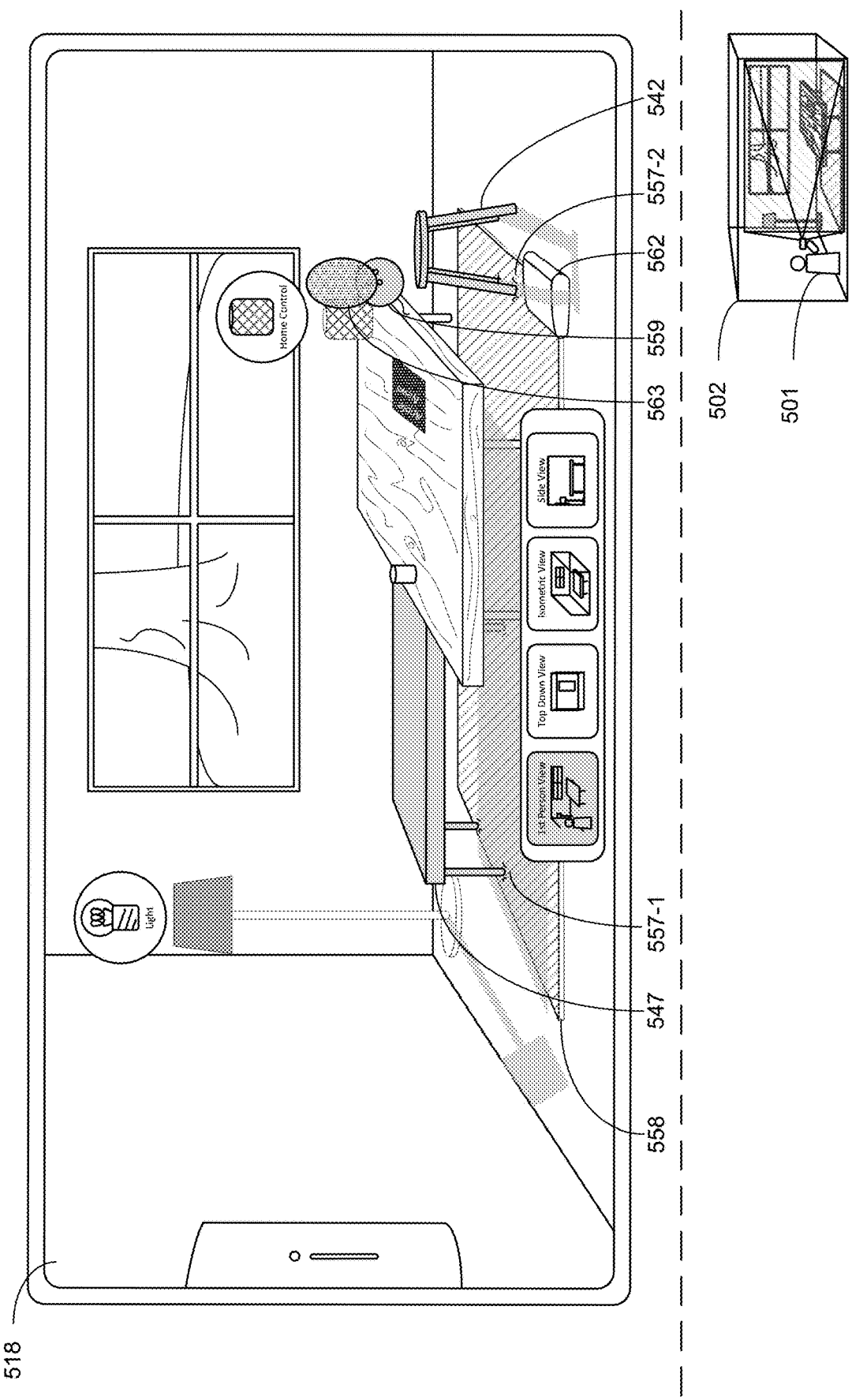
Figure 5J:
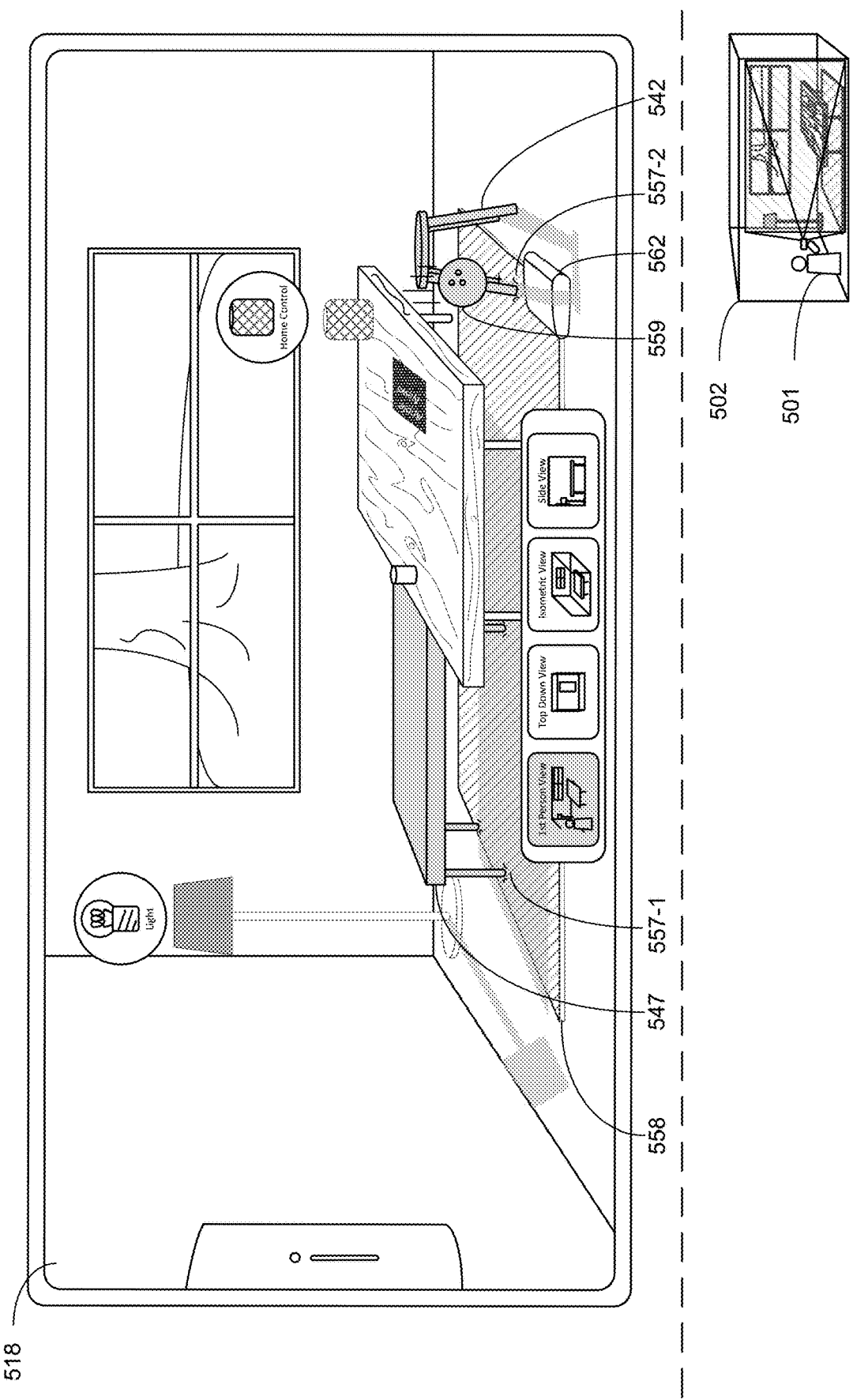
Figure 5K:
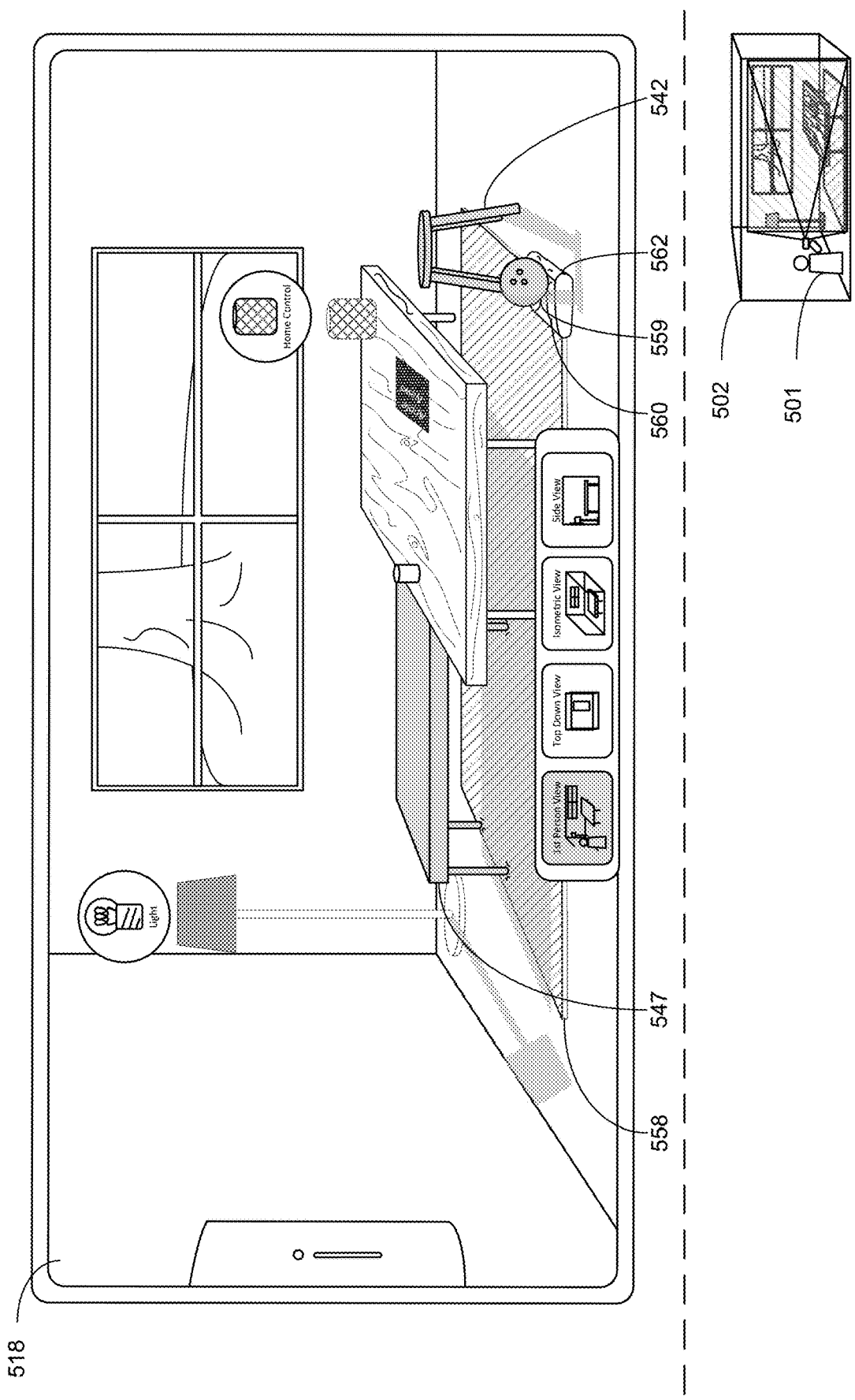
Figure 5L:
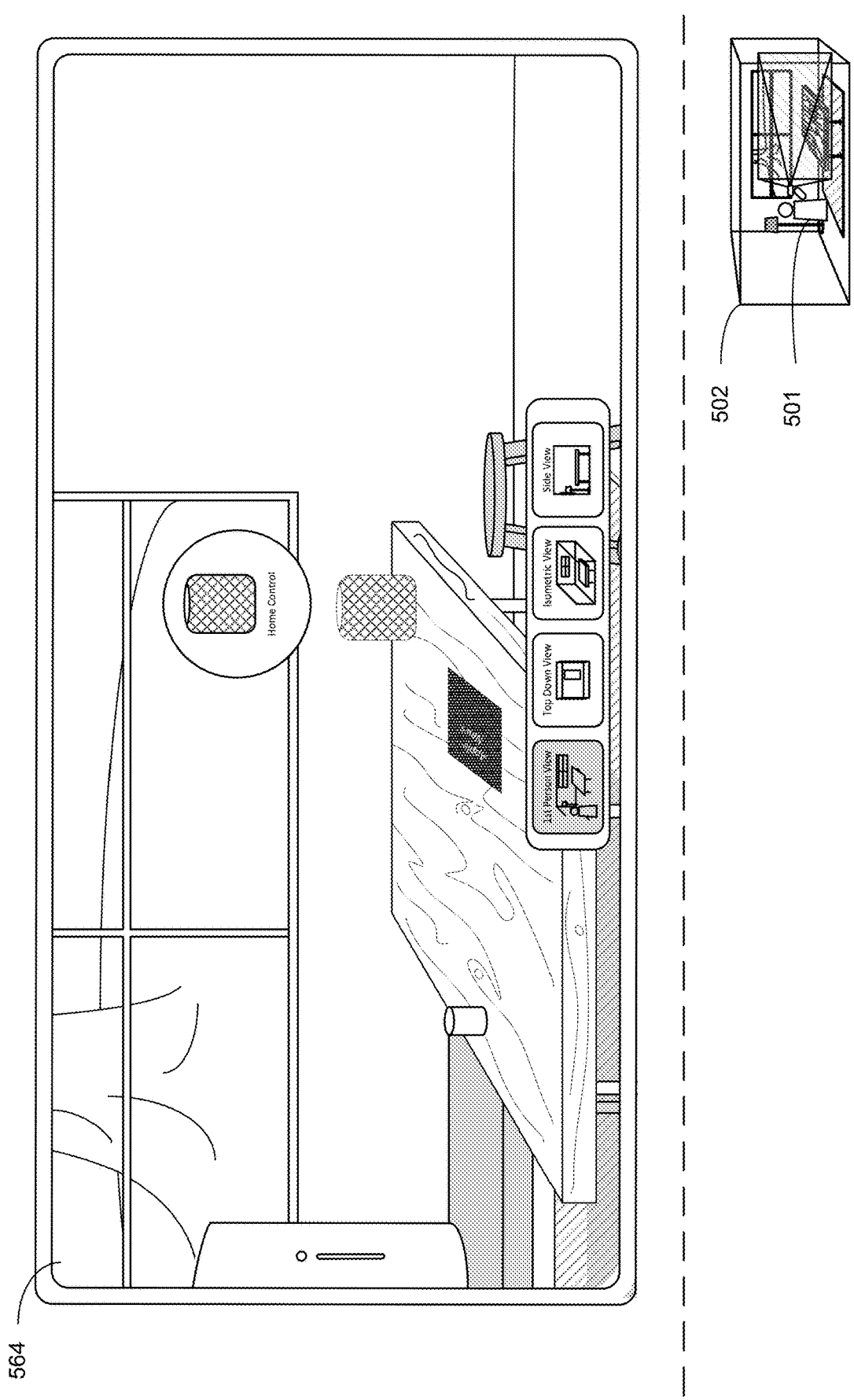

FIG. 5Z shows a result produced when the input 546-3 meets a threshold acceleration, velocity, or combination of acceleration and velocity (and also not interfering with any other real world objects). In response to meeting the threshold acceleration, velocity, or combination, (and not interfering with any real world objects), computer system 301-*b* snaps the virtual stool 542 through the representation of the wooden table 544. When the virtual stool 542 snaps through the representation of the wooden table 544, the computer system 301-*b* cause the virtual stool 542 to be aligned with the input 546-3.

FIG. 5AA-5CC show the interaction of a user adding a virtual table 547 to the live representation 518, and resizing the virtual table 547. Additionally, FIG. 5CC shows the virtual table 547 automatically resizing to abut the representation of the wooden table 544. Throughout the discussion of FIGS. 5AA-5LL below, the virtual table 547, virtual stool 542 and virtual bowling ball 559 are to be understood to be examples of virtual objects, and the wooden table 544, rug 558 and pillow 562 are examples of real world objects.

Specifically, FIG. 5AA shows a dragging input at a first position 548-1 over a virtual table 547 that was inserted into the live representation 518. The dragging input 548 is moving in a direction towards the representation of the wooden table 544. Additionally, this dragging input 548-1 is occurring at an edge 549 of the virtual table 547 and the direction of movement of input 548-1 is away from locations interior to virtual table 547.

FIG. 5BB shows the dragging input continuing to a second position 548-2, and virtual table 547 resizing to a position that corresponds with the dragging input at the second position 548-2. The resizing of the virtual table 547 corresponds to the direction the dragging input 548-1 and 548-2 (e.g., if the dragging gesture is to the right the item of furniture will resize to the right). Although the virtual table 547 is shown expanding in FIG. 5BB, in some embodiments, an input in the opposite direction to dragging input 548-1 and 548-2 (e.g., in a direction toward a location within virtual table 547) would result in the virtual table 547 reducing in size.

FIG. 5CC shows the dragging input 548-2 no longer being received, but shows the table expanding (e.g., snapping) to abut the representation of the wooden table 544. This expansion occurs automatically when the user's input (e.g., dragging input 548-2) satisfies a threshold proximity to an edge of another (virtual or real world) object, without requiring any additional input from the user to cause the virtual object to expand exactly the correct amount so as to abut the representation of the other (e.g., virtual or real world) object.

FIGS. 5DD to 5HH illustrate the ability to switch between orthographic views (e.g., the top down view and the side view). Furthermore, these figures also show how virtual objects are maintained when different views are selected.

FIG. 5DD shows the controls to select either the "1st Person View" control 525-1, the "Top-Down View" control 525-2, or a "Side View" control 525-4. The "Side View" control 525-4, when selected, displays a flattened side view (e.g., a side orthographic view) of the environment. FIG. 5DD shows an input 551 over the "Side View" control 525-4. Although the side-view is shown without texture (e.g., representations of objects in the side-view are displayed without texture) in the example of FIG. 5DD, in some embodiments, the side-view is shown with texture (e.g., representations of one or more objects in the side-view are displayed with texture).

FIG. 5EE shows the resulting user interface in response to receiving the input 551 over the "Side View" control 525-4. FIG. 5EE shows a side view simplified representation 552 with the virtual furniture (e.g., the virtual stool 542, and the virtual table 547) and the real world furniture. In addition, icons (e.g., the same icons as shown in the augmented reality representation of the live view) corresponding to the detected building/home automation objects and/or smart object (e.g., the "Home Control" icon 526-1 and the smart-light icon 526-2) are displayed.

FIG. 5FF shows the same side view simplified representation 552 as FIG. 5EE. FIG. 5FF also shows an input 553 over the "Top-Down View" control 525-2.

FIG. 5GG shows the resulting user interface in response to receiving the input 553 over the "Top-Down View" control 525-2. FIG. 5GG shows a top-down view simplified representation 554 with the virtual furniture (e.g., the virtual stool 542, and the virtual table 547) and the real world furniture. In addition, icons (e.g., the same icons as shown in the augmented reality representation of the live view) corresponding to the detected building/home automation objects and/or smart object (e.g., the "Home Control" icon 526-1 and the smart-light icon 526-2) are displayed. Although the top-down view is shown without texture (e.g., representations of objects in the top-down view are displayed without texture), it should be appreciated that this top-down view can also be shown with texture (e.g., representations of objects in the top-down view are displayed with texture).

FIG. 5HH shows the same top-down view simplified representation 554 as FIG. 5GG. FIG. 5FF also shows an input 555 over the "1st Person View" control 525-1.

FIGS. 5II to 5KK show an augmented reality representation (e.g., the live representation 518 with one or more added virtual objects) of the room 502. These Figures show how virtual objects can change visual appearances of real world objects. FIG. 5II shows all the textures of the features in the room 502, and also shows non-essential features (e.g., a representation of the pillow 562 that corresponds to the pillow 508). FIG. 5II also shows virtual objects (e.g., the virtual stool 542, and the virtual table 547) in the live representation 518 of the room 502. These virtual objects, interact with the physical objects, and have an effect on their appearance. In this example, the virtual table 547 creates an impression 557-1 (e.g., a compression of the rug) on the representation of the rug 558 (which corresponds to rug 509). The virtual stool 542 also creates an impression 557-2

(e.g., a compression of the rug) on the representation of the rug 558. FIG. 5II also shows a virtual bowling ball 559 being inserted into the non-simplified representation of the room 502 above the representation of the pillow 562, via input 563.

FIG. 5JJ shows user releasing (e.g., input 563 no longer being received) the virtual bowling ball 559 in the live representation 518 of the room 502 above the representation of the pillow 562. In response to releasing the virtual bowling ball 559, the virtual bowling ball 559 begins to fall to the representation of the pillow 562, respecting the physical properties of the room 502.

FIG. 5KK shows the virtual bowling ball 559 landing on the representation of the pillow 562, and in response to landing the representation of the pillow 562 shows that it deforms. The deformation of the representation of the pillow 562 is shown by compression lines 560 of the representation of the pillow 562.

FIG. 5LL illustrates that the user has moved within the room to a new position while the computer system is displaying a live representation 518 of the room 502. As a result the live representation 518 of the room 502 has updated to what the user 501 would perceive from the new position. As such, the computer system 301-*b* displays a new live view representation 564. As the device's location, yaw, pitch, and roll changes, the live representation of the room updates in real time to correspond to the device's current location, yaw, pitch, and roll. As a result, the display of the live representation 518 is constantly adjusting to minute changes in the device's position and orientation while the user is holding the device. In other words, the live representation will appear as if the user is looking through a view-finder of a camera, although virtual objects may be added or included in the live representation.

Figure 6A:
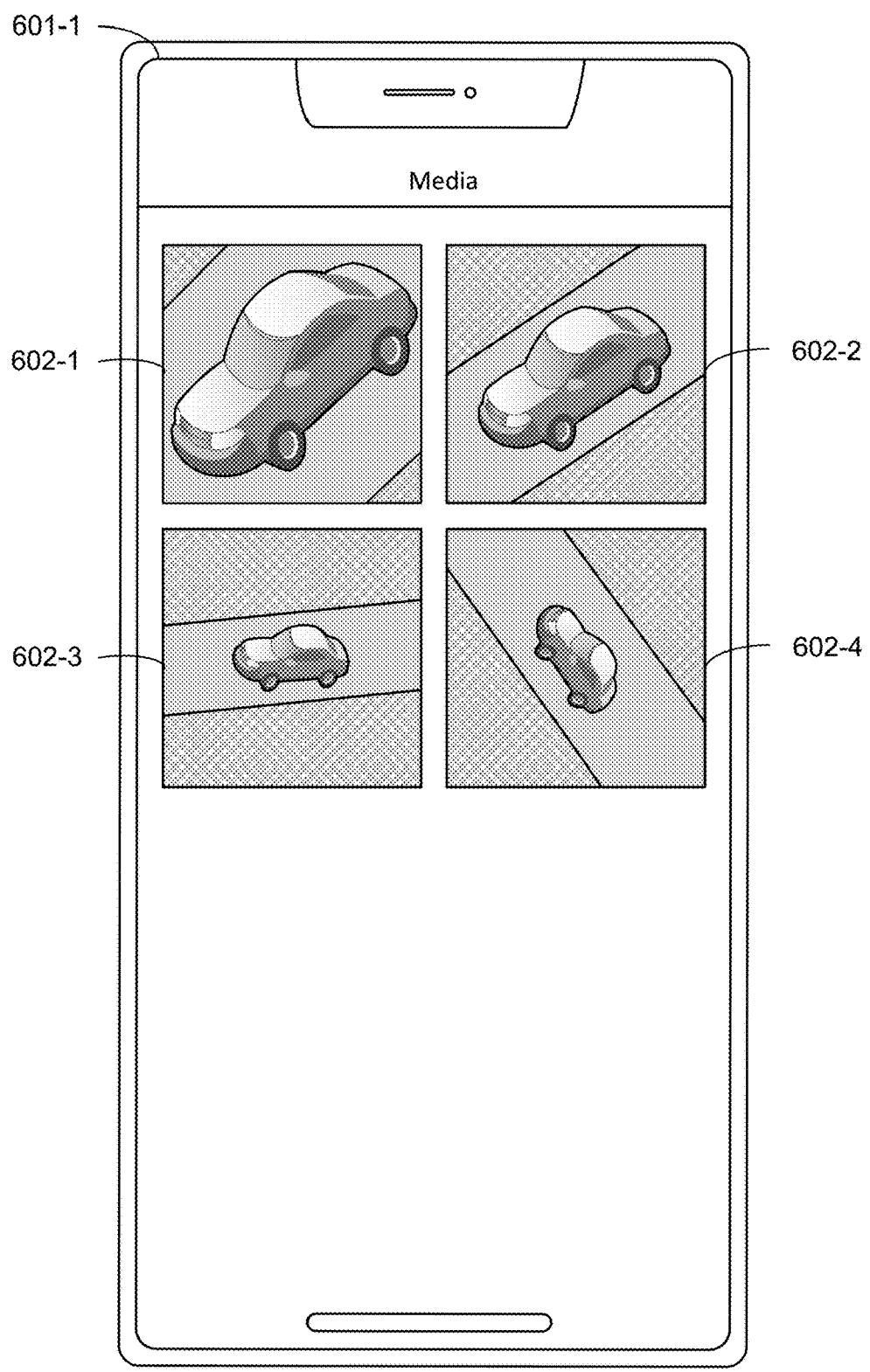
FIGS. 6A-6T illustrate example user interfaces for adding annotations to media items in accordance with some embodiments.
Figure 6B:
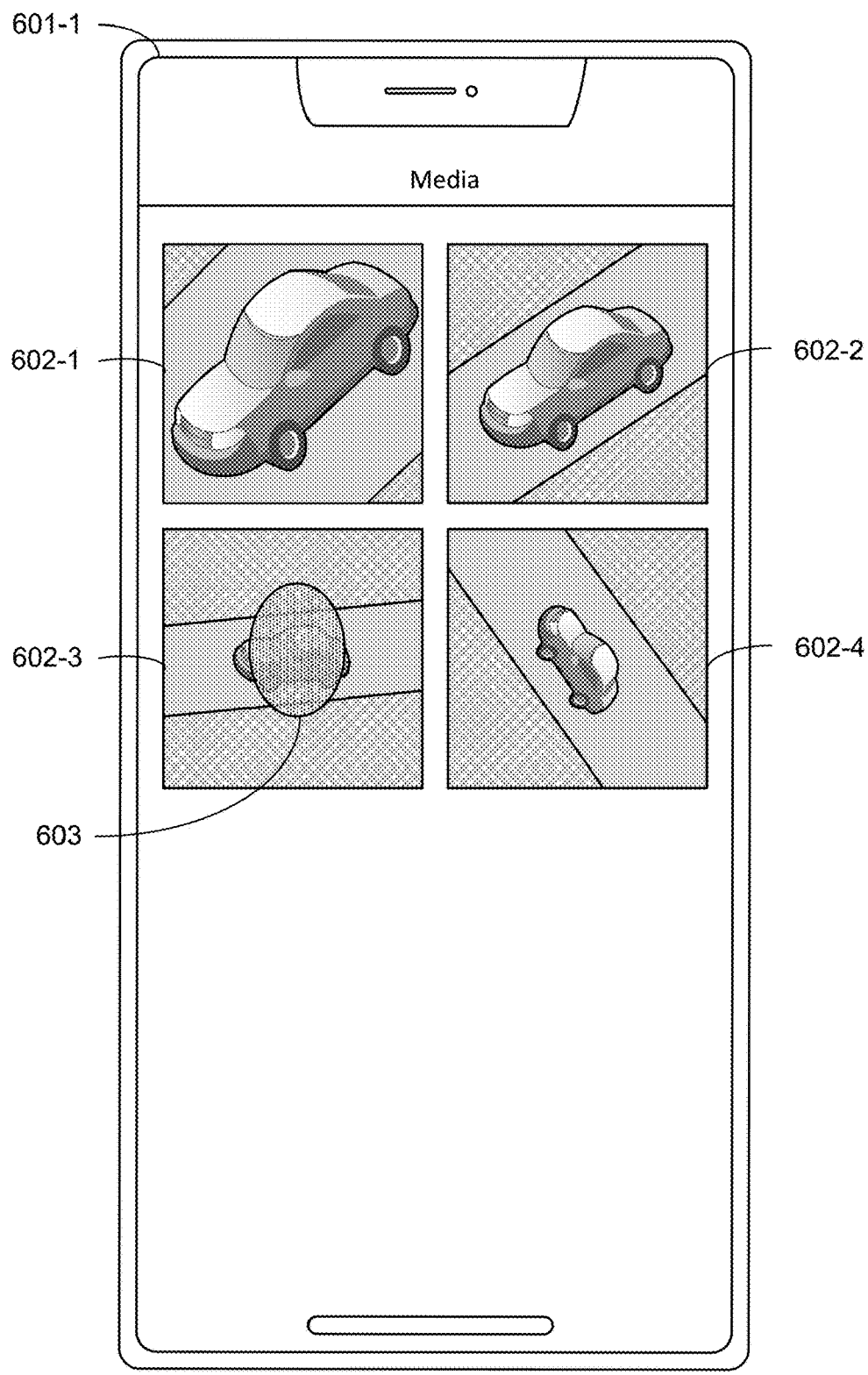
Figure 6C:
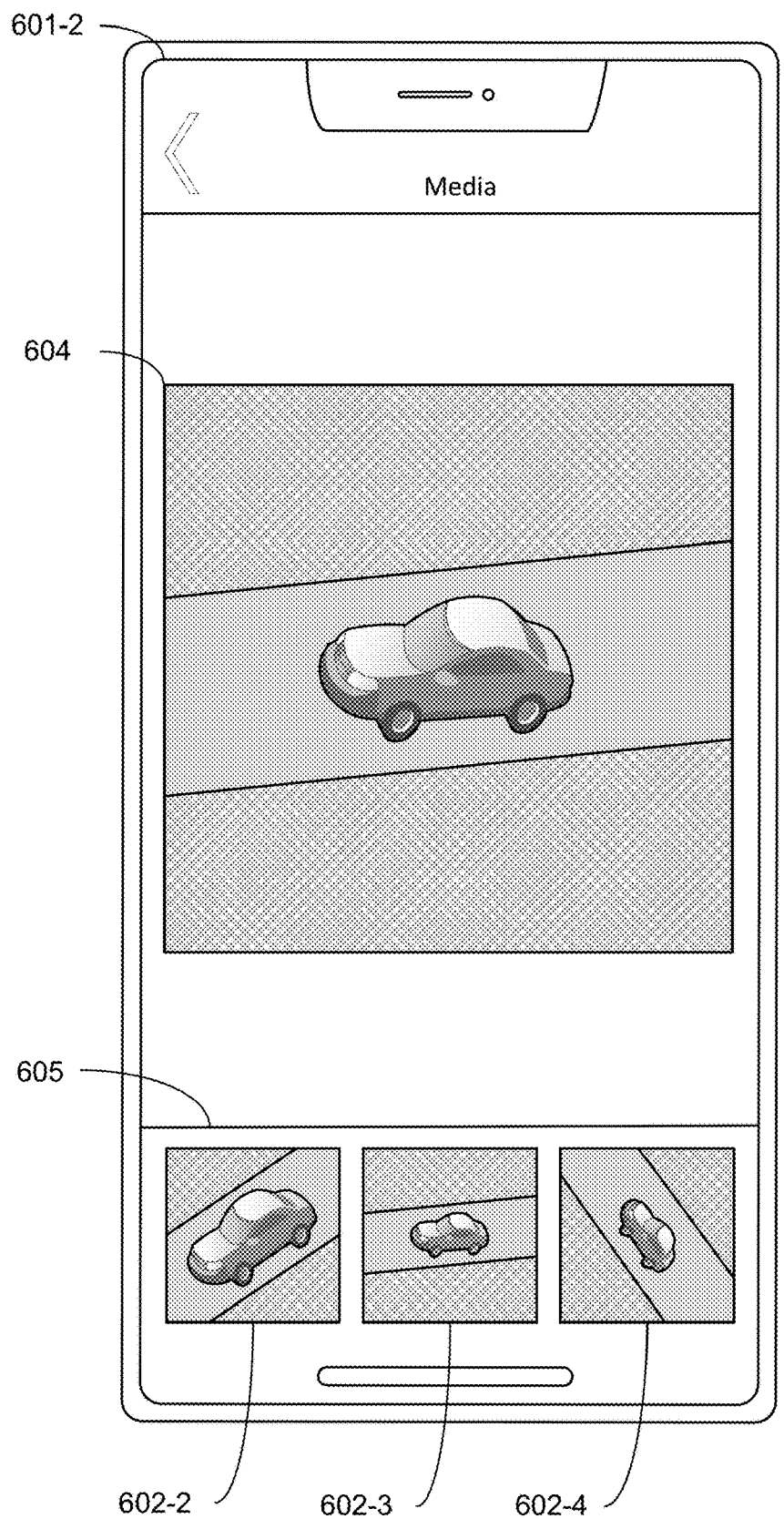
Figure 6D:
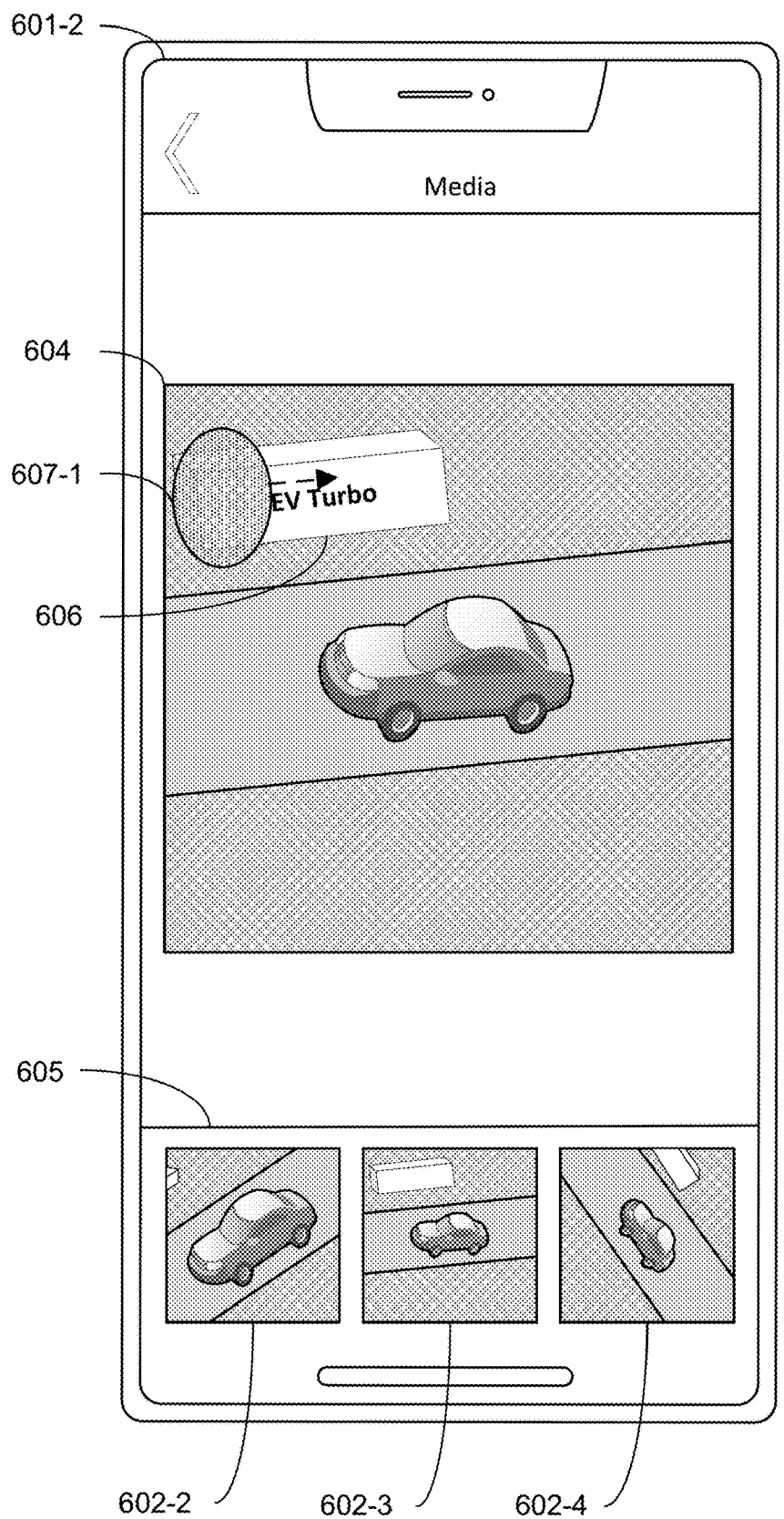
Figure 6E:
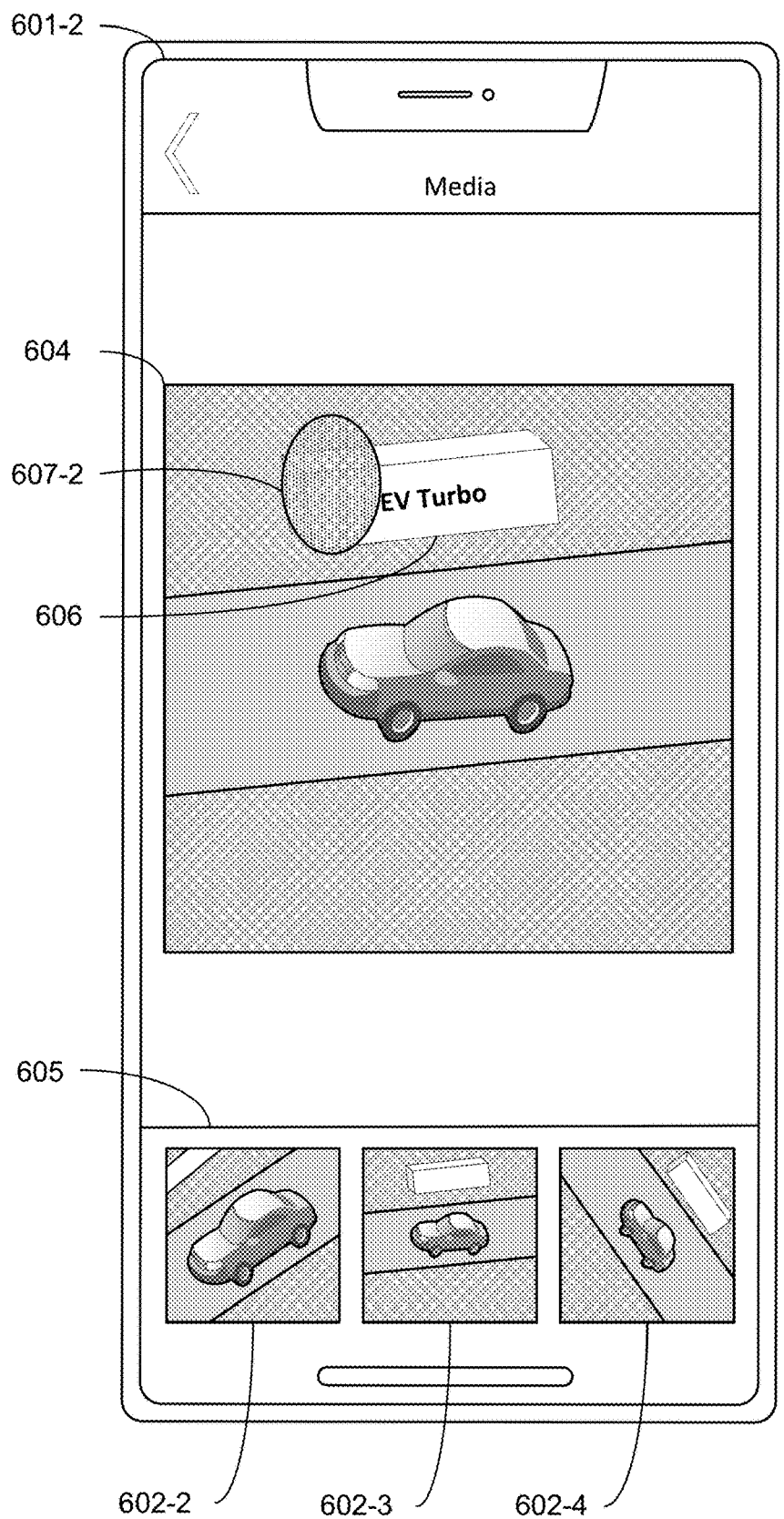
Figure 6F:
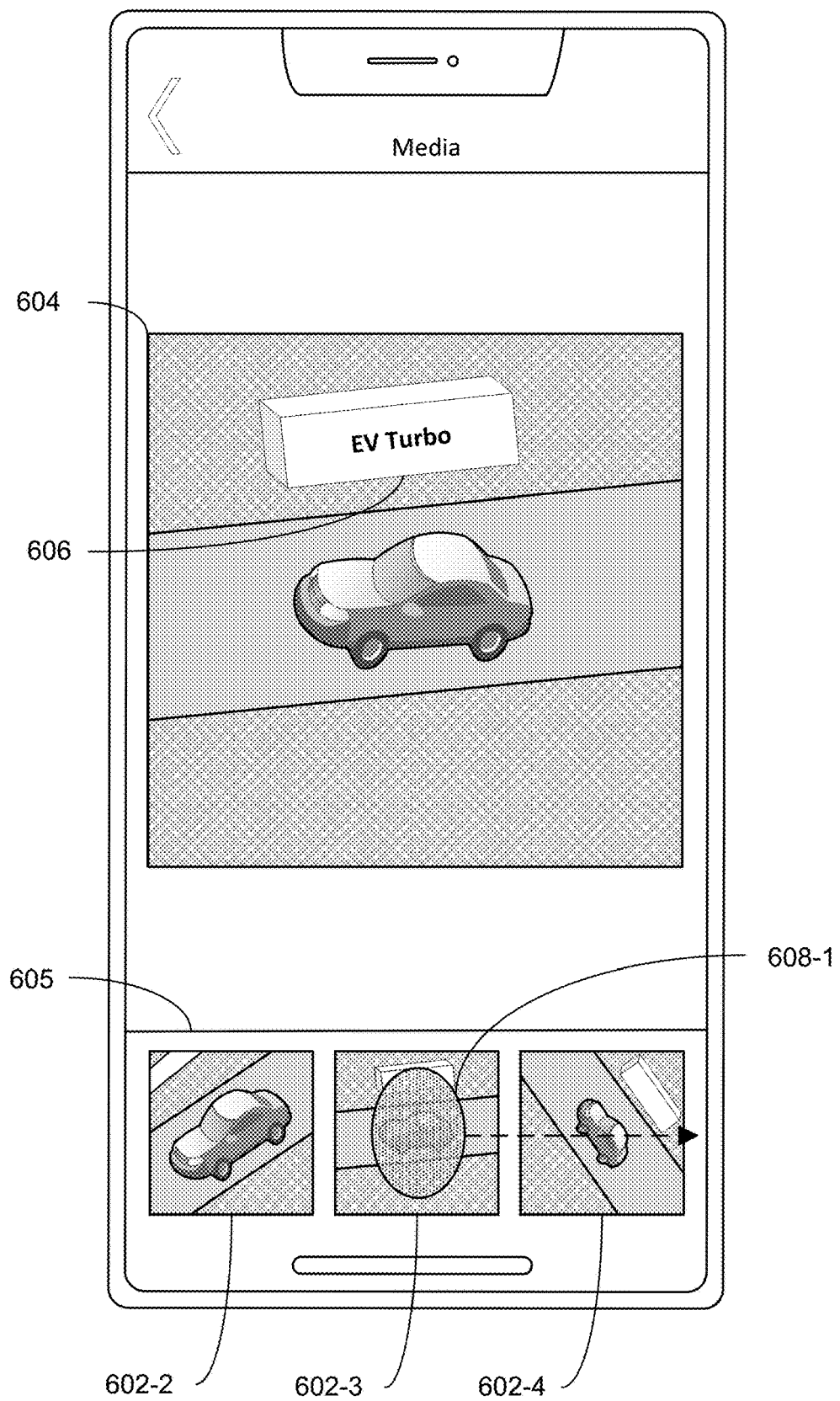
Figure 6G:
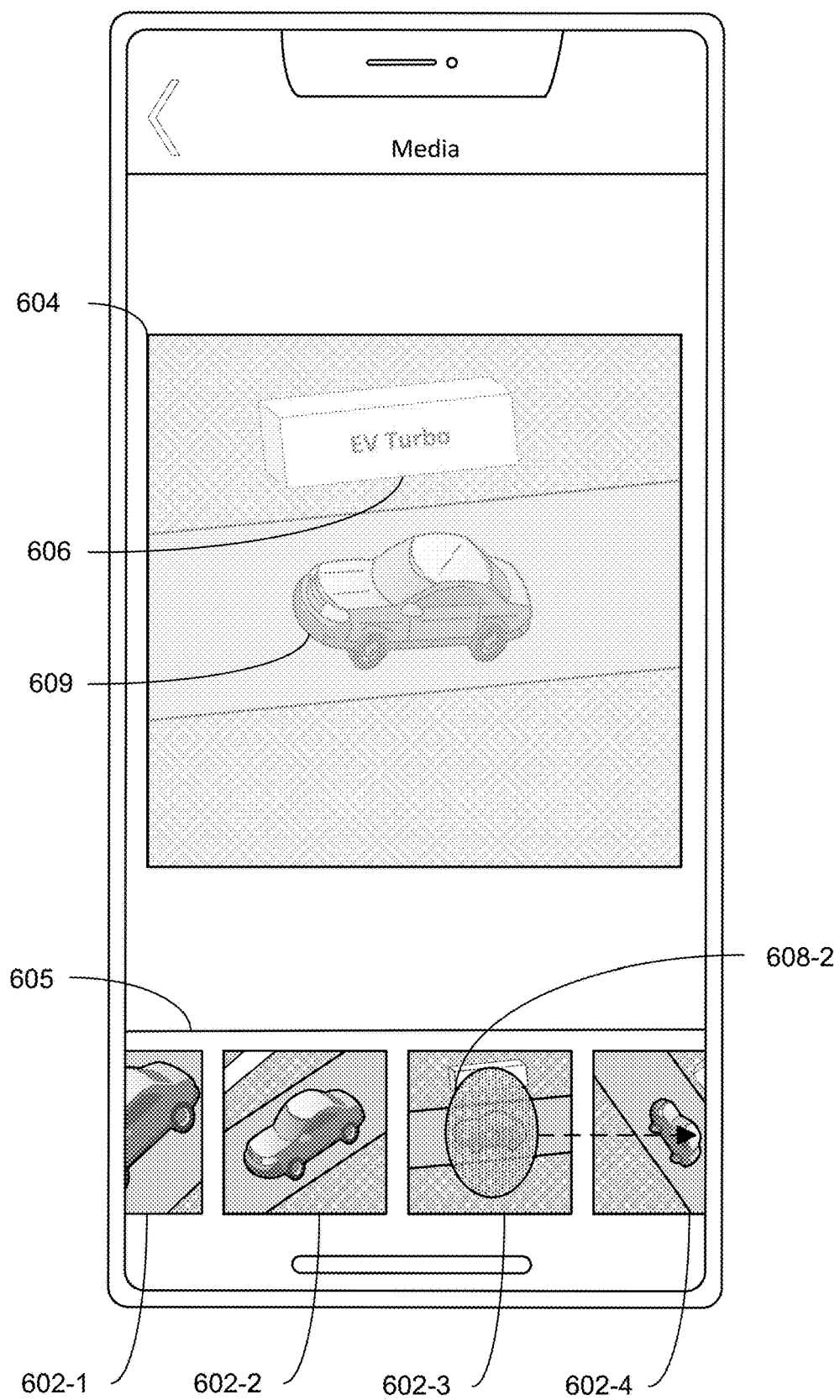
Figure 6H:
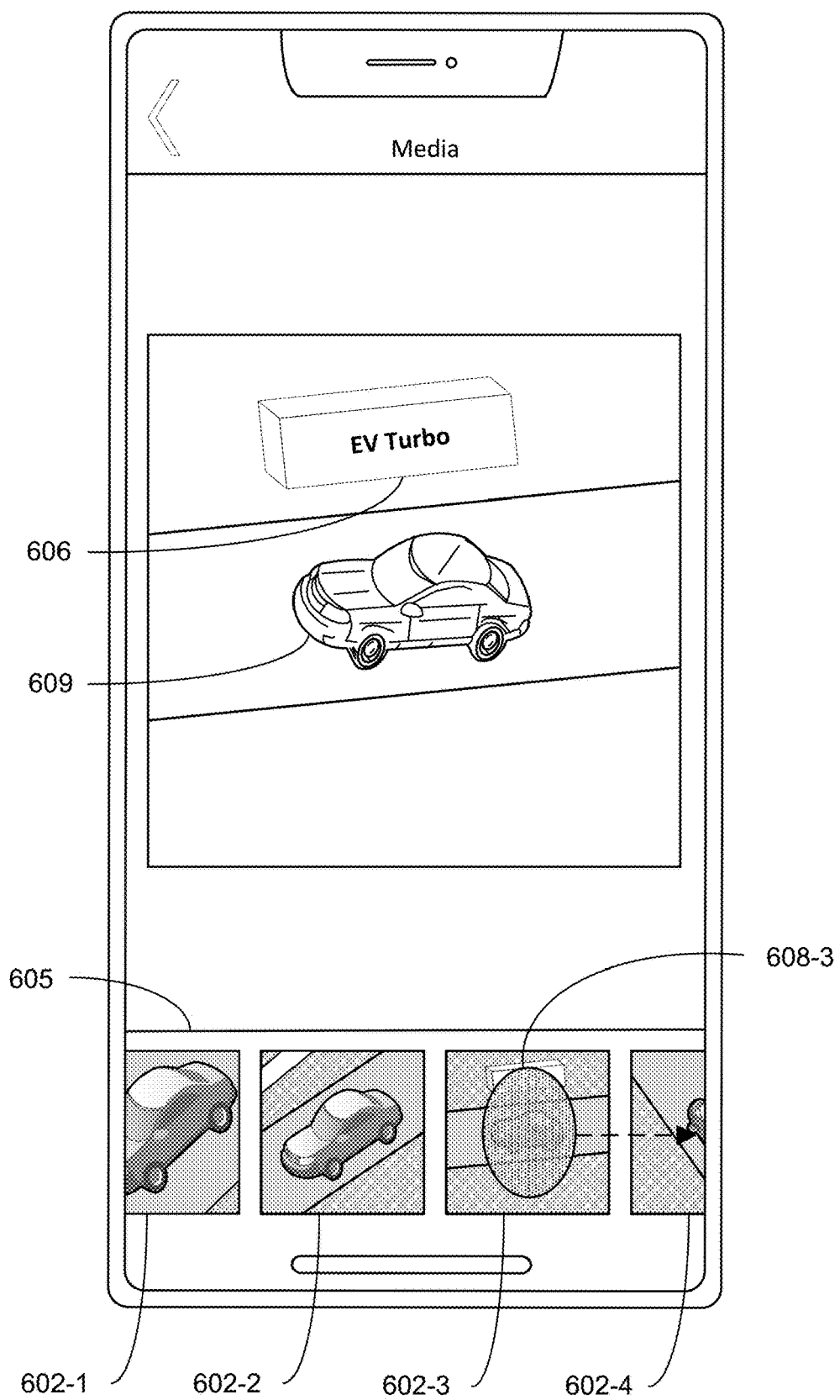
Figure 6I:
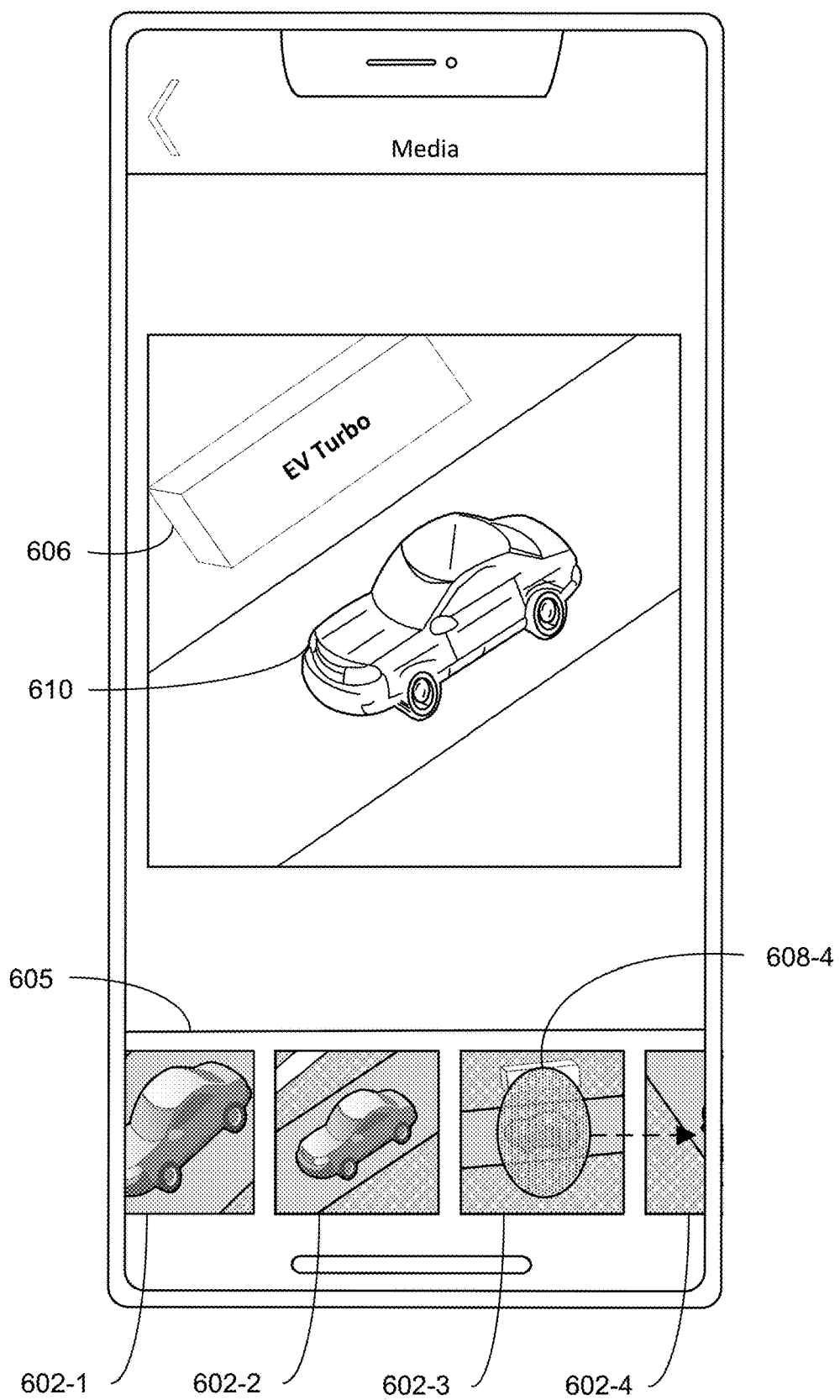
Figure 6J:
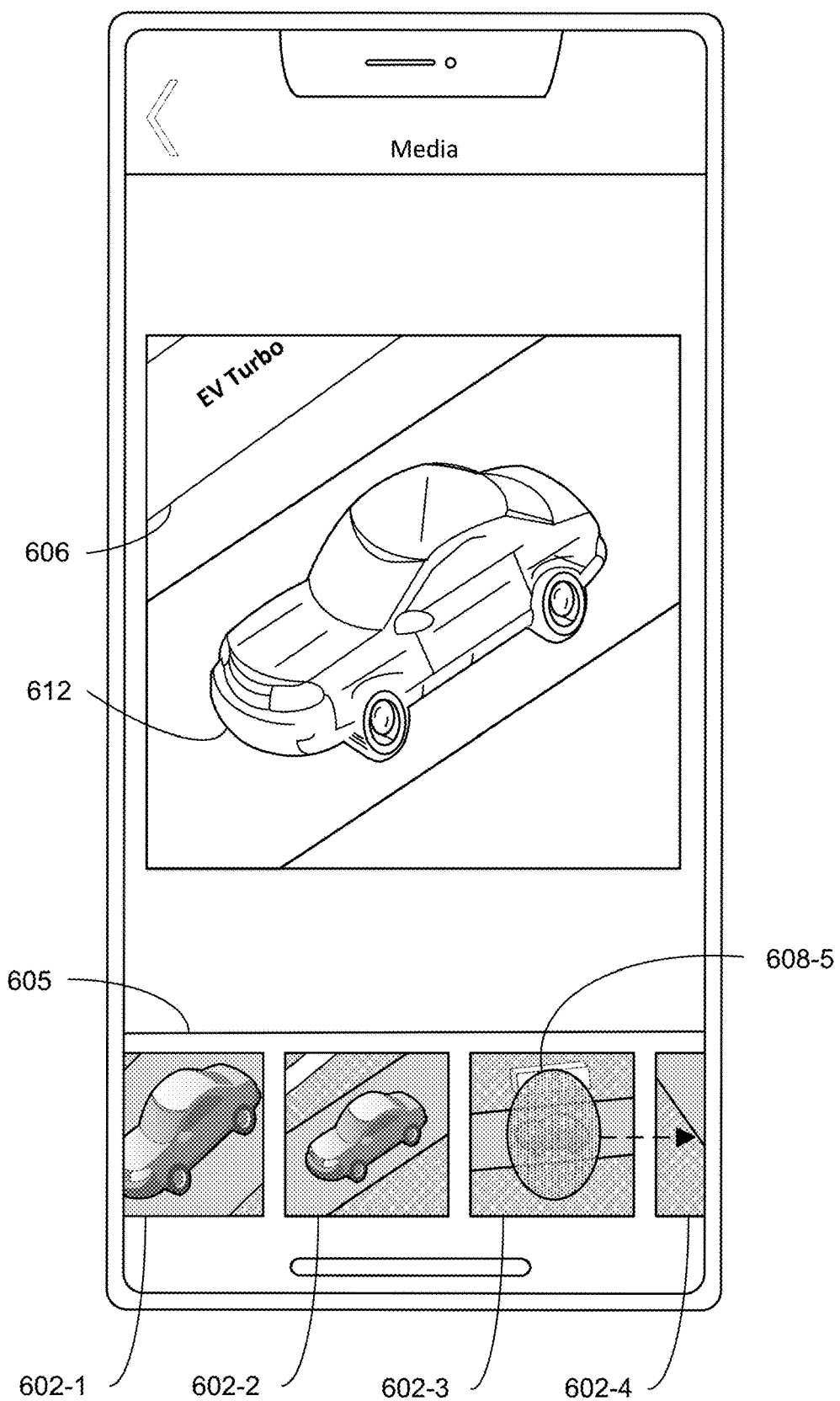
Figure 6K:
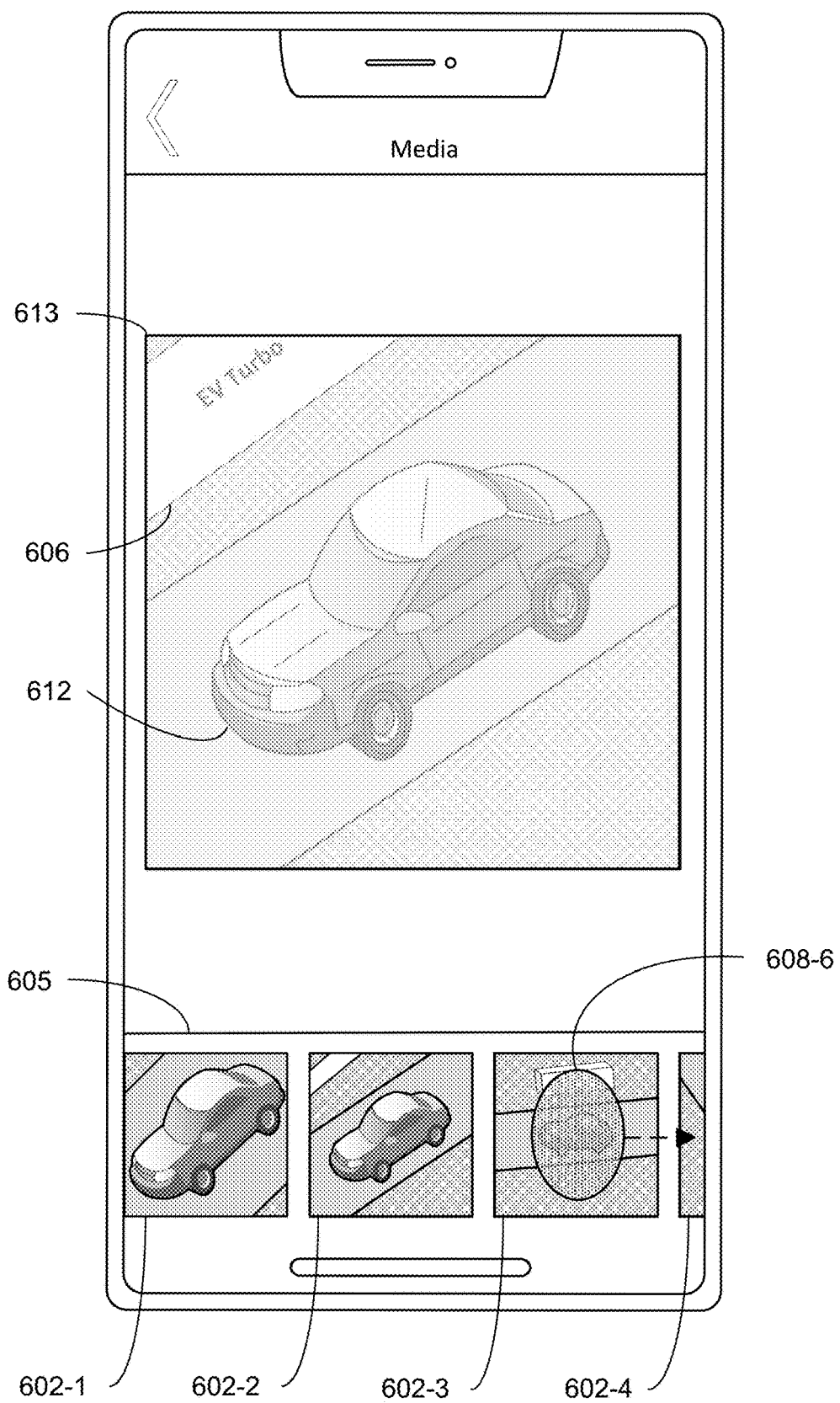
Figure 6L:
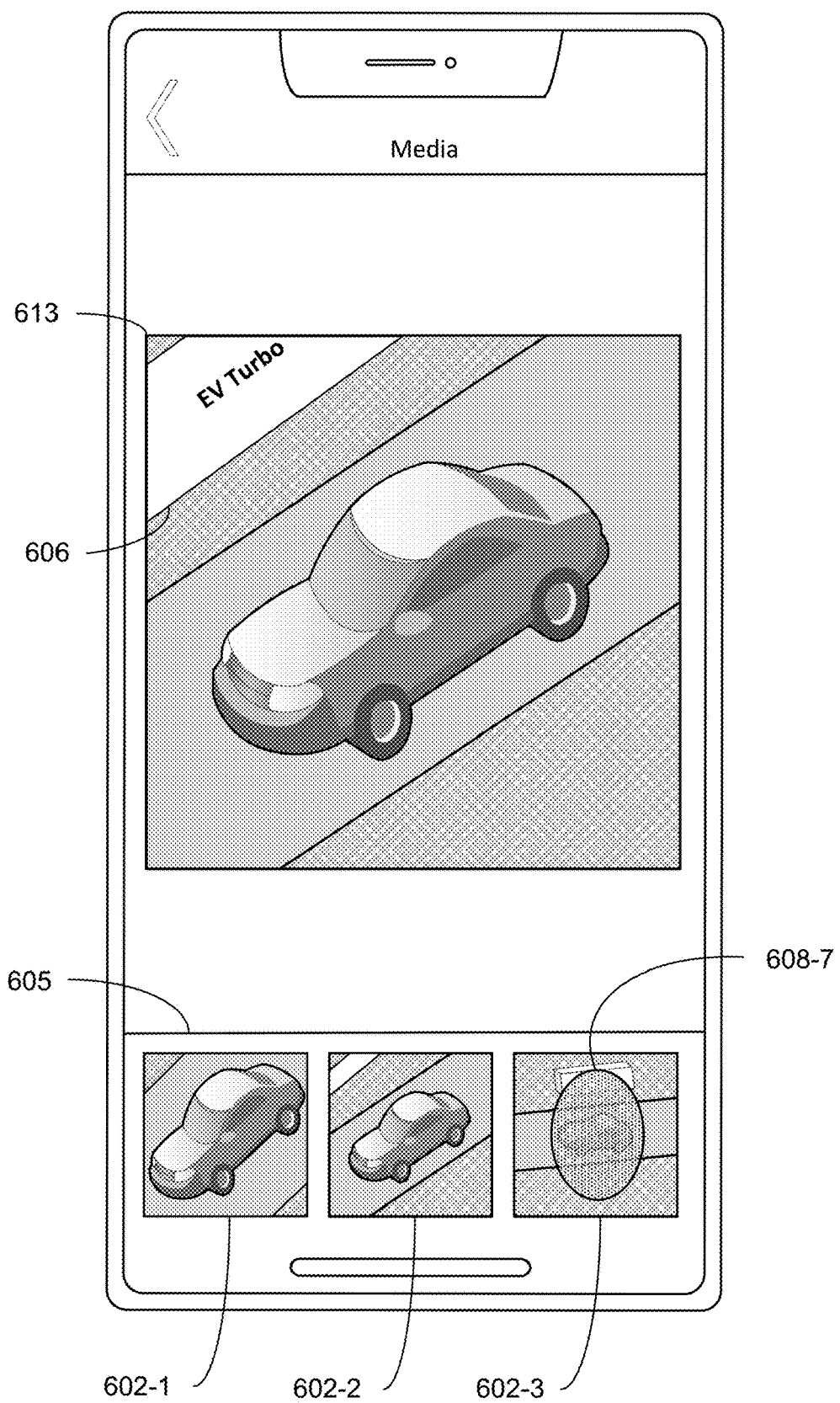
Figure 6M:
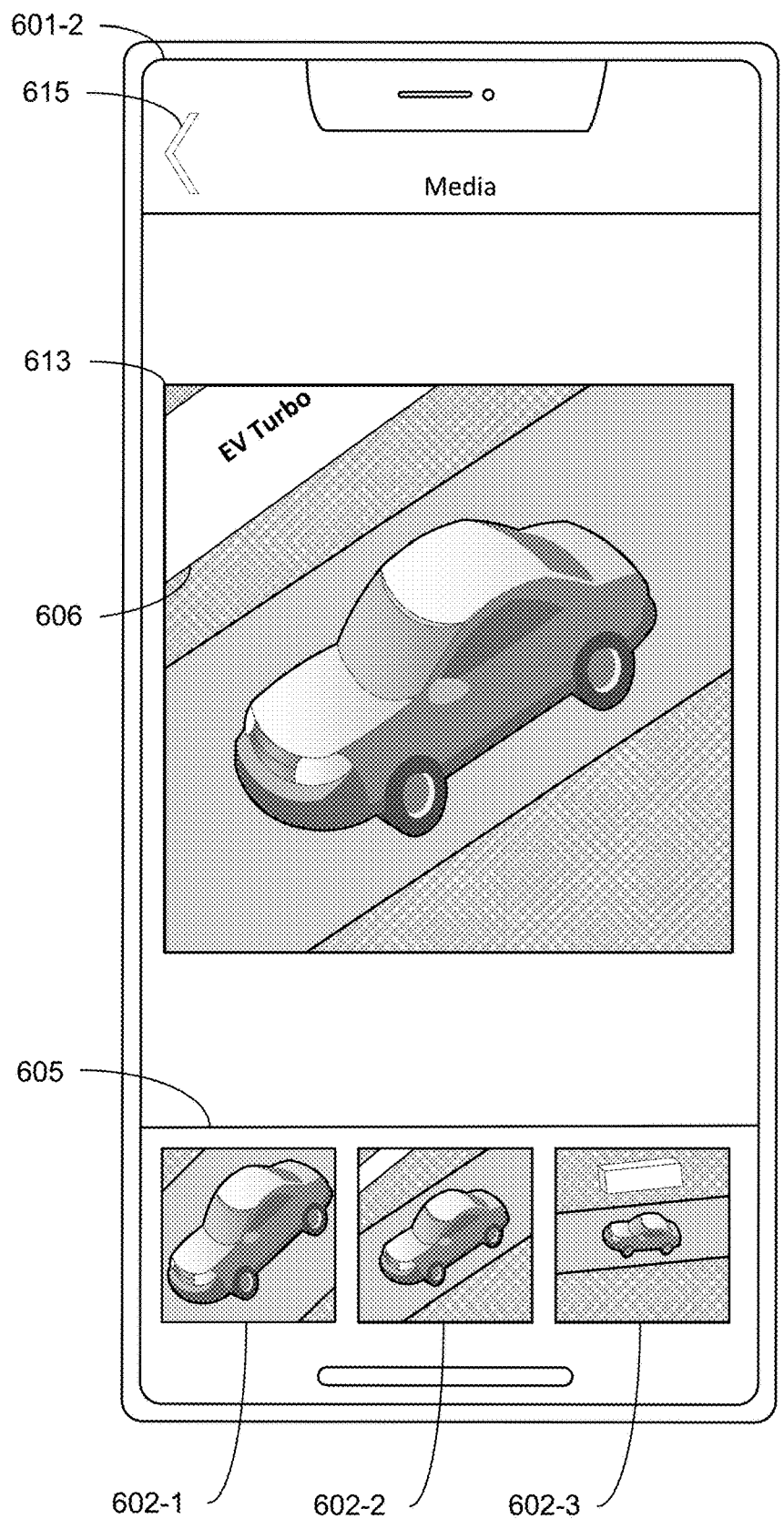
Figure 6N:
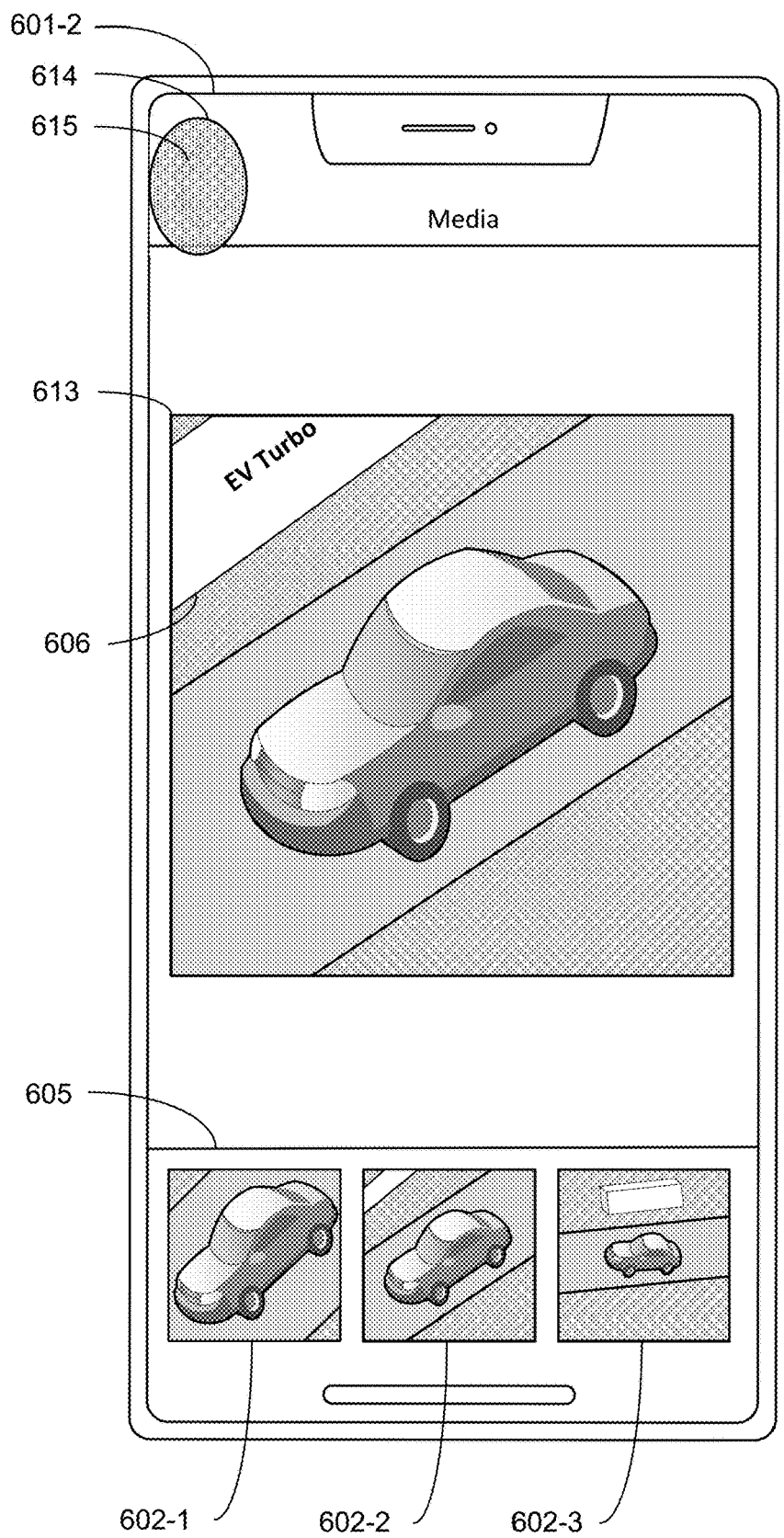
Figure 6O:
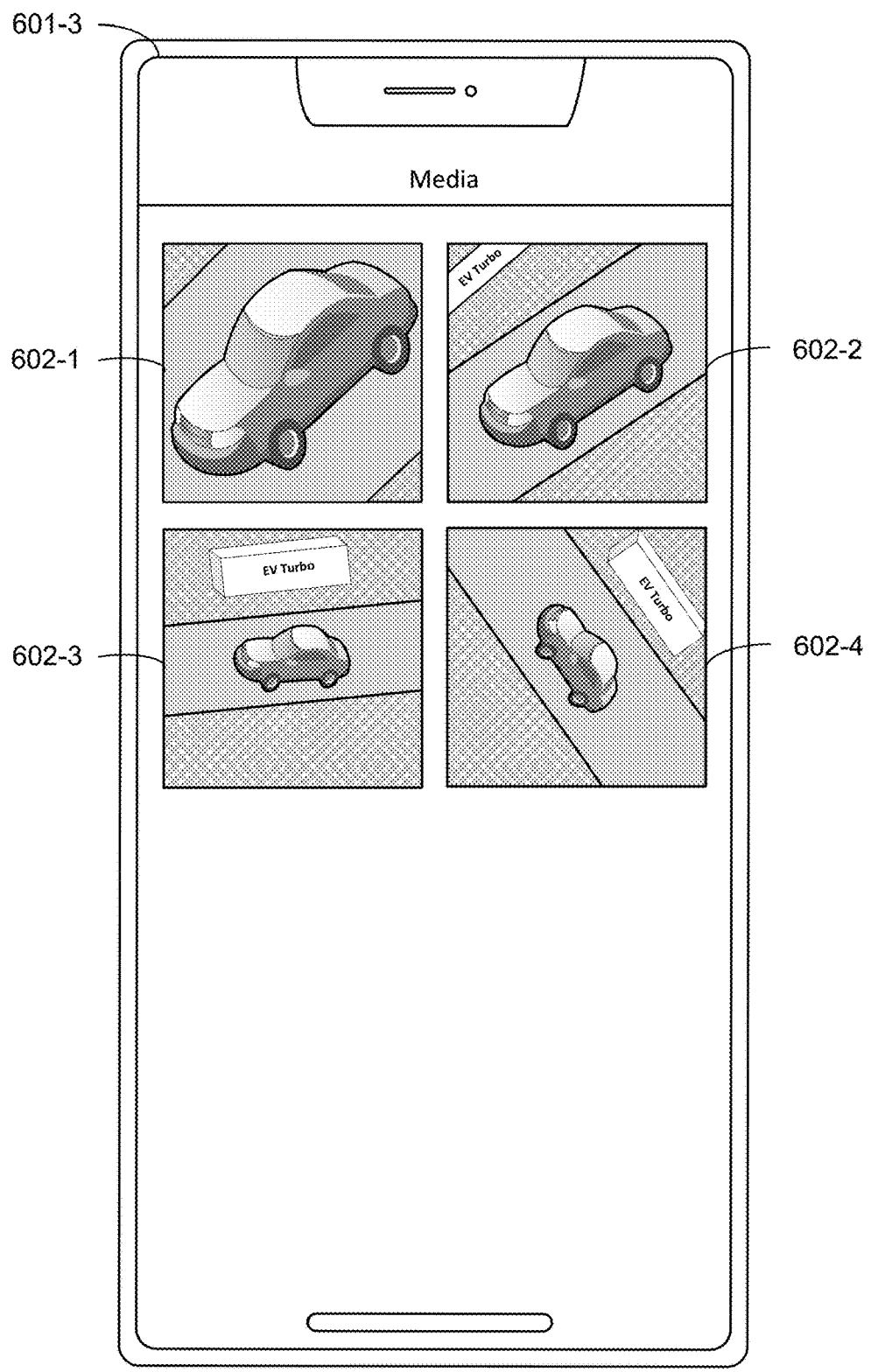
Figure 6P:
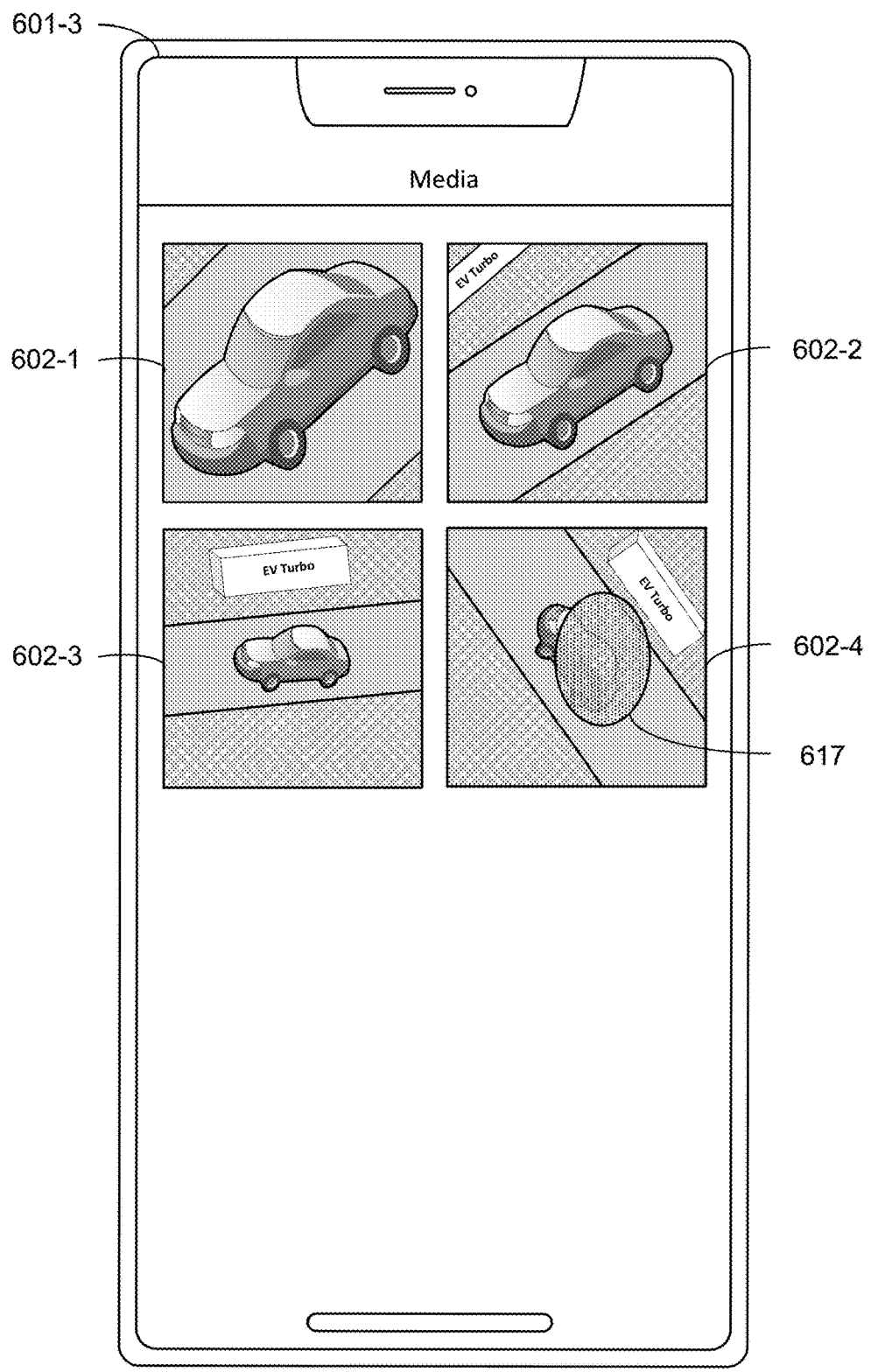
Figure 6Q:
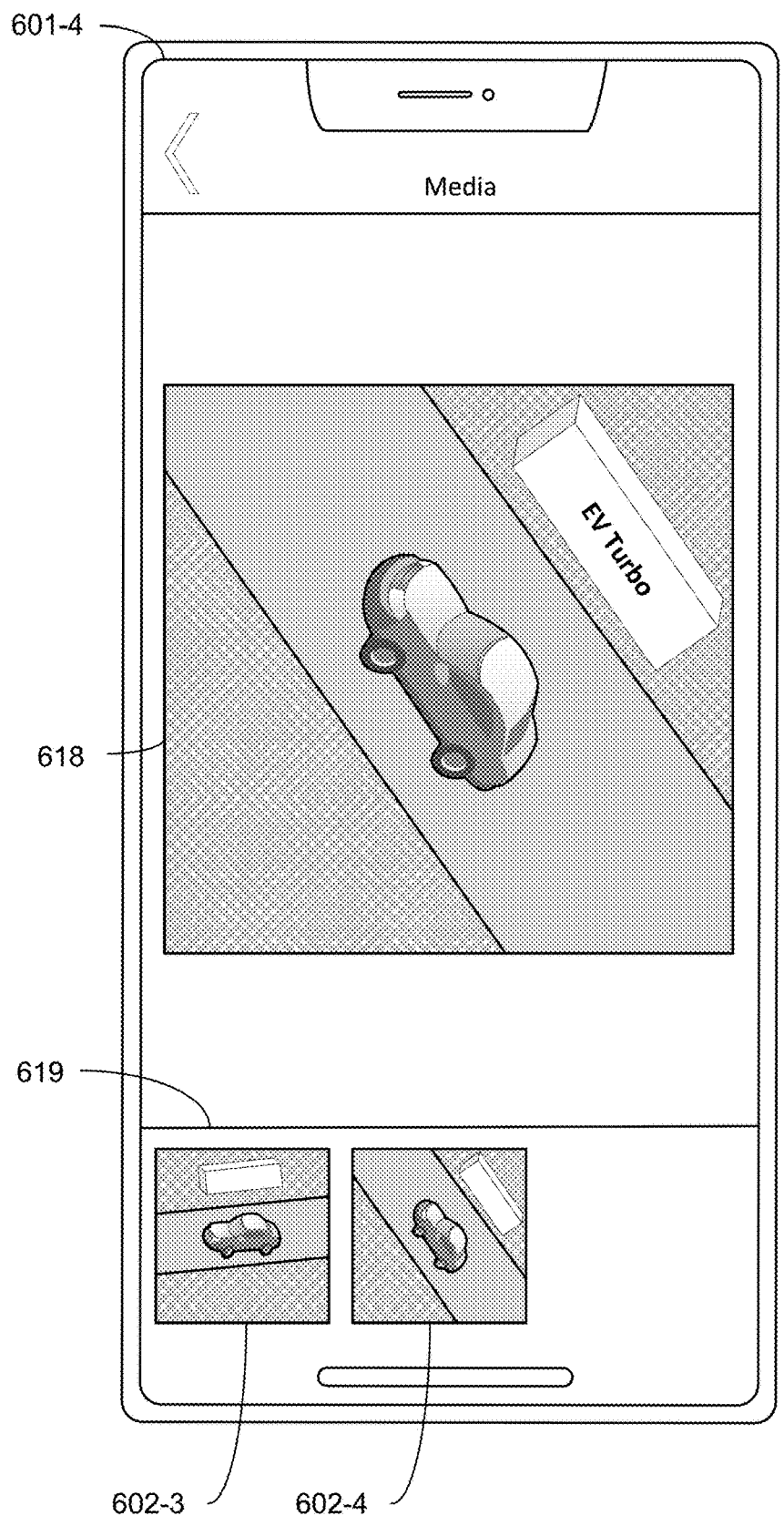
Figure 6R:
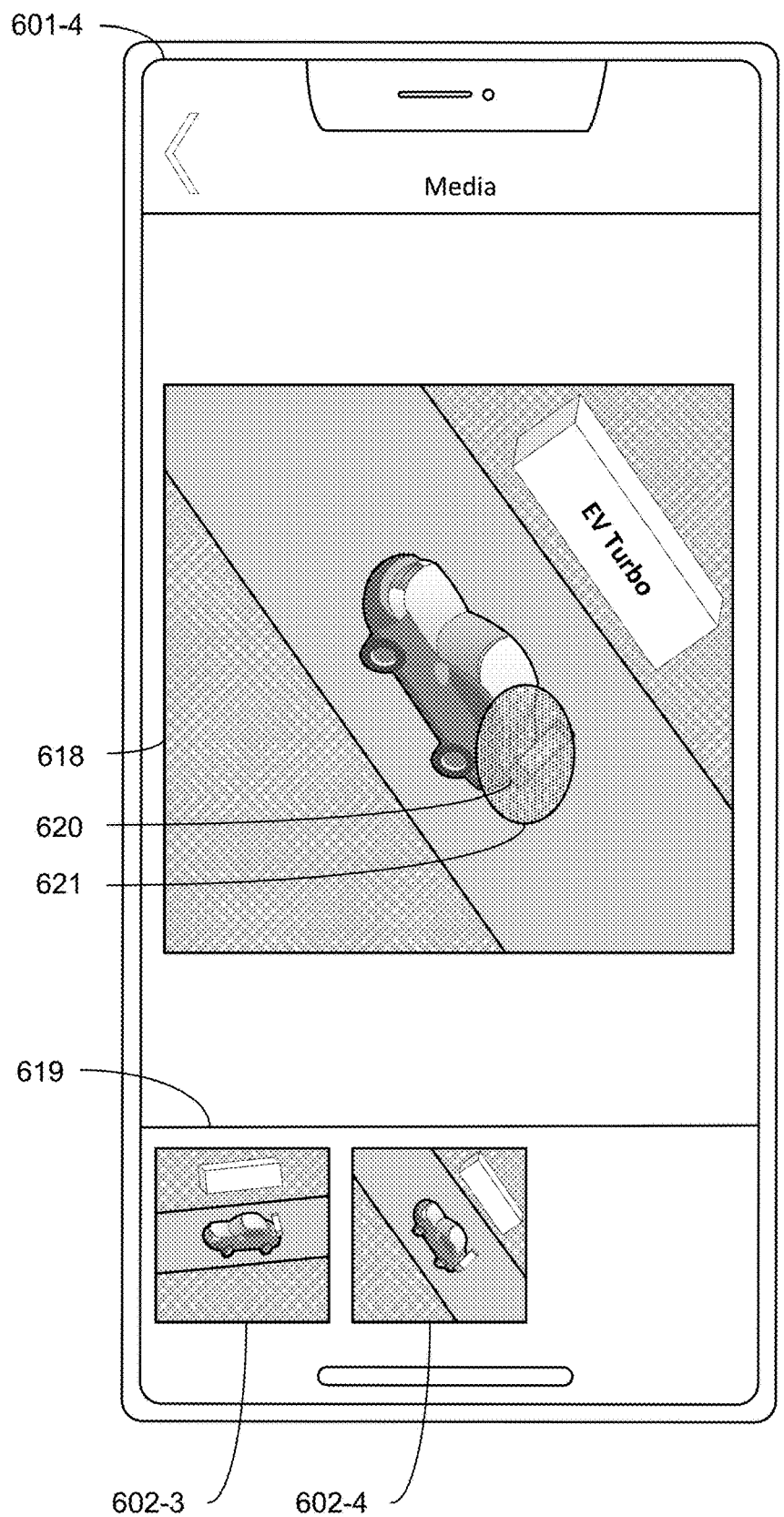
Figure 6S:
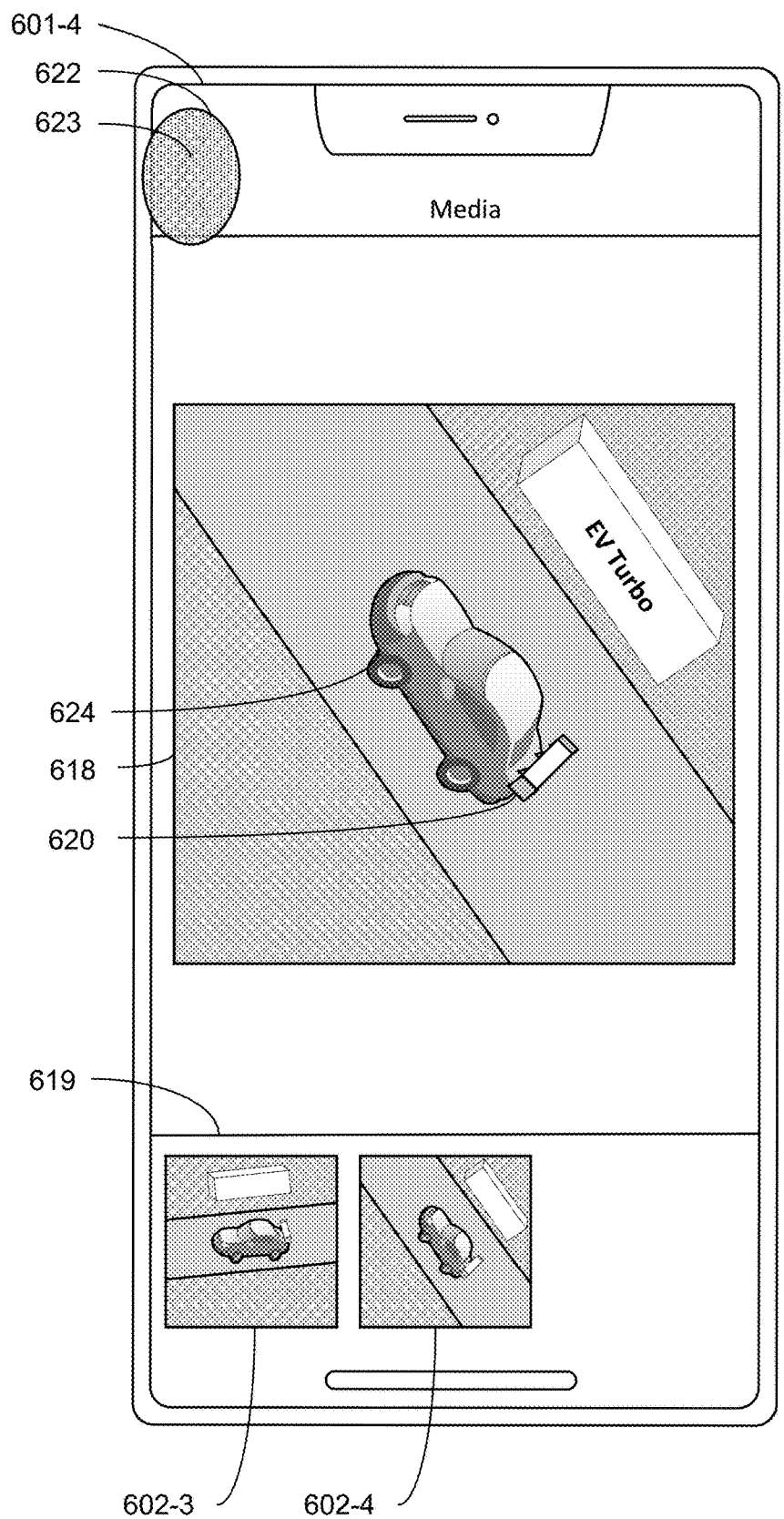
Figure 6T:
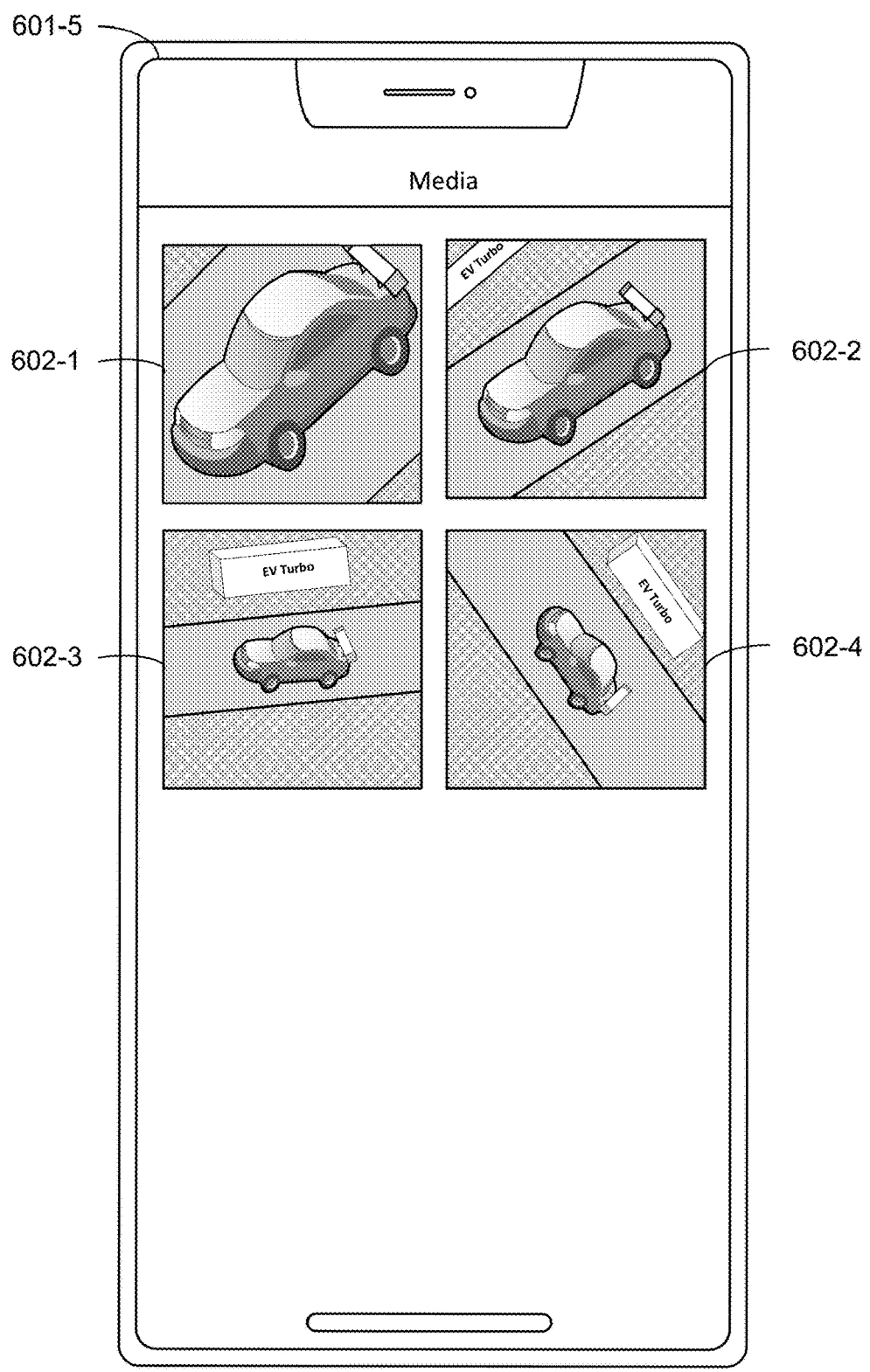

FIGS. 6A to 6T illustrate exemplary user interfaces that allow a user to insert a virtual object into a first representation of the real world. If the device detects that the first representation of the real world corresponds (e.g., portions of the other representations match the first representation) to other representations, then the virtual object will be placed in the corresponding other representations. Although the following photographs are of a vehicle, it should also be understood that the pictures shown could be photographs of the environment shown in the FIGS. 5A to 5LL.

FIG. 6A depicts illustrates a "Media" user interface 601-1 that includes four media thumbnail items: media thumbnail item 1 602-1, media thumbnail item 2 602-2, media thumbnail item 3 602-3, and media thumbnail item 4 602-4. These media thumbnail items can represent photographs, photographs with live content (e.g., a LIVE PHOTO, which is a registered trademark of APPLE INC. of Cupertino, Calif.), a video, or a Graphics Interchange Format ("GIF"). In this example the media thumbnail items are of a representation of a car 624.

FIG. 6B shows an input 603 over the media thumbnail item 3 602-3 depicted in the "Media" user interface 601-1. FIG. 6C shows the response to the input 603 over the media thumbnail item 3 602-3. FIG. 6C shows another "Media" user interface 601-2 that shows an expanded media item 604 that corresponds to the media thumbnail item 3 602-3 depicted in the "Media" user interface 601-1. In addition, FIG. 6C also shows a media thumbnail scrubber 605 that contains media thumbnail item 2 602-2, media thumbnail item 3 602-3, and media thumbnail item 4 602-4. The thumbnail displayed in the center of the media thumbnail scrubber 605 signifies which thumbnail item 602 corresponds to the expanded media item 604 being displayed. Media thumbnail items shown in the media thumbnail scrubber 605 can be scrolled through and/or clicked on to change between the media items being displayed as the expanded media item 604.

FIG. 6D shows an annotation 606 that states "EV Turbo" being added to the expanded media item 604 by an input 607-1. Without receiving liftoff of the input 607, the media thumbnail item 2 602-2, media thumbnail item 3 602-3, and media thumbnail item 4 602-4 depicted in the media thumbnail scrubber 605 are updated to display the annotation 606 that states "EV Turbo" that was added to the expanded media item 604. FIG. 6D also shows that the input 607-1 is a dragging input in the substantially rightward direction.

FIG. 6E shows the input 607-1 continuing to a second input position 607-2. In response to this change in position of this dragging input (607-1 to 607-2) the annotation 606 that states "EV Turbo" moves to a second location within the expanded media item 604. Additionally, without receiving liftoff of the input 607, the media thumbnail item 2 602-2, media thumbnail item 3 602-3, and media thumbnail item 4 602-4 depicted in the media thumbnail scrubber 605 are updated to display the annotation 606 that states "EV Turbo" at a second location that corresponds to the second location in the expanded media item 604.

FIGS. 6F to 6M show exemplary user interface when switching between different media items. In some embodiments, when media items are switched, a transitional representation of the three-dimensional model of the physical environment illustrating the change in orientation is displayed. Such an interaction allows a user to see how the media items relate to each other in three dimensional space.

FIG. 6F shows a dragging input 608 at position 608-1 beginning over the media thumbnail item 3 602-3 depicted in the media thumbnail scrubber 605. The dragging input moves in the rightward direction and pulls the media thumbnail items in the rightward direction. As the media thumbnail items are moved in the rightward direction, portions of the media thumbnail items are ceased to be displayed, and new portions of non-displayed media thumbnail items come into view.

FIG. 6G shows dragging input 608 continuing to position 608-2. As the position changes, the expanded media item 604 begins to fade out, and a representation of an underlying three-dimensional model of the physical environment of the expanded media item 609 begins to fade in. In some embodiments, the representation of the three-dimensional model of the physical environment of the expanded media item 609 is based on an unstructured three-dimensional model of the physical environment that can approximate any geometric shape using a combination of two-dimensional cell types (e.g., a triangle and/or quadrangles). In some embodiments, three-dimensional cell types are used (e.g., tetrahedron, hexahedrons, pyramids, and/or wedges). As the dragging input occurs the scrubber 605 is scrolled through, and media thumbnail item 602-1 begins to appear, and media thumbnail item 602-4 begins to disappear.

FIG. 6H shows dragging input 608 continuing to position 608-3. As the position changes the expanded media item 604 completely fades out, and the representation of the three-dimensional model of the physical environment of the expanded media item 609 completely fades in. As the dragging input 608 occurs, the scrubber 605 is scrolled through, and additional portions of media thumbnail item 602-1 are displayed, while less of (or fewer portions of) media thumbnail item 602-4 are displayed.

FIG. 6I shows dragging input 608 continuing to position 608-4. As the position changes, an intermediary representation of a three-dimensional model of the physical environment 610 is displayed. This intermediary representation of the three-dimensional model of the physical environment 610 illustrates that the media item's perspective changes as another media item begins to be displayed. In some embodiments, the intermediary representation of the three-dimensional model of the physical environment 610 is an unstructured three-dimensional model that can approximate any geometric shape using a combination of two-dimensional cell types (e.g., a triangle and/or quadrangles). In some embodiments, three-dimensional cell types are used (e.g., tetrahedron, hexahedrons, pyramids, and/or wedges). As the dragging input 608 progresses, the scrubber 605 is scrolled, more of media thumbnail item 602-1 is displayed, and less of media thumbnail item 602-4 is displayed.

FIG. 6J shows dragging input 608 continuing to position 608-5. As the position changes the intermediary representation of the three-dimensional model of the physical environment 610 is no longer displayed, and another representation of the three-dimensional model of the physical environment of the other expanded media item 612 is displayed. In this example, the other expanded media item corresponds to the media thumbnail item 2 602-2. In some embodiments, the other representation of the three-dimensional model of the physical environment of the other expanded media item 612 is an unstructured three-dimensional model that can approximate any geometric shape using a combination of two-dimensional cell types (e.g., a triangle and/or quadrangles). In some embodiments, three-dimensional cell types are used (e.g., tetrahedron, hexahedrons, pyramids, and/or wedges). As the dragging input 608 progresses, the scrubber 605 is scrolled, more of media thumbnail item 602-1 is displayed, and less of media thumbnail item 602-4 is displayed.

FIG. 6K shows dragging input 608 continuing to position 608-6. As the position changes the other representation of the three-dimensional model of the physical environment of the other expanded media item 612 begins to fade out, and the other expanded media item 613 that corresponds to the media thumbnail item 2 602-2 begins to fade in. As the dragging input 608 progresses, the scrubber 605 is scrolled, more of media thumbnail item 602-1 is displayed, and less of media thumbnail item 602-4 is displayed.

FIG. 6L shows dragging input 608 continuing to position 608-7. As the position changes the other expanded media item 613 completely fades in, and the representation of the three-dimensional model of the physical environment of the expanded media item 612 completely fades out. FIG. 6M shows the dragging input 608 no longer being displayed and the other expanded media item 613 completely faded in. As the dragging input 608 comes to an end, the scrubber 605 stops scrolling, media thumbnail item 602-1 is fully displayed, and media thumbnail item 602-4 is no longer disappear at all in the scrubber.

FIG. 6N shows an input 614 over a back button 615 located within the other "Media" user interface 601-2. FIG. 6O shows that, in response to receiving the input 614 over a back button 615, a "Media" user interface 601-3 is displayed.

FIGS. 6P to 6T show another virtual object being added to an expanded media item 616 that corresponds with media thumbnail item 4 602-4. These Figures show that any one of the media items can have annotations added to them, and have those annotations be shown in the other associated media items.

FIG. 6P shows an input 617 over the media thumbnail item 4 602-4. Figure Q shows that in response to receiving the input 617 over the media thumbnail item 4 602-4, a "Media" user interface 601-4 is displayed. FIG. 6Q shows the response to the input 617 over the media thumbnail item 4 602-4. FIG. 6Q shows a "Media" user interface 601-4 that includes an expanded media item 618 that corresponds to the media thumbnail item 3 602-4 depicted in the "Media" user interface 601-3 (FIG. 6P). In addition, FIG. 6Q also shows a media thumbnail scrubber 619 that contains media thumbnail item 3 602-3 and media thumbnail item 4 602-4. The thumbnail displayed in the center of the media thumbnail scrubber 619, signifies that the corresponding expanded media item is being displayed. These media thumbnail items shown in the media thumbnail scrubber 619, can be scrolled through and/or clicked on to change between the media items.

FIG. 6R shows a wing element (e.g., spoiler) annotation 620 added to the car 624 by an input 621. Without receiving liftoff of the input 621, the item 3 602-3 and media thumbnail item 4 602-4 depicted in the media thumbnail scrubber 619 are updated to display the wing element annotation 620 that was added to the expanded media item 618.

FIG. 6S shows the wing element (e.g., spoiler) annotation 620 added to the car 624, and also shows an input 622 over a back button 623 located within the "Media" user interface 601-3. FIG. 6T shows that in response to receiving the input 622 over the back button 623, the "Media" user interface 601-5 is displayed. Within the "Media user interface 601-5, media thumbnail item 1 602-1, media thumbnail item 2 602-2, media thumbnail item 3 602-3, and media thumbnail item 4 602-4 all contain the wing element (e.g., spoiler) annotation 620.

FIGS. 7A-7B are flow diagrams illustrating method 700 of providing different views of a physical environment in accordance with some embodiments. Method 700 is performed at a computer system (e.g., portable multifunction device 100 (FIG. 1A), device 300 (FIG. 3A), or computer system 301 (FIG. 3B)) with a display generation component (e.g., touch screen 112 (FIG. 1A), display 340 (FIG. 3A), or display generation component(s) 304 (FIG. 3B)), an input device (e.g., of one or more input devices) (e.g., touch screen 112 (FIG. 1A), touchpad 355 (FIG. 3A), input device(s) 302 (FIG. 3B), or a physical button that is separate from the display), and one or more cameras (e.g., optical sensor(s) 164 (FIG. 1A) or camera(s) 305 (FIG. 3B)) that are in a physical environment (the one or more cameras optionally including or in communication with one or more depth sensors such as time-of-flight sensor 220 (FIG. 2B)) (702). Some operations in method 700 are, optionally, combined and/or the order of some operations is, optionally, changed.

As described below, method 700 describes user interfaces and interactions that occur after capturing, via the one or more cameras, a representation of the physical environment. The user interface displayed after capturing the representation of the physical environment includes an activatable user interface element for displaying the captured physical environment in an orthographic view. The activatable user interface element provides a simple control for manipulating the view of the representation of the physical environment, and does not require the user to make multiple inputs to achieve an orthographic view. Reducing the number of inputs needed to view the representation of the physical environment in an orthographic view enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The method includes capturing (704), via the one or more cameras, and optionally one or more depth sensors, a representation of the physical environment, including updating the representation to include representations of respective portions of the physical environment that are in (e.g., that enter) a field of view of the one or more cameras as the field of view of the one or more cameras moves; In some embodiments, the representation includes depth data corresponding to a simulated three-dimensional model of the physical environment. In some embodiments, the capturing is performed in response to activation of a capture affordance.

The method also includes, after capturing the representation of the physical environment, displaying (706) a user interface that includes an activatable user interface element for requesting display of a first orthographic view (e.g., a front orthographic view, also called a front elevation view) of the physical environment; and in some embodiments, the front orthographic view of the physical environment is a two-dimensional representation of the physical environment in which the physical environment is projected onto a plane positioned in front of (e.g., and parallel to the front plane of) the physical environment (e.g., the frontal plane of a person standing and looking directly forward at the physical environment, which is shown in FIGS. 5E, 5EE, and 5FF). In some embodiments, the front orthographic view is neither an isometric view nor a perspective view of the physical environment. In some embodiments, the front orthographic view of the physical environment is distinct from one or more (e.g., any) views of the physical environment that any one of the one or more cameras had during the capturing.

The method also includes receiving (708), via the input device, a user input corresponding to the activatable user interface element (e.g., control region 525 in FIG. 5C-1) for requesting display of a first orthographic view of the physical environment; and in response to receiving the user input, displaying (710) the first orthographic view of the physical environment based on the captured representation of the one or more portions of the physical environment.

In some embodiments, the first orthographic view of the physical environment based on the captured representation of the one or more portions of the physical environment is a simplified orthographic view, where the simplified orthographic view simplifies an appearance of the representation of the one or more portions of the physical environment (712). In some embodiments, when physical items within the captured representation of the one or more portions of the physical environment are below a certain size threshold, the simplified orthographic view removes those physical items from the representations of the one or more portions of the physical environment (e.g., a wall with hanging pictures that disappear when viewed in the simplified orthographic view). In some embodiments, when physical items are identified items (e.g., appliances, and furniture (e.g., wooden table 511, and floor lamp 508)), the computer system replaces the physical item in the physical environment with simplified representation of the physical item (e.g., a physical refrigerator is replaced with a simplified refrigerator (e.g., a smoothed refrigerator with only the minimum amount of features so as to identify it as a refrigerator). See, e.g., wooden table 511 in FIG. 5B and simplified wooden table 511 in FIG. 5GG. Automatically displaying a simplified orthographic view that simplifies the appearance of the representation of the one or more portions of the physical environment, provides a user the ability to quickly identify which representations of physical items they are interacting with. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, identifying (714) one or more walls, one or more floors, and/or one or more ceilings in the physical environment (e.g., in combination with capturing the representation of the physical environment, or after capturing the representation of the physical environment), and edges of features of the physical environment. The first orthographic view of the physical environment includes representations of the identified one or more walls, floors, ceilings, and features, represented by lines of projection that are displayed perpendicular to the identified one or more walls, floors, ceilings, and features (e.g., the user interfaces shown in FIGS. 5EE-5HH). In some embodiments, a wall, floor, or ceiling is identified based at least in part on a determination that a physical object in the physical environment exceeds a predefined size threshold (e.g., so as to not confuse smaller planar surfaces, such as tables, with walls, floors, and ceilings). Automatically identifying one or more walls, one or more floors, and/or one or more ceilings in the physical environment, and automatically aligning the one or more walls, one or more floors, and/or one or more ceilings in the physical environment when the first orthographic view is selected provides the user the ability to not have to identify walls, floors, or ceilings manually. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the first orthographic view is based on a first perspective (716). And, in some embodiments, after displaying the first orthographic view of the physical environment based on the captured representation of the one or more portions of the physical environment, receiving, via the input device, a second user input corresponding to a second activatable user interface element for requesting display of a second orthographic view of the physical environment (e.g., input 553 on control 525-2). In response to receiving the second user input (e.g., input 553 on control 525-2), displaying the second orthographic view of the physical environment based on the captured representation of the one or more portions of the physical environment (e.g., the top-down view in FIG. 5GG), wherein the second orthographic view is based on a second perspective (of the physical environment) that is distinct from the first perspective (of the physical environment). In some embodiments, where the first orthographic view is a front orthographic view (e.g., FIG. 5HH), the second orthographic view is a top orthographic view (e.g., FIG. 5GG), a side orthographic view (e.g., FIG. 5HH), or an isometric orthographic view (e.g., FIG. 5H). The user interface displayed after capturing the representation of the physical environment includes a second activatable user interface element for displaying the captured physical environment in another orthographic view. The second activatable user interface element provides a simple control for manipulating the view of the representation of the physical environment, and does not require the user to make multiple inputs to achieve an orthographic view. Reducing the number of inputs needed to view the representation of the physical environment in an orthographic view enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the captured representation of the field of view includes one or more edges (e.g., edges of representations of physical objects) that each form a respective (e.g., non-zero and in some embodiments oblique) angle with an edge of the captured representation of the field of view (e.g., due to perspective) (718). For example, because the user views the physical environment from an angle, lines in the user's field of view are not parallel; however, the orthographic projection shows a projection of the representation of the physical environment such that lines that appear to the user at an angle are parallel in the orthographic projection. And, the one or more edges that each form a respective angle with an edge of the captured representation of the field of view correspond to one or more edges that are displayed parallel to an edge of the first orthographic view. Displaying edges of the captured representation of the field of view parallel to an edge of the first orthographic view allows a user to understand the geometric properties of the captured representation (e.g., by displaying a representation without perspective), which provides the user with desired orthographic view without having to provide multiple inputs to change the view of the captured representation. Reducing the number of inputs needed to view the representation of the physical environment in a desired orthographic view enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the captured representation of the field of view includes at least one set of (e.g., two or more) edges that form an oblique angle (e.g., a non-zero angle that is not a right angle nor a multiple of a right angle) (e.g., before the user was looking at the physical environment from an oblique angle thus the lines are not at right angles, but the orthographic projection shows the representation of the physical environment from a perspective where the lines are parallel). In some embodiments, the at least one set of edges that form an oblique angle in the captured representation of the field of view correspond to at least one set of perpendicular edges in the orthographic view. Displaying a set of edges that form an oblique angle in the captured representation of the field of view as perpendicular edges in the orthographic view, enables the user to view the desired orthographic view without having to provide multiple inputs to change the view of the captured representation. Reducing the number of inputs needed to view the representation of the physical environment in a desired orthographic view enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be understood that the particular order in which the operations in FIGS. 7A-7B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1500, 1600, 1700, and 1800) are also applicable in an analogous manner to method 700 described above with respect to FIGS. 7A-7B. For example, the physical environments, features, and objects, virtual objects, inputs, user interfaces, and views of the physical environment described above with reference to method 700 optionally have one or more of the characteristics of the physical environments, features, and objects, virtual objects, inputs, user interfaces, and views of the physical environment described herein with reference to other methods described herein (e.g., methods 800, 900, 1000, 1500, 1600, 1700, and 1800). For brevity, these details are not repeated here.

FIGS. 8A-8C are flow diagrams illustrating method 800 of providing representations of a physical environment at different levels of fidelity to the physical environment in accordance with some embodiments. Method 800 is performed at a computer system (e.g., portable multifunction device 100 (FIG. 1A), device 300 (FIG. 3A), or computer system 301 (FIG. 3B)) with a display generation component (e.g., touch screen 112 (FIG. 1A), display 340 (FIG. 3A), or display generation component(s) 304 (FIG. 3B)), an input device (e.g., touch screen 112 (FIG. 1A), touchpad 355 (FIG. 3A), input device(s) 302 (FIG. 3B), or a physical button that is separate from the display), and one or more cameras (e.g., optical sensor(s) 164 (FIG. 1A) or camera(s) 305 (FIG. 3B)), optionally in combination with one or more depth sensors (e.g., time-of-flight sensor 220 (FIG. 2B)), that are in a physical environment (802).

As described below, method 800 automatically distinguishes between primary features and secondary features of the physical environment, where the primary and secondary features are identified via information provided by cameras. After distinguishing between the primary features and the secondary features, displaying a user interface that includes both the primary features (e.g., structural non-movable features such as walls, floors, ceilings, etc.) and secondary features (e.g., discrete fixtures and/or movable features such as furniture, appliances, and other physical objects). The primary features are displayed at a first fidelity, and the secondary features are displayed at a second fidelity within a representation of the physical environment. Distinguishing between primary features and secondary features provides the user with the ability to not have to identify (e.g., categorize) items within the physical environment (e.g., the device will recognize a chair, and the user does not need to specify that the item is a chair). Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

The method includes, capturing (804), via the one or more cameras, information indicative of the physical environment, including information indicative of respective portions of the physical environment that are in (e.g., that enter) a field of view of the one or more cameras as the field of view of the one or more cameras moves, wherein the respective portions of the physical environment include a plurality of primary features of the physical environment (e.g., bounding walls 504-1, 504-2, 504-3, and 504-4 in FIG. 5A) and one or more secondary features of the physical environment (e.g., representation of the wooden table 544, and floor lamp 508 in FIG. 5A). In some embodiments, the information indicative of the physical environment includes depth information about the physical environment captured using one or more cameras (e.g., optical sensor(s) 164 (FIG. 1A) or camera(s) 305 (FIG. 3B)) and one or more depth sensors (e.g., time-of-flight sensor 220 (FIG. 2B)). In some embodiments, the information indicative of the physical environment is used to generate one or more representations of primary (e.g., structural) features (e.g., non-movable features such as walls, floors, ceilings, etc.) of the physical environment and representations of one or more secondary (e.g., non-structural) features (e.g., discrete fixtures and/or movable features such as furniture, appliances, and other physical objects).

The method includes, after capturing (806) the information indicative of the physical environment (e.g., in response to capturing the information indicative of the physical environment or in response to a request to display a representation of the physical environment based on the information indicative of the physical environment), displaying a user interface. The method includes, concurrently displaying: graphical representations of the plurality of primary features that are generated with a first level of fidelity to the corresponding plurality of primary features of the physical environment (808); and one or more graphical representations of secondary features that are generated with a second level of fidelity to the corresponding one or more secondary features of the physical environment, wherein the second level of fidelity is lower than the first level of fidelity in the user interface (810).

In some embodiments, the plurality of primary features of the physical environment include one or more walls and/or one or more floors (e.g., bounding walls 504-1, 504-2, 504-3, and 504-4 in FIG. 5A) (812). In some embodiments, where walls and/or floors are classified as primary features and represented at a first level of fidelity, décor items such as picture frames hanging on the wall or textiles placed on the floor (e.g., representation of the rug 558 in FIGS. 5II-5KK) are classified as secondary features and represented at a second level of fidelity. In some embodiments, the plurality of primary features in the physical environment include one or more ceilings. Identifying walls and floors as primary features of the physical environment provides the user with an environment that quickly indicates which objects are capable of being manipulated, and which items are not capable of being manipulated, which provides the user the ability to not have to identify walls and floors, as it is done so automatically by the computer system. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the primary features of the physical environment include one or more doors and/or one or more windows (e.g., window 505 shown in FIG. 5A) (814). Automatically identifying doors and windows as primary features of the physical environment provides the user with the ability to not have to specify what each feature in the physical environment is and how it interacts with other features in the physical environment. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the one or more secondary features of the physical environment include one or more pieces of furniture (e.g., representation of the wooden table 544 in FIGS. 5II-5KK) (816). In some embodiments, a physical object, such as a piece of furniture, is classified as a secondary feature in accordance with a determination that the object is within a predefined threshold size (e.g., volume). In some embodiments, a physical object that meets or exceeds the predefined threshold size is classified as a primary feature. Furniture may include anything from, tables, lamps, desks, sofas, chairs, and light fixtures. Automatically identifying pieces of furniture as primary features of the physical environment provides the user with the ability to not have to specify what each feature in the physical environment is and how it interacts with other features in the physical environment. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the one or more graphical representations of the one or more secondary features that are generated with the second level of fidelity to the corresponding one or more secondary features of the physical environment include one or more icons representing the one or more secondary features (818) (e.g., a chair icon representing a chair in the physical environment, optionally displayed in the user interface at a location relative to the graphical representations of the plurality of primary features that corresponds to the location of the chair relative to the plurality of primary features in the physical environment) (e.g., the floor lamp 508 and smart light icon 526-2 in FIG. 5C-1, and FIGS. 5J-5N). In some embodiments, the icon representing a secondary feature is selectable, and in some embodiments, in response to selection of the icon, a user interface including one or more user interface elements for interacting with the secondary feature is displayed (e.g., the light control user interface 536 in FIG. 5K-5N). In some embodiments, a respective user interface element allows for control of an aspect of the secondary feature (e.g., brightness or color of a smart light). In some embodiments, information about the secondary feature is displayed (e.g., a description of the secondary feature, a link to a website for the identified (known) piece of furniture, etc.). Automatically displaying icons for representing the one or more secondary features (e.g., smart-lights, smart-speakers, etc.) provides the user with an indication that the secondary feature has been recognized in the physical environment. In other words, the user would not have to navigate to different user interfaces for controlling each secondary feature (e.g., smart smart-lights, smart-speakers, etc.), and instead can control building automation devices with minimal inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more graphical representations of the one or more secondary features include respective three-dimensional geometric shapes outlining respective regions in the user interface that correspond to physical environment occupied by the one or more secondary features of the physical environment (820). In some embodiments, the respective three-dimensional geometric shapes (e.g., sometimes called bounding boxes, see e.g., in FIG. 5C-3) include polyhedra or any other three-dimensional shape. In some embodiments, the respective three-dimensional geometric shapes are displayed as wireframes, as partially transparent, with dashed or dotted outlines, and/or in any other manner suitable to indicate that the respective three-dimensional geometric shapes are merely outline representations of the corresponding secondary features of the physical environment. In some embodiments, the respective three-dimensional geometric shapes are based on or correspond to a three-dimensional model of the physical environment (e.g., generated based on depth data included in the information indicative of the physical environment). Displaying bounding boxes for representing the one or more secondary features (e.g., lamps, chairs, and other furniture of a predetermined size) provides the user with the ability to quickly appreciate the size of secondary features in the physical environment, which allows the user to manipulate the physical environment with minimal inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, wherein the one or more graphical representations of the one or more secondary features include predefined placeholder furniture (e.g., CAD chair 529 in FIG. 5C-4) (822). In some embodiments, in accordance with a determination that a room does not contain furniture, the room is automatically populated with furniture. In such an embodiment, a determination is made as to what type of room (e.g., a kitchen, a bedroom, a living room, an office, a dining room, or a commercial space) is being captured and corresponding placeholder furniture is positioned/placed in that determined type of room.

In some embodiments, the one or more graphical representations of the one or more secondary features include computer aided design (CAD) representations of the one or more secondary features (e.g., CAD representation for the wooden table 528-1 and a CAD representation for the floor lamp 528-2 in FIG. 5C-4) (824). In some embodiments, the one or more CAD representations of the one or more secondary features provide predefined models for the one or more secondary features that include additional shape and/or structural information beyond what is captured in the information indicative of the physical environment. Displaying predefined placeholder furniture in a representation of a physical environment provides the user an efficient way to see how a physical space can be utilized. The user no longer needs to navigate menus to add furniture (e.g., secondary non-structural features), and can instead automatically fill the physical environment with placeholder furniture. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more graphical representations of the one or more secondary features are partially transparent (826). In some embodiments, graphical representations of secondary features are displayed as partially transparent, whereas graphical representations of primary features are not displayed as partially transparent. In some embodiments, the secondary features are partially transparent in certain views (e.g., a simplified view), but are not transparent in fully texturized views. At times it may be difficult to appreciate the size of a physical environment, and providing a user with partially transparent secondary features allows the user to see the constraints of the representation of the physical environment. This reduces the need for the user to move secondary features around to understand the physical environment. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more secondary features include one or more building automation devices (e.g., also called home automation devices or smart home devices, particularly when installed in a user's home, such as smart lights (e.g., smart-light icon 526-2 in FIGS. 5C-1), smart televisions, smart refrigerators, smart thermostats, smart speakers (e.g., "Home Control" icon 526-1 in FIG. 5C-1), etc. or other wirelessly-controlled electronic devices), and the one or more graphical representations of the one or more secondary features include graphical indications that the graphical representations correspond to the one or more building automation devices (828) In some embodiments, a respective icon representing a respective building automation device is displayed at a location in the user interface relative to the graphical representations of the plurality of primary features that corresponds to the location of the respective building automation device relative to the plurality of primary features in the physical environment. (e.g., a lightbulb icon is displayed at a location in the user interface that corresponds to the physical location of a corresponding smart light). In some embodiments, the computer system determines that a secondary feature is a building automation device and, in accordance with that determination, displays the icon for that secondary feature (e.g., and in some embodiments, in accordance with a determination that a secondary feature is not a building automation device, no icon is displayed for that secondary feature). In some embodiments, in response to an input corresponding to selection of the icon, the computer system displays a control user interface for controlling one or more aspects of the building automation device. In some embodiments where multiple building automation devices are detected, multiple respective icons are displayed, optionally indicating that control of each respective building automation device is available through selection of the respective corresponding icon. In some embodiments, when a state of a respective building automation device is changed (e.g., a smart light is turned on), the icon representing the respective building automation device is updated to reflect the change in state (e.g., the icon for the smart light is changed from a graphic of a light bulb that is off to a graphic of a light bulb that is on). Displaying icons for representing the one or more building automation devices (e.g., smart-lights, smart-speakers, etc.) provides the user with a single user interface for interacting with all the building automation devices in the physical environment. In other words, the user does not have to navigate to different user interfaces for controlling each building automation device (e.g., smart smart-lights, smart-speakers, etc.), and instead can control the building automation devices with minimal inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving an input at a respective graphical indication that corresponds to a respective building automation device, displaying (830) at least one control for controlling at least one aspect of the respective building automation device (e.g., changing the temperature on a smart thermostat, or changing the brightness and/or color of a smart light (e.g., light control user interface 536 in FIGS. 5J-5N), etc.). In some embodiments, the at least one control for controlling at least one aspect of the respective building automation device is displayed in response to a detected input corresponding to the respective icon representing the respective building automation device. In some embodiments, the icon changes in appearance in response to being selected (e.g., is displayed with a selection indication). Displaying controls for representing the one or more building automation devices (e.g., smart-lights, smart-speakers, etc.) provides the user with the ability to quickly change aspects of the building automation devices without having to open up multiple user interfaces in a settings menu. In other words, the user does not have to navigate to different user interfaces for controlling each building automation object (e.g., smart smart-lights, smart-speakers, etc.), and instead can control building automation devices with minimal inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface is a first user interface that includes a first view (e.g., an isometric view) of the physical environment and a first user interface element (e.g., "1st Person View" control 525-1 in FIG. 5DD), wherein the first view of the physical environment is displayed in response to activation of the first user interface element; (In some embodiments, in response to detecting activation of a first user interface element, displaying the user interface that is a first user interface that includes a first view (e.g., an isometric view) of the physical environment) (832). The user interface includes a second user interface element (e.g., "Top-Down View" control 525-2 in FIG. 5DD), wherein a second view (e.g., a birds-eye-view, three dimensional top-down view, or two dimensional (orthographic) blueprint or floor plan view) of the physical environment, different from the first view, is displayed in response to activation of the second user interface element; (In some embodiments, in response to detecting activation of the second user interface element (e.g., "Side View" control 525-4 in FIG. 5DD), displaying the user interface that is a second user interface that includes the second view (e.g., a birds-eye-view, three dimensional top-down view, or two dimensional (orthographic) blueprint or floor plan view) of the physical environment, different from the first view) and the user interface includes a third user interface element, wherein a third view (e.g., a simplified, wireframe view that removes at least some texture and detail from the physical environment) of the physical environment, different from the first view and from the second view, is displayed in response to activation of the third user interface element In some embodiments, in response to detecting activation of a third user interface element, displaying the user interface that is a third view (e.g., a simplified, wireframe view that removes at least some texture and detail from the physical environment) of the physical environment, different from the first view and from the second view). In some embodiments, the user interface includes a fourth user interface element, wherein a fourth view (e.g., a side-view, three dimensional side view, or two dimensional (orthographic) side view) of the physical environment and a fourth user interface element, different from the first view, the second view, and the third view, is displayed in response to activation of the fourth user interface element. A user interface with multiple user interface elements where each user interface element corresponds to changing a view of the physical environment provides a user with simple controls for manipulating the view of the physical environment. With such controls the user does not need to make multiple inputs to change the view of the physical environment manually. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be understood that the particular order in which the operations in FIGS. 8A-8C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1000, 1500, 1600, 1700, and 1800) are also applicable in an analogous manner to method 800 described above with respect to FIGS. 8A-8C. For example, the physical environments, features, and objects, virtual objects, inputs, user interfaces, and views of the physical environment described above with reference to method 800 optionally have one or more of the characteristics of the physical environments, features, and objects, virtual objects, inputs, user interfaces, and views of the physical environment described herein with reference to other methods described herein (e.g., methods 700, 900, 1000, 1500, 1600, 1700, and 1800). For brevity, these details are not repeated here.

FIGS. 9A-9G are flow diagrams illustrating method 900 of displaying modeled spatial interactions between virtual objects/annotations and a physical environment in accordance with some embodiments. Method 900 is performed at a computer system (e.g., portable multifunction device 100 (FIG. 1A), device 300 (FIG. 3A), or computer system 301 (FIG. 3B)) with a display generation component (e.g., touch screen 112 (FIG. 1A), display 340 (FIG. 3A), or display generation component(s) 304 (FIG. 3B)) and one or more input devices (e.g., touch screen 112 (FIG. 1A), touchpad 355 (FIG. 3A), input device(s) 302 (FIG. 3B), or a physical button that is separate from the display) (902). Some operations in method 900 are, optionally, combined and/or the order of some operations is, optionally, changed.

As described below, method 900 describes adding virtual objects to a representation of a physical environment, and indicating to the user that the virtual object is interacting (e.g., partially overlapping) with a physical object in the physical environment. One indication to show such an interaction is to show a virtual object moving (e.g. being dragged by a user) at a slower rate when it is partially overlapping physical objects (e.g., real world objects) in the physical environment. Such an interaction signifies to the user that the virtual object is interfacing with a physical object that occupies a physical space in the physical environment. Providing a user with such feedback helps the user orient virtual objects so they do not overlap with real world objects, since overlapping virtual objects with real world objects is not something that can occur in the physical environment. Without such a feature the user will have to make multiple inputs to avoid overlapping virtual objects with physical objects. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The method includes displaying (904), via the display generation component, a representation of a physical environment (e.g., a two-dimensional representation, such as a live view of one or more cameras, or a previously-captured still image or frame of a previously-captured video). The representation of the physical environment includes a representation of a first physical object that occupies a first physical space in the physical environment (e.g., wooden table 511 in FIG. 5O) and has a first respective object property (e.g., is a "solid" (e.g., rigid and/or hard) object). In some embodiments, the representation of the physical environment is a live view of a field of view of one or more cameras of the computer system (e.g., 1st person view in FIG. 5O). In some embodiments, the representation of the physical environment is a previously-captured still image (e.g., a previously-captured photograph or a frame of a previously-captured video) (906). The method also includes a virtual object (e.g., virtual stool 542) at a position in the representation of the physical environment that corresponds to a second physical space in the physical environment that is distinct from (e.g., that does not overlap with) the first physical space (908). In some embodiments, the representation of the physical environment includes or is associated with depth information about the physical environment captured using one or more cameras (e.g., optical sensor(s) 164 (FIG. 1A) or camera(s) 305 (FIG. 3B)) and one or more depth sensors (e.g., time-of-flight sensor 220 (FIG. 2B)).

The method includes detecting (910) a first input that corresponds to the virtual object, wherein movement of the first input corresponds to a request to move the virtual object in the representation of the physical environment relative to the representation of the first physical object. The method includes, while detecting (912) the first input, at least partially moving the virtual object in the representation of the physical environment based on the movement of the first input. In accordance with a determination that the movement of the first input corresponds to a request to move the virtual object through one or more positions, in the representation of the physical environment, that correspond to physical space in the physical environment that is not occupied by a physical object with the first respective object property, at least partially moving the virtual object in the representation of the physical environment includes moving the virtual object by a first amount (e.g., the dragging gesture 543-1 in FIG. 5O) (916). In accordance with a determination that the movement of the first input corresponds to a request to move the virtual object through one or more positions, in the representation of the physical environment, that correspond to physical space in the physical environment that at least partially overlaps with the first physical space of the first physical object, at least partially moving the virtual object in the representation of the physical environment includes moving the virtual object by a second amount, less than the first amount, through at least a subset of the one or more positions that correspond to physical space in the physical environment that at least partially overlaps with the first physical space of the first physical object (e.g., dragging gesture 543-1 at a position no longer overlapping the virtual stool 542 in FIGS. 5P-5Q). In some embodiments, overlap between the virtual object and one or more representations of physical objects in the representation of the physical environment (e.g., visual overlap in the two-dimensional representation) does not necessarily mean movement of the virtual object through positions that correspond to overlapping physical space (e.g., spatial overlap in three-dimensional space). For example, movement of a virtual object through corresponding space behind or underneath (e.g., at a different depth from portions of) a physical object produces (e.g., visual) overlap between the virtual object and the representation of the physical object in the (e.g., two-dimensional) representation of the physical environment and virtual object (e.g., due to apparent occlusion of the virtual object by at least a portion of the representation of the physical object), even though the virtual object does not occupy (e.g., in a virtual sense) any of the same physical space occupied by any physical object. In some embodiments, the magnitude of movement of the virtual object (through the positions in the representation of the physical environment that correspond to physical space in the physical environment that at least partially overlaps with the first physical space of the first physical object) decreases as the degree of overlap between the corresponding physical space and the first physical space increases.

In some embodiments, the representation of the physical environment corresponds to a first (e.g., perspective) view of the physical environment, and the method includes: in accordance with a determination that the virtual object is at a respective position in the representation of the physical environment such that one or more portions of the virtual object overlap with one or more representations of respective physical objects in the physical environment and correspond to physical space in the physical environment that, from the first view of the physical environment, is occluded by the one or more respective physical objects, changing (918) an appearance of (e.g., virtual stool 542 is shown in deemphasized state in FIGS. 5P-5Q) so as to deemphasize (e.g., for example by displaying as at least partially transparent, forgoing displaying, and/or displaying (e.g., only) an outline of) the one or more portions of the virtual object that overlap with the one or more representations of respective physical objects (e.g., to represent the portion of the virtual object being partially blocked (e.g., occluded) from view by the representation of the first physical object). In some embodiments, a portion of the virtual object that is occluded is deemphasized, while another portion of the virtual object is not occluded and thus not deemphasized (e.g., the texture is displayed). A visual change to a virtual object (e.g., deemphasizing) illustrates to the user that the virtual object is occluded by a physical object, which provides the user with depth information of the virtual object in the physical environment. By providing enhanced depth information to the user about the virtual object, the user can place the virtual object in the physical environment with ease and with minimal inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation of the physical environment corresponds to a first (e.g., perspective) view of the physical environment. This embodiment includes, in response to detecting the first input that corresponds to the virtual object, (920) displaying an outline around the virtual object. While continuing to display the outline around the virtual object, in accordance with a determination that the virtual object is at a respective position in the representation of the physical environment such that one or more portions of the virtual object overlap with one or more representations of respective physical objects in the physical environment and correspond to physical space in the physical environment that, from the first view of the physical environment, is occluded by the one or more respective physical objects, forgoing displaying the one or more portions of the virtual object that overlap with the one or more representations of respective physical objects (e.g., while maintaining display of the outline around the virtual object, for example without regard to whether an outlined portion of the virtual object is displayed or not). In some embodiments, forgoing displaying the one or more portions of the virtual object that overlap with the one or more representations of respective physical objects includes displaying the one or more overlapping portions of the virtual object without texture (e.g., includes visual characteristics of the virtual object other than shape, such as material properties, patterns, designs, finishes). In some embodiments, light and/or shadows are not considered texture and remain displayed). In some embodiments, non-overlapping portions of the virtual object are displayed with texture and outlining (e.g., in accordance with a determination that those portions of the virtual object are not occluded). Foregoing displaying a portion of the virtual object, but still maintaining display of an outline around the virtual object illustrates to the user that the virtual object is partially occluded by a physical object, which provides the user with depth information of the virtual object in the physical environment. By providing enhanced depth information to the user about the virtual object, the user can place the virtual object in the physical environment with ease and with minimal inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, ceasing (922) to detect the first input; in response to ceasing to detect the first input, in accordance with a determination that the first input ceased to be detected while the virtual object is at a respective position, in the representation of the physical environment, that corresponds to physical space in the physical environment that at least partially overlaps with the first physical space of the first physical object, moving (e.g., rubber-banding as shown by virtual stool 542 in FIG. 5R) the virtual object to a position in the representation of the physical environment that corresponds to a physical space in the physical environment near the first physical object that does not overlap with the first physical space of the first physical object (e.g., or with the physical space of any respective physical object in the physical environment). (In some embodiments, the physical space that is near the first physical object is physical space that does not overlap with physical space of the first physical object (or of any physical object) and that is subject to various constraints such as the path of the first input and/or the shapes of the first physical object and the virtual object. In some embodiments, the physical space near the first physical object is non-overlapping physical space that is a minimum distance (e.g., in the physical environment) from the physical space corresponding to the respective position of the virtual object (e.g., such that the least amount of movement would be needed to move an object directly (e.g., along the shortest path) from the physical space corresponding to the virtual object to the nearest physical space). In some embodiments, the physical space that is near the first physical object is determined based on a vector between an initial location of the input and an end location of the input, and corresponds to a point along the vector that is as close as possible to the end location of the input yet does not cause the virtual object to occupy space that overlaps with one or more (e.g., any) physical object. In some embodiments, the speed and/or acceleration with which the virtual object snaps (e.g., back) to the position corresponding to the unoccupied physical space that is near the first physical object depends on the degree of overlap between the physical space corresponding to the virtual object and the physical space occupied by a physical object (e.g., how many of the one or more positions corresponding to overlapping physical space through which the virtual object was moved). For example, the virtual object snaps to the position corresponding to the unoccupied virtual space that is near the first physical object with a higher speed and/or acceleration from a position that corresponds to greater overlap between the physical space occupied by a physical object and the physical space corresponding to (e.g., "occupied," in a virtual sense, by) the virtual object; in another example, the virtual object snaps to the position corresponding to the unoccupied virtual space that is near the first physical object with a lower speed and/or acceleration from a position that corresponds to lesser overlap between the physical space occupied by a physical object and the physical space corresponding to the virtual object. After detecting a gesture that causes a virtual object to partially overlap with a physical object, the computer device automatically moves the virtual object to the nearest physical space in the physical environment that does not result in overlap, which provides the user with context as to how virtual items can be placed in the physical environment and remain consistent with the physical aspects (e.g., physical objects can't overlap with each other) of the physical environment. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, after the virtual object moves by the second amount, less than the first amount, through at least the subset of the one or more positions that correspond to physical space in the physical environment that at least partially overlaps with the first physical space of the first physical object, in accordance with a determination that the movement of the first input meets a distance threshold, moving (924) the virtual object through the first physical space of the first physical object (e.g., to a position in the representation of the physical environment that corresponds to physical space in the physical environment that is not occupied by a physical object, which is shown in FIGS. 5S-5V). In some embodiments, the distance threshold is met when the movement of the first input corresponds to a request to move the virtual object through the one or more positions that correspond to physical space that at least partially overlaps with the first physical space of the first physical object to a position that corresponds to physical space that does not overlap with (e.g., and is optionally at least a threshold distance from) physical space of any physical object. For example, if a user attempts to drag a virtual chair through space corresponding to space occupied by a physical table, in accordance with a determination that the user is attempting to move the chair through the table to place the chair on the opposite side of the table, the chair is displayed as snapping (e.g., moving) "through" the table after previously being displayed as resisting movement "into" the table. After detecting that the gesture that causes the virtual object to partially overlap with a physical object meets a distance threshold, moving the virtual object through the first physical space of the first physical objects, which provides the user with the ability to make one input to move objects through physical objects when the device determines that this is in fact the user's intent. Reducing the number of inputs needed to perform an operation enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, in accordance with the determination that the movement of the first input corresponds to a request to move the virtual object through one or more positions, in the representation of the physical environment, that correspond to physical space in the physical environment that at least partially overlaps with the first physical space of the first physical object. In accordance with a determination that the first input meets a velocity threshold (e.g., and/or in some embodiments an acceleration threshold and/or distance threshold as shown in FIGS. 5X-5Z) and that the first input corresponds to a request to move the virtual object to a respective position that corresponds to physical space in the physical environment that does not overlap with the first physical space of the first physical object, moving (926) the virtual object through the one or more positions that correspond to physical space in the physical environment that at least partially overlaps with the first physical space of the first physical object to the respective position. In some embodiments, moving the virtual object by the second amount that is less than the first amount is performed in accordance with a determination that the input does not meet the velocity threshold (e.g., and/or acceleration threshold and/or distance threshold). After detecting that the input causes the virtual object to partially overlap with a physical object, determining if the input meets a velocity threshold, and if it does, moving the virtual object through the first physical space of the first physical objects. This interaction provides the user with the ability to make one input to move objects through physical objects when the device determines that as the user's intent. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with the determination that the movement of the first input corresponds to a request to move the virtual object through one or more positions, in the representation of the physical environment, that correspond to physical space in the physical environment that at least partially overlaps with the first physical space of the first physical object. In accordance with a determination that the first input does not meet the velocity threshold (e.g., and/or in some embodiments an acceleration threshold and/or distance threshold) and/or that the first input corresponds to a request to move the virtual object to a respective position that corresponds to physical space in the physical environment that does not overlap with the first physical space of the first physical object, forgoing (928) movement of the virtual object through the one or more positions that correspond to physical space in the physical environment that at least partially overlaps with the first physical space of the first physical object to the respective position. After detecting that the input causes the virtual object to partially overlap with a physical object, determining if the input meets a velocity threshold, and if it does not, do not move the virtual object through the first physical space of the first physical objects. This interaction provides the user with the ability to not accidentally move objects through physical objects when the user does not wish to do so. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, an initial location of the first input is within a displayed region of the virtual object (e.g., and at least a predefined threshold distance from an edge of the virtual object) (930). In some embodiments, the circumstance that the movement of the first input corresponds to a request to move the virtual object in the representation of the physical environment is at least partially based on a determination that an initial location of the first input is within a displayed region of the virtual object (e.g., rather than at or near an edge of the virtual object as shown by the inputs in FIGS. 5O and 5X). Changing the position of a virtual object in response to an input within the displayed region of the virtual object, provides the user with an intuitive distinctive region to provide an input, which causes a change in the position of the object. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, detecting a second input that corresponds to the virtual object. In response to detecting the second input, in accordance with a determination that the second input corresponds to a request to resize (e.g., input 549 in FIG. 5AA) the virtual object (e.g., virtual table 547 in FIG. 5AA) in the representation of the physical environment (e.g., relative to the representation of the first physical object (e.g., the representation of the wooden table 544 in FIG. 5AA), resizing (932) the virtual object in the representation of the physical environment based on movement of the second input, where in accordance with a determination that the movement of the second input corresponds to a request to resize the virtual object such that at least a portion (e.g., an edge) of the virtual object is within a predefined distance threshold of an edge (e.g., or multiple edges) of the first physical object, (e.g., automatically) the resizing (932) of the virtual object in the representation of the physical environment based on the movement of the second input includes resizing the virtual object to snap to the edge (e.g., or the multiple edges) of the first physical object (e.g., as shown by the virtual table in FIG. 5AA-5CC being resized in response to a dragging input, and snapping to the representation of the wooden table 544). In some embodiments, if resizing is requested in multiple directions (e.g., length and width), the virtual object is resized in each requested direction, and can optionally "snap" to abut one or more virtual object(s) in each direction. In some embodiments, as long as the object is within a threshold distance of the object it is snapping to it moves to a predefined location relative to that object. When an input corresponds to a request to resize virtual object, and the request to resize the virtual object ends within a predefined distance threshold of an edge of a physical object, the device will automatically resize the virtual object so that it abuts the physical object. This provides the user with the ability to resize objects so the edges are aligned, and does not require the user to make granular adjustments to reach the desired size of the virtual object. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, determining (934) that the second input corresponds to a request to resize the virtual object includes determining that an initial location of the second input corresponds to an edge of the virtual object (e.g., input 548-1 is occurring at an edge 549 of the virtual table 547 in FIG. 5AA). In some embodiments, movement of the input (e.g., dragging) initiated from a corner of the virtual object resizes the virtual object in multiple directions (e.g., any combination of length, width, and/or height). An input that occurs at an edge of a virtual object that results in resizing the virtual object, provides the user with an intuitive control for resizing, and reduces the amount of inputs that are required to resize the virtual object. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the second input includes movement in a first direction, the resizing of the virtual object includes resizing (936) the virtual object in the first direction (e.g., without resizing the virtual object in one or more other directions, or in other words without maintaining aspect ratio between the size of the virtual object in the first direction (e.g., a first dimension such as length) and the size of the virtual object in other directions (e.g., in other dimensions such as width or height)). In accordance with a determination that the drag gesture includes movement in a second direction, the resizing of the virtual object includes resizing the virtual object in the second direction (e.g., without resizing the virtual object in one or more other directions, or in other words without maintaining aspect ratio between the size of the virtual object in the second direction (e.g., a second dimension such as width) and the size of the virtual object in other directions (e.g., in other dimensions such as length or height)). Resizing a virtual object in the direction that the input is moving, provides the user with intuitive controls for resizing different portions of the virtual object (e.g., dimensions such as width or height). Intuitive controls result in less erroneous inputs being made. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying (938), in the representation of the physical environment, light from a light source (e.g., light from the physical environment or from a virtual light) that changes a visual appearance of the representation of the first physical object and the virtual object (e.g., the virtual objects (e.g., the virtual table 547 and the virtual stool 542) casting shadows on the physical objects (e.g., the representation of the rug 558) in FIGS. 5II-5KK). In accordance with a determination that the virtual object is at a position in the representation of the physical environment that corresponds to physical space in the physical environment that is between the light source and (e.g., the first physical space occupied by) the first physical object (e.g., the virtual object at least partially "blocks" the path of the light that would otherwise have been cast by the light source on the physical object), displaying a shaded region (e.g., a simulated shadow) over at least a portion of the representation of the first physical object (e.g., over the portion of the representation of the first physical object that is "shaded" from the light by the virtual object, as if the virtual object casts a shadow over the first physical object).

In accordance with a determination that (e.g., the first physical space occupied by) the first physical object is between the light source and the physical space that corresponds to the position of the virtual object in the representation of the physical environment (e.g., the physical object at least partially blocks the path of the light that would otherwise have been "cast" by the light source on the virtual object), displaying a shaded region (e.g., a simulated shadow) over at least a portion of the virtual object (e.g., over the portion of the virtual object that is "shaded" from the light by the first physical object, as if the first physical object casts a shadow over the virtual object). In some embodiments, the light source may be a virtual light source (e.g., simulated light, including for example simulated colored light displayed in response to changing a color of a smart light). In some embodiments, the light source is in the physical environment (e.g., sunlight, lighting from a physical light bulb). In some embodiments, where the light source is in the physical environment, the computer system determines a location of the light source and displays shadows in accordance with the determined light source location. Automatically displaying shaded regions on both physical objects and virtual objects provides the user with a representation of a physical environment that is realistic. When virtual objects appear realistic, the user does not need to go into a separate application and edit the representation of the physical environment to enhance the virtual objects "reality." Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, displaying (940), in the representation of the physical environment, light from a light source (e.g., light from the physical environment or from a virtual light) that changes a visual appearance of the representation of the first physical object and the virtual object (e.g., as shown in FIGS. 5L; 5II-5KK). In accordance with a determination that the virtual object is at a position in the representation of the physical environment that corresponds to physical space in the physical environment that is in the path of light from the light source, increasing a brightness of a region of the virtual object (e.g., displaying at least some light cast from the light source onto the virtual object). Automatically increasing the brightness of a region of the virtual object in response to light from a light source, provides the user with the ability to not have to go to a separate media editing application to make the virtual objects appear realistic. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the representation of the physical environment includes a representation of a second physical object that occupies a third physical space in the physical environment and has a second respective object property (e.g., is a "soft" or elastic object, which is shown by the virtual table 547 and the virtual stool 542, deforming the). While detecting (942) a respective input that corresponds to a request to move the virtual object in the representation of the physical environment relative to the representation of the second physical object (e.g., the respective input is a portion of the first input, or a distinct input from the first input), at least partially moving the virtual object in the representation of the physical environment based on movement of the respective input. In accordance with a determination that the movement of the respective input corresponds to a request to move the virtual object through one or more positions, in the representation of the physical environment, that correspond to physical space in the physical environment that at least partially overlaps with the third physical space of the second physical object (e.g., and optionally in accordance with a determination that the virtual object has the first respective object property). At least partially moving the virtual object through at least a subset of the one or more positions that correspond to physical space in the physical environment that at least partially overlaps with the third physical space of the second physical object; and In some embodiments, for a given amount of movement of the respective input, an amount by which the virtual object is moved through physical space overlapping with a physical object with the second respective object property is greater than the corresponding amount by which the virtual object would be moved through physical space overlapping with a physical object with the first respective object property. For example, a virtual object can be moved so as to appear more embedded "into" a soft physical object than a rigid physical object, in response to a same degree of overlap requested by the movement of the input.

In some embodiments, displaying one or more changes in a visual appearance (e.g., simulated deformation) of at least a portion of the representation of the second physical object that corresponds to the at least partial overlap with the virtual object. In some embodiments, the change in visual appearance (e.g., the extent of the simulated deformation) is based at least in part on the second respective object property of the second virtual object, and optionally also on simulated physical characteristics of the virtual object, such as rigidity, weight, shape, and speed and/or acceleration of movement). In some embodiments, the deformation is maintained while the virtual object remains in a location that corresponds to physical space that at least partially overlaps with the physical space of the second physical object. In some embodiments, after a virtual object is moved such that the virtual object is no longer "occupies" one or more physical spaces that overlaps with the physical space occupied by the second physical object, the one or more changes in the visual appearance of at least the portion of the representation of the second physical object cease to be displayed (e.g., and optionally instead, a different set of changes is displayed (e.g., the one or more changes are reversed) such that the second physical object appears to return to its original appearance prior to the simulated deformation by the virtual object). For example, simulated deformation of a physical couch cushion is displayed when a (e.g., rigid, heavy) virtual object is placed on the couch cushion, and the deformation is gradually reduced (e.g., reversed) as the couch cushion regains its shape after the virtual object is removed. In some embodiments, object properties (e.g., physical attributes such as material hardness, rigidity, elasticity, etc.) of physical objects are determined by the computer system, and different simulated interactions between physical objects and virtual objects will be displayed based on the determined object properties of the physical objects. Automatically deforming physical objects in response to virtual objects provides the user with a representation of a physical environment that is more realistic. When virtual objects appear realistic, the user does not need to go into a separate application and edit the representation of the physical environment to enhance the virtual objects "realism." Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, displaying (944) the one or more changes in the visual appearance of at least the portion of the representation of the second physical object that corresponds to the at least partial overlap with the virtual object is based on one or more object properties (e.g., physical attributes) of the second physical object in the physical environment (e.g., based on depth data associated with the second physical object). Automatically detecting object properties of physical objects provides the user with a representation of a physical environment that is realistic. When virtual objects appear realistic, the user does not need to go into a separate application and edit the representation of the physical environment to enhance the virtual objects "reality." Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

It should be understood that the particular order in which the operations in FIGS. 9A-9G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 1000, 1500, 1600, 1700, and 1800) are also applicable in an analogous manner to method 900 described above with respect to FIGS. 9A-9G. For example, the physical environments, features, and objects, virtual objects, object properties, inputs, user interfaces, and views of the physical environment described above with reference to method 900 optionally have one or more of the characteristics of the physical environments, features, and objects, virtual objects, object properties, inputs, user interfaces, and views of the physical environment described herein with reference to other methods described herein (e.g., methods 700, 800, 1000, 1500, 1600, 1700, and 1800). For brevity, these details are not repeated here.

FIGS. 10A-10E are flow diagrams illustrating method 1000 of applying modeled spatial interactions with virtual objects/annotations to multiple media items in accordance with some embodiments. Method 1000 is performed at a computer system having a display generation component and one or more input devices (and optionally one or more cameras (e.g., optical sensor(s) 164 (FIG. 1A) or camera(s) 305 (FIG. 3B)) and one or more depth sensing devices (e.g., time-of-flight sensor 220 (FIG. 2B))) (1002).

As described below, method 1000 describes making an annotation in a representation of the physical environment (e.g., marking up a photograph or video), where the annotations position, orientation, or scale is determined within the physical environment. Using the annotations position, orientation, or scale, in the representation, subsequent representations that include the same physical environment can be updated to include the same annotation. This annotation will be placed in the same position relative to the physical environment. Having such a feature avoids requiring the user to repeatedly annotate multiple representations of the same environment. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The method includes displaying (1004), via the display generation component, a first representation of first previously-captured media (e.g., that includes one or more images (e.g., expanded media item 604 in FIG. 6C), and that in some embodiments is stored with depth data), wherein the first representation of the first media includes a representation of a physical environment. While displaying the first representation of the first media, receiving (1006) an input corresponding to a request to annotate (e.g., by adding a virtual object or modifying an existing displayed virtual object as shown in FIGS. 6D-6E where the annotation 606 is added to the expanded media item 604) a portion of the first representation that corresponds to a first portion of the physical environment.

In response to receiving the input, displaying an annotation on the portion of the first representation that corresponds to the first portion of the physical environment, the annotation having one or more of a position, orientation, or scale that is determined based on (e.g., the physical properties of and/or physical objects in) the physical environment (e.g., using depth data that corresponds to the first media) (1008).

After (e.g., in response to) receiving the input, displaying the annotation on a portion of a displayed second representation of second previously-captured media, wherein the second previously-captured media is distinct from the first previously-captured media, and the portion of the second representation corresponds to the first portion of the physical environment (e.g., the annotation is displayed on the portion of the second representation of the second previously-captured media with one or more of a position, orientation, or scale that is determined based on the physical environment as displayed in the second representation of the second previously-captured media) (1010) (See e.g., FIG. 5O showing media thumbnail item 1 602-1, media thumbnail item 2 602-2, media thumbnail item 3 602-3, and media thumbnail item 4 602-4 each containing the annotation 606). In some embodiments, the annotation is displayed on the portion of the second representation of the second previously-captured media using depth data that corresponds to the second media. In some embodiments where the view of the first portion of the physical environment represented in the second representation of the second previously-captured media is from a viewpoint that is different from a viewpoint of the first representation of the first media with respect to the first portion of the physical environment, the position, orientation, and/or scale of the annotation (e.g., virtual object) is different between the first and second representations according to the respective viewpoints of the first and second representations.

In some embodiments, after (e.g., in response to) receiving (1012) the input corresponding to the request to annotate the portion of the first representation, and before displaying the annotation on the portion of the displayed second representation of the second media, the method includes displaying a first animated transition from display of the first representation of the first media (e.g., in response to an input that correspond to selection of the second media) to display of a first representation of a three-dimensional model of the physical environment represented in the first representation of the first media (e.g., 6F-6H showing such an animated transition) (e.g., generated by the computer system from depth information indicative of the physical environment that is associated, for example stored, with the first media) and that represents one or more (e.g., any) annotations displayed at least partially in the first representation of the first media (e.g., including ceasing to display, for example by fading out, the first representation of the first media, and optionally by (e.g., concurrently) fading in the first representation of the three-dimensional model of the physical environment). In some embodiments, the first animated transition is displayed in response to an input that correspond to selection of the second media. In some embodiments, the transitional representation of the three-dimensional model of the physical environment is simplified relative to the first and second representations of media. In some embodiments, the transitional representation of the three-dimensional model of the physical environment is a wireframe representation of the three-dimensional model of the physical environment generated based on detected physical features such as edges and surfaces.

In some embodiments, the method further includes displaying a second animated transition from display of the first representation of the three-dimensional model to display of a second representation of the three-dimensional model of the physical environment represented in the second representation of the second media (e.g., 6I-6J showing such an animated transition) (e.g., generated by the computer system from depth information indicative of the physical environment that is associated, for example stored, with the second media) and that represents one or more (e.g., any) annotations displayed at least partially in the second representation of the second media. In some embodiments, the animated transition from the first representation of the 3D model to the second representation of the 3D model includes performing one or more transformations of the 3D model, including for example rotation, translation and/or rescaling of the 3D model.

In some embodiments, the method further includes displaying a third animated transition from display of the second representation of the three-dimensional model to display of the second representation of the second media (e.g., 6K-6L showing such an animated transition) (e.g., including ceasing to display, for example by fading out, the second representation of the three-dimensional model, and optionally by (e.g., concurrently) fading in the second representation of the second media). Displaying animated transitions (e.g., representations of three-dimensional models of the physical environment) when switching between different representations of the physical environment provides the user with contextual information as to the different locations, orientations, and/or magnifications at which the representations were captured. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying (1014) the annotation while displaying the first animated transition, the second animated transition, and the third animated transition (e.g., FIGS. 6F-6M showing the annotation 606 being displayed). Displaying animated transitions (e.g., representations of three-dimensional models of the physical environment) with annotations when switching between different representations of the physical environment provides the user with contextual information as to the different locations, orientations, magnifications of the representations were captured at, and where the annotation will be placed. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the first animated transition from display of the first representation of the first media (e.g., in response to an input that correspond to selection of the second media) to display of the first representation of the three-dimensional model of the physical environment represented in the first representation of the first media includes a first change in perspective, updating (1016) the display of the annotation in response to the first change in perspective (e.g., 6F-6H showing such an animated transition) (e.g., displaying the annotation with one or more of a position, orientation, or scale that is determined based on the physical environment as represented during the first change in perspective during the first animated transition).

In some embodiments, in accordance with a determination that the second animated transition from display of the first representation of the three-dimensional model to display of the second representation of the three-dimensional model of the physical environment represented in the second representation of the second media includes a second change in perspective, the method includes updating the display of the annotation in response to the second change in perspective (e.g., 6I-6J showing such an animated transition) (e.g., displaying the annotation with one or more of a position, orientation, or scale that is determined based on the physical environment as represented during the first change in perspective during the second animated transition).

In some embodiments, in accordance with a determination that the third animated transition from display of the second representation of the three-dimensional model to display of the second representation of the second media includes a third change in perspective, updating the display of the annotation in response to the third change in perspective (e.g., 6K-6L showing such an animated transition) (e.g., displaying the annotation with one or more of a position, orientation, or scale that is determined based on the physical environment as represented during the third change in perspective during the first animated transition). Showing multiple animations that include changes in perspective of annotations provides the user with the ability to see how the annotation that is made in one representation will appear the other representations. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after (e.g., in response to) receiving the input corresponding to the request to annotate the portion of the first representation, and before displaying the annotation on the portion of the displayed second representation of the second media: receiving (1018) an input corresponding to selection of the second media; and in response to receiving the input corresponding to selection of the second media, displaying a respective representation of the second media (e.g., media thumbnail scrubber 605 in FIG. 6F). In some embodiments, displaying the annotation on the portion of the second representation of the second media is performed after (e.g., in response to) receiving the input corresponding to selection of the second media. In some embodiments, the respective representation of the second media is an image or a representative (e.g., initial frame) of a video that at least partially corresponds to at least the first portion of the physical environment. In some embodiments, the respective representation of the second media is the second representation of the second media, and in some such embodiments the annotation is displayed on the portion of the second representation (e.g., which is the respective representation) of the second media in response to receiving the input corresponding to selection of the second media. In some embodiments, the respective representation of the second media is a different frame of a video from the second representation of the second media, and in some such embodiments the second representation of the second media is displayed after at least a portion of the video is played. In some such embodiments where the respective representation of the second media does not correspond to the first portion of the physical environment, the annotation is not displayed in the respective representation of the second media. In some such embodiments, the annotation is not displayed until playback of the video reaches an initial frame (e.g., the second representation) of the second media that corresponds to at least the first portion of the physical environment, corresponds to at least the first portion of the physical environment, and the annotation is displayed on the portion of the second representation of the second media in response to receiving the input corresponding to selection of the second media, in combination with displaying the second media. In some embodiments, the computer system displays the first representation of the first media in a user interface that further includes a media (e.g., image or video) selector that includes one or more respective representations of media, such as thumbnails (e.g., displayed in a scrollable list or array), and the input corresponding to selection of the second media is an input corresponding to a representation of the second media displayed in the media selector. In some embodiments, after receiving the input corresponding to a request to annotate a portion of the first representation that corresponds to a first portion of the physical environment, the respective representations of media that correspond to at least the first portion of the physical environment are updated to reflect the addition of the annotation to the first representation.

Including a media selector (e.g., media thumbnail scrubber 605) in the user interface provides a user with a quick controls for switching between media items, and does not require the user to navigate multiple user interface to interact with each media item. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after displaying the annotation on the portion of the first representation that corresponds to the first portion of the physical environment, receiving (1020) an input that corresponds to a request to view a live representation of the physical environment (e.g., a live feed from a camera). In response to receiving the input that corresponds to a request to view a representation of a current state of the physical environment (e.g., a representation of a field of view of one or more cameras that changes as the physical environment changes in the field of view of the one or more cameras or as the field of view of the one or more cameras shifts around the physical environment): displaying the representation of the current state of the physical environment. In accordance with a determination that the representation of the current state of the physical environment corresponds to at least the first portion of the physical environment, displaying the annotation on a portion of the representation of the current state of the physical environment that corresponds to the first portion of the physical environment, wherein the annotation is displayed with one or more of a position, orientation, or scale that is determined based on the physical environment as represented in the representation of the current state of the physical environment (e.g., the annotation appears differently in the live representation than in the first or second representations based on differences between the viewpoint of the live representation and the viewpoint(s) of the first or second representations). Showing multiple representations provides the user with the ability to see how an annotation that is made in one representation will appear the other representations. Viewing these representations concurrently, avoids having to make the user switch between representations. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first representation and the second representation are displayed concurrently (e.g., FIG. 6O showing the concurrent display of media items, and FIGS. 6D-6E showing simultaneous movement of the media items with the annotations); the input corresponding to a request to annotate a portion of the first representation includes movement of the input; and in response to receiving the input, concurrently: modifying (1022) (e.g., moving, resizing, extending, etc.) a first representation of the annotation in the portion of the first representation that corresponds to the first portion of the physical environment at least partially based on the movement of the input. Also concurrently modifying (e.g., moving, resizing, extending, etc.) a second representation of the annotation in the portion of the second representation that corresponds to the first portion of the physical environment at least partially based on the movement of the input. In some embodiments where the view of the first portion of the physical environment represented in the second representation of the second media is from a viewpoint that is different from a viewpoint of the first representation of the first media with respect to the first portion of the physical environment, the position, orientation, and/or scale of the annotation (e.g., virtual object) is different between the first and second representations according to the respective viewpoints of the first and second representations. Showing multiple representations provides the user with the ability to see how an annotation that is made in one representation will appear the other representations. Viewing these representations concurrently, avoids having to make the user switch between representations. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a portion of the annotation is not displayed on the second representation from the second media (1024) (e.g., because the annotation is obscured, occluded, or out of the frame of the second representation, which is shown in FIG. 6O where the annotation is not shown in media thumbnail item 1 602-1, and partially shown in media thumbnail item 2 602-2). In some representations portions of the annotation are partially displayed because a portion of the annotation is out of frame of the representation. Having a partially displayed annotation signifies to the user the position change, orientation change, and magnification change of where the representation was captured. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the second representation from the second previously-captured media, receiving (1026) a second input corresponding to a request to annotate (e.g., by adding a virtual object or modifying an existing displayed virtual object) a portion of the second representation that corresponds to a second portion of the physical environment. In response to receiving the second input, displaying a second annotation on the portion of the second representation that corresponds to the second portion of the physical environment, the second annotation having one or more of a position, orientation, or scale that is determined based on (e.g., the physical properties of and/or physical objects in) the physical environment (e.g., using depth data that corresponds to the first image) (e.g., FIG. 6R shows a wing element (i.e., spoiler) annotation 620 added to the car 624 by an input 621).

After (e.g., in response to) receiving the second input, the second annotation is displayed on (e.g., added to) a portion of the first representation of the first media that corresponds to the second portion of the physical environment (e.g., FIG. 6T displaying the wing element annotation 620 in media thumbnail item 1 602-1, media thumbnail item 2 602-2, media thumbnail item 3 602-3, and media thumbnail item 4 602-4). In some embodiments, the second annotation is displayed on the first representation in response to receiving the second input (e.g., while the first representation is concurrently displayed with the second representation). In some embodiments, the second annotation is displayed on the first representation in response to receiving an intervening input that corresponds to a request to (re-)display the first representation of the first media. When making an annotation in a representation of the physical environment (e.g., marking up a photograph or video), the annotations position, orientation, or scale is determined within the physical environment. Using the annotations position, orientation, or scale, subsequent representations that include the same physical environment can be updated to include the annotation. This annotation will be placed in the same position relative to the physical environment. Having such a feature avoids requiring the user to repeatedly annotate multiple representations of the same environment. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently In some embodiments, at least a portion of the second annotation is not displayed on the first representation of the first media (e.g., because it is obscured or out of the frame of the first representation) (See e.g., FIG. 6T where the wing element annotation 620 is partially not shown in media thumbnail item 1 602-1) (1028). Having a portion of the annotation not visible provides the user with information regarding whether the annotation is occluded by the physical environment. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be understood that the particular order in which the operations in FIGS. 10A-10E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1500, 1600, 1700, and 1800) are also applicable in an analogous manner to method 1000 described above with respect to FIGS. 10A-10E. For example, the physical environments, features, and objects, virtual objects and annotations, inputs, user interfaces, and views of the physical environment described above with reference to method 1000 optionally have one or more of the characteristics of the physical environments, features, and objects, virtual objects and annotations, inputs, user interfaces, and views of the physical environment described herein with reference to other methods described herein (e.g., methods 700, 800, 900, 1500, 1600, 1700, and 1800). For brevity, these details are not repeated here.

FIGS. 11A-11JJ, 12A-12RR, 13A-13HH, and 14A-14SS illustrate example user interfaces for interacting with and annotating augmented reality environments and media items in accordance with some embodiments. The user interfaces in these figures are used to illustrate the processes described herein, including the processes in FIGS. 7A-7B, 8A-8C, 9A-9G, 10A-10E, 15A-15B, 16A-16E, 17A-17D, and 18A-18B. For convenience of explanation, some of the embodiments will be discussed with reference to operations performed on a device with a touch-sensitive display system (e.g., touch-sensitive display system 112 of FIG. 1A). In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system. However, analogous operations are, optionally, performed on a device with a display (e.g., the display 450 of FIG. 4B) and a separate touch-sensitive surface (e.g., the touch-sensitive surface 451 of FIG. 4B) in response to detecting the contacts on the touch-sensitive surface while displaying the user interfaces shown in the figures on the display, along with a focus selector.

FIGS. 11A-11JJ illustrate scanning of a physical environment and capturing various media items of the physical environment (e.g., representations of the physical environment such as images (e.g., photographs)) via one or more cameras (e.g., optical sensor(s) 164 of FIG. 1A or camera(s) 305 of FIG. 3B) of a computer system (e.g., device 100 of FIG. 1A or computer system 301 of FIG. 3B). Depending on the selected capture mode, the captured media items can be live view representation(s) of the physical environment or still view representation(s) of the physical environment. In some embodiments, the captured media items are displayed using a display generation component (e.g., touch-sensitive display 112 of FIG. 1A or display generation component 304 or 308 of FIG. 3B). In some embodiments, the cameras (optionally in combination with one or more time-of-flight sensors such as time-of-flight sensor 220 of FIG. 2B) acquire depth data of the physical environment that is used for creating a media item with a representation of the scanned physical environment (e.g., based on a three-dimensional model of the physical environment that is generated using the depth data). The depth data is also used to enhance user interactions with the scanned physical environment, for example by displaying dimensional information (e.g., measurements) of physical objects, constraining user-provided annotations to predefined locations in a representation of the physical environment, displaying different views of the physical environment, etc. During scanning and capturing, some features of the physical environment may be removed to provide a simplified representation (e.g., a simplified live view representation or a simplified still view representation) of the physical environment to be displayed on the display.

Figure 11A:
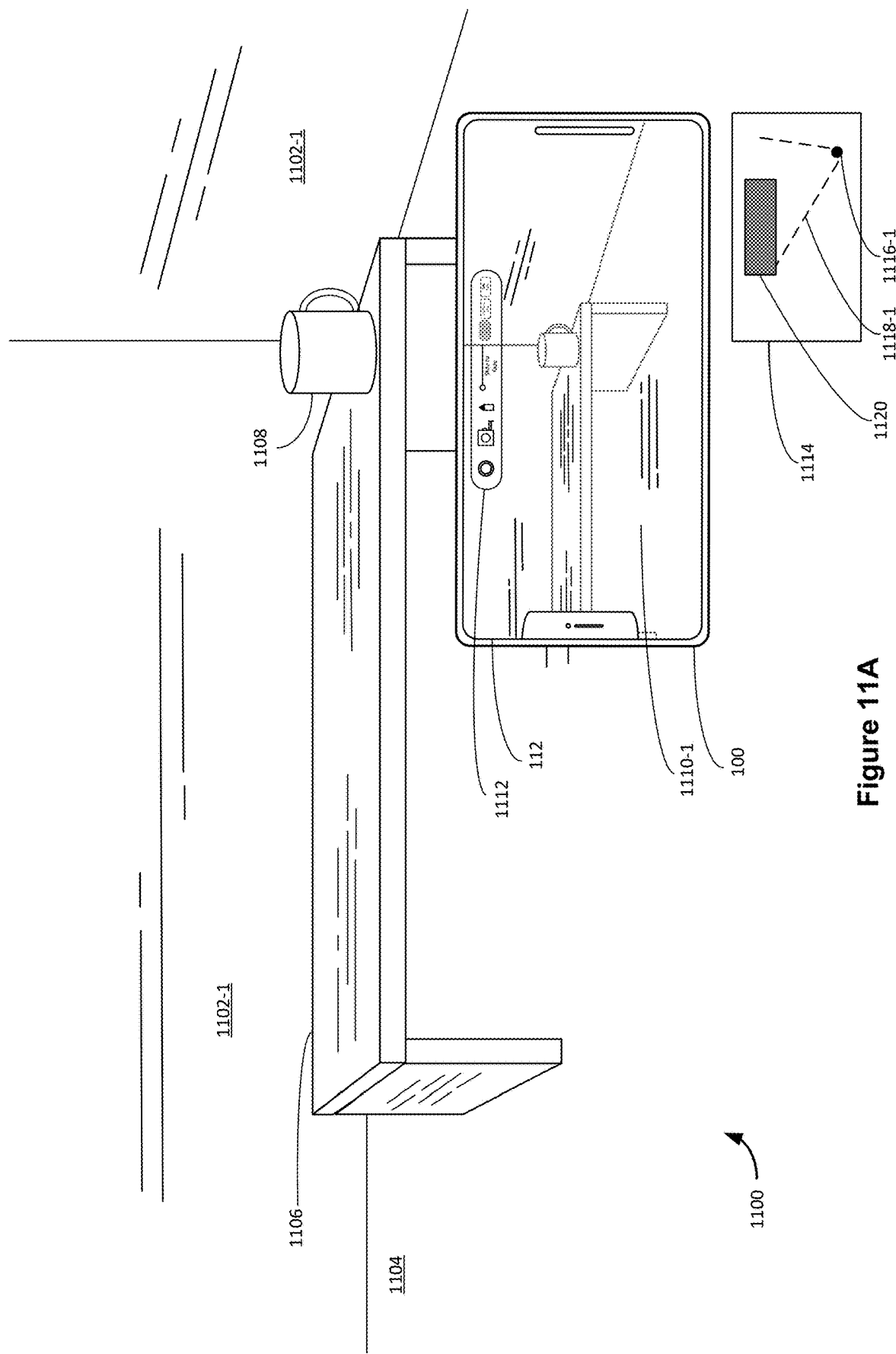
FIGS. 11A-11JJ illustrate example user interfaces for scanning a physical environment and adding annotations to captured media items of the physical environment in accordance with some embodiments.
Figure 12A:
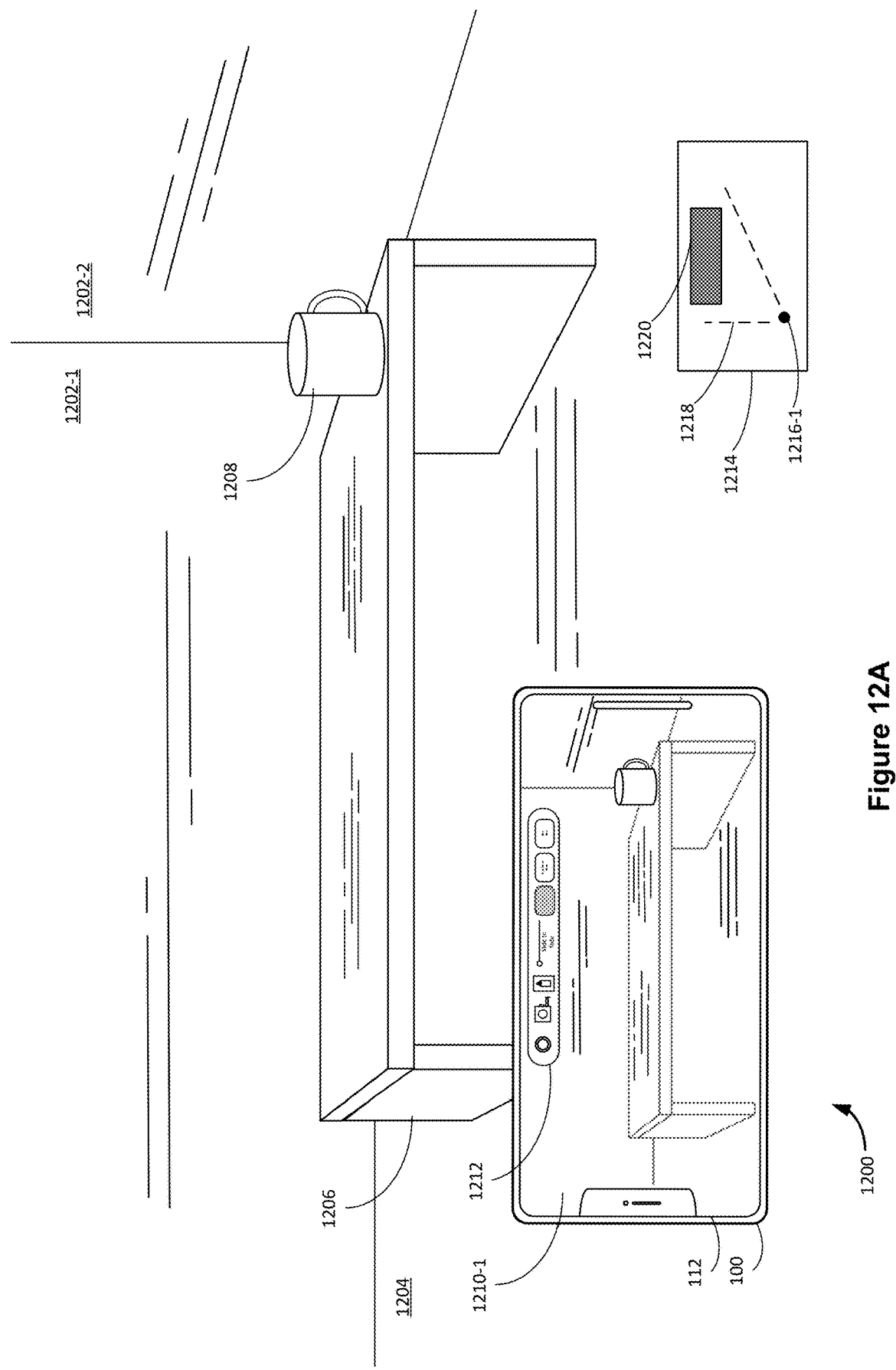
FIGS. 12A-12RR illustrate example user interfaces for scanning a physical environment and adding measurements corresponding to objects in captured media items of the physical environment in accordance with some embodiments.
Figure 12B:
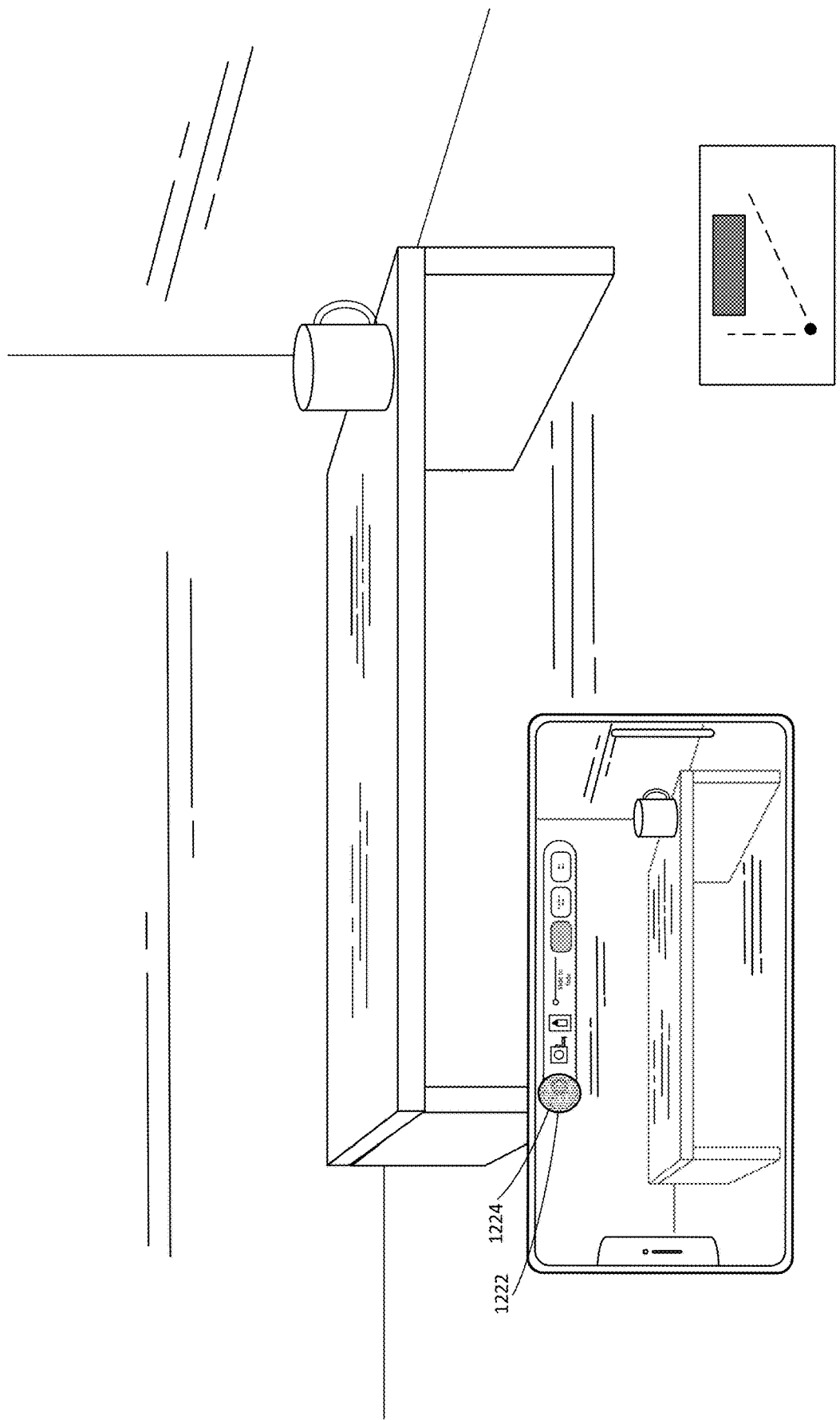
Figure 12C:
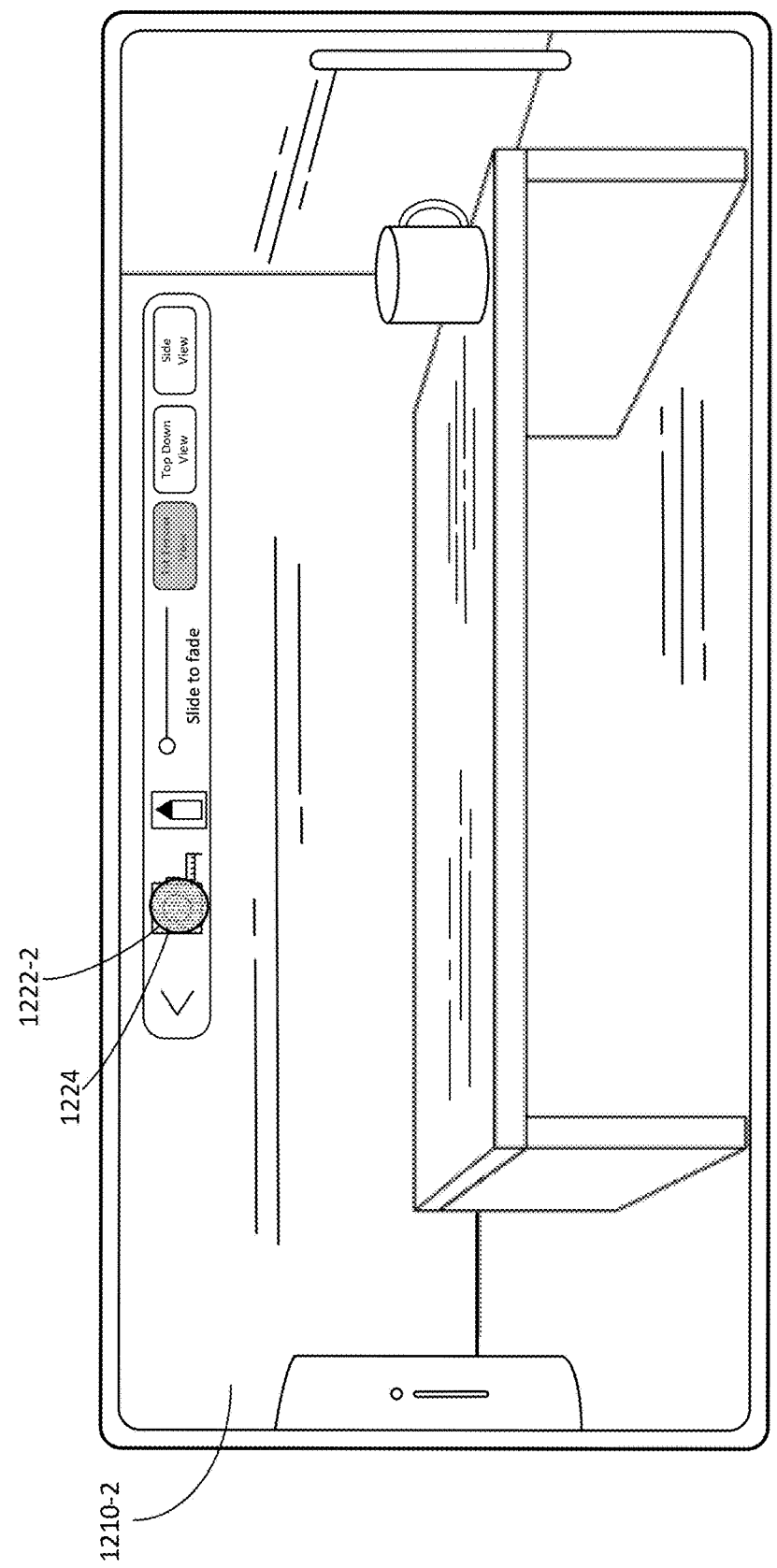
Figure 12D:
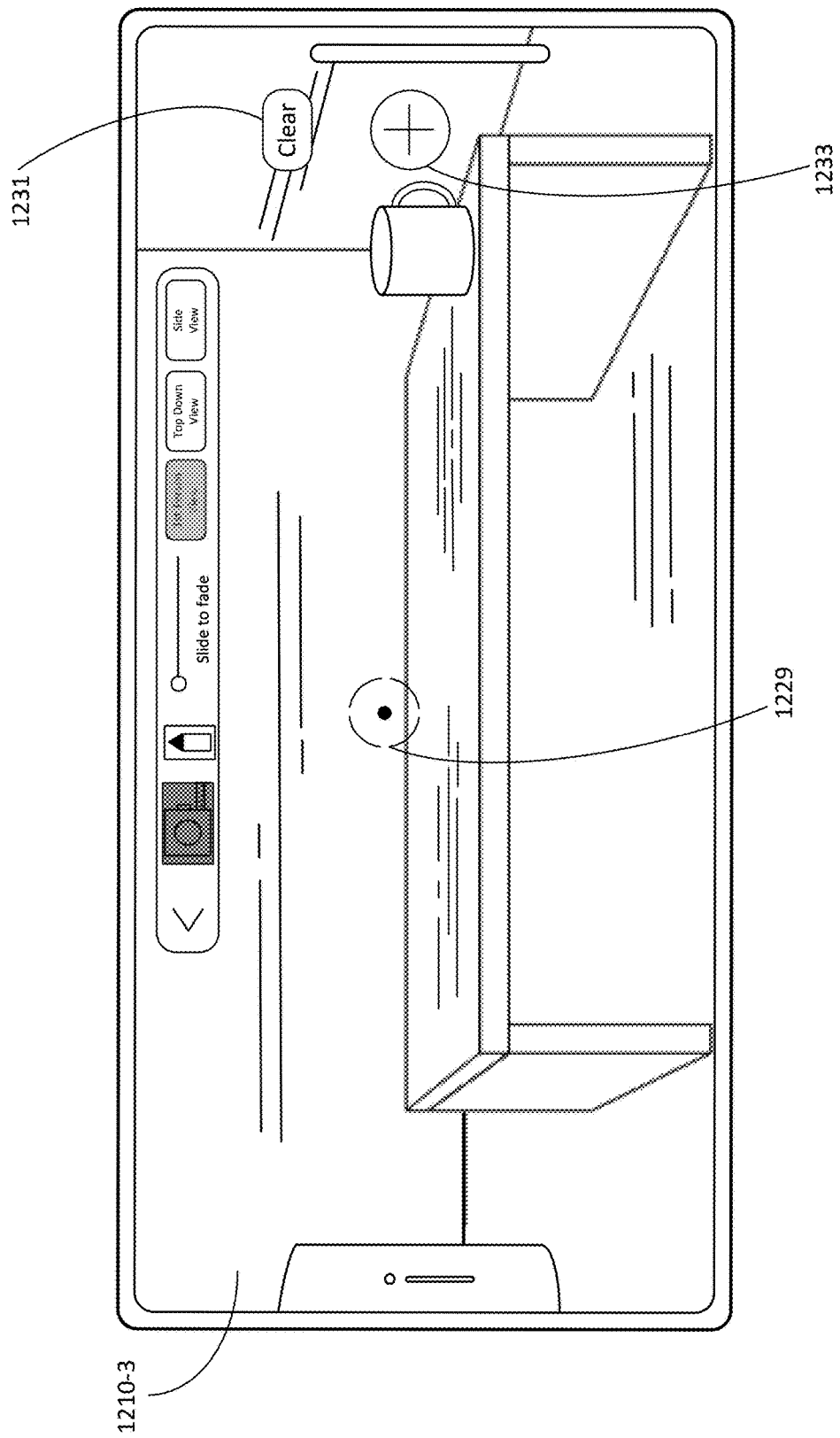
Figure 12E:
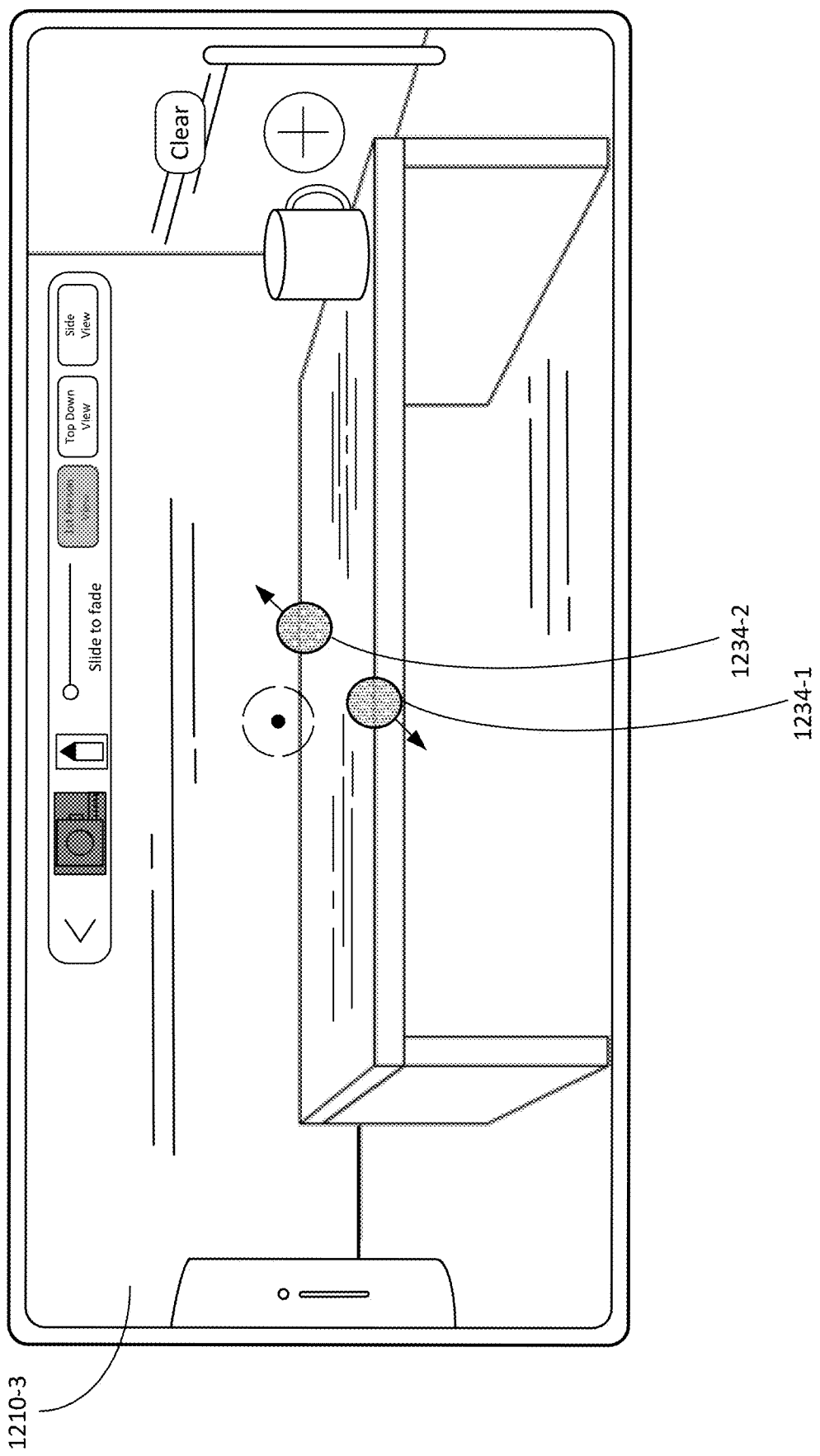
Figure 12F:
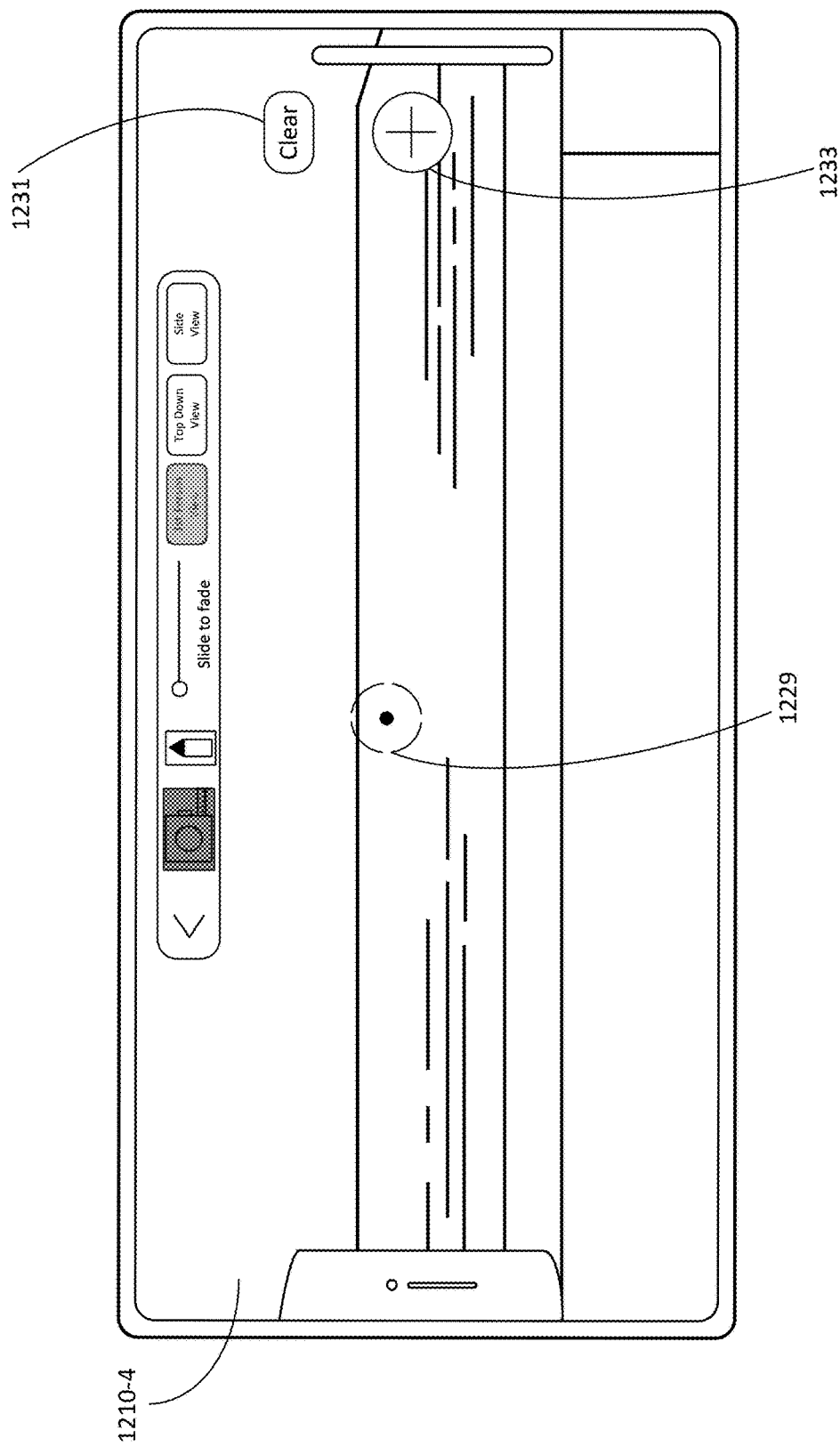
Figure 12G:
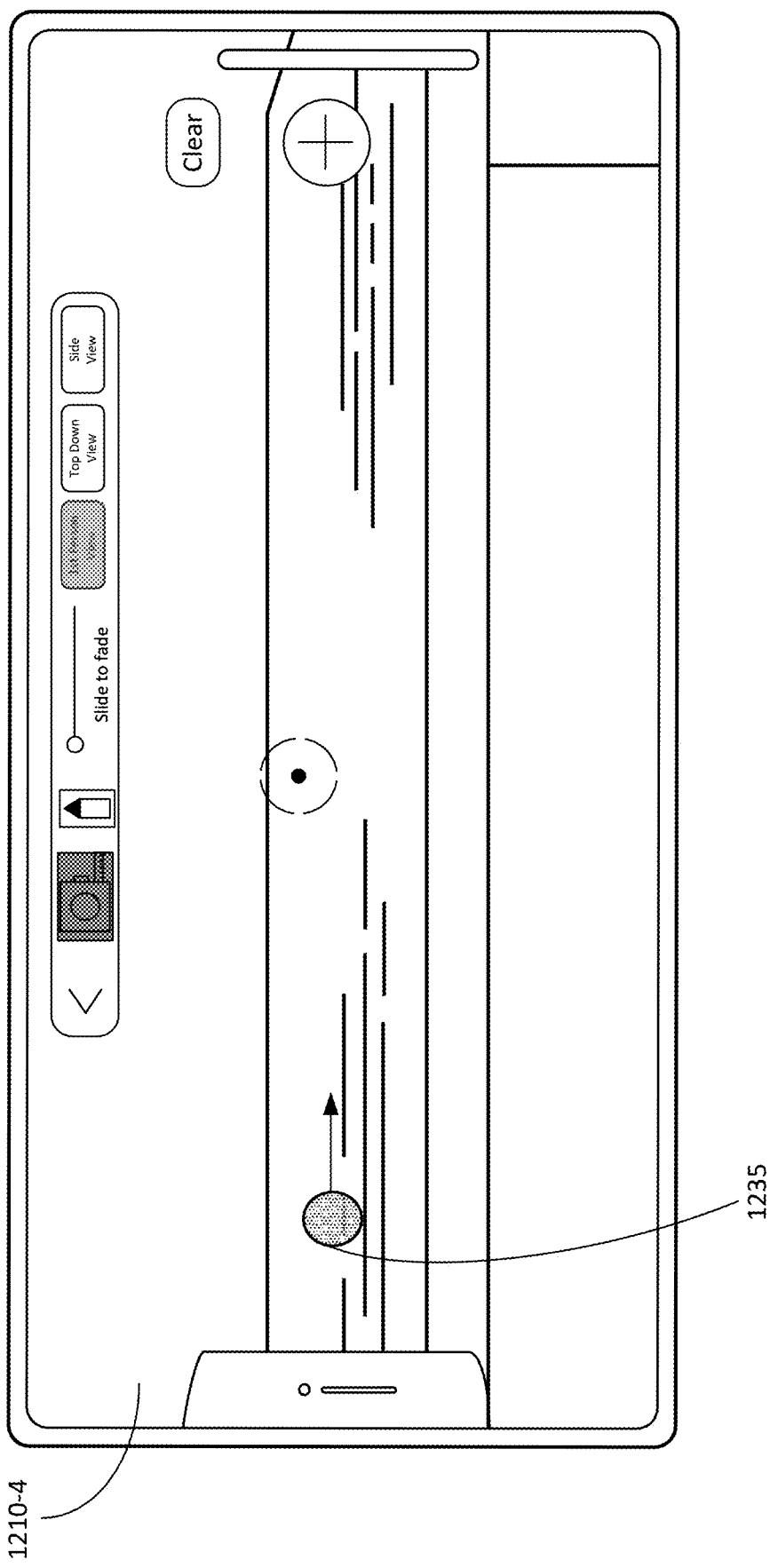
Figure 12H:
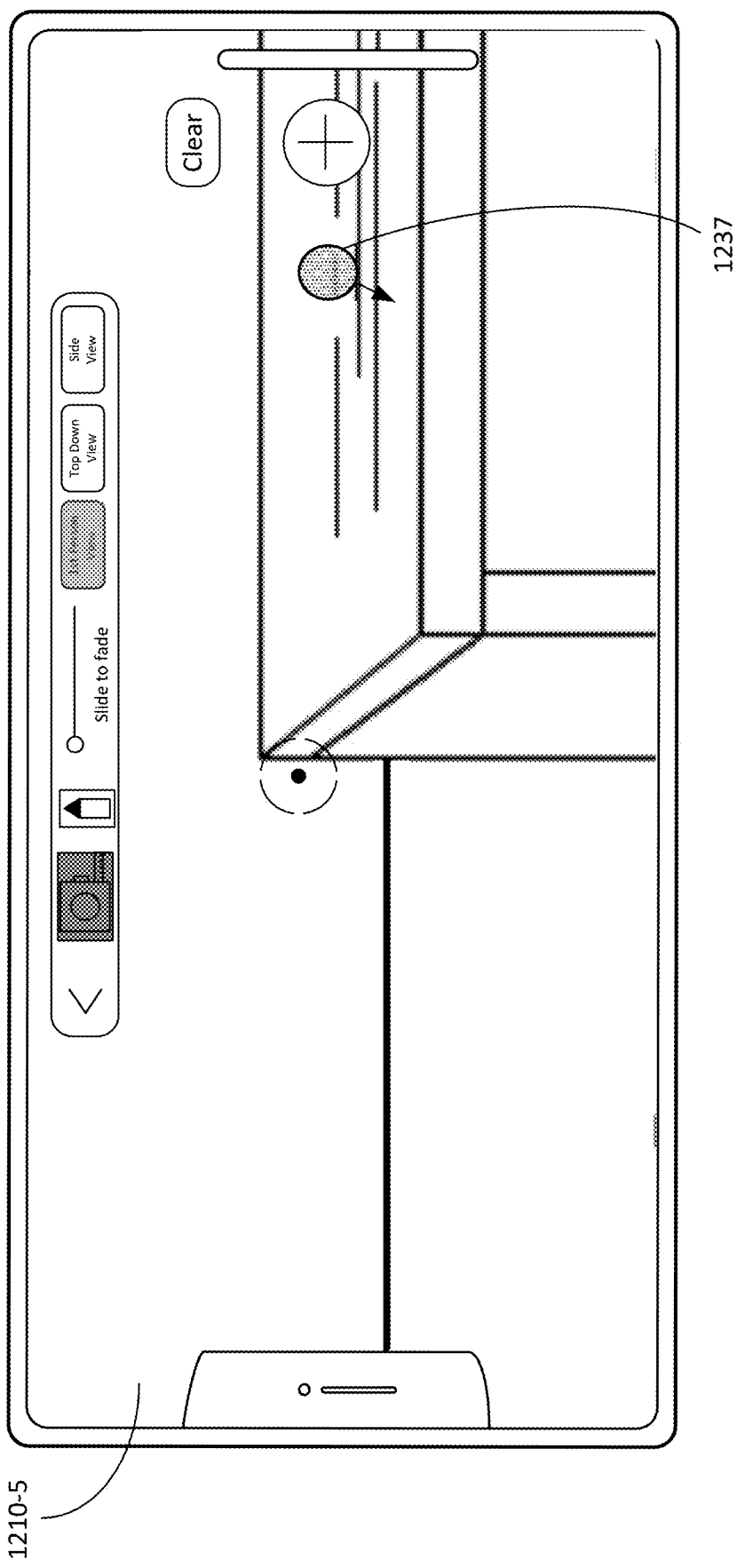
Figure 12I:
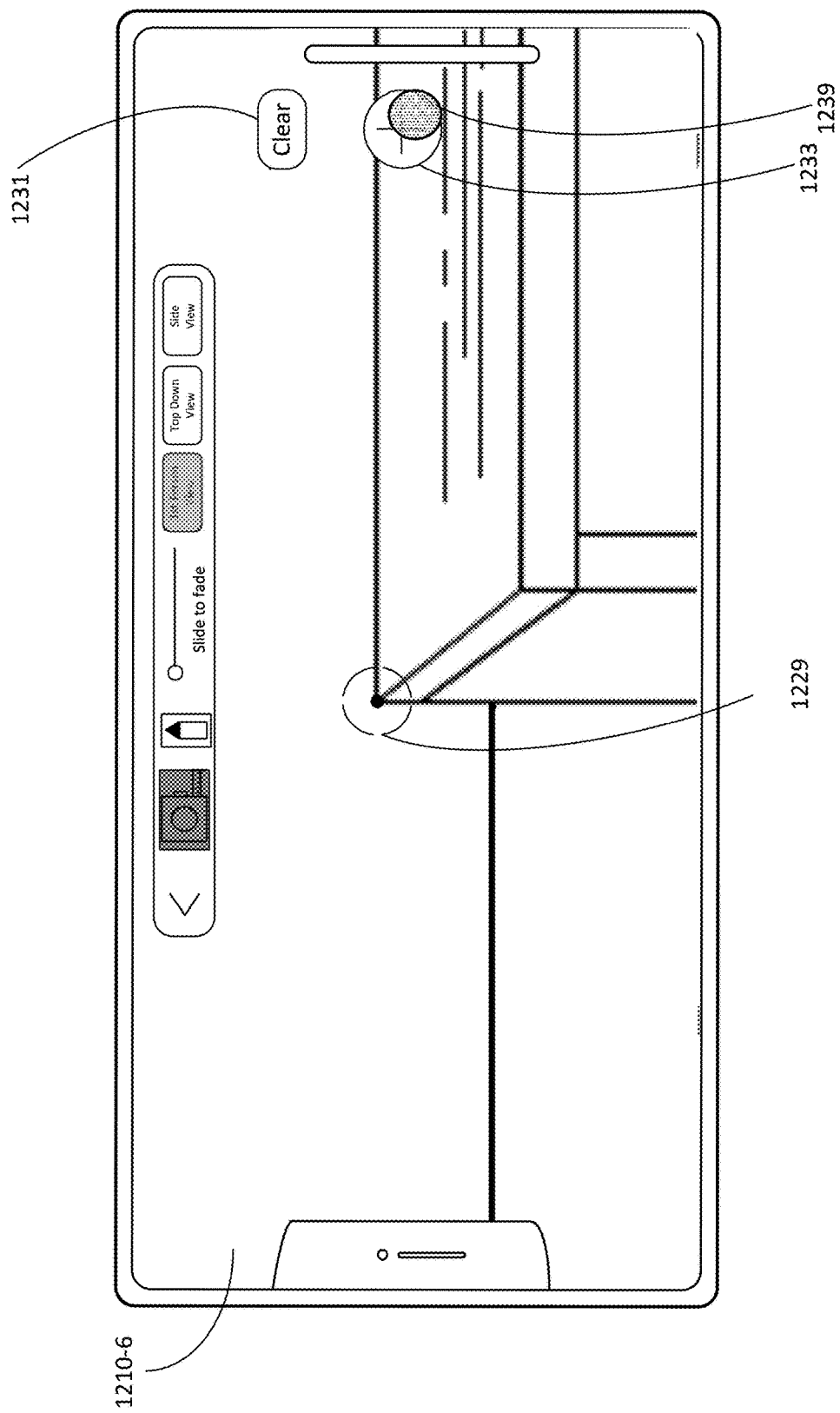
Figure 12J:
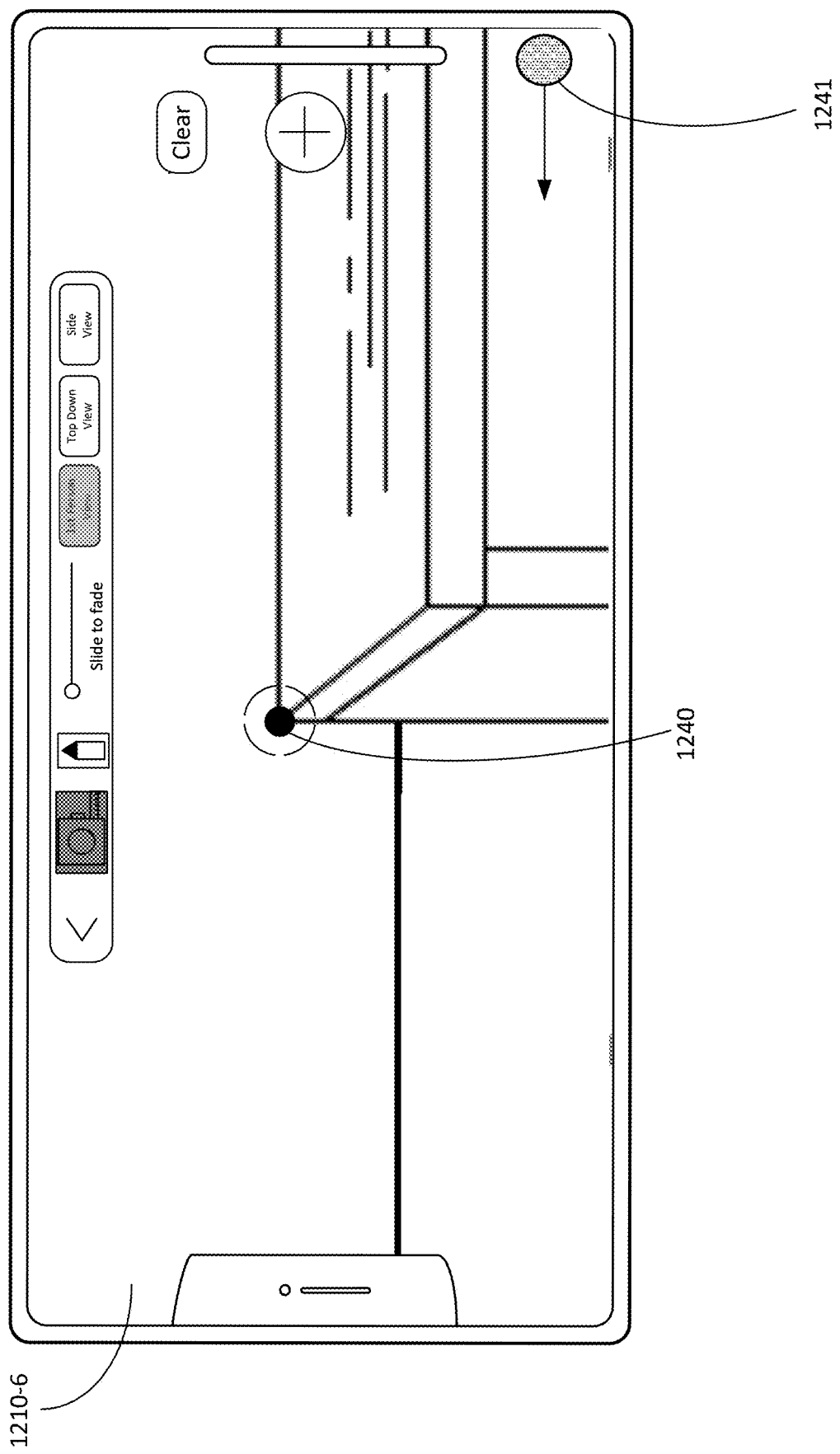
Figure 12K:
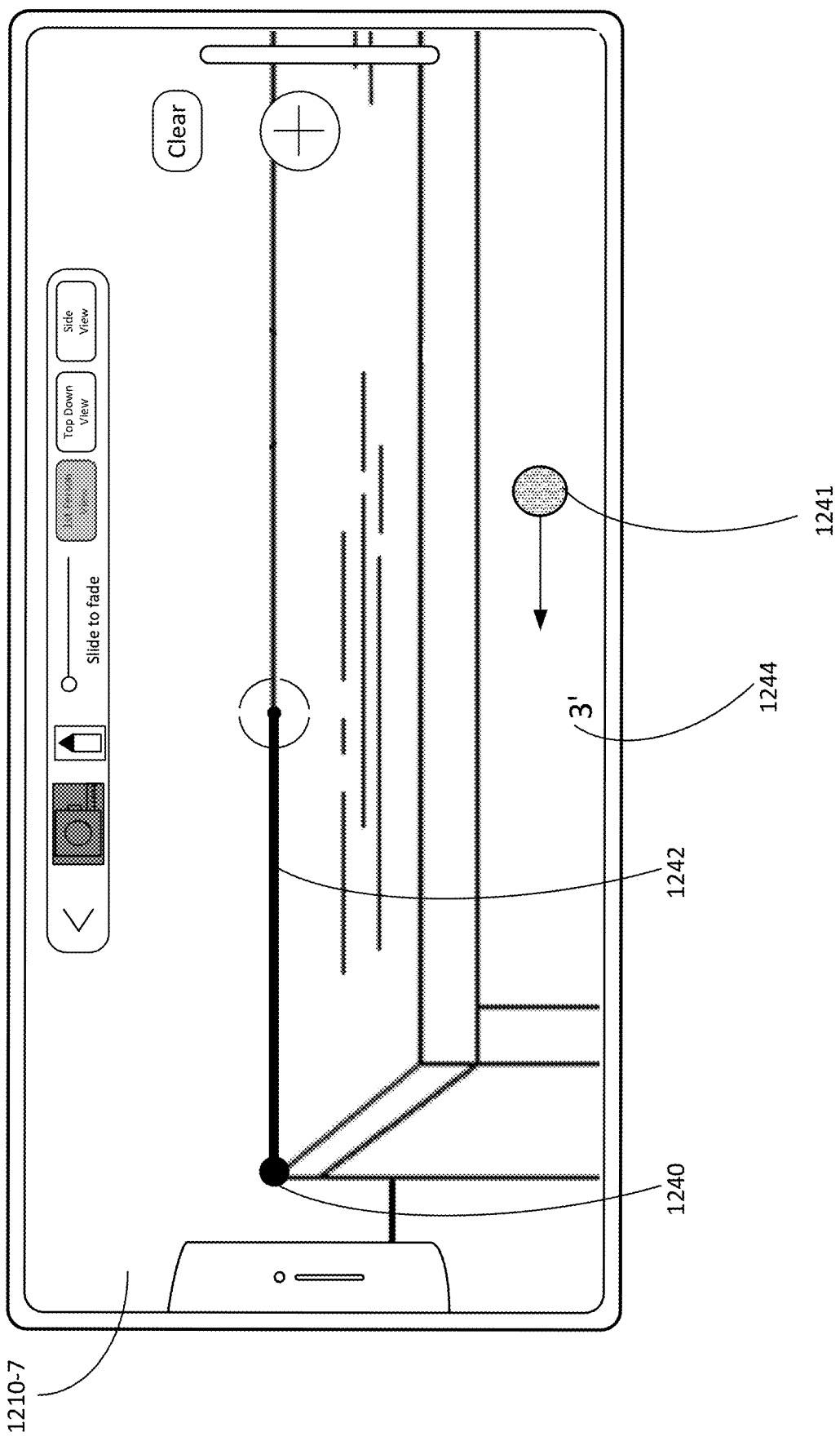
Figure 12L:
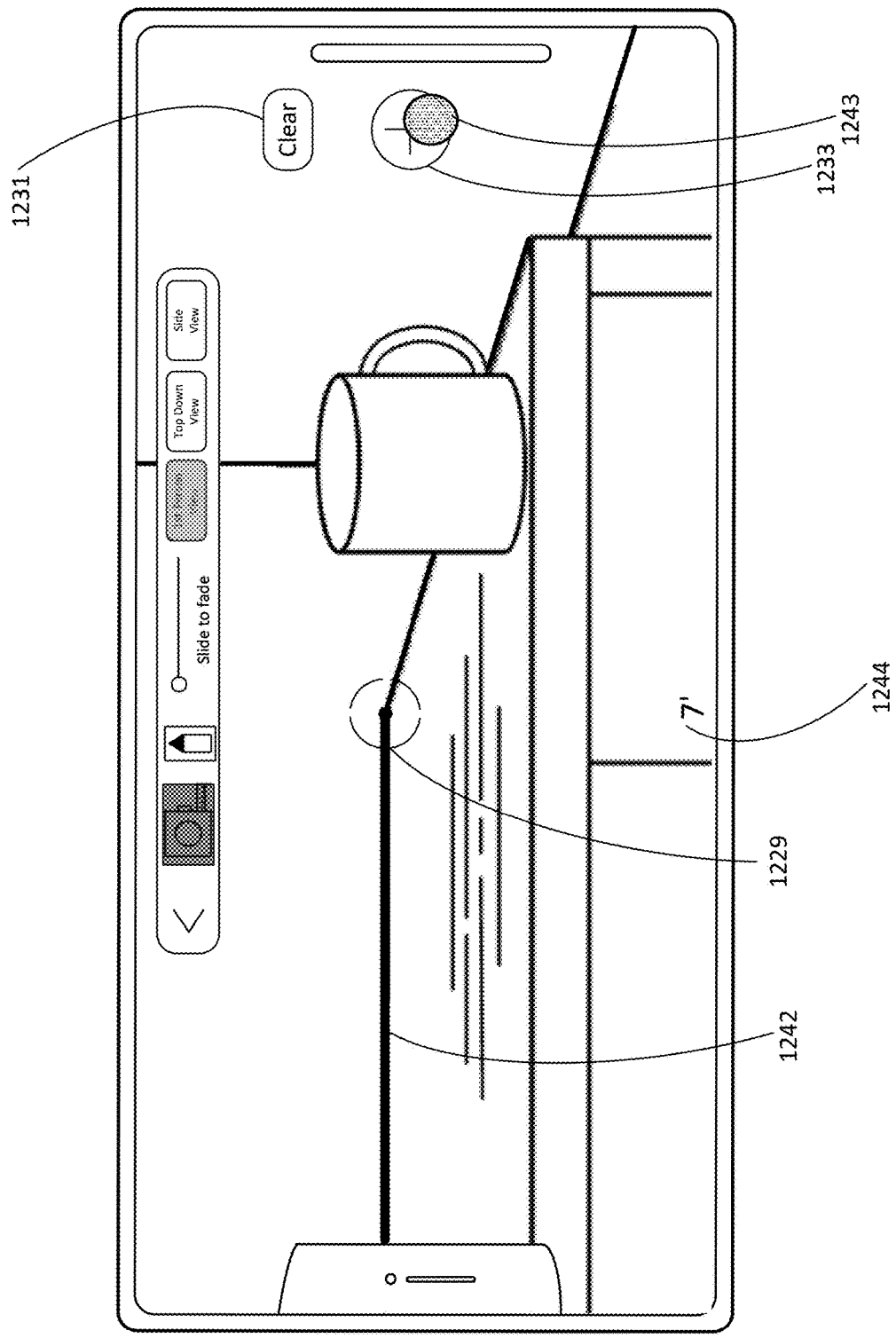
Figure 12M:
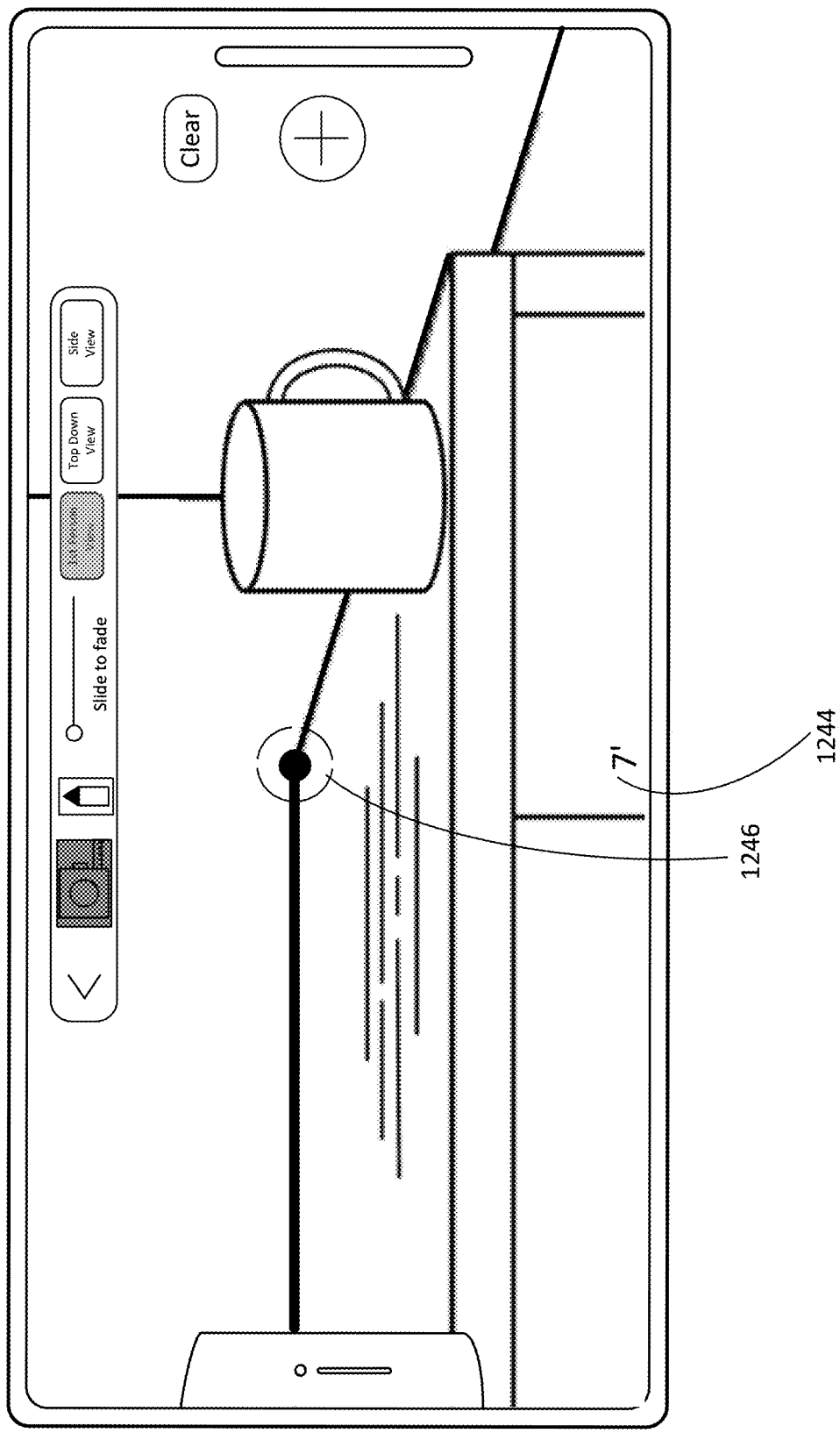
Figure 12N:
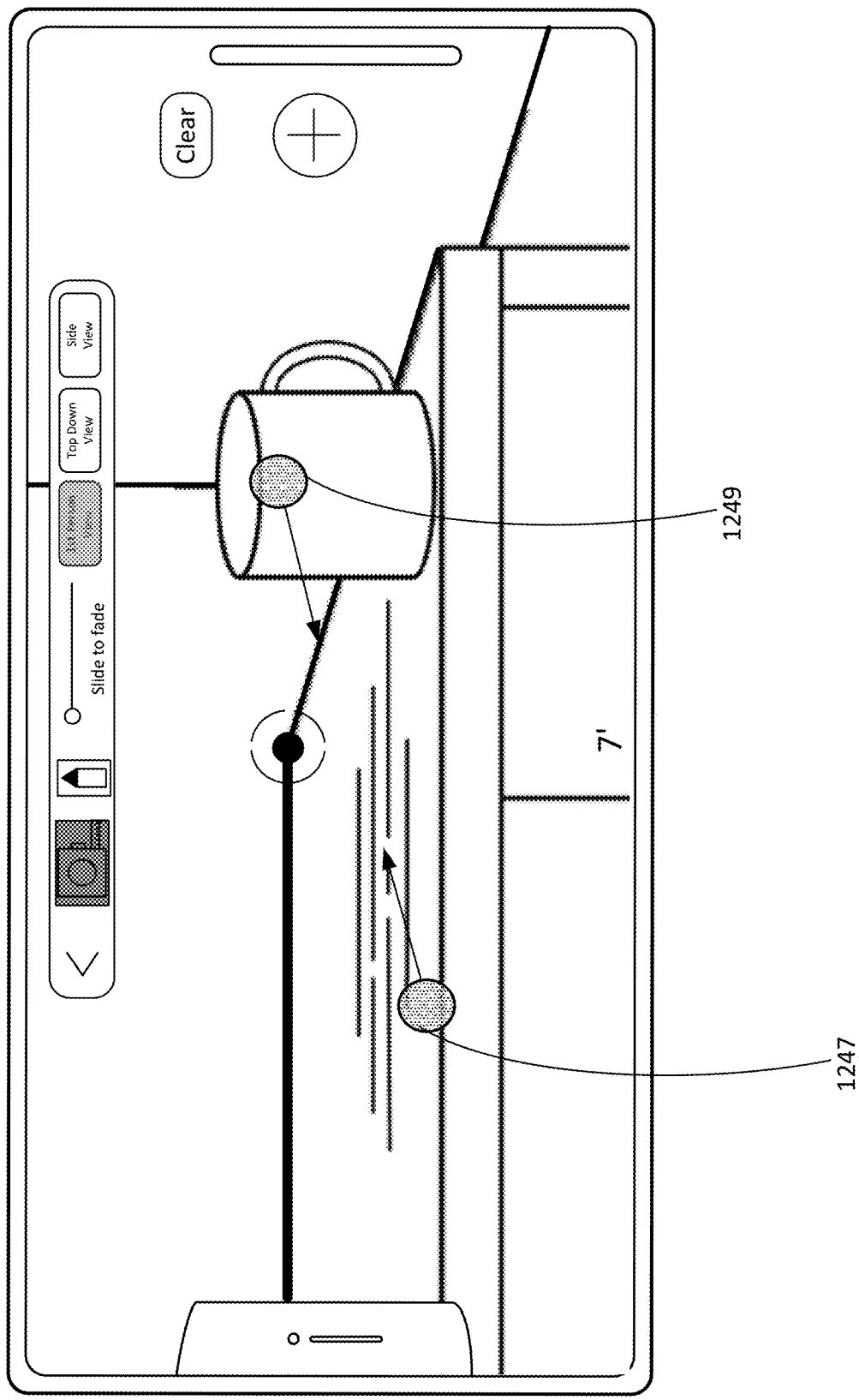

FIG. 11A illustrates physical environment 1100. Physical environment 1100 includes a plurality of structural features including two walls 1102-1 and 1102-2 and floor 1104. Additionally, physical environment 1100 includes a plurality of non-structural objects including table 1106 and mug 1108 placed on top of table 1106. The system displays user interface 1110-1 that includes a live view representation of physical environment 1100. User interface 1110-1 also includes control bar 1112 with a plurality of controls for interacting with the live view representation of physical environment 1100 and for switching to different views of physical environment 1100.

To illustrate the position and orientation of the cameras of the system in physical environment 1100 during scanning, FIG. 11A also includes legend 1114 that illustrates a top-down schematic view of the cameras relative to physical environment 1100. The top-down schematic view indicates camera location 1116-1, camera field of view 1118-1, and schematic representation 1120 of table 1106.

Figure 11B:
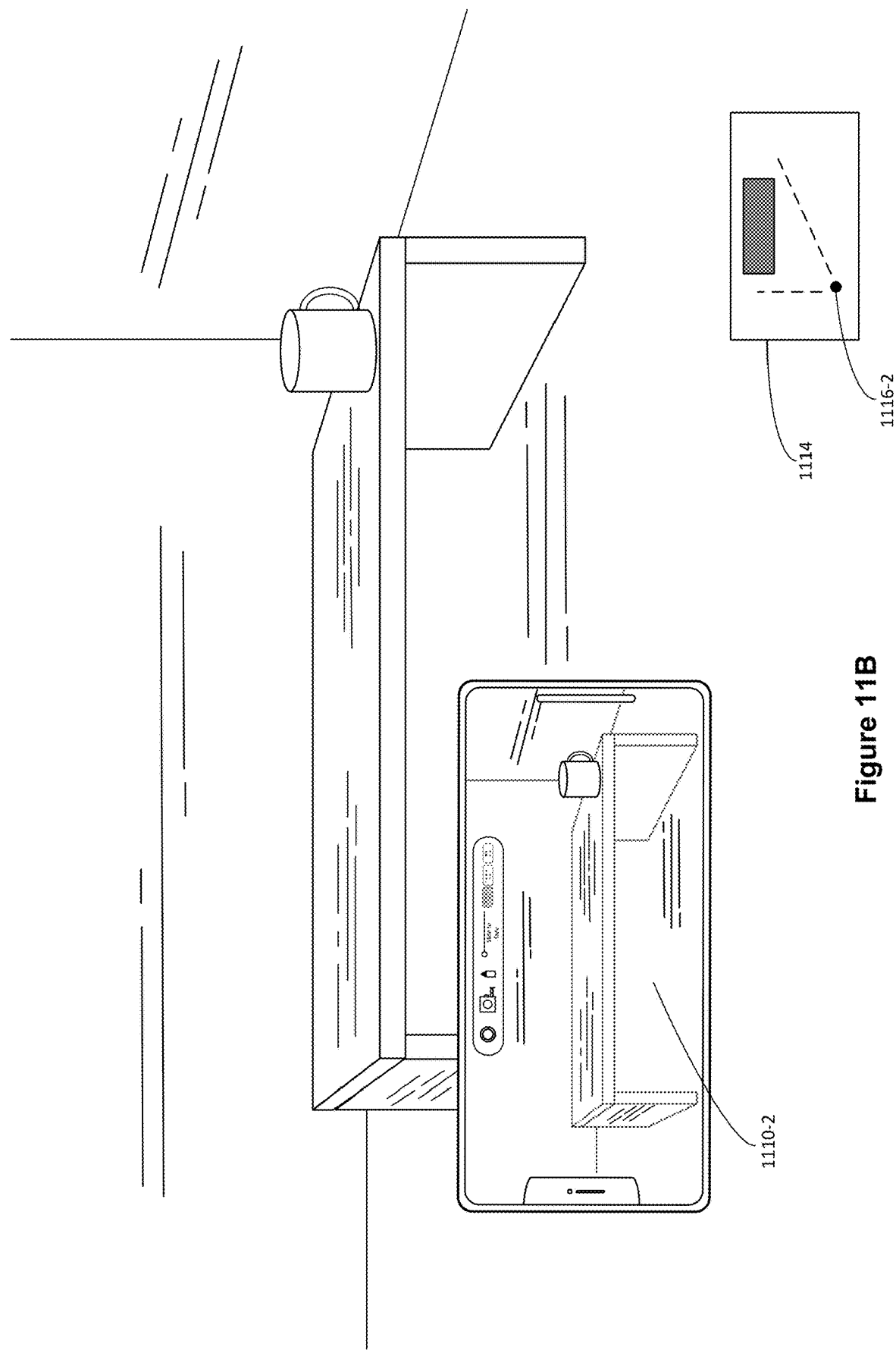

FIG. 11B illustrates that device 100 and its cameras have been moved to a different location during the scanning. To signify this change in camera location, legend 1114 displays an updated top-down schematic view including an updated camera location 1116-2. As a result of the cameras moving to camera location 1116-2, the system displays a different live view representation of physical environment 1100 in an updated user interface 1110-2, from the perspective of the cameras at camera location 1116-2.

Figure 11C:
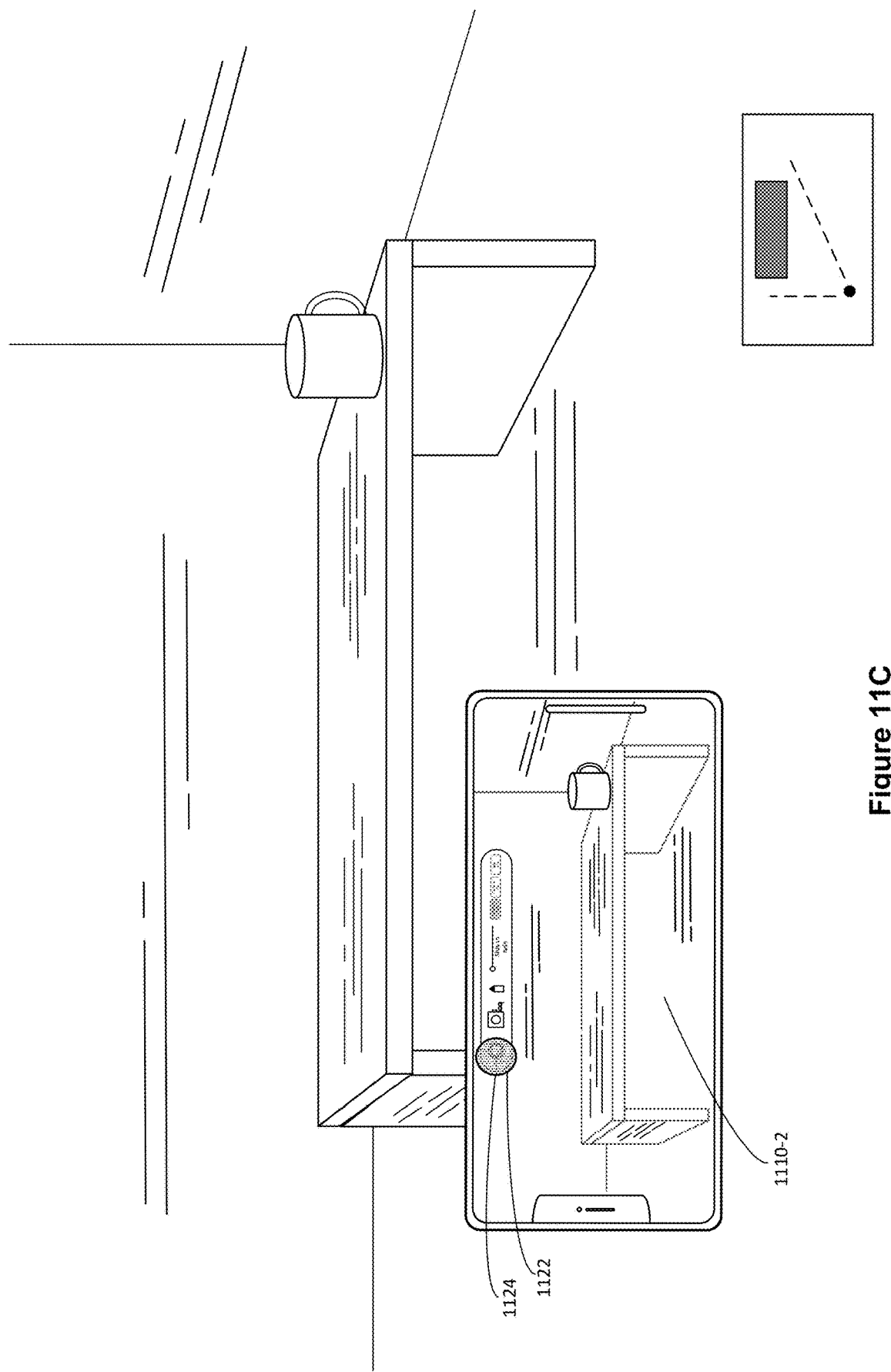

FIG. 11C illustrates that the user captures a still view representation of the physical environment 1100 by placing contact 1122 on record control 1124 in user interface 1110-2.

Figure 11D:
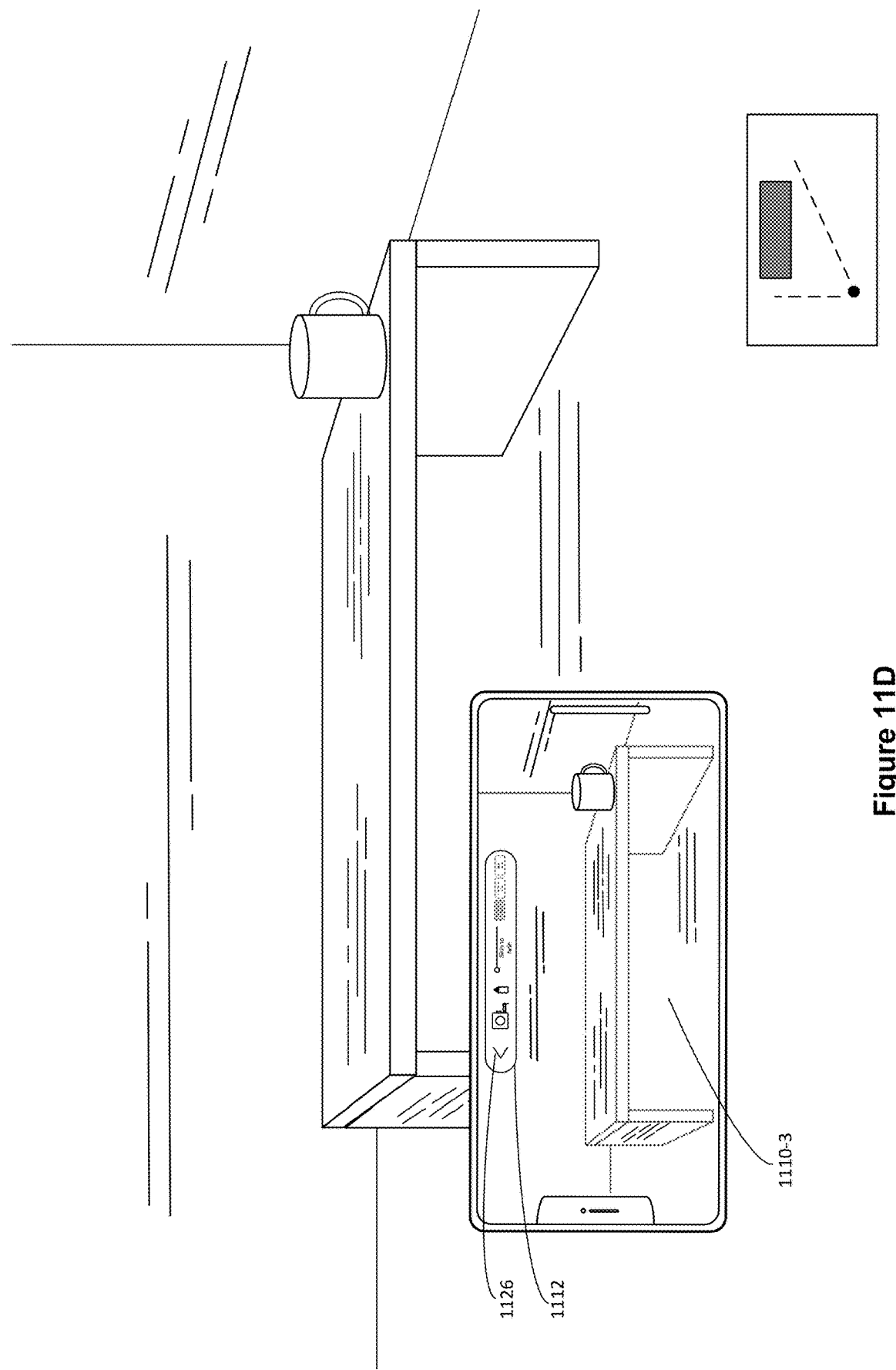

FIG. 11D illustrates that in response to the user input by contact 112 on record control 1124, a still view representation of physical environment 1100 is captured, and the system displays updated user interface 1110-3 showing the still view representation and an updated control bar 1112. In control bar 1112, record control 1124 (shown in FIG. 11C) is replaced with back control 1126 that, when activated, results in display of (e.g., redisplay of) a live view representation of physical environment 1110.

Figure 11E:
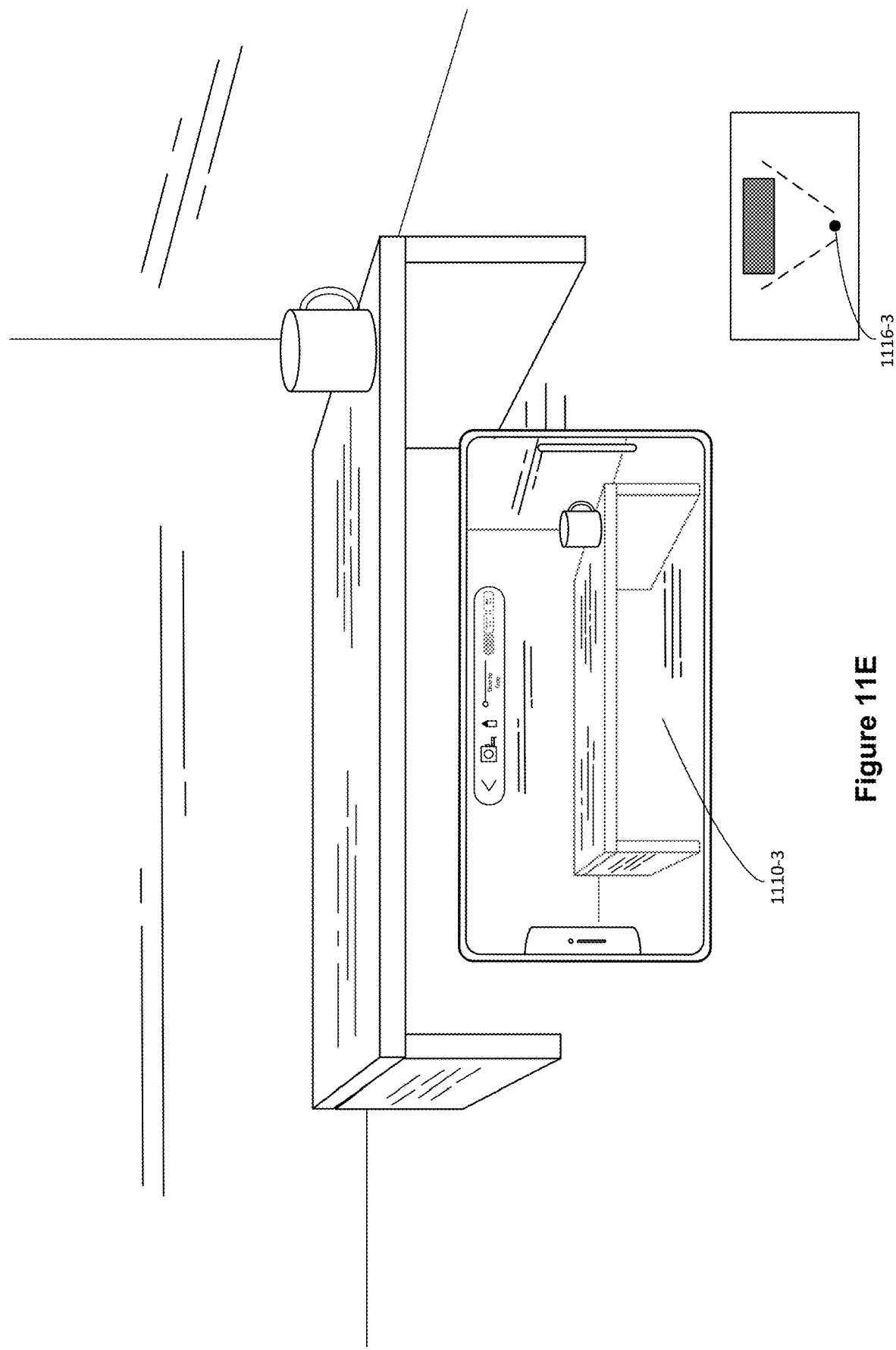

FIG. 11E illustrates that display of the still view representation of physical environment 1110 (as captured in FIGS. 11C-11D) is maintained in user interface 1110-3 even when the cameras are moved to a different camera location 1116-3 (e.g., unlike the live view representation (FIGS. 11A-11B), which is updated as the cameras move).

Figure 11F:
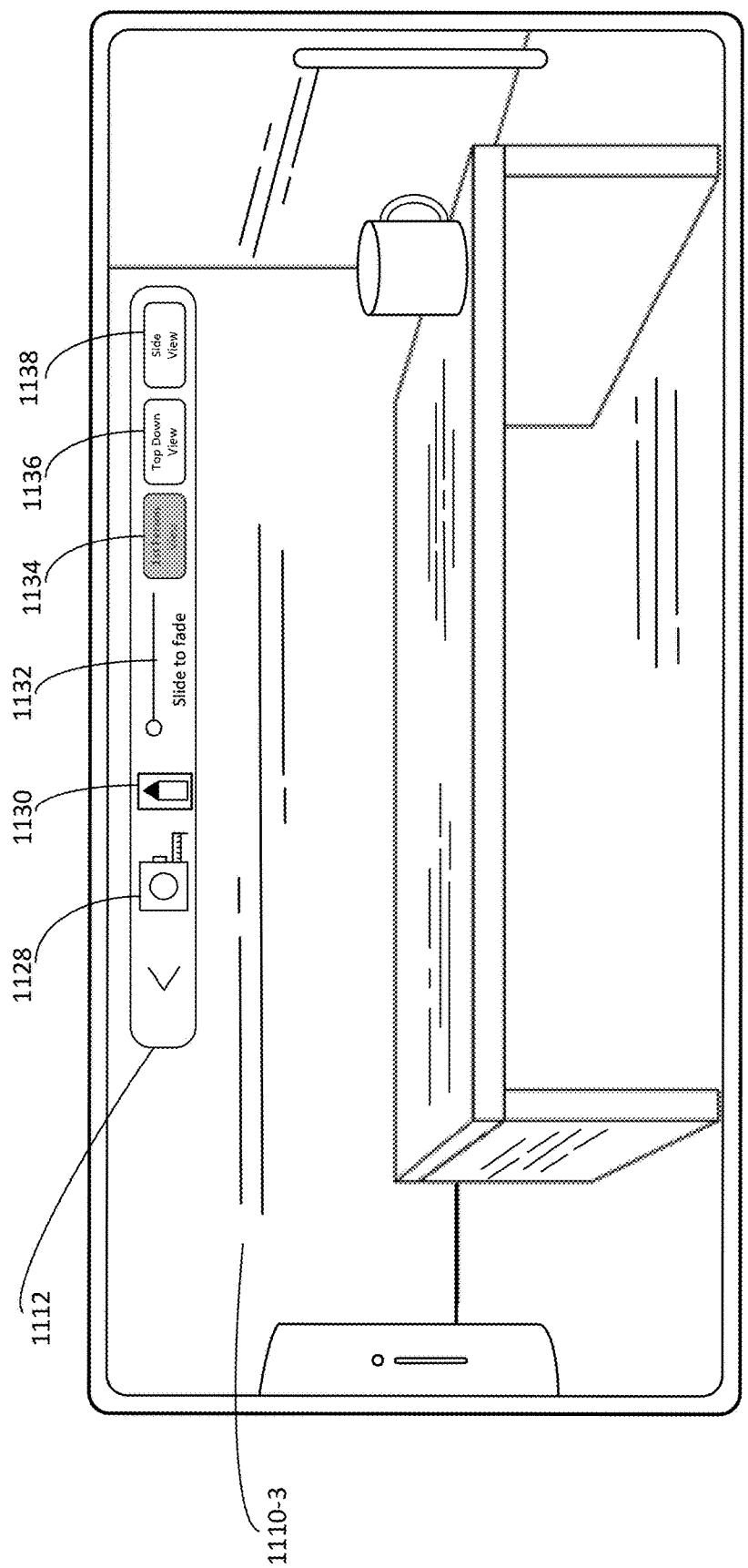

FIG. 11F illustrates an enlarged view of user interface 1110-3 including the still view representation of physical environment 1110. Control bar 1112 includes a plurality of controls for interacting with the still view representation of physical environment 1110, including measurement control 1128, annotation control 1130, "Slide to Fade" control 1132, "1st Person View" control 1134, "Top Down View" control 1136, and "Side View" control 1138. In the example shown in FIG. 11F, "1st Person View" control 1134 is selected (e.g., highlighted in the control bar 1112). Accordingly, user interface 1110-3 includes a first-person view (e.g., front perspective view) of physical environment 1100, captured from the perspective of the cameras at camera location 1116-3 (FIG. 11E).

Figure 11G:
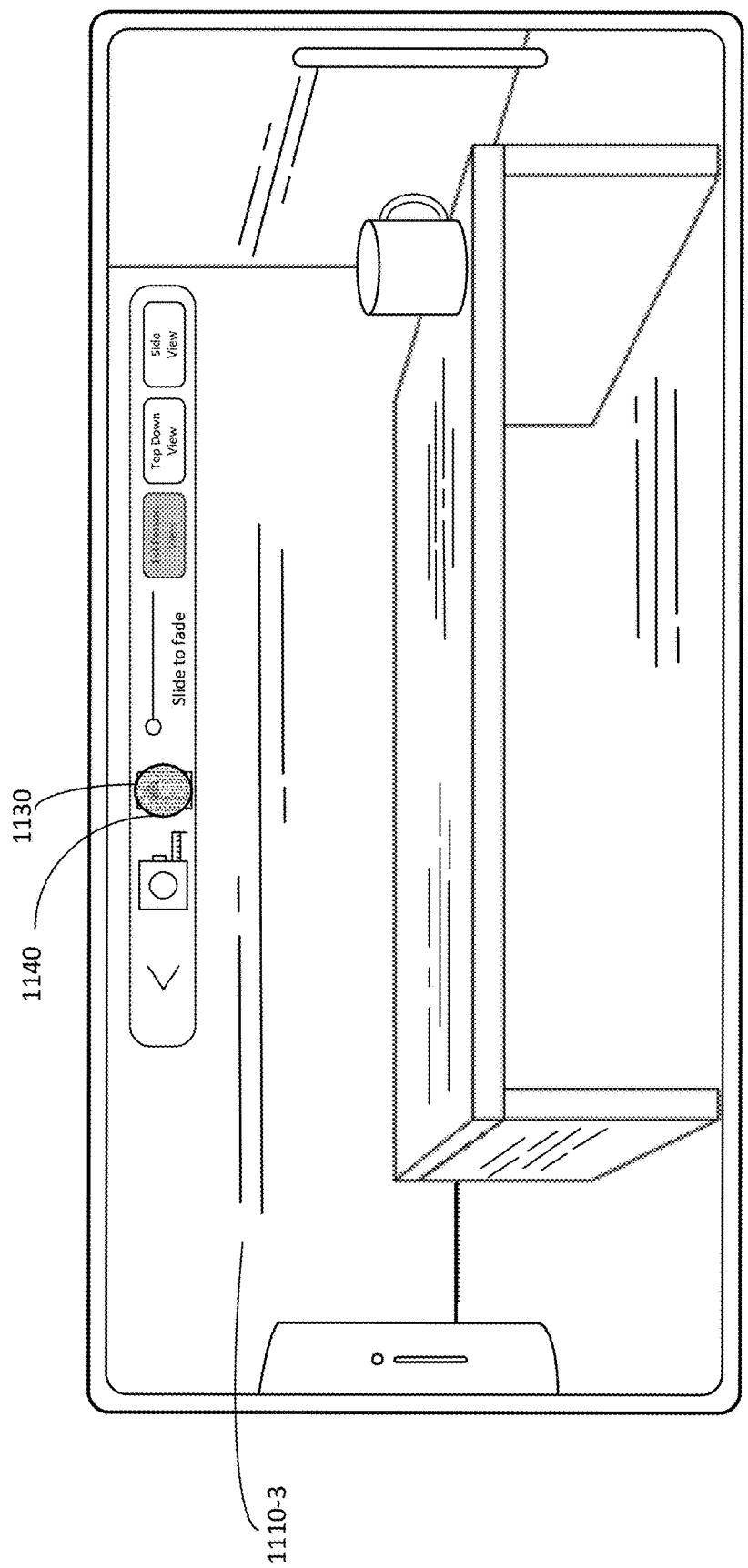
Figure 11H:
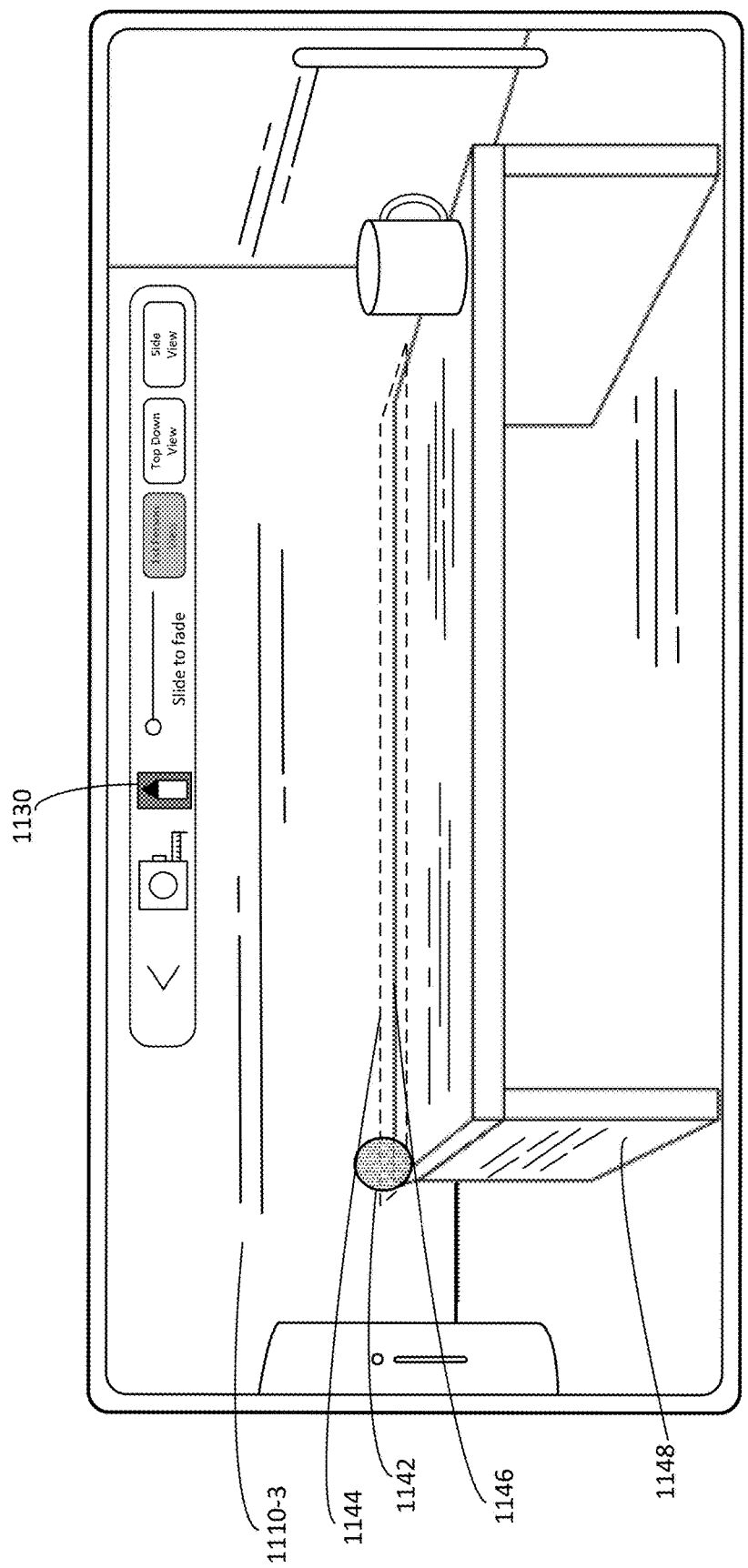

FIGS. 11G-11L illustrate adding an annotation to the still view representation of physical environment 1100. FIG. 11G illustrates selection (e.g., by a user) of annotation control 1130 by contact 1140. FIG. 11H illustrates that, in response to selection of annotation control 1130, annotation control 1130 is highlighted. User interface 1110-3 then enters an annotation session (e.g., an annotation mode) that allows a user to add annotations to the still view representation of physical environment 1100.

FIG. 11H illustrates contact 1142 initiating annotation of user interface 1110-3 beginning at a location in user interface 1110-3 corresponding to a physical location along edge 1146 (e.g., a representation of an edge) of table 1148 (e.g., a representation of table 1106, FIG. 11A) in physical environment 1100. Bounding box 1144 in FIG. 11H indicates a region within a threshold distance of edge 1146. In some embodiments, in response to contact 1142, the system displays bounding box 1144 over a portion of the still view representation of the physical environment 1100 (e.g., encompassing an edge 1146 of the table 1148). In some embodiments, bounding box 1144 is not displayed, and is included in FIG. 11H merely to indicate an invisible threshold. In some embodiments, one or more properties of bounding box 1144 (e.g., size, location, orientation, etc.) are determined based on the location and/or movement of contact 1142 and a corresponding (e.g., nearest) feature in the still view representation of physical environment 1100. For example, in FIG. 11H, edge 1146 is the closest feature to the location of contact 1142. As a result, bounding box 1144 encompasses edge 1146. In some embodiments, when two or more features (e.g., two edges of a table) are equidistant from the location of contact 1142 (or within a predefined threshold distance from the location of contact 1142), two or more bounding boxes may be used, each encompassing a respective feature. In some embodiments, depth data recorded from the physical environment (e.g., by one or more cameras and/or one or more depth sensors) is used to identify features in the still view (or live view) representation of physical environment 1100.

Figure 11I:
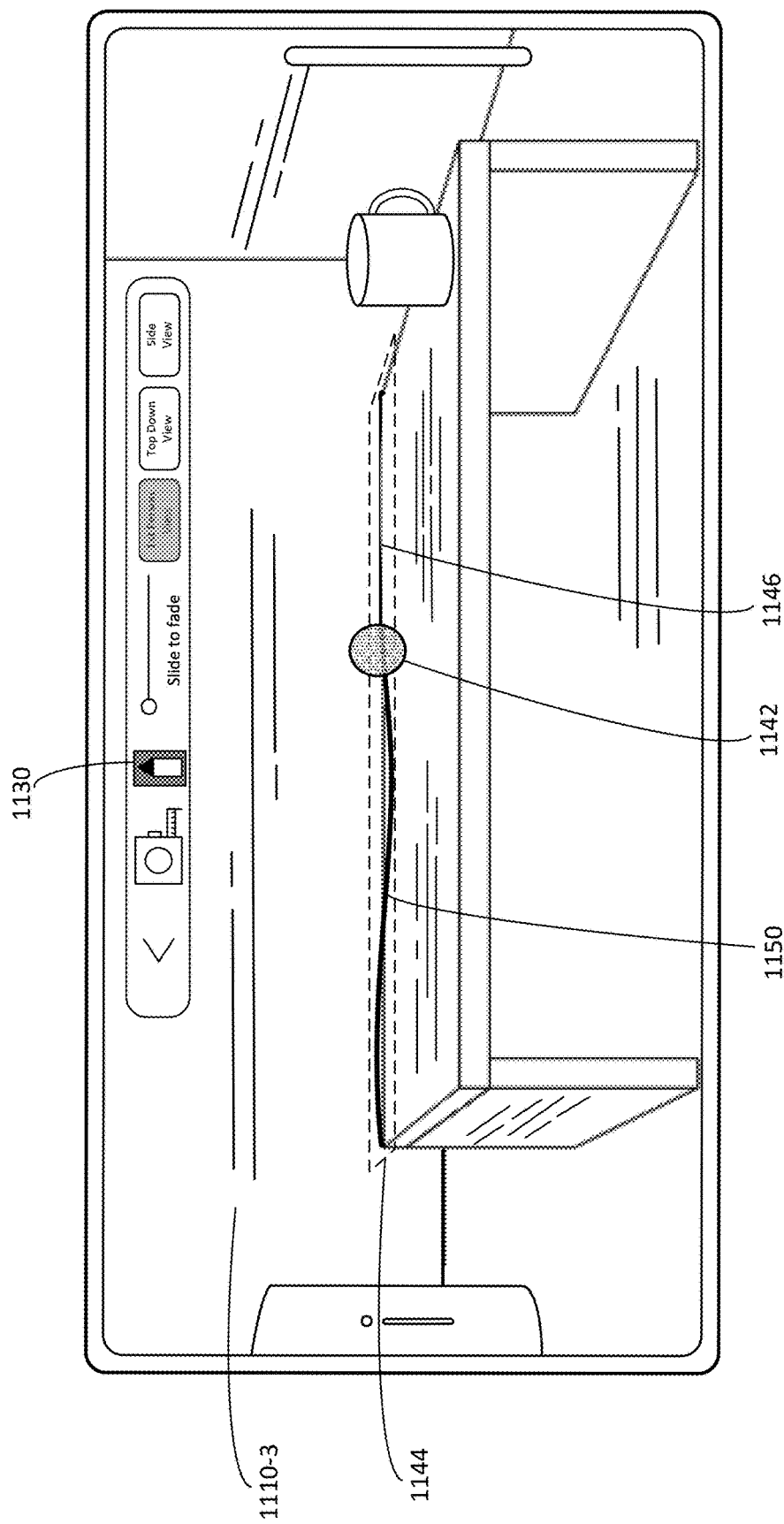
Figure 11J:
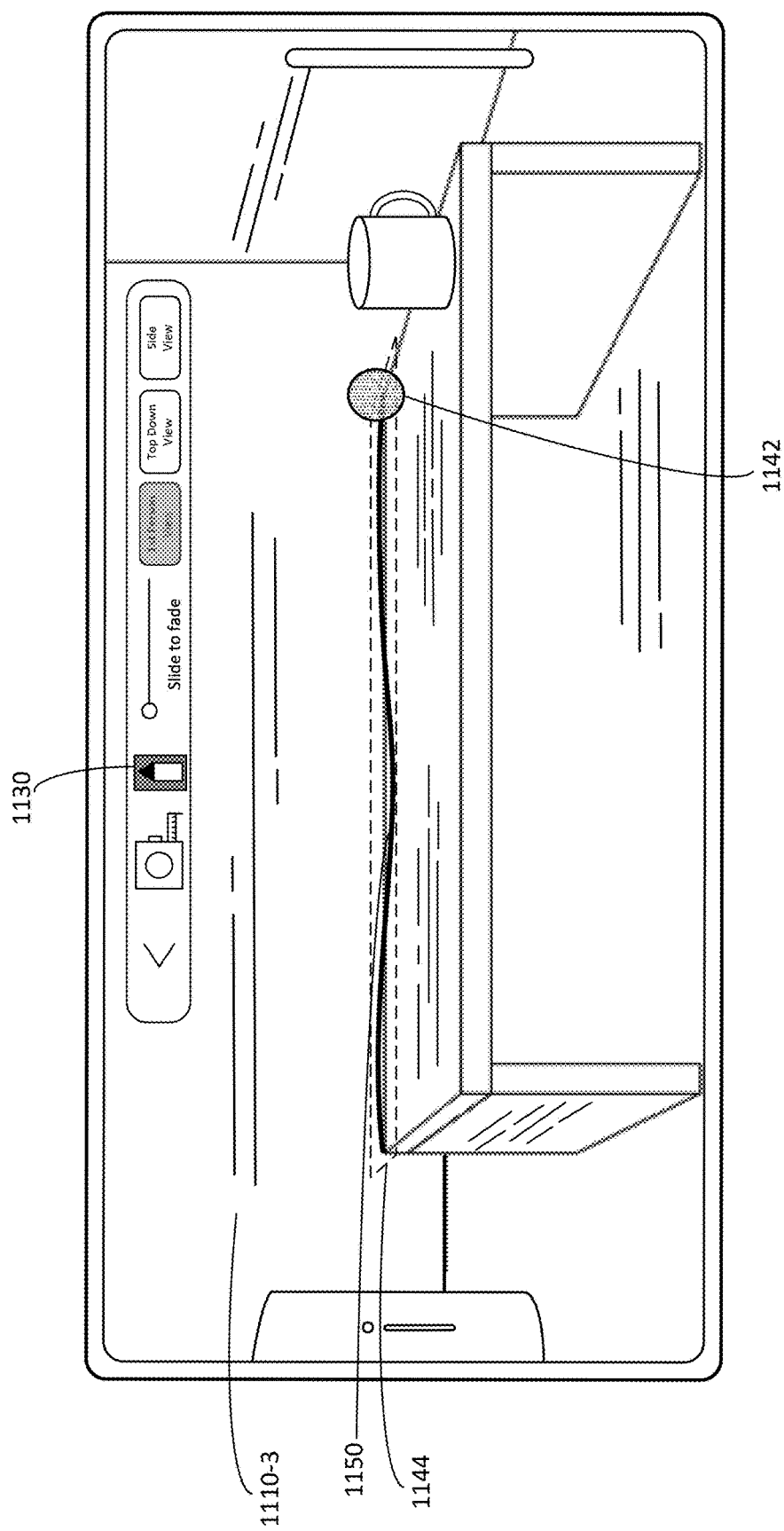

FIGS. 11I-11J show movement of contact 1142 across user interface 1110-3 along a path that corresponds to edge 1146. The path of contact 1142 is entirely within bounding box 1144. Annotation 1150 is displayed along the path of contact 1142 as contact 1142 moves. In some embodiments, annotation 1150 is displayed with a predefined (or, in some embodiments, user-selected) color and thickness to distinguish annotation 1150 from features (e.g., edge 1146) included in the still view representation of physical environment 1110-3.

Figure 11K:
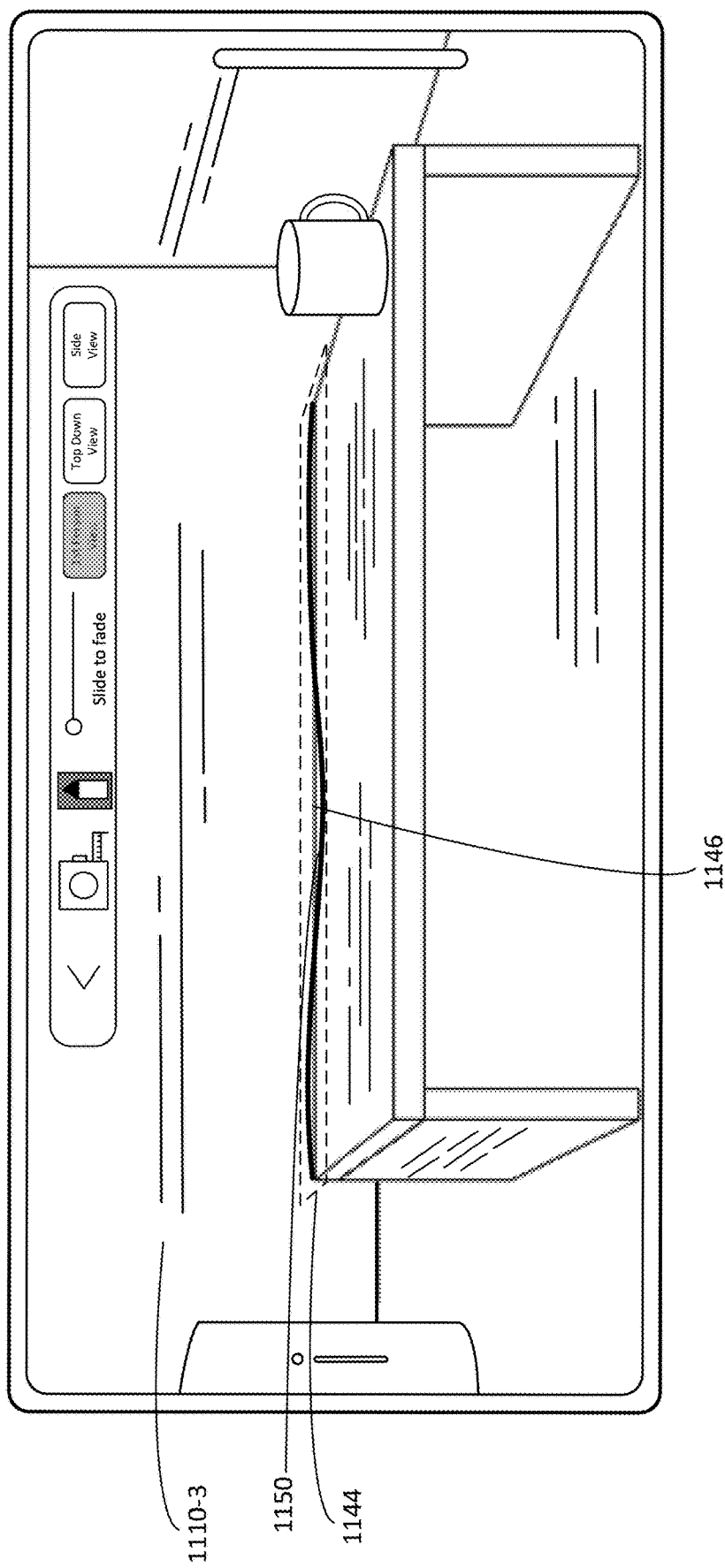
Figure 11L:
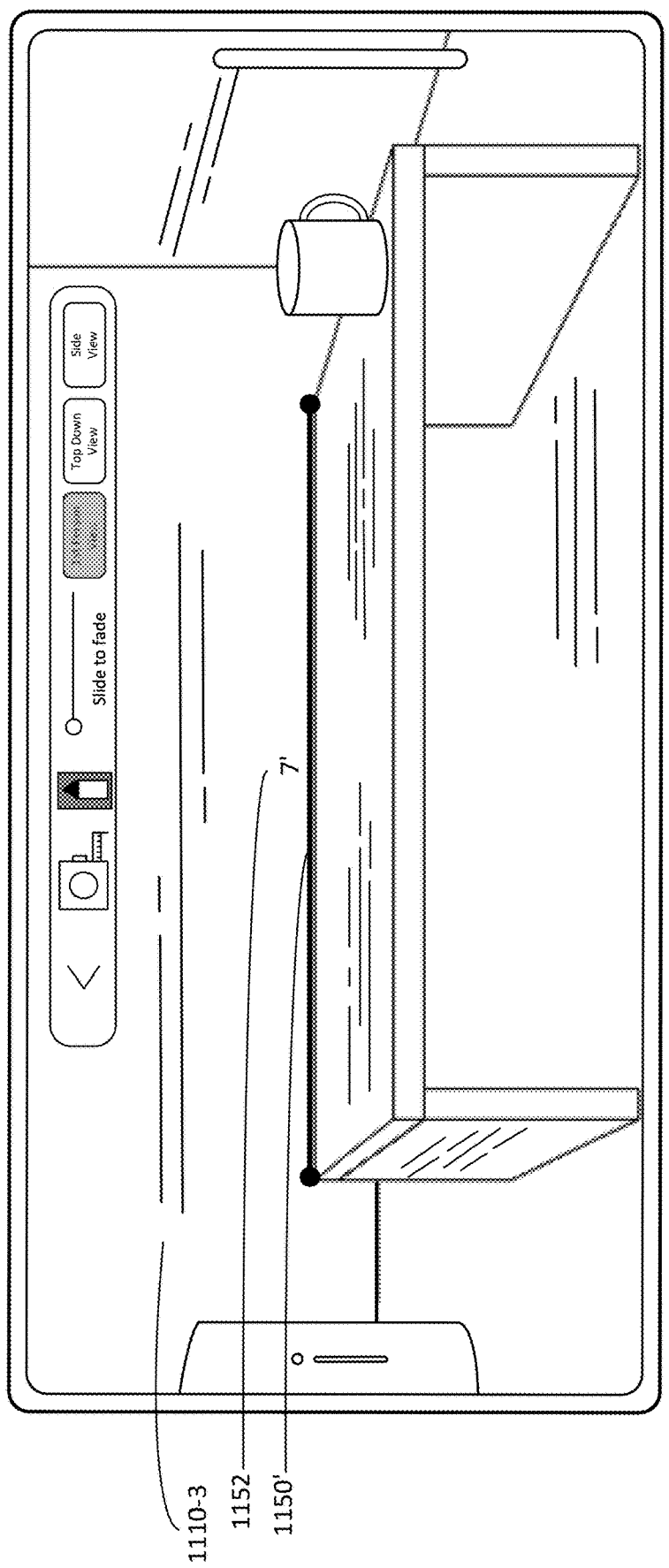

FIGS. 11K-11L illustrate a process in which annotation 1150 is transformed to be constrained to correspond to edge 1146. In FIG. 11K, the user finishes adding annotation 1150 by lifting contact 1142 off of the display. Since annotation 1150 is entirely contained within bounding box 1144, after lift-off, annotation 1150 is transformed into a different annotation 1150' that is constrained to edge 1146, as shown in FIG. 11L. In addition, in embodiments where bounding box 1144 is shown while annotation 1150 is being added, after the lift-off of contact 1142, bounding box 1144 ceases to be displayed in user interface 1110-3. Label 1152, which indicates the measurement of the length of annotation 1150' (e.g., the physical length of edge 1146 to which annotation 1150' corresponds), is displayed in a portion of user interface 1110-3 in proximity to annotation 1150'. In some embodiments, the user can add annotations corresponding to two-dimensional physical regions or three-dimensional physical spaces, optionally with corresponding labels indicating measurements of other physical characteristics of the annotations, such as area (e.g., for annotations corresponding to two-dimensional regions) or volume (e.g., for annotations corresponding to three-dimensional spaces).

Figure 11M:
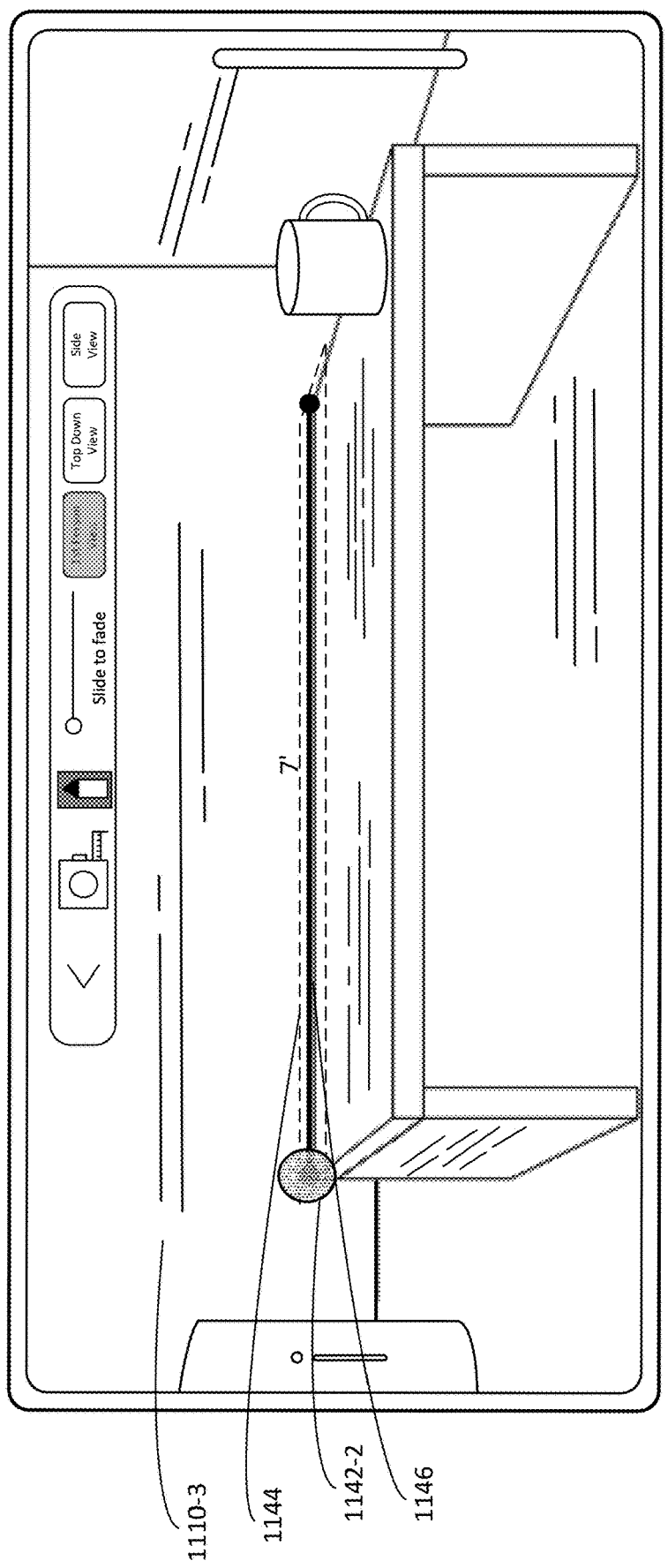
Figure 11N:
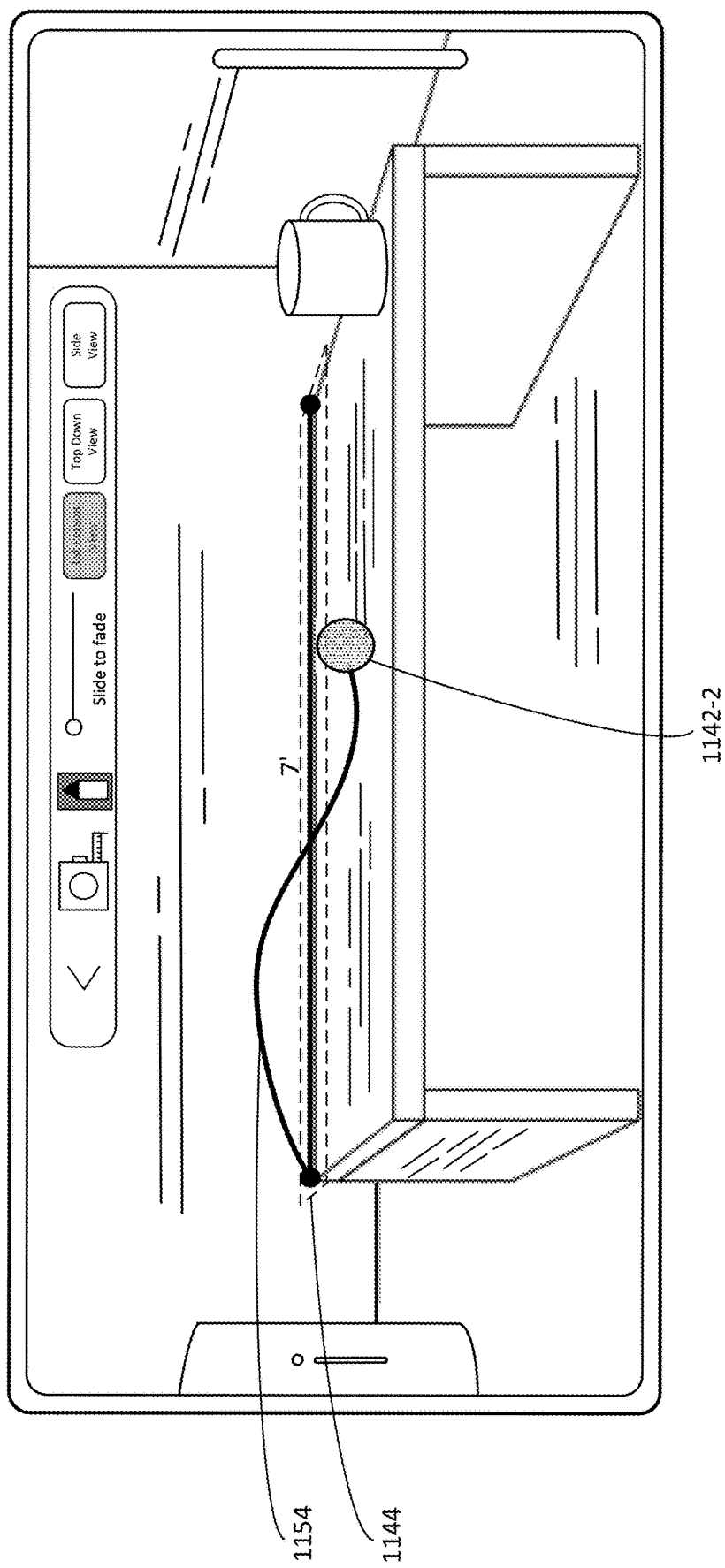
Figure 11O:
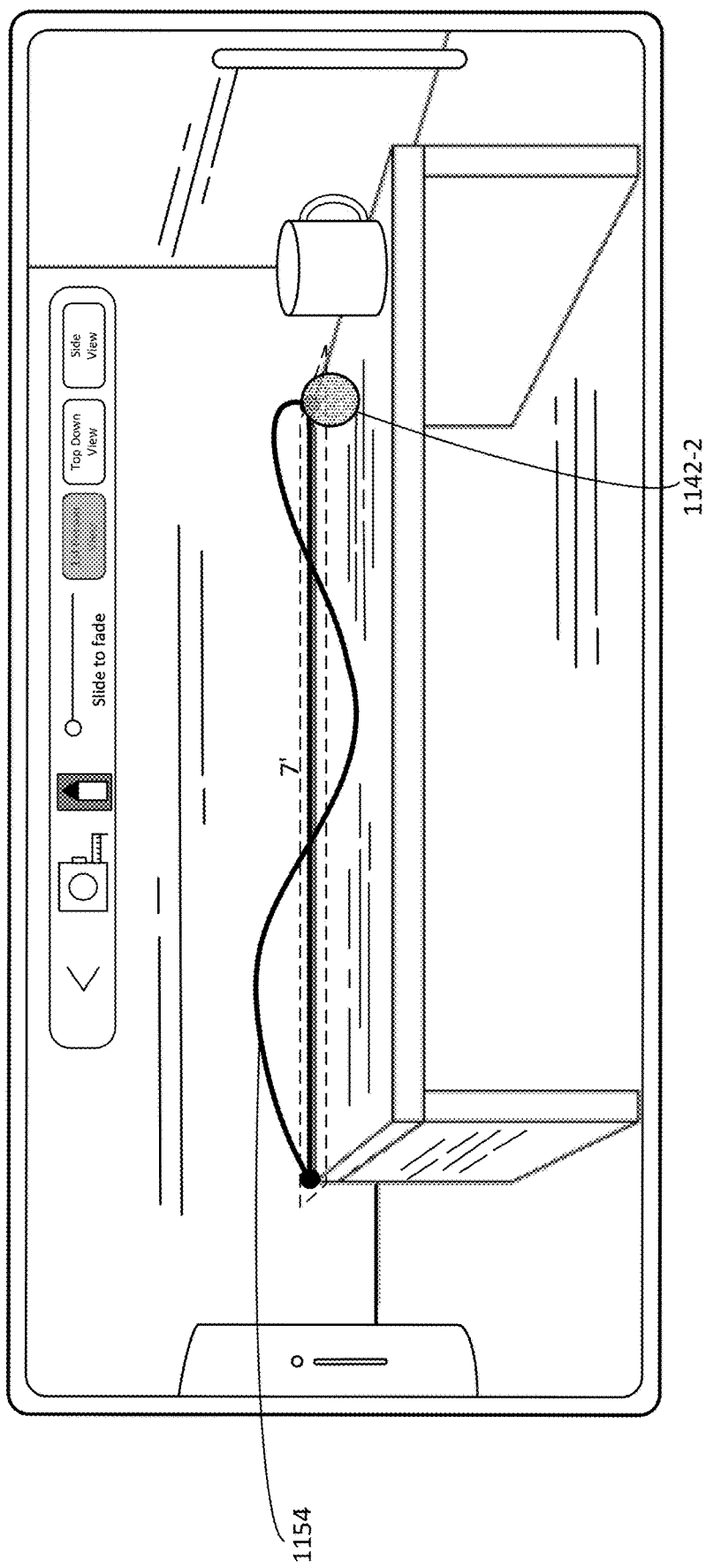
Figure 11P:
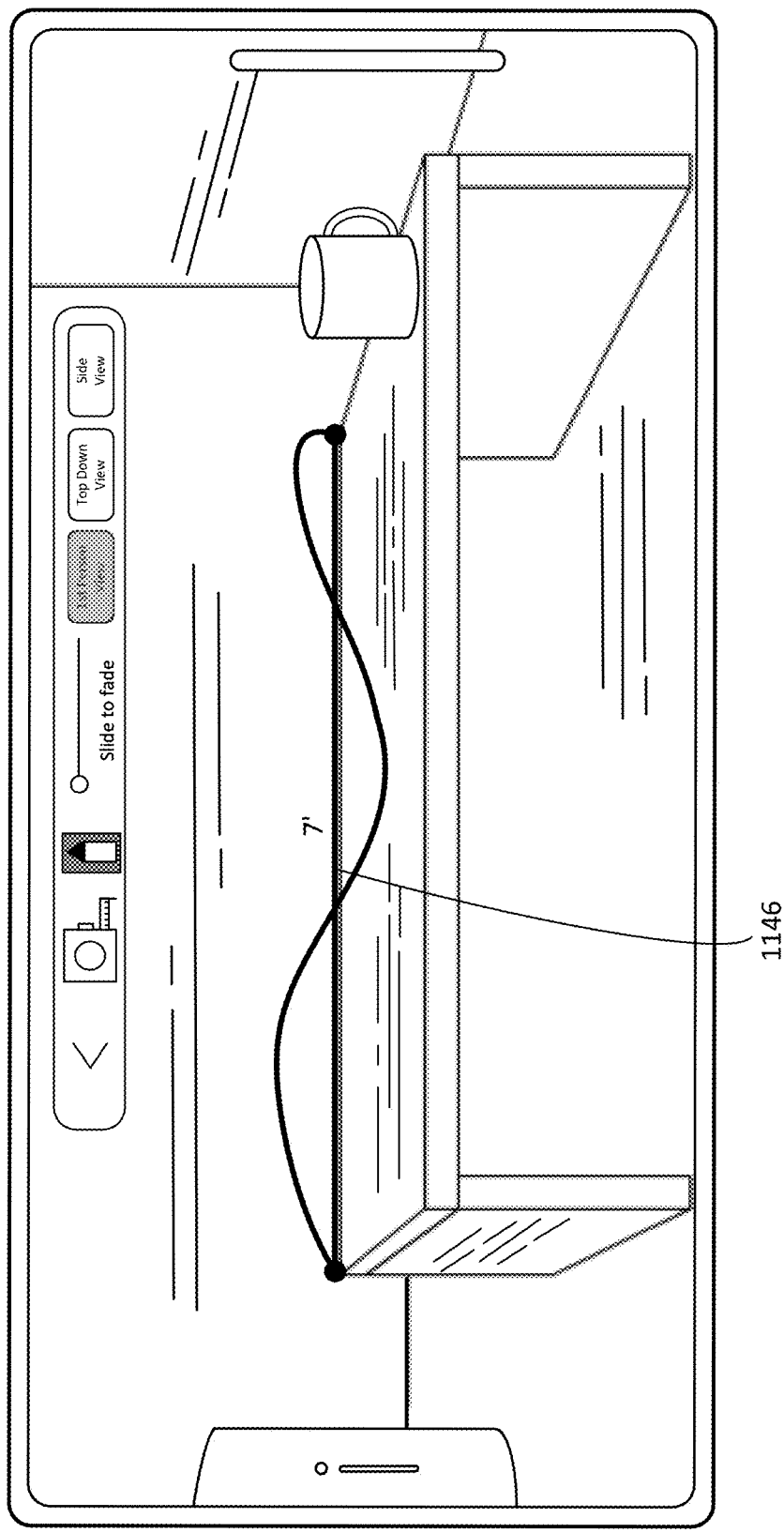

FIGS. 11M-11P illustrates a process in which the user adds a second annotation 1154 to the still view representation of physical environment 1100. In FIG. 11M, bounding box 1144 is again shown to indicate the region within the threshold distance of edge 1146 (e.g., within which the annotation would be transformed, as described herein with reference to FIGS. 11K-11L). In FIGS. 11N-11O, as contact 1142-2 moves across the display, annotation 1154 is displayed along the path of contact 1142-2. Some portions of the path of contact 1142-2 extend beyond bounding box 1144. As a result, after the lift-off of contact 1142-2, in FIG. 11P, annotation 1154 remains in its original location and is not transformed to be constrained to edge 1146. In some embodiments, no label is displayed for indicating measurements of physical characteristics (e.g., length) of physical space to which annotation 1154 corresponds (e.g., because annotation 1154 is not constrained to any features in the still view representation of physical environment 1100.

Figure 11Q:
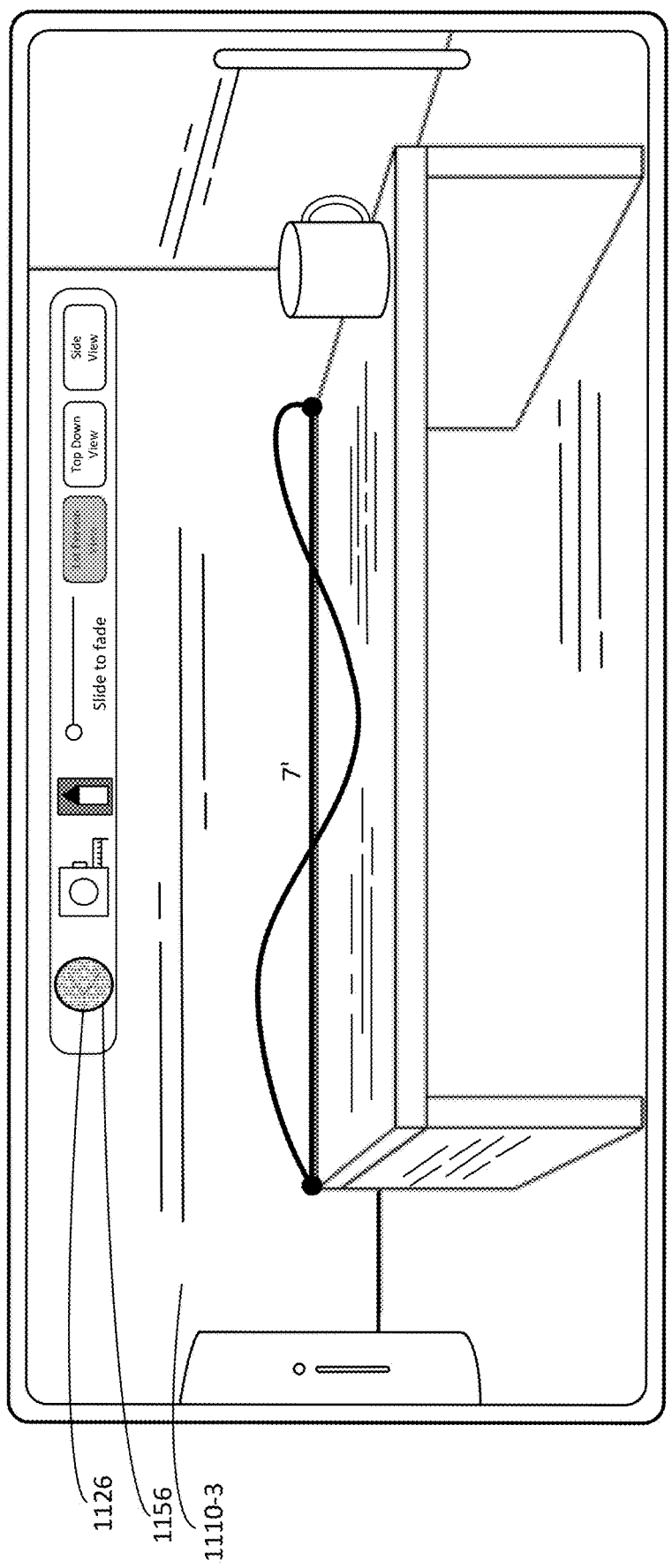
Figure 11R:
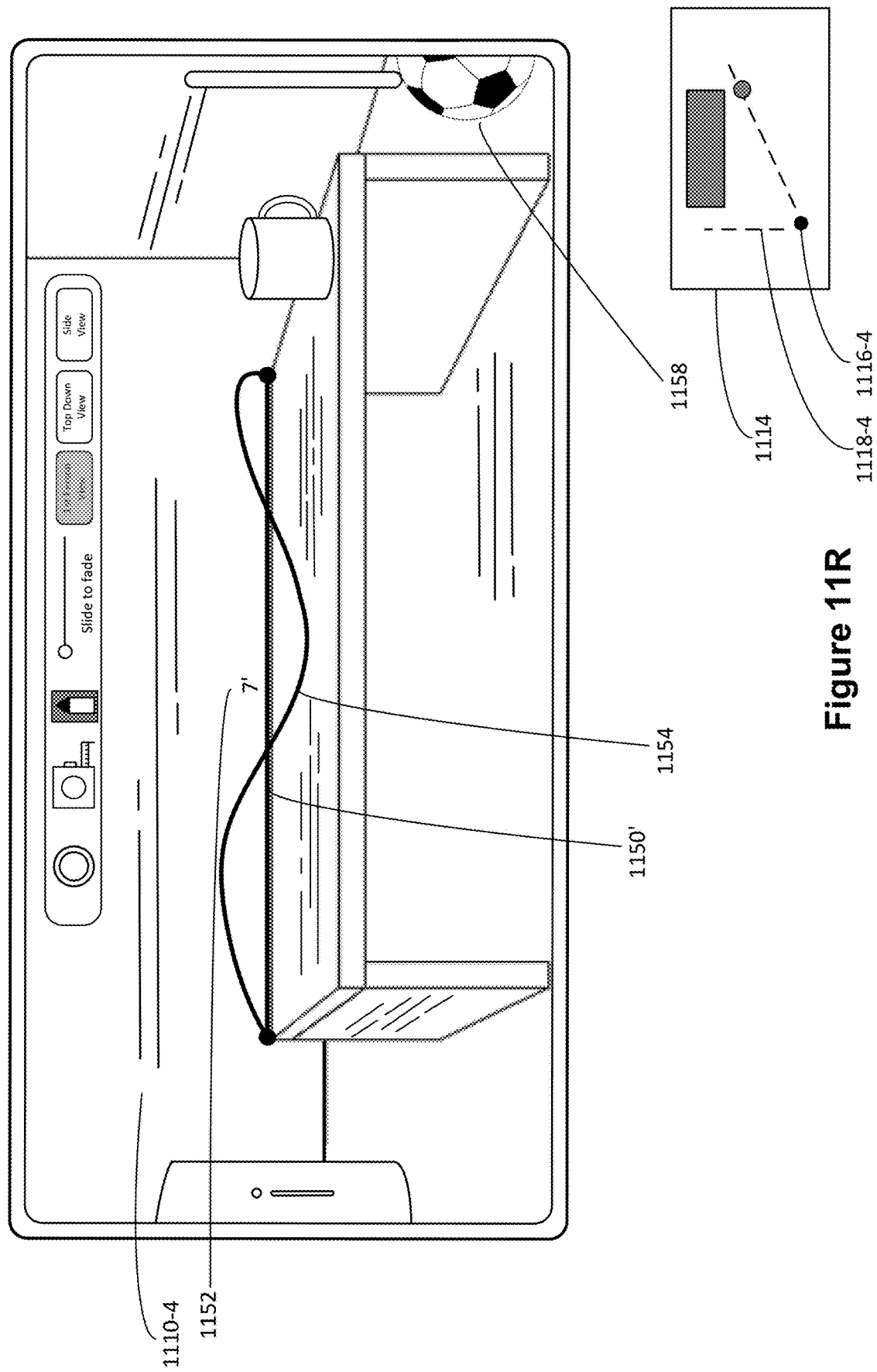
Figure 11S:
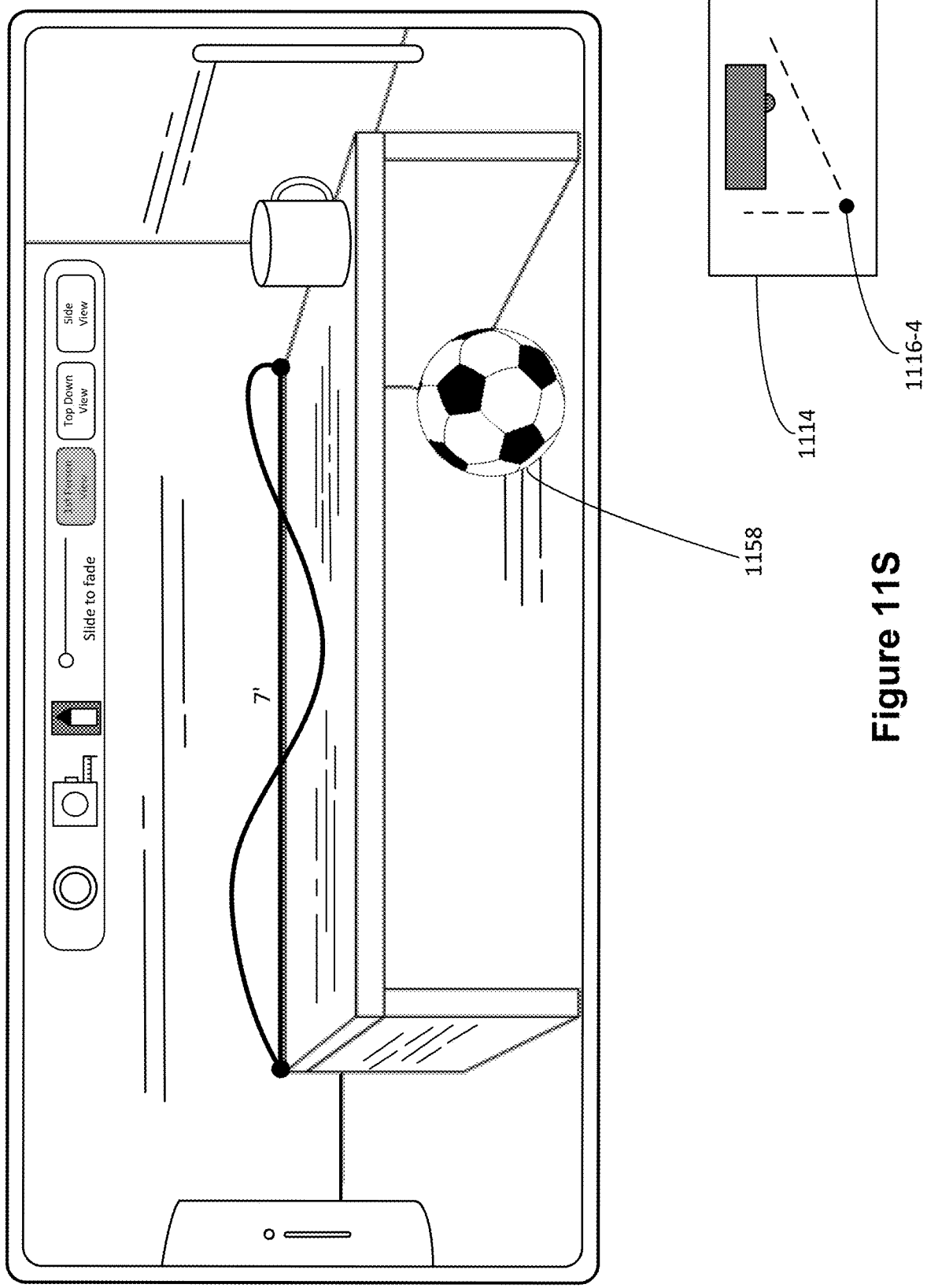
Figure 11T:
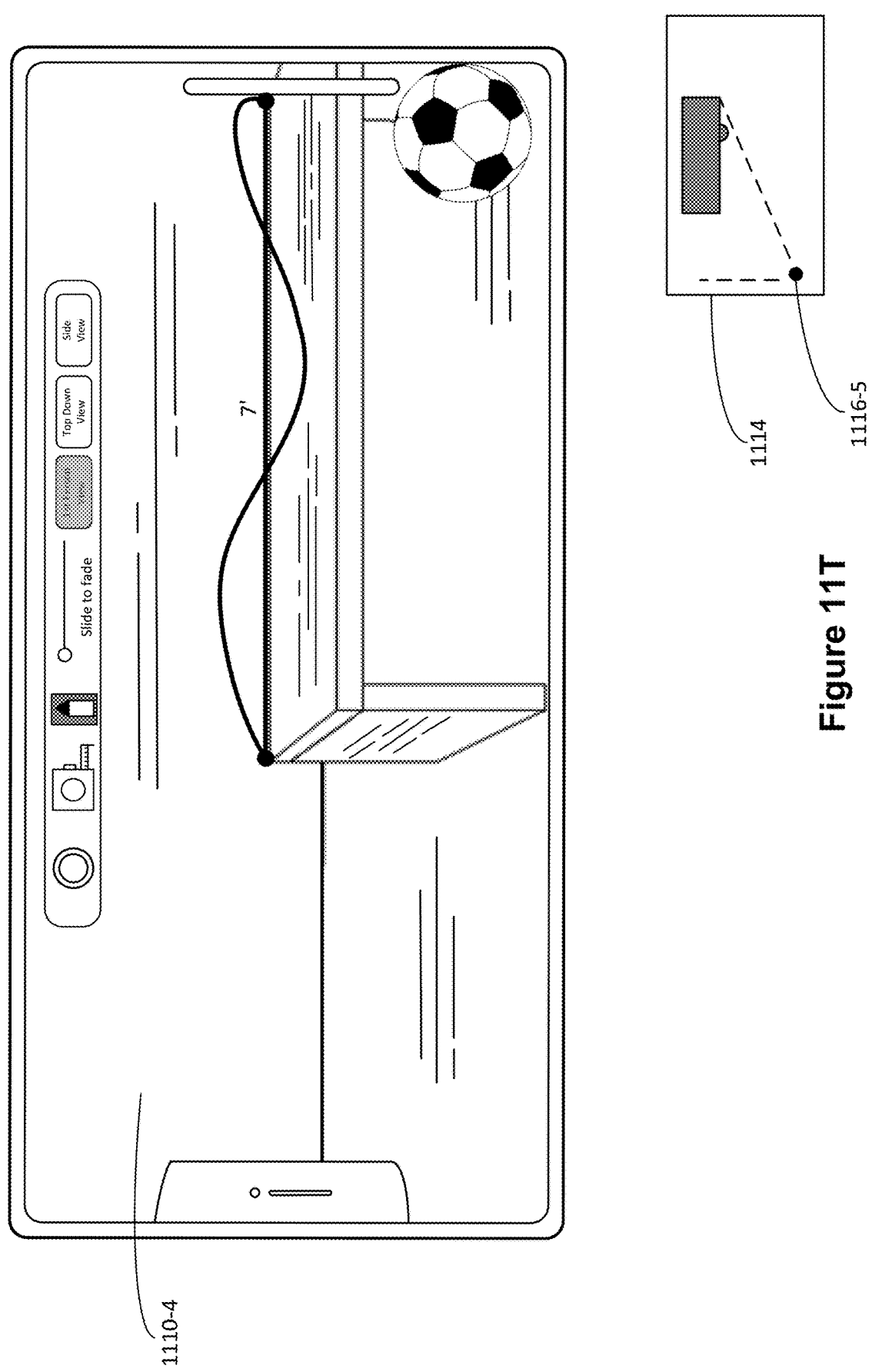

FIGS. 11Q-11T illustrate display (e.g., redisplay) of a live view representation of physical environment 1100. In FIG. 11Q, the user selects back control 1126 using contact 1156 on user interface 1110-3. In response, as shown in FIG. 11R, the system ceases to display user interface 1110-3, which includes the still view representation of physical environment 1100, and instead displays user interface 1110-4 including a live view representation of physical environment 1100. FIG. 11R also illustrates legend 1114 indicating camera location 1116-4 corresponding to the viewpoint from which the live view representation of physical environment 1100 in user interface 1110-4 is captured. In some embodiments, after switching to the live view representation, previously-added annotations (e.g., annotations 1150' and 1154) and labels (e.g., label 1152) remain displayed relative to features (e.g., edges) in the still view representation of physical environment 1100 (e.g., as the cameras move relative to physical environment 1100, the annotations move in the displayed representation of physical environment 1100 so that the annotations continue to be displayed over corresponding features in physical environment 1100). As shown in FIGS. 11R-11S, while the live view representation of physical environment 1100 is displayed, changes in field of view of the cameras (e.g., soccer ball 1158 rolling into camera field of view 1118-4) are reflected (e.g., displayed live) in user interface 1110-4. FIG. 11T illustrates that the cameras have moved to a different location 1116-5 within physical environment 1100. As a result, user interface 1110-4 displays a different live view representation of the physical environment (e.g., a different portion of the physical environment 1100), from the perspective of the cameras from location 1116-5.

Figure 11U:
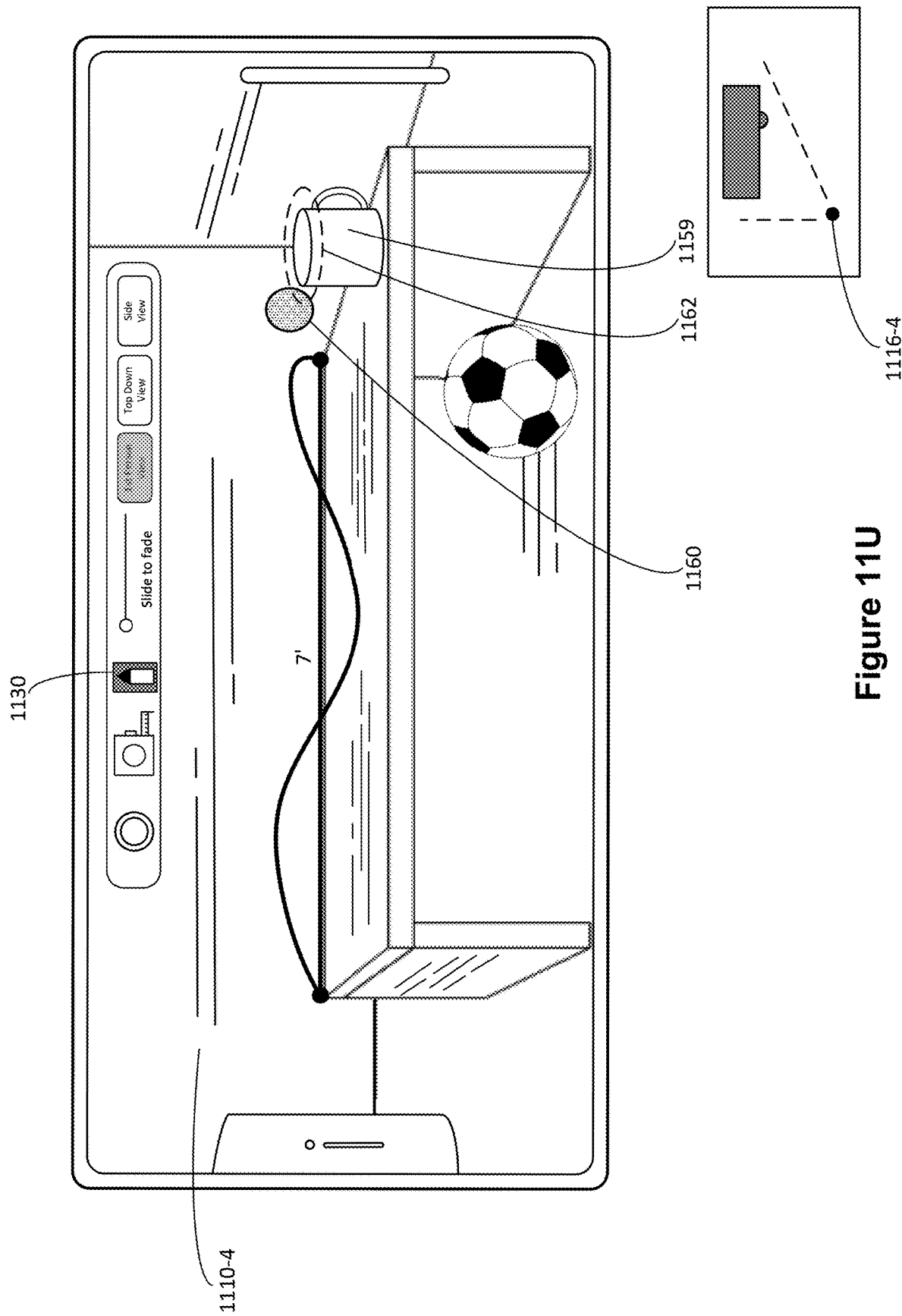
Figure 11V:
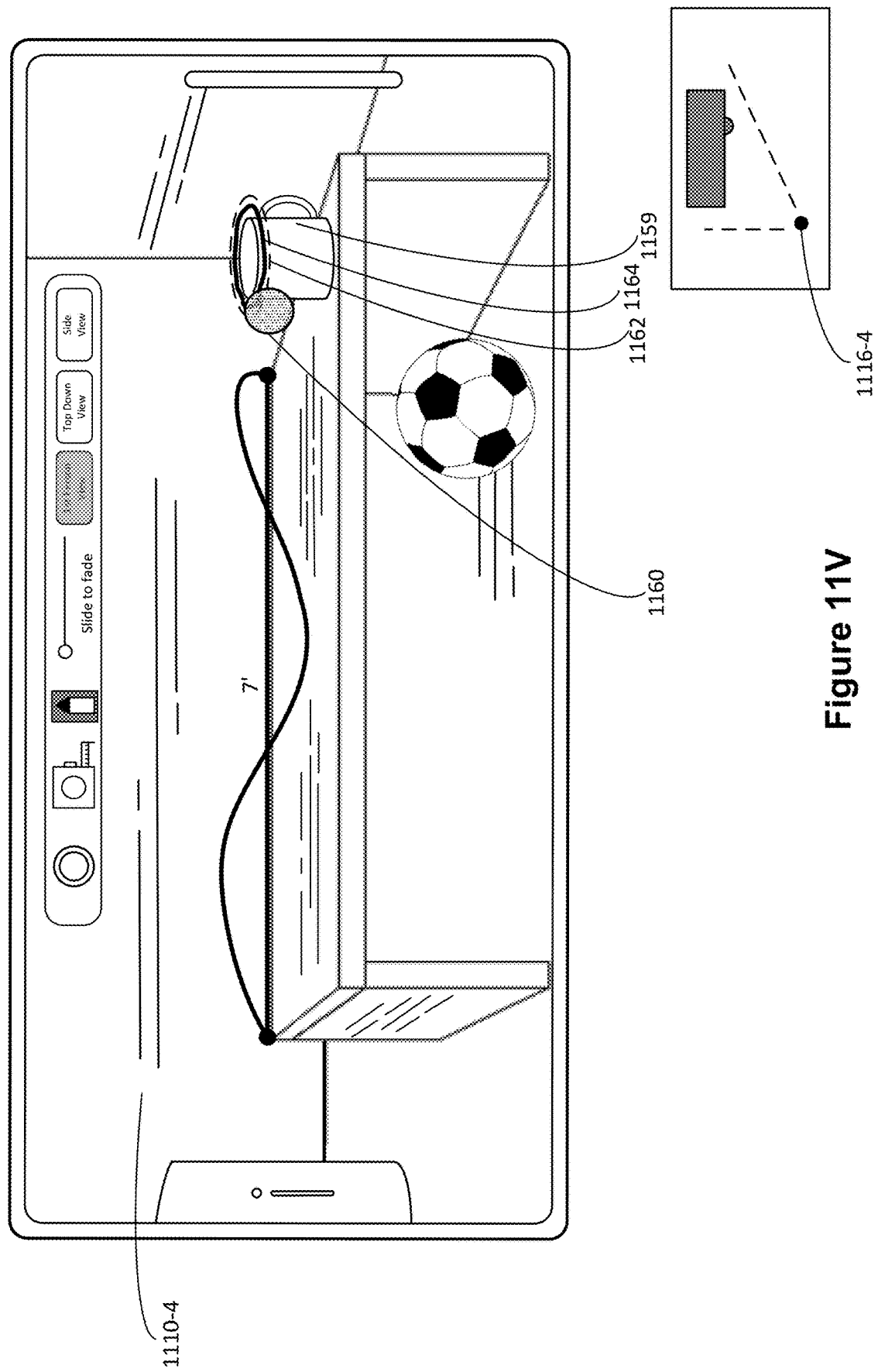
Figure 11W:
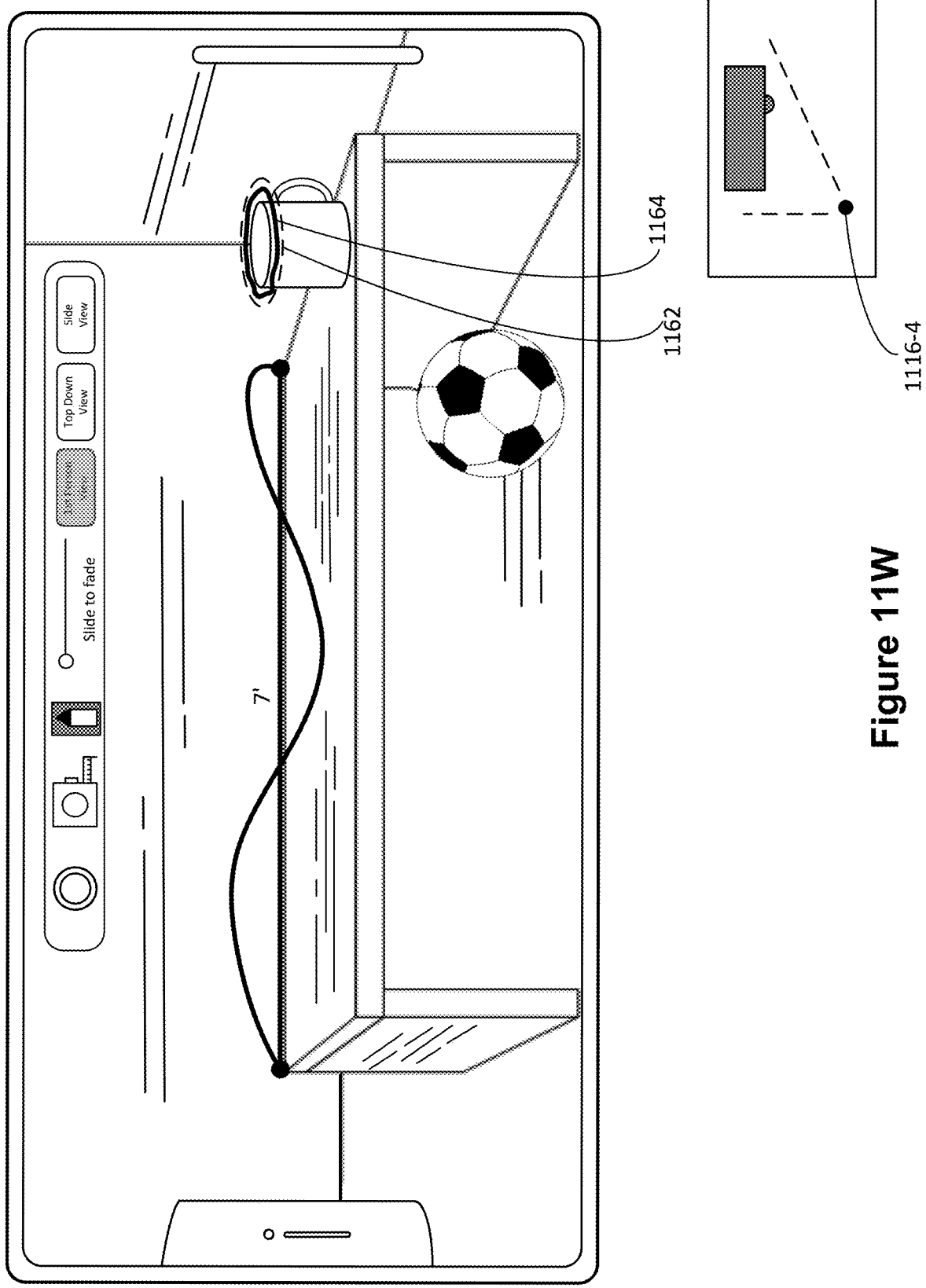
Figure 11X:
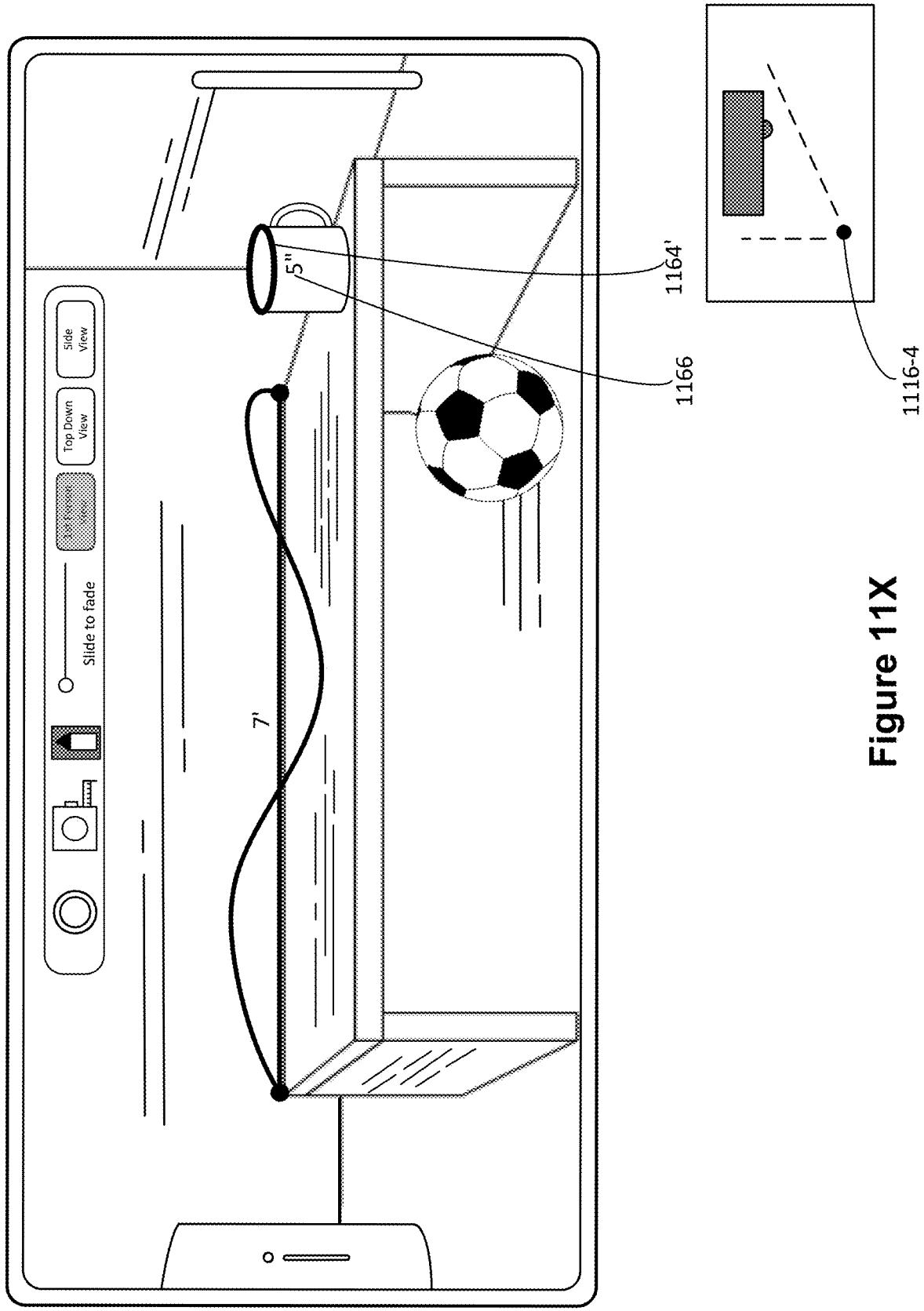

FIGS. 11U-11X illustrate adding an annotation to the live view representation of physical environment 1100. FIG. 11U illustrates contact 1160 detected at a location corresponding to a location in user interface 1110-4 near mug 1159 while annotation control 1130 is selected (e.g., highlighted). Boundary 1162 encompassing the top rim of mug 1159 indicates a region within a threshold distance of the rim of mug 1159. As described herein with reference to bounding box 1144, in some embodiments boundary 1162 is not displayed and is included in FIG. 11U merely to indicate an invisible threshold, whereas in other embodiments boundary 1162 is displayed (e.g., optionally while detecting contact 1160). FIG. 11V illustrates that the user has added annotation 1164 around the rim of mug 1159 (e.g., by moving contact 1160 along a path encircling the rim). Annotation 1164 is entirely within boundary 1162. Accordingly, FIGS. 11W-11X illustrate that after the lift-off contact 1160, annotation 1164 is transformed to annotation 1164' that is constrained to the rim of mug 1159. Label 1166 is displayed next to annotation 1164' to indicate the circumference of the rim of mug 1159, to which annotation 1164' corresponds.

Figure 11Y:
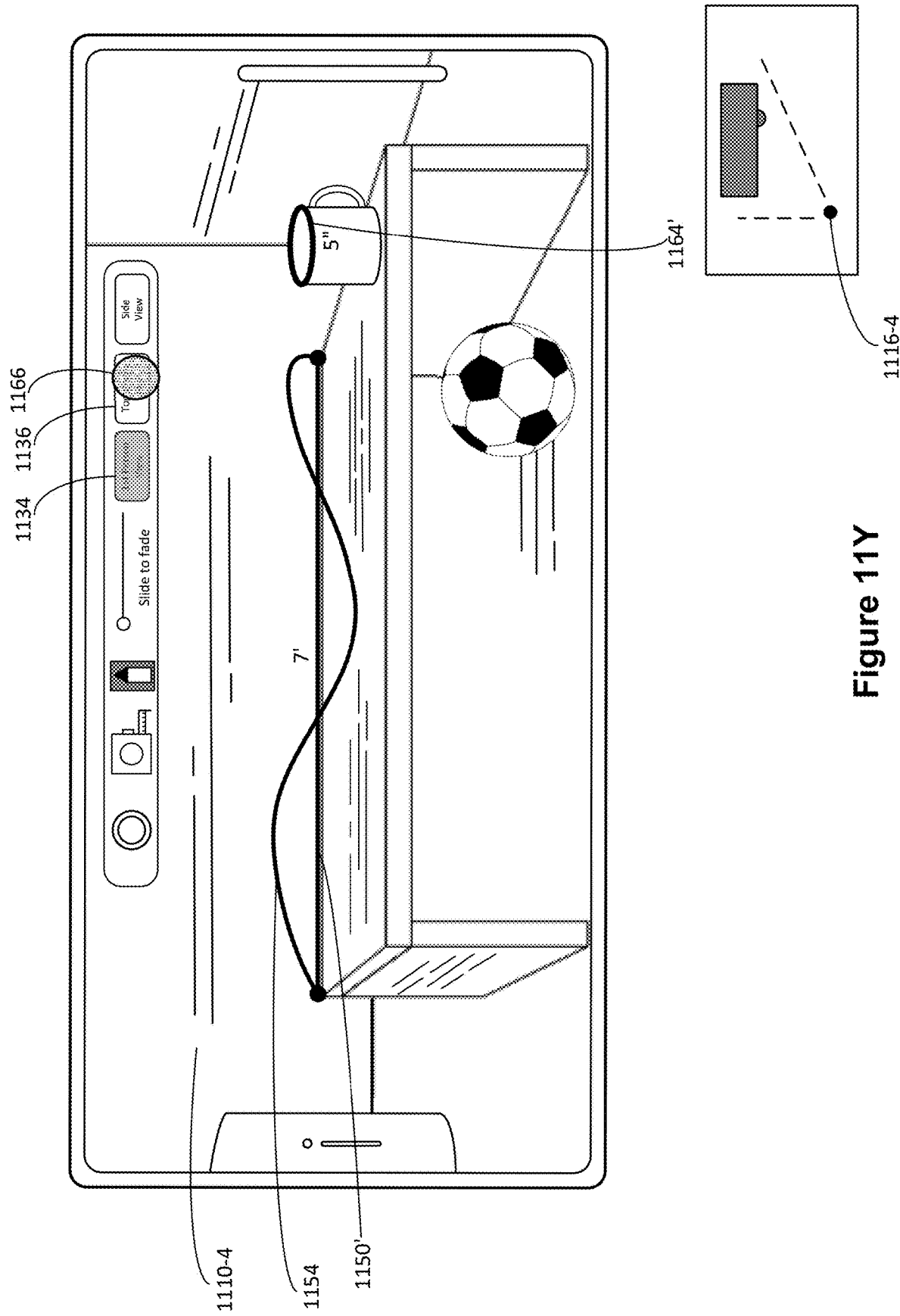
Figure 11Z:
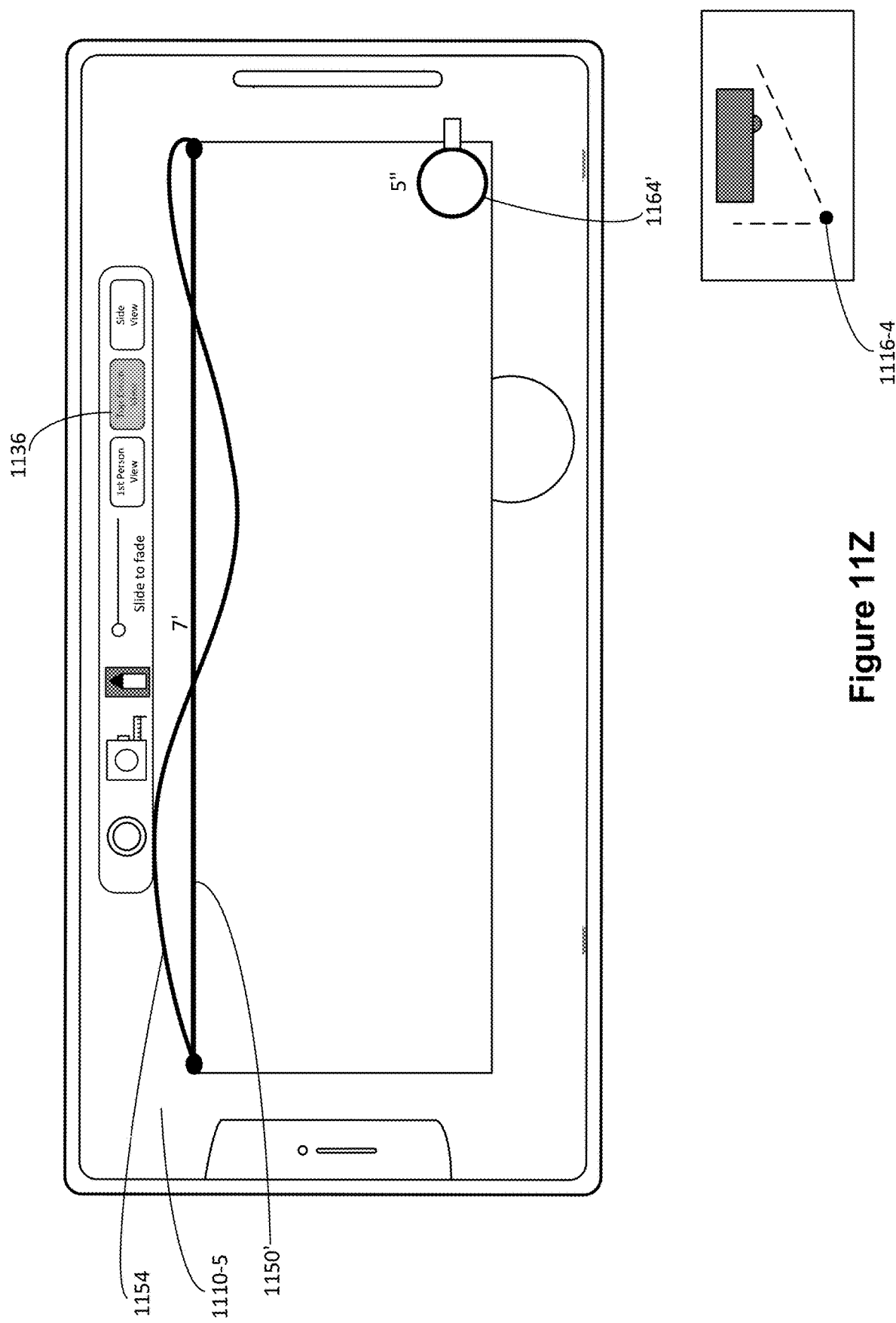
Figure 11B:
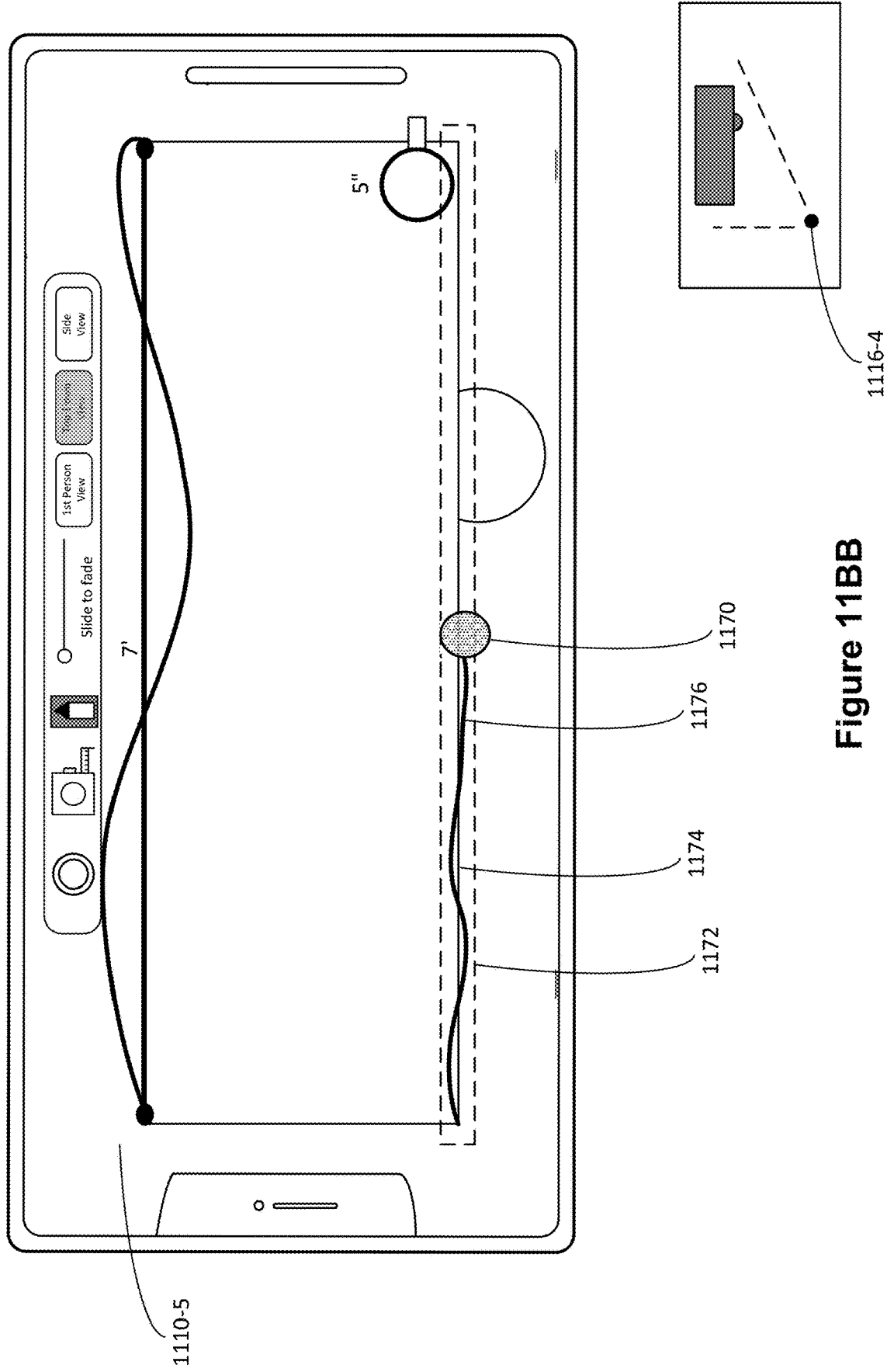
Figure 11C:
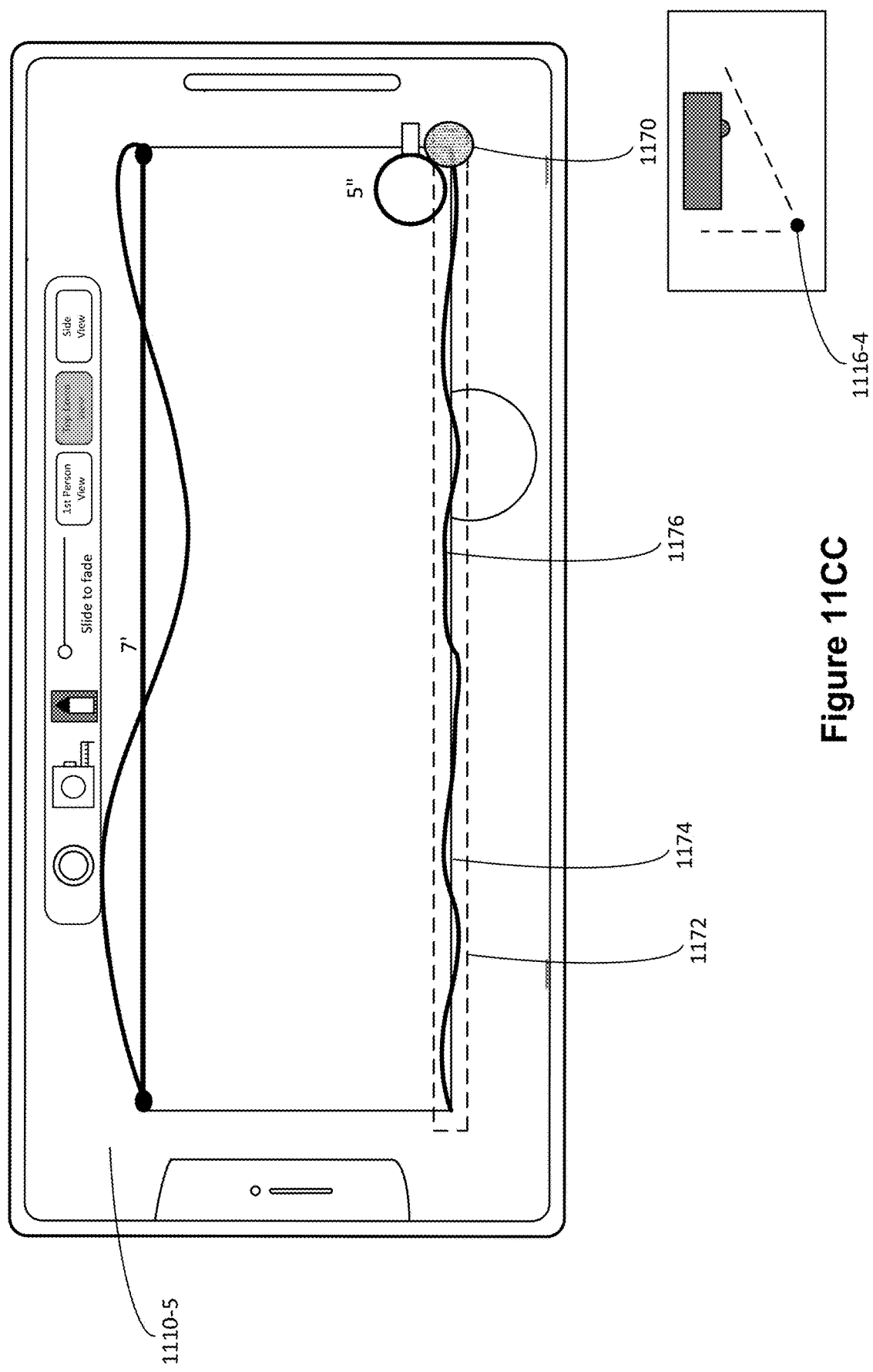
Figure 11D:
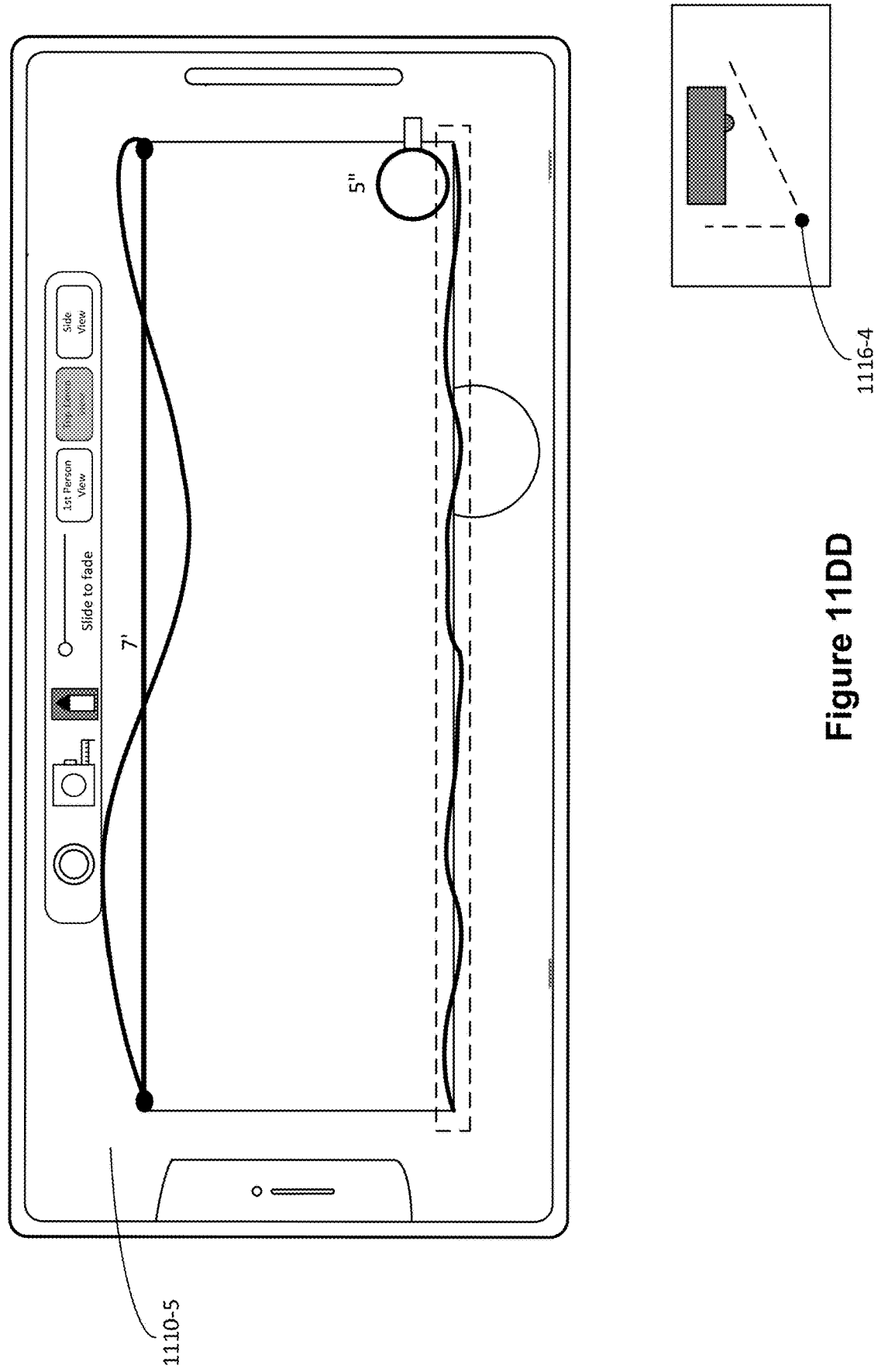
Figure 11E:
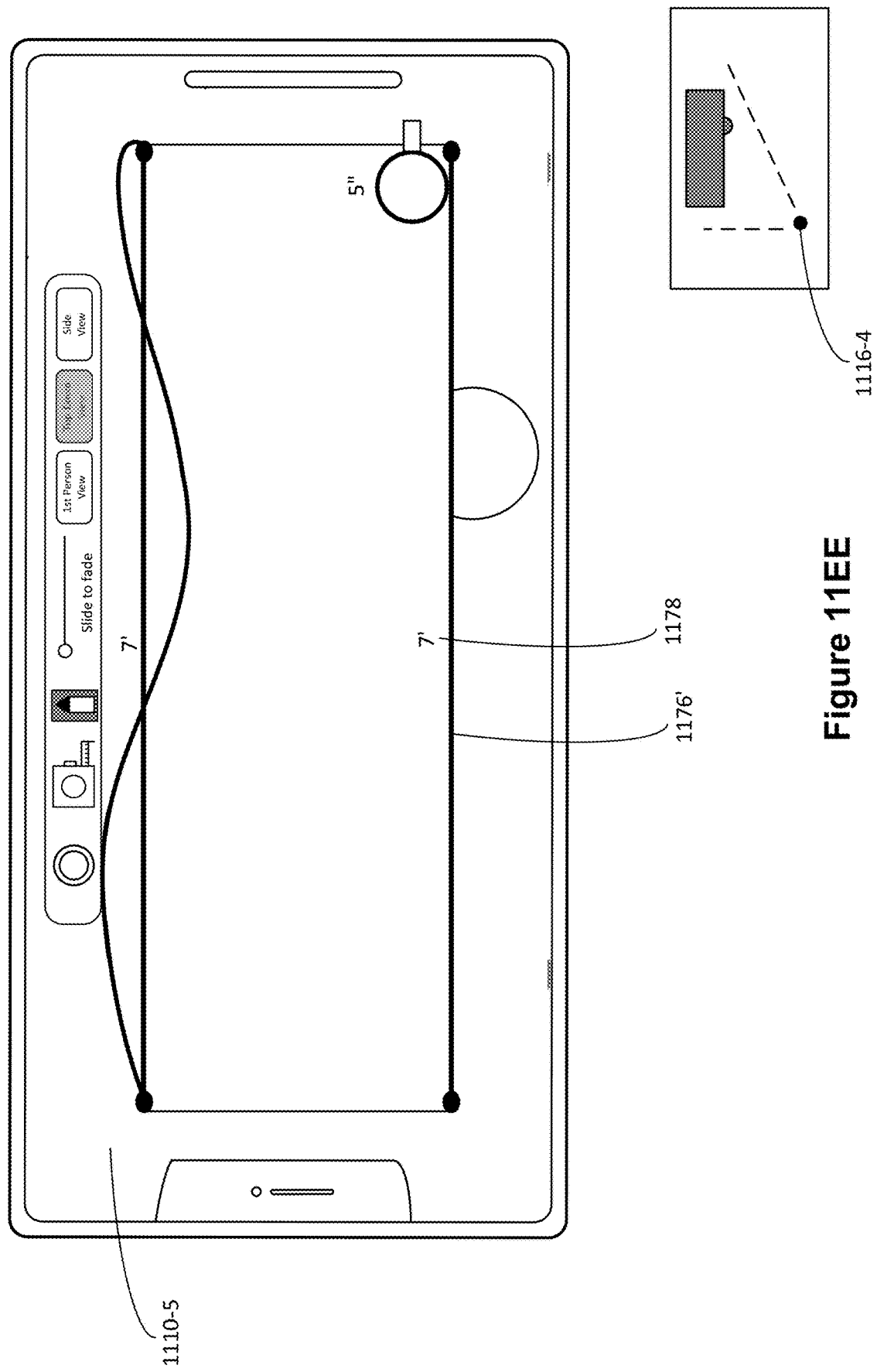
Figure 11F:
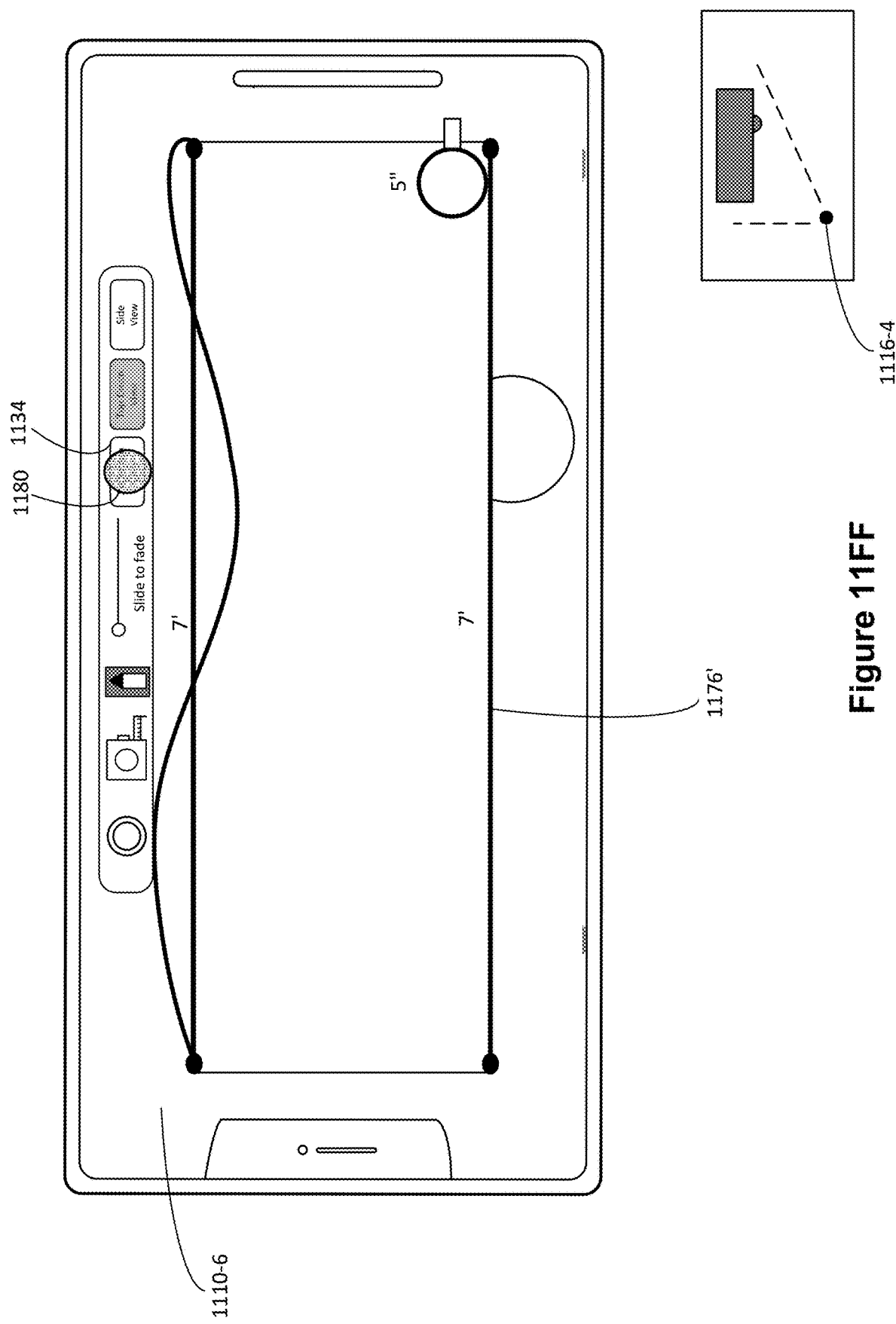
Figure 11G:
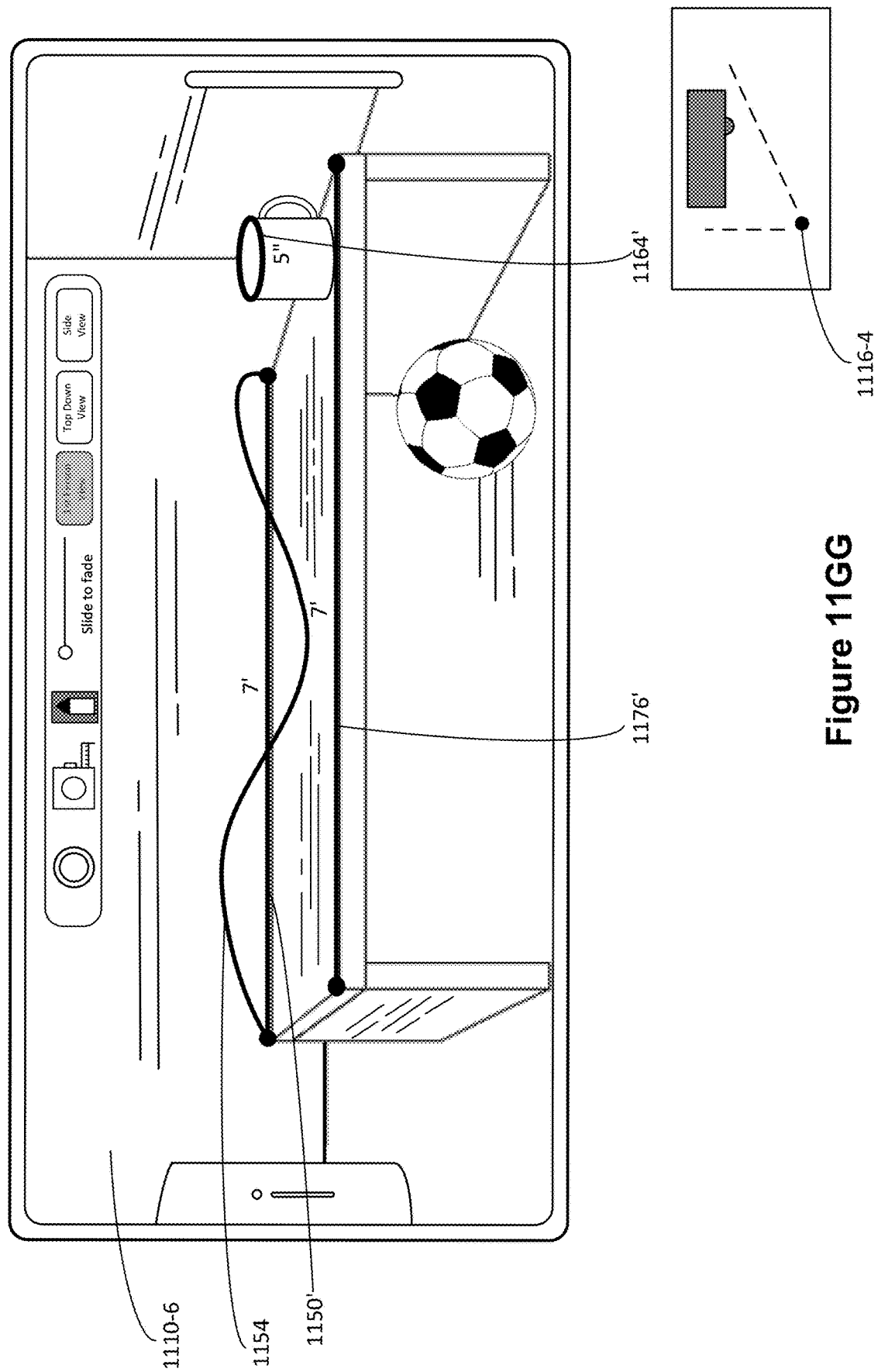
Figure 11H:
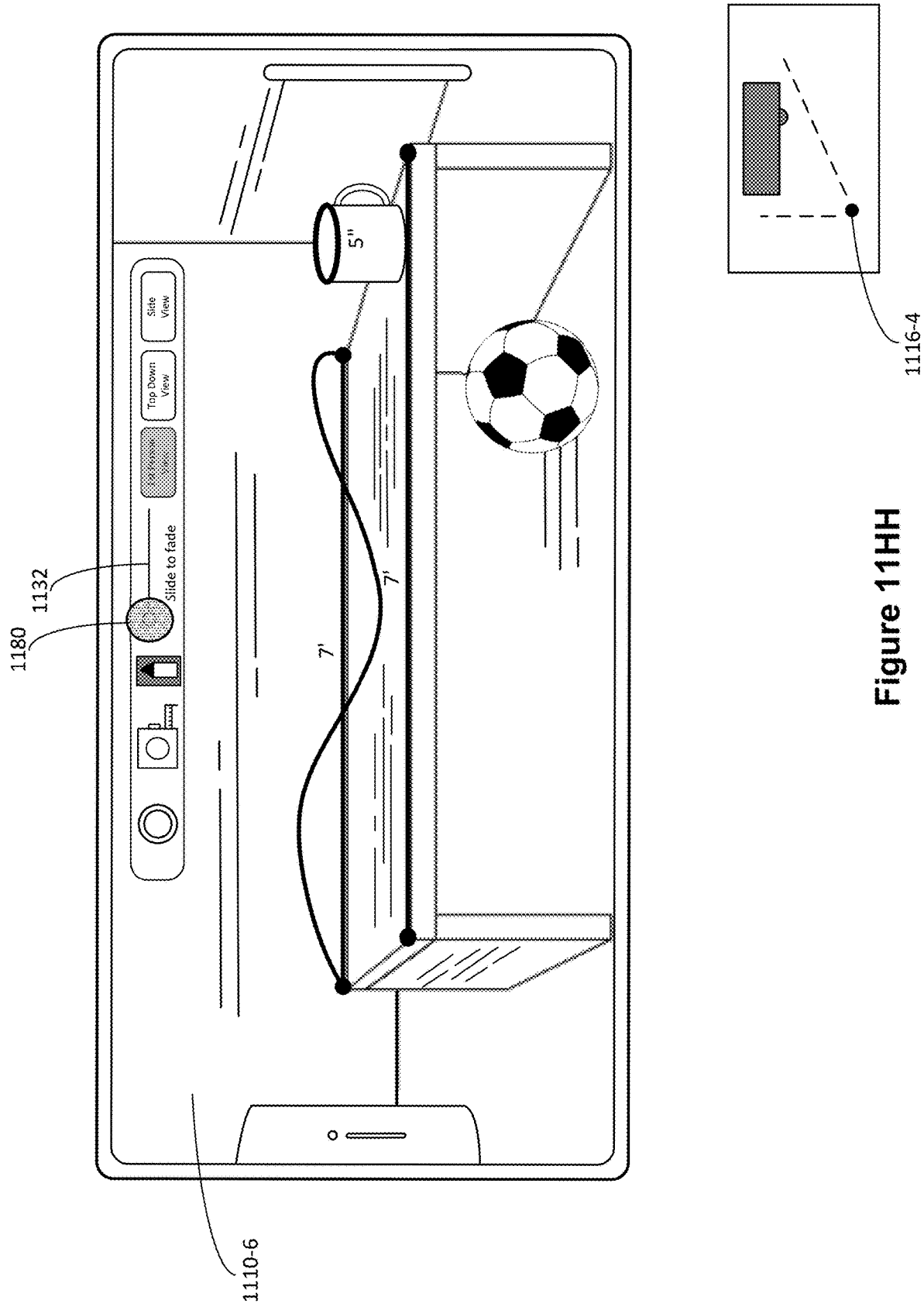
Figure 11I:
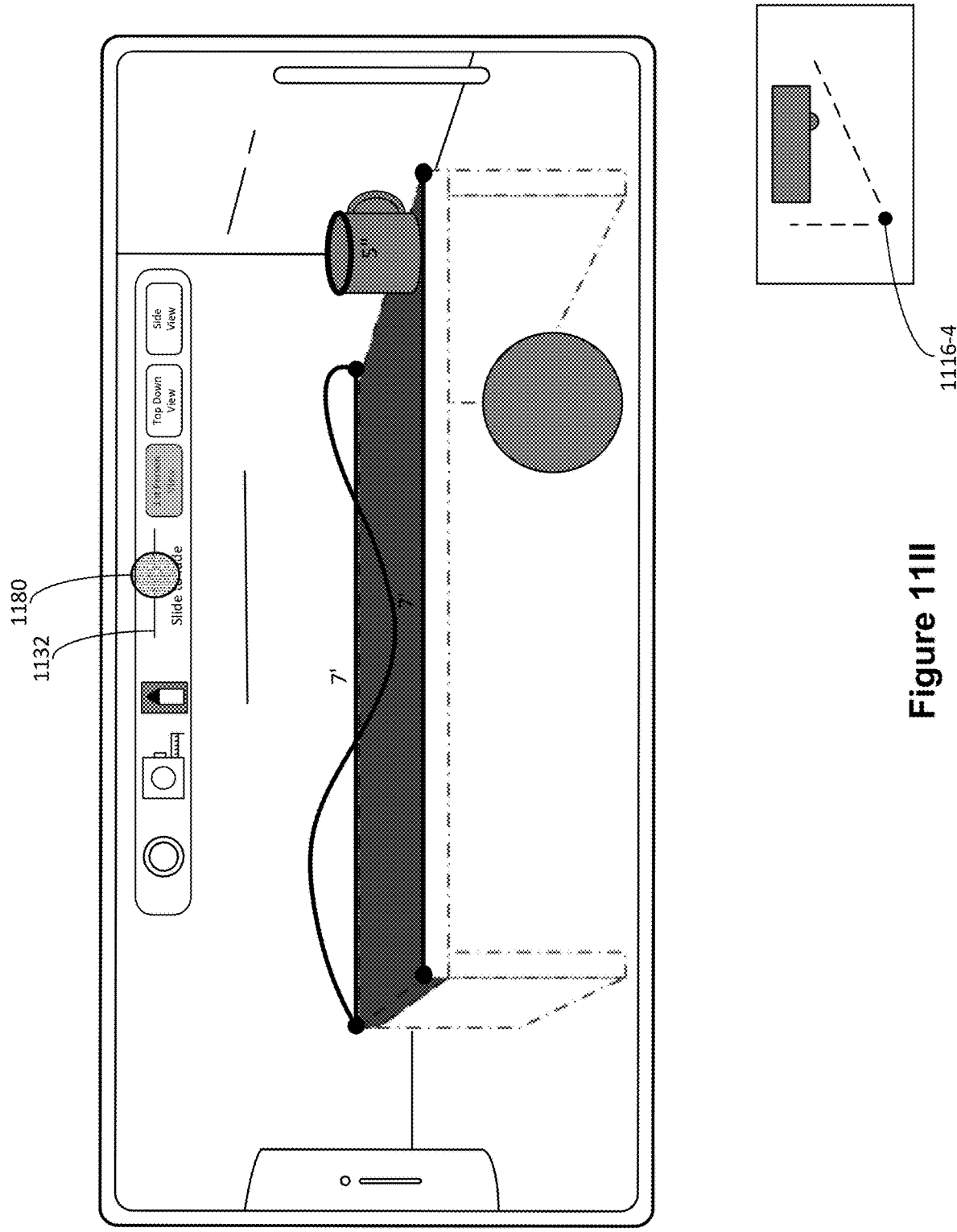
Figure 11J:
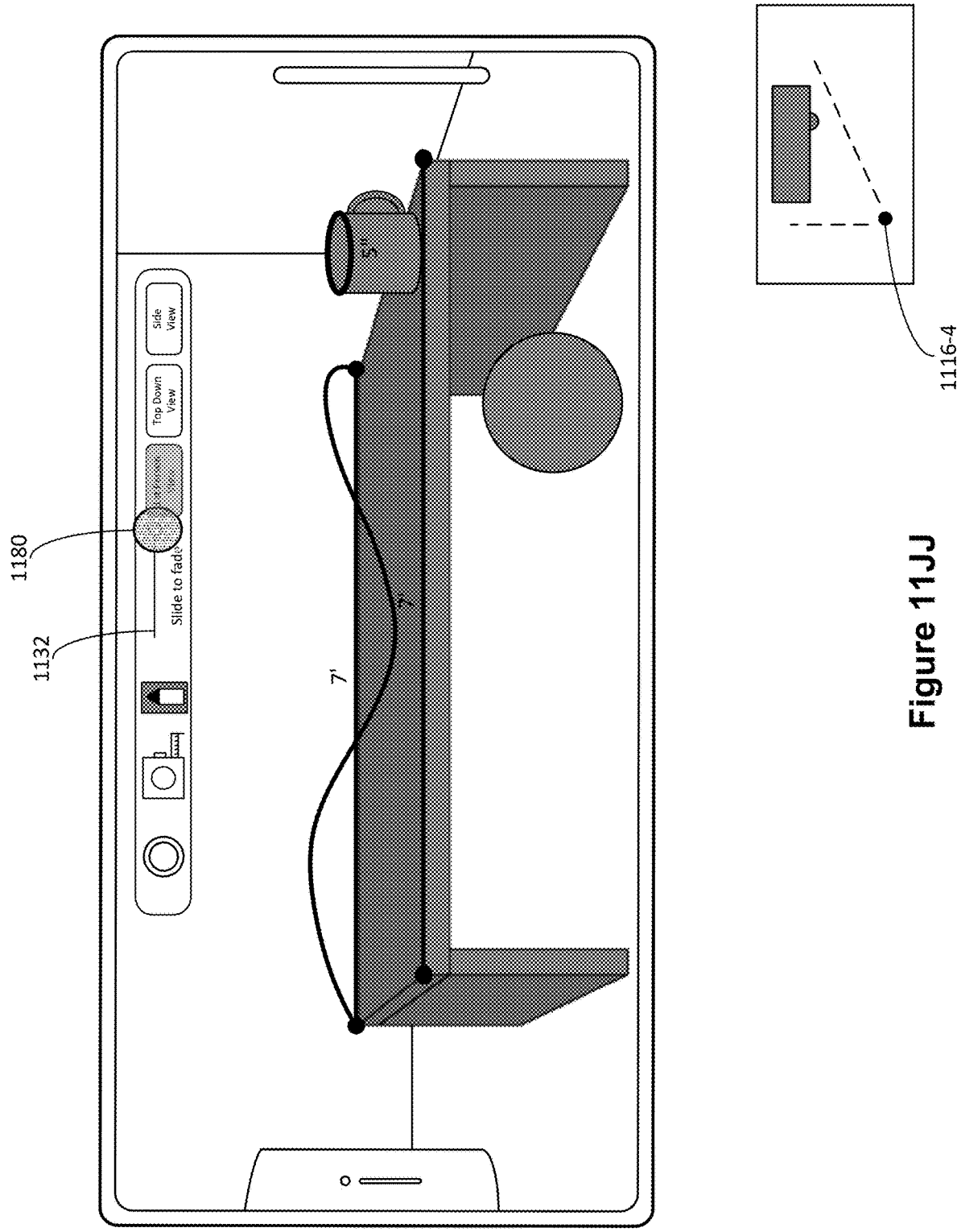

FIGS. 11Y-11Z illustrate switching between different types of view of representations (e.g., live view representations or still view representations) of physical environment 1100. In FIG. 11Y, while "1st Person View" control 1134 is selected (e.g., highlighted) and a first-person view (e.g., front perspective view) of physical environment 1100, as captured from the perspective of the cameras at camera location 1116-4, is displayed, the user selects "Top Down View" control 1136 using contact 1166. In response to the selection of "Top Down View" control 1136 using contact 1166, the system displays an updated user interface 1110-5 showing a top-down view representation of physical environment 1100. In user interface 1110-5, "Top Down View" control 1136 is highlighted and previously-added annotations and labels are displayed at respective locations in the top-down view representation of physical environment 1100 that correspond to their respective locations in the first-person view of physical environment 1100 in FIG. 11Y. For example, annotation 1150', which was constrained to edge 1146 in the first-person view, is also displayed as constrained to edge 1146 in the top-down view. In another example, annotation 1154, which extended, unconstrained, along edge 1146 in the first-person view, is also displayed along but not constrained to edge 1146 in the top-down view. In some embodiments, the top-down view is a simulated representation of the physical environment using depth data collected by the cameras. In some embodiments, one or more real-world features of the physical environment are omitted in the top-down view such as object surface texture or surface patterns.

FIGS. 11AA-11FF illustrate a process in which the user adds an annotation to the top-down view representation of physical environment 1100. In FIG. 11AA, while annotation control 1130 remains selected, the user initiates adding an annotation to the top-down view representation of physical environment 1100 using contact 1170. Bounding box 1172 indicates a region within a threshold distance of edge 1174. FIGS. 11BB-11CC illustrate movement of contact 1170 along edge 1174 and display of annotation 1176 along a path corresponding to the movement of contact 1170. Because annotation 1176 is entirely contained within bounding box 1172, after the lift-off of contact 1170 as indicated in FIG. 11DD, annotation 1176 is transformed into annotation 1176' that is constrained to correspond to edge 1174, as shown in FIG. 11EE. In addition, label 1178 is displayed next to annotation 1176' to indicate a measurement, which in this case is length, of the physical region (e.g., edge 1174) to which annotation 1176' corresponds.

FIGS. 11FF-11GG illustrate switching back to displaying a first-person view representation of physical environment 1100. In FIG. 11FF, the user selects the "1st Person View" control 1134 using contact 1180. In response, in FIG. 11GG, the system displays updated user interface 1110-6 with a first-person view representation (e.g., which in the example in FIG. 11GG is also a live view representation) of physical environment 1100. The first-person view representation displays all the previously-added annotations and labels at their respective locations, including annotations 1150', 1154, and 1164' as before (FIGS. 11R and 11Z) and also including annotation 1176' (FIG. 11EE), which was added while displaying the top-down view.

FIGS. 11HH-11JJ illustrate transitioning the representation of the physical environment 1100 between a photorealistic view of the camera field of view and a model view (e.g., drawing canvas view) of the camera field of view using "Slide to Fade" control 1132. As the user drags the slider thumb along "Slide to Fade" control 1132 with input 1180 (e.g., a touch input, such as a drag input), one or more features of the representation of physical environment 1100 fade from view. The extent of feature fading is proportional to the extent of movement of the slider thumb along "Slide to Fade" control 1132, as controlled by input 1180 (e.g., FIG. 11II illustrates partial transition to the model view in accordance with movement of the slider thumb from the left end to the middle of "Slide to Fade" control 1132, and FIG. 11JJ illustrates the completed transition to the model view in accordance with movement of the slider thumb to the right end of "Slide to Fade" control 1132). In some embodiments, the features being faded include color, texture, surface patterns, etc., leaving only dimensional information (e.g., edges and shapes) of objects in the representation of physical environment 1100. In some embodiments, previously-added annotations are displayed in the model view. In some embodiments, the transition between the photorealistic camera view and the model view using "Slide to Fade" control 1132 can be performed in the still view representation of physical environment 1100 and/or in other views (e.g., while viewing a top-down view in response to selection of "Top Down View" control 1134 or while viewing a side view in response to selection of "Side View" control 1136).

Figure 12O:
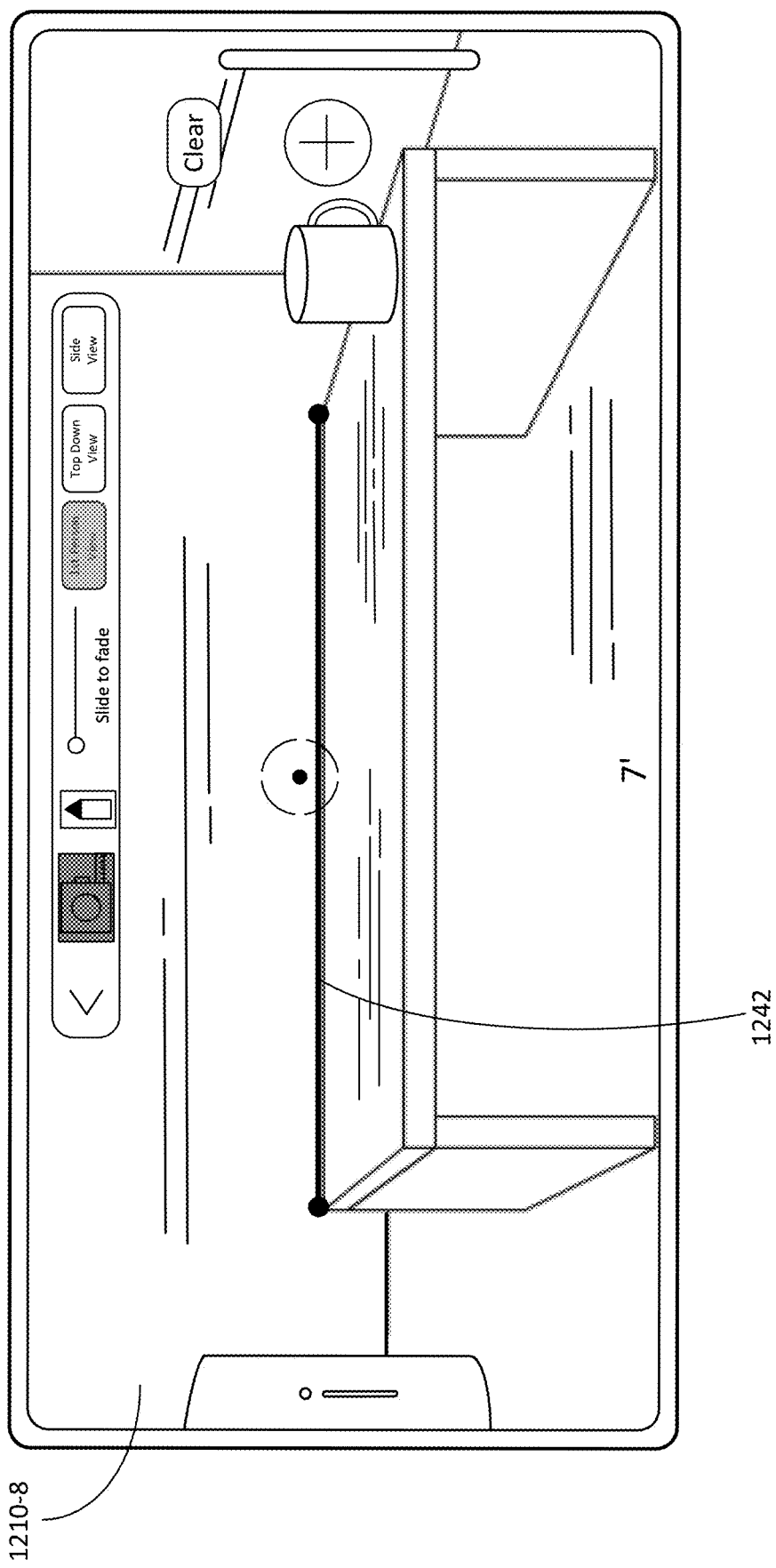

FIGS. 12A-12O illustrate measuring one or more properties of one or more objects (e.g., an edge of a table) in representations (e.g., still view representations or live view representations) of a physical environment.

FIG. 12A illustrates physical environment 1200. Physical environment 1200 includes a plurality of structural features including two walls 1202-1 and 1202-2 and floor 1204. Additionally, physical environment 1200 includes a plurality of non-structural objects including table 1206 and mug 1208 placed on top of table 1206.

Device 100 in physical environment 1200 displays a live view representation of physical environment 1200 in user interface 1210-1 on touch-sensitive display 112 of device 100. Device 100 captures the live view representation of physical environment 1200 via one or more cameras (e.g., optical sensor(s) 164 of FIG. 1A or camera(s) 305 of FIG. 3B) of device 100 (or in some embodiments of a computer system such as computer system 301 of FIG. 3B). User interface 1210-1 also includes control bar 1212 with a plurality of controls for interacting with the live view representation of physical environment 1200.

FIG. 12A also includes legend 1214 that illustrates a top-down schematic view of physical environment 1200. The top-down schematic view in legend 1214 indicates the location and field of view of the one or more cameras of device 100 relative to physical environment 1200 via camera location 1216-1 and camera field of view 1218, respectively, relative to schematic representation 1220 of table 1206.

FIG. 12B illustrates contact 1222 selecting record control 1224 in control bar 1212. In response to selection of record control 1224, device 100 captures a still view representation (e.g., an image) of physical environment 1200 and displays an updated user interface 1210-2, as shown in FIG. 12C, including the captured still view representation of physical environment 1200.

FIG. 12C illustrates an enlarged view of user interface 1210-2 generated in response to the user selecting record control 1224 in FIG. 12B. User interface 1210-2 includes the still view representation of physical environment 1200 as captured from the perspectives of the cameras at camera location 1216-1 (FIG. 12A). Control bar 1212 in user interface 1210-2 includes measurement control 1228 for activating (e.g., entering) a measurement mode for adding measurements to objects in the captured still view representation of the physical environment 1200. FIG. 12C illustrates selection of measurement control 1228 by contact 1222-2.

FIG. 12D illustrates that, in response to the selection of measurement control 1228 by contact 1222-2 in FIG. 12C, device 100 displays an updated user interface 1210-3. In user interface 1210-3, measurement control 1228 is highlighted to indicate that the measurement mode has been activated. In addition, user interface 1210-3 includes a plurality of controls for performing measurement functions to measure objects, including reticle 1229 in the center of user interface 1210-3, add-measurement-point control 1233 for adding a measurement point (e.g., an endpoint of a measurement segment), and "Clear" control 1231 for removing (e.g., clearing) previously-added measurements.

FIGS. 12E-12F illustrate a process in which the user performs a zoom-in operation on the still view representation of physical environment 1200. In some embodiments, the user performs the zoom-in operation by placing two contacts 1234-1 and 1234-2 on user interface 1210-3 and moving the two contacts 1234-1 and 1234-2 away from each other (e.g., pinch-to-zoom, or more specifically depinch-to-zoom in). As a result, in FIG. 12F, device 100 displays an updated user interface 1210-4 that includes an enlarged portion of the still view representation of physical environment 1200. The plurality of measurement-related controls, such as reticle 1229, "Clear" control 1231, and add-measurement-point control 1233, remain at their respective locations as in user interface 1210-3 of FIG. 12E.

FIGS. 12G-12I illustrate a process in which the user performs a panning operation on the still view representation of physical environment 1200. In FIG. 12G, the user places contact 1235 on user interface 1210-4 and moves contact 1235 rightward. As a result, device 100 displays an updated user interface 1210-5 in FIG. 12H. User interface 1210-5 includes a different portion of the still view representation of physical environment 1200 compared to that displayed in user interface 1210-4 (e.g., showing portions of the physical environment on the left). The user then places another contact 1237 on user interface 1210-5 and moves another portion of the still view representation of physical environment 1200 into view in an updated user interface 1210-6 in FIG. 12I. In FIG. 12I, a corner (e.g., a first corner) of a representation of table 1206 aligns with the center of reticle 1229. To add a first measurement point, the user then activates add-measurement-point control 1233 with contact 1239.

FIGS. 12J-12O illustrate a process in which the user measures a portion of the still view representation of physical environment 1200. After the user activates add-measurement-point control 1233 in FIG. 12I, a first measurement point 1240 appears on user interface 1210-6 at a location corresponding to the center of reticle 1229 as shown in FIG. 12J. The user then places another contact 1241 on user interface 1210-6 and moves contact 1241 leftward. As a result, in FIG. 12K, measurement segment 1242 appears on an updated user interface 1210-7. Measurement segment 1242 connects the first measurement point 1240 with the center of reticle 1229, as the first measurement point 1240 moves with the representation of physical environment 1200 according to the movement of contact 1241. Label 1244 is displayed at a predefined location of user interface 1210-7 (e.g., bottom center) to indicate the current length of measurement segment 1242. As measurement segment 1242 changes length (e.g., as the still view representation of physical environment 1200 is moved with contact 1241), label 1244 is continually updated to indicate the current length of measurement segment 1242. In FIG. 12L, the user selects the add-measurement-point control 1233 with contact 1243. As a result, in FIG. 12M, a second measurement point 1246 appears at the location corresponding to the center of reticle 1229, which also corresponds to a corner (e.g., a second corner, distinct from the first corner) of the representation of table 1206. In some embodiments, when reticle 1229 moves within a predefined threshold of an identified feature in the still view representation of physical environment 1200 (e.g., a corner of an object), the user interface updates to automatically align the center of reticle 1229 with the identified feature to facilitate adding measurement points. In FIG. 12M, label 1244 indicates that measurement segment 1242, which connects the two added measurement points 1246 and 1240, now measures 7' in length (e.g., the length of the long edge of table 1206).

FIGS. 12N-12O illustrate a process in which the user performs a zoom-out operation on the still view representation of physical environment 1200 to generate an updated user interface 1210-8 by moving contacts 1251 and 1249 (e.g., pinch-to-zoom out). Label 1244 continues to be displayed to indicate the length of measurement segment 1242, which is 7', while at least a threshold portion (e.g., a threshold fraction) of measurement segment 1242 remains in view, and while measurement segment 1242 is at least a threshold size on the display.

Figure 12P:
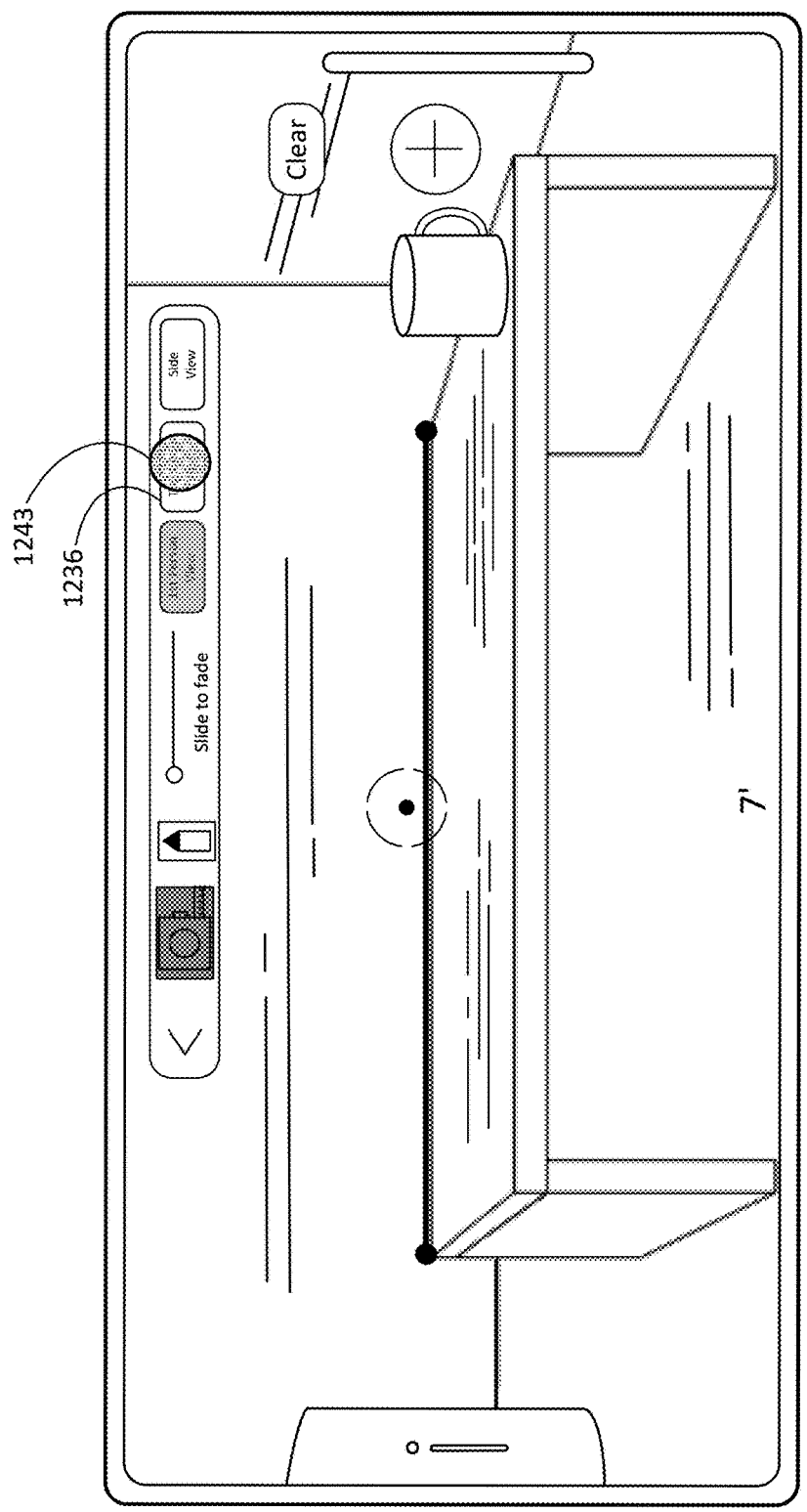
Figure 12Q:
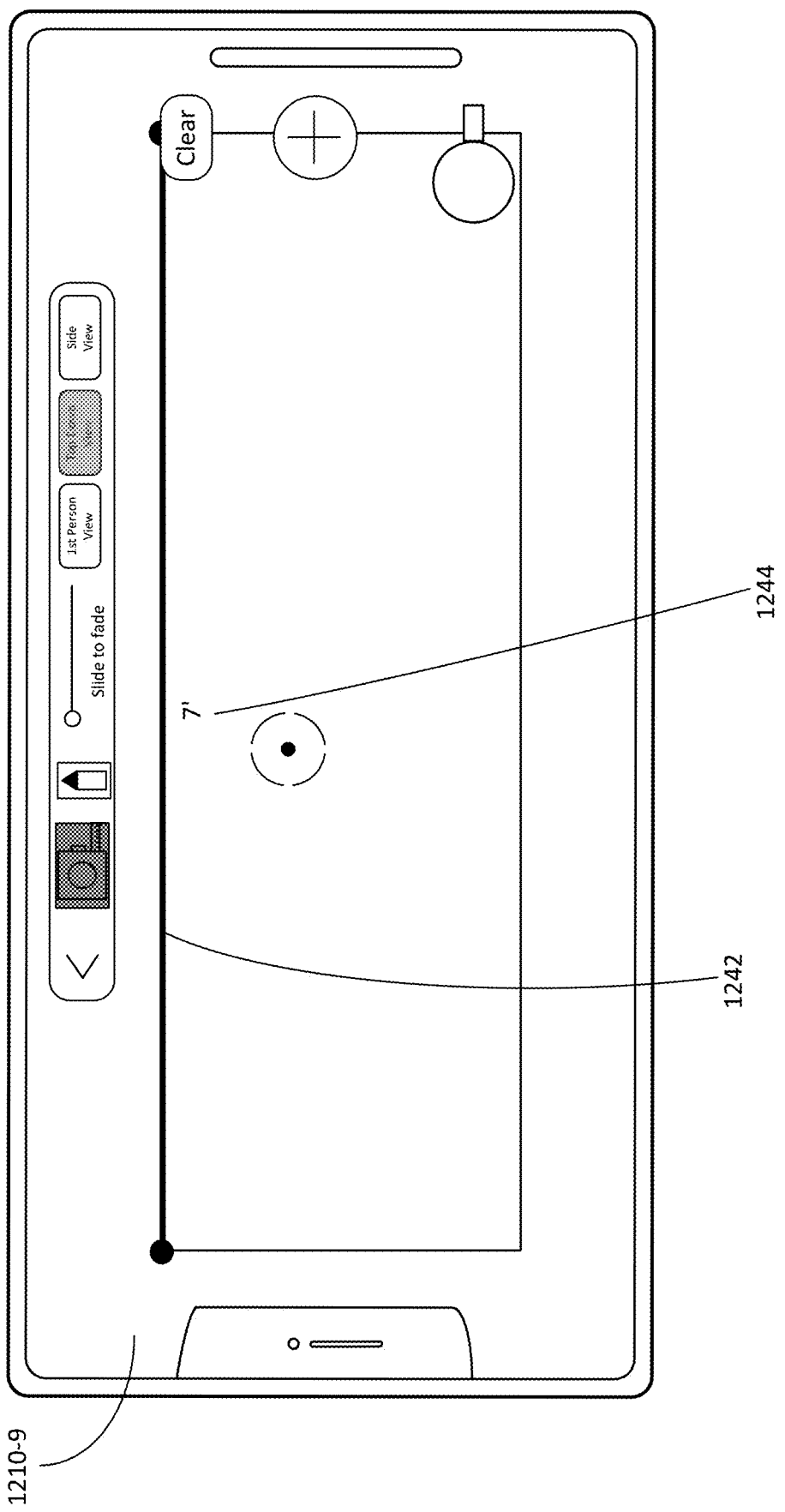
Figure 12R:
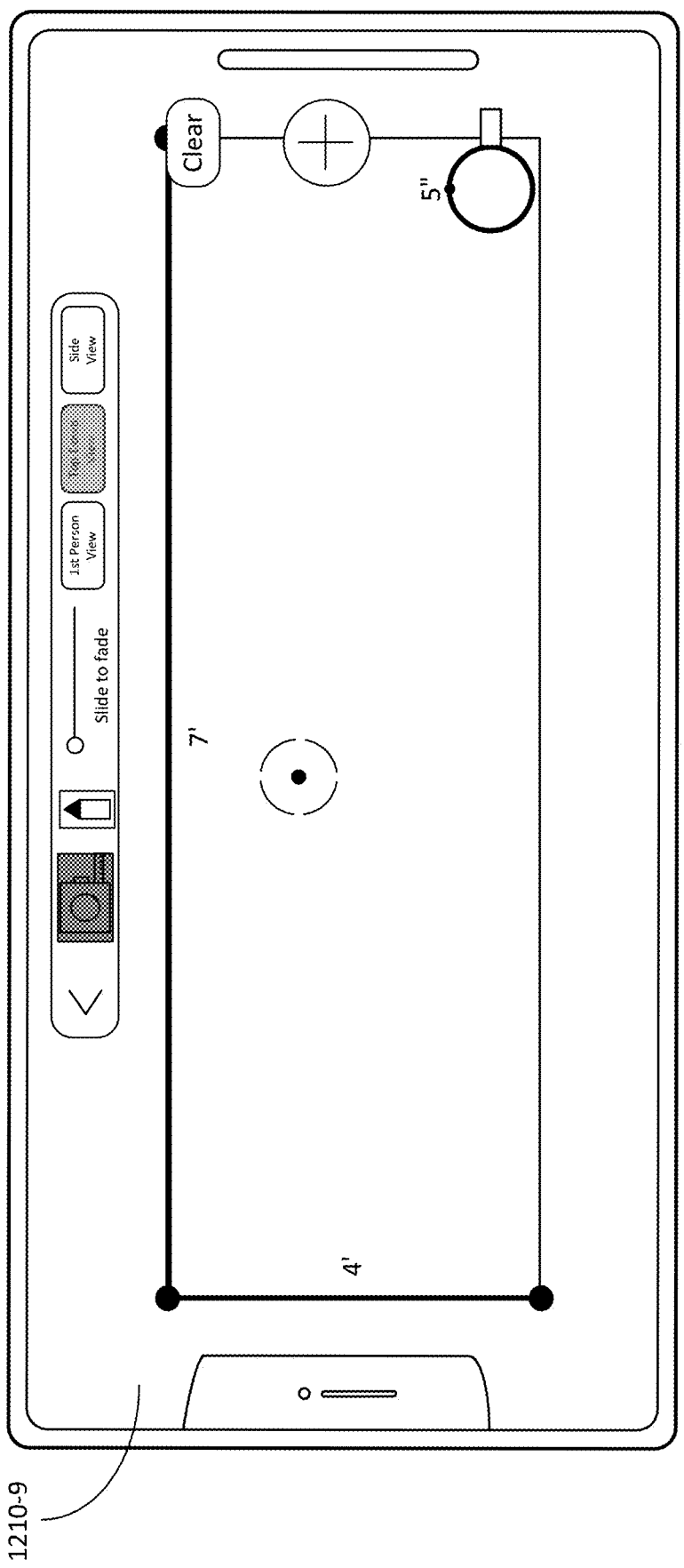
Figure 12S:
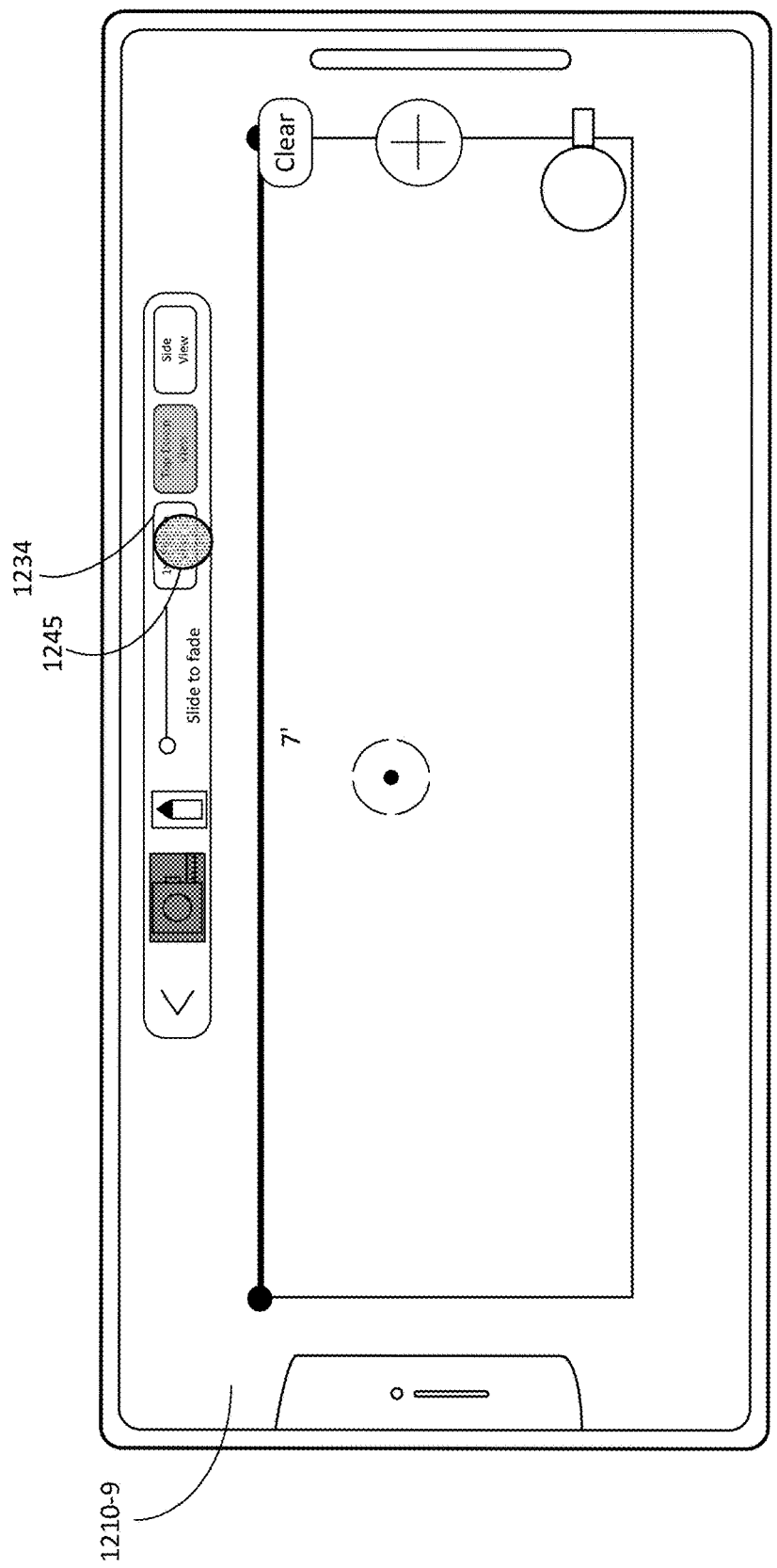
Figure 12T:
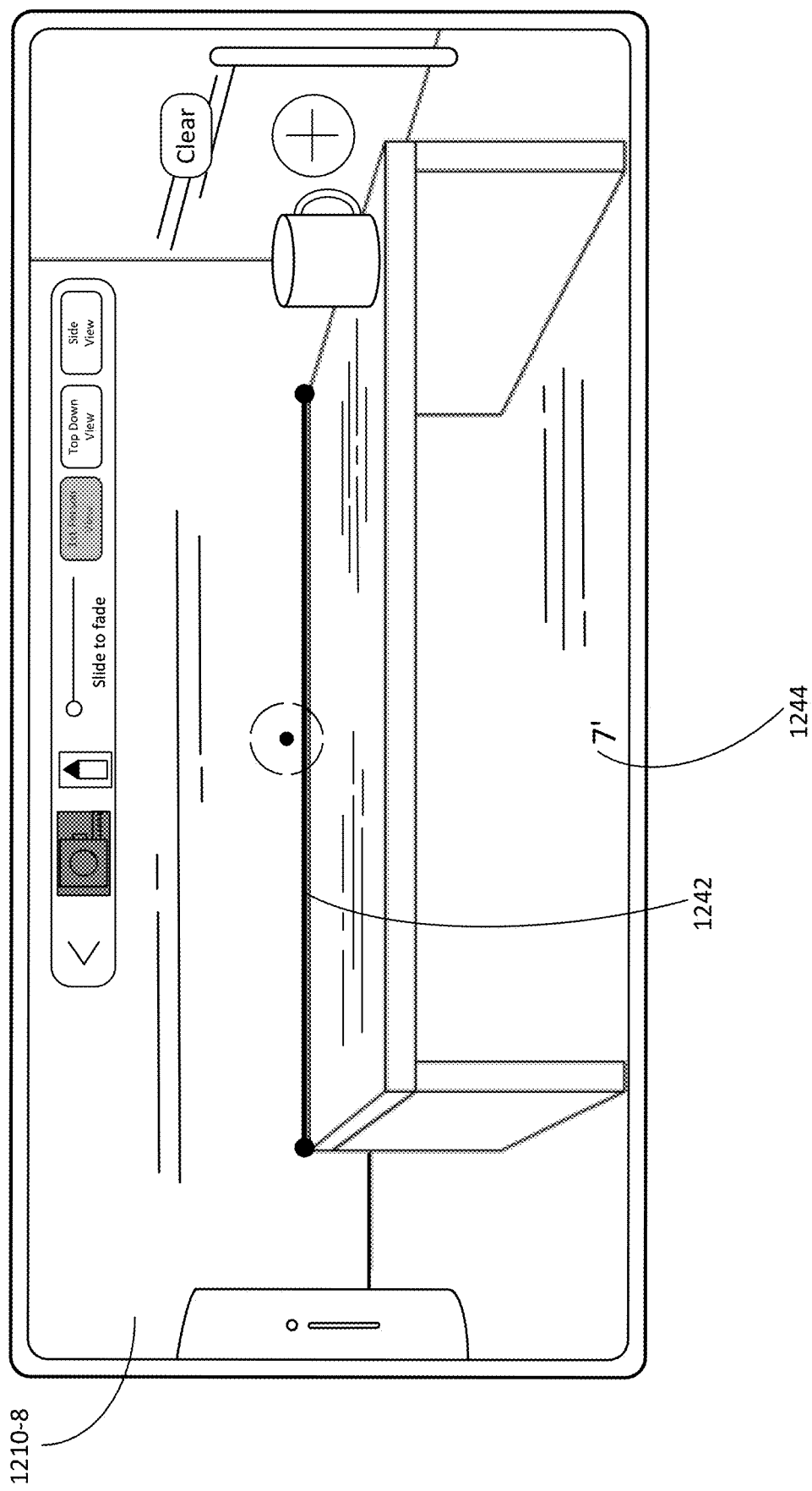

FIGS. 12P-12T illustrate a process in which the user switches to different views from the still view representation (e.g., a first-person view in this example) of physical environment 1200. In FIG. 12P, the user selects "Top Down View" control 1236 with contact 1243. As a result, in FIG. 12Q, device 100 displays an updated user interface 1210-9 showing a top-down view representation of physical environment 1200, with measurement segment 1242 displayed at the same location with respect to the physical environment 1200 (e.g., overlapping the long edge of table 1206). In some embodiments, measurement labels are displayed next to their corresponding measurement segments rather than in a predefined region (e.g., bottom center) of the user interface; FIG. 12Q thus illustrates that label 1244 is displayed next to measurement segment 1242 in the top-down view representation. In some embodiments, measurement labels are displayed in a predefined region of the user interface in embodiments where only one measurement at a time may be made of a representation of a physical environment. In some embodiments, measurement labels are displayed next to their corresponding measurement segments in embodiments where multiple simultaneous measurements may be made of a representation of a physical environment, so as to more closely associate a particular label with its respective measurement segment (e.g., where a single label is displayed in the predefined region, there may be confusion as to which of multiple measurement segments the label refers). Alternatively or optionally, in some embodiments, when switching to the top-down view representation, the updated user interface 1210-9 automatically shows all dimensional information (e.g., all available measurements) of objects in the top-down view representation, as shown in FIG. 12R. FIG. 12S illustrates that the user selects "1st Person View" control 1234 with contact 1245. As a result, device 100 switches back to displaying the first-person view, including the previously-added measurement segment 1242 and label 1244, as shown in user interface 1210-8 in FIG. 12T.

Figure 12U:
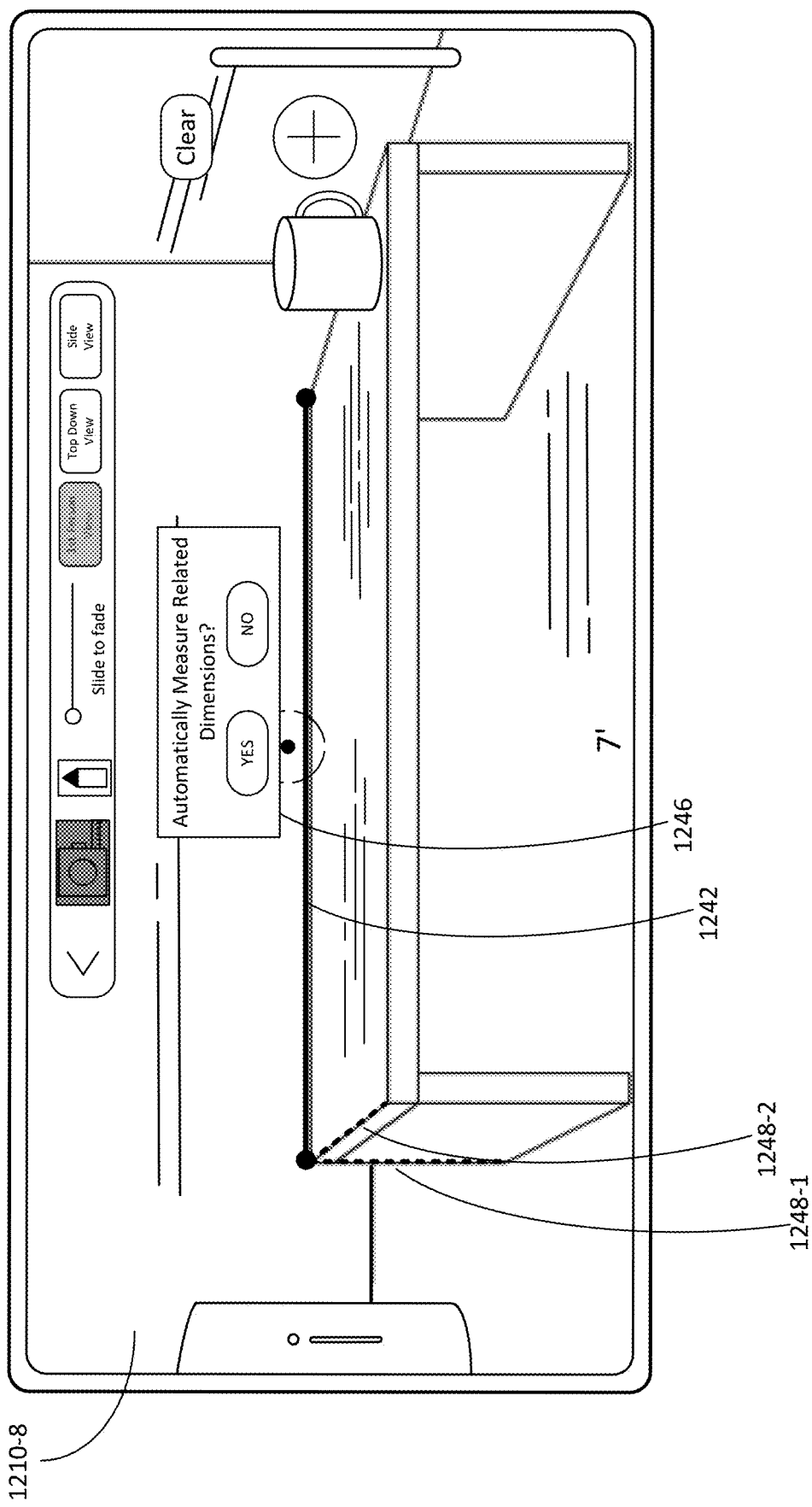
Figure 12V:
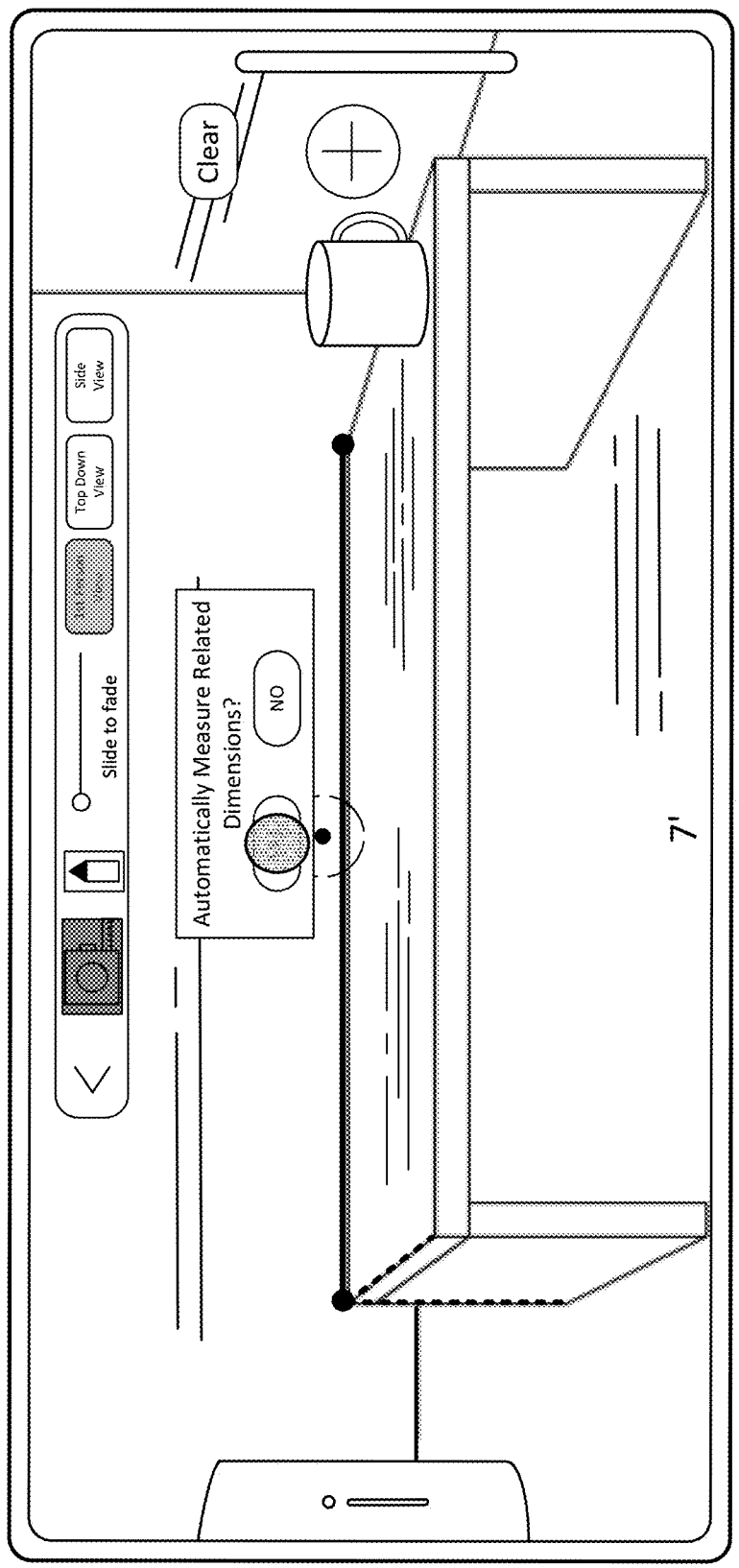
Figure 12W:
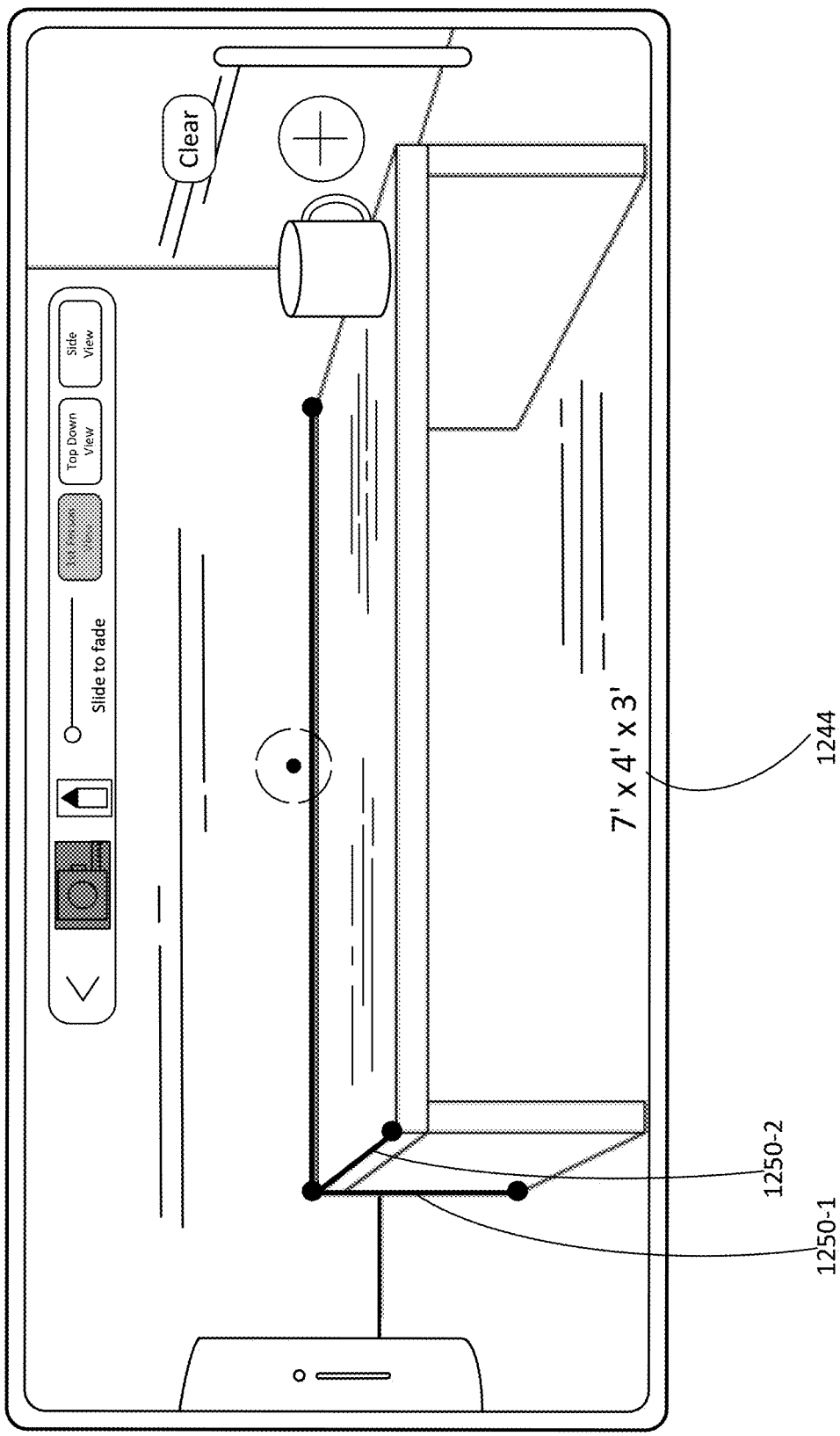
Figure 12X:
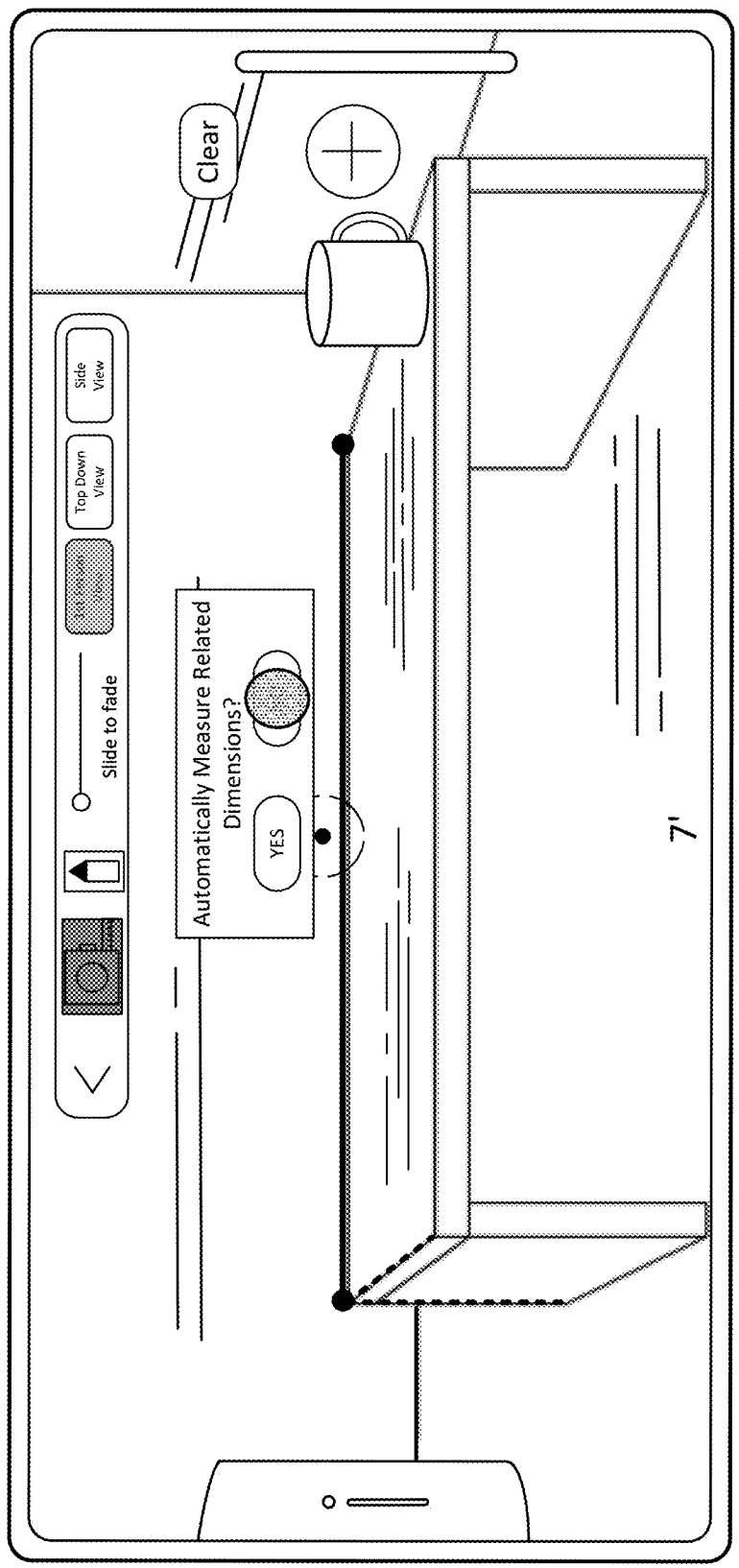
Figure 12Y:
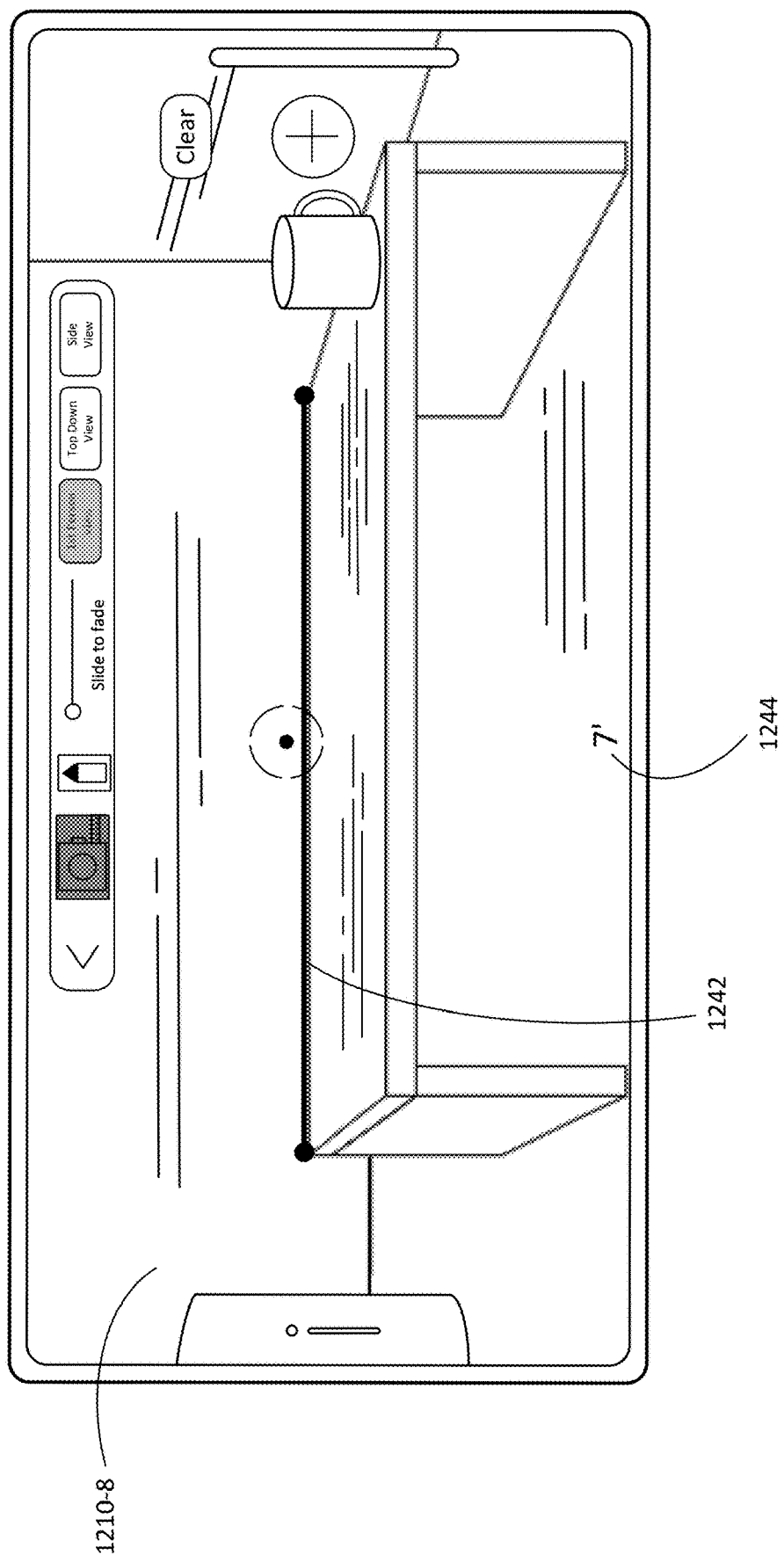

FIGS. 12U-12Y illustrate a process in which related dimensional information for an object that has been previously measured is automatically measured. In FIG. 12U, after measurement segment 1242 is generated (e.g., after the user adds the second measuring point 1246), prompt 1247 appears in user interface 1210-10 asking if the user would like to automatically measure additional dimensional information related to that measured by measurement segment 1242. In some embodiments, the related dimensional information is determined based on depth data collected by the camera(s) or depth sensor(s) of device 100. For example, since measuring segment 1242 measures an edge of table 1206 in the still view representation of physical environment 1200, the related information may be other edges of the same table 1206. In some embodiments, while prompt 1247 is displayed, visual indicators such as dotted lines 1248-1 and 1248-2 are displayed to indicate additional dimensional information that is available (e.g., available measurements for other edges of table 1206). FIGS. 12V-12W illustrate that if the user accepts the option to automatically measure the related dimensional information (e.g., by selecting the "Yes" option in FIG. 12V), additional measurement segments (e.g., 1250-1 and 1250-2 in FIG. 12W) corresponding to the additional dimensional information are displayed (e.g., over the other edges of table 1206). Furthermore, label 1244 is updated to indicate these additional measurements. Alternatively, FIGS. 12X-12Y illustrate that if the user declines the option to automatically measure related dimensions (e.g., by selecting the "No" option in FIG. 12X), no measurement segments are added, and only the previously-added measuring segment 1242 and corresponding label 1244 are displayed in user interface 1210-11 (e.g., the same user interface as user interface 1210-8).

Figure 12Z:
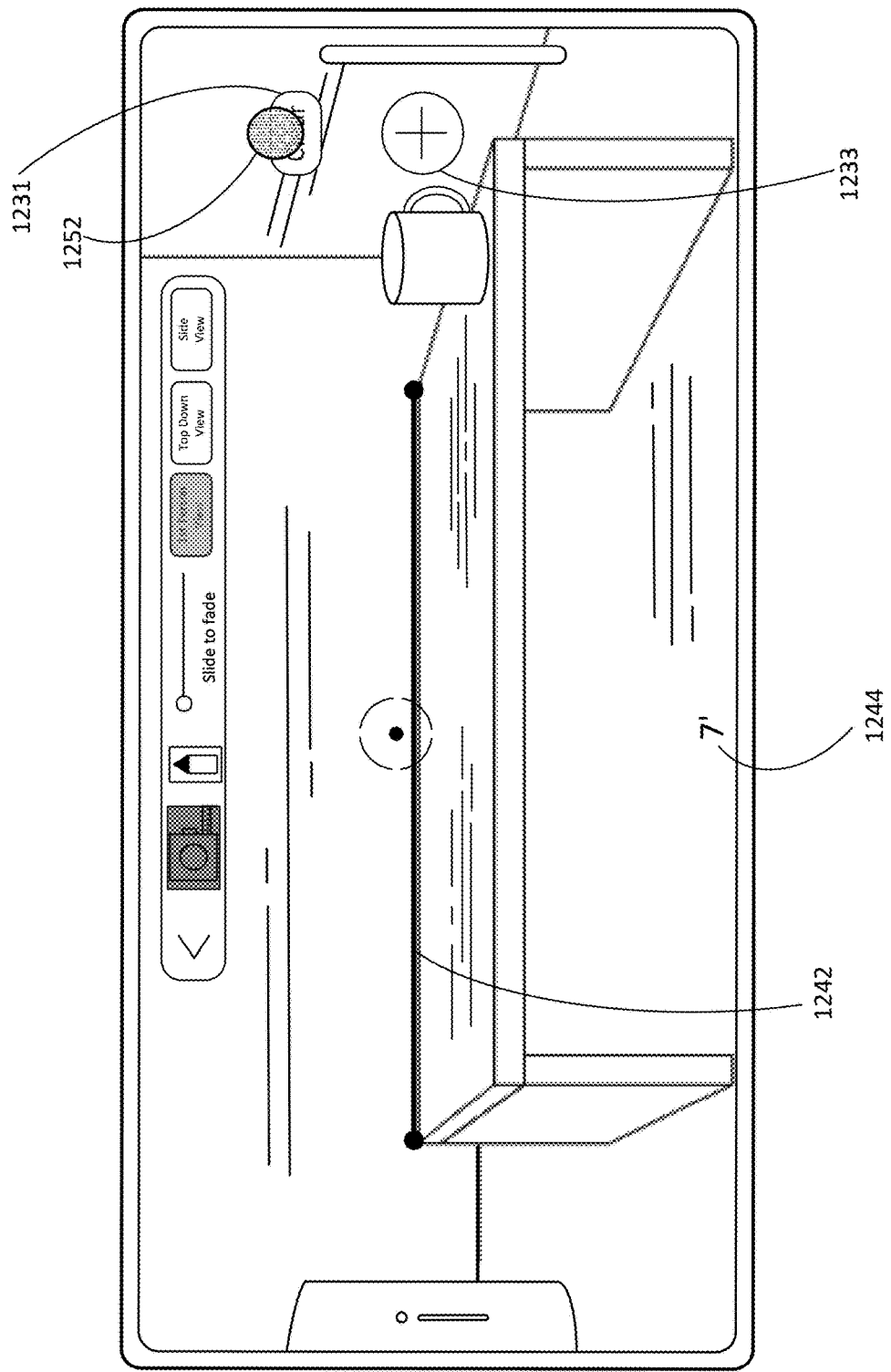
Figure 12A:
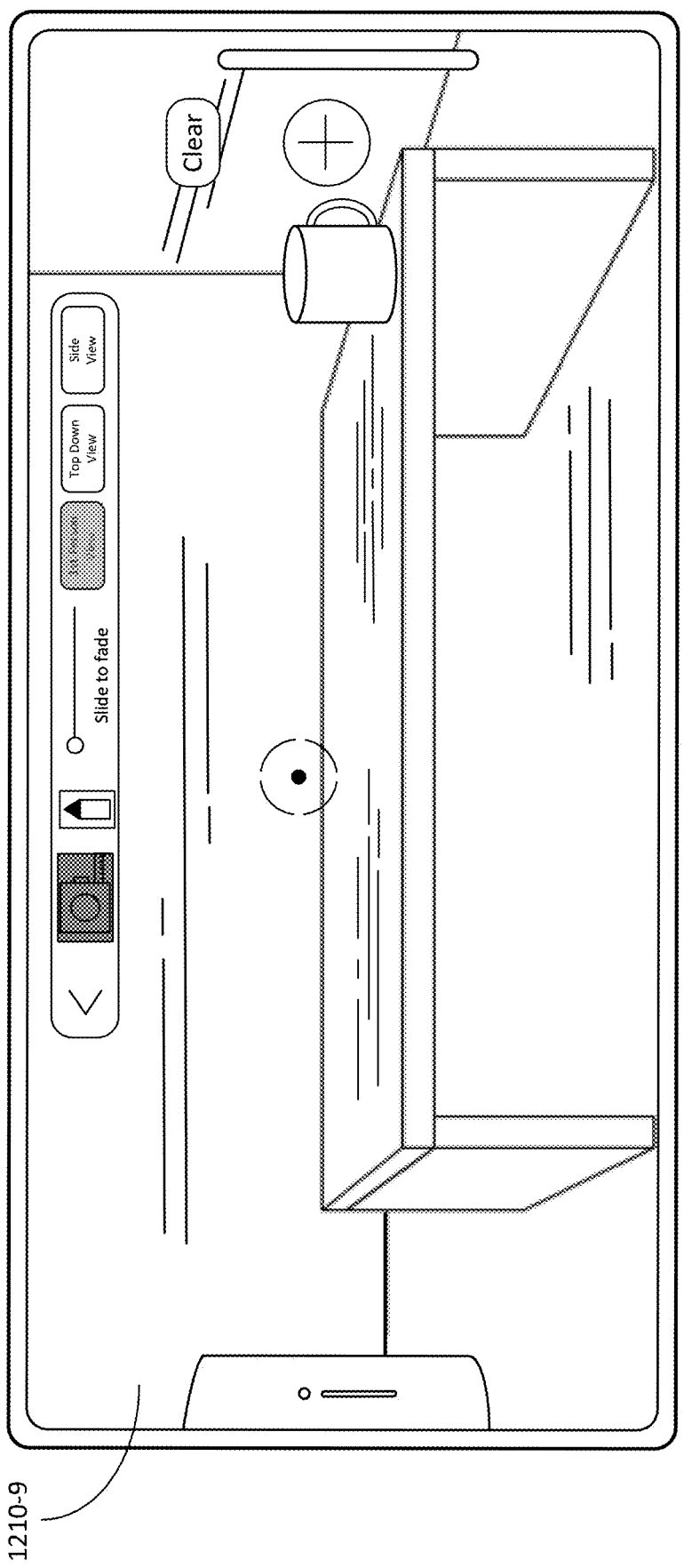
Figure 12B:
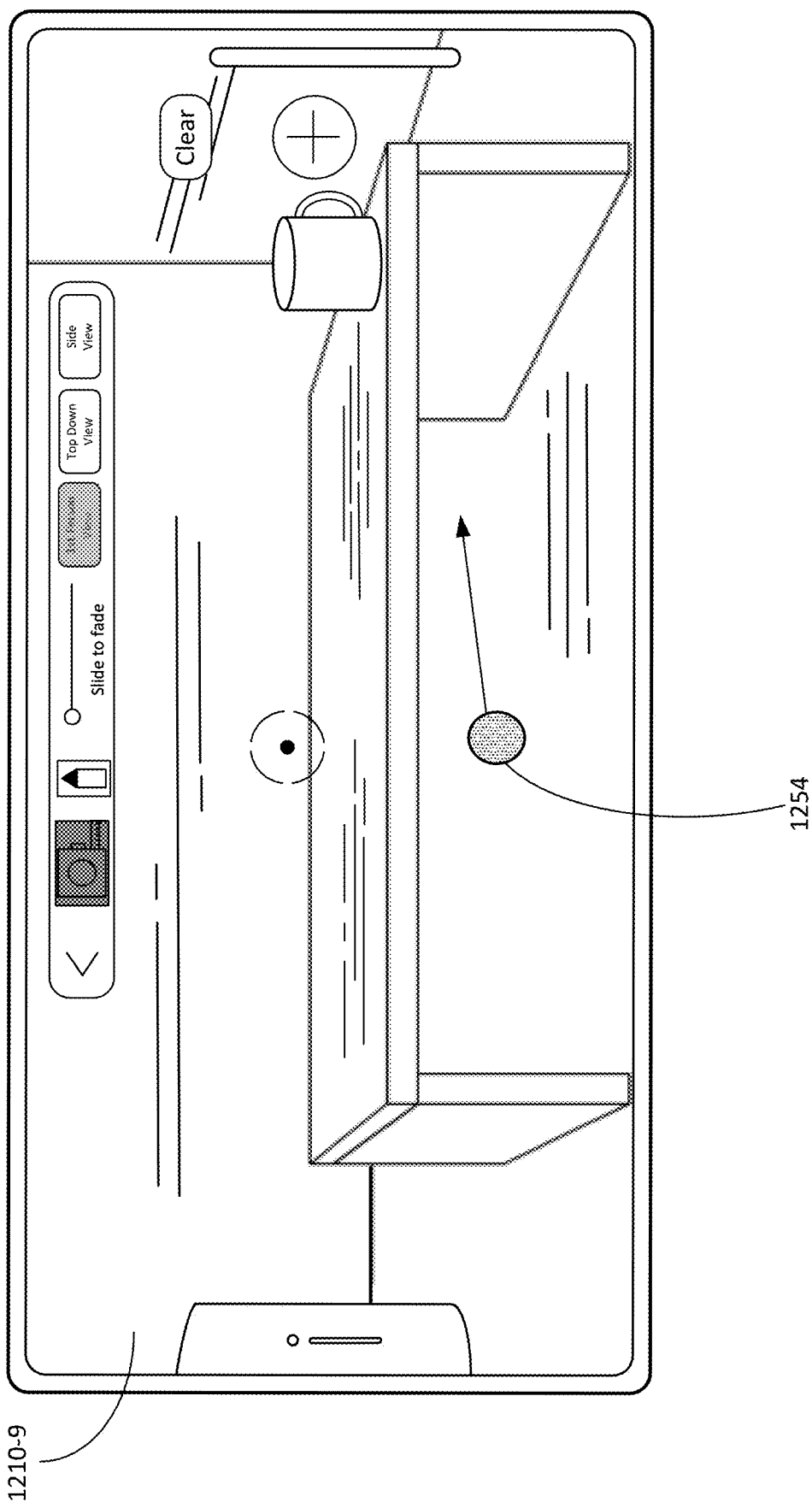
Figure 12C:
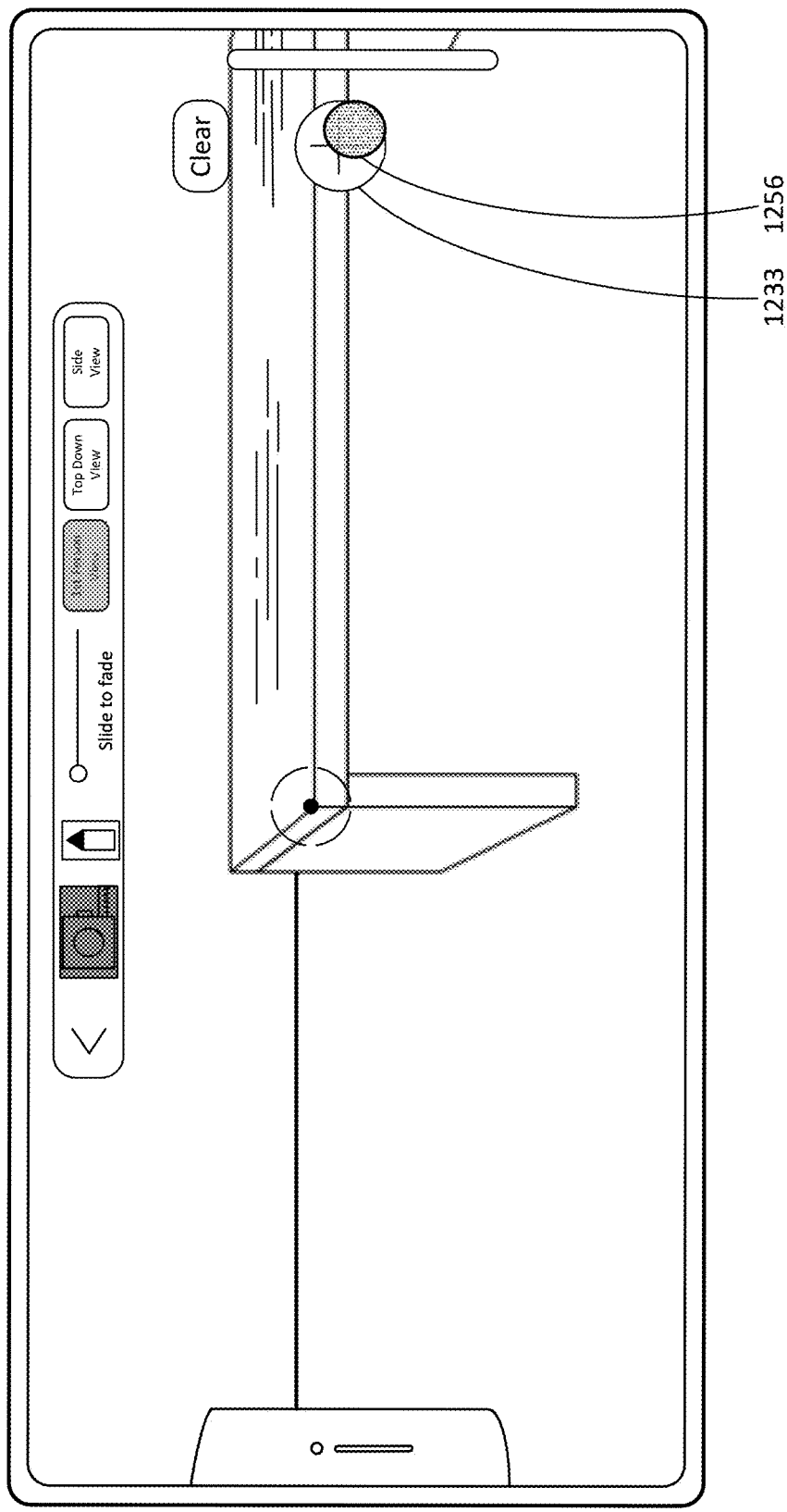
Figure 12D:
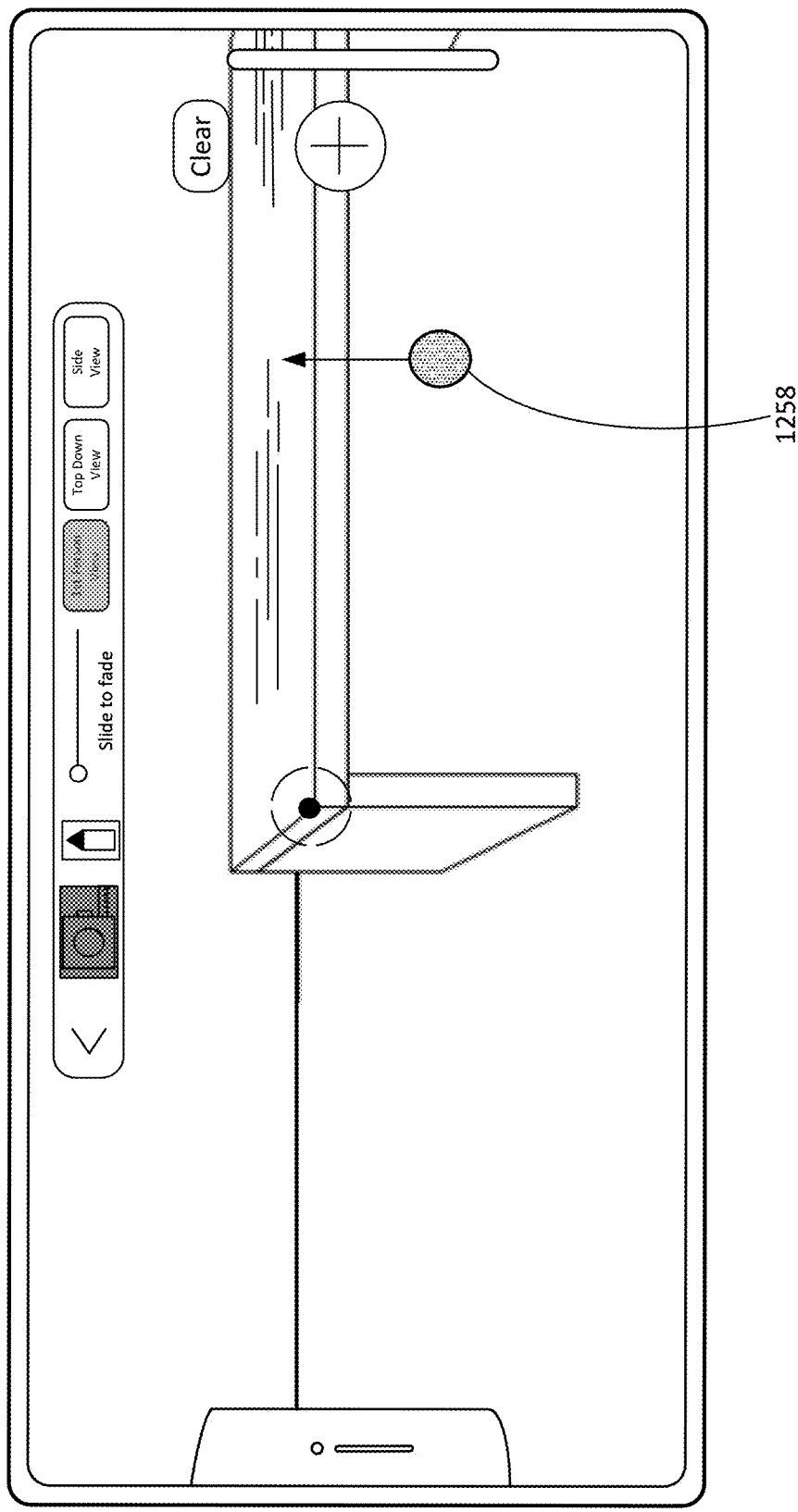
Figure 12E:
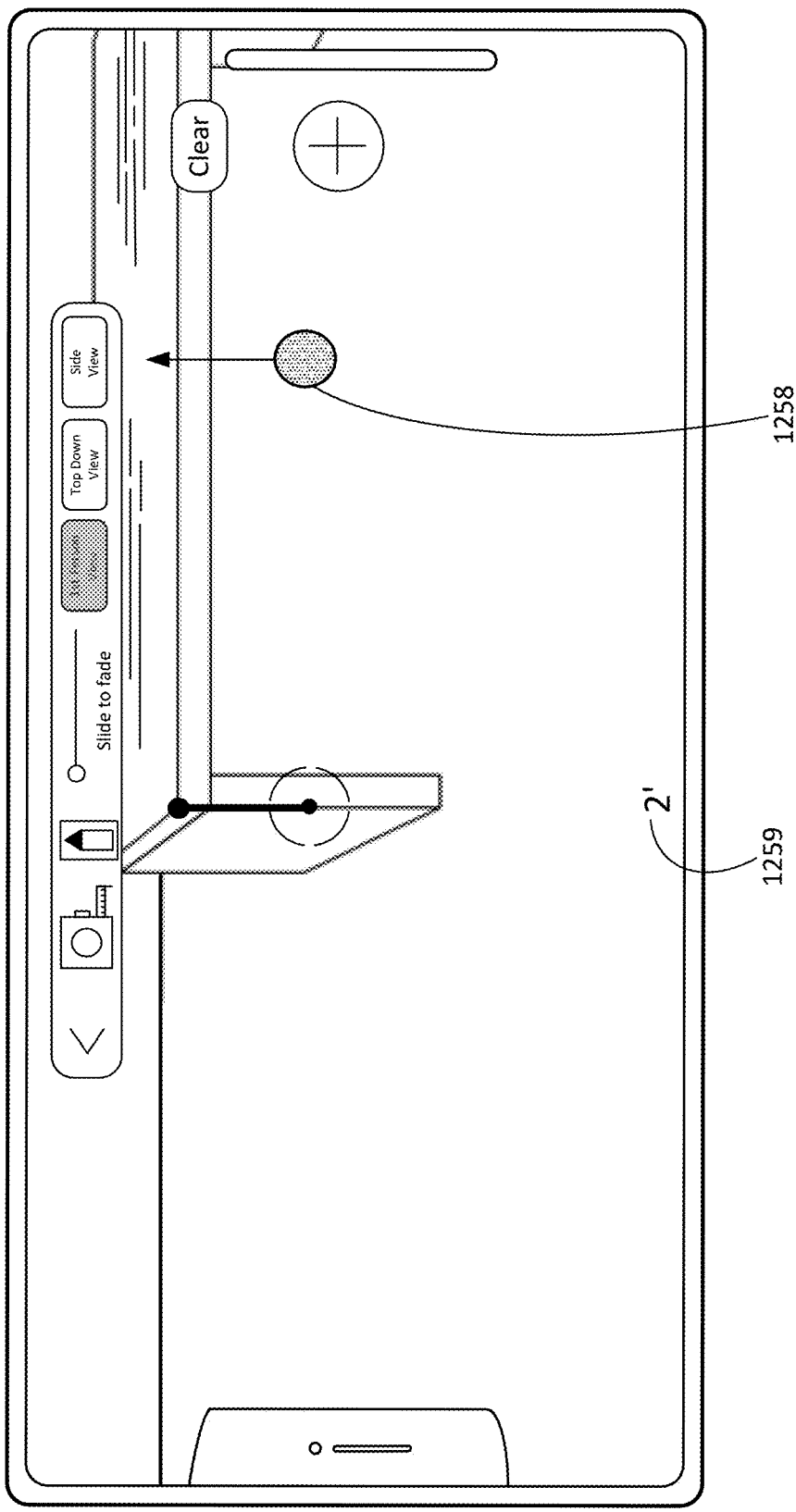
Figure 12F:
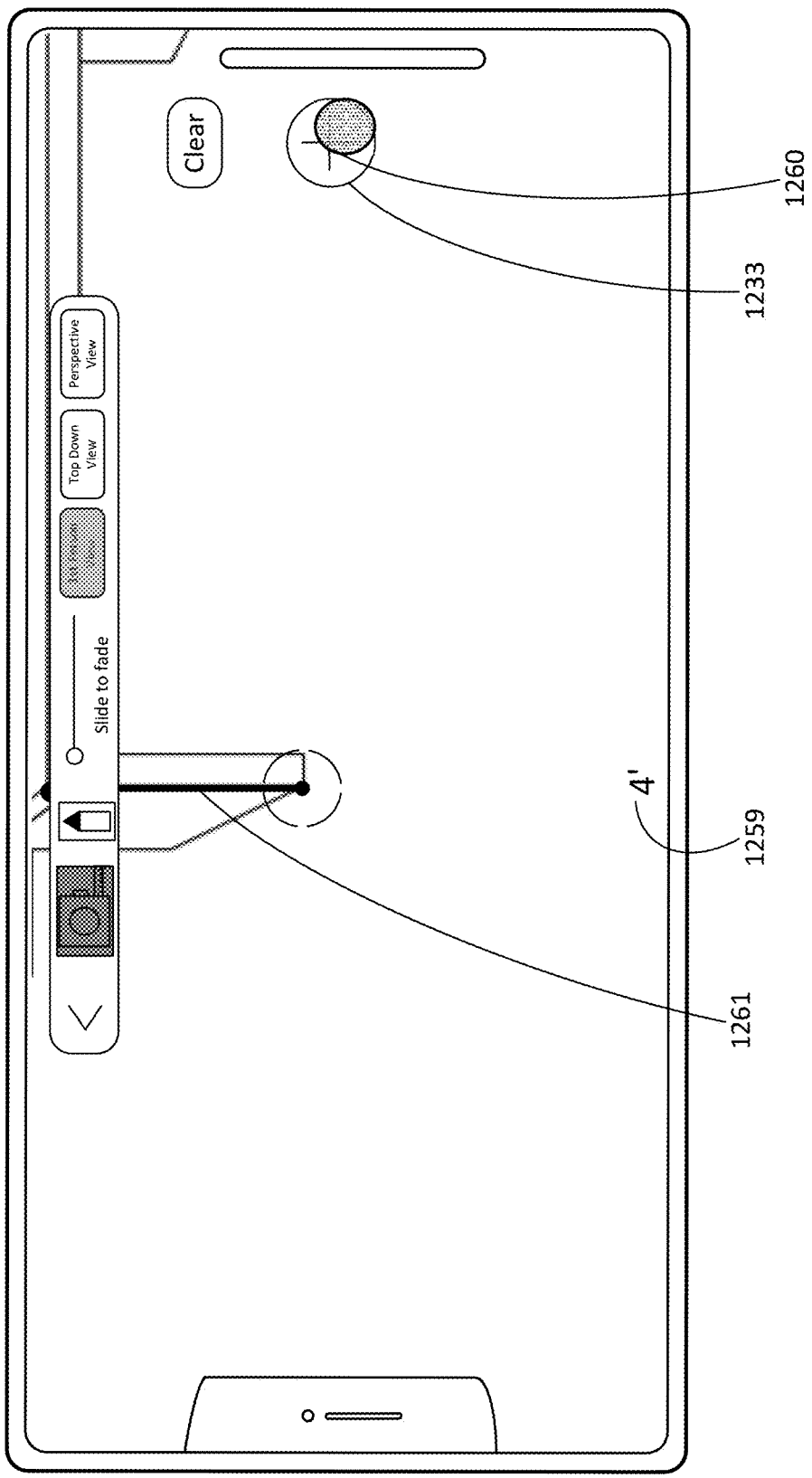
Figure 12G:
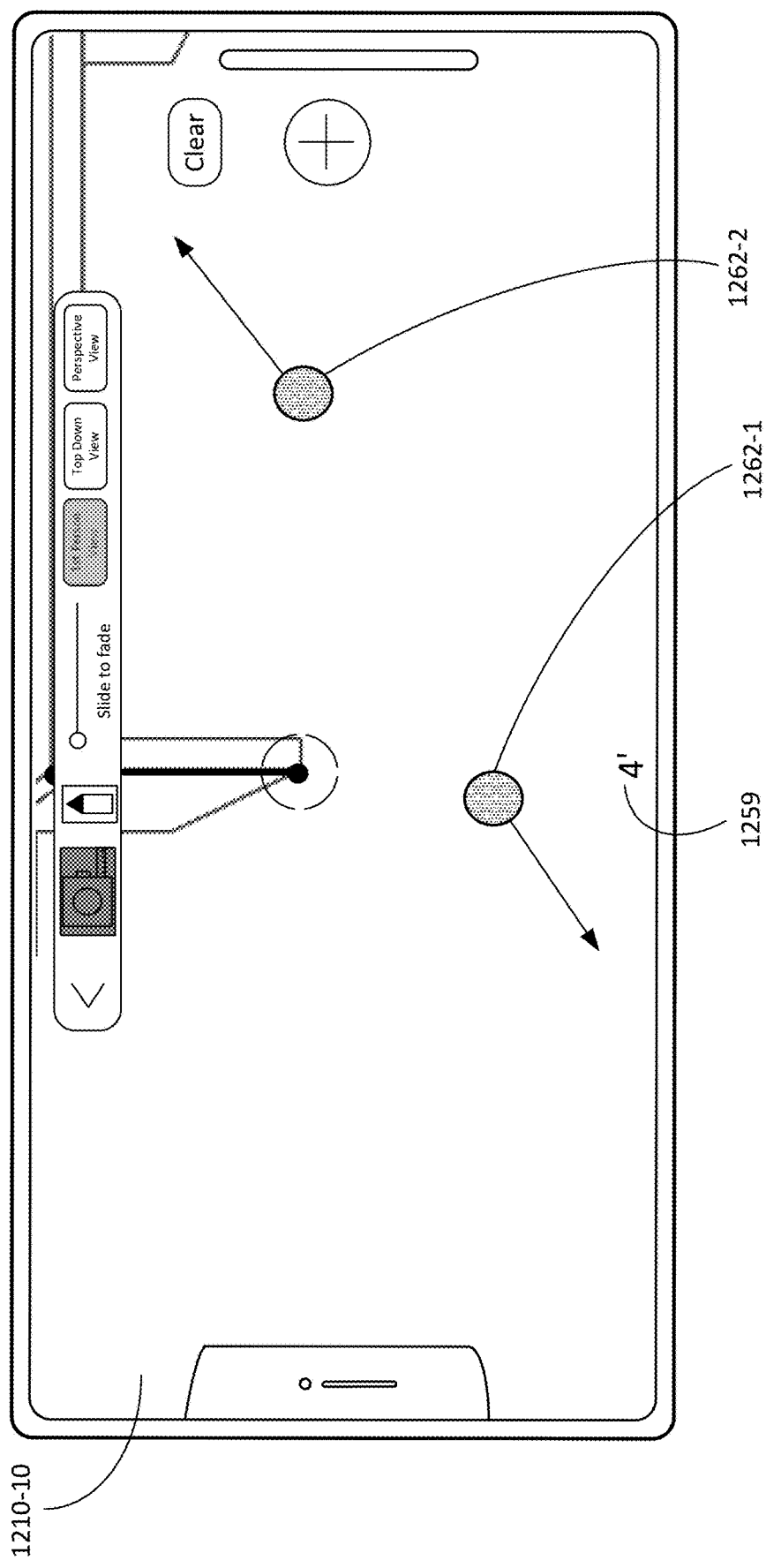
Figure 12H:
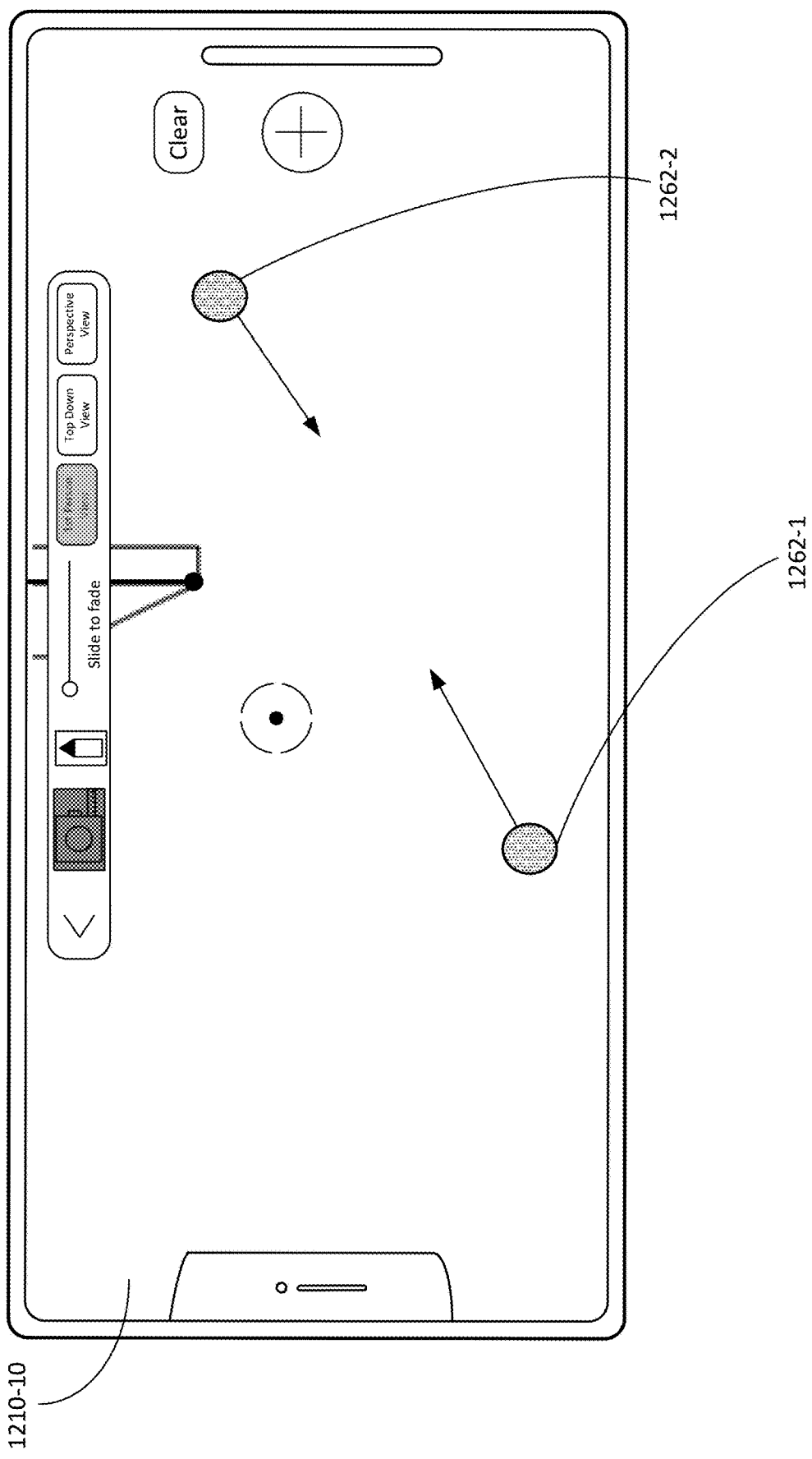
Figure 12I:
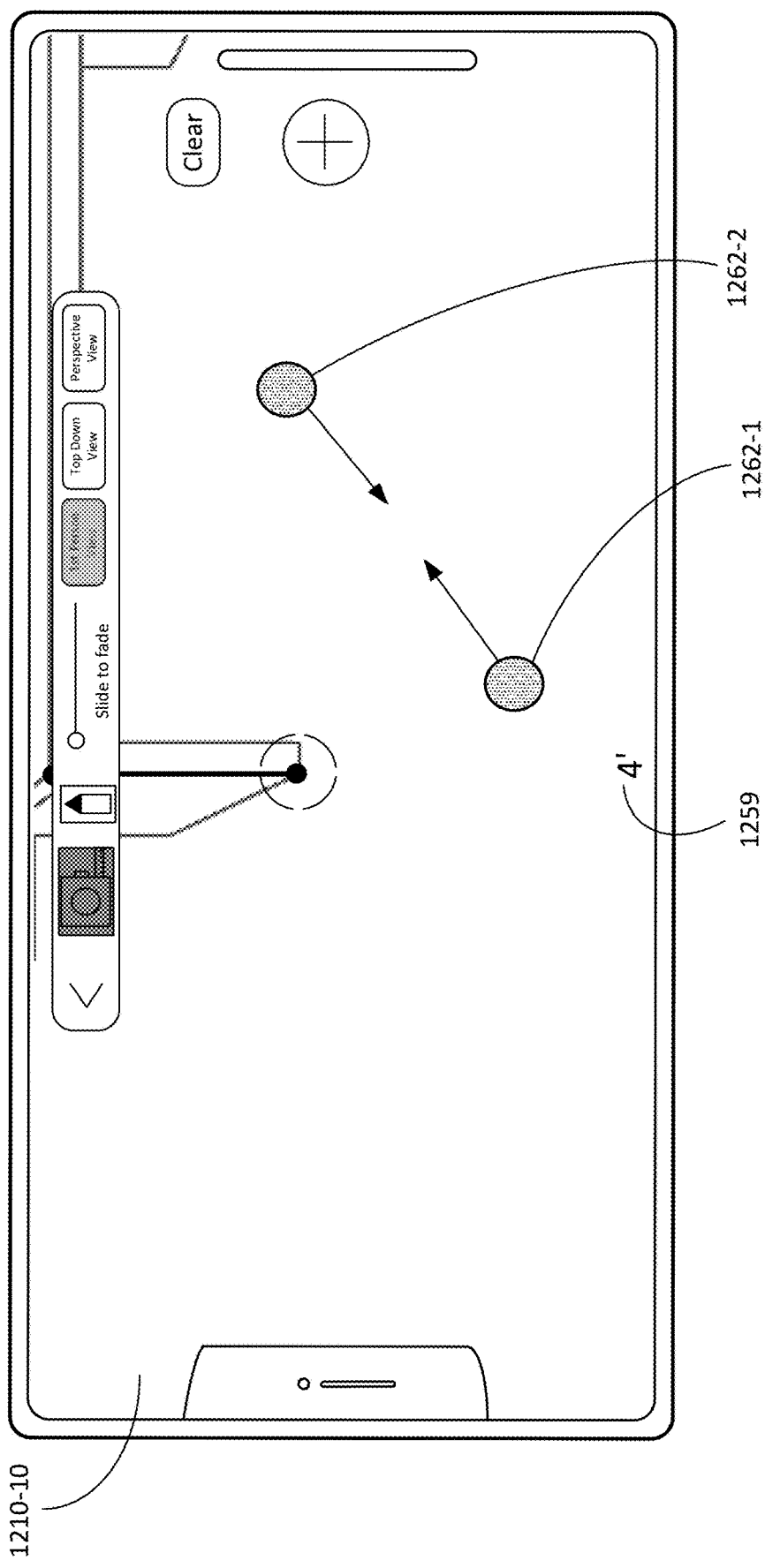
Figure 12J:
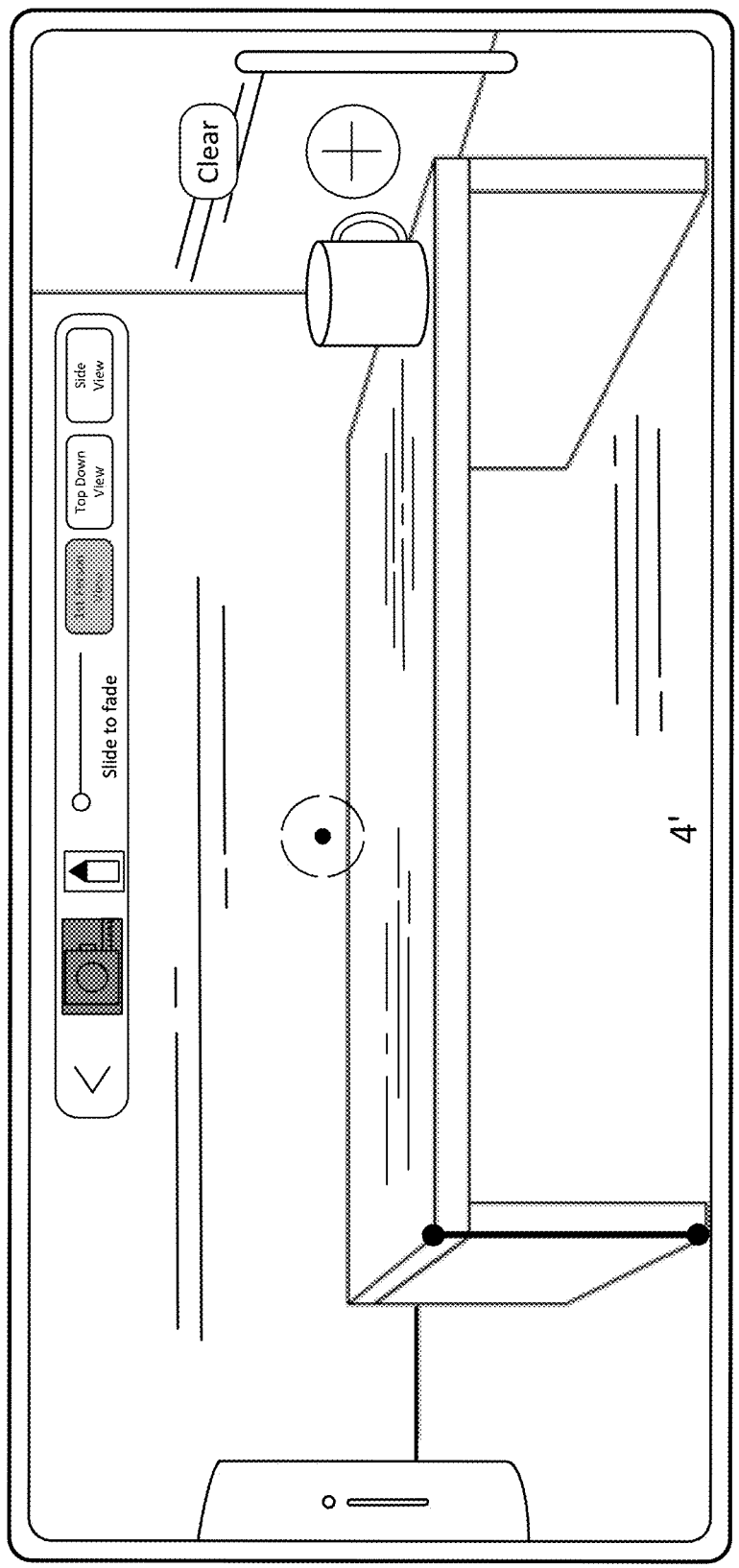
Figure 12K:
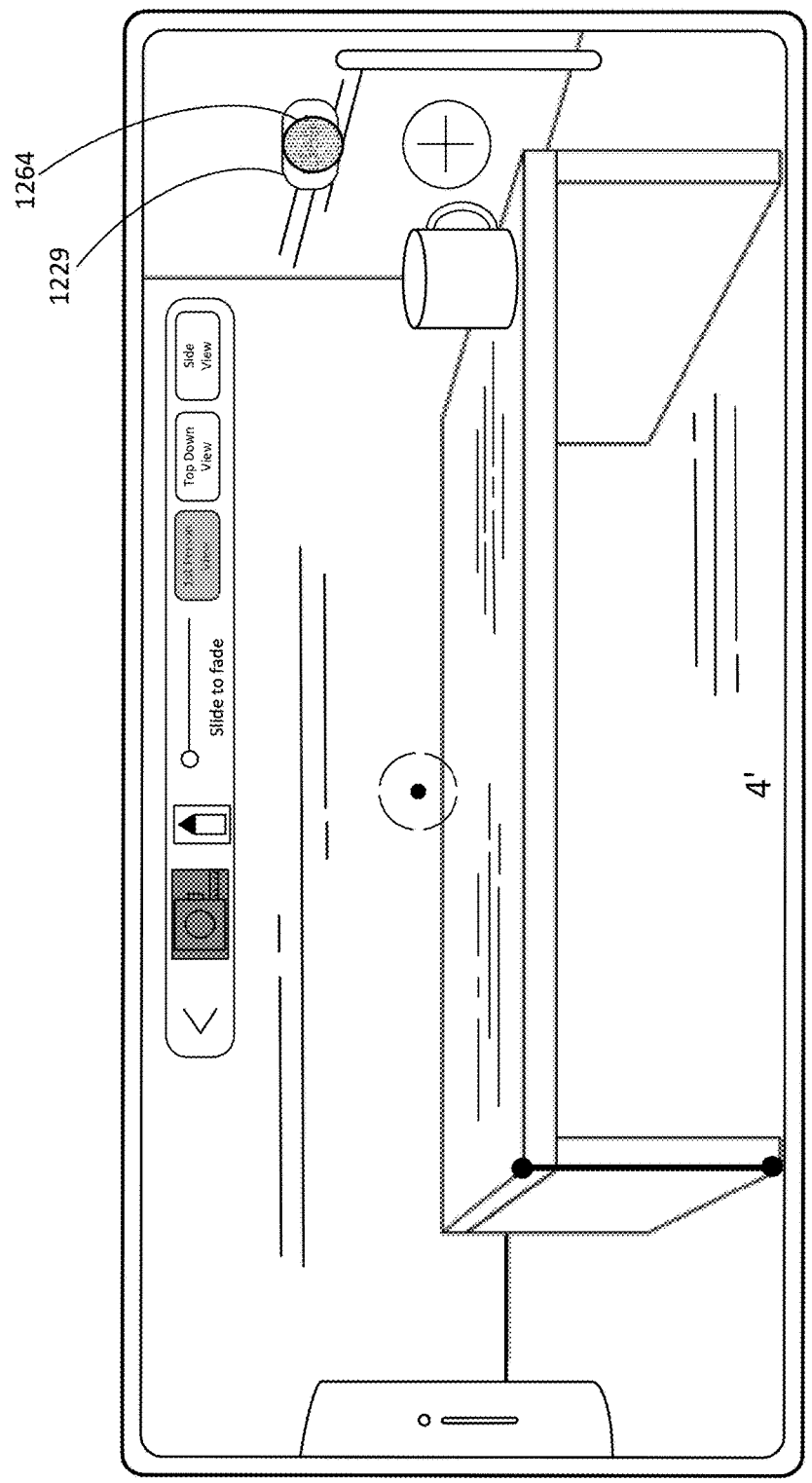
Figure 12L:
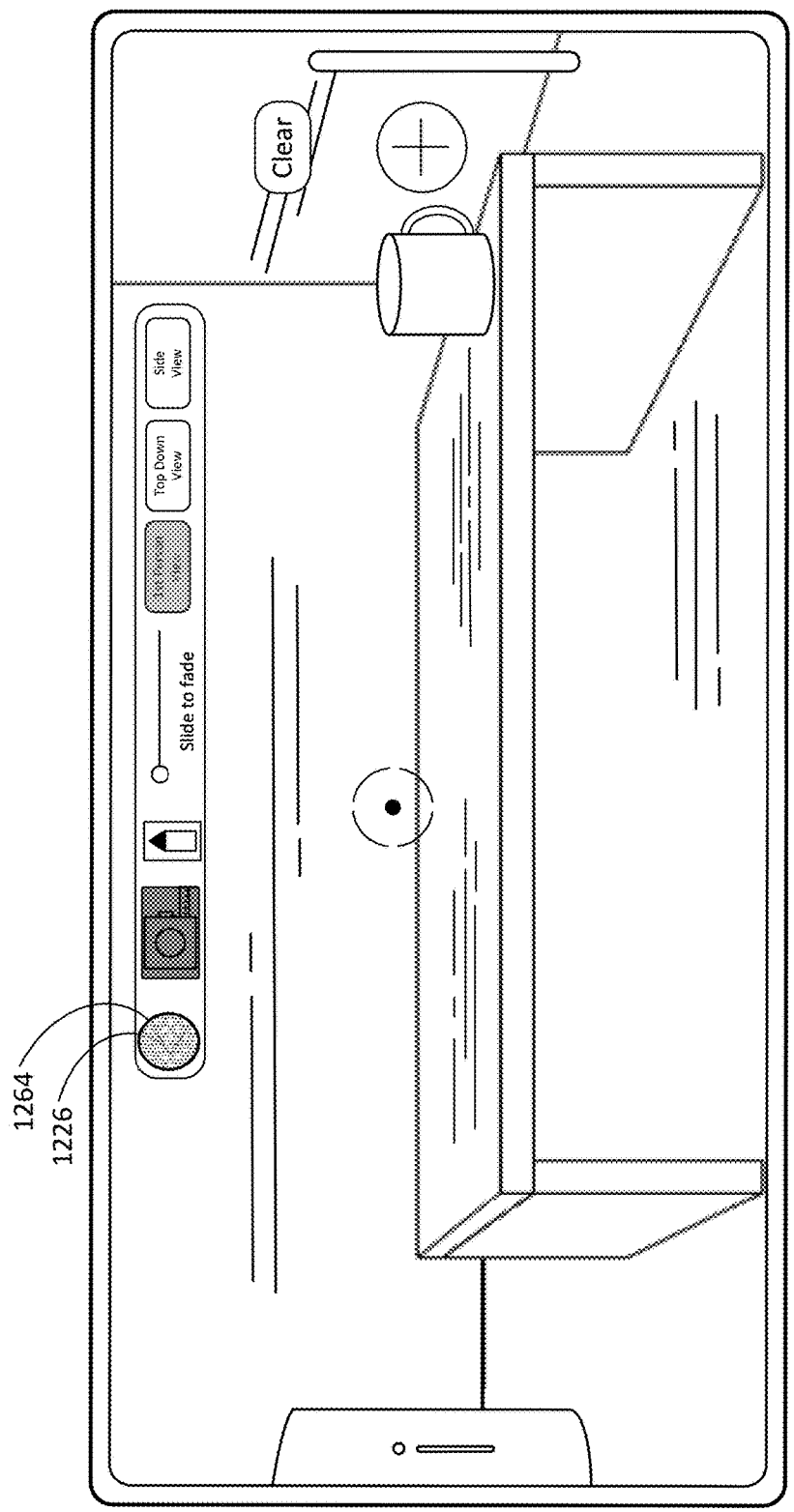
Figure 12M:
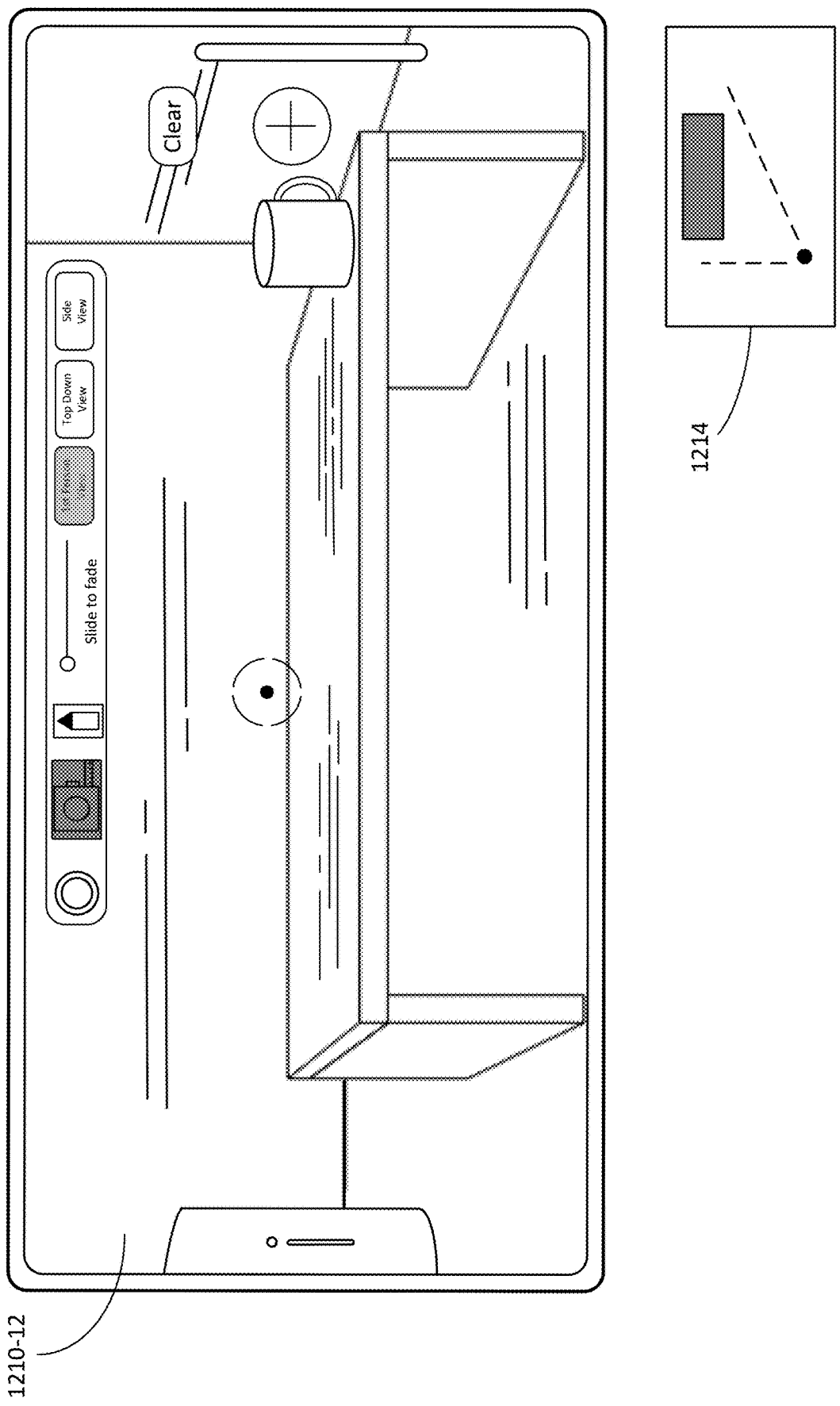
Figure 12N:
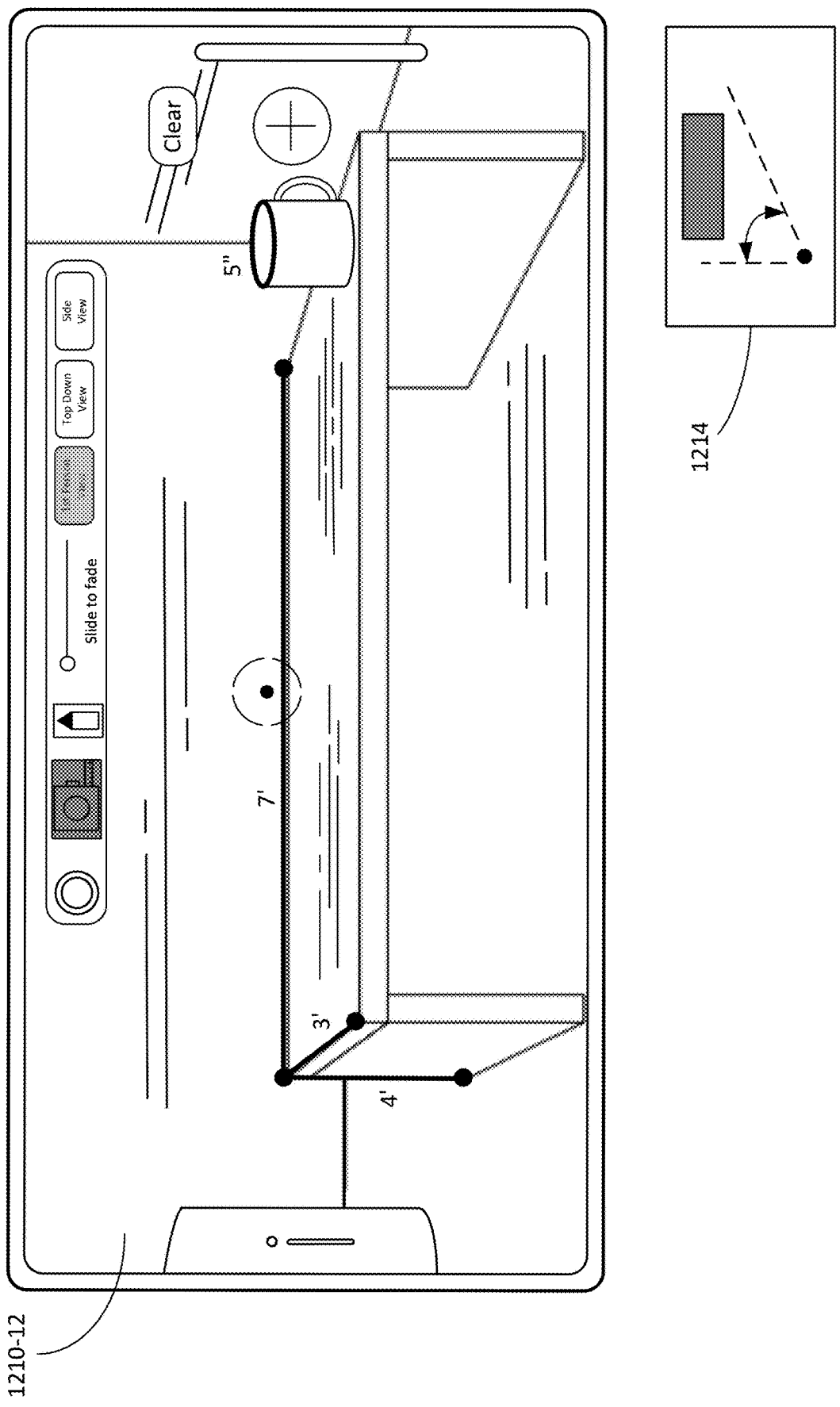
Figure 12O:
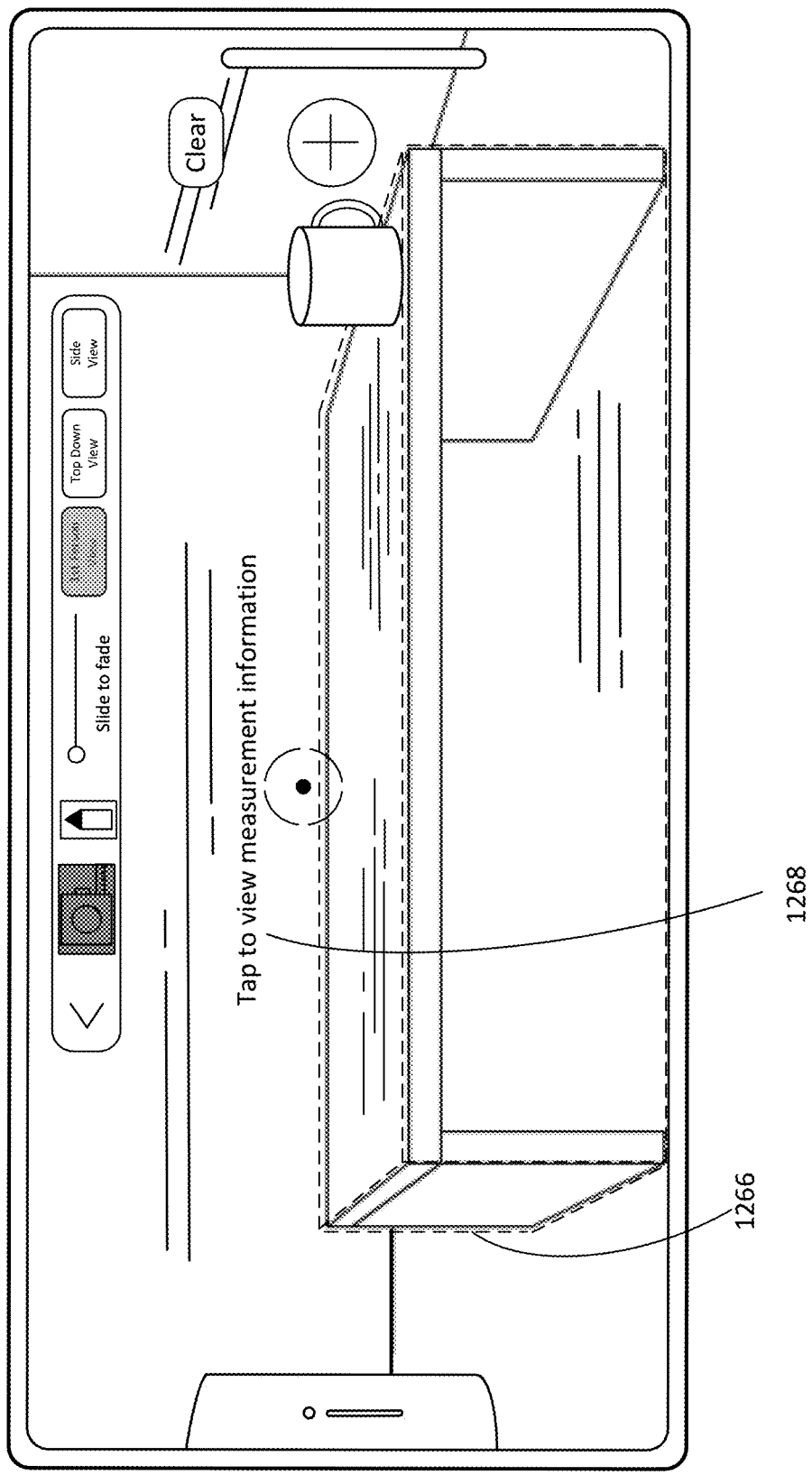
Figure 12P:
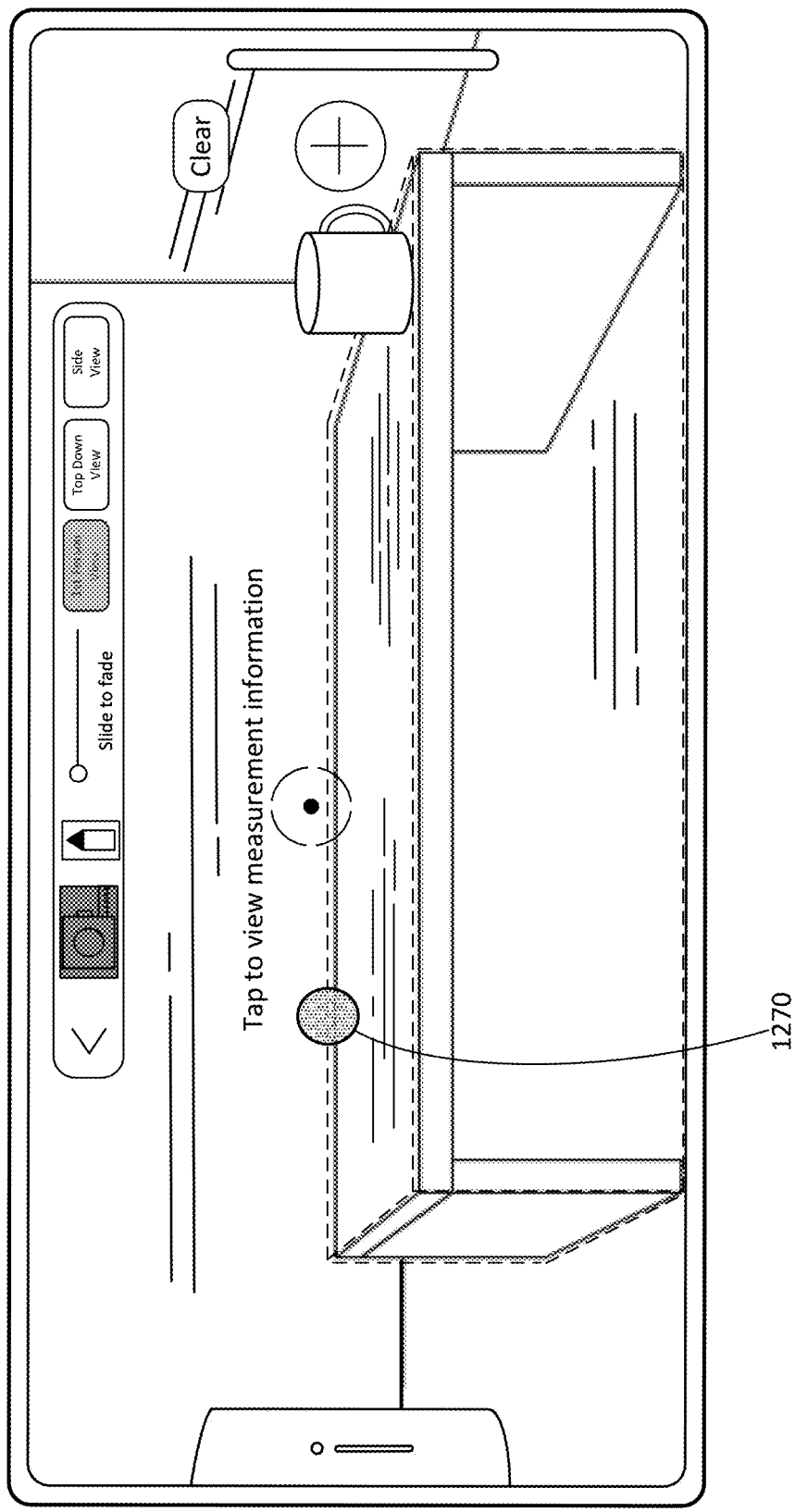
Figure 12Q:
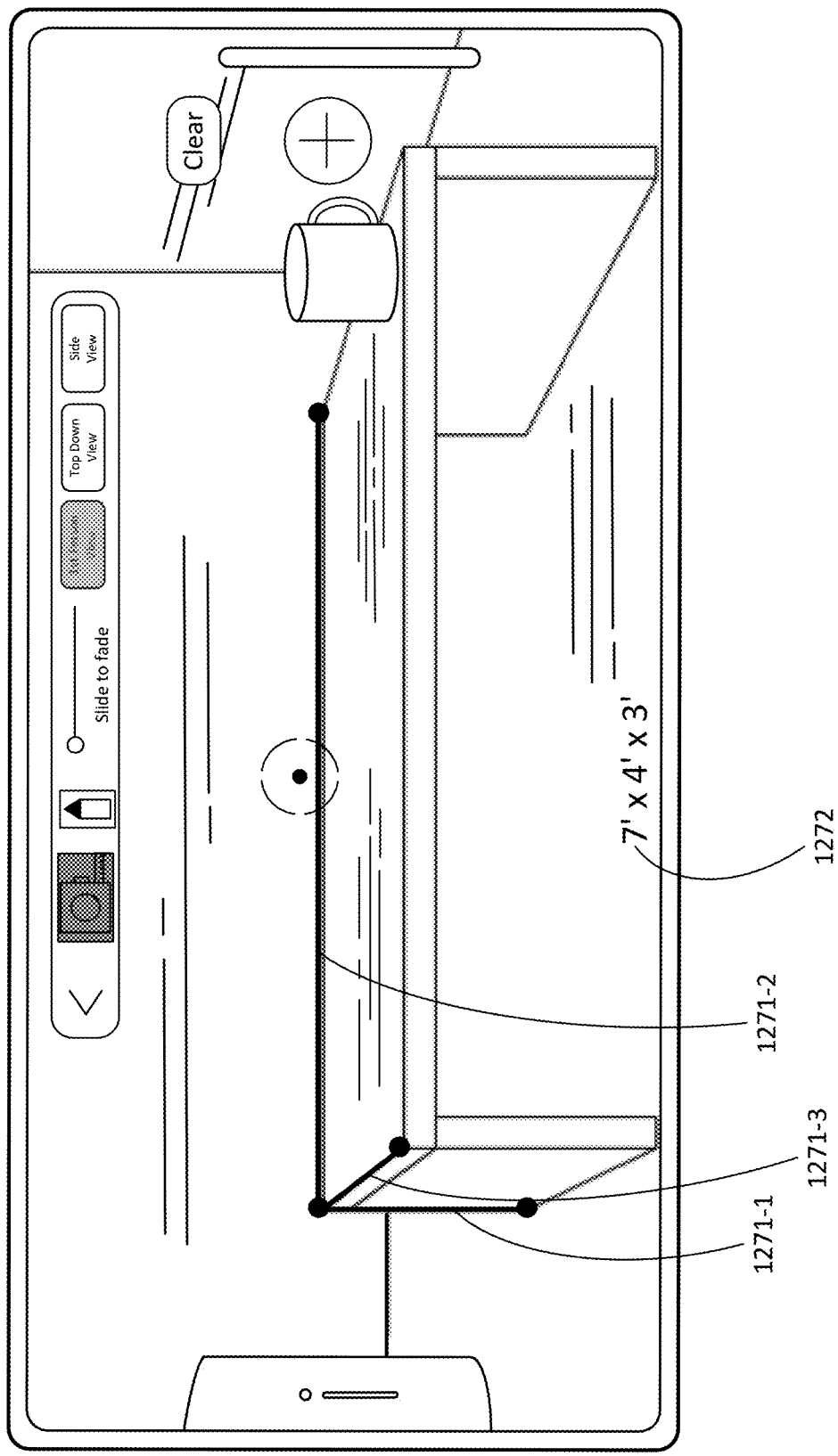
Figure 12R:
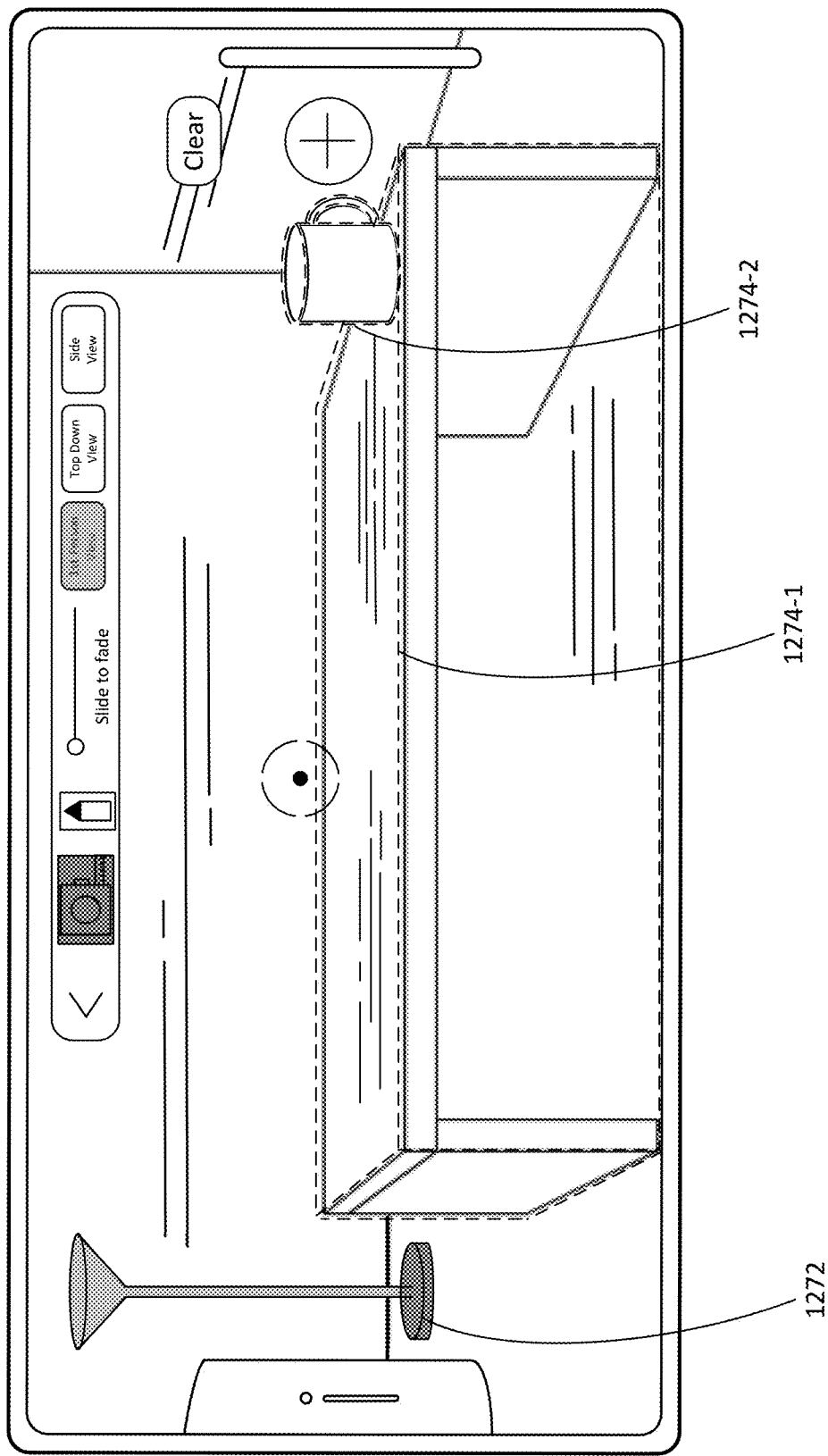

FIGS. 12Z-12FF illustrate a process in which the user manually measures a different portion of the still view representation of physical environment 1200. In FIG. 12Z, the user clears the previously-added measuring segment 1242 by selecting "Clear" control 1231 with contact 1252. As a result, as shown in FIG. 12AA, device 100 displays an updated user interface 1210-12 with measuring segment 1242 and label 1244 removed. In FIGS. 12BB-12FF, the user measures a different portion of the still view representation of physical environment 1200 (e.g., another edge of the table) by panning user interface 1201-9 with contact 1254 in FIG. 12BB, adding a first measurement point (shown in FIG. 12DD) with contact 1256 in FIG. 12CC, continuing to pan the updated user interface with contact 1258 in FIGS. 12DD-12EE, and adding a second measurement point with contact 1260 in FIG. 12FF. The measuring process performed in FIGS. 12Z-12FF is similar to that performed in FIGS. 12J-12M. Label 1259 is continually updated to display the current information (e.g., length) of measuring segment 1261.

FIGS. 12GG-12JJ illustrate that the user performs zoom operations (e.g., zoom-in and zoom-out with pinch-to-zoom) on the still view representation of physical environment 1200 with contacts 1262-1 and 1262-2. In some embodiments, when the still view representation of physical environment 1200 has been zoomed in past a predefined threshold (e.g., the still view representation of physical environment 1200 is enlarged above a size limit or zoom factor limit), label 1259 indicating the measured dimensional information ceases to be displayed in user interface 1210-13, as shown in FIG. 12HH. FIG. 12II illustrates that once the captured media item has been zoomed out to below the predefined threshold (e.g., the captured media item is reduced in scale from above the size limit to or below the size limit, or from above the zoom factor limit to or below the zoom factor limit), label 1259 is redisplayed in user interface 1210-14, and is maintained as the user continues to zoom the captured media item out to the original size (e.g., a zoom factor of 1.0), as shown in FIG. 12JJ. FIGS. 12KK-12LL illustrate a process in which the user clears the added measurements by selecting "Clear" control 1231 with contact 1264. FIG. 12LL also illustrates that the user selects back control 1226 with contact 1264. Back control 1226, when activated, causes device 100 to cease displaying a still view representation of physical environment 1200 (e.g., a captured media item) and to instead display a live view representation of physical environment 1200.

FIGS. 12MM-12NN illustrate a process in which the user interacts with a live view representation of the physical environment. FIG. 12MM illustrates user interface 1210-15 showing a live view representation of physical environment 1200, and legend 1214 showing a schematic top-down view of the cameras and camera field of view relative to physical environment 1200. In some embodiments, as illustrated in FIG. 12NN, as the user scans the physical environment with the cameras of device 100, all measureable physical features in the representation of physical environment 1200 are automatically measured, with measurement segments superimposed on the measureable physical features and corresponding measurement labels displayed next to their respective measurement segments.

FIGS. 12OO-12RR illustrate a process in which dimensional information in a still view representation of physical environment 1200 is automatically measured. In FIG. 12OO, the representation of table 1206 in the captured media item is outlined by dotted box 1266 to indicate that information (e.g., depth information) about table 1206 is available such that measurements can be made of table 1206. In some embodiments, the available information is determined by the camera(s) and/or depth sensor(s) during the capturing of the still view representation of physical environment 1200. Prompt 1268 provides instructions to the user on how to initiate the automatic measurement process. In FIG. 12PP, the user taps on dotted box 1266 using contact 1270. As a result, measurement segments 1271-1, 1271-2 and 1271-3 are displayed over edges of the representation of table 1206 to indicate dimensional information (e.g., height, length, and width) of table 1206, as shown in FIG. 12QQ. Label 1272 is displayed at the predefined portion of the captured media item to indicate the measurement results. In some embodiments, where the captured media item includes one or more objects for which dimensional information is not available, such that measurements cannot be made of those objects (e.g., lamp 1272 in the background of the captured media item in FIG. 12RR), the one or more objects without available information for making measurements are deemphasized (e.g., greyed-out) relative to objects with available information for making measurements (e.g., the representation of table 1206 and the representation of mug 1208 in FIG. 12RR are emphasized using dotted lines 1274-1 and 1274-2).

FIGS. 13A-13GG illustrate various perspective-based animated transitions, including multiple transition effects, between a displayed media item (e.g., an image, such as an RGB image, or an initial frame or representative frame of a video) and a different media item selected by a user for viewing (e.g., when the user scrolls through a plurality of media items). In some embodiments, the media items include still view representations of a physical environment captured by one or more cameras of a system and displayed using a display generation component of the system). In some embodiments, different transitions are displayed based on whether the media items were captured in a same capturing session or within a predefined time or proximity threshold of each other. The different transition effects provide visual indications as to the different camera perspectives from which the media items were captured.

Figure 13A:
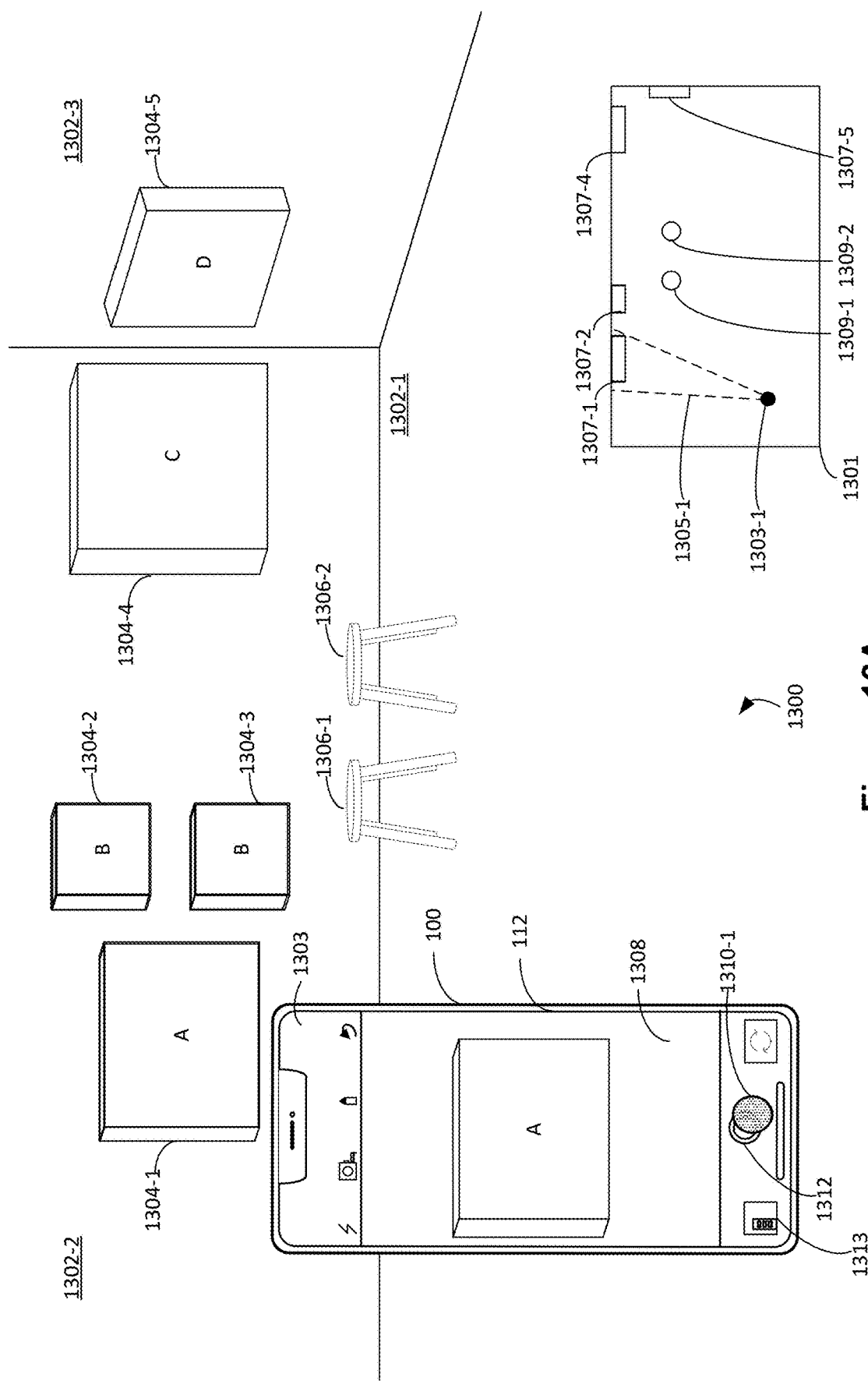
FIGS. 13A-13HH illustrate example user interfaces for transitioning between a displayed media item and a different media item selected by a user for viewing in accordance with some embodiments.
Figure 13B:
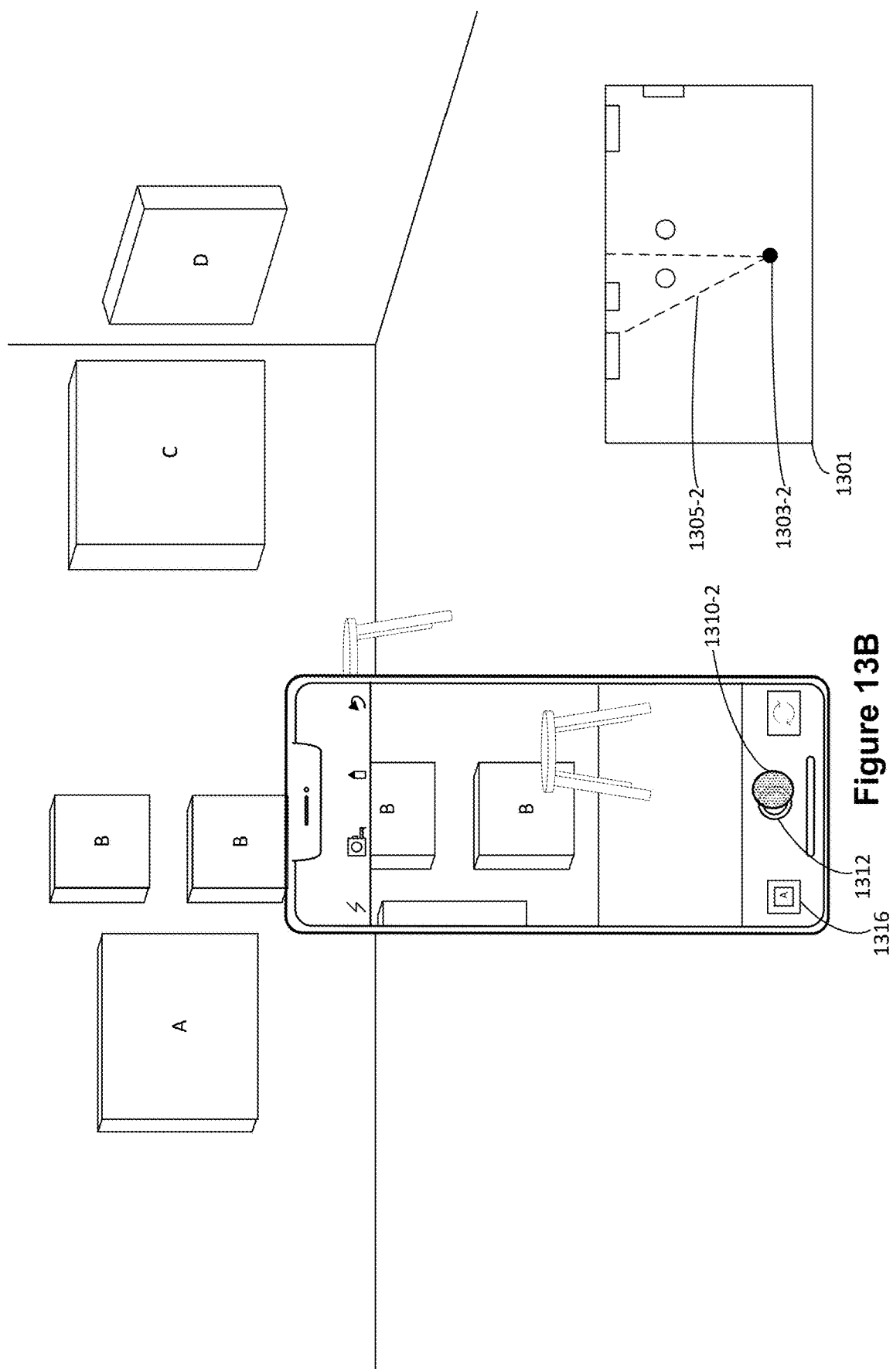
Figure 14A:
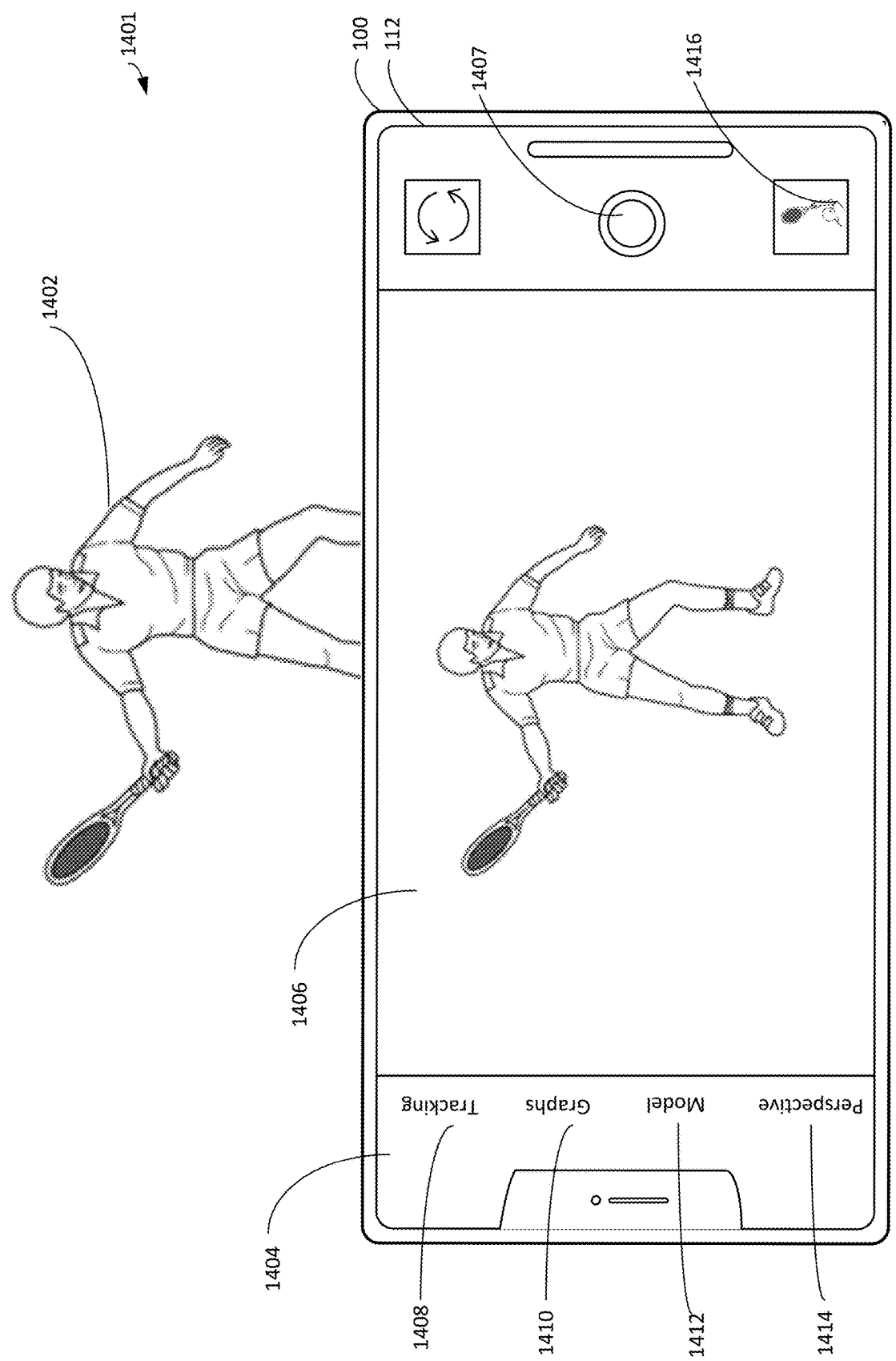
FIGS. 14A-14SS illustrate example user interfaces for viewing motion tracking information corresponding to a representation of a moving subject in accordance with some embodiments.

FIG. 13A illustrates physical environment 1300, which includes structural features such as floor 1302-1 and walls 1302-2 and 1302-3, as well as non-structural features such as objects 1304-1 to 1304-5 (e.g., paintings hanging on walls 1302-2 and 1302-3) and objects 1306-1 and 1306-2 (e.g., chairs placed on floor 1302-1). In addition, device 100 is located in physical environment 1300 and includes display 112 and one or more cameras. Display 112 displays user interface 1303 that includes a live view representation 1308 of a portion of physical environment 1300 that is in the field of view of the camera(s) of device 100. User interface 1303 also includes a plurality of controls including record control 1312 for capturing media items such as images and/or videos and thumbnail 1313 for viewing the most recently-captured media item (e.g., or, in some embodiments, a plurality of previously-captured media items including the most recently-captured media item). FIG. 13A also illustrates activation of record control 1312 in user interface 1303 with contact 1310-1. In response to the activation of record control 1312, representation 1308 of physical environment 1300 is captured and stored as a media item by device 100, and thumbnail 1313 is accordingly updated to display preview 1316 of the newly-captured media item, as shown in FIG. 13B. In addition, FIG. 13A includes legend 1301 showing a schematic top-down view of physical environment 1300. Legend 1301 includes camera location 1303-1, camera field of view 1305-1, and schematic representations of the various objects in physical environment 1300 (e.g., schematic representations 1307-1, 1307-2, 1307-4, 1307-5, 1309-1, and 1309-2 that correspond to objects 1304-1, 1304-2 and/or 1304-3, 1304-4, 1304-5, 1306-1, and 1306-2, respectively). Camera location 1303-1 and camera field of view 1305-1 indicate the location and field of view, respectively, of the cameras of device 100 at the time of capture of the media item with respect to physical environment 1300 and other objects therein.

Figure 13C:
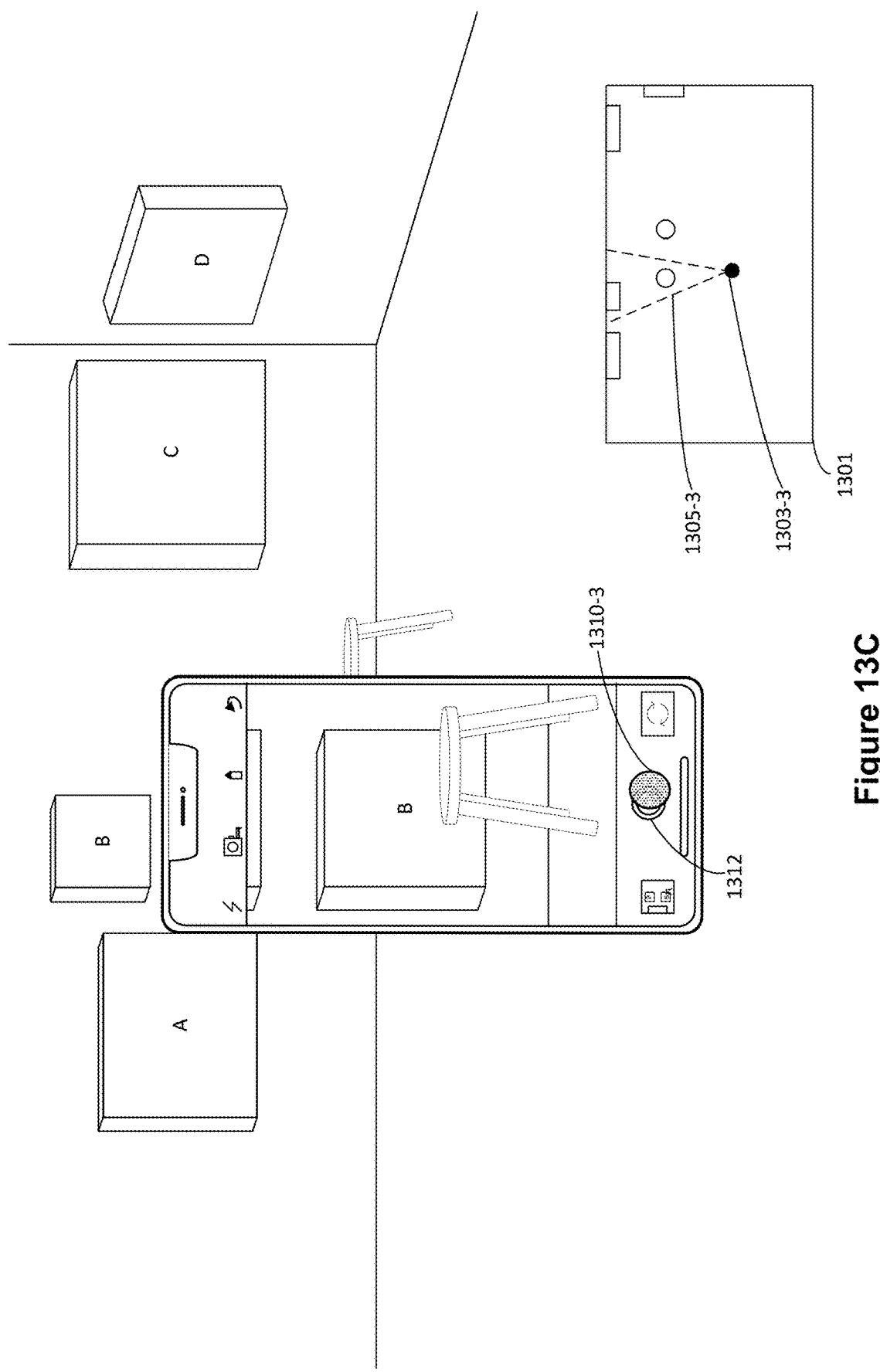
Figure 13D:
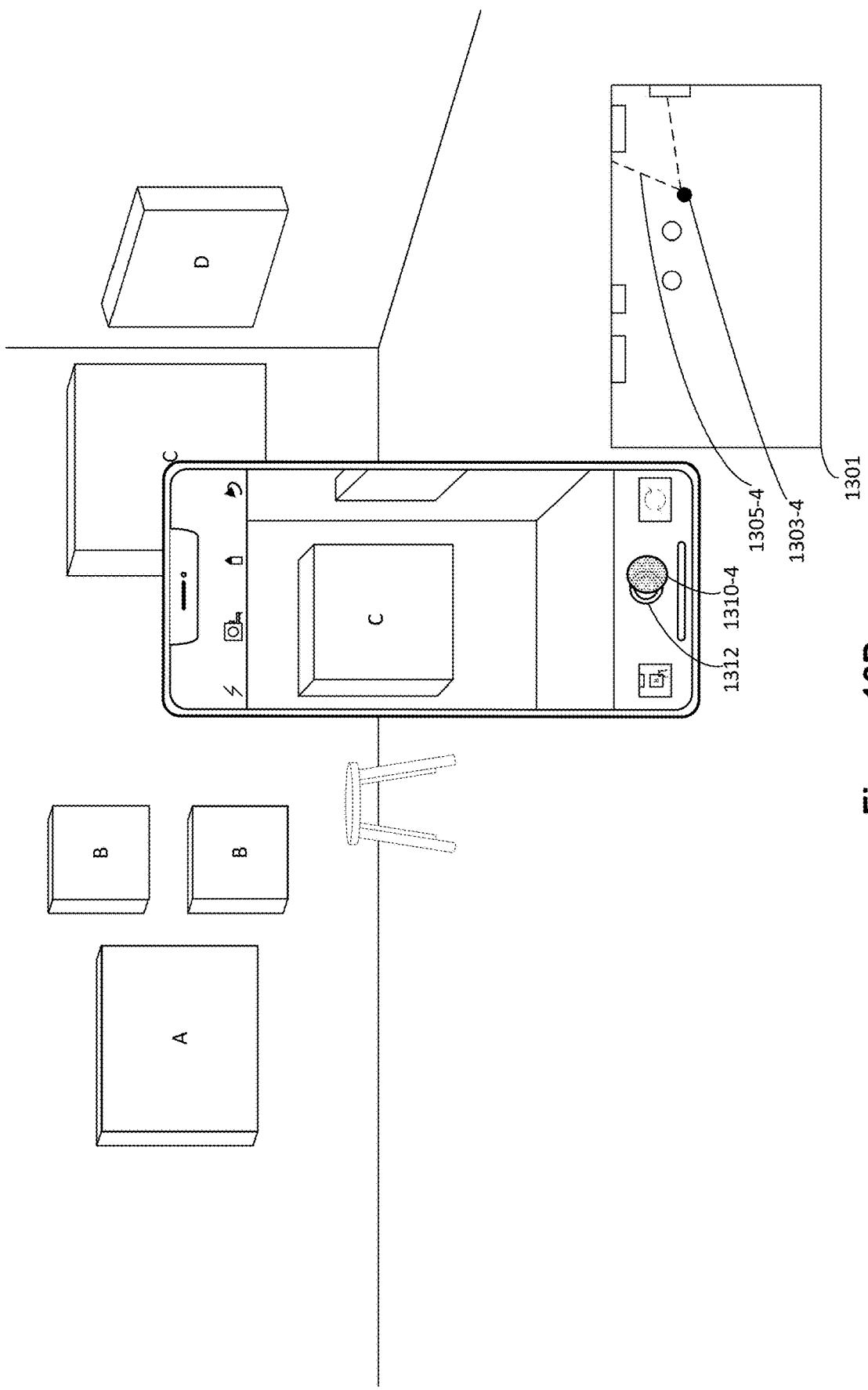
Figure 13E:
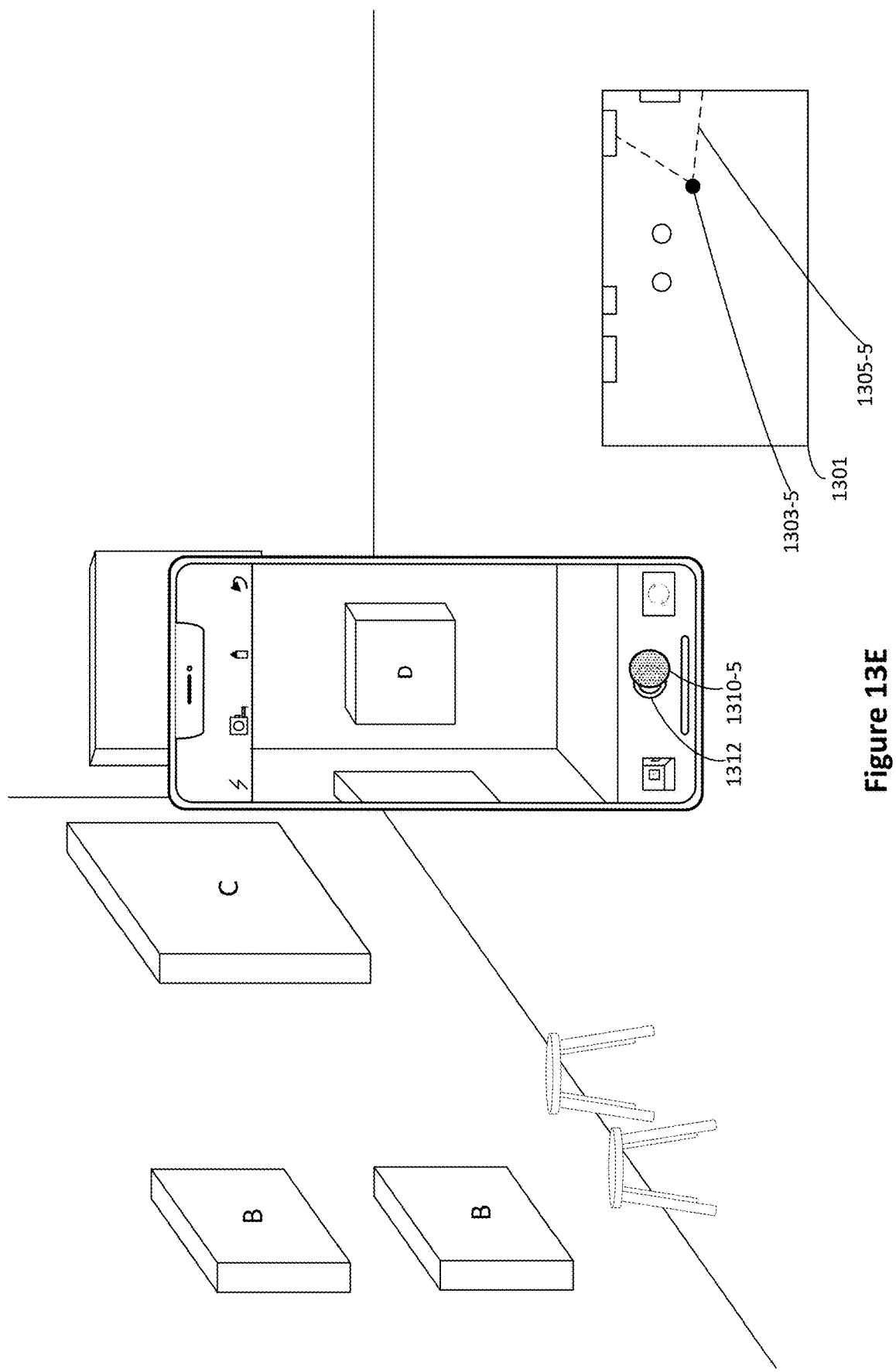
Figure 13F:
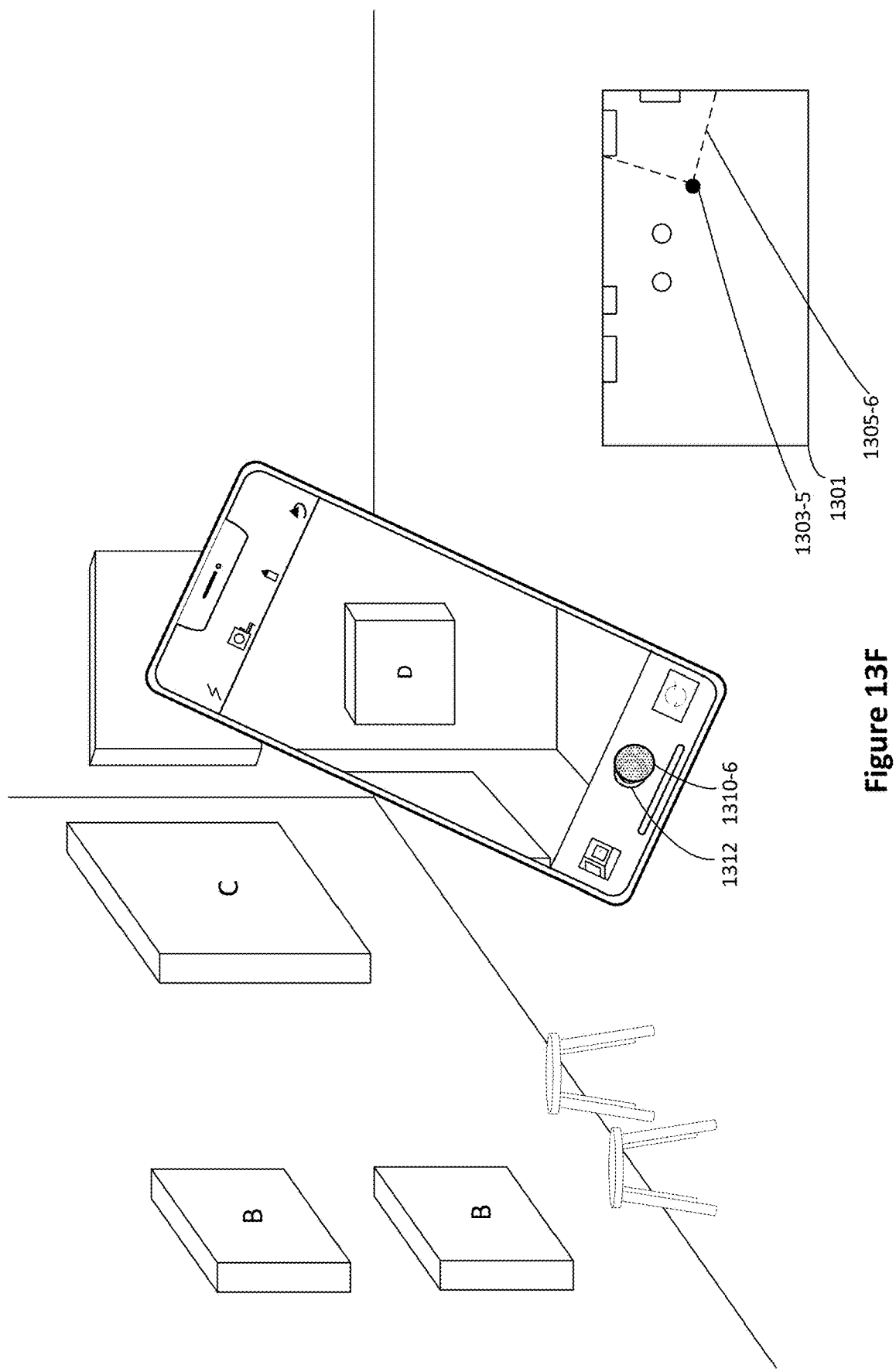

FIGS. 13B-13F illustrate capture of additional media items at various different locations in physical environment 1300 (e.g., indicated by camera locations 1303-2 to 1303-5 in the legend 1301). In particular, FIG. 13B illustrates capture of a media item corresponding to camera field of view 1305-2, in response to activation of record control 1312 using contact 1310-2 while the camera(s) are positioned at camera location 1303-2. FIG. 13C illustrates capture of a media item corresponding to camera field of view 1305-3, in response to activation of record control 1312 using contact 1310-3 while the cameras are positioned at camera location 1303-3. FIG. 13D illustrates capture of a media item corresponding to camera field of view 1305-4, in response to activation of record control 1312 using contact 1310-4 while the cameras are positioned at camera location 1303-4. FIGS. 13E-13F illustrate capture of two media items both while the cameras are positioned at the same camera location 1303-5. In FIG. 13E, device 100 is held upright, and the captured media item corresponds to camera field of view 1305-5 as indicated in legend 1301. In FIG. 13F, however, device 100 is held at an angle so as to have a different camera field of view (e.g., that is rotated relative to the camera field of view of device 100 in FIG. 13E), as indicated by camera field of view 1305-6 in legend 1301.

Figure 13G:
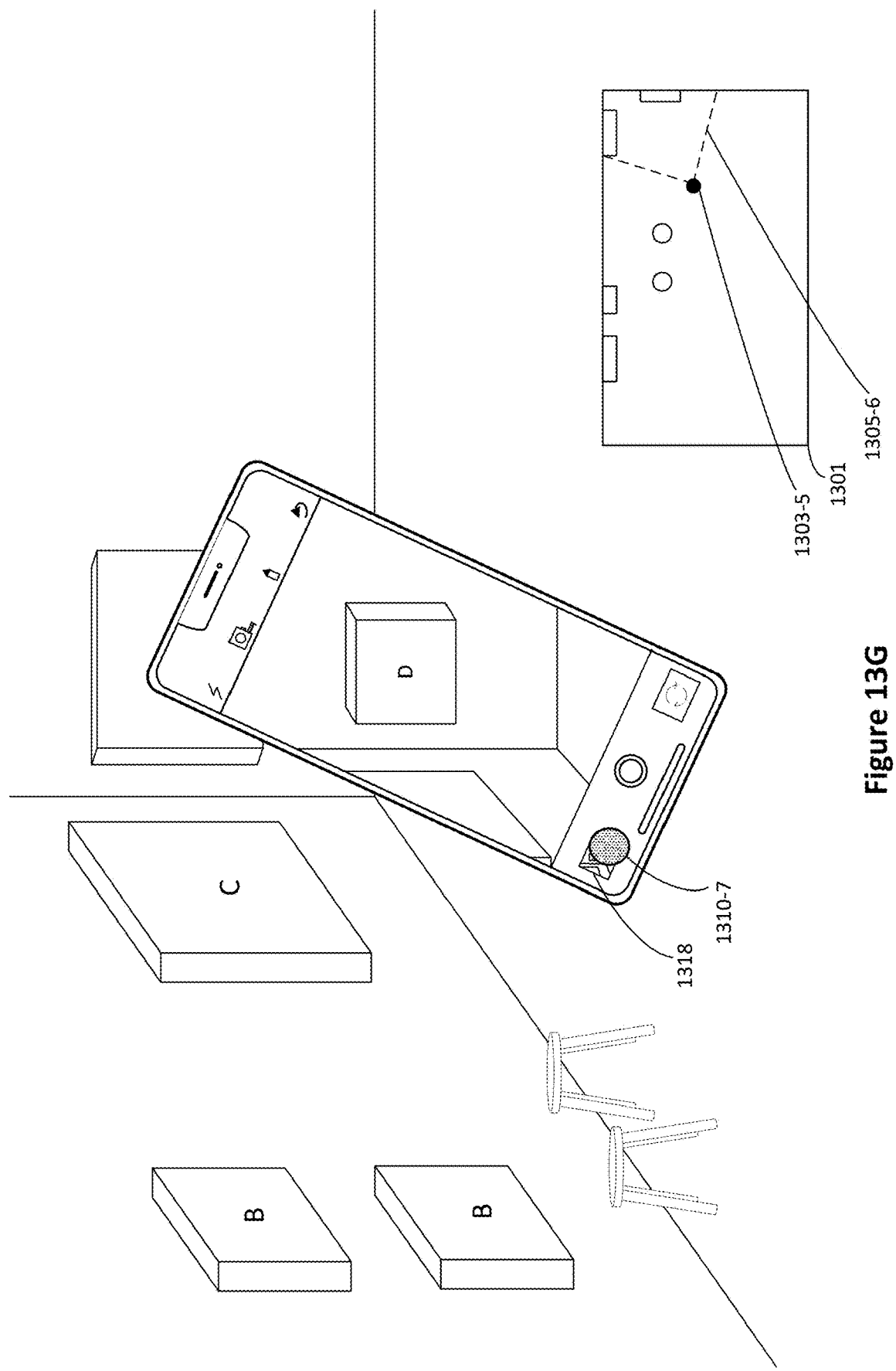

FIG. 13G illustrates activation of thumbnail 1318 with contact 1310-7. Thumbnail 1318 includes a preview of the most-recently captured media item (e.g., the media item captured in response to contact 1310-6, as described with reference to FIG. 13F).

Figure 13H:
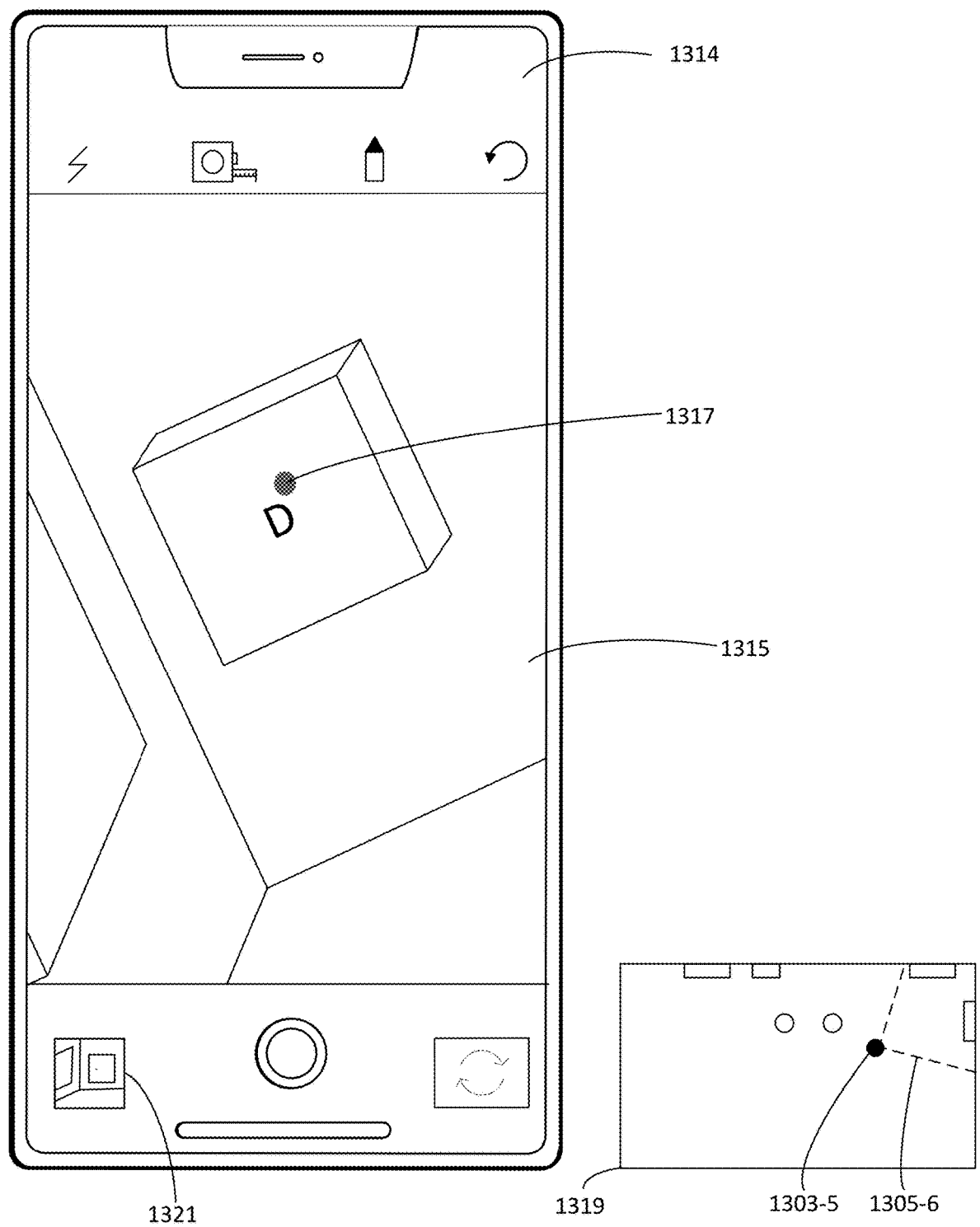

FIG. 13H illustrates that in response to the activation of thumbnail 1318, device 100 displays user interface 1314 including most-recently captured media item 1315 (e.g., a still view representation such as a photo) representing the portion of physical environment 1300 captured in FIG. 13F. Legend 1319 indicates that media item 1315 was captured at camera location 1303-5 with camera field of view 1305-6 in physical environment 1300 (e.g., the same location and field of view as in FIG. 13F). Updated thumbnail 1321 shows a preview of another media item captured immediately before media item 1315 (e.g., the media item captured in FIG. 13E). User interface 1314 also includes visual indicator 1317 displayed in (or alternatively, displayed over) media item 1315 to indicate a location corresponding to at least one other media item (e.g., a location that can also be viewed using the media item captured in FIG. 13E). In some embodiments, visual indicators such as visual indicator 1317 are displayed in accordance with a determination that a perspective-based animated transition is available between the displayed media item and another media item to which a respective visual indicator corresponds. In some embodiments, a perspective-based animated transition is available when the two media items were captured within a proximity threshold (e.g., from respective camera locations within a predefined distance of each other) and/or a time threshold (e.g., within a predefined amount of time of each other and/or within a same camera session), and/or the portions of the physical environment 1300 captured in the two media items overlap by at least a predefined amount.

Figure 13I:
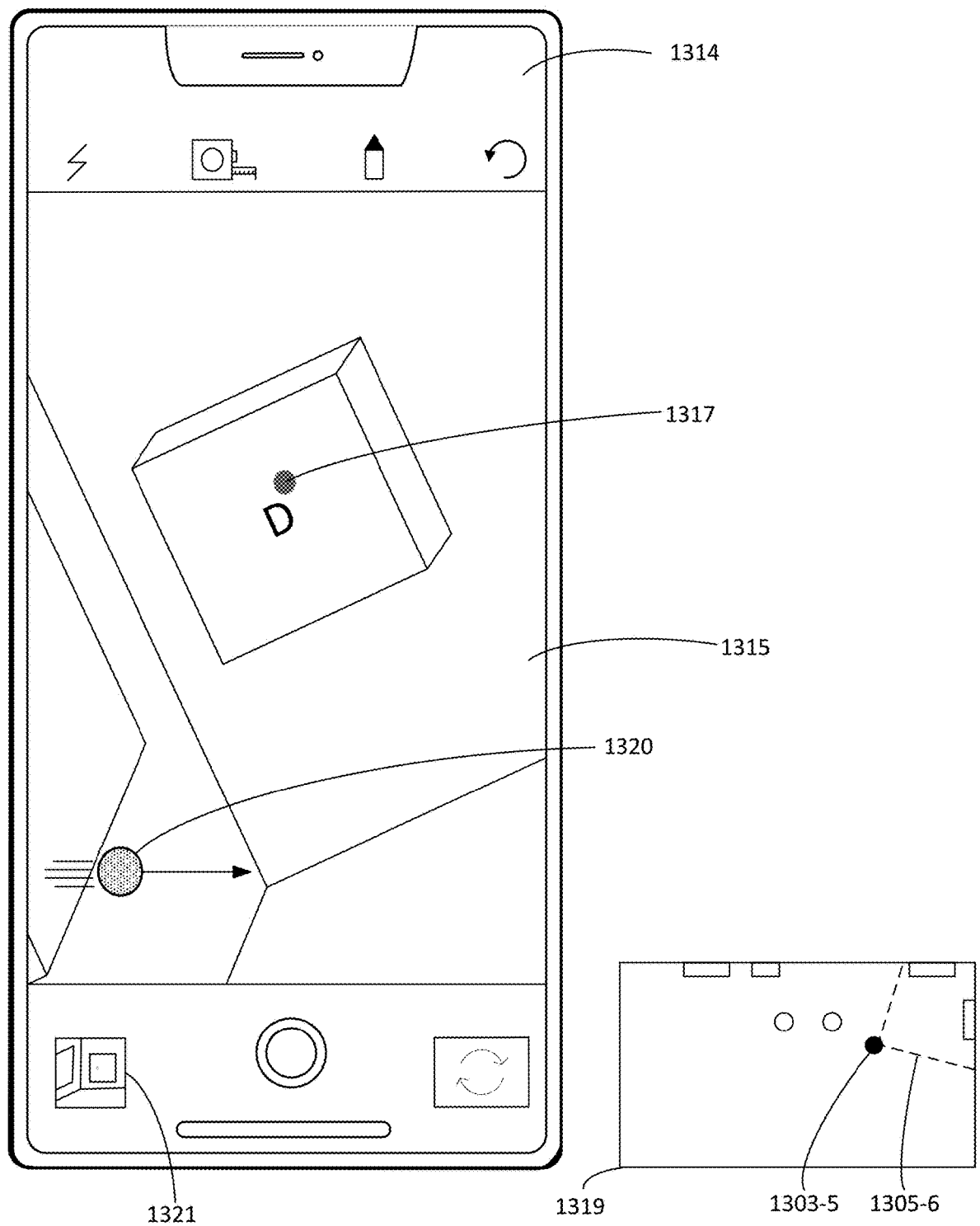
Figure 13J:
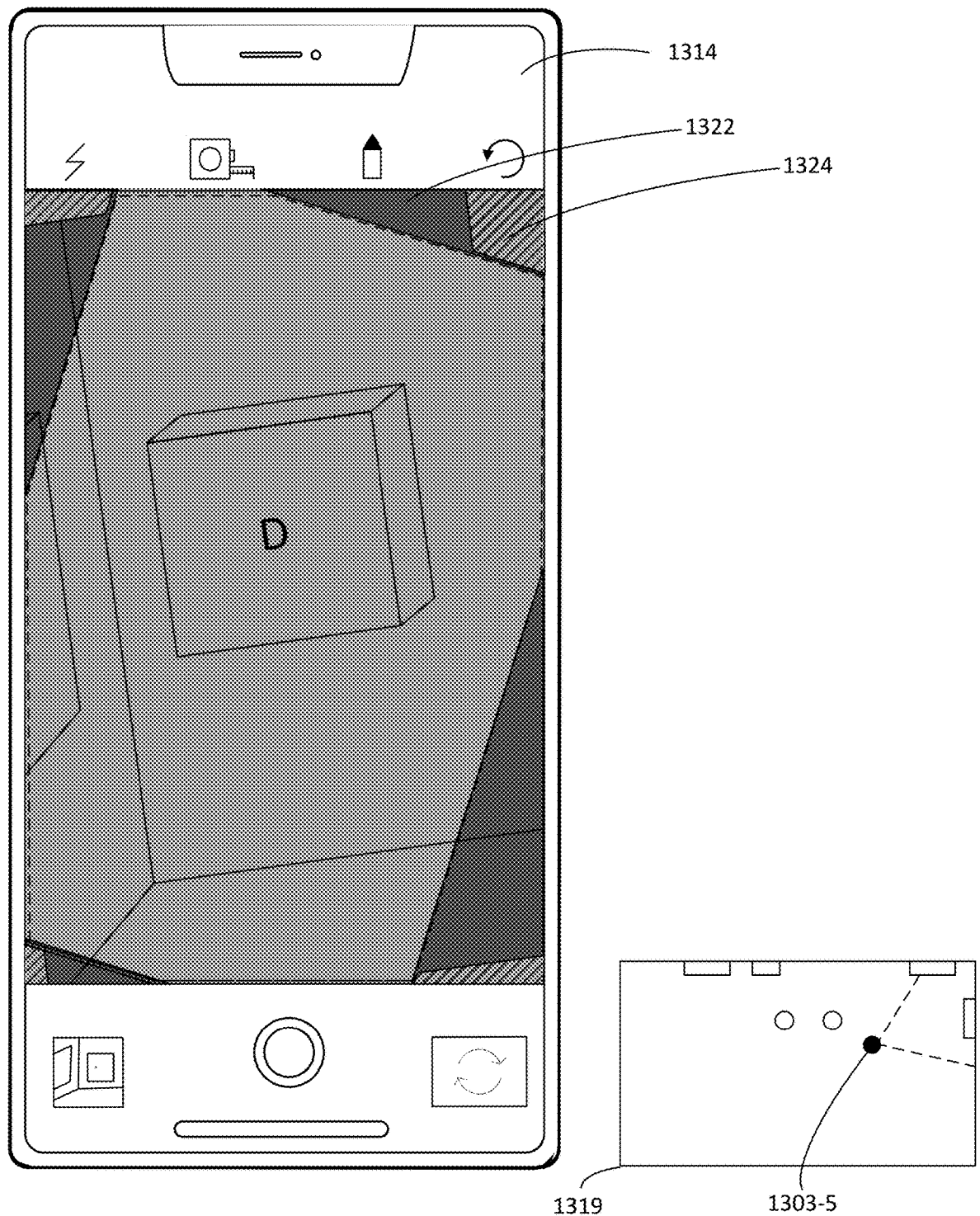
Figure 13K:
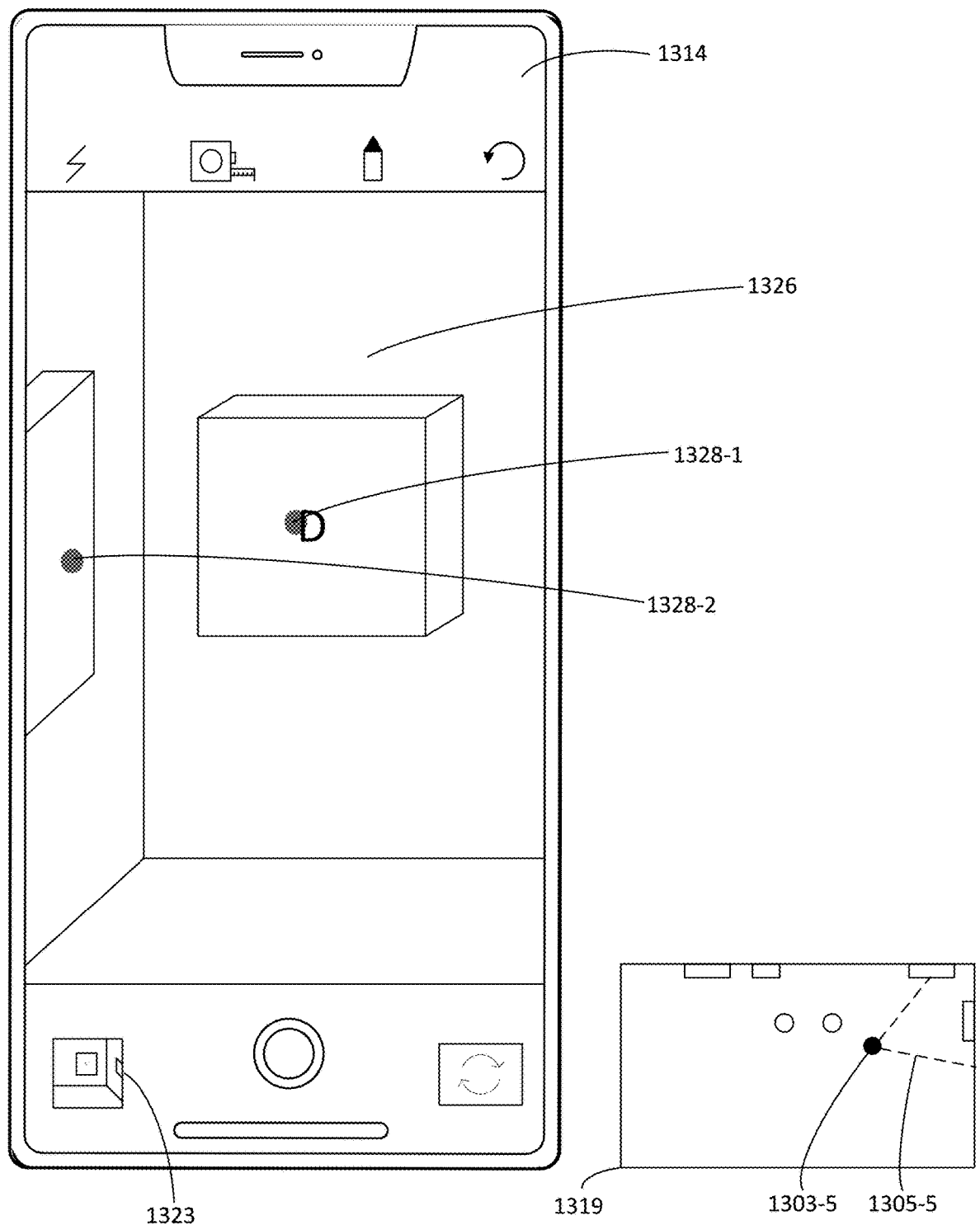

FIGS. 13I-13K illustrate display of a different captured media item via a perspective-based animated transition. In FIG. 13I, the user requests display of a media item different from the one currently displayed by swiping rightward on display 112 with contact 1320. In the example shown in FIG. 13I, the rightward swipe by contact 1320 corresponds to a request to display a media item that immediately precedes displayed media item 1315 in a collection of media items (e.g., by being the media item captured immediately prior to media item 1315, or by being the media item immediately preceding media item 1315 in an ordered list of media items), which in this example is the media item captured in response to contact 1310-5, as described herein with reference to FIG. 13E. Since the media item captured in FIG. 13E (also referred to herein as "media item 1326," as shown in FIG. 13K) and media item 1315 satisfy the perspective-based transition criteria (e.g., they are captured within the time and proximity thresholds, and there is enough overlap between the respective portions of physical environment 1300 captured in the two media items), a perspective-based animated transition is displayed as shown in FIG. 13J. As noted above, media item 1315 was captured with device 100 held upright, and media item 1326 was captured with device 100 held at an angle. As such, the difference between the camera perspective for media item 1315 and the camera perspective for media item 1326 includes rotation (e.g., tilting) of the cameras, and accordingly, the perspective-based animated transition includes rotating media item 1315 by an amount corresponding to the difference in camera tilt angle, so that representations of objects in media item 1315 align with representations of objects in media item 1326. In other words, the perspective-based animated transition simulates movement of the cameras from the camera pose (e.g., position and/or orientation) for a first, currently-displayed media item to the camera pose for a different media item. In the example in FIGS. 13I-13J, the animated transition simulates movement from the camera orientation corresponding to field of view 1305-6 for media item 1315 (FIG. 13I) to the camera orientation corresponding to field of view 1305-5 for media item 1326 (FIG. 13K), since camera location 1303-5 is the same for both media item 1315 and media item 1326.

FIG. 13J illustrates a snapshot of the rotation effect partway through the animated transition. Optionally, as shown in FIG. 13J, while rotating media item 1315, regions 1322 corresponding to portions of physical environment 1300 captured in media item 1326 are at least partially displayed, partially rotated, such that representations of objects in media item 1326 align with corresponding representations of objects in media item 1315 during the rotation of media item 1315. In other words, in some embodiments, as media item 1315 is rotated from a default orientation (e.g., a rotation angle of zero) to an orientation that corresponds to the camera angle at which media item 1326 was captured (e.g., a non-zero rotation angle), media item 1326 is likewise concurrently rotated from an orientation that corresponds to the camera angle at which 1315 was captured (e.g., the negative of the non-zero rotation angle of media item 1315) to its default orientation (e.g., a rotation angle of zero). In some embodiments, during the animated transition, regions 1324 corresponding to portions of physical environment 1300 that are not captured in either media item are left blank (or alternatively, displayed with hatching or a similar fill pattern and/or blurring) to indicate the lack of information about the corresponding portions of physical environment 1300. One of ordinary skill will recognize that, although FIG. 13J illustrates a snapshot of a single intermediate step partway through the animated transition, in some embodiments the animated transition includes a plurality of intermediate steps so as to present a continually-updated animated transition that simulates smooth rotation of the camera(s).

FIG. 13K shows user interface 1314 updated to display media item 1326, representing the portions of physical environment 1300 captured in FIG. 13E, after completion of the animated transition. The media item captured in FIG. 13D (also referred to herein as "media item 1332," as shown in FIG. 13N) is the media item immediately preceding displayed media item 1326, and thus a preview of media item 1332 is displayed in thumbnail 1323. Two visual indicators 1328-1 and 1328-2 are displayed, indicating locations corresponding to other captured media items (e.g., locations captured in and viewable in other media items). For example, visual indicator 1328-1 indicates the location at the center of media item 1315, and visual indicator 1328-2 indicates the location at the center of media item 1332. One of ordinary skill in the art will recognize that as an alternative to displaying one or more visual indicators at respective locations in a displayed media item that correspond to central locations in other media items, the visual indicators may be displayed at other types of locations associated with the other media items, such as locations indicating respective camera positions from which the other media items were captured.

Figure 13L:
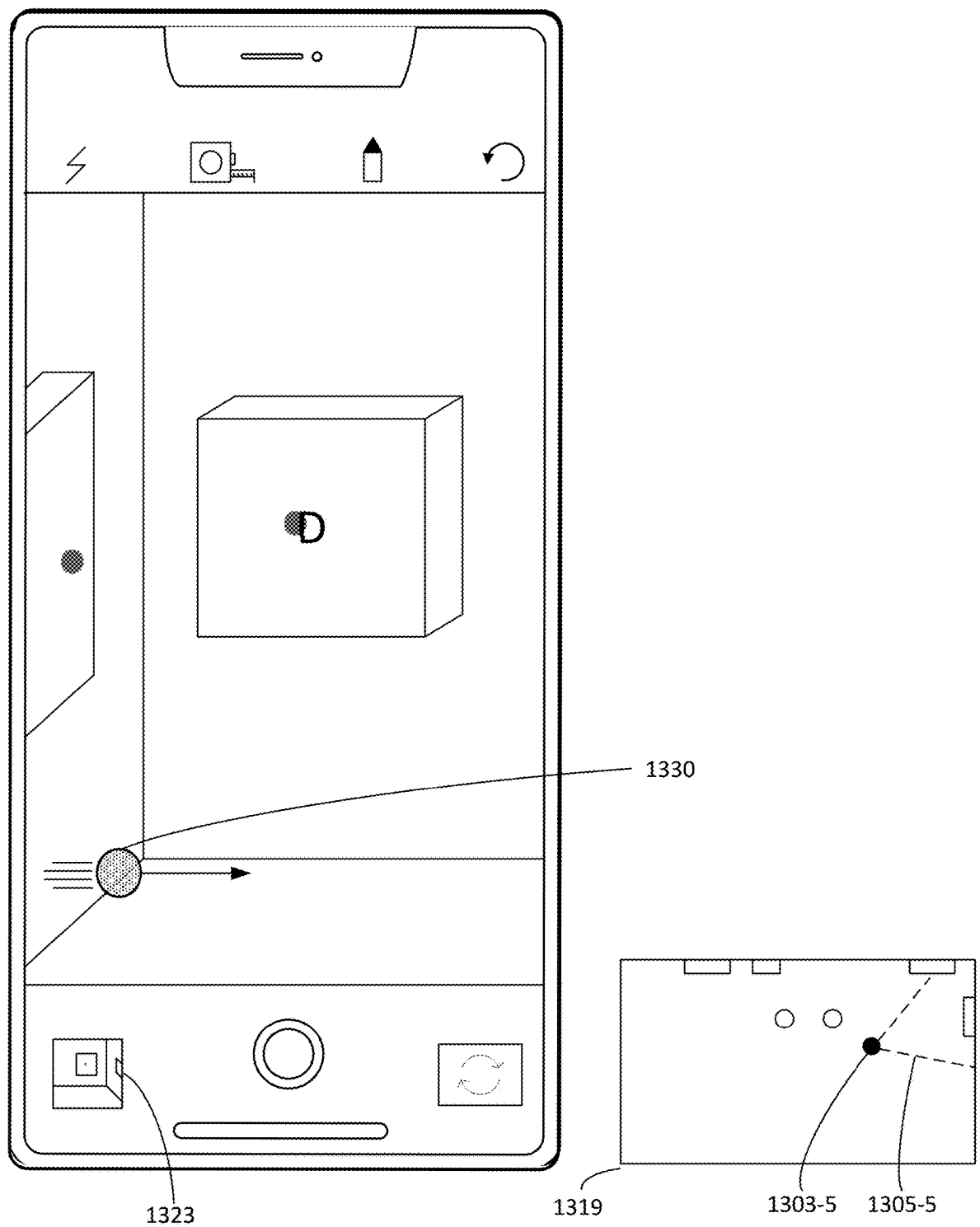
Figure 13M:
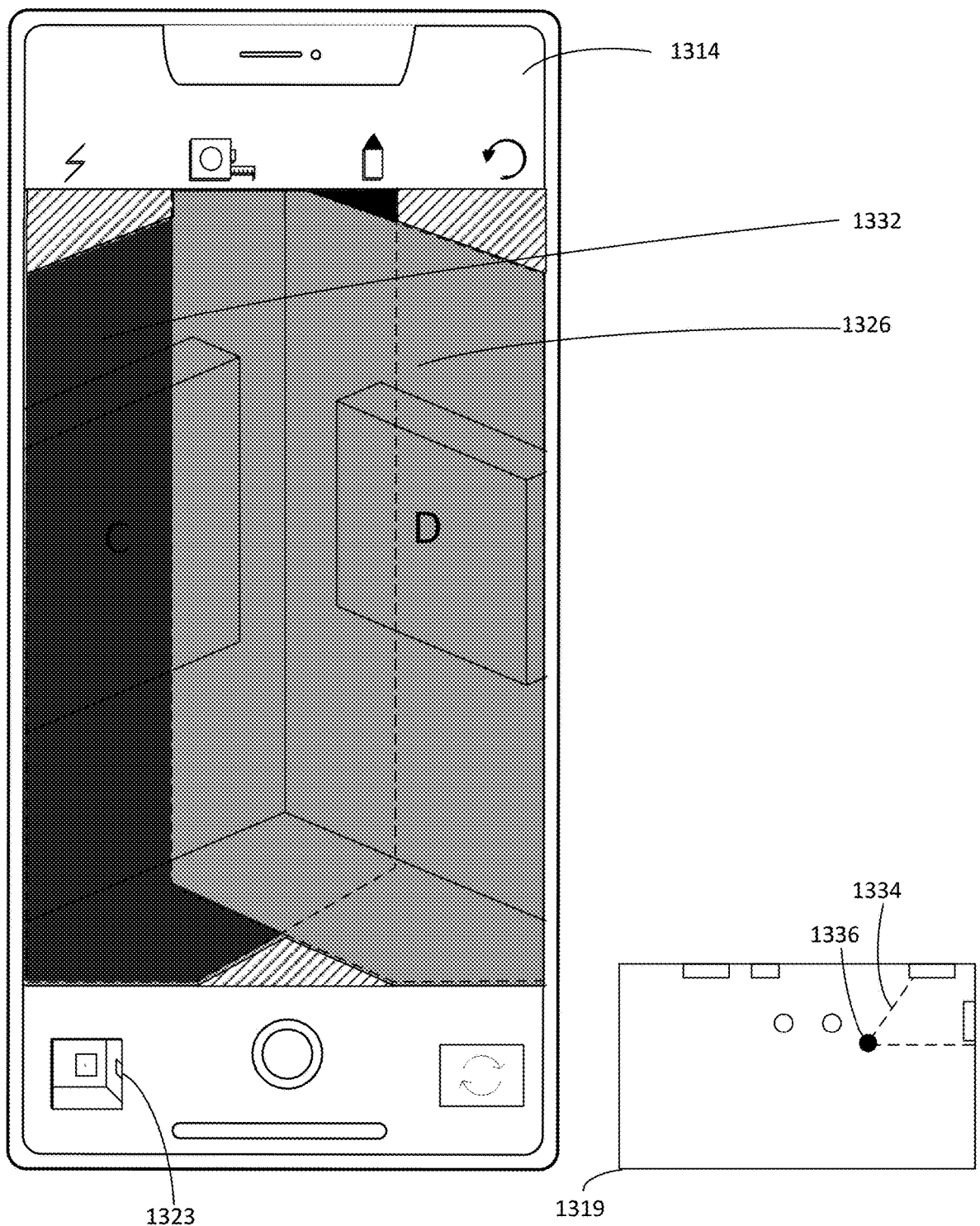
Figure 13N:
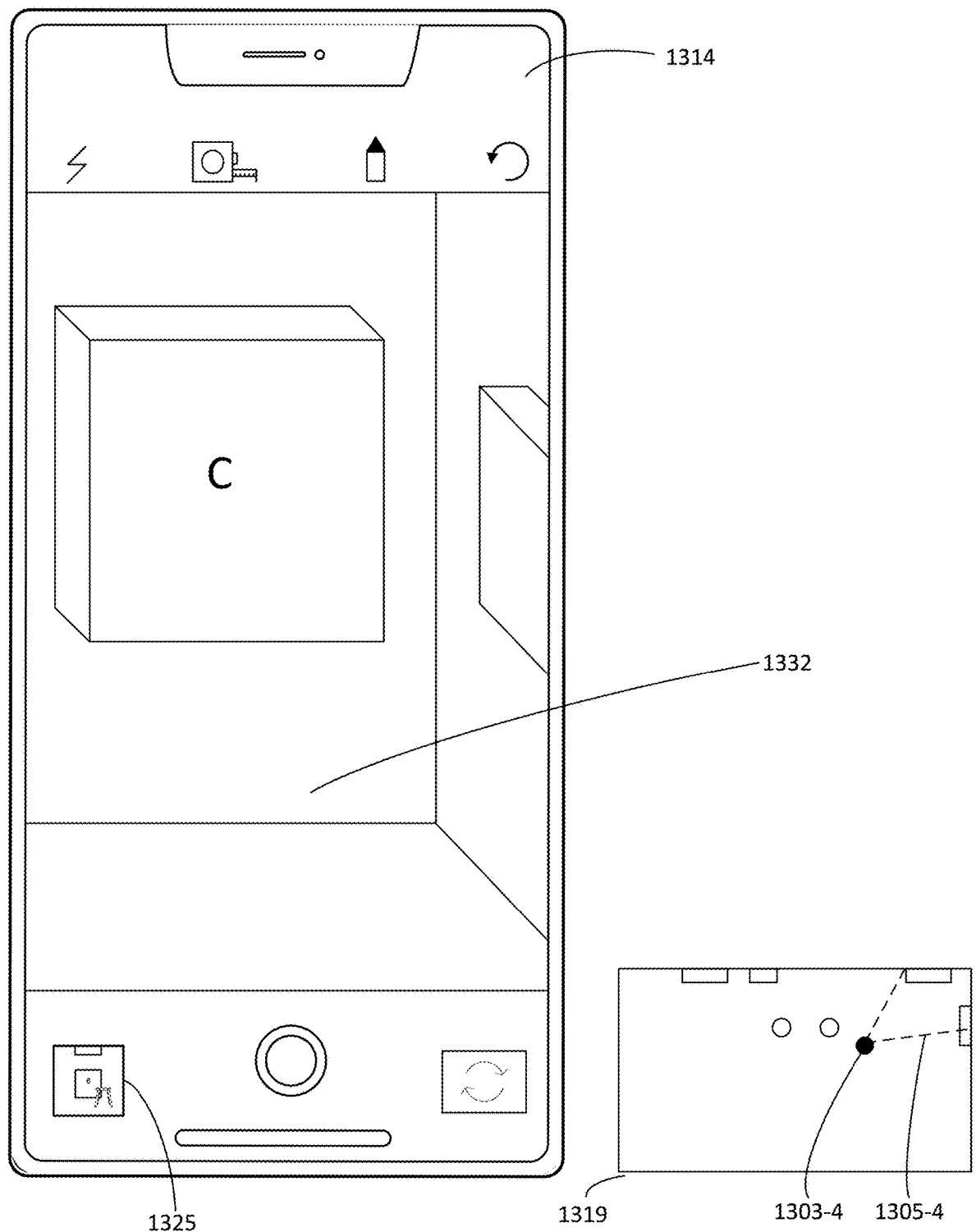

FIGS. 13L-13N illustrate another perspective-based animated transition. In FIG. 13L, the user requests display of a media item different from the one currently displayed by swiping rightward on display 112 with contact 1330. In the example shown in FIG. 13L, the rightward swipe by contact 1330 corresponds to a request to display the immediately preceding media item, media item 1332. As a result, media item 1332 is displayed in user interface 1314, as shown in FIG. 13N. Since media item 1326 and media item 1332 satisfy the perspective-based transition criteria (e.g., the two images were captured within the time and proximity thresholds, and their respectively captured portions of physical environment 1300 overlap at least a predefined amount), a perspective-based animated transition is displayed while switching from displaying media item 1326 to displaying media item 1332. The perspective-based animated transition includes transition effects that depend on the difference between the locations and perspectives of the cameras when the two media items were captured. In the example in FIG. 13L-13N, media item 1326 corresponds to camera location 1303-5 and camera field of view 1305-5 (as shown in legend 1319 in FIG. 13L), whereas media item 1332 corresponds to camera location 1303-4 and camera field of view 1305-4 (as shown in legend 1319 in FIG. 13N). The difference between the camera perspective for media item 1326 and the camera perspective for media item 1332 includes out-of-plane rotation (e.g., similar to a person turning his or her head) and lateral movement of the camera(s) from camera location 1303-5 to camera location 1303-4. As such, the animated transition from media item 1326 to media item 1332 simulates rotation and lateral movement of the camera(s) from camera location 1303-5 and field of view 1305-5 to camera location 1303-4 and field of view 1305-4.

FIG. 13M shows a snapshot of the rotation and movement effects partway through the animated transition. Media item 1326 is skewed, to simulate rotation of the camera(s) to having simulated field of view 1334 that is partway between field of view 1305-5 and field of view 1305-4, and shifted rightward, to simulate leftward lateral movement of the camera(s) to simulated camera location 1336 that is partway between camera location 1303-5 and camera location 1303-4. Optionally, as shown in FIG. 13M, media item 1332 is also displayed, skewed to correspond to simulated field of view 1334 and shifted rightward to correspond to simulated camera location 1336. In some embodiments, the animated transition simulates media item 1332 gradually moving into user interface 1314 as media item 1326 gradually moves out of user interface 1314. As noted above with reference to FIG. 13J, FIG. 13M is a non-limiting example of an intermediate step partway through the animated transition; additional intermediate steps may be displayed so as to present an animated transition that simulates smooth rotation and movement of the camera(s). FIG. 13N illustrates media item 1332 displayed in user interface 1314 after completion of the animated transition from media item 1326, and legend 1319 indicates camera location 1303-4 and field of view 1305-4 with which media item 1332 was captured. The media item captured in FIG. 13C (also referred to herein as "media item 1337," as shown in FIG. 13R) is the media item immediately preceding displayed media item 1332, and thus a preview of media item 1337 is displayed in thumbnail 1325). It is noted that no visual indicators are displayed over media item 1332, as no locations corresponding to other media items are visible in media item 1332.

Figure 13O:
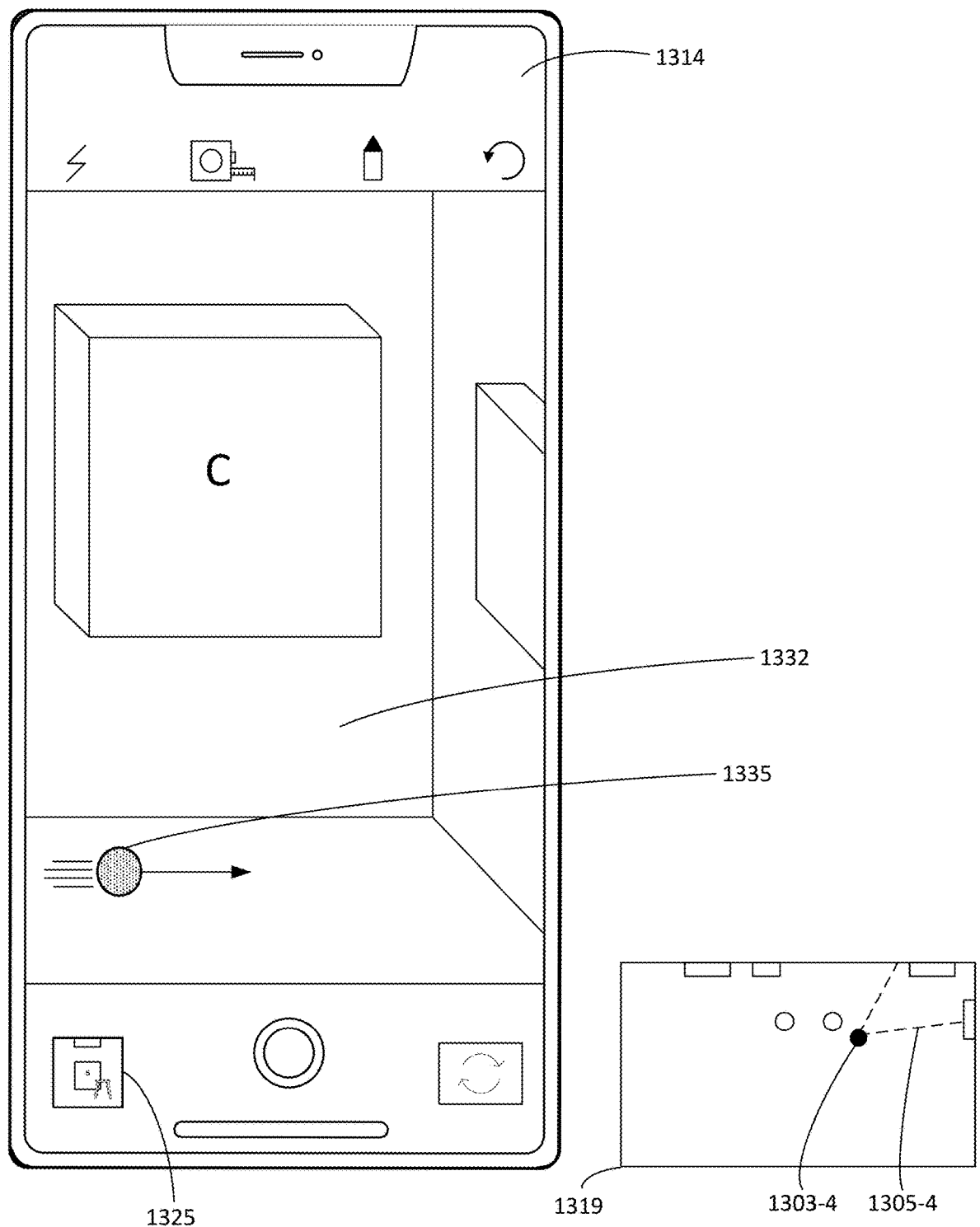
Figure 13P:
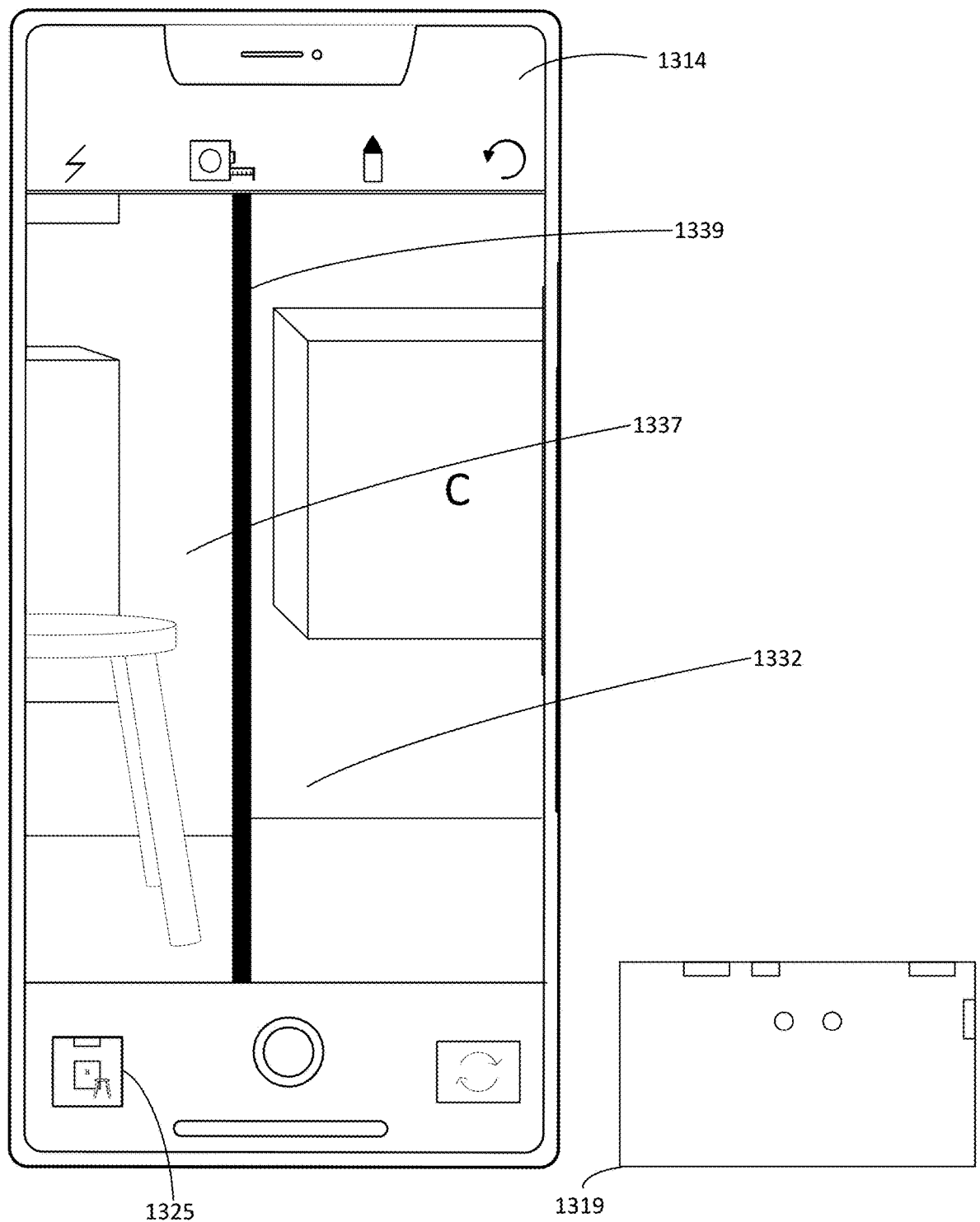
Figure 13Q:
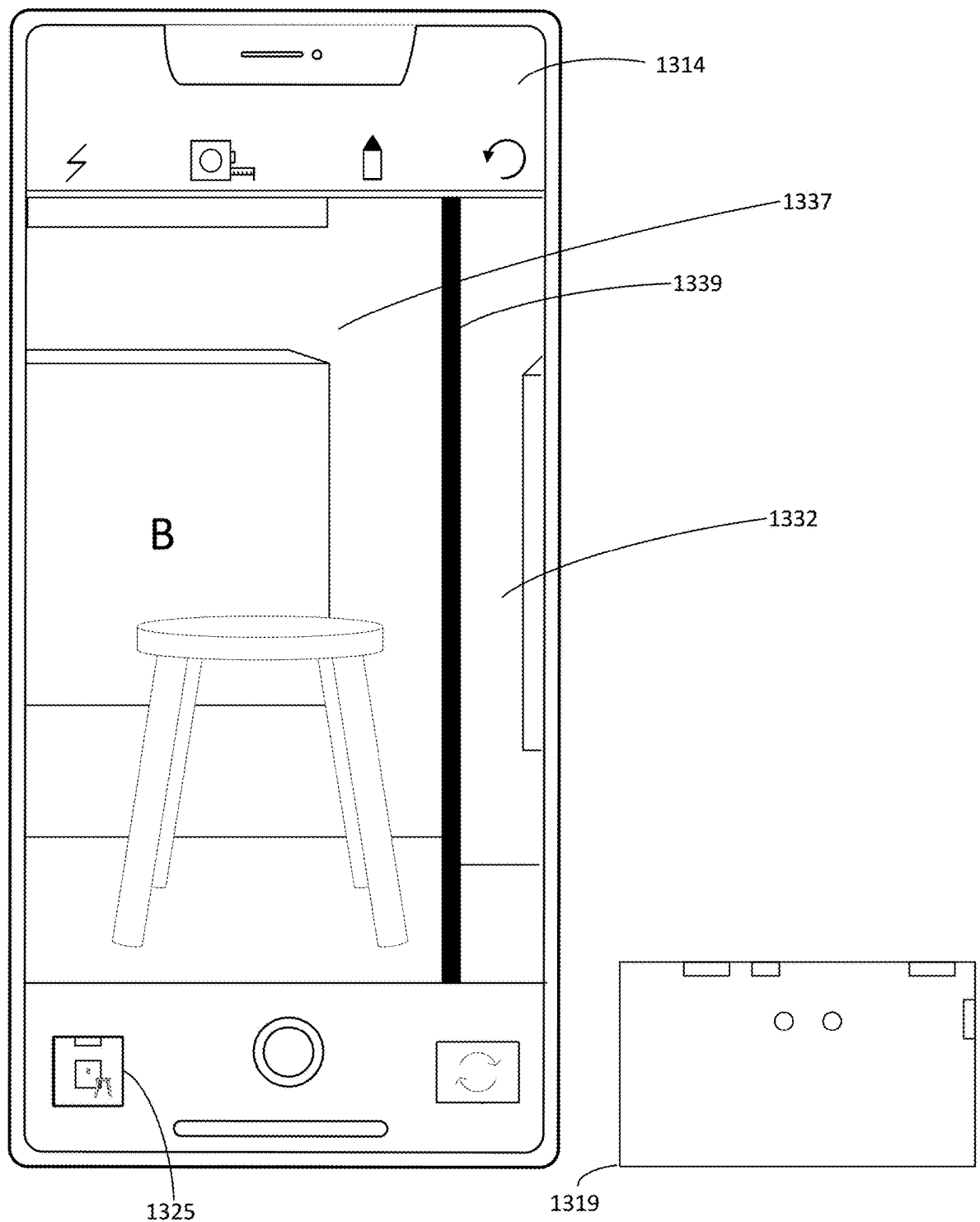
Figure 13R:
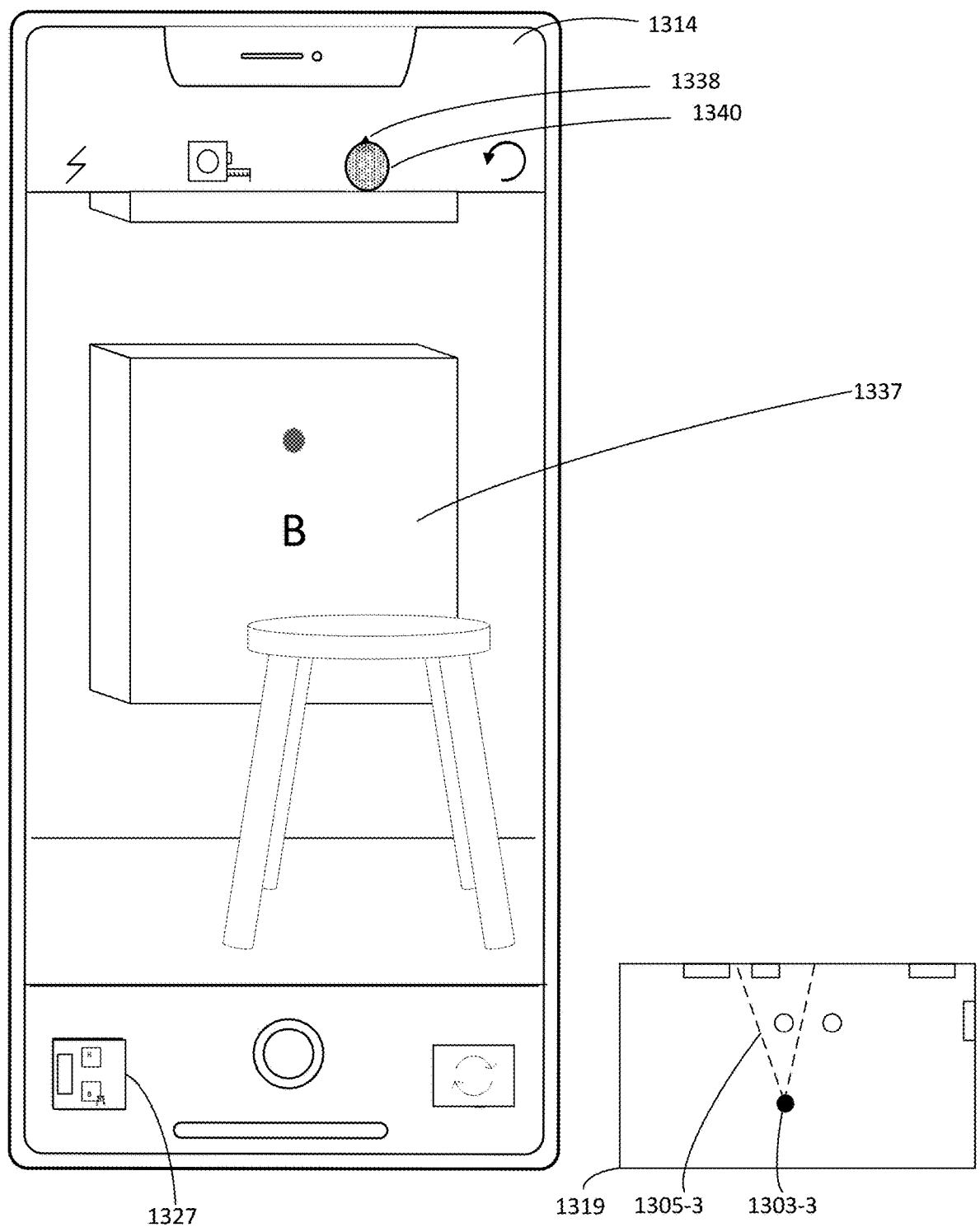

FIGS. 13O-13R illustrate display of a different captured media item without a perspective-based animated transition being displayed. In FIG. 13O, the user requests display of a media item other than displayed media item 1332 by swiping rightward on display 112 with contact 1335. In the example shown in FIG. 13O, the rightward swipe by contact 1335 corresponds to a request to display the immediately preceding media item, media item 1337 (FIG. 13R) that immediately precedes displayed media item 1332. As a result of the swipe, media item 1335 is displayed in user interface 1314 in FIG. 13R via a perspective-independent transition. The perspective-independent transition is displayed when switching between media items that do not satisfy the perspective-based transition criteria. As illustrated in the example in FIGS. 13P-13Q, the perspective-independent transition is a slide transition in which media item 1332 is shifted rightward so as to appear to move rightward "off of" display 112 (e.g., according to the direction of movement of the swipe by contact 1335), media item 1337 is shifted rightward so as to appear to move rightward "onto" display 112 to take the place of media item 1332

(e.g., also according to the direction of movement of the swipe by contact 1335), and boundary 1339 is displayed to separate the left, trailing edge of media item 1332 from the right, leading edge of media item 1337. No perspective-based animated transition between camera location 1303-4 and field of view 1305-4 corresponding to media item 1332 (FIG. 13O) and camera location 1303-3 and field of view 1305-3 corresponding to media item 1337 (FIG. 13R) is displayed, because, in this example, media item 1337 and media item 1332 do not satisfy the perspective-based transition criteria (e.g., the respective portions of physical environment 1300 captured in the two media items do not overlap by at least a threshold amount). Accordingly, legend 1319 in FIGS. 13P-13Q does not indicate any simulated camera locations or simulated fields of view during the perspective-independent transition. In FIG. 13R, media item 1337 is displayed in user interface 1314 after completion of the perspective-independent slide transition from media item 1332, and legend 1319 indicates camera location 1303-3 and field of view 1305-3 with which media item 1337 was captured. The media item captured in FIG. 13B (also referred to herein as "media item 1348," as shown in FIG. 13Y) is the media item immediately preceding displayed media item 1337, and thus a preview of media item 1348 is displayed in thumbnail 1327. FIG. 13R also illustrates selection of annotation control 1338 with contact 1340 to activate an annotation mode for adding annotations to displayed media item 1337.

Figure 13S:
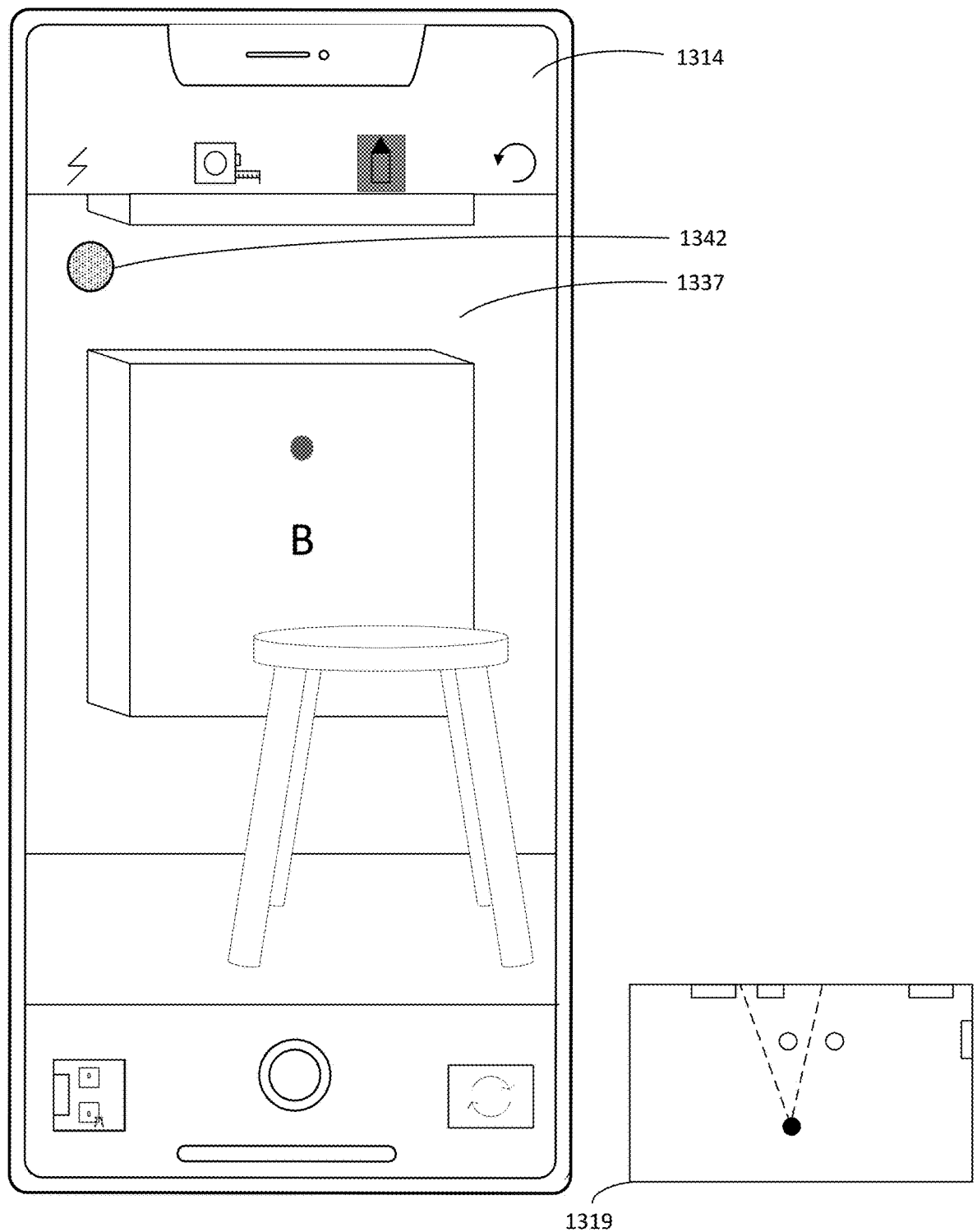
Figure 13T:
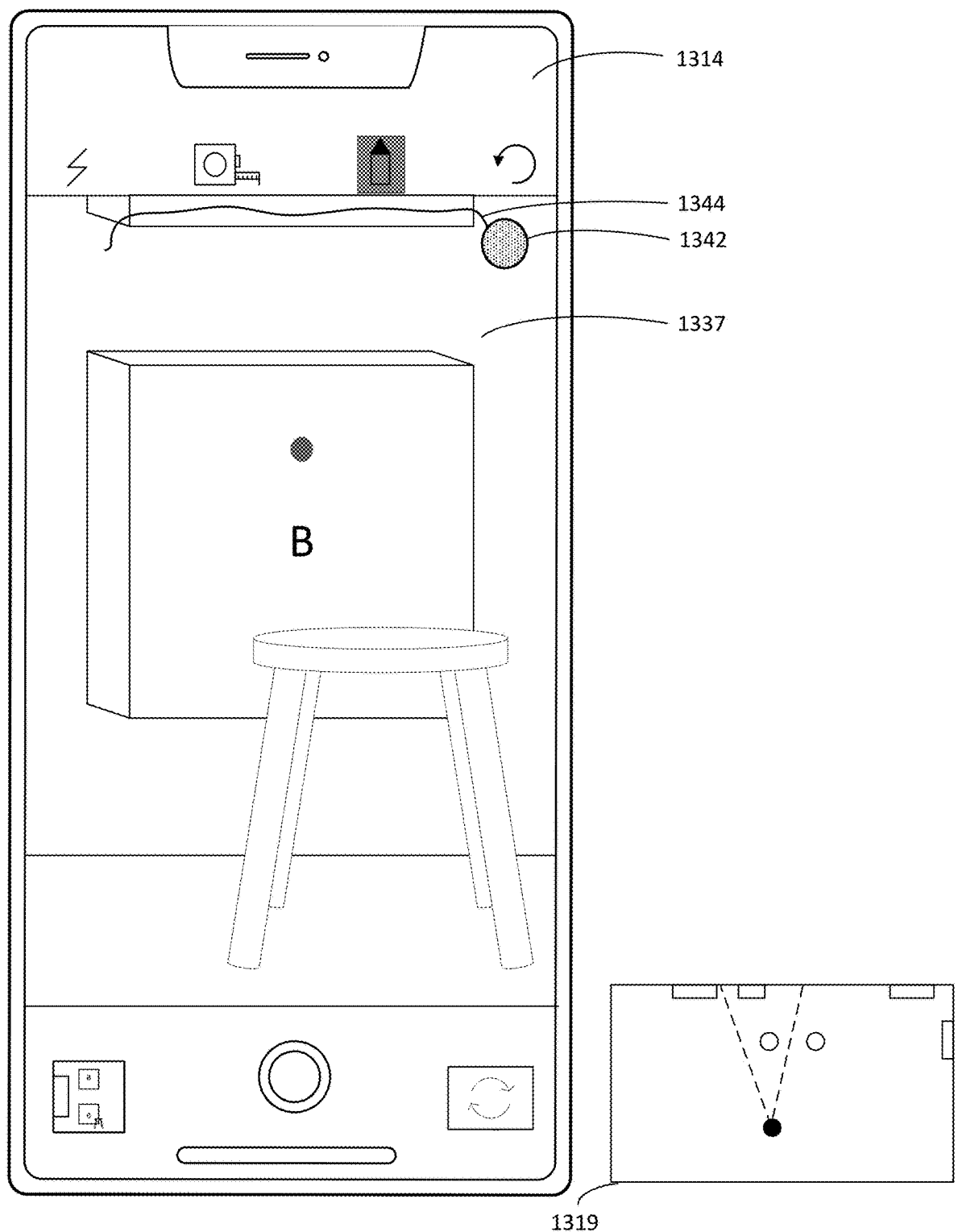
Figure 13U:
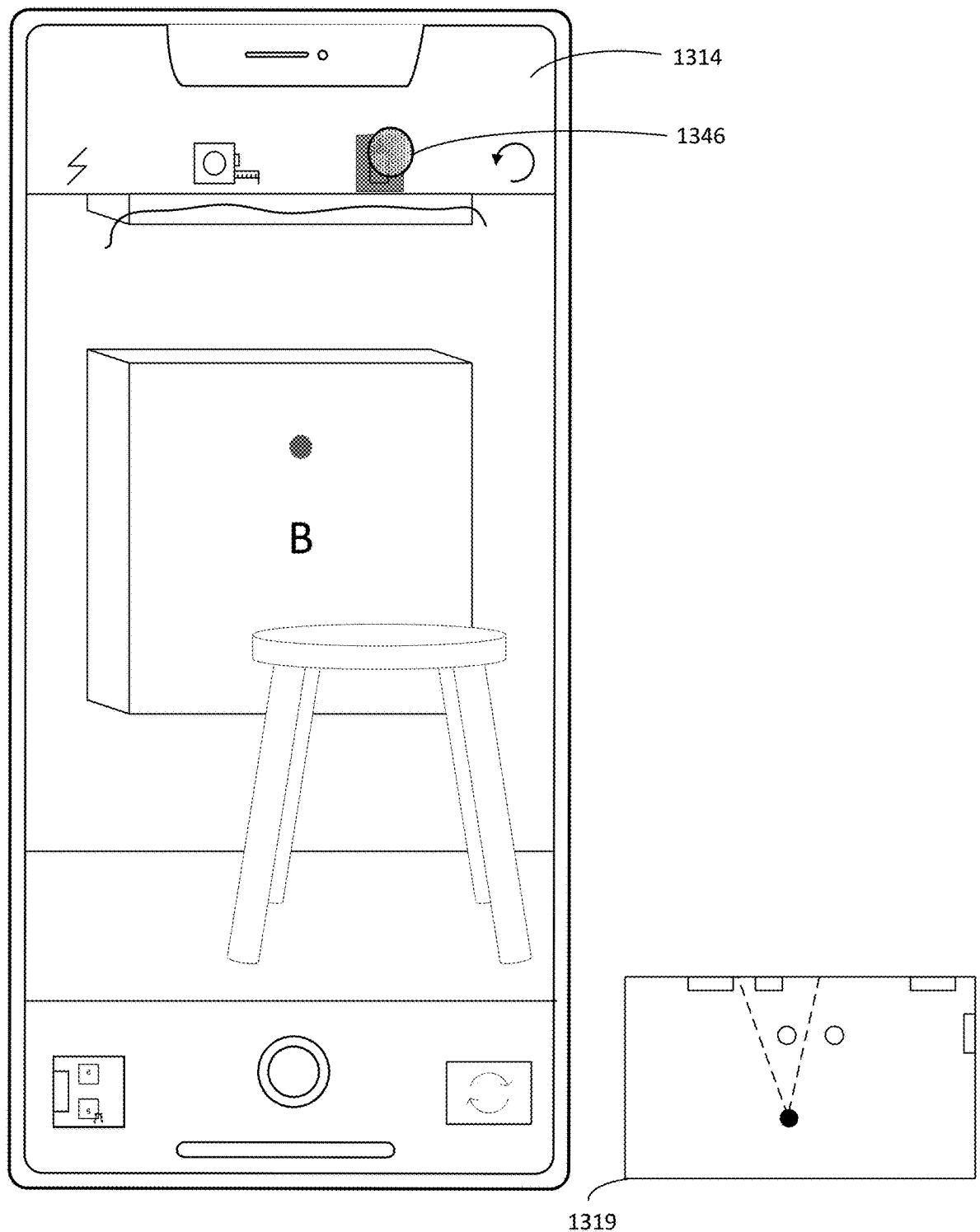

FIGS. 13S-13U illustrate adding an annotation to media item 1337. In response to selection of annotation control 1338 by contact 1340 in FIG. 13R, annotation control 1338 is highlighted in FIG. 13S, and annotation of the media item displayed in user interface 1314 is enabled. The user then draws on media item 1336 by moving contact 1342 across display 112. As a result, annotation 1344 is displayed over media item 1337 along the path of contact 1342, as shown in FIG. 13T. The user then exits the annotation mode by selecting highlighted annotation control 1338 with contact 1346 in FIG. 13U.

Figure 13V:
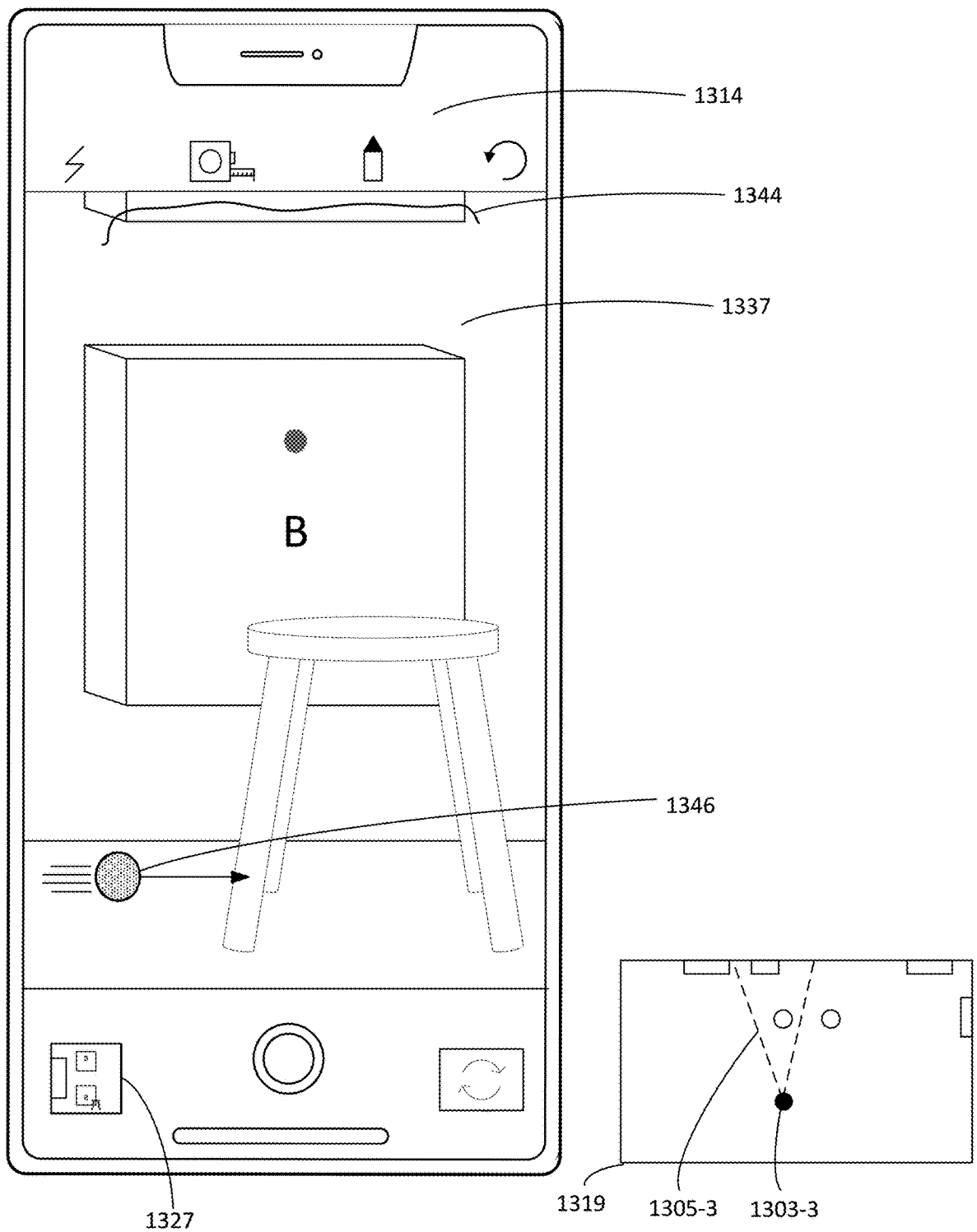
Figure 13W:
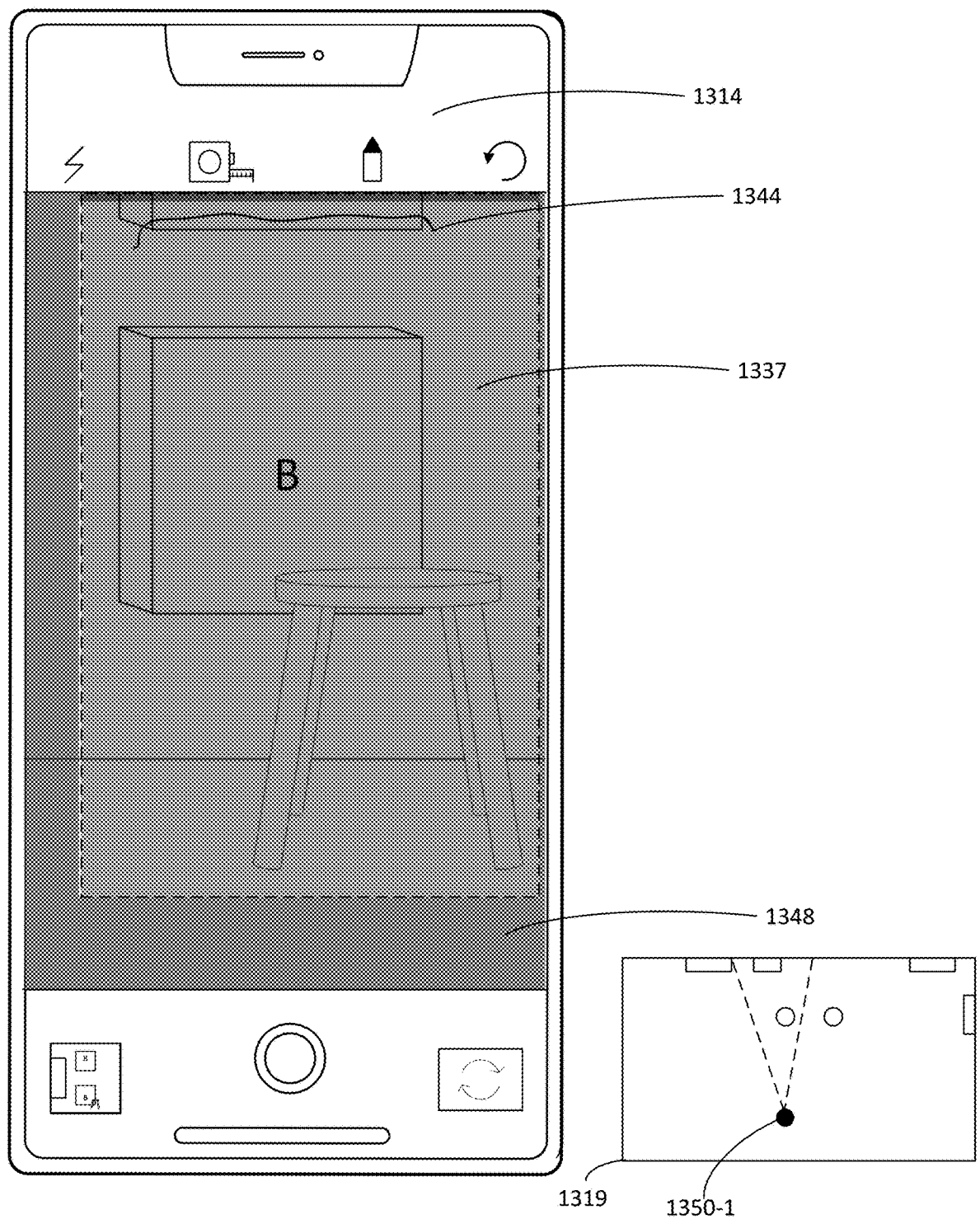
Figure 13X:
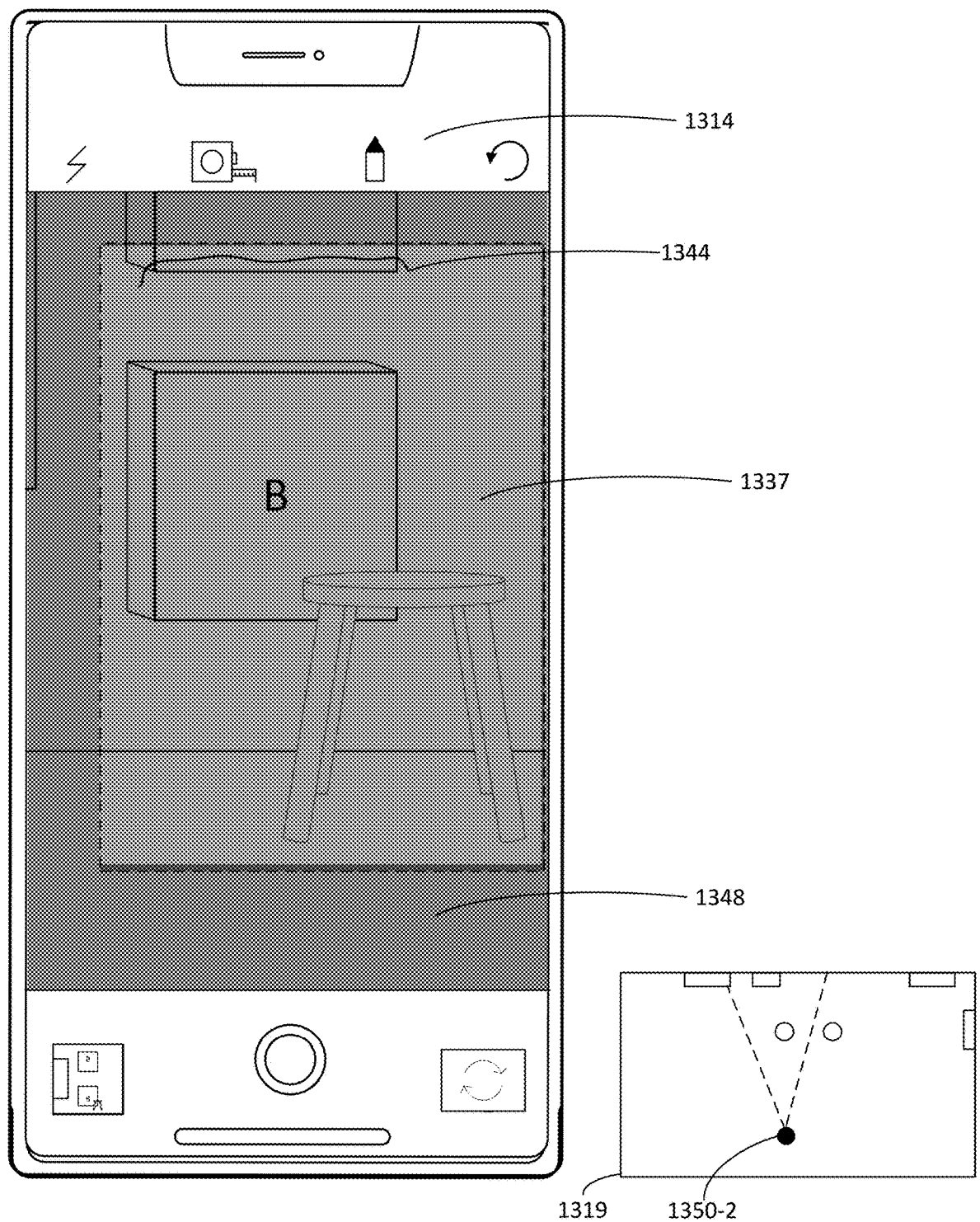
Figure 13Y:
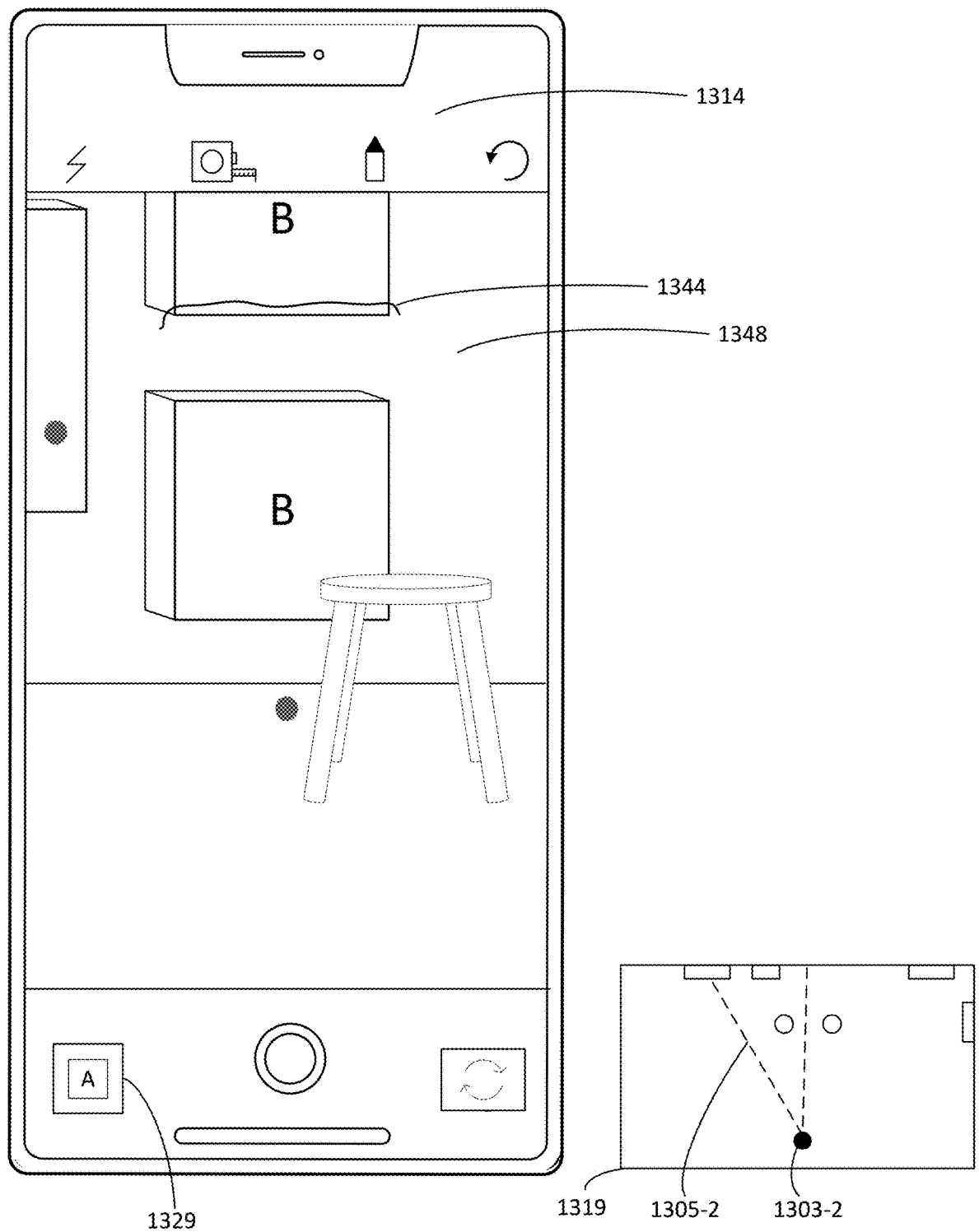

FIGS. 13V-13Y illustrate another perspective-based animated transition between two captured media items. In FIG. 13V, the user requests display of a media item different from the one currently displayed by swiping rightward on display 112 with contact 1346, which corresponds to a request to display immediately-preceding media item 1348 (shown in FIG. 13Y). As a result, user interface 1314 is updated in FIG. 13Y to display media item 1348, and since media item 1348 and media item 1337 satisfy the perspective-based transition criteria, display of media item 1337 is replaced with display of media item 1348 via a perspective-based transition, as shown in FIGS. 13W-13X, based on the difference between the respective camera locations and fields of view of media items 1337 and 1348. In particular, the animated transition simulates movement of the camera(s) from camera location 1303-3 and field of view 1305-3 corresponding to media item 1337 (FIG. 13V) to camera location 1303-2 and field of view 1305-2 corresponding to media item 1348 (FIG. 13Y), including moving through simulated intermediate camera locations 1350-1 (FIG. 13W) and 1350-2 (FIG. 13X). Because media item 1337 was captured from camera location 1303-3 (FIG. 13V) which is in front of camera location 1303-2 (FIG. 13Y) from which media item 1348 was captured, and because media item 1337 captures field of view 1305-3 (FIG. 13V) which is wholly within field of view 1305-2 (FIG. 13Y) captured by media item 1348, the portion of physical environment 1300 captured in media item 1337 is a subset of the portion of physical environment 1300 captured in media item 1348. Accordingly, the perspective-based animated transition from media item 1337 to media item 1348 includes a "zoom-out" transition effect, as illustrated by the shrinking (e.g., reduction in scale) of media item 1337 in FIG. 13W and further shrinking of media item 1337 in FIG. 13X.

Optionally, as shown in FIG. 13W, while media item 1337 is (e.g., gradually) reduced in scale, regions in media item 1348 corresponding to portions of physical environment 1300 beyond the portions captured by media item 1337 are (e.g., gradually) displayed, initially at least partially enlarged, such that representations of objects in media item 1348 align with representations of objects in media item 1337 during the shrinking of media item 1337. In other words, in some embodiments, media item 1337 is reduced in scale from a first scale (e.g., as shown in FIG. 13V) to a second scale at which representations of objects in media item 1337 align with corresponding representations of objects in media item 1348 at a default display scale (e.g., a scale at which media item 1348 is fitted to display 112 (or more specifically to a media item display region on display 112), as shown in FIG. 13Y). In some embodiments, media item 1348 is meanwhile reduced in scale from an initial scale, at which representations of objects in media item 1348 align with corresponding representations of objects in media item 1337 displayed at the first scale, to the default display scale at which media item 1348 is fitted to display 112 (e.g., the display region), with media item 1348 fully displayed in FIG. 13Y, and thumbnail 1329 displaying a preview of the media item captured in FIG. 13A, which is the media item immediately preceding displayed media item 1348. In addition, during the animated transition, annotation 1344 is displayed over media item 1337 so as to continue to correspond to the same portion of physical environment 1300 over which annotation 1344 was initially added, including being reduced in scale as media item 1337 is reduced in scale. In FIG. 13Y, annotation 1344 is displayed over media item 1348 at a reduced scale so as to correspond to the same portion of physical environment 1300 as that portion is represented in media item 1348 (e.g., even though annotation 1344 was added over media item 1337).

Figure 13Z:
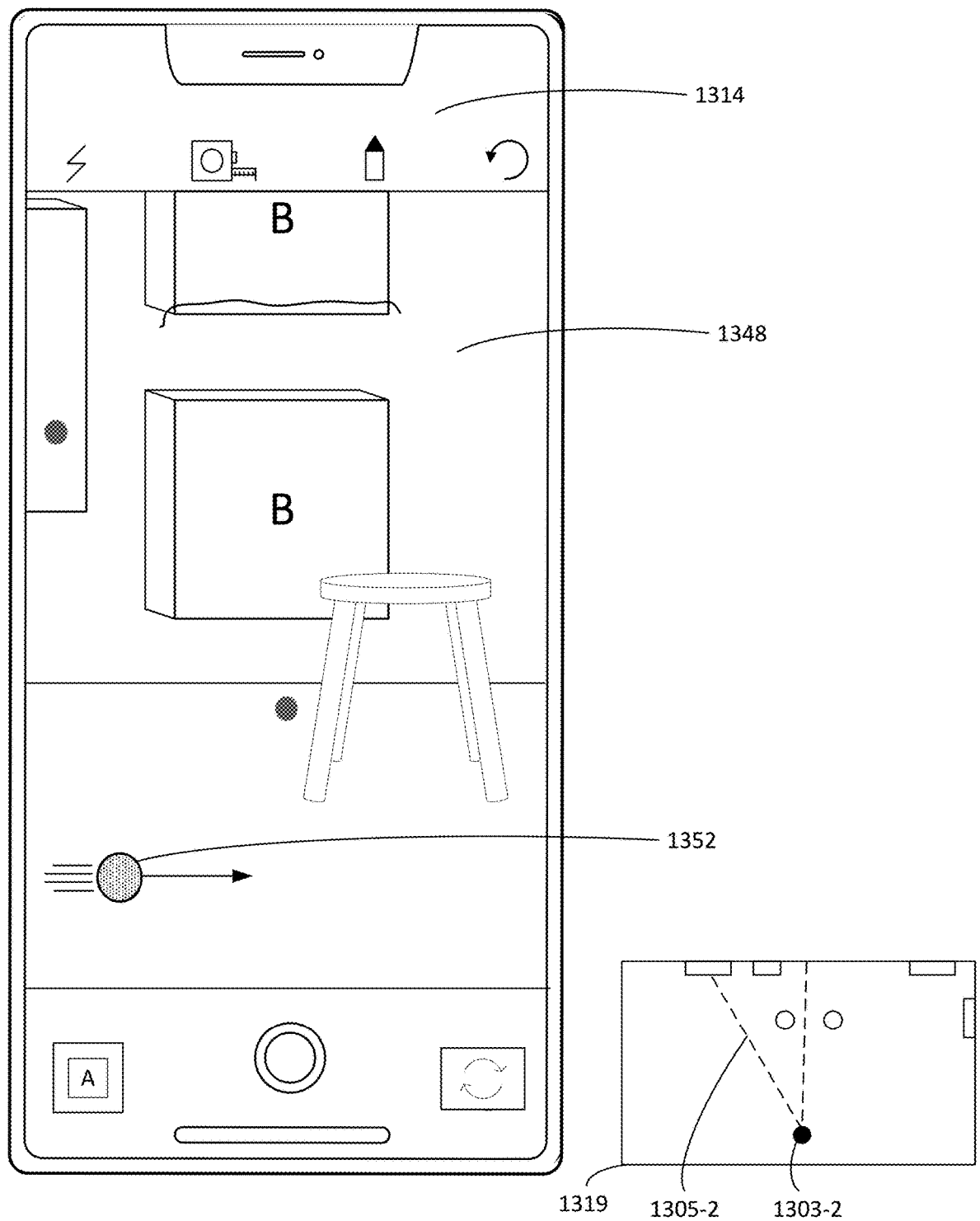
Figure 13A:
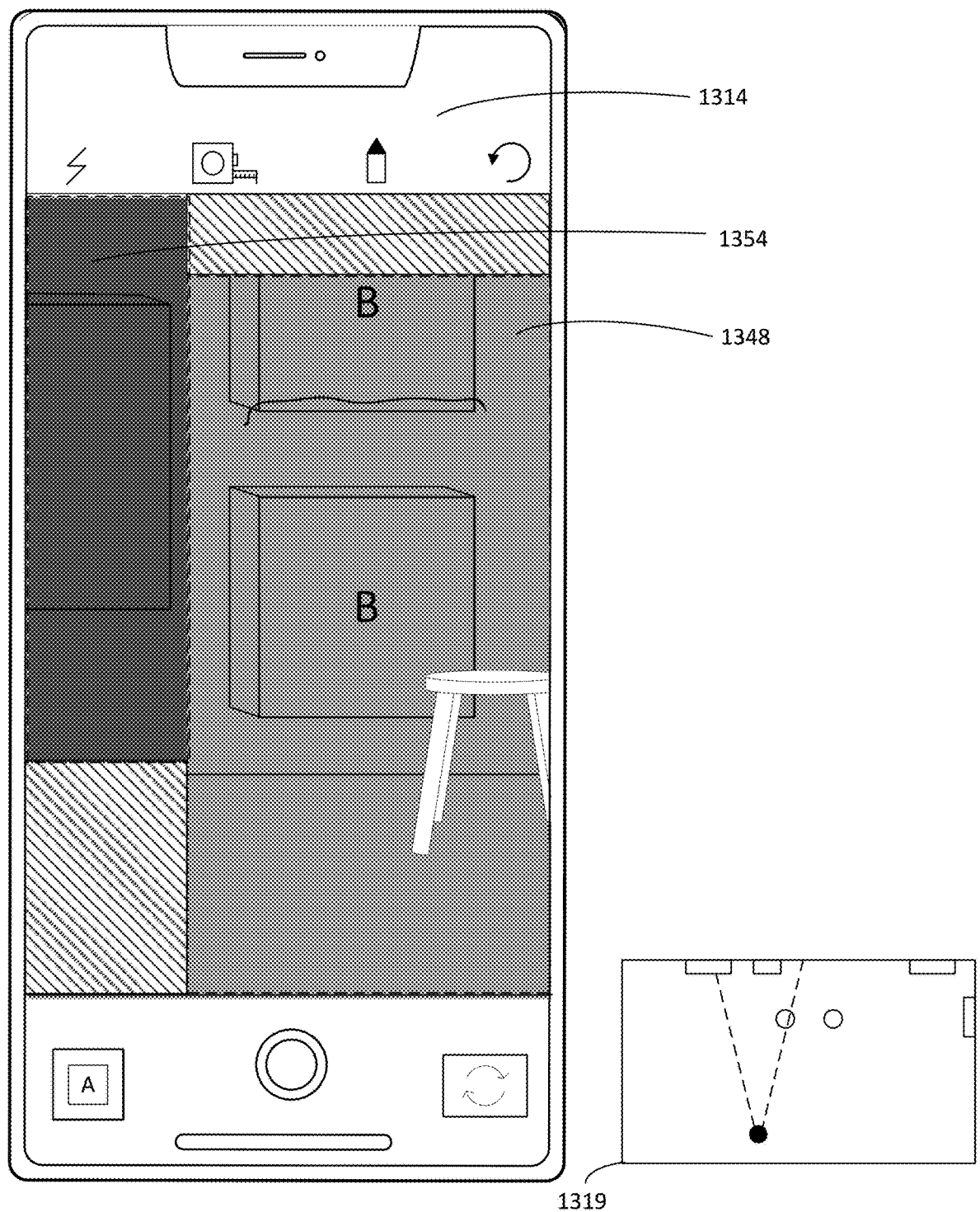
Figure 13B:
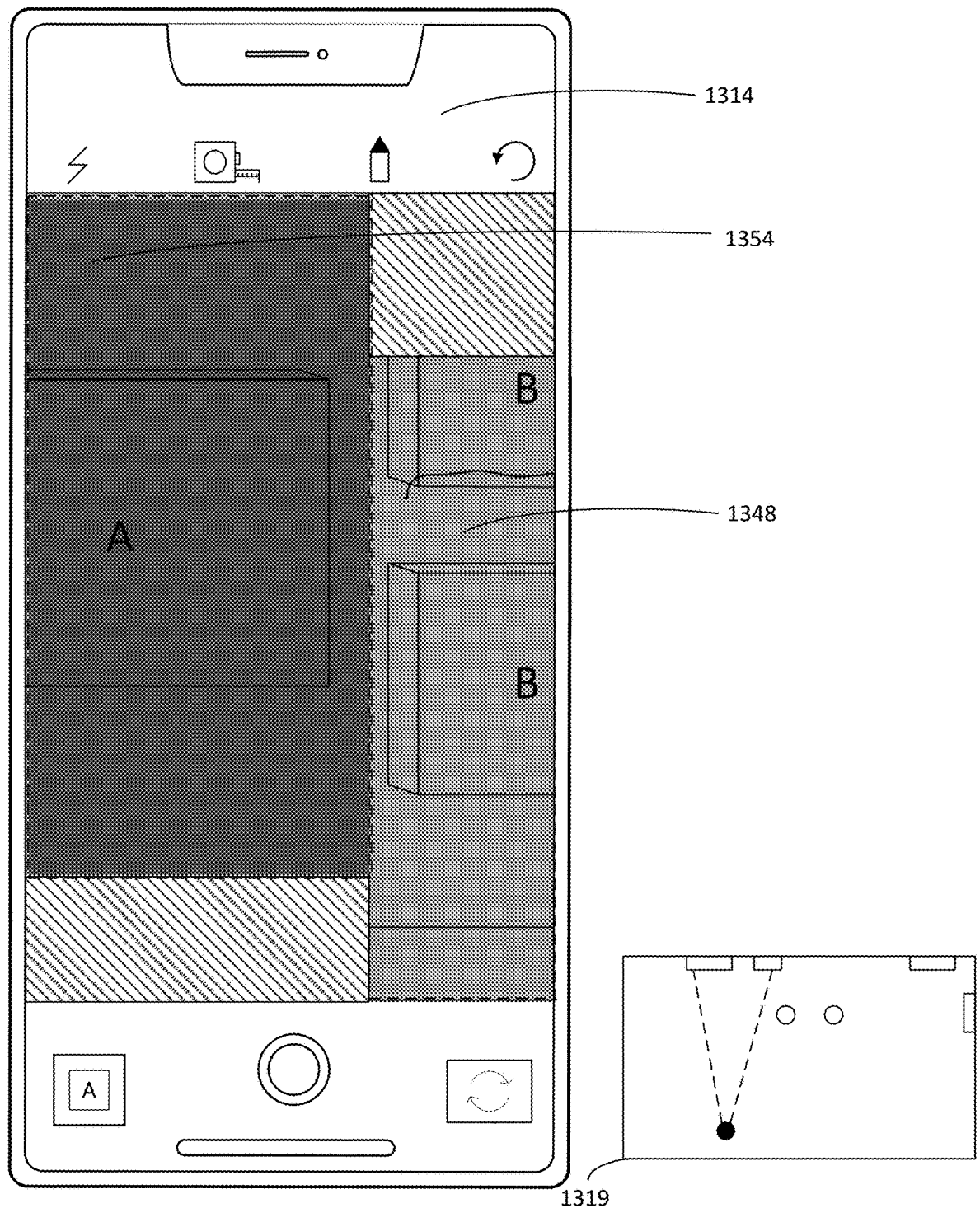
Figure 13C:
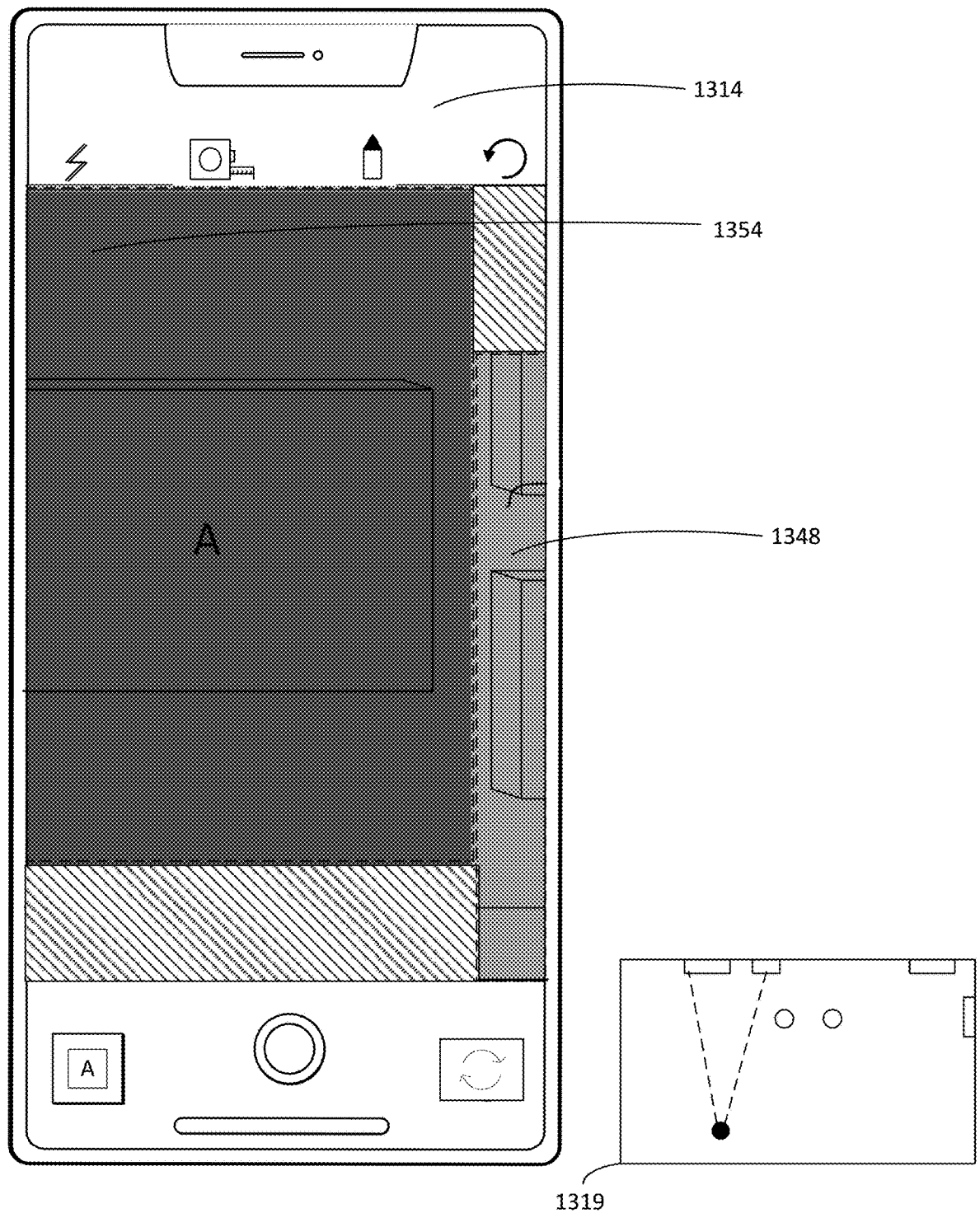
Figure 13D:
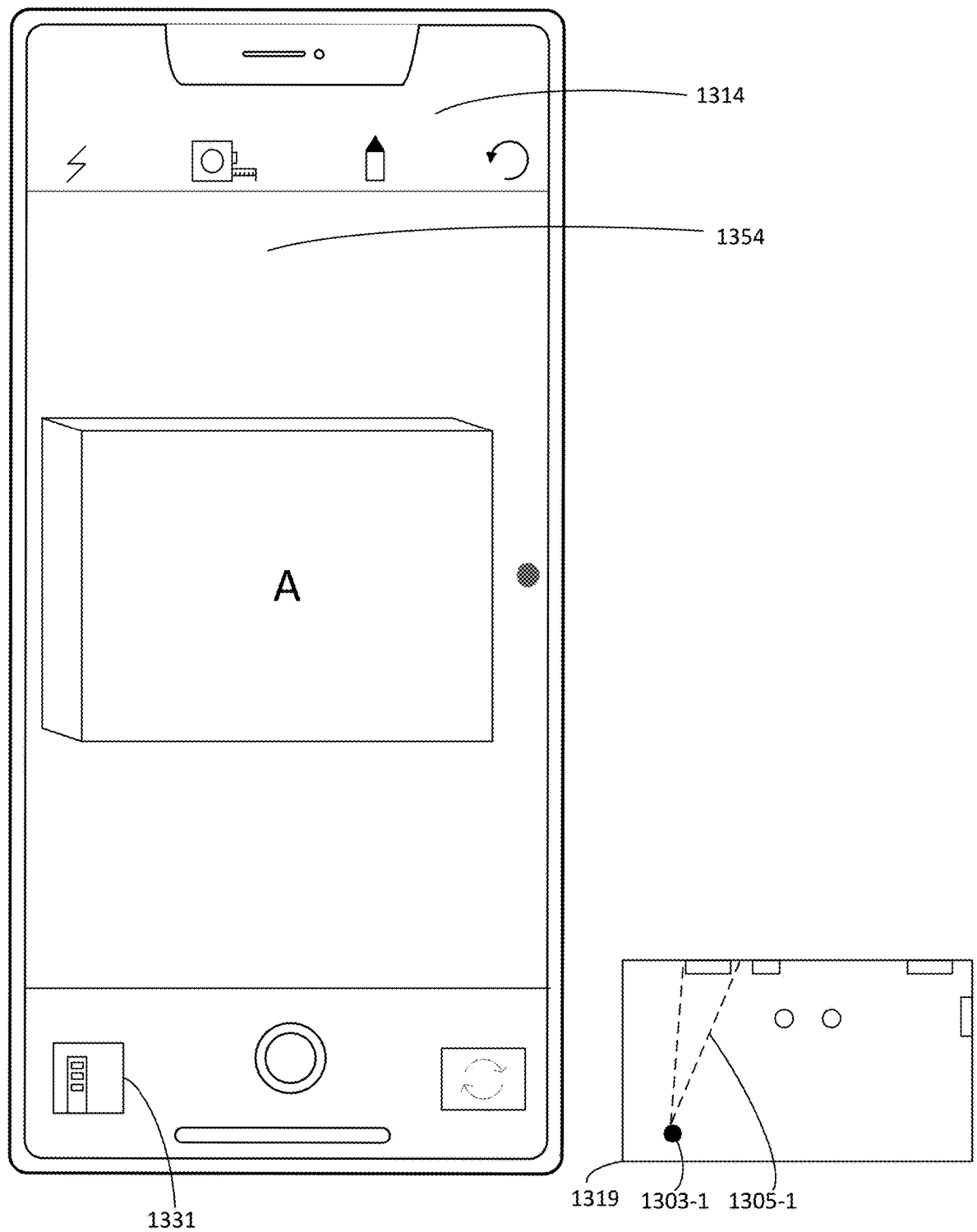
Figure 13E:
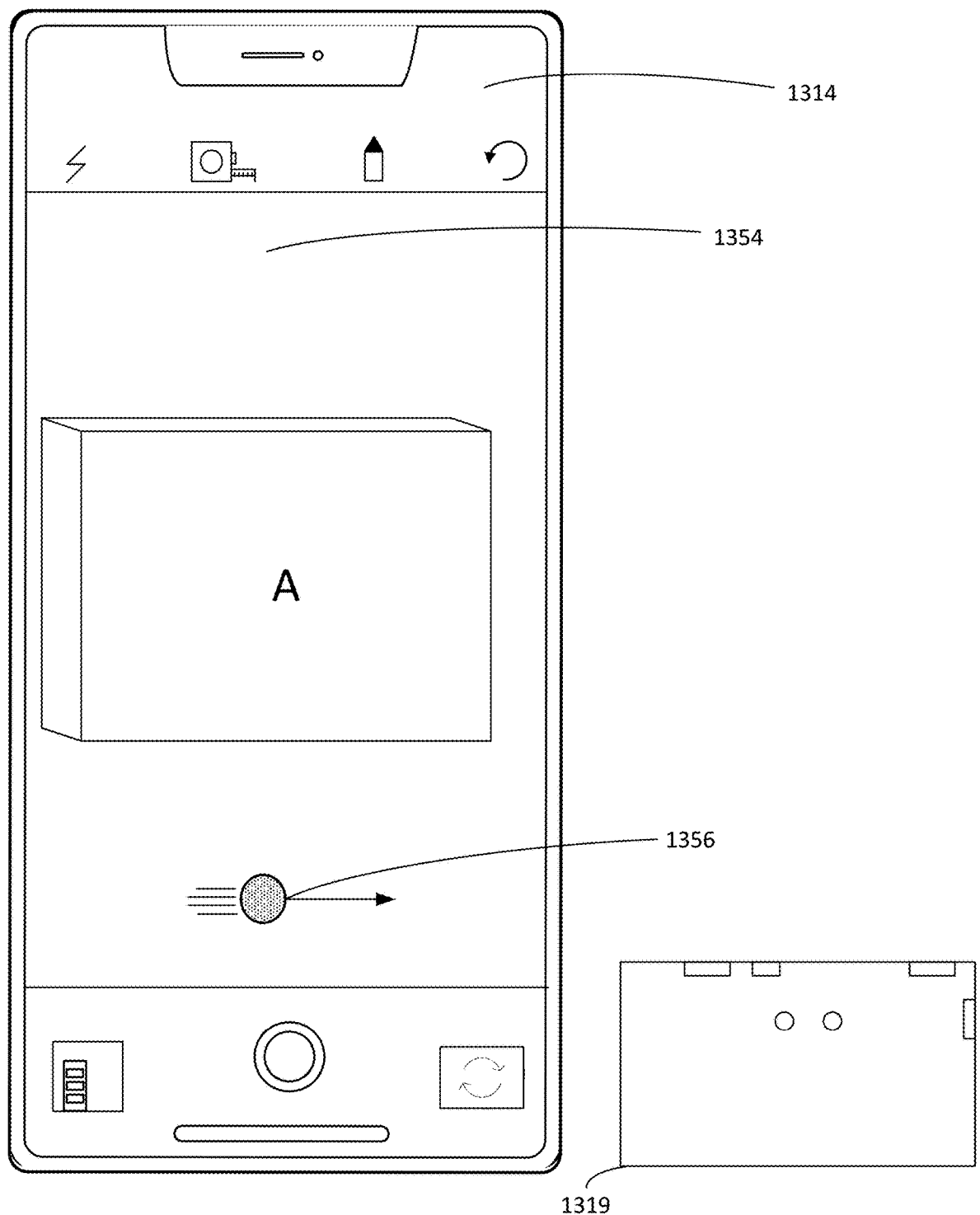
Figure 13F:
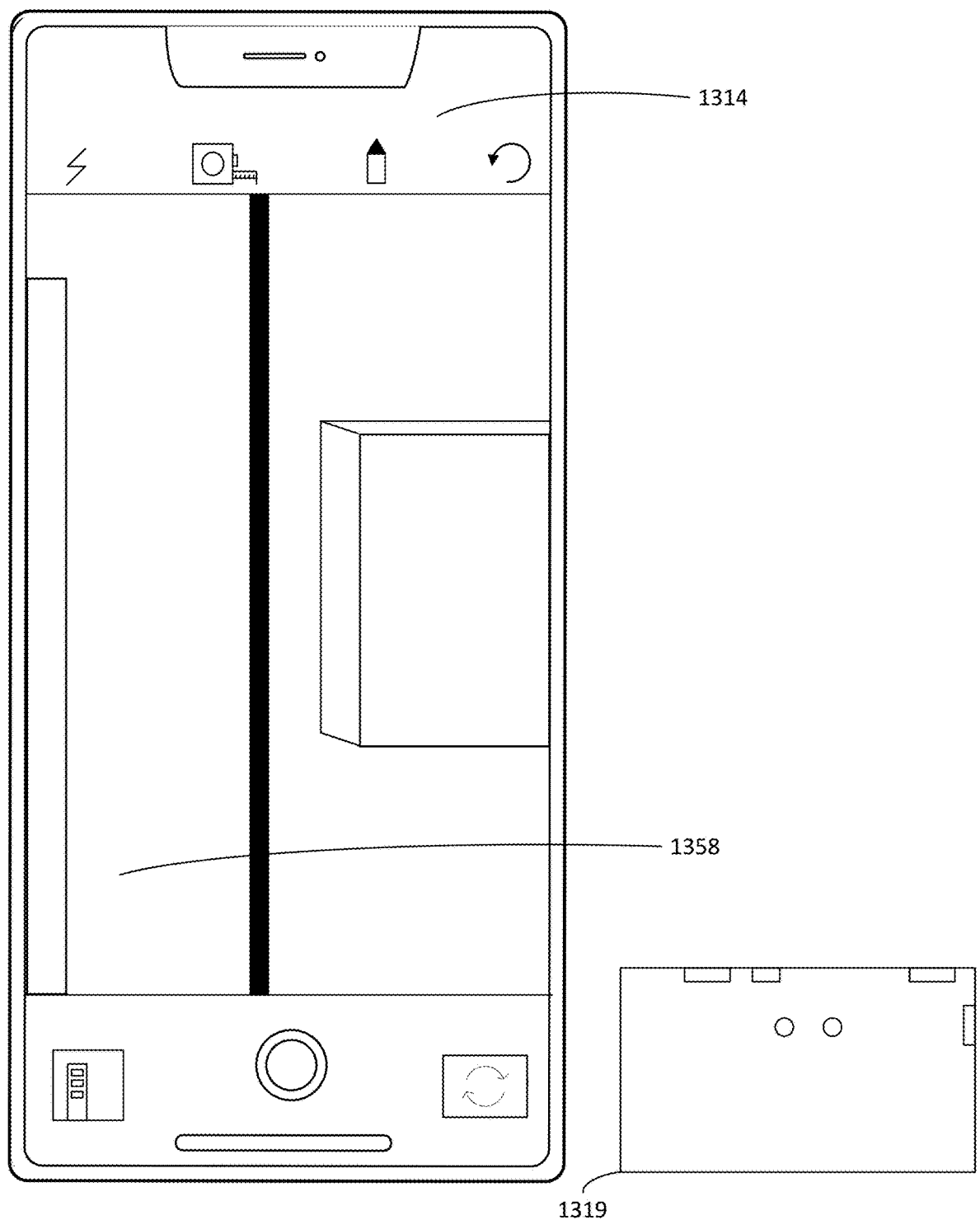
Figure 13G:
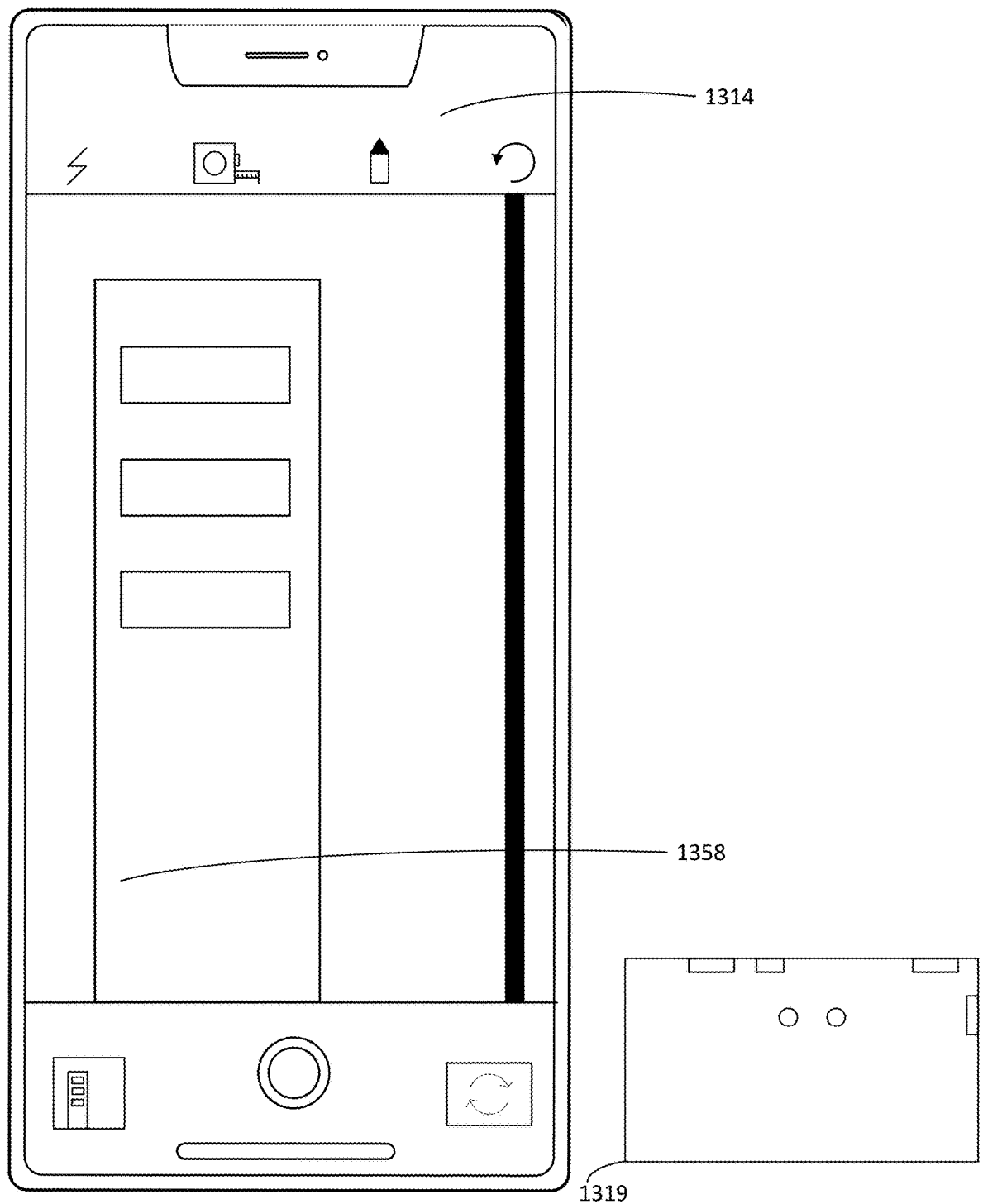
Figure 13H:
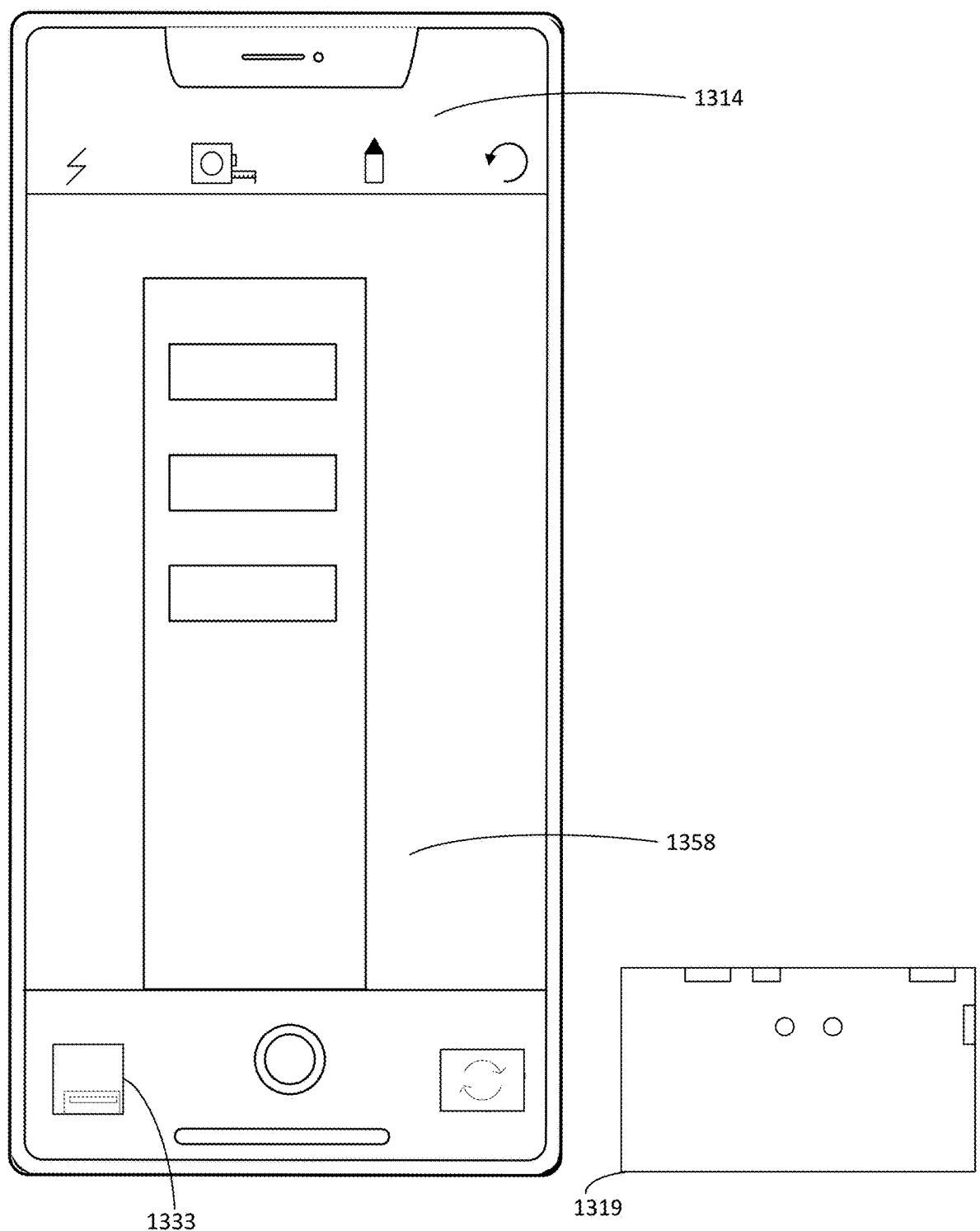

FIGS. 13Z-13DD illustrate another perspective-based animated transition between two captured media items. In FIG. 13Z, the user requests display of a media item different from the one currently displayed by swiping rightward on display 112 with contact 1352, which corresponds to a request to display immediately-preceding media item 1354. As a result, media item 1354 is displayed in user interface 1314, as shown in FIG. 13DD, and since media item 1354 and media item 1348 satisfy the perspective-based transition criteria, display of media item 1348 is replaced with display of media item 1354 via a perspective-based animated transition, as shown in FIGS. 13AA-13CC, based on the difference between the respective camera locations and fields of view of media items 1348 and 1354. In particular, the animated transition simulates lateral movement of the camera(s) from camera location 1303-2 and field of view 1305-2 corresponding to media item 1348 (FIG. 13Z) to camera location 1303-1 and field of view 1305-1 corresponding to media item 1354 (FIG. 13DD). Because media item 1348 was captured from camera location 1303-2 which is to the right of and above (e.g., from a greater height than) camera location 1303-1 from which media item 1354 was captured, displaying the animated transition includes shifting media item 1348 toward the right and downward on display 112, including gradually ceasing to display portions of media item 1348 that have moved "off of" display 112. Displaying the animated transition also optionally includes shifting media item 1354 leftward and downward "onto" display 112, by initially displaying the lower right portions of media item 1354 and gradually displaying additional portions of media item 1354 above and to the left of the displayed portions until media item 1354 is fully displayed, as shown in FIG. 13DD. A previously-captured media item (also referred to herein as "media item 1358," as shown in FIG. 13HH) is the media item immediately preceding displayed media item 1354, and thus a preview of media item 1358 is displayed in thumbnail 1331.

FIGS. 13EE-13HH illustrate a transition between two captured media items without a perspective-based animated transition being displayed. In FIG. 13EE, the user requests display of a media item different from the one currently displayed by swiping rightward on user interface 1314 with contact 1356. As a result, user interface 1314 is updated to display media item 1358, as shown in FIG. 13HH. Since media item 1358 was not captured in the same camera session as media item 1354 (e.g., media item 1358 was captured at a different location and at a different time, and during a previous camera session that was ended prior to the camera application being relaunched to begin the camera session during which media items 1354, 1348, 1337, 1332, 1326, and 1315 were captured), media items 1354 and 1358 do not satisfy the perspective-based transition proximity criteria. Accordingly, no perspective-based animated transition is displayed. Instead, the perspective-independent slide transition, described herein with reference to FIGS. 13O-13R, is displayed, as shown in FIGS. 13FF-13GG.

Although FIGS. 13A-13HH illustrate transitions between media items in response to requests to display different media items based on rightward swipe gestures (e.g., requesting display of the immediately-preceding media item in a collection of media items viewable in user interface 1314 and indexed using the thumbnail displayed in the lower left corner of user interface 1314), one of ordinary skill in the art will recognize that other ways to request display a different media item may be used. For example, leftward swipe gestures may correspond to requests for display of immediately-following media item in the collection. In another example, a plurality of thumbnails may be displayed alongside (e.g., below) the displayed media item, and an input (e.g., a tap gesture) on one of the plurality of thumbnails may correspond to a request to display the corresponding media item represented by the thumbnail. In such examples, the above-described perspective-based animated transitions may be performed to change from the currently-displayed media item to the requested media item based on the respective camera locations and fields of view, without regard to the type of input requesting the change (e.g., without regard to whether the input corresponds to a request for a next media item, previous media item, or other non-sequential media item).

FIGS. 14A-14AS illustrate various processes for viewing motion tracking information corresponding to a representation (e.g., live view representations or still view representations) of a moving subject (e.g., a person completing a tennis swing).

In FIG. 14A, device 100 displays user interface 1404 including representation 1406 corresponding to a live view of subject 1402 in physical environment 1401. Representation 1406 is captured using the camera(s) and/or depth sensor(s) of device 100. User interface 1404 also includes a plurality of controls for displaying motion tracking information about subject 1402 over representation 1406, including tracking control 1408, graph control 1410, model control 1412, and perspective control 1414. User interface 1404 also includes controls, such as record control 1407 and thumbnail 1416, for recording and viewing representations (e.g., videos) of physical environment 1401 and subject 1402.

Figure 14B:
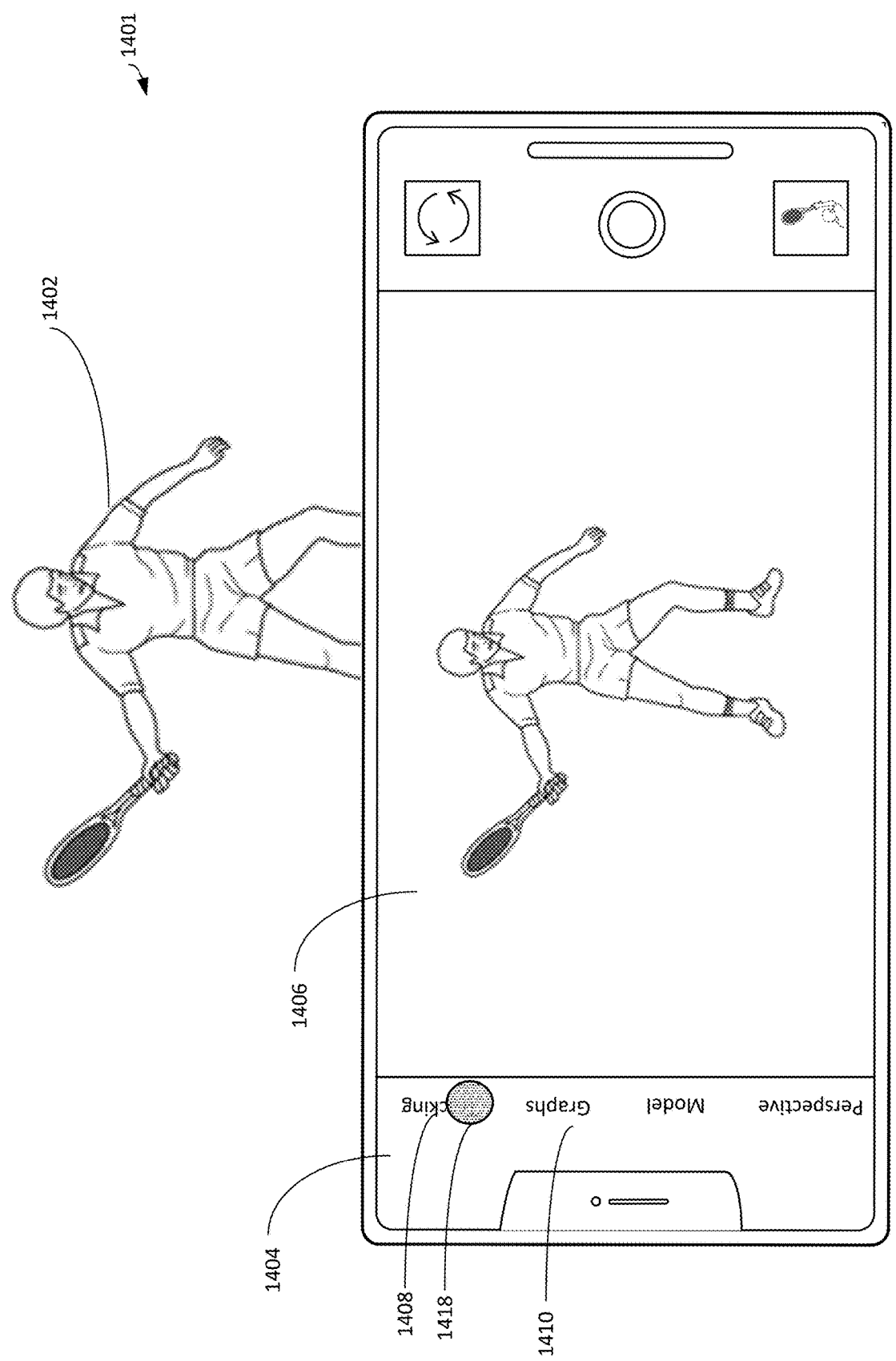
Figure 14C:
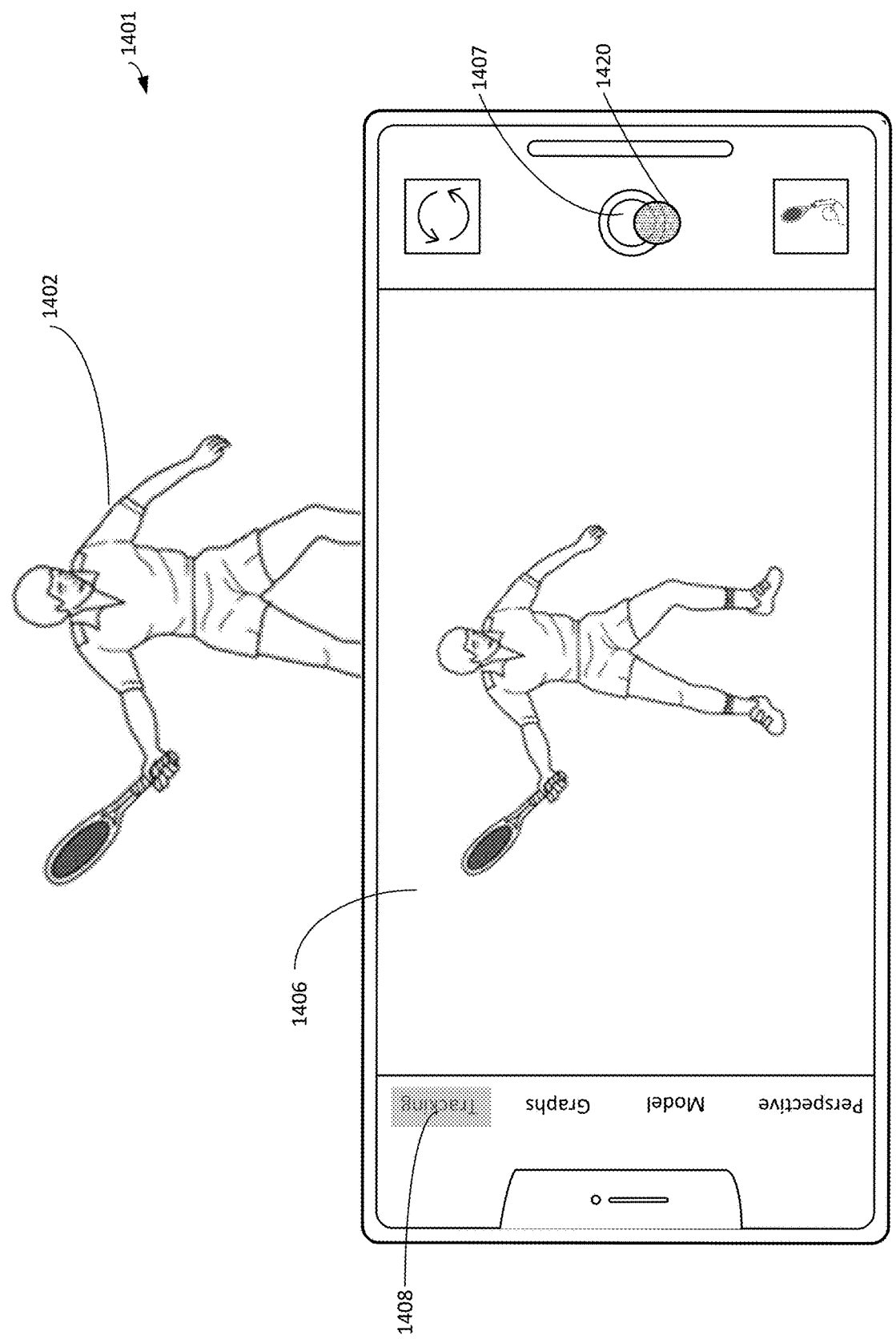
Figure 14D:
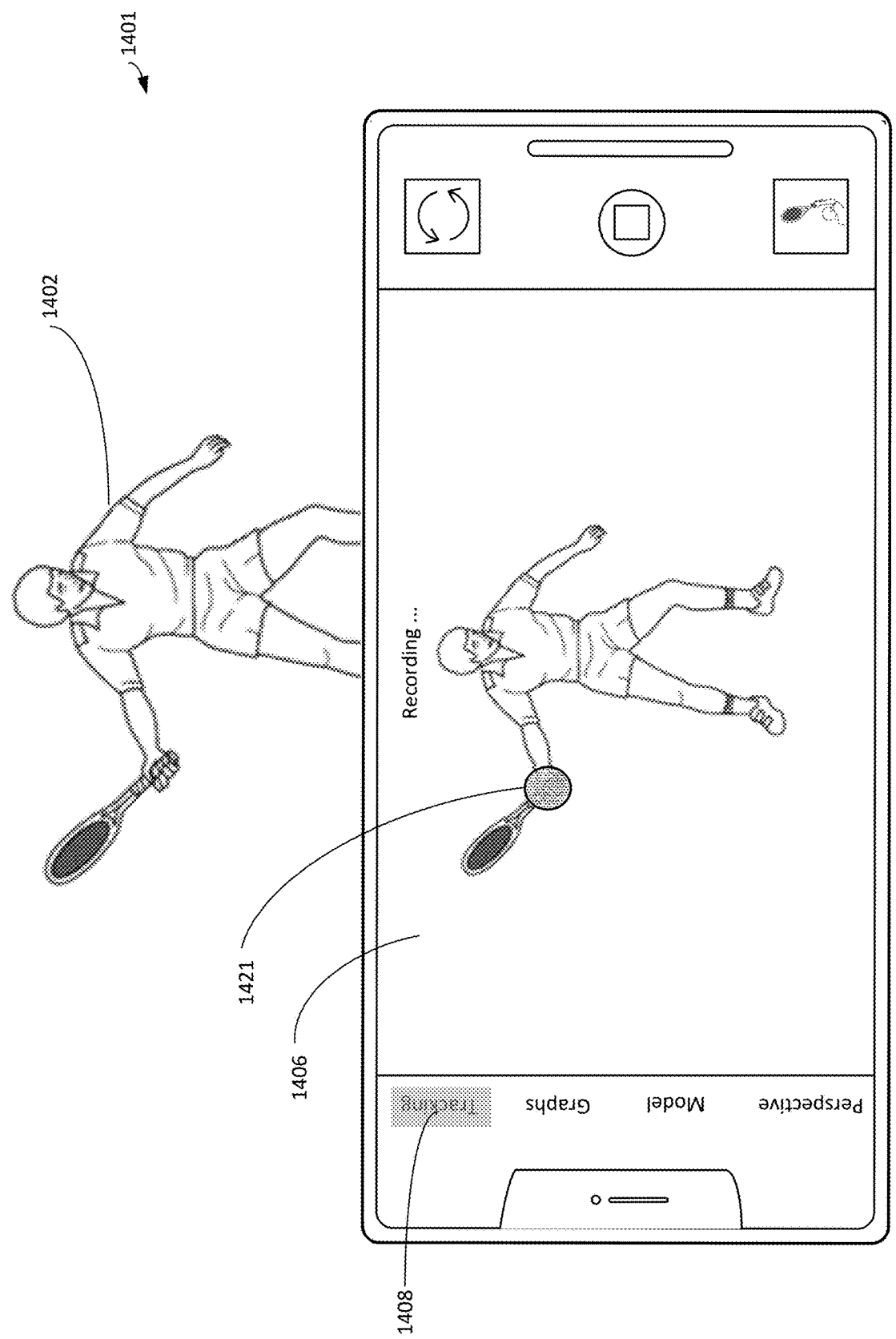
Figure 14E:
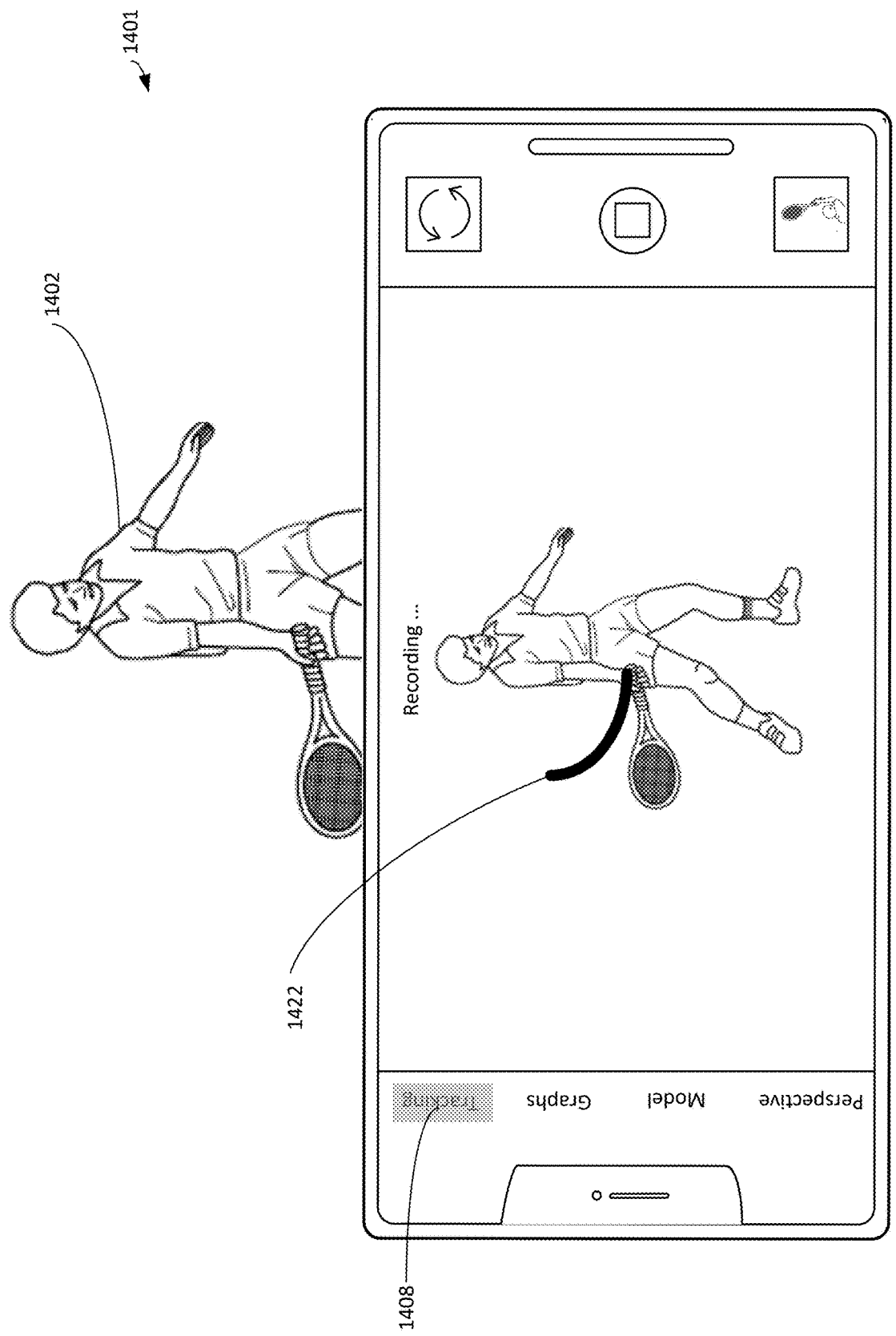
Figure 14F:
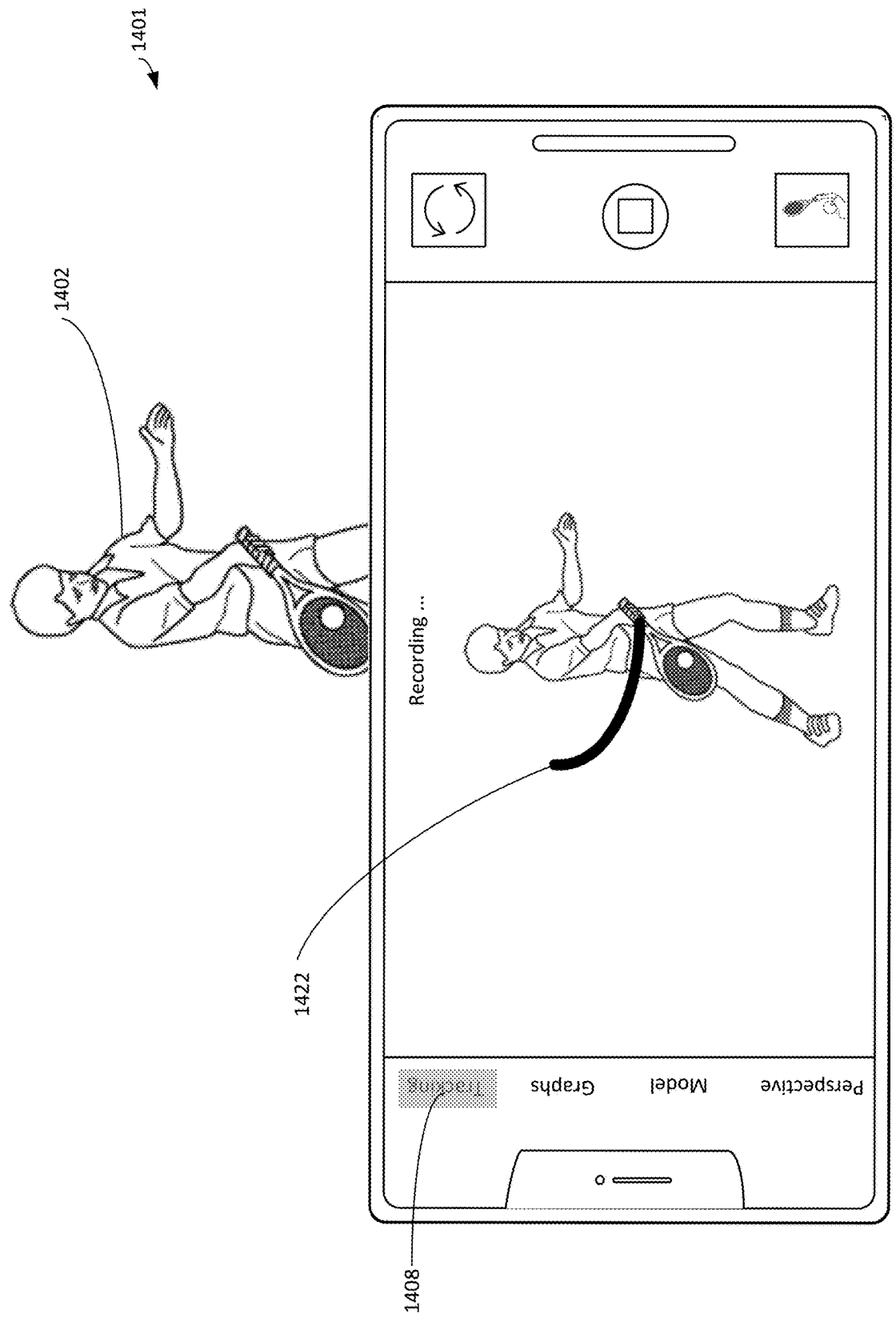
Figure 14G:
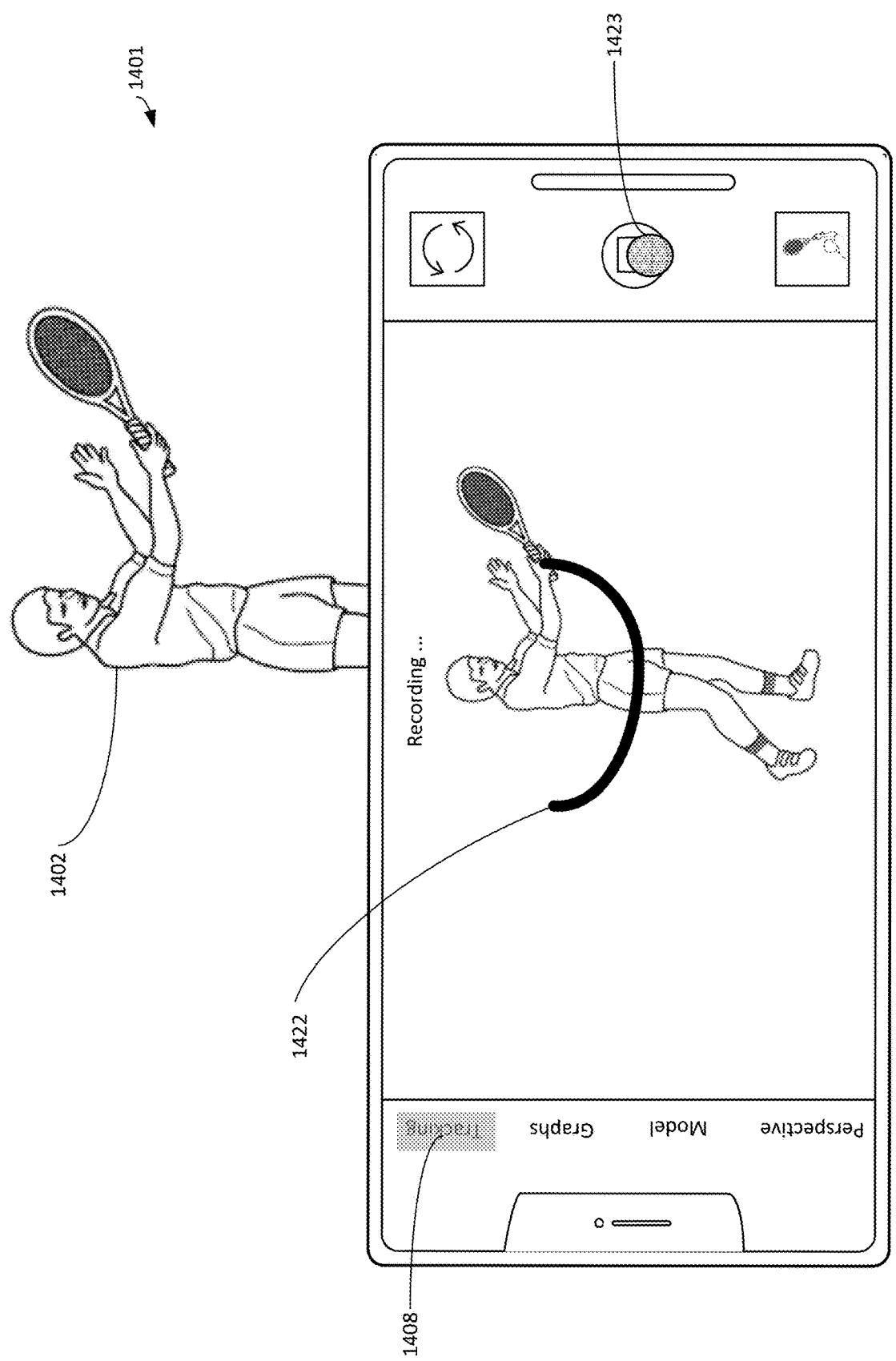

FIGS. 14B-14G illustrate a process in which the user records a representation (e.g., a video) of physical environment 1401 and subject 1402 therein with motion tracking information. In FIG. 14B, the user selects tracking control 1408 with contact 1418. As a result, tracking control 1408 is highlighted as shown in FIG. 14C, and tracking of subject 1402 is enabled. FIG. 14C also illustrates selection of record control 1407 using contact 1420 to start the recording process. To add motion tracking information, the user then selects a point in representation 1406 that corresponds to a point on subject 1402 using contact 1421 (e.g., the user selects the wrist of subject 1402 as represented in representation 1406), as shown in FIG. 14D. FIGS. 14E-14G illustrate that as subject 1402 moves in physical environment 1401, annotation 1422 is displayed over representation 1406 to track the movement of the previously-selected point (e.g., subject 1402's wrist) in representation 1406. In some embodiments, annotation 1422 is displayed with varying visual properties, such as varying colors and/or thickness, based on one or more characteristics of the tracked motion (e.g., speed, acceleration, and so on) of the selected point on subject 1402. For example, annotation 1422 may be widened along portions that correspond to fast movement of subject 1402's wrist and/or may be displayed with a brighter or warmer color (e.g., red) than portions along annotation 1422 that correspond to slower movement of subject 1402's wrist, which may be tapered and/or displayed with a cooler color (e.g., yellow or green). The user stops the recording process using contact 1423 on record control 1407, as shown in FIG. 14G.

Figure 14H:
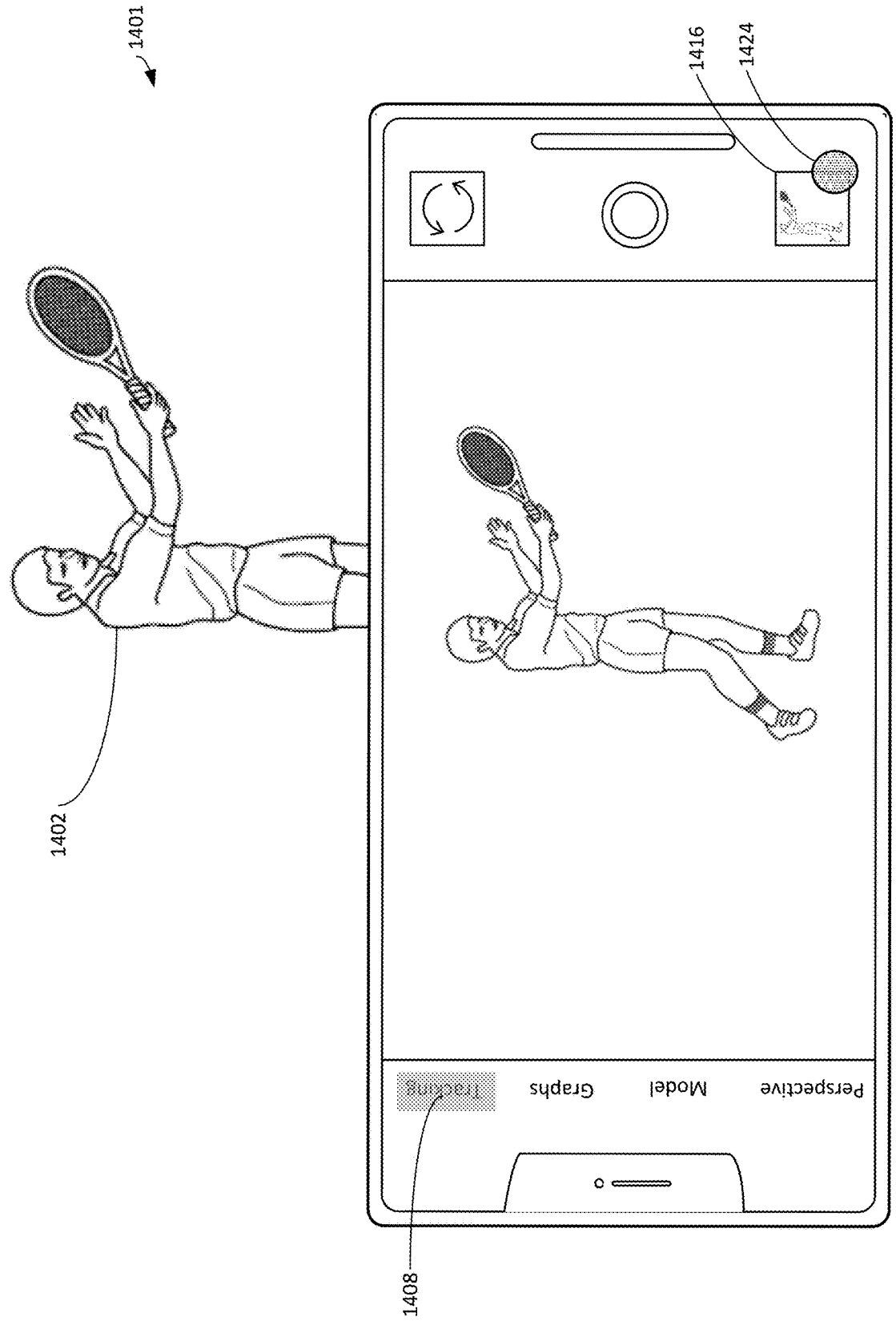
Figure 14I:
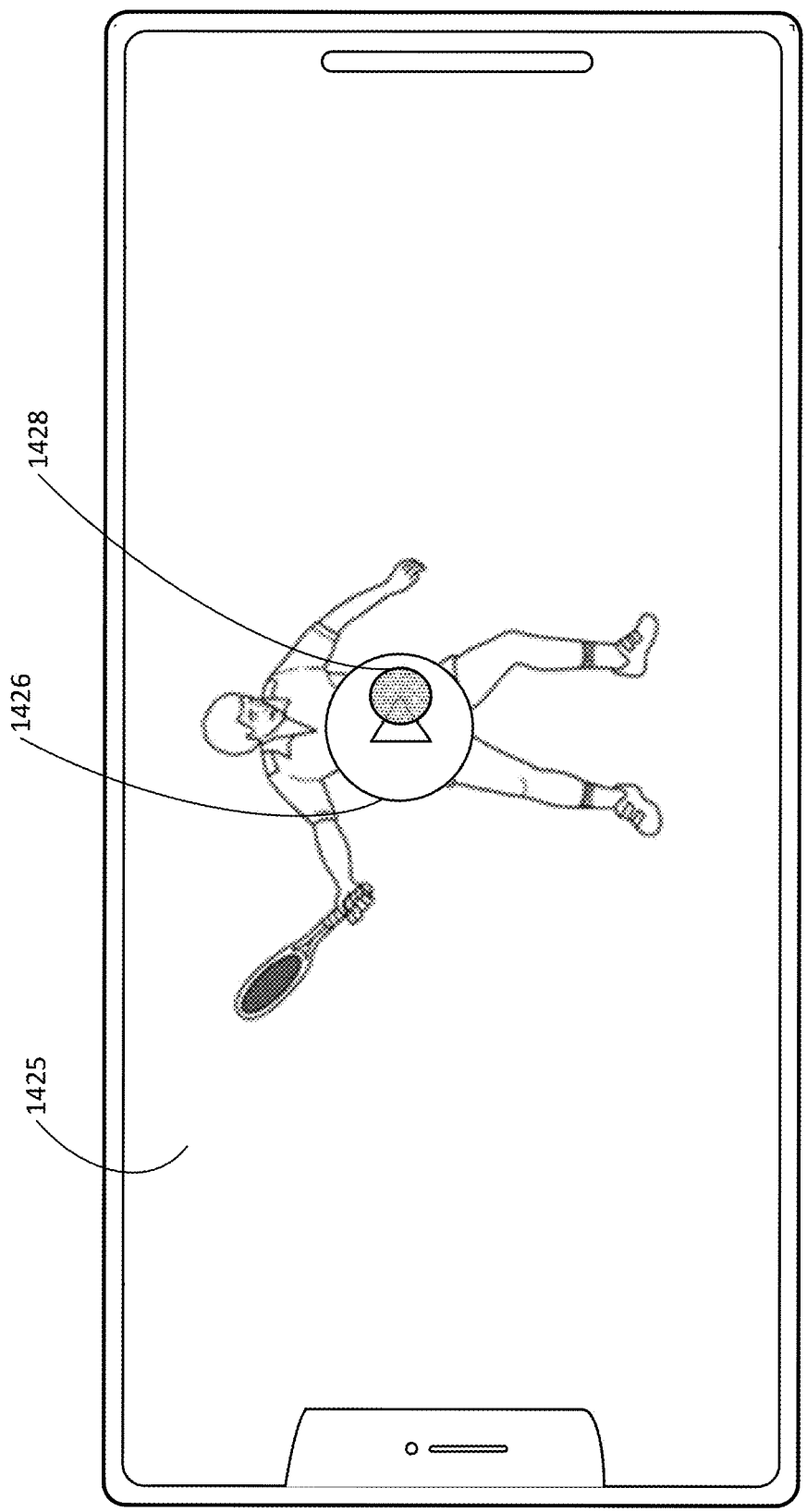
Figure 14J:
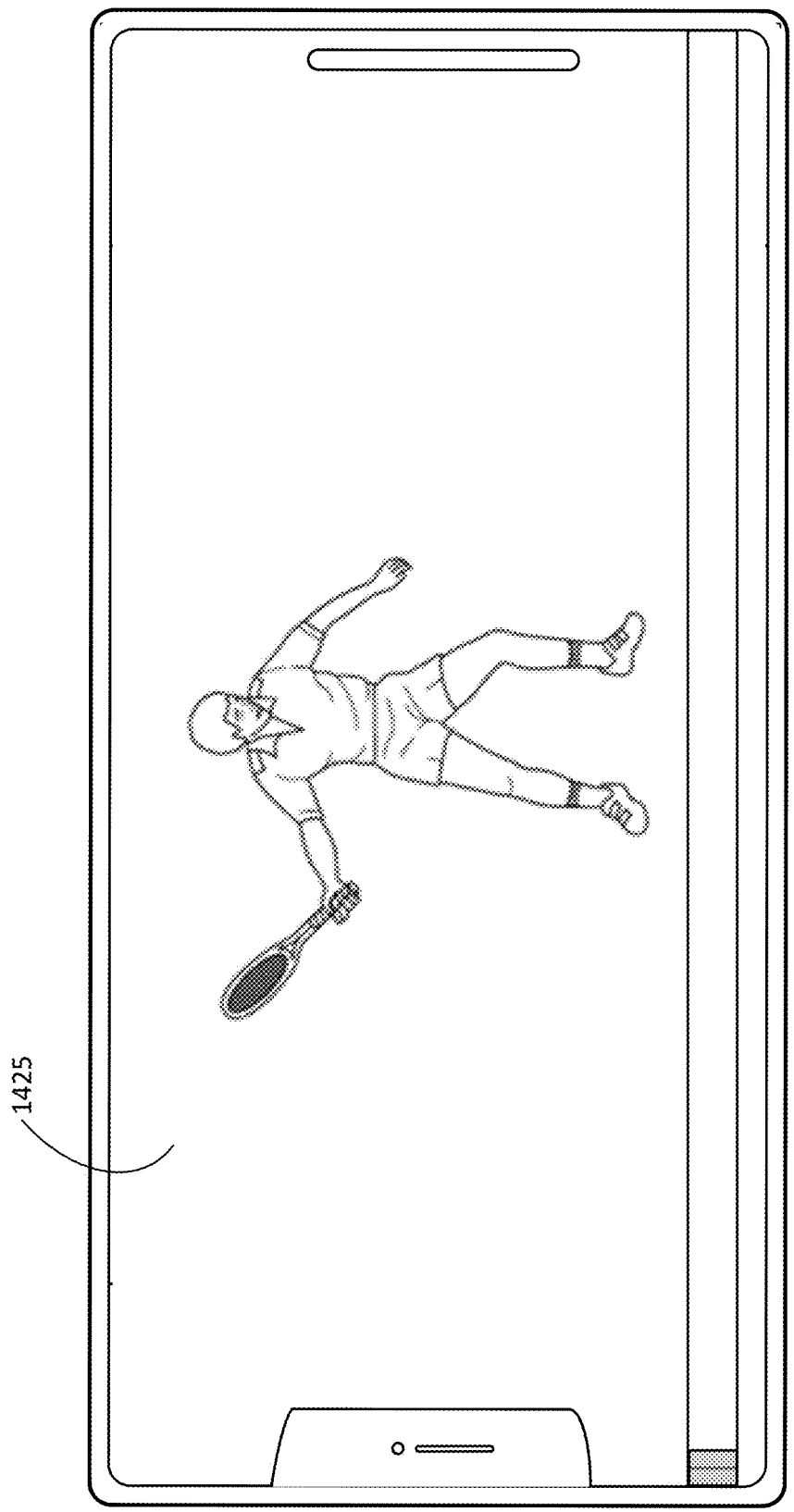
Figure 14K:
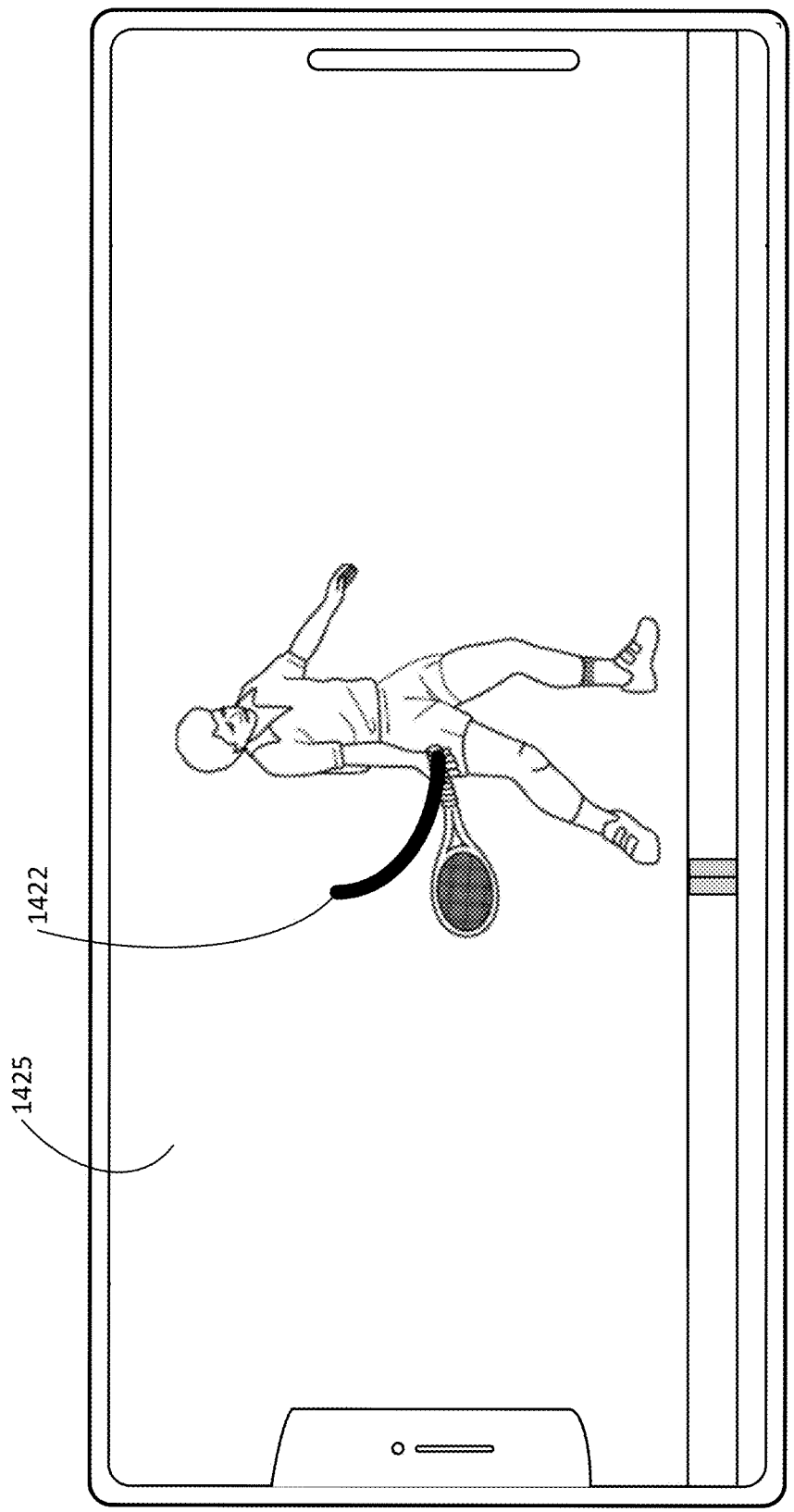
Figure 14L:
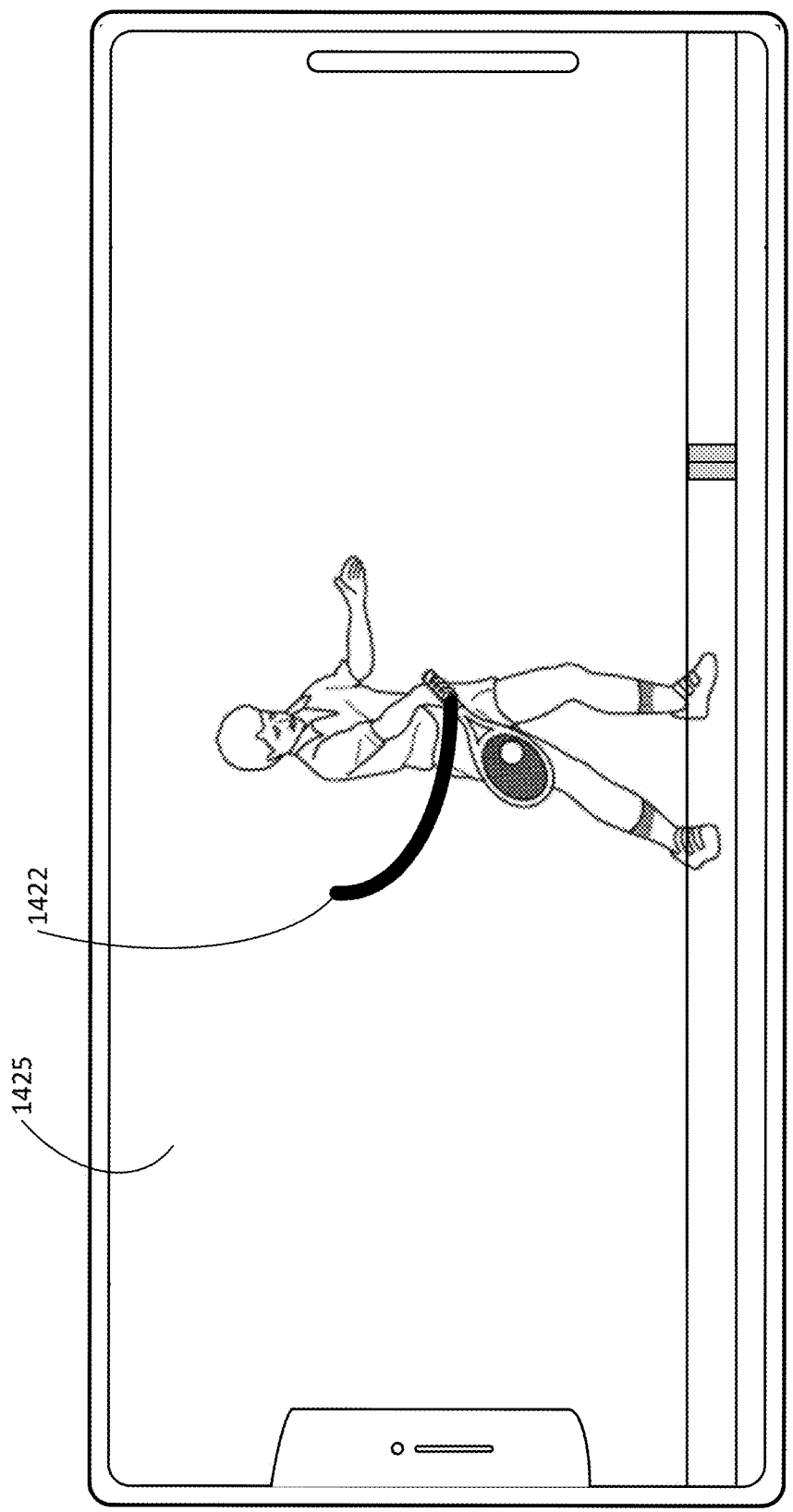
Figure 14M:
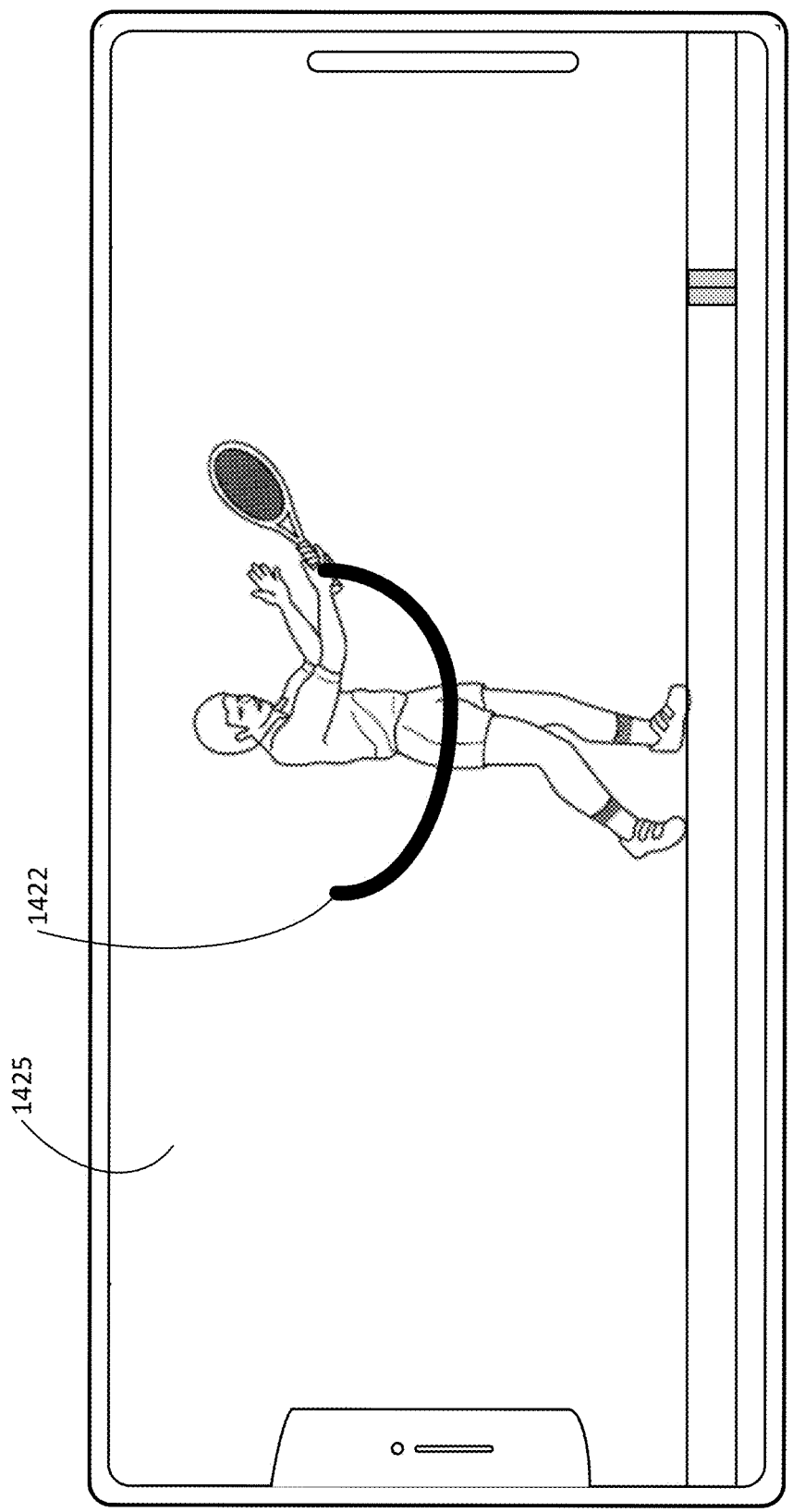

FIGS. 14H-14M illustrate a process in which the user plays back a previously-recorded video 1425 of movement of subject 1402 (e.g., the recording described with reference to FIGS. 14B-14G). In FIG. 14H, the user selects thumbnail 1416 with contact 1424. In response, a frame (e.g., an initial frame) of video 1425 is displayed on the display, as shown in FIG. 14I. Then, in FIG. 14I, the user selects playback control 1426 with contact 1428. FIGS. 14J-14M illustrate the resulting playback of previously-recorded video 1425. During the playback of recorded video 1425, annotation 1422 is displayed overlaid on the video showing the motion of the previously-selected point (e.g., the wrist of subject 1402). In particular, as shown in FIG. 14J, while an initial frame of video 1425 is displayed, prior to recorded movement of the selected point, annotation 1422 is not displayed. As playback of video 1425 progresses as shown in FIG. 14K, annotation 1422 is displayed over the path of movement of the selected point on subject 1402. Similarly, additional portions of annotation 1422 are displayed as playback of video 1425 progresses to show further movement of the selected point, as shown in FIGS. 14L and 14M.

Figure 14N:
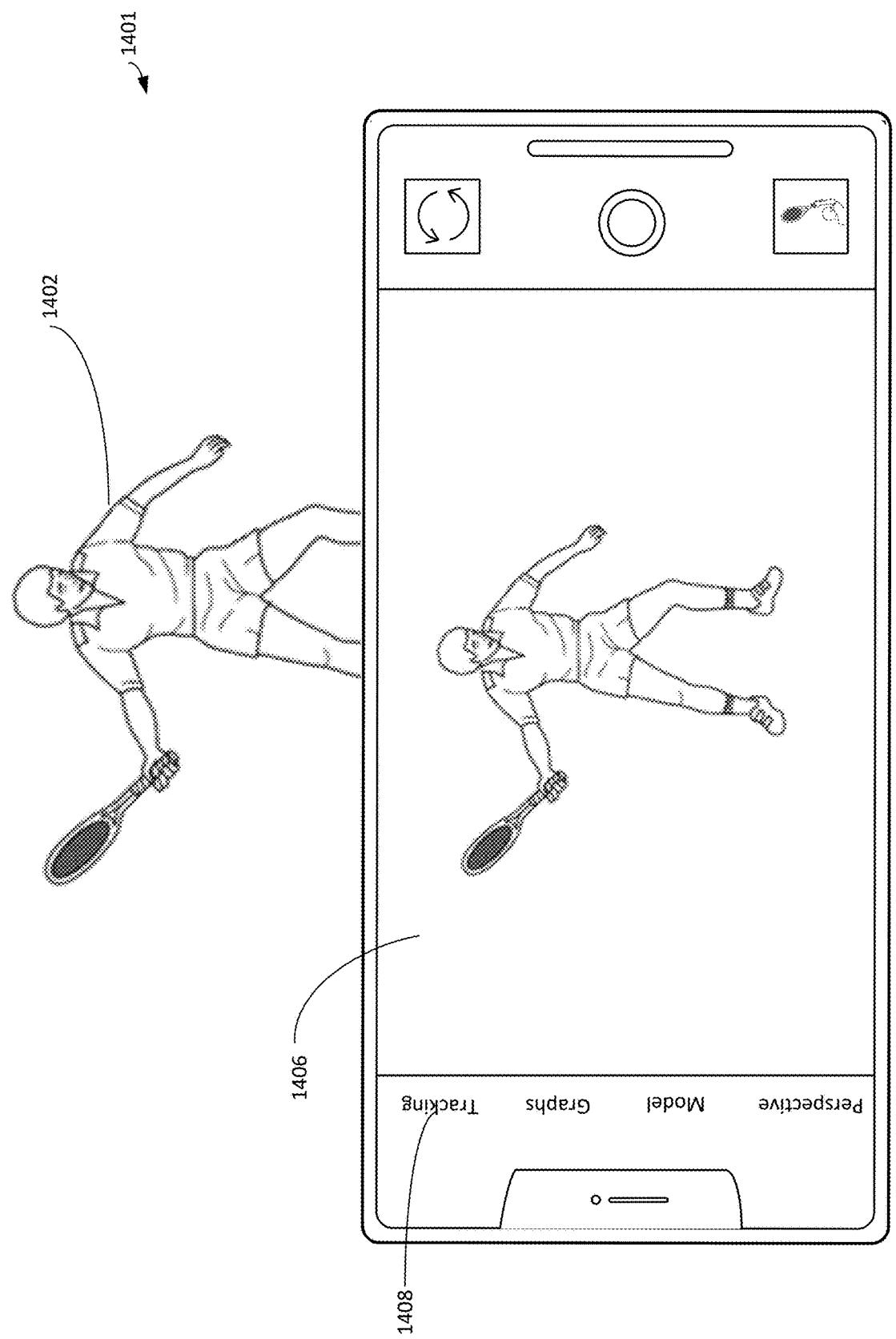
Figure 14O:
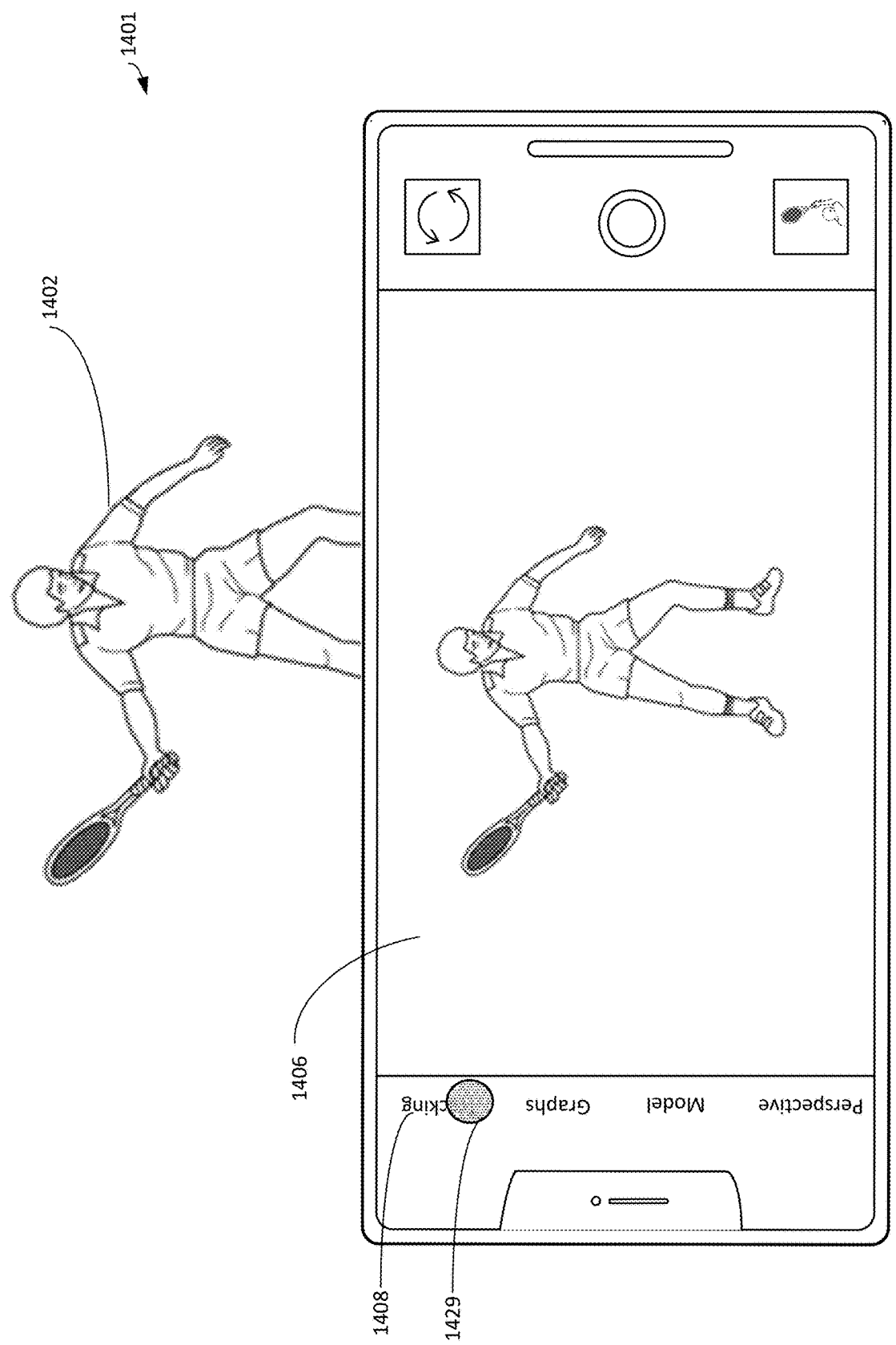
Figure 14P:
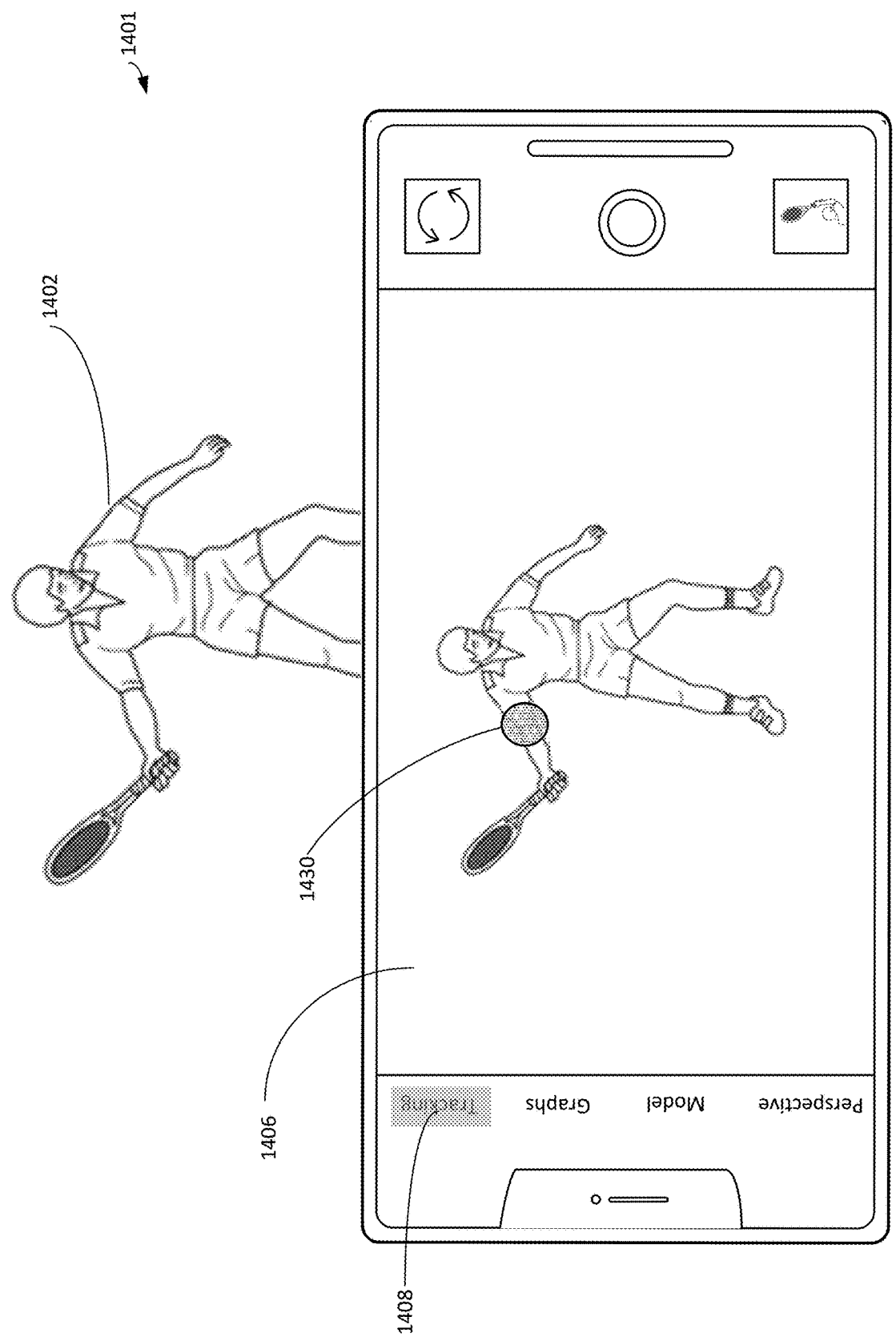
Figure 14Q:
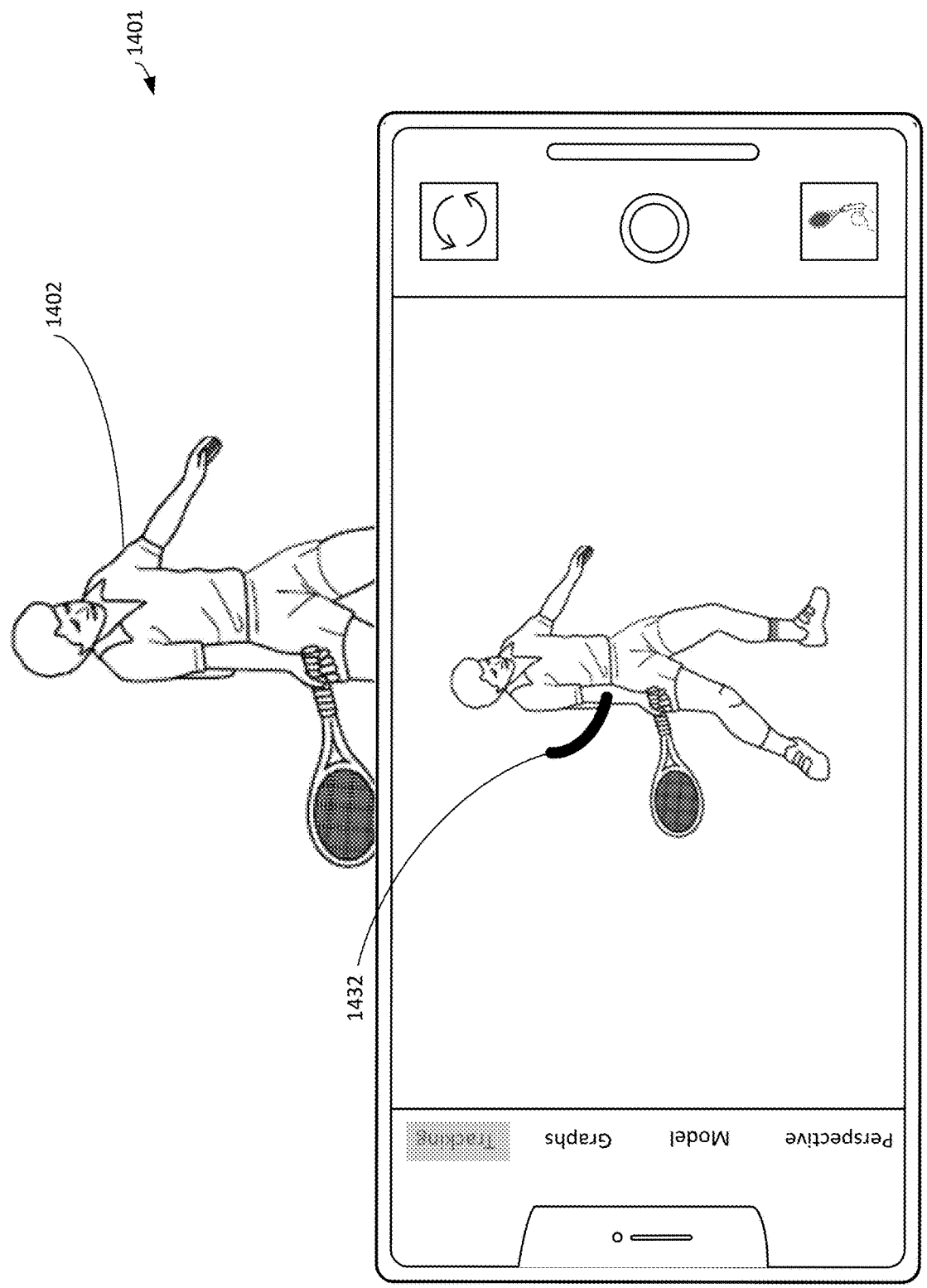
Figure 14R:
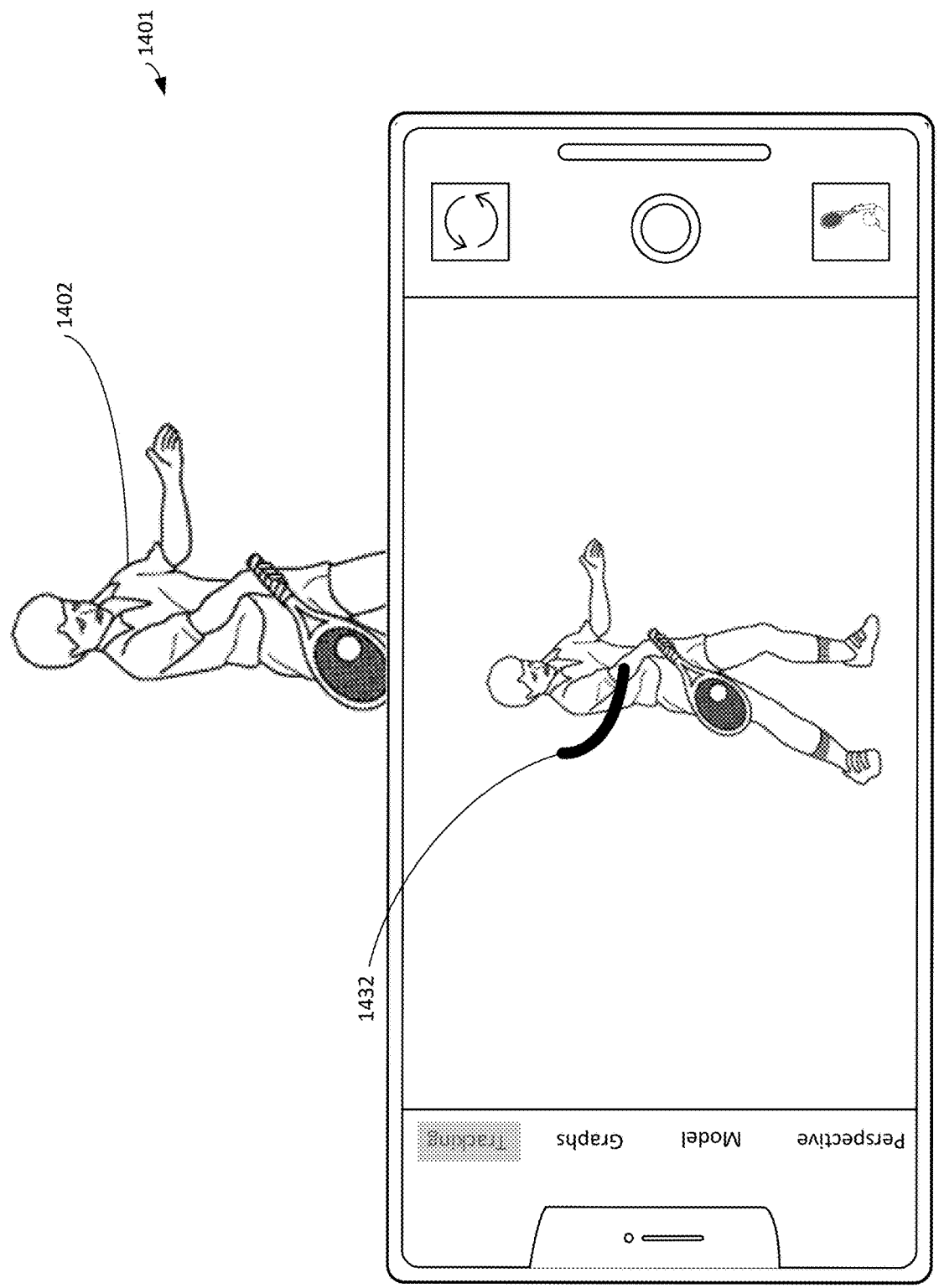
Figure 14S:
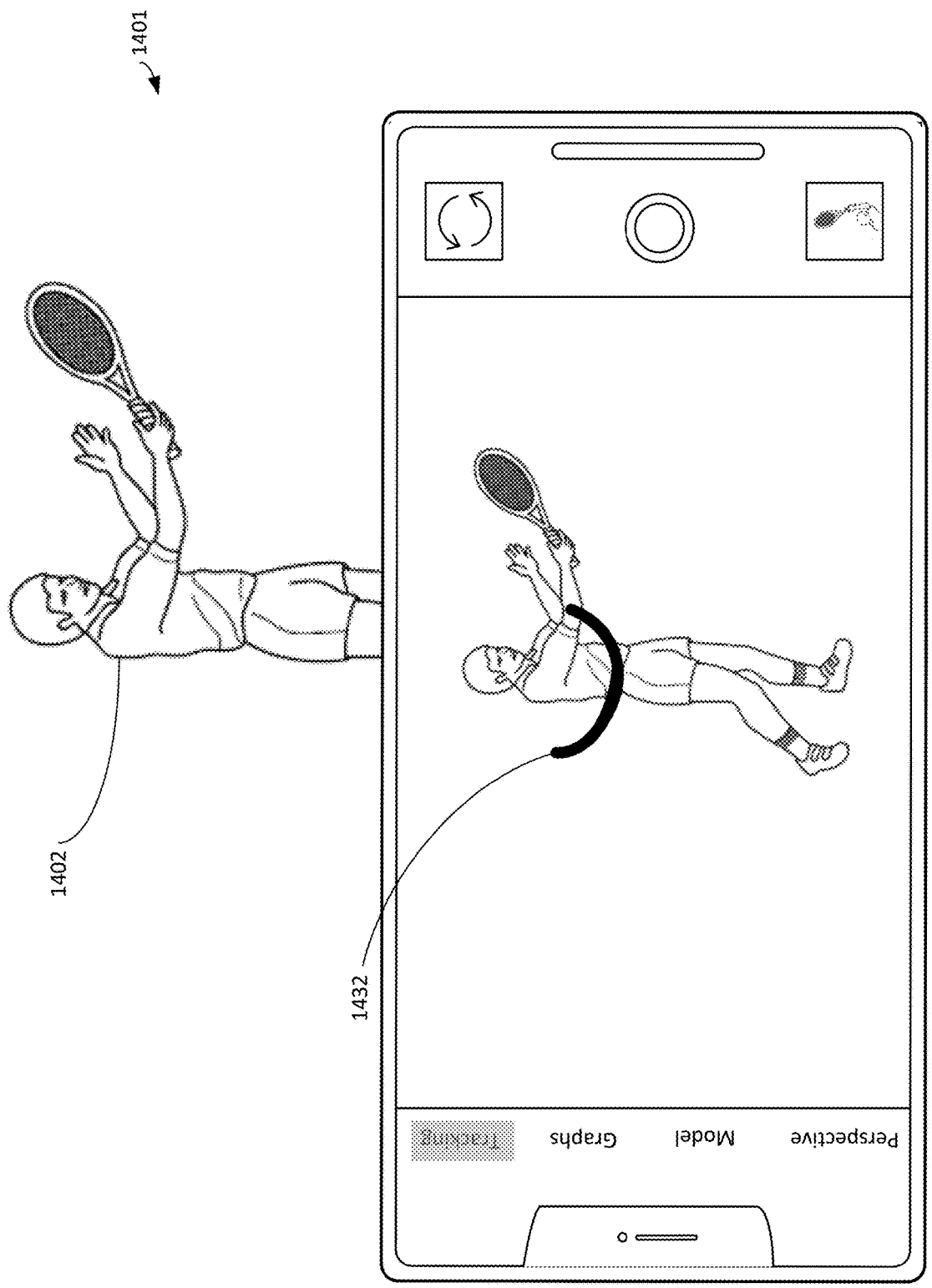
Figure 15A:
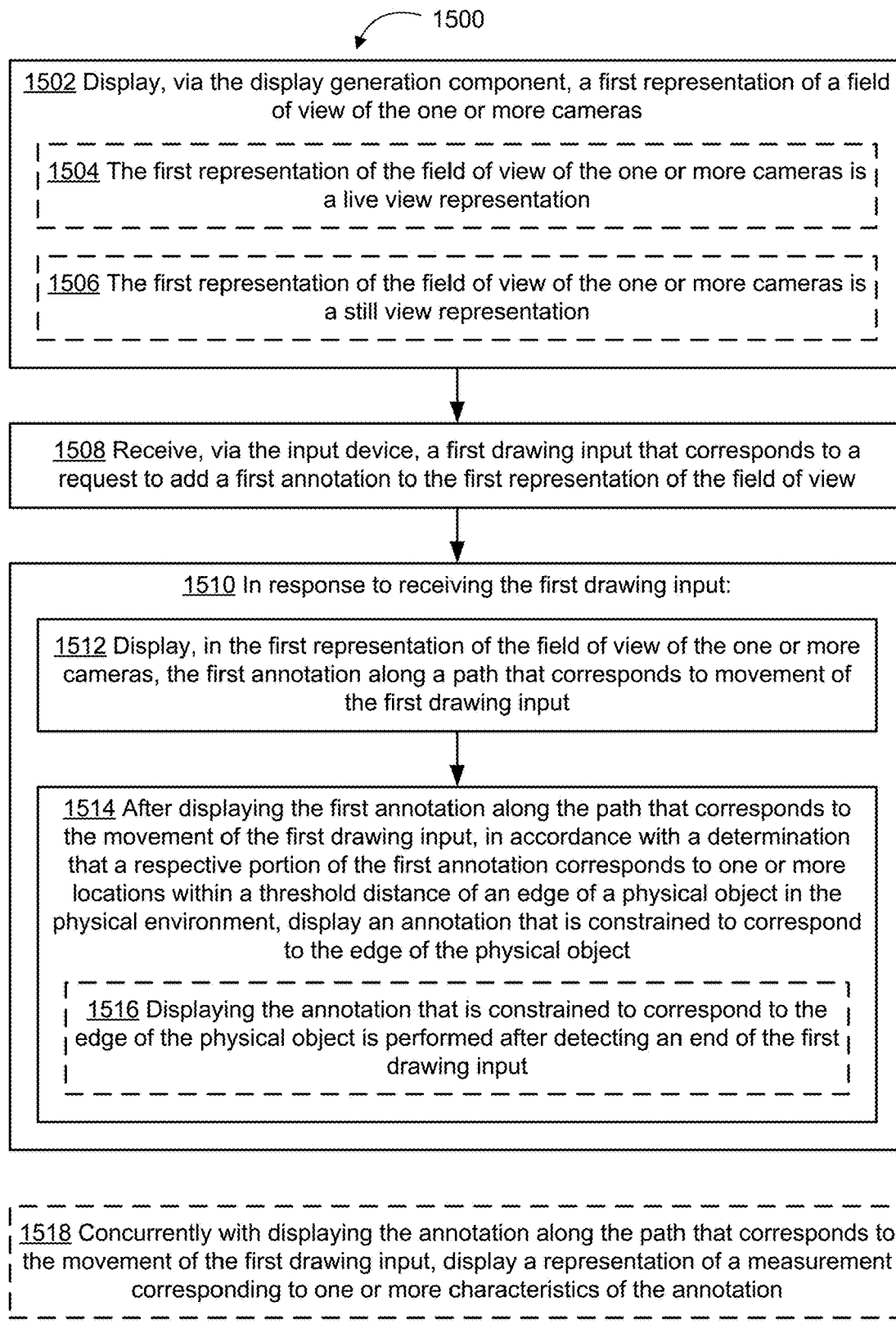
Figure 16A:
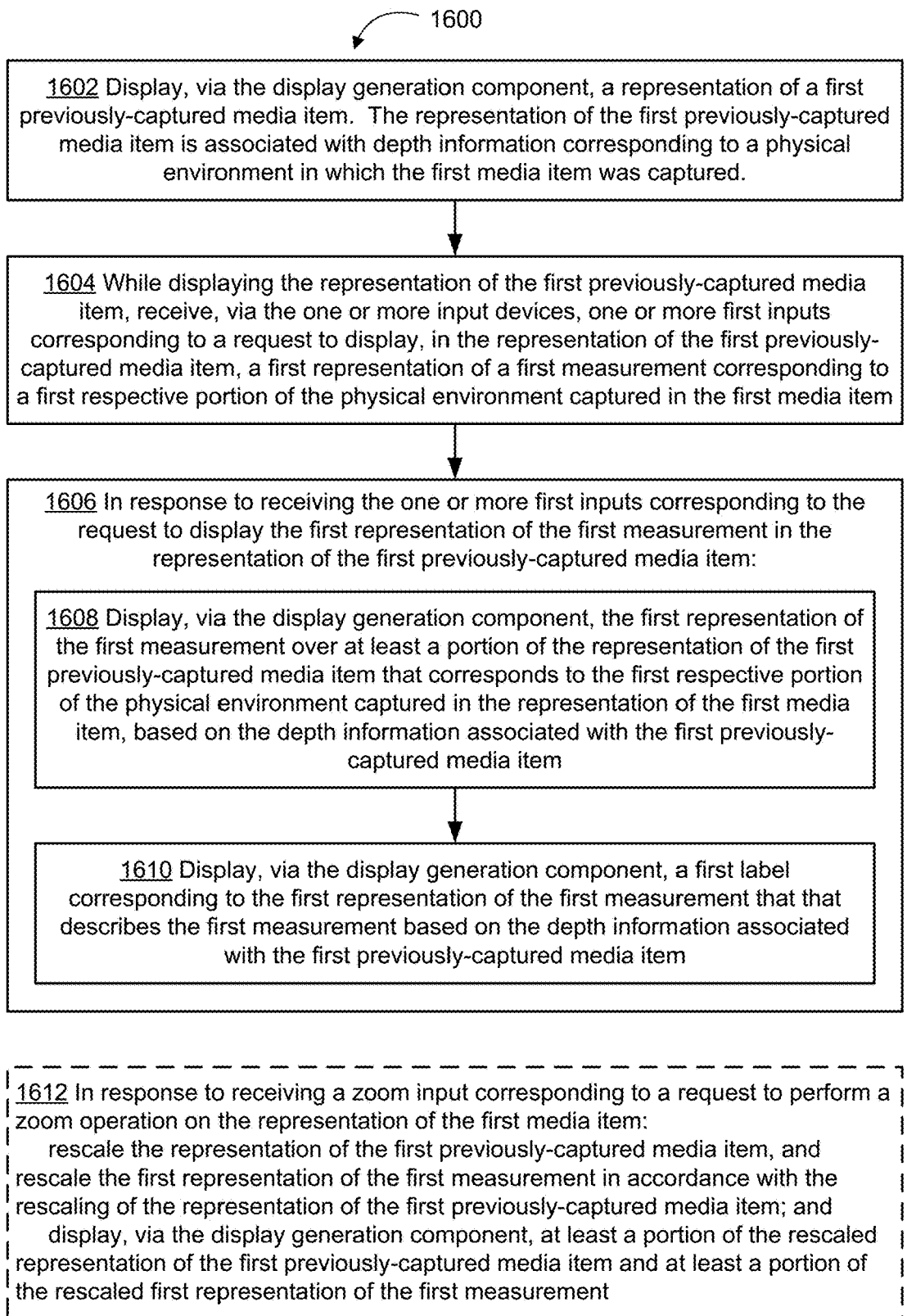
Figure 17A:
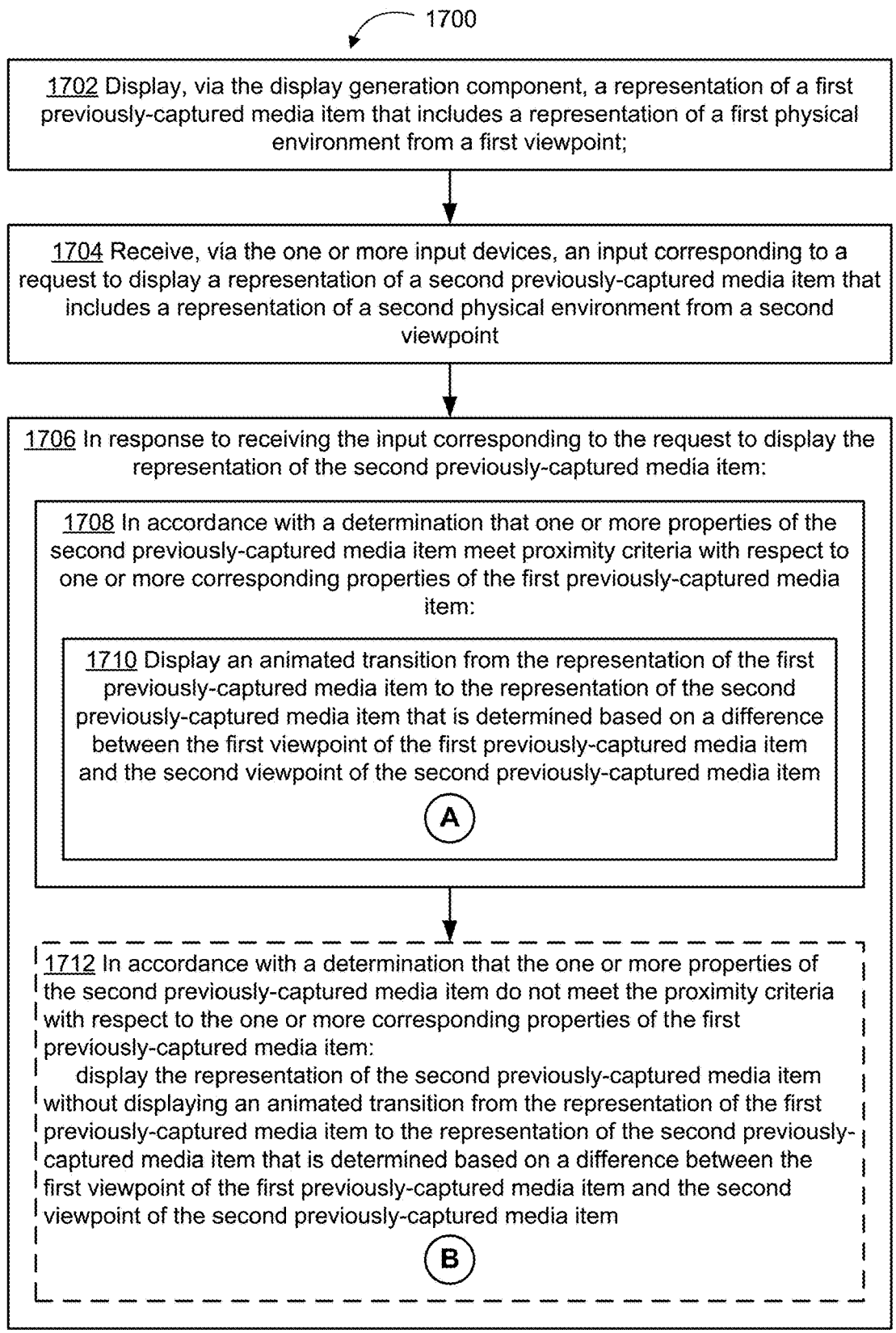

FIGS. 14N-14S illustrate a process for viewing motion tracking information for a live view representation of physical environment 1401 and subject 1402 therein. FIG. 14N is the same as FIG. 14A. FIG. 14O illustrates selection of tracking control 1408 by contact 1429; in response, movement tracking is enabled, as indicated by tracking control 1408 being highlighted as shown in FIG. 14P. In addition, as shown in FIG. 14P, the user selects a point in representation 1406 corresponding to a point on subject 1402, different from the point selected in FIG. 14D, using contact 1430 (e.g., the user selects the elbow of subject 1402 as represented in representation 1406). In FIGS. 14Q-14S, as subject 1402 moves, annotation 1432 is displayed over the representation of subject 1402 in representation 1406 to track the movement of the selected point.

Figure 14T:
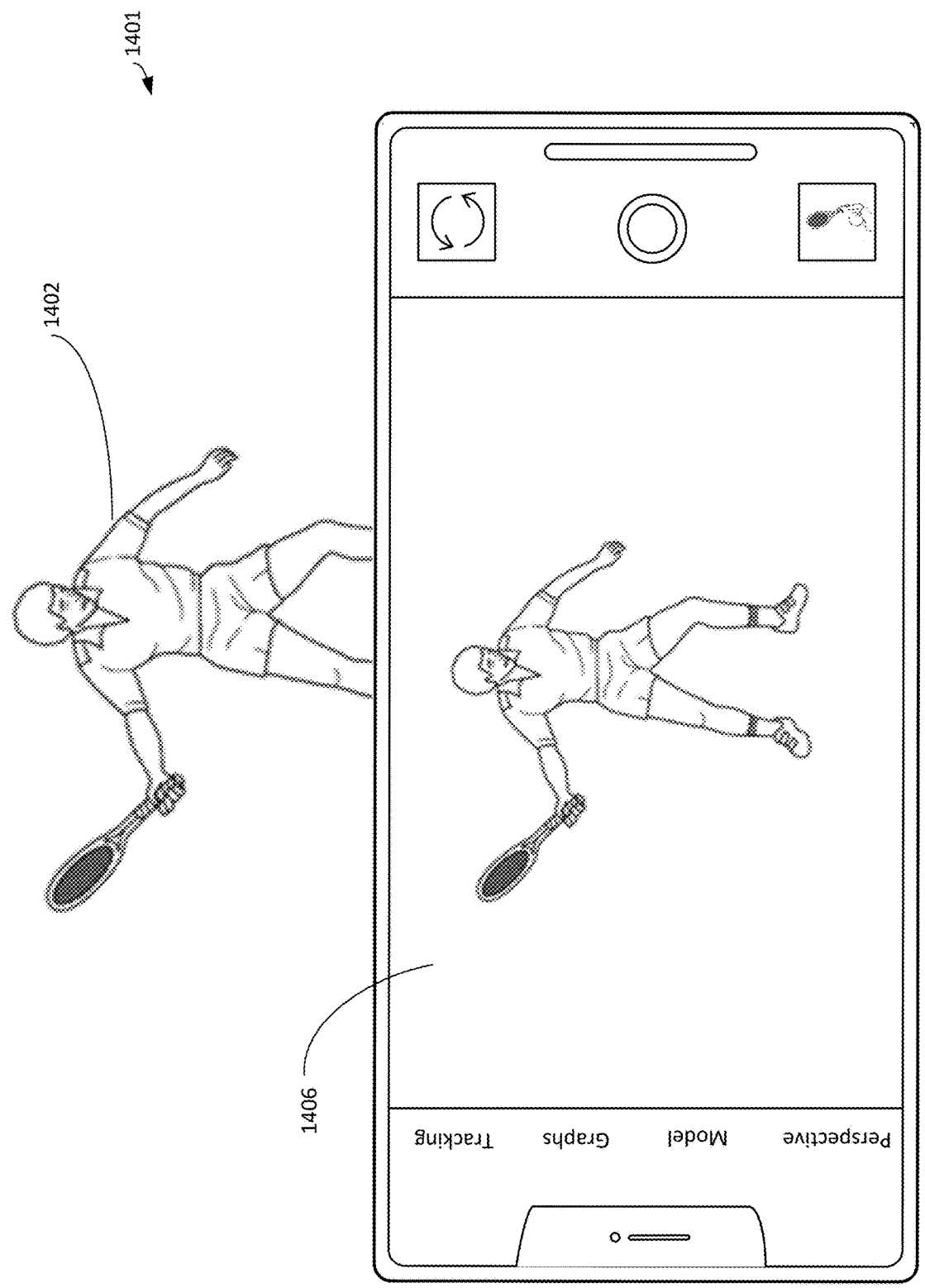
Figure 14U:
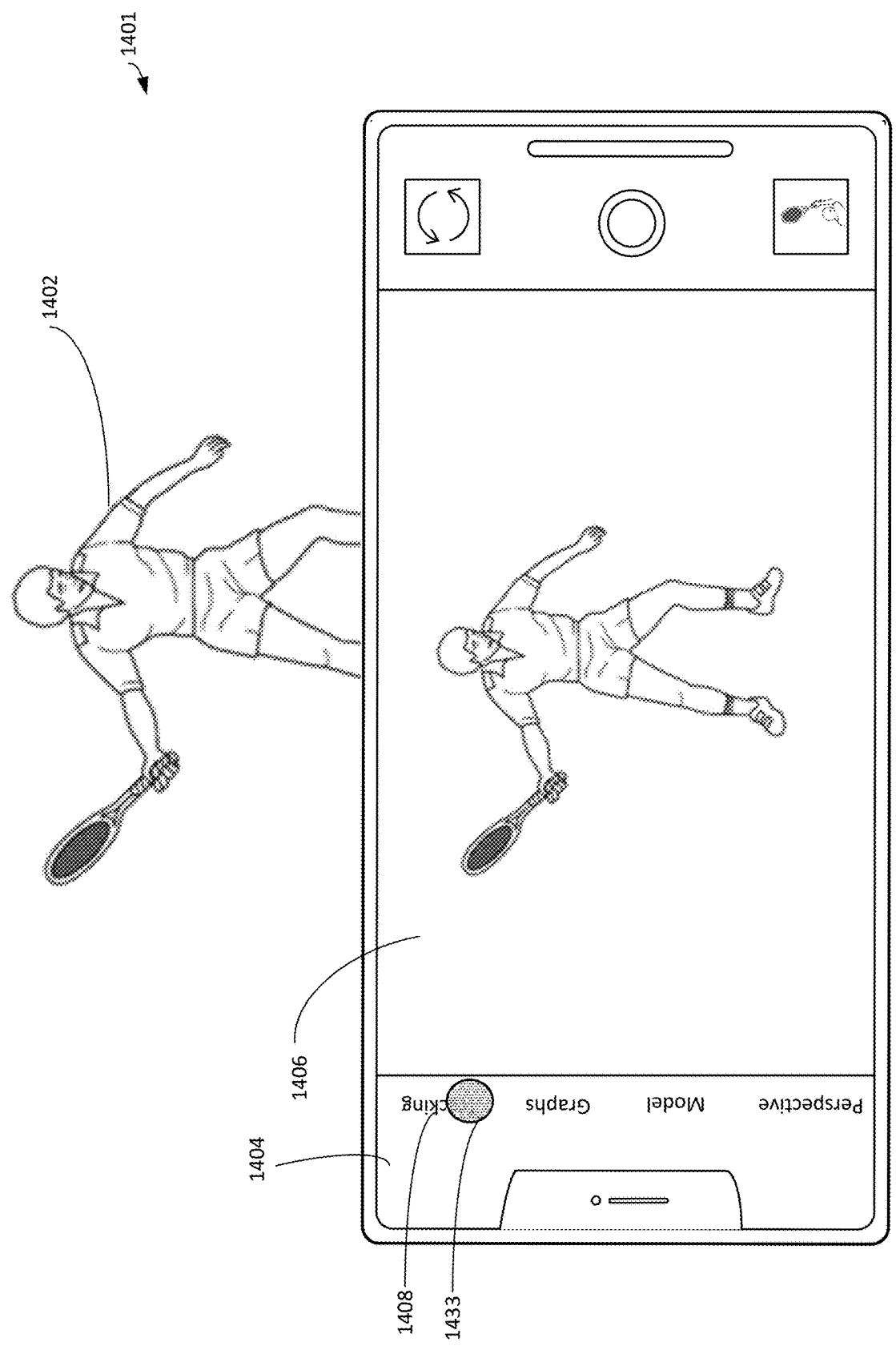
Figure 14V:
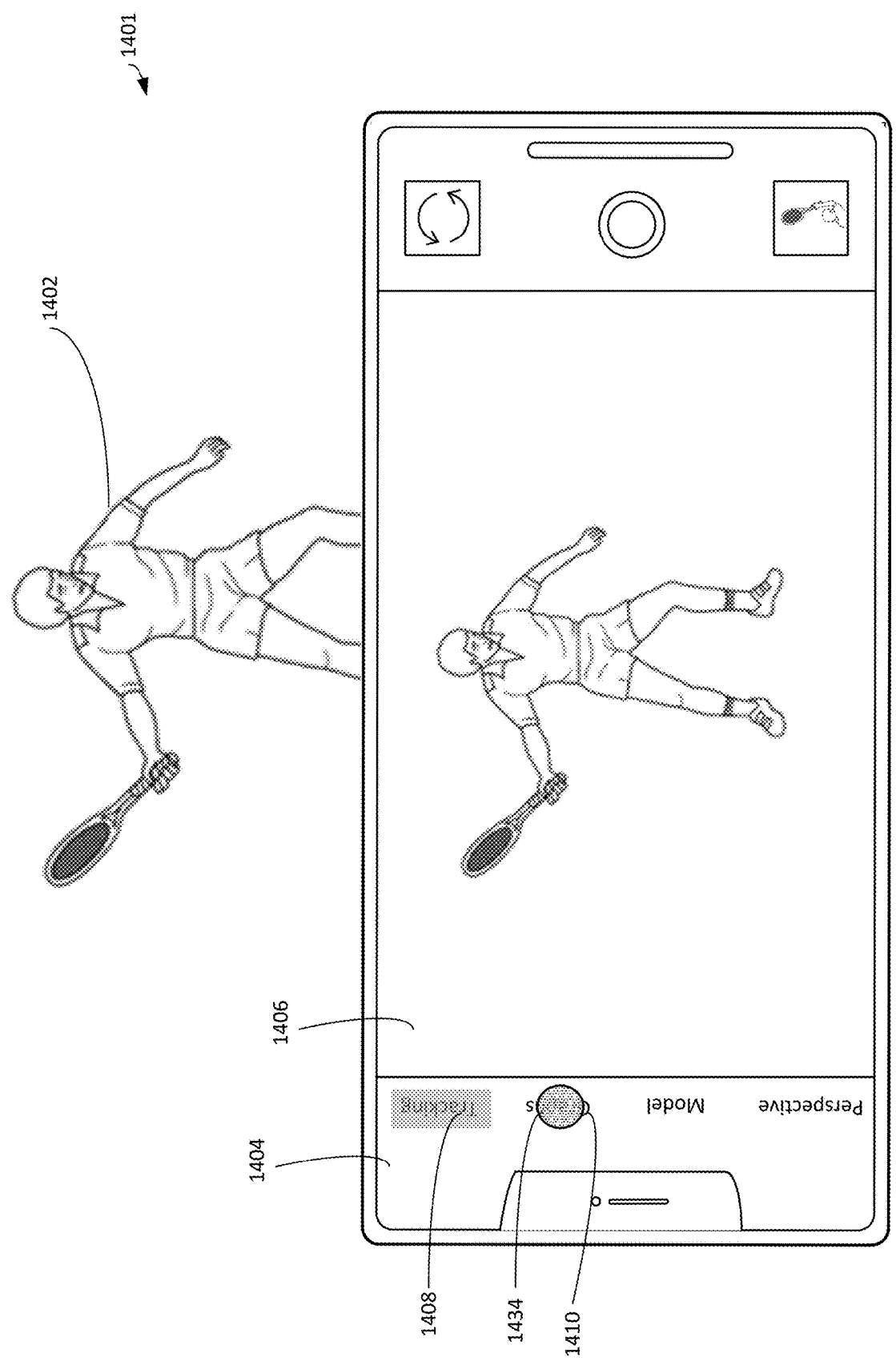
Figure 14W:
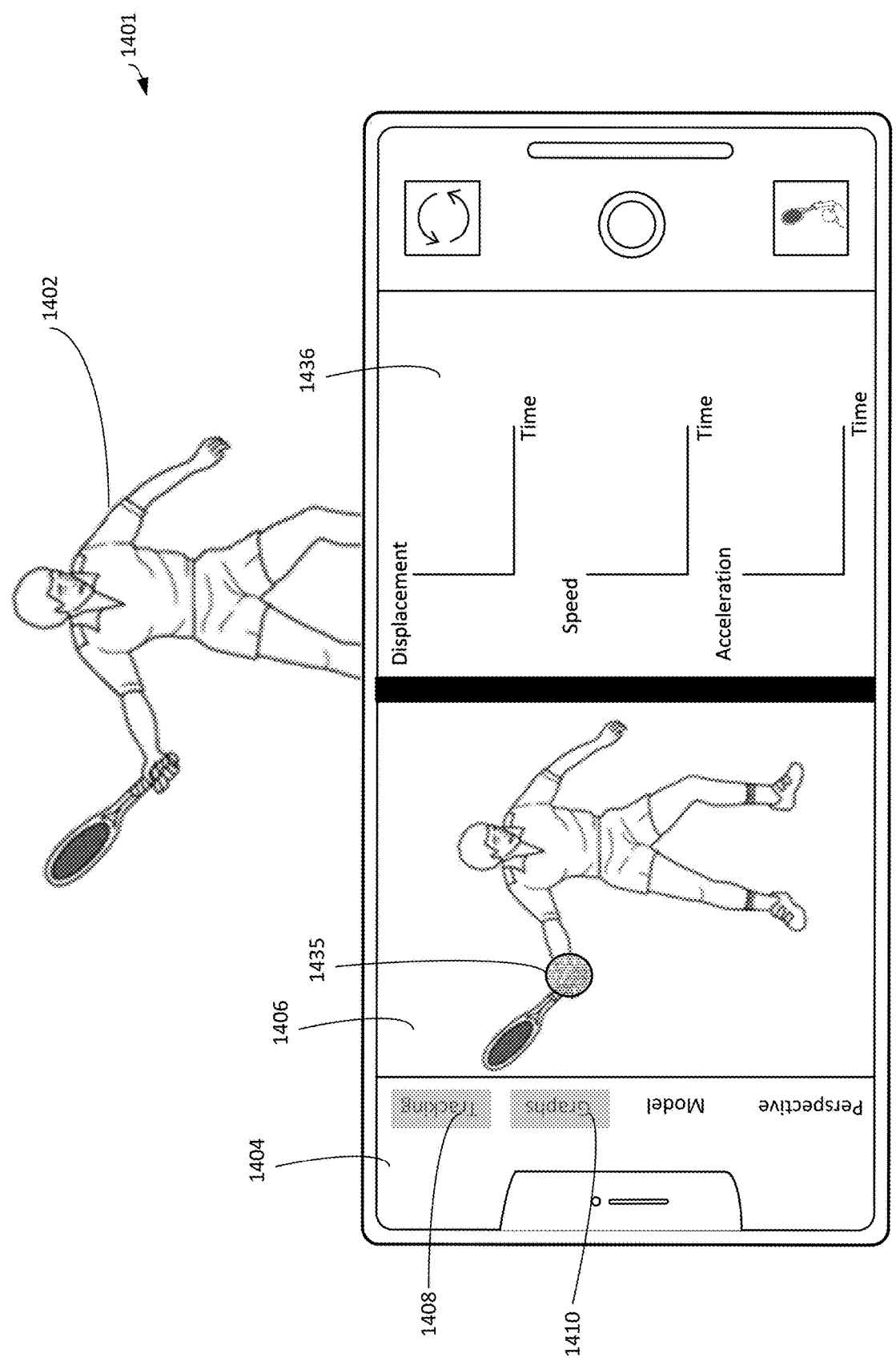
Figure 14X:
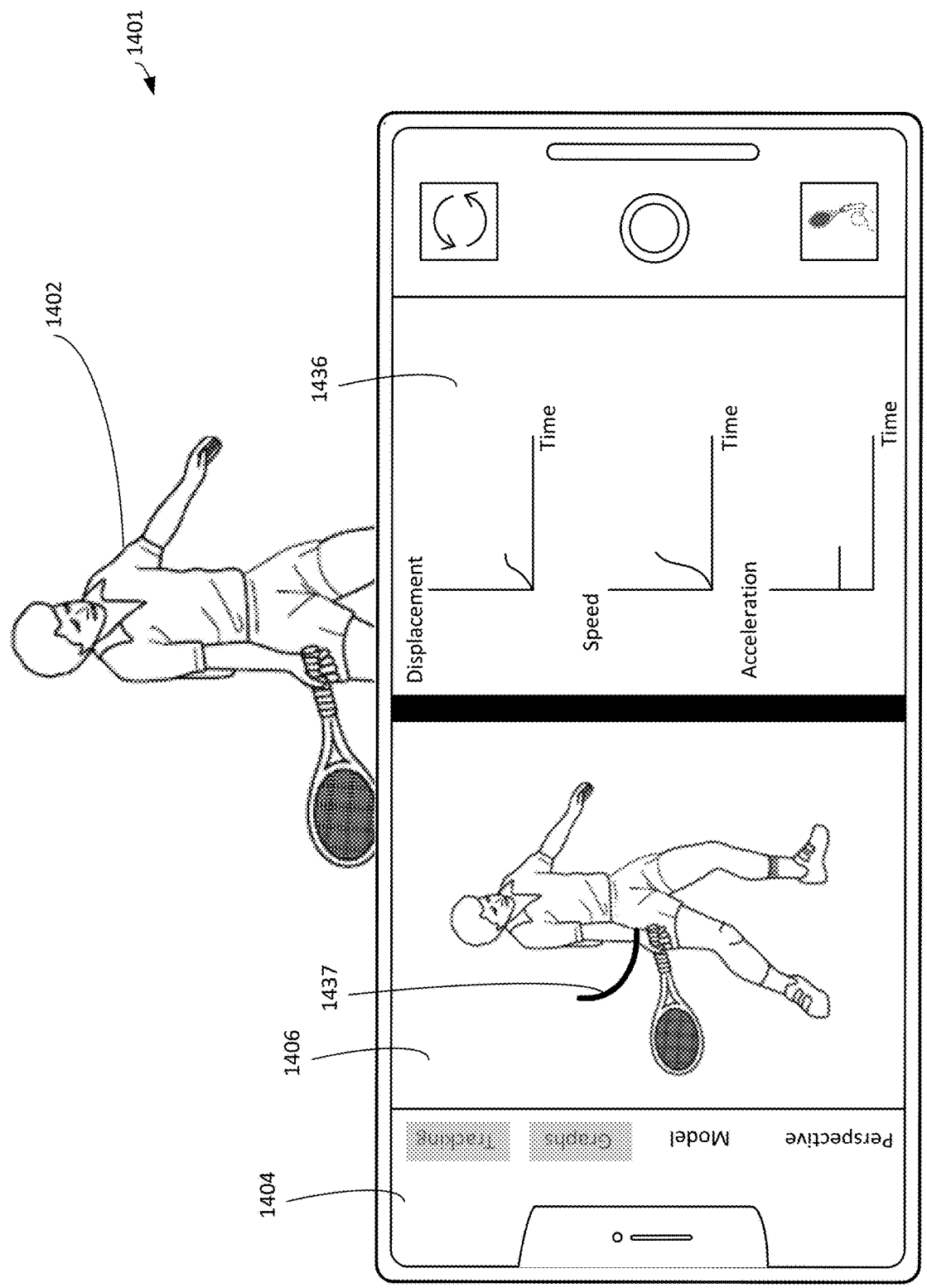
Figure 14Y:
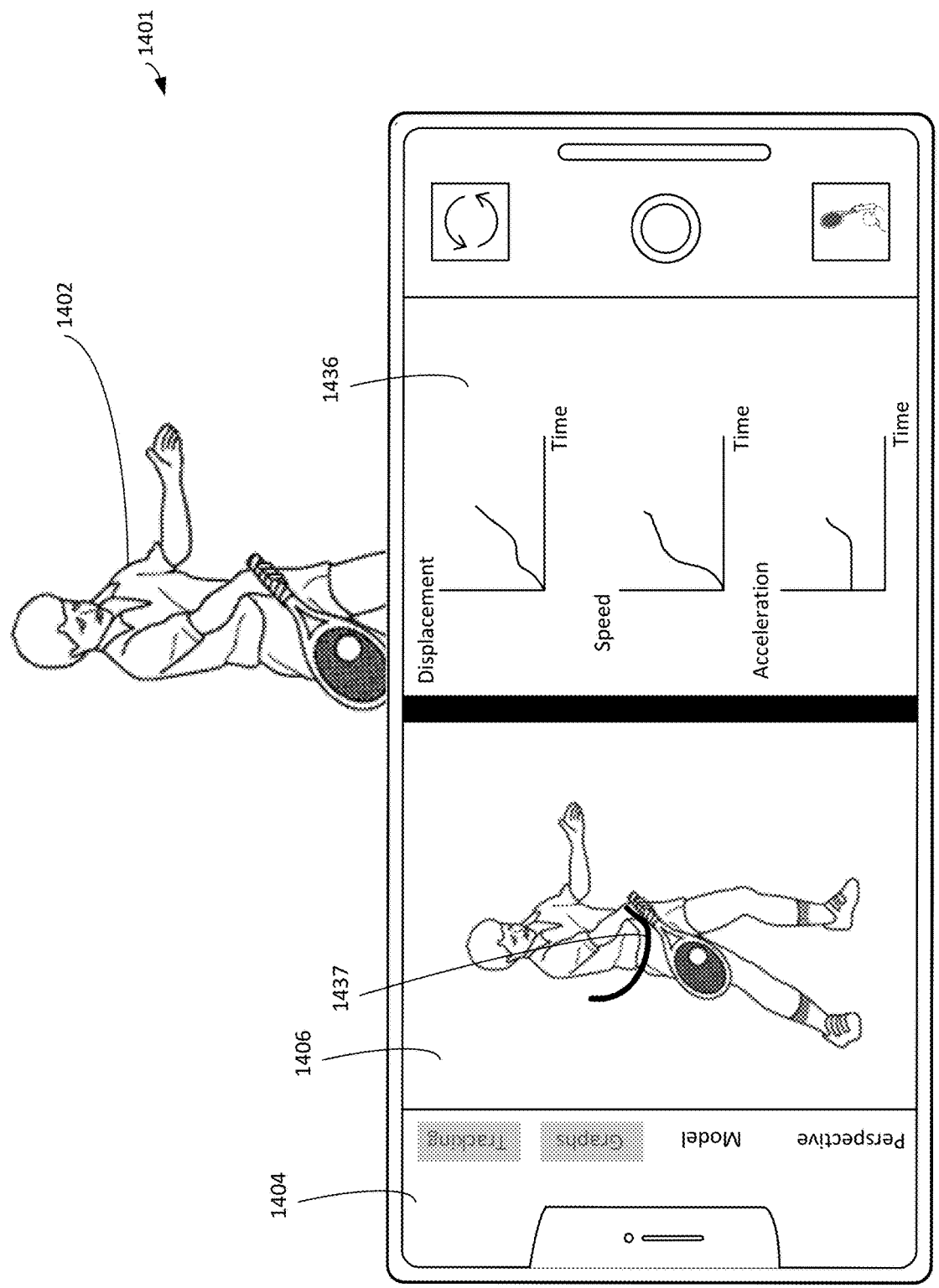
Figure 14Z:
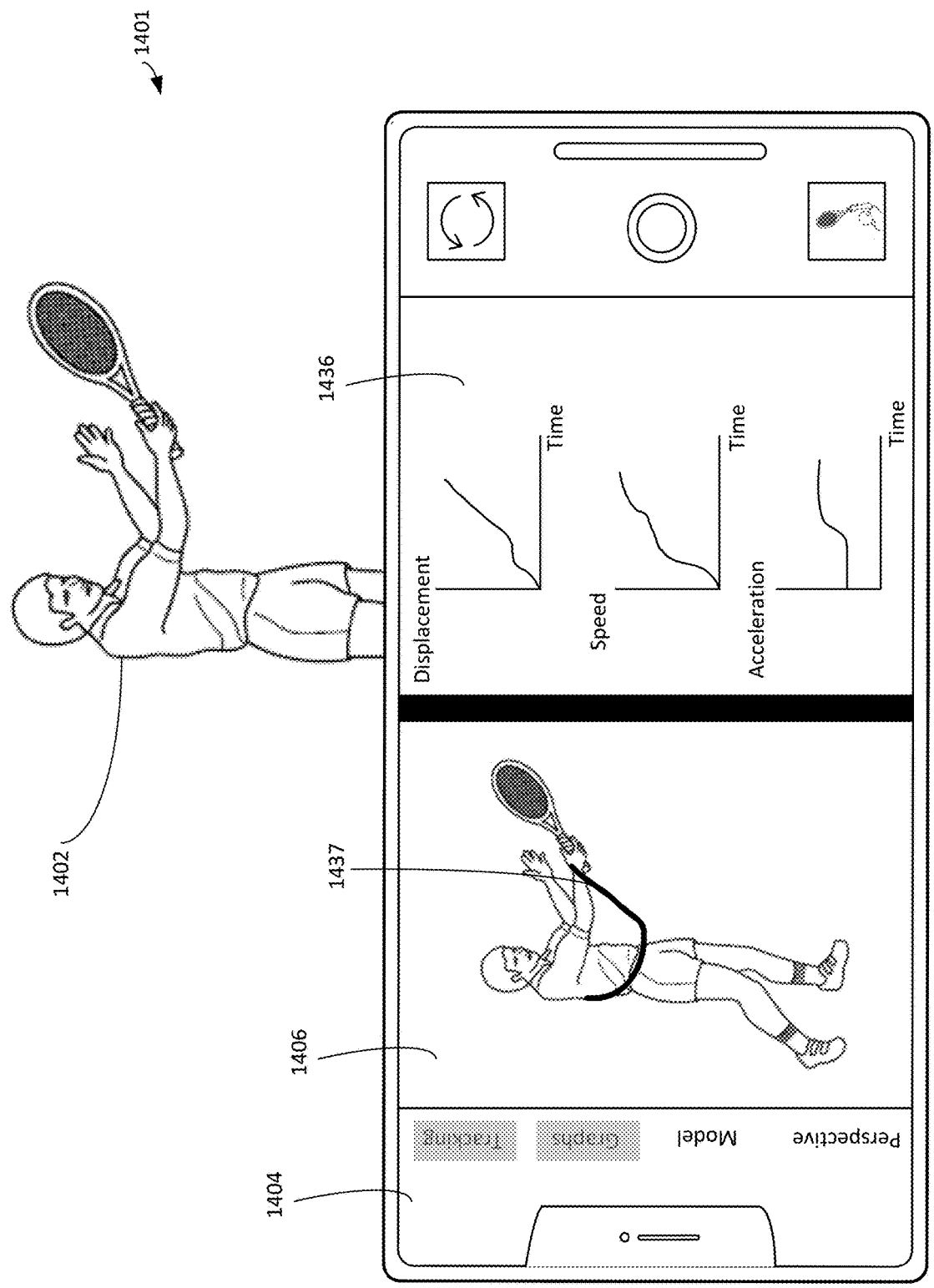
Figure 14A:
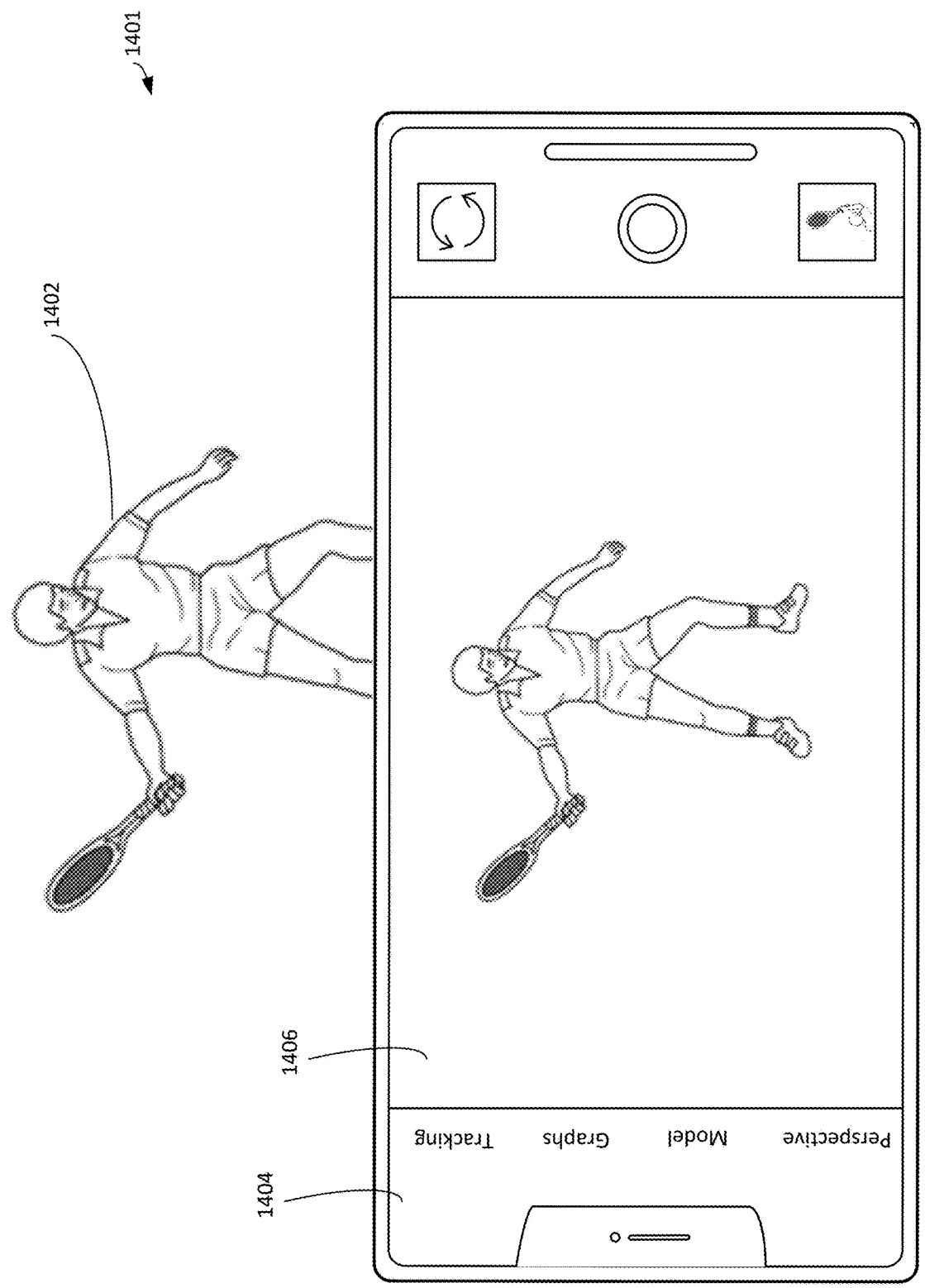
Figure 14B:
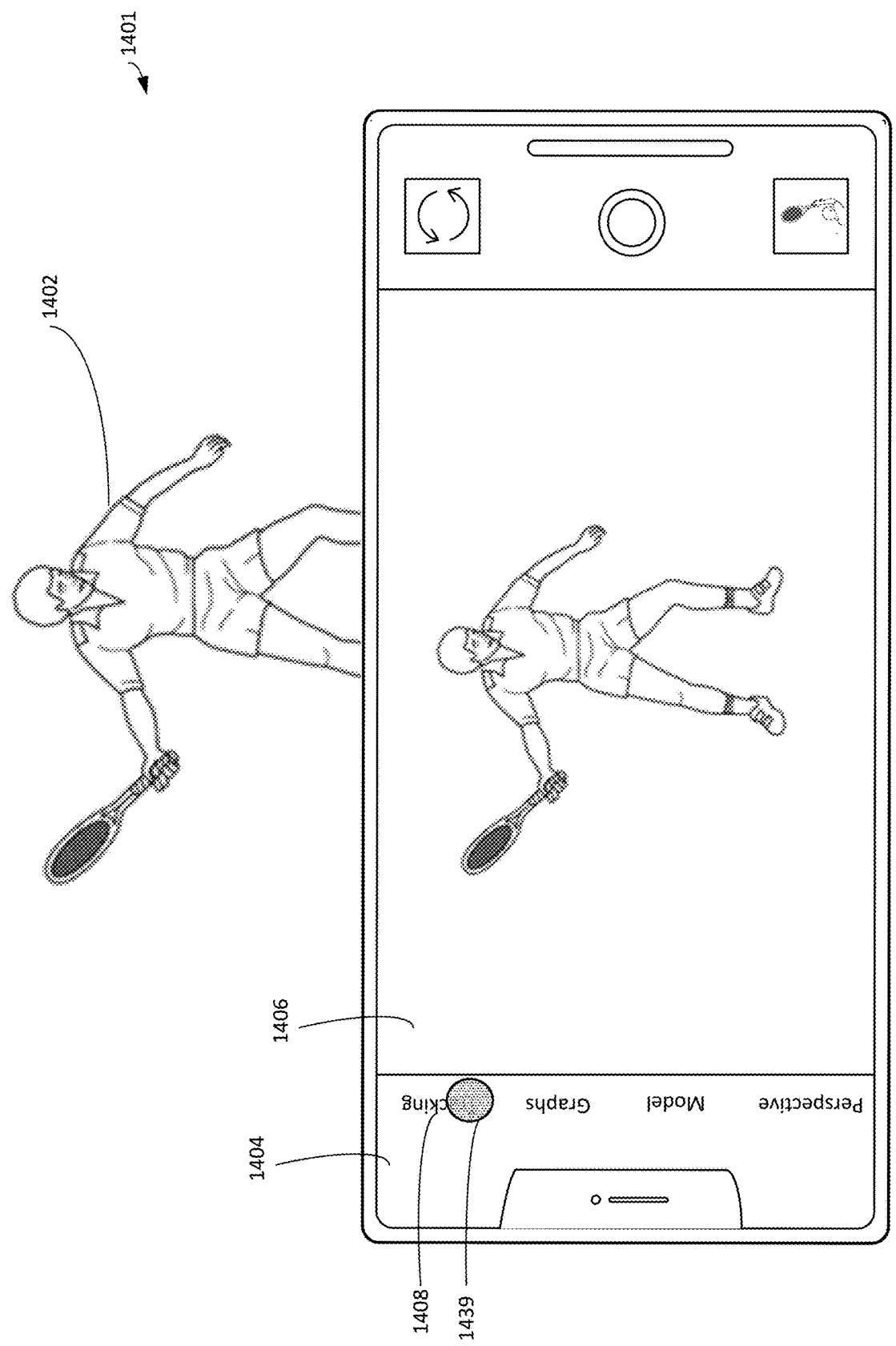
Figure 14C:
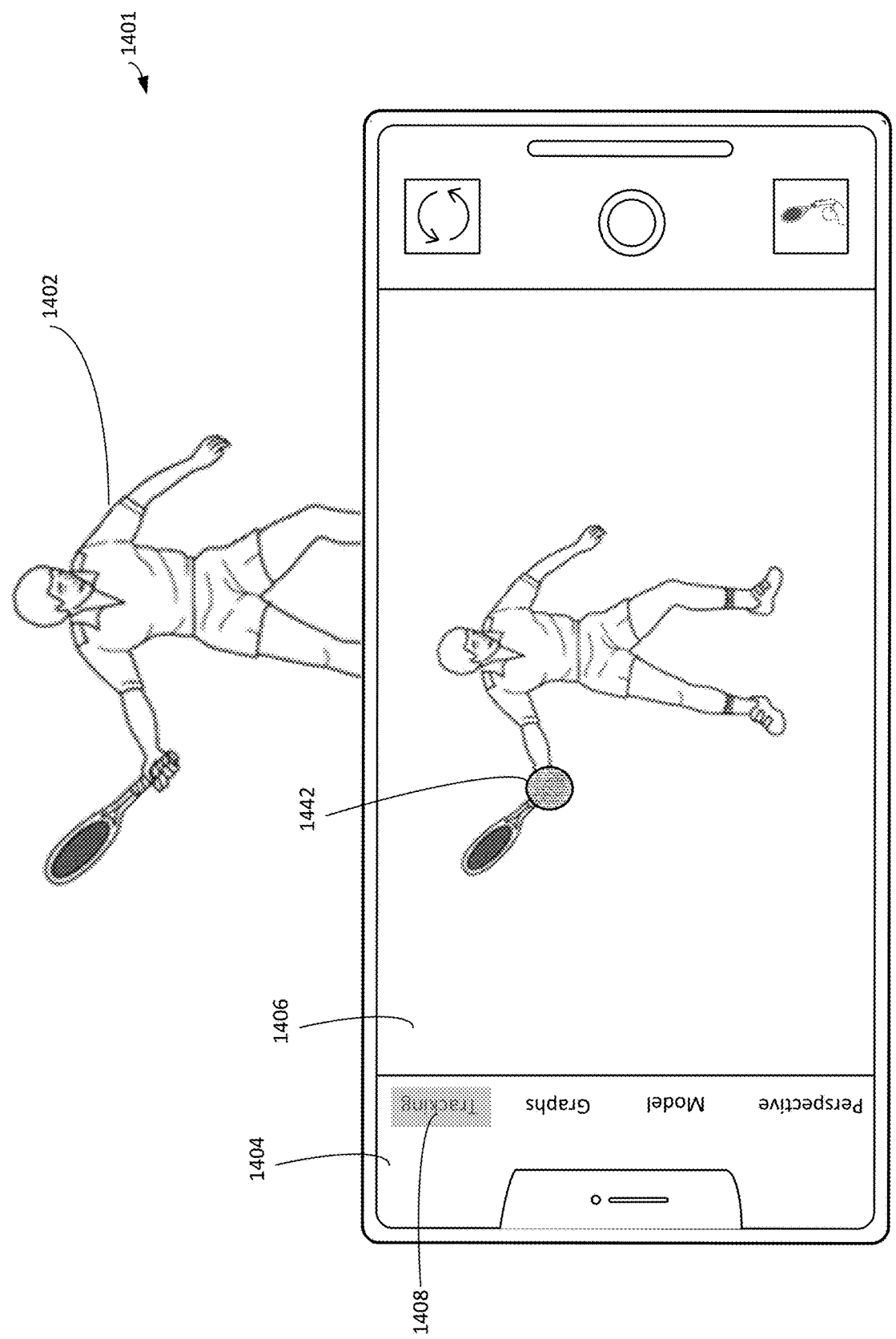
Figure 14D:
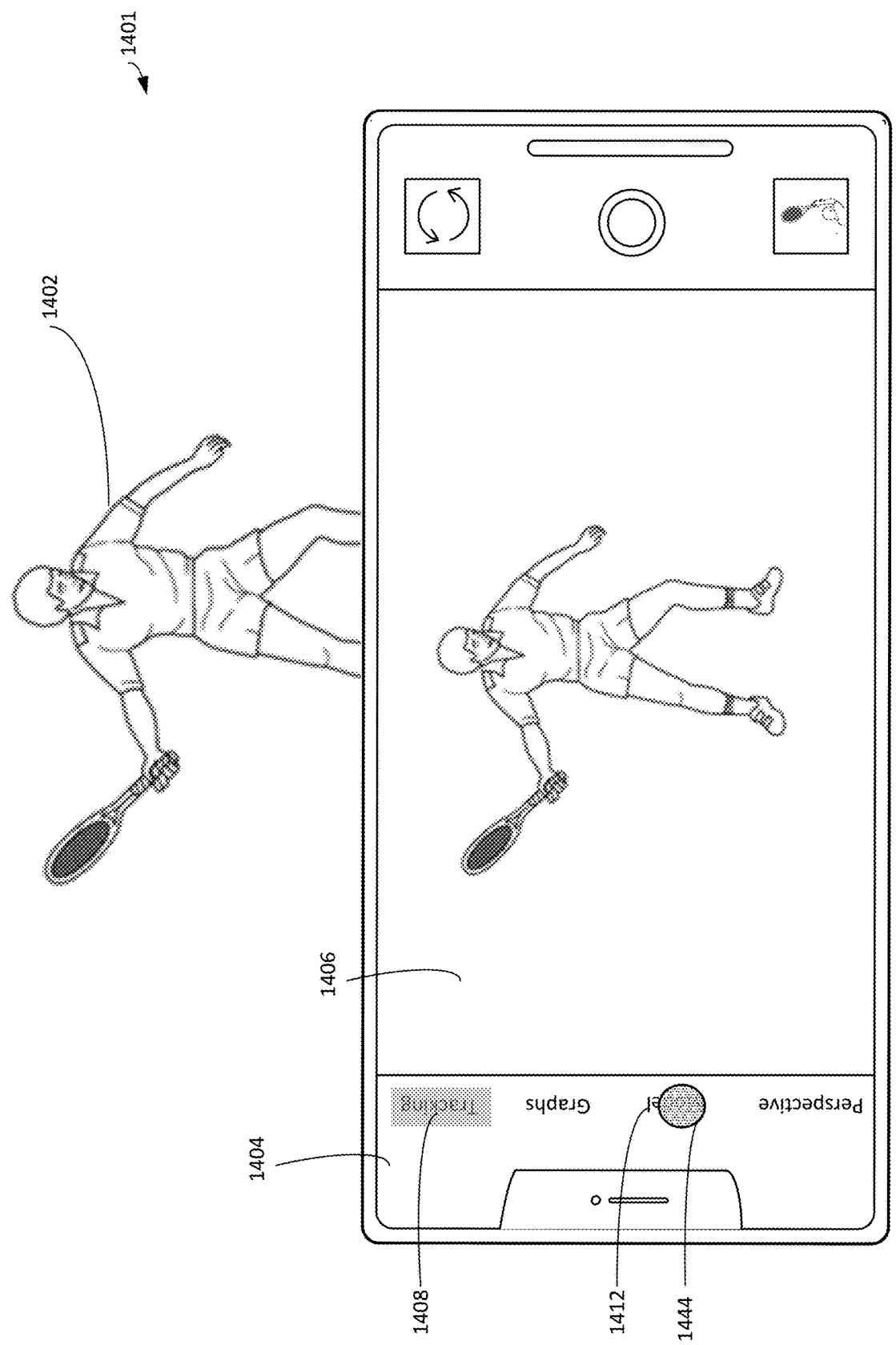
Figure 14E:
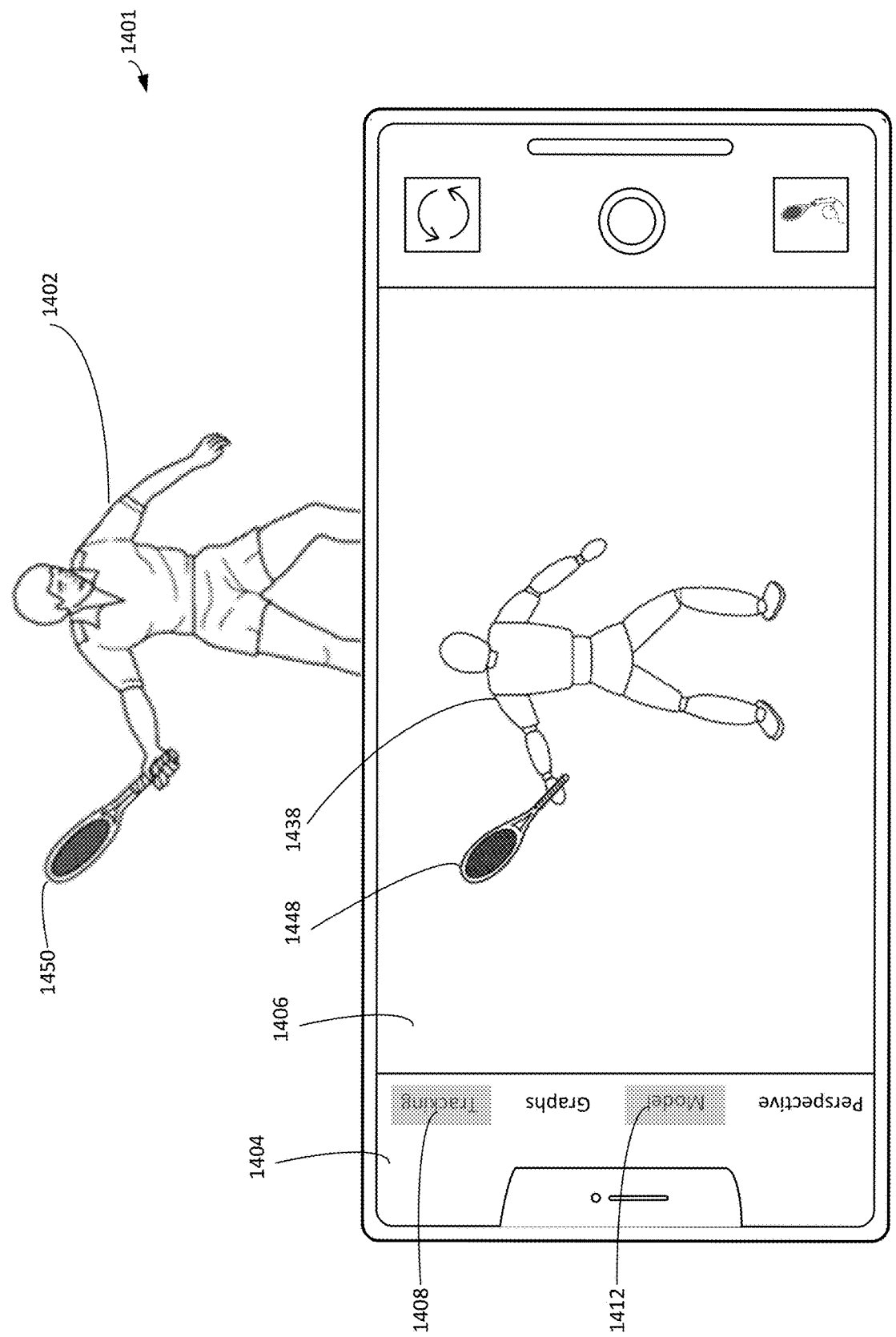
Figure 14F:
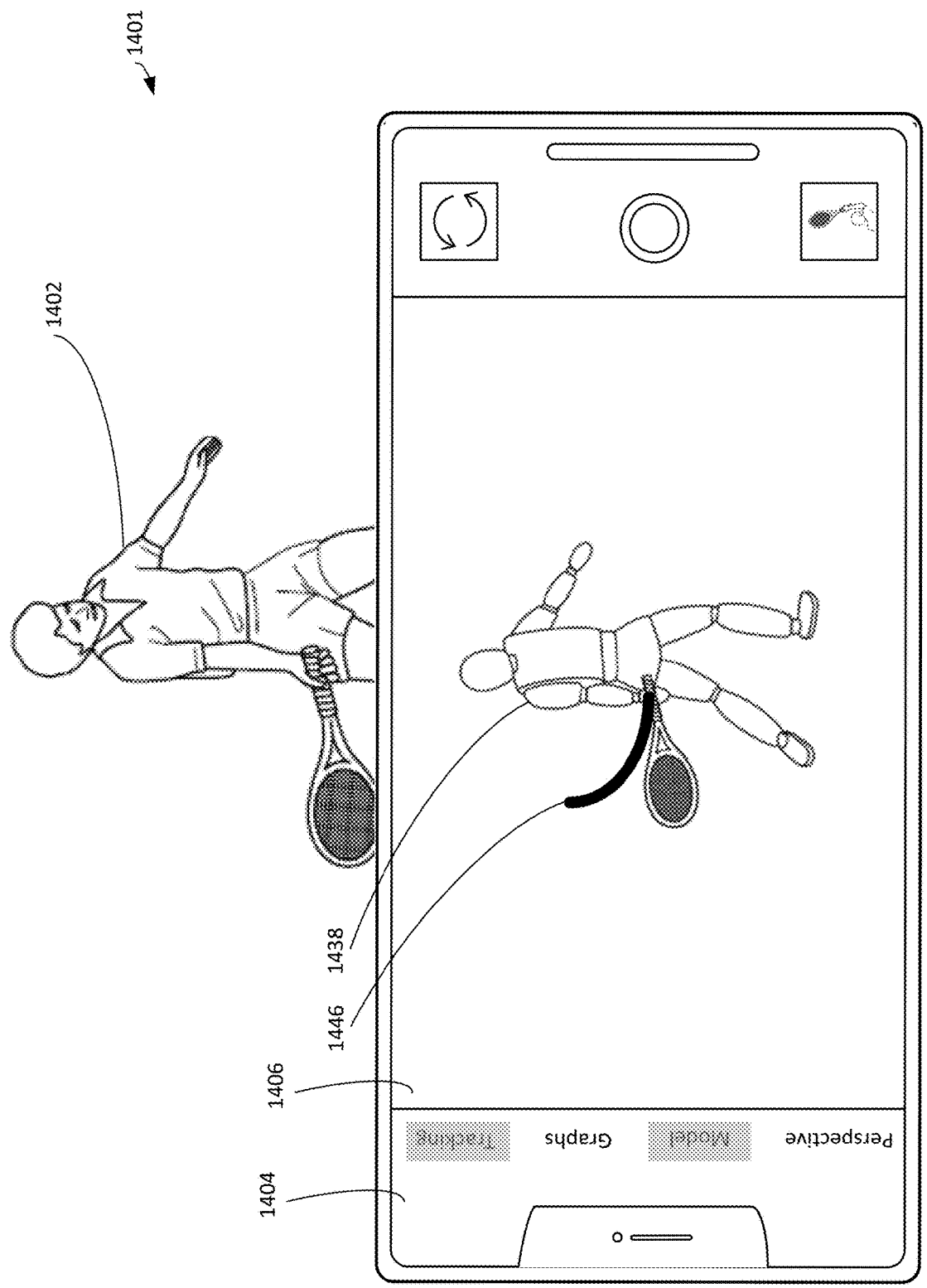
Figure 14G:
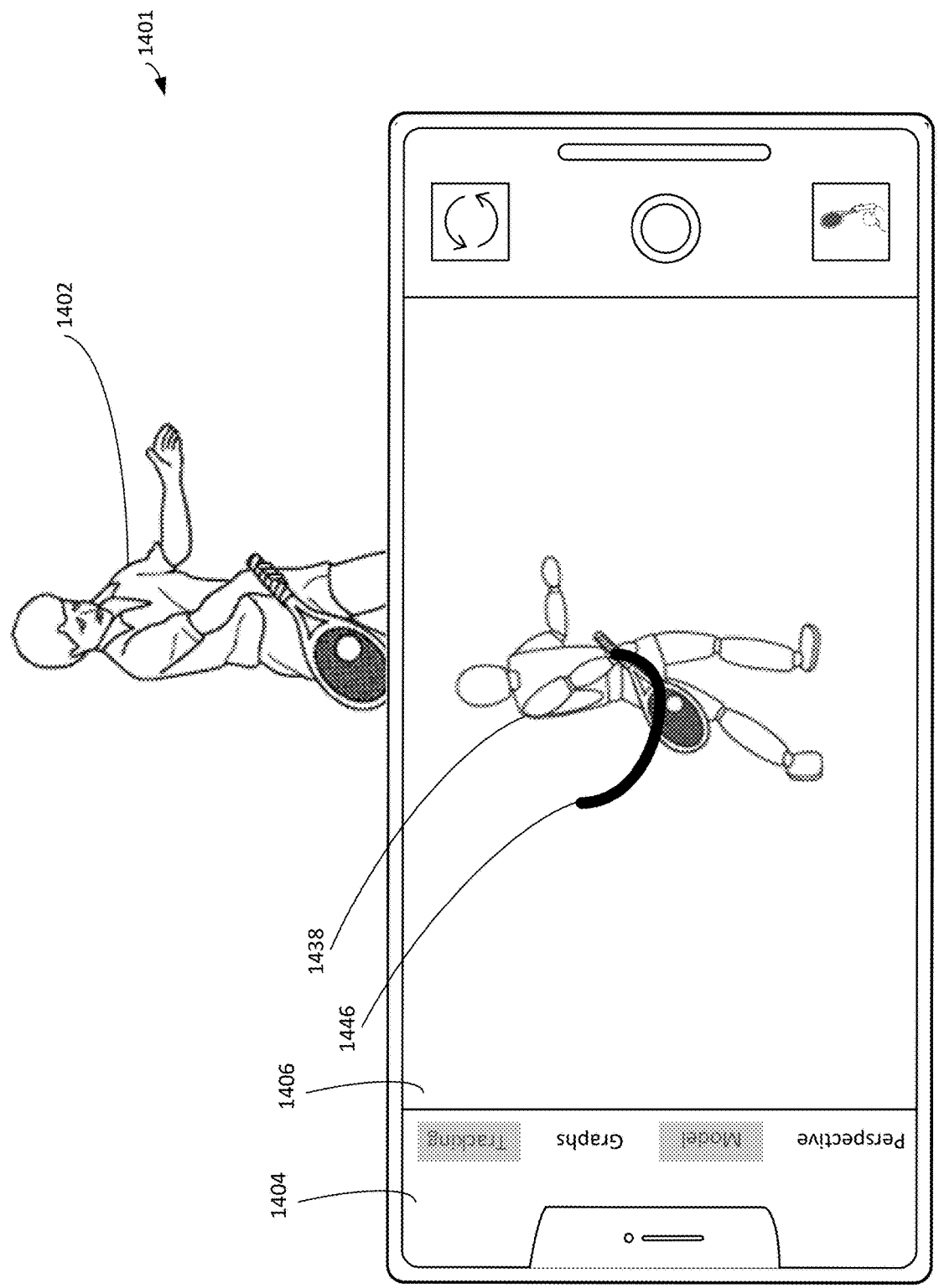
Figure 14H:
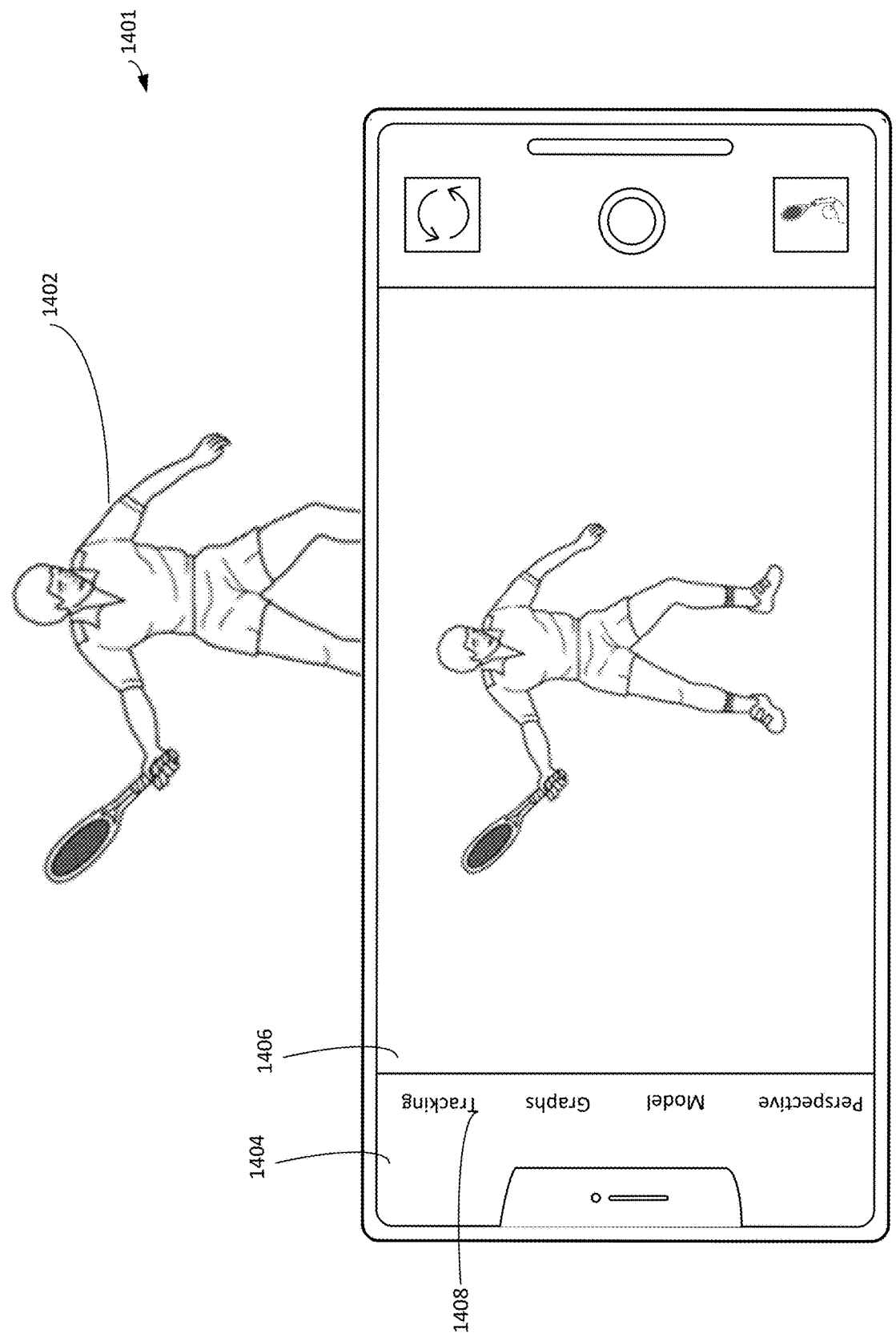
Figure 14I:
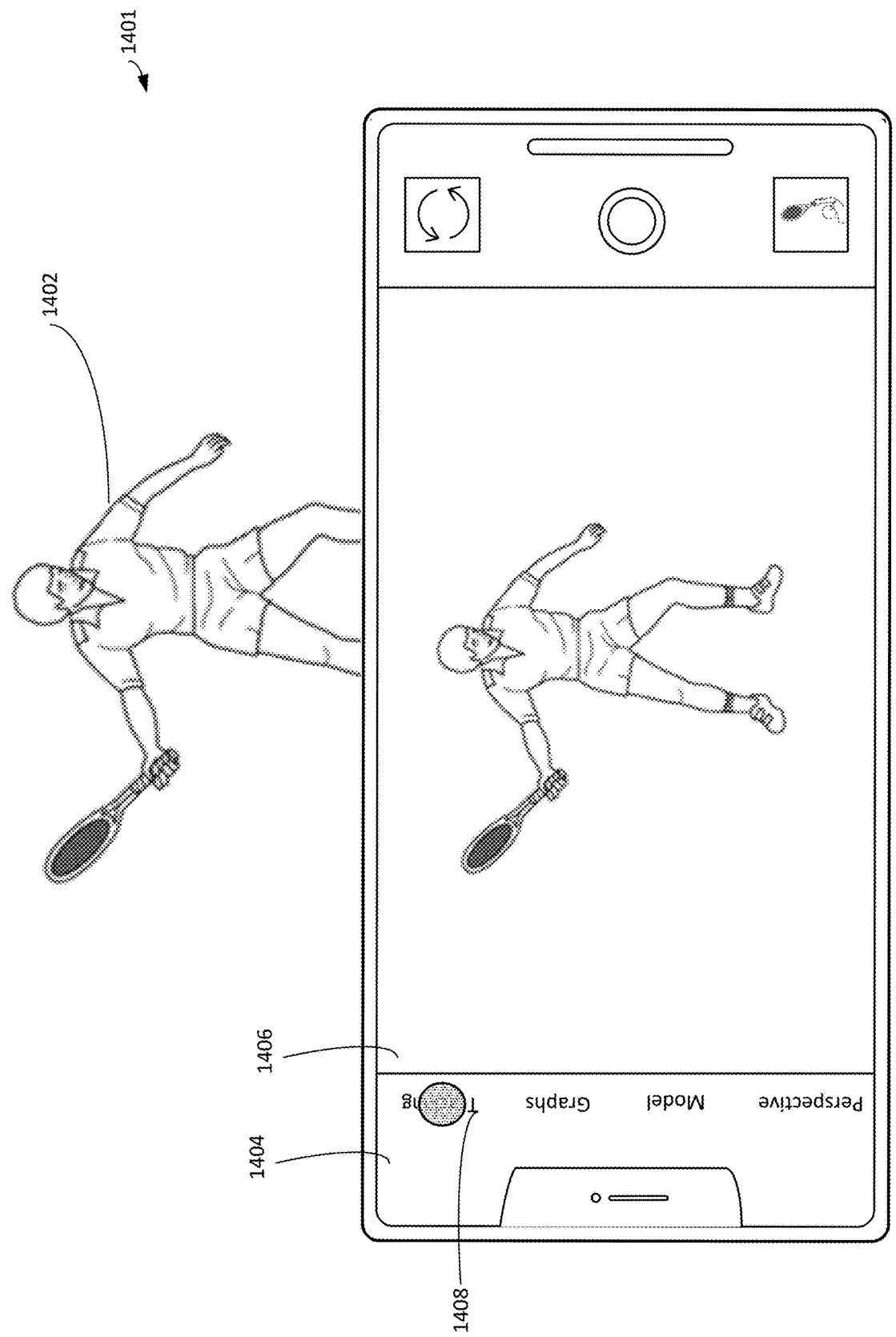
Figure 14J:
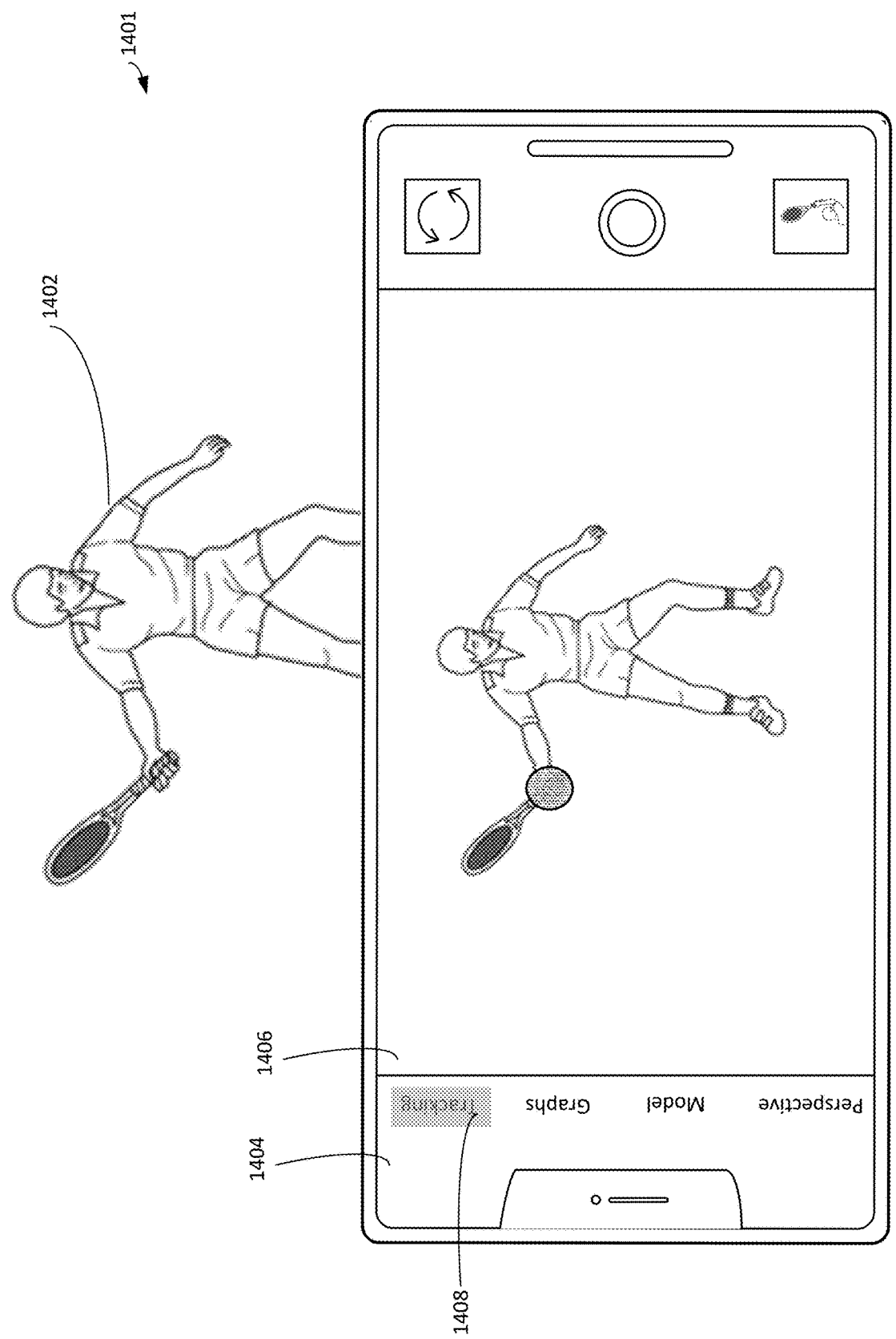
Figure 14K:
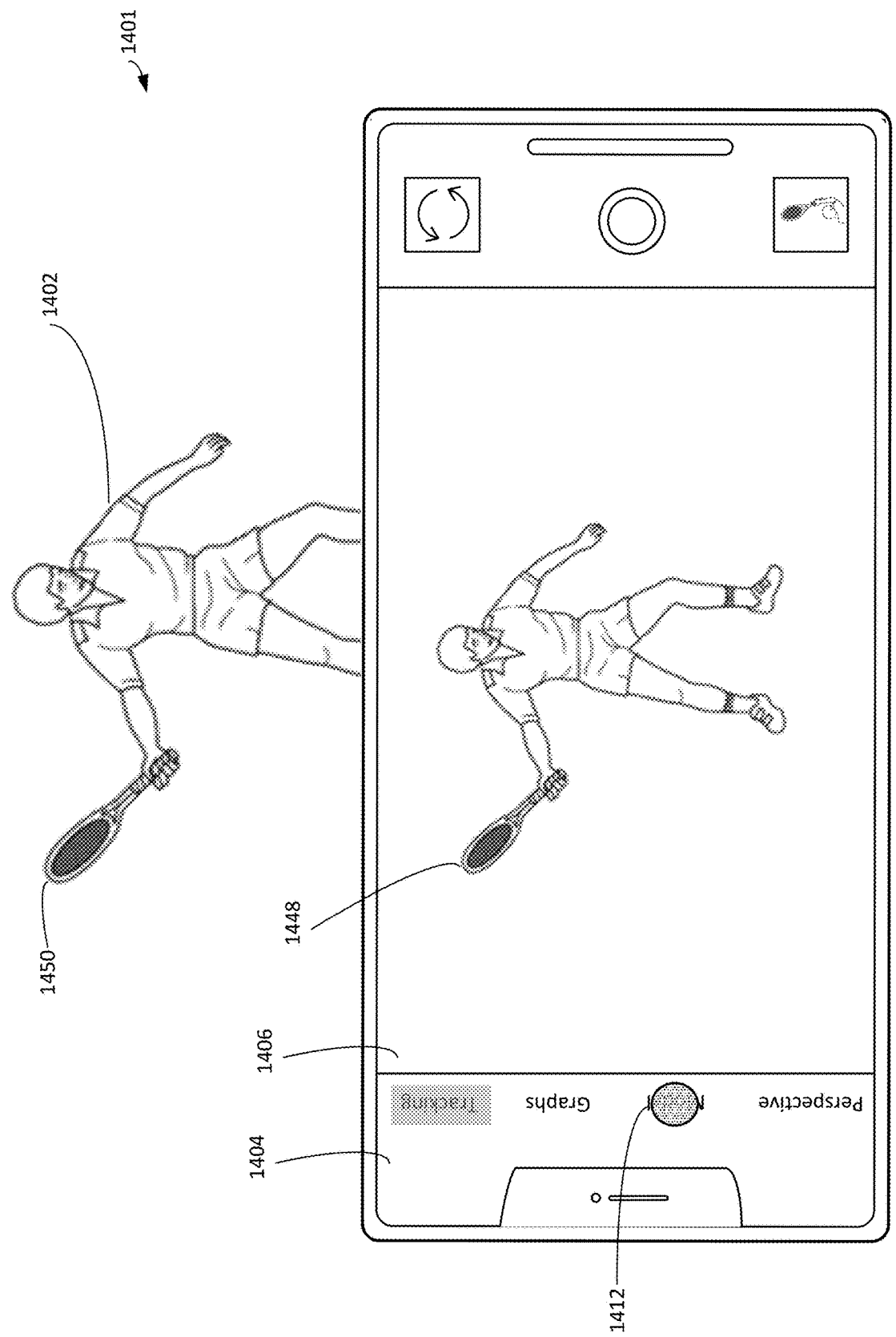
Figure 14L:
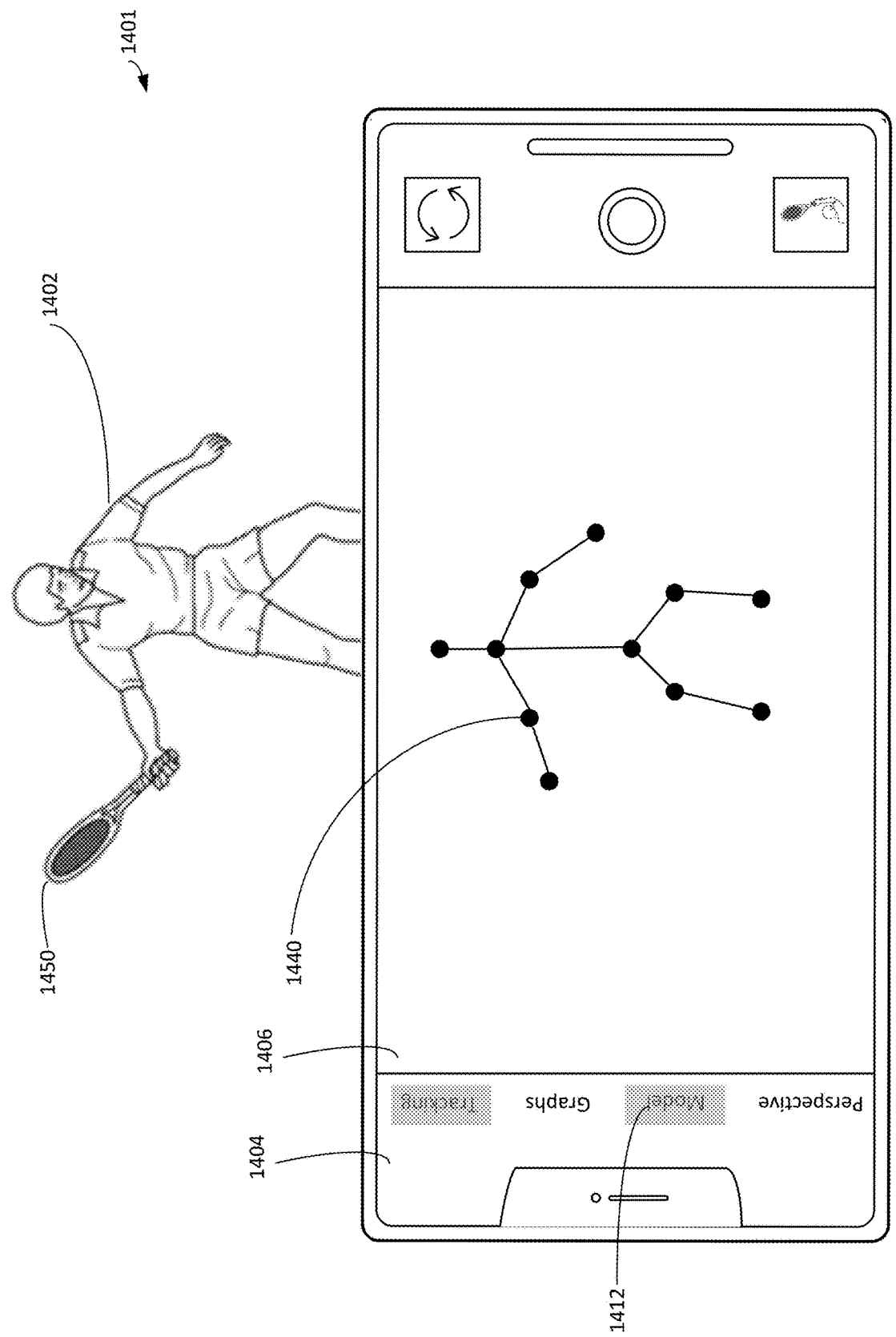
Figure 14M:
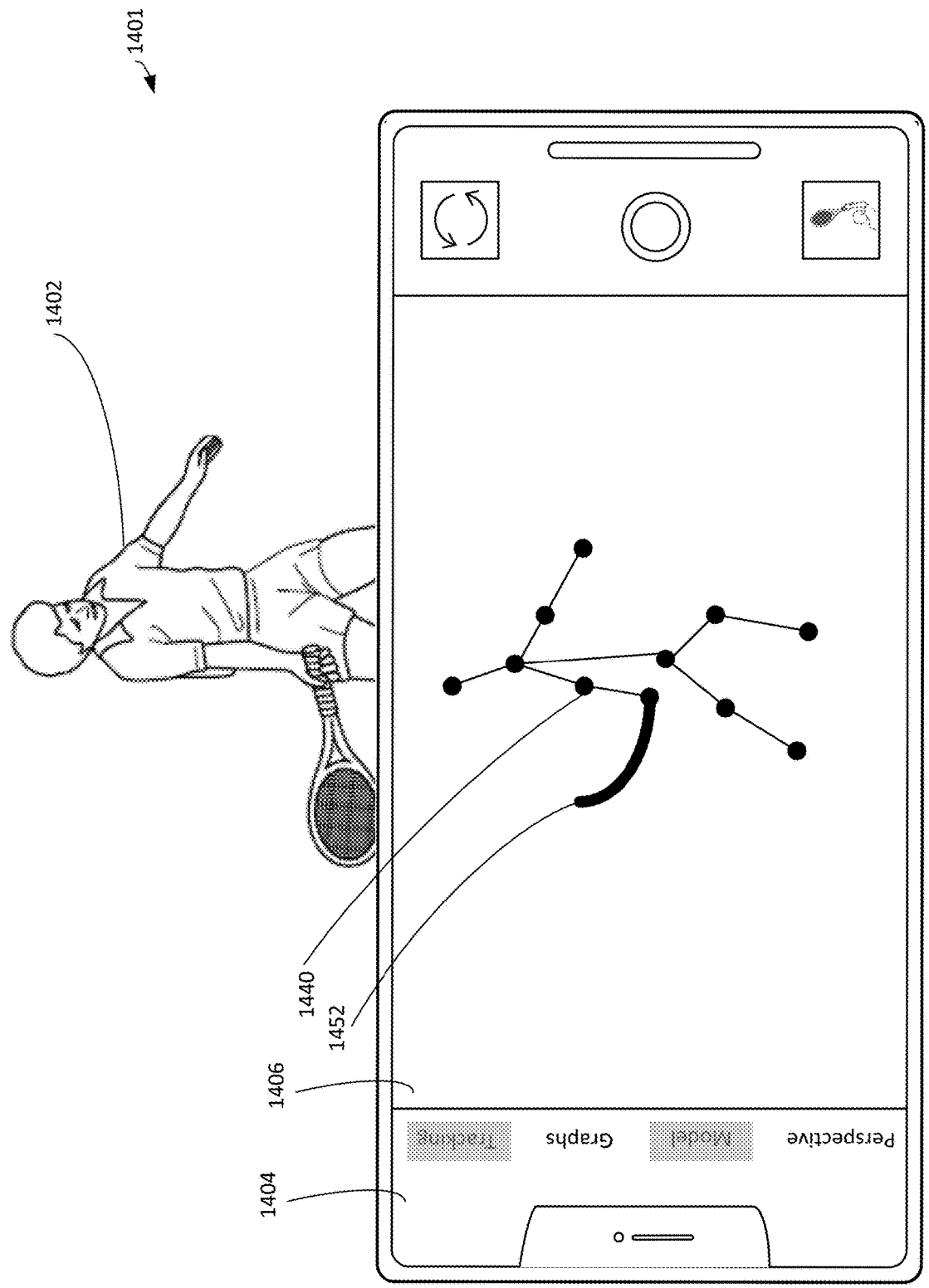
Figure 14N:
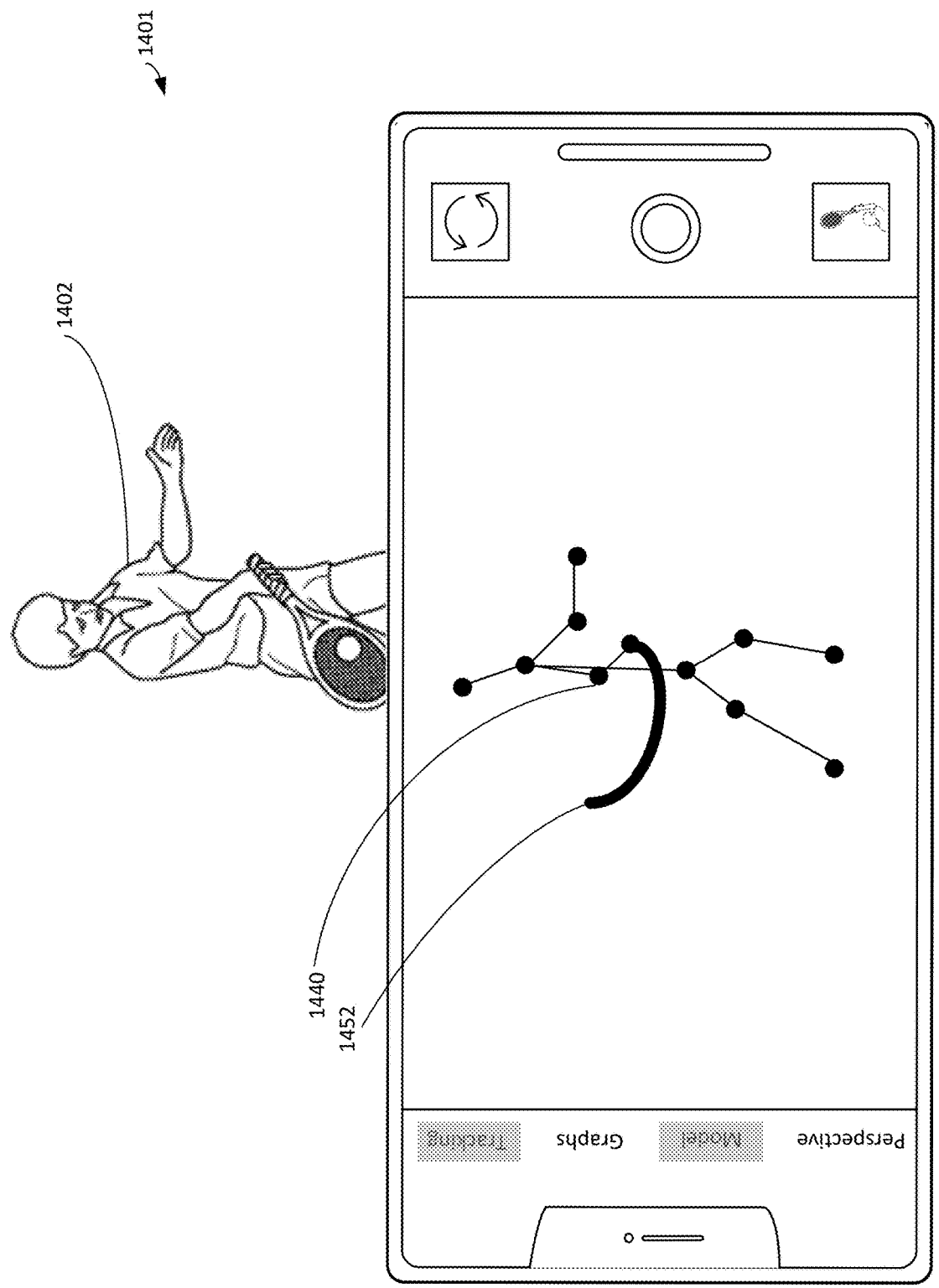
Figure 14P:
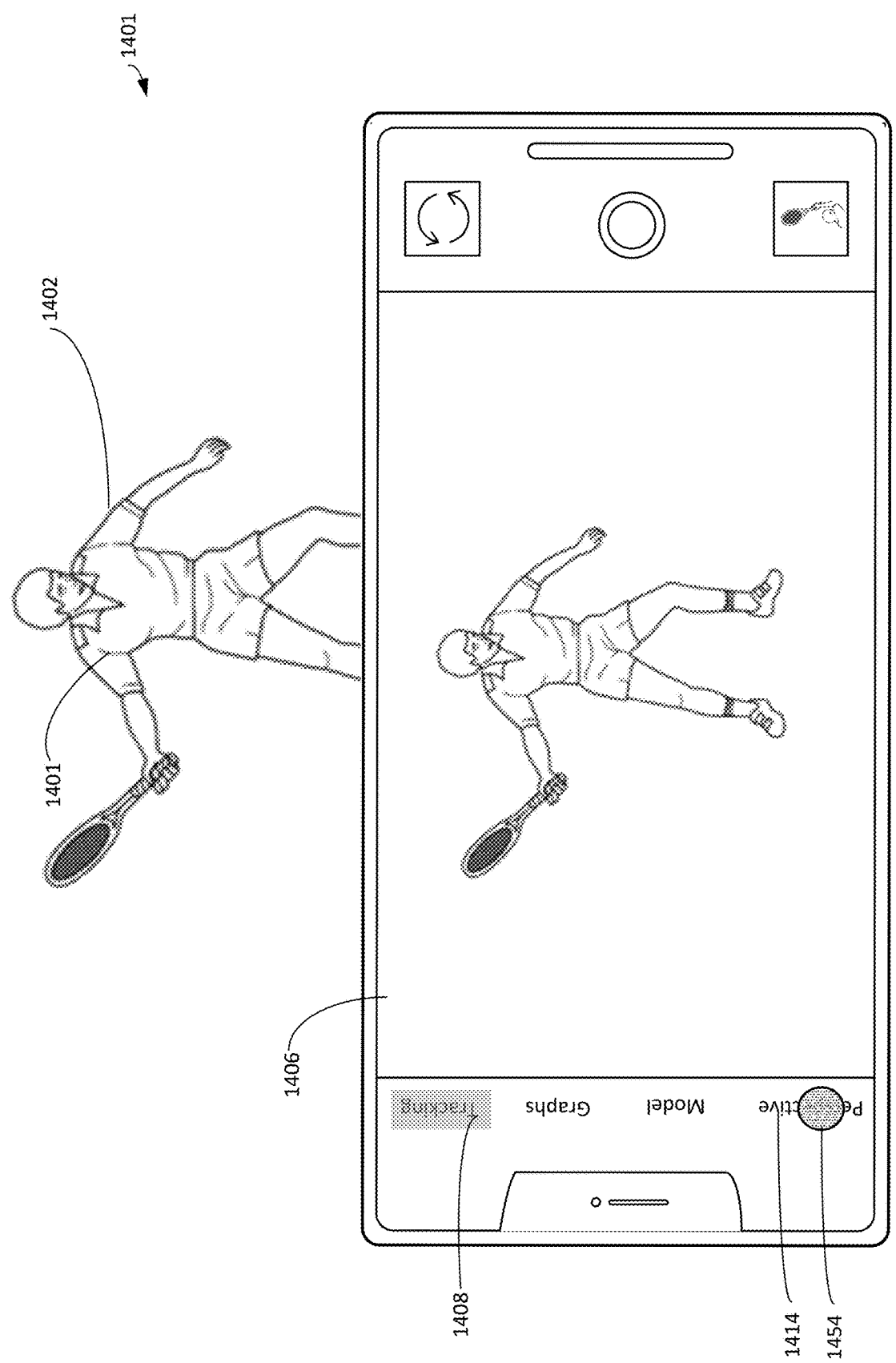
Figure 14Q:
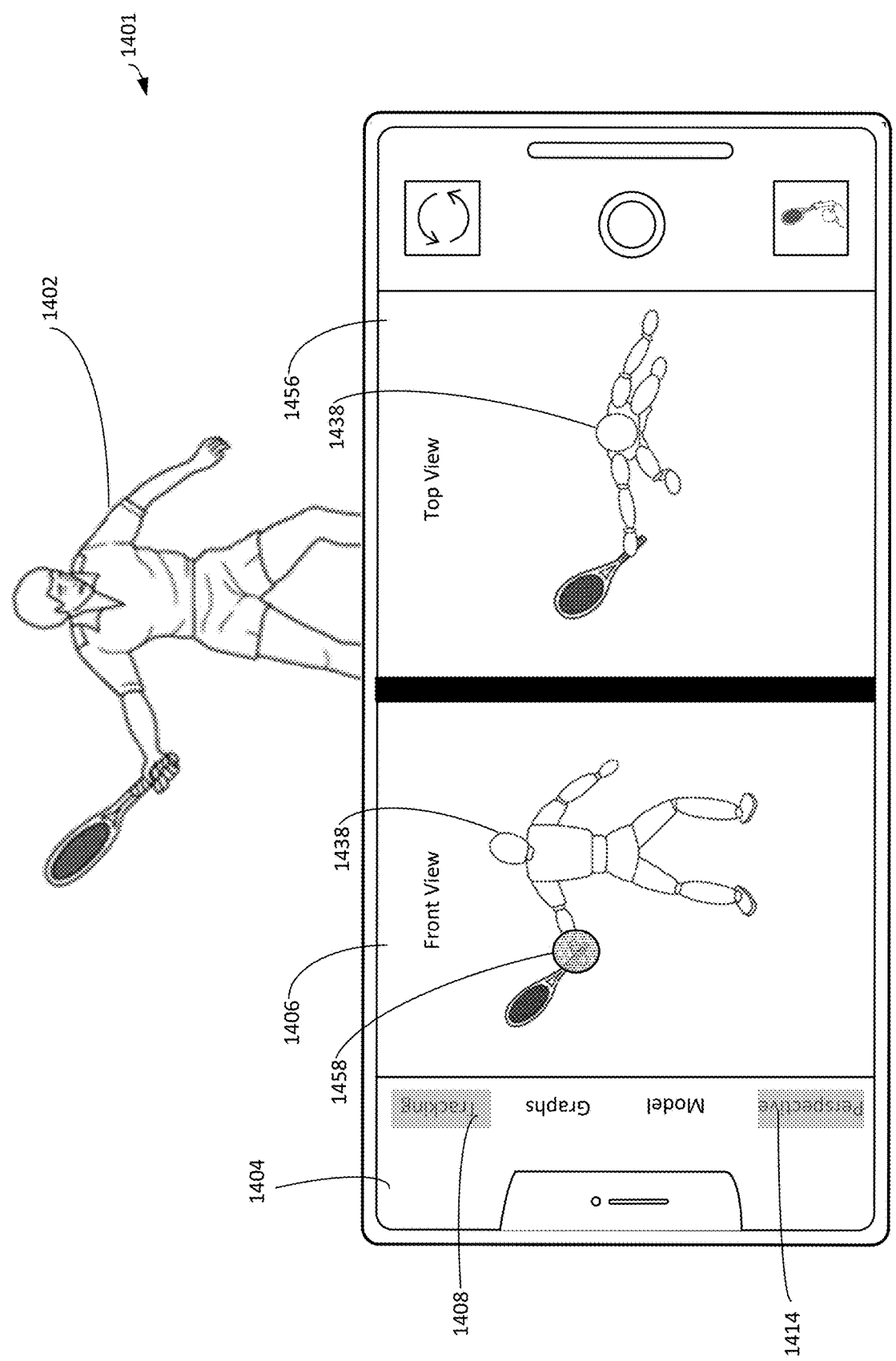
Figure 14R:
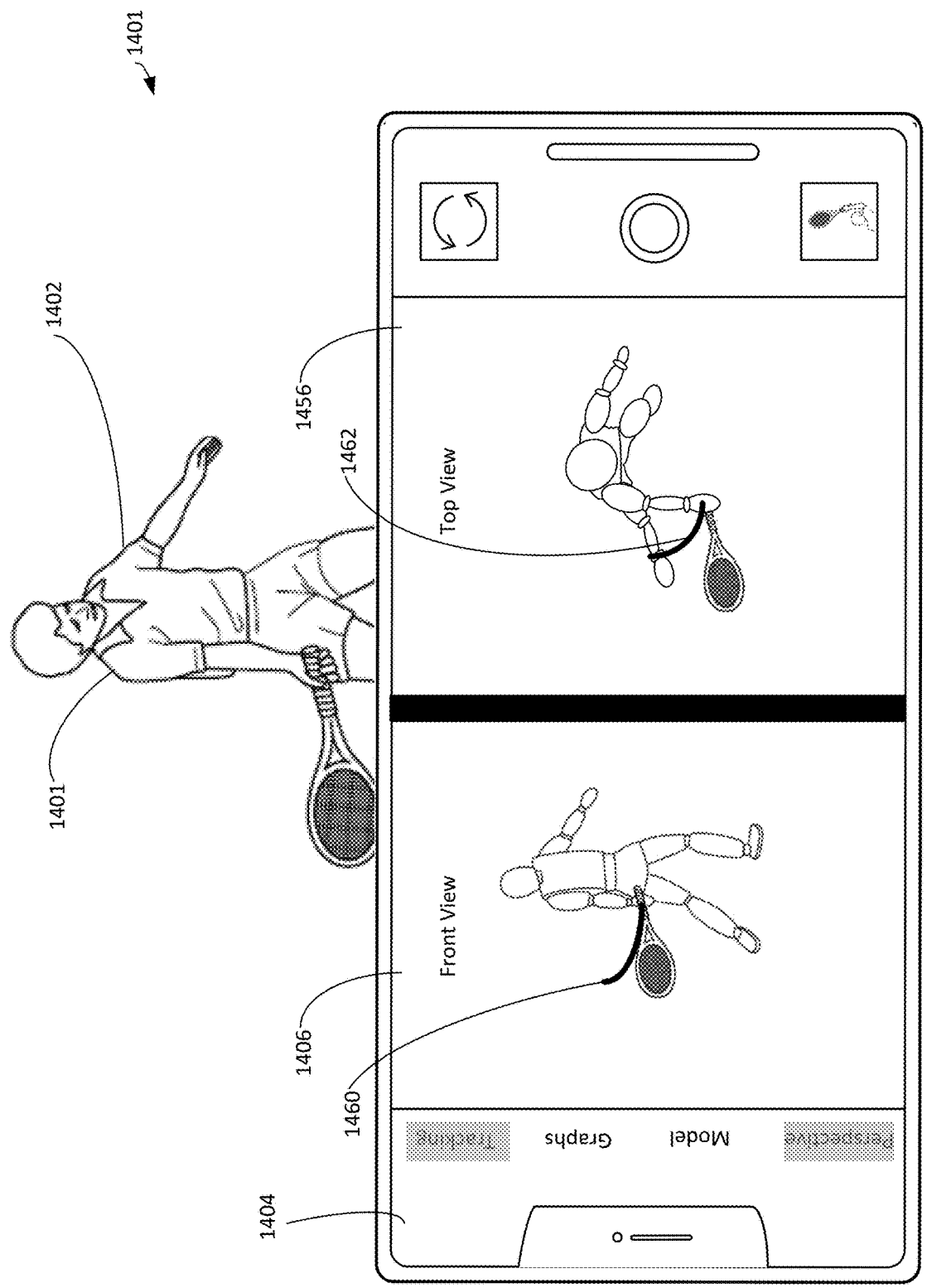
Figure 14S:
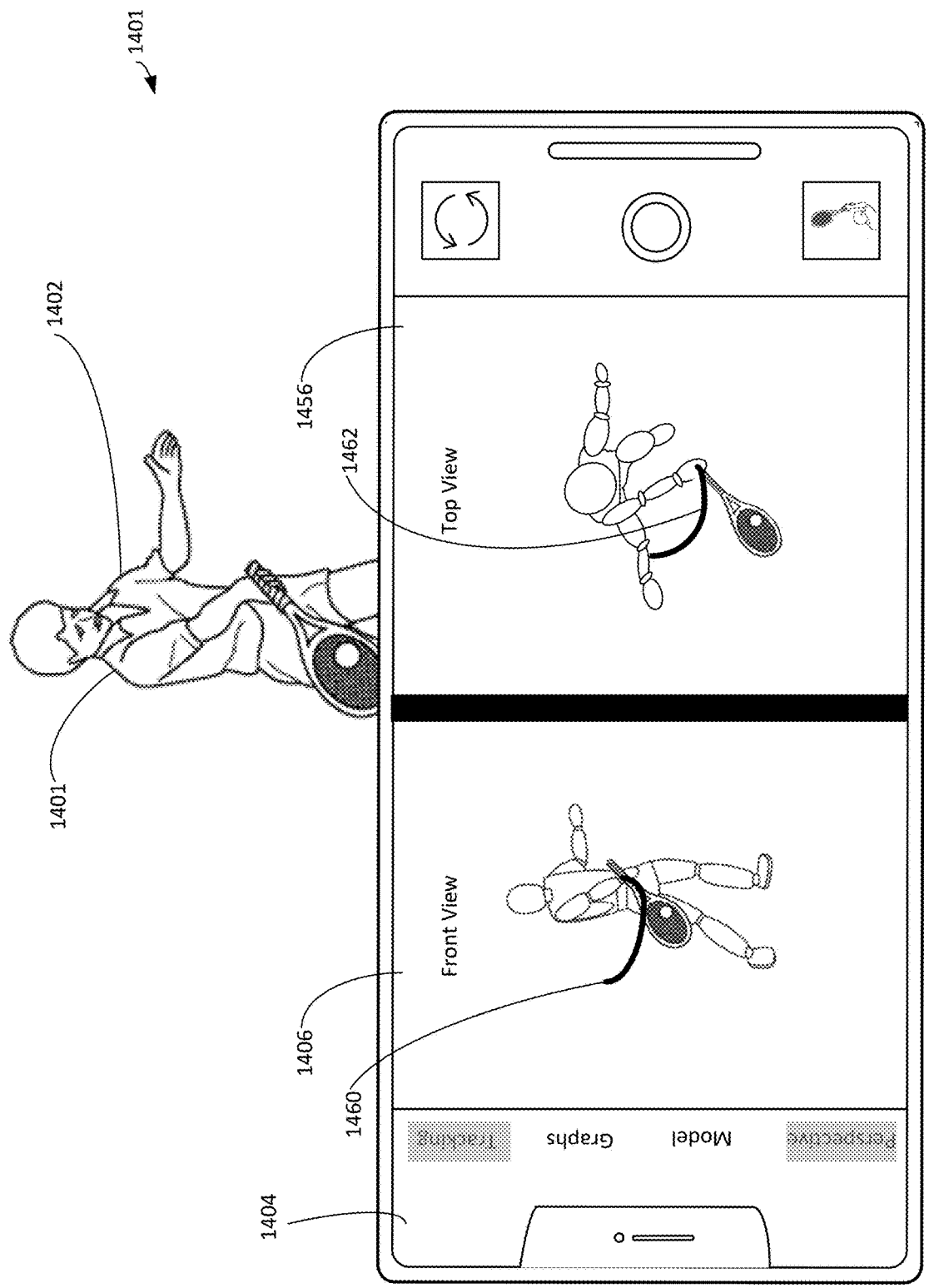

FIGS. 14T-14Z illustrate a process for viewing motion tracking information for a live view representation of physical environment 1401. The process depicted in FIGS. 14T-14Z is similar to that in FIGS. 14N-14S. FIG. 14T is the same as FIG. 14N. FIG. 14U illustrates selection of tracking control 1408 by contact 1433; in response, movement tracking is enabled, as indicated by tracking control 1408 being highlighted in FIG. 14V. Additionally, the user selects graph control 1410 with contact 1434 in FIG. 14V. As a result, in FIG. 14W, graph control 1410 is highlighted, and user interface 1404 is updated to include one or more graphs in addition to representation 1406 of subject 1402 in physical environment 1401. Graphs 1436 plot properties (e.g., displacement, speed, acceleration, etc.) of the movement of a point selected for tracking (e.g., subject 1402's wrist, as represented in representation 1406 and selected using contact 1435 in FIG. 14W) with respect to time (e.g., in real time while viewing a live view representation, and corresponding to a current timestamp while playing back a recorded video). In the example shown in FIGS. 14W-14Z, graphs 1436 include plots of displacement, speed, and acceleration of the tracked point over time. In FIG. 14X, movement of subject 1402 in physical environment 1401 is reflected in live view representation 1406 in user interface 1404, and annotation 1437 is displayed (e.g., superimposed) over the representation of the selected point (e.g., subject 1402's wrist) in live view representation 1406. In addition, graphs 1436 are updated to plot the displacement, speed, and acceleration of the selected point during the movement of the selected point (e.g., corresponding to annotation 1437). Similarly, in FIGS. 14Y-14Z, further movement of subject 1402 is reflected in representation 1406 in user interface 1404, annotation 1437 is progressively extended over the representation of the selected point (e.g., subject 1402's wrist) in representation 1406 to track the further movement, and graphs 1436 are progressively updated to plot the displacement, speed, and acceleration of the selected point during the further movement of the selected point (e.g., corresponding to annotation 1437).

FIGS. 14AA-14GG illustrate a process for viewing motion tracking information using a model corresponding to subject 1402 instead of a live view representation of subject 1402. The process depicted in FIGS. 14AA-14GG is similar to that in FIGS. 14N-14S. In particular, FIG. 14AA is the same as FIG. 14N, and FIG. 14BB illustrates selection of tracking control 1408 by contact 1439, in response to which movement tracking is enabled, as indicated by tracking control 1408 being highlighted in FIG. 14CC. Additionally, FIG. 14CC shows contact 1442 selecting the representation of subject 1402's wrist, as shown in representation 1406, for movement tracking. FIG. 14DD shows selection of model control 1412 by contact 1444. In response, in FIG. 14EE, model control 1412 is highlighted, and a model viewing mode is enabled. Accordingly, as shown in FIG. 14EE, a model—humanoid model 1438—is displayed in live view representation 1406 in user interface 1404 instead of a photorealistic live view representation of subject 1402. In some embodiments, the substitution of humanoid model 1438 for the representation of subject 1402 in representation 1406 does not affect other aspects of physical environment 1401 (e.g., photorealistic representations of one or more features in physical environment 1401, such as representation 1448 of racket 1450, continue to be displayed). In some embodiments, reference points on humanoid model 1438 are mapped to corresponding reference points on subject 1402 such that humanoid model 1438 moves (e.g., is animated) in user interface 1404 to track and correspond to the movement of subject 1402 in physical environment 1401, as shown in FIGS. 14FF-14GG. In addition, in FIGS. 14FF-14GG, as subject 1402 moves, annotation 1446 is displayed and progressively updated in representation 1406 to track the movement of the selected point on humanoid model 1438. It is noted that although the selected point was selected with respect to a live, photorealistic view of subject 1402 (e.g., the representation of subject 1402's wrist in representation 1406 in FIG. 14CC), the selected point remains tracked with respect to a corresponding point on humanoid model 1438 (e.g., the wrist of humanoid model 1438 in FIG. 14EE-14GG).

FIGS. 14HH-14NN illustrate a process for viewing motion tracking information using another type of model—skeletal model 1440—instead of a live view representation of subject 1402. The process depicted in FIGS. 14HH-14NN is similar to that in FIGS. 14AA-14GG, except that, in response to selection of model control 1412 in FIGS. 14KK-14LL, skeletal model 1440 is displayed instead of humanoid model 1438. Like humanoid model 1438 in FIGS. 14EE-14GG, skeletal model 1440 in FIGS. 14LL-14NN tracks and corresponds to the movement of subject 1402 in physical environment 1401, and like annotation 1446 in FIGS. 14FF-14GG, annotation 1452 in FIGS. 14MM-14NN is displayed and progressively updated in representation 1406 to track the movement of the selected point (e.g., subject 1402's wrist) on skeletal model 1440 (e.g., even though the selected point was selected with respect to the live view representation of subject 1402 in FIG. 14JJ rather than with respect to skeletal model 1440 directly). In addition, in some embodiments, the substitution of a model for the representation of subject 1402 in representation 1406 affects other aspects of physical environment 1401; in particular, in the example shown in FIGS. 14LL-14NN, representation 1448 of racket 1450 is not displayed while skeletal model 1440 is displayed in response to activation of model control 1412 (e.g., unlike the example shown in FIGS. 14EE-14GG in which representation 1448 of racket 1450 continues to be displayed even while humanoid model 1438 is displayed).

FIGS. 14OO-14SS illustrate a process for viewing motion tracking information for a subject from multiple viewing perspectives. In FIG. 14OO, movement tracking is enabled, as indicated by tracking control 1408 being highlighted (e.g., in response to user selection of tracking control 1408 as described herein with reference to FIGS. 14N-14P). Additionally, the user selects perspective control 1414 using contact 1454 in FIG. 14PP. In response to the user selecting perspective control 1414, user interface 1404 is updated to show multiple views of subject 1402, as shown in FIG. 14QQ. In the example shown in FIG. 14QQ, user interface 1404 includes front view representation 1406 of subject 1402 and top view representation 1456 of subject 1402. One of ordinary skill will readily appreciate that other types of views of subject 1402 (e.g., a side view representation) may be presented. In some embodiments, the different views are generated based on depth information collected by camera(s) and/or depth sensor(s) of device 100. For example, because device 100 and its camera(s) are in front of subject 1402 rather than above subject 1402, top view representation 1456 is not a view currently being captured by the camera(s) of device 100, and thus a photorealistic representation of subject 1402 as viewed from above is not available. Instead, top view representation 1456 is a simulated top view of subject 1402 that is generated using a model (e.g., here, humanoid model 1438) that is animated based on movement of subject 1402 as viewed from the front (e.g., in accordance with depth information captured about subject 1402 from the front).

FIG. 14QQ also shows selection, by contact 1458, of the wrist of humanoid model 1438 for tracking (e.g., in contrast to the earlier examples where the selected point is selected on the photorealistic representation of subject 1402 prior to display of the model view). In accordance with the selection of the wrist of humanoid model 1438, annotation 1460 is displayed in front view representation 1406, as shown in FIGS. 14RR-14SS. Annotation 1460 tracks the movement of the wrist of humanoid model 1438, which corresponds to the movement of the wrist of subject 1402 in physical environment 1401. In addition, as also shown in FIGS. 14RR-14SS, annotation 1462 is displayed in top view representation 1456, and tracks the movement of the wrist of humanoid model 1438 in top view representation 1456 (e.g., which corresponds to the movement of subject 1402 in physical environment 1401, which as noted above is in some embodiments simulated based on depth information captured about subject 1402 from the front).

FIGS. 15A-15B are flow diagrams illustrating method 1500 of scanning a physical environment and adding annotations to captured media items of the physical environment in accordance with some embodiments. Method 1500 is performed at a computer system (e.g., portable multifunction device 100 (FIG. 1A), device 300 (FIG. 3A), or computer system 301 (FIG. 3B)) having a display generation component (e.g., a display, a projector, a heads up display or the like) (e.g., touch screen 112 (FIG. 1A), display 340 (FIG. 3A), or display generation component(s) 304 (FIG. 3B)), an input device (e.g., of one or more input devices, including a touch-sensitive surface, such as a touch-sensitive remote control, or a touch-screen display that also serves as the display generation component, a mouse, a stylus, a joystick, a wand controller, and/or cameras tracking the position of one or more features of the user such as the user's hands) (e.g., touch screen 112 (FIG. 1A), touchpad 355 (FIG. 3A), or input device(s) 302 (FIG. 3B)), one or more cameras (e.g., optical sensor(s) 164 (FIG. 1A) or camera(s) 305 (FIG. 3B)) that are in a physical environment, and optionally one or more depth sensing devices (e.g., one or more depth sensors such as time-of-flight sensor 220 (FIG. 2B)). In some embodiments, detecting inputs via the input device (or via one or more input devices) includes detecting movement of an input, which in some embodiments includes movement of an input relative to the input device or computer system (e.g., movement of a touch input relative to a touch-sensitive surface, or movement of a part of a user, such as the user's finger or hand, relative to one or more cameras), movement of the input device relative to the physical environment (e.g., movement of a mouse, joystick, stylus, wand, or one or more cameras of the system), or a combination thereof. Some operations in method 1500 are, optionally, combined and/or the order of some operations is, optionally, changed.

As described below, method 1500 displays an annotation in a representation of a physical environment in response to a user input, based on whether the user input satisfies proximity-based criteria. In particular, the system determines whether to constrain the annotation (e.g., annotation 1150 in FIG. 11I) to correspond to an edge in the physical environment (e.g., an edge of table 1106, FIG. 11A, as represented by edge 1146 of table 1148 in FIG. 11H). If the annotation traces an edge (e.g., of a physical object) in the physical environment while remaining within a threshold distance of the edge (in the representation of the physical environment) (e.g., as indicated by bounding box 1144 in FIG. 11I), the annotation is constrained to correspond to the edge. Constraining an annotation to correspond to a physical edge when the user input for adding the annotation stays within a threshold distance of the edge, rather than maintaining the annotation as a freeform annotation, intelligently produces an annotation of a type consistent with the user's likely intent, so that the user can provide the input more quickly (e.g., instead of needing to follow the edge slowly and carefully) and so that the user need not change to a different annotation mode or tool. Performing an operation (e.g., automatically) when a set of conditions has been met while reducing the number and extent of inputs needed to perform the operation enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

The system displays (1502), via the display generation component, a first representation of a field of view of the one or more cameras.

In some embodiments, the first representation of the field of view of the one or more cameras is (1504) a live view representation (e.g., the live view representation of the field of view is continuously, or continually (e.g., repeatedly at regular intervals), updated based on changes in the physical environment in the field of view of the one or more cameras, as well as movement of the one or more cameras) (e.g., the live view representation shown on user interfaces 1110-1 to 1110-3 in FIGS. 11A-11E). For example, if the one or more cameras move to a different location (e.g., from camera location 1116-1 to camera location 1116-2 in FIGS. 11A-11B) in the physical environment, a different second representation of the field of view of the one or more cameras is displayed on the display generation component. In some embodiments, if an annotation (e.g., annotation 1150' in FIG. 11L) has been added to the first representation of the field of view, the annotation continues to be displayed in the representation of the field of view at a location that is fixed relative to a physical location in the physical environment as the one or more cameras move, while the physical location remains in the field of view of the one or more cameras (e.g., annotation 1150' remains displayed constrained to edge 1146 as the live view representation in user interface 1110-4 is updated as shown in FIGS. 11R-11Y). Constraining the annotation to the edge of the physical object in a live view representation enables contemporaneous annotation of an environment that the user is currently in and intelligently produces an annotation of a type consistent with the user's likely intent, so that the user can provide the input more quickly (e.g., instead of needing to follow the edge slowly and carefully) and so that the user need not change to a different annotation mode or tool. Providing additional control options and performing an operation (e.g., automatically) when a set of conditions has been met while reducing the number and extent of inputs needed to perform the operation enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the first representation of the field of view of the one or more cameras is (1506) a still view representation (e.g., a still image, which in some embodiments is a previously-captured image) (e.g., the still view representation shown on user interface 1110-3 in FIG. 11F). In some embodiments, the still view representation includes or is associated with depth data corresponding to the physical environment captured in the still view representation. For example, one or more characteristics of the physical environment captured in the still view representation can be measured based on the depth data. Constraining the annotation to an edge (e.g., of a physical object) in a still view representation allows a user to annotate an environment at a later point using a captured representation of the environment, without requiring continuous operation of the camera, and intelligently produces an annotation of a type consistent with the user's likely intent, so that the user can provide the input more quickly (e.g., instead of needing to follow the edge slowly and carefully) and so that the user need not change to a different annotation mode or tool. Providing additional control options and performing an operation (e.g., automatically) when a set of conditions has been met while reducing the number and extent of inputs needed to perform the operation enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

The system receives (1508), via the input device, a first drawing input (e.g., drawing on a touch-sensitive surface with a stylus or with a user's finger) (e.g., contact 1142 of FIG. 11H) that corresponds to a request to add a first annotation (e.g., a measuring line, a note, a label, free-hand drawing, etc.) to the first representation of the field of view (e.g., the annotation is to be added to a portion of the physical environment or to an object in the physical environment).

In response to receiving the first drawing input (1510), the system displays (1512), in the first representation of the field of view of the one or more cameras, the first annotation (e.g., annotation 1150 of FIG. 11I) along a path that corresponds to movement of the first drawing input (e.g., the annotation is displayed along a path traced by movement of a stylus or a user's finger on a touch-sensitive surface).

In addition, in response to receiving the first drawing input (1510), after displaying the first annotation along the path that corresponds to the movement of the first drawing input, in accordance with a determination that a respective portion of the first annotation corresponds to one or more locations within a threshold distance (e.g., represented by bounding box 1144 of FIG. 11I) of an edge of a physical object (e.g., edge 1146 of table 1148 in FIG. 11H, representing an edge of table 1106 in FIG. 11A) in the physical environment (e.g., the respective portion of the annotation is a freeform drawing that tracks the edge of the physical object), the system displays (1514) an annotation that is constrained to correspond to the edge of the physical object (e.g., annotation 1150' in FIG. 11L). In some embodiments, displaying the annotation that is constrained to the edge of the physical object includes replacing display of the respective portion of the first annotation with display of the annotation that is constrained to correspond to the edge of the physical object. In some embodiments, displaying the annotation that is constrained to the edge of the physical object includes morphing display of the respective portion of the first annotation to display of the annotation that is constrained to correspond to the edge of the physical object.

In some embodiments, the annotation that is constrained to correspond to the edge of the physical environment is displayed without first displaying the annotation along a path corresponding to the movement of the drawing input (e.g., in accordance with a determination that the movement of the drawing input corresponds to locations within the threshold distance of the edge of the physical object). In some embodiments, the edge of the physical object is a straight line, a curved line, or of an irregular pattern such as a zig-zag line. For example, the annotation is created using a freeform drawing input that tracks an edge (e.g., a straight edge, a curved edge, or an irregularly-shaped edge) of a table in the physical environment, and the annotation is constrained to the edge of the desk, optionally after (e.g., in response to) the end of the freeform drawing input (e.g., liftoff of a contact from a touch-sensitive surface such as a touch-sensitive display), even though the path of the freeform drawing input does not follow the edge of the desk exactly (but is within a threshold distance of the edge).

In some embodiments, displaying the annotation that is constrained to correspond to the edge of the physical object is (1516) performed after (e.g., in response to) detecting an end of the first drawing input (e.g., where the first drawing input includes a contact on a touch-sensitive surface by stylus or a user's finger, the freeform drawing (e.g., the annotation displayed along a path that corresponds to movement of the contact) is constrained to the corresponding edge after (e.g., in response to) detecting liftoff of the contact from the touch-sensitive surface) (e.g., liftoff of contact 1142 in FIGS. 11J-11K). Replacing display of the respective portion of the annotation with the display of the annotation constrained to correspond to the edge of the physical object after detecting an end of the first drawing input intelligently produces an annotation of a type consistent with the user's likely intent, so that the user can provide the input more quickly (e.g., instead of needing to follow the edge slowly and carefully) and so that the user need not change to a different annotation mode or tool, and also provides the user with visual feedback that takes into account the entire extent of the annotation drawn with the first drawing input when determining whether to constrain the annotation to an edge (e.g., rather than switching between constraining and not constraining the annotation as the first drawing input progresses). Performing an operation (e.g., automatically) when a set of conditions has been met, without requiring further user input, and providing improved feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, concurrently with displaying the annotation (e.g., annotation 1150 in FIG. 11K) along the path that corresponds to the movement of the first drawing input, the system displays (1518) a representation of a measurement corresponding to one or more characteristics of the annotation. In some embodiments, the representation of the measurement is continually updated as the annotation is drawn. For example, if the annotation is a one-dimensional object such as a line segment, the representation of the measurement shows the current length of the line segment, optionally with (e.g., linear) graduation such as ruler markings, as the line is drawn. In another example, if the annotation is a two-dimensional object such as a rectangle, the representation of the measurement shows two-dimensional measurement information (e.g., area) that is optionally continually updated, and that is optionally displayed with graduation in one or both dimensions of the two-dimensional object. In some embodiments, the representation of the measurement is displayed with respect to the constrained annotation (e.g., label 1152 is displayed for annotation 1150' in FIG. 11L). Displaying a representation of a measurement corresponding to one or more characteristics (e.g., distance, area, and/or volume, etc.) of the annotation concurrently with displaying the annotation along the path that corresponds to the movement of the first drawing input provides visual feedback indicating additional information about (e.g., measurements of) the annotation without requiring the user to change to a different annotation mode or tool or to provide additional inputs requesting the additional information about the annotation. Providing improved visual feedback with fewer user inputs enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the first representation of the field of view of the one or more cameras is (1520) a first type of view (e.g., first-person-view as shown on user interface 1110-4 in FIG. 11Y). In some embodiments, the system receives a second input (e.g., contact 1166 on "Top Down View" control 1136 in FIG. 11Y) corresponding to a request to display a second representation of the field of view (e.g., top-down view as shown on user interface 1110-5 in FIG. 11Z) of the one or more cameras that is a second type of view that is different from the first type of view (e.g., a contact, on a touch-sensitive surface, selecting a graphical user interface element corresponding to the second type of view). In some embodiments, in response to receiving the second input, the system: displays, via the display generation component, an animated transition from the first representation of the field of view of the one or more cameras to the second representation of the field of view of the one or more cameras (e.g., a gradual transition from the first representation to the second representation); and displays, via the display generation component, the second representation of the field of view of the one or more cameras, including displaying the first annotation in the second representation of the field of view of the one or more cameras, wherein the first annotation is displayed at a location in the second representation of the field of view of the one or more cameras that corresponds to a location at which the first annotation is displayed in the first representation of the field of view of the one or more cameras (e.g., the first annotation remains stationary in three-dimensional, physical space as the display switches from displaying the image view to displaying a different type of view such as a three-dimensional model view or orthographic view). For example, annotation 1150' is displayed along the same edge 1146 of table 1148 in the top-down view in FIG. 11Z as in the first-person view in FIG. 11X.

In some embodiments, the first type of view is an image view (e.g., a realistic, photographic view) of the corresponding physical environment (e.g., as shown in FIG. 11HH). In some embodiments, the second type of view is a three-dimensional model view (e.g., a non-photorealistic rendering of a three-dimensional model) of the corresponding physical environment that includes a representation of a three-dimensional model of physical objects in the physical environment (e.g., as shown in FIG. 11JJ). In some embodiments, when displaying the three-dimensional model view, one or more visual properties, such as color, hue, and/or texture, of the physical environment and any physical objects in the physical environment, though present in the image view, are omitted from the three-dimensional model view (e.g., to emphasize structural and/or dimensional information over visual detail).

In some embodiments, the second input (corresponding to the request to display the second representation) includes movement of a control element (e.g., a thumb) on a slider user interface element (e.g., "Slide to fade" control 1132 in FIG. 11HH), and the extent of the animated transition (e.g., the gradual transition) is dependent on the position of the control element on the slider (e.g., movement of the control element in one direction along the slider progresses the animated transition, and movement of the control element in the opposite direction along the slider reverses the animated transition). For example, movement of the slider thumb rightward along "Slide to fade" control 1132 in FIG. 11HH progresses the animated transition away from the state shown in FIG. 11HH and toward the state shown in FIG. 11JJ, whereas movement of the slider thumb leftward along "Slide to fade" control 1132 reverses the animated transition (e.g., progresses the animated transition away from the state shown in FIG. 11JJ and toward the state shown in FIG. 11HH).

In some embodiments, the annotation is anchored to a fixed location in physical space relative to the physical environment in the first representation of the field of view, such that the annotation is displayed in the second representation of the field of view at a location corresponding to the same fixed location in physical space as represented in the second representation of the field of view (e.g., the annotation may be displayed at a different location relative to the display generation component and optionally with different orientation and/or scale, based on a difference between a viewpoint of the first representation and a viewpoint of the second representation) (e.g., annotations 1150' and 1154 as displayed in FIG. 11Y, in comparison with annotations 1150' and 1154 as displayed in FIG. 11Z). Conversely, if an annotation is drawn in a respective view other than the image view (e.g., a three-dimensional model view or orthographic view) at a location that corresponds to a particular location in physical space, and the image view is later redisplayed, the annotation will be displayed at a location (e.g., and orientation and/or scale) in the image view that corresponds to the same particular location in physical space.

Displaying an animated transition from a first representation of the field of view of the one or more cameras to a second representation of the field of view of the one or more cameras and displaying the first annotation at a corresponding location in the second representation of the field of view of the one or more cameras provides the user with a different type of view of and thus more information about both the physical environment and the annotation within the context of the physical environment, and enables the user to easily transition between the different views. Providing improved visual feedback with fewer user inputs enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, while displaying a respective representation that is a respective type of view other than the first type of view (e.g., the top-down view as shown in FIG.

11Z), the system receives (1522), via the input device, a second drawing input (e.g., similar to the first drawing input, the second drawing input can be a drawing input on a touch-sensitive surface with a stylus or with a user's finger) (e.g., by contact 1170 in FIG. 11AA) that corresponds to a request to add a second annotation (e.g., annotation 1176 in FIGS. 11BB-11CC) to the respective representation of the field of view (e.g., an annotation in the orthographic view). In some embodiments, in response to receiving the second drawing input, the system displays, in the respective representation of the field of view of the one or more cameras, the second annotation (e.g., annotation 1176 in FIGS. 11BB-11CC) along a path that corresponds to movement of the second drawing input, and after receiving the second drawing input, displays, in the first representation of the field of view of the one or more cameras, the second annotation along a path that corresponds to the movement of the second drawing input.

In some embodiments, the first representation of the field of view is displayed in response to a subsequent input corresponding to a request to redisplay the first representation (e.g., a contact, on a touch-sensitive surface, selecting a user interface element corresponding to the first type of view) (e.g., contact 1180 on "1st Person View" control 1134 in FIG. 11FF). In some embodiments, the first representation of the field of view is displayed concurrently with the second representation of the field of view (e.g., as described herein with reference to method 1000). In some embodiments, in accordance with a determination that a respective portion of the second annotation corresponds to one or more locations within a threshold distance (e.g., indicated by bounding box 1172 in FIG. 11CC) of an edge (e.g., edge 1174 in FIG. 11CC) of an object (e.g., an object in the three-dimensional model view or orthographic view) in the respective representation of the field view of the one or more cameras, the system displays an annotation (e.g., annotation 1176' in FIG. 11EE) that is constrained to correspond to the edge of the object in the second representation of the field of view (e.g., optionally replacing display of a freeform version of the respective portion of the second annotation) (e.g., drawing an annotation in other types of views is similar to drawing an annotation in the first type of view as described above with reference to operation 1514).

Displaying the second annotation along a path that corresponds to the movement of the second drawing input in the first representation of the field of view provides visual feedback indicating the spatial correspondence between the first representation and the second representation of the field of view of the one or more cameras. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the system receives (1524) a third input corresponding to a request to display a third representation of the field of view of the one or more cameras that is a third type of view that is different from the first type of view (e.g., and different from the second type of view). In some embodiments, the third input is a contact, on a touch-sensitive surface, selecting a user interface element corresponding to the third type of view. In some embodiments, the third type of view is an orthographic view such as a top orthographic view. In some embodiments, in response to receiving the third input, the device displays the third representation that is the third type of view based on one or more detected edges in the field of view. In some embodiments, the annotation is anchored to a fixed location in physical space relative to the physical environment in the first representation of the field of view, such that the annotation is displayed in the third representation of the field of view at a location corresponding to the same fixed location in physical space as represented in the third representation of the field of view (e.g., the annotation may be displayed at a different location relative to the display generation component and optionally with different orientation and/or scale, based on a difference between a viewpoint of the first representation and a viewpoint of the third representation). Displaying the third representation based on one or more detected edges in the field of view in response to receiving the third input provides the user with a different type of view of and thus more information about the physical environment. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the edge of the physical object is (1526) a curved edge. For example, the curved edge is a portion of a perimeter of a round object (e.g., a round table top, or the rim of mug 1159 in FIG. 11U). In some embodiments, annotations follow curved and/or irregular surfaces of physical objects (e.g., annotations are not limited to following straight edges). Displaying an annotation constrained to a curved edge (or surface) of a physical object enables annotation of additional types of objects (e.g., curved objects) and provides visual feedback that an added annotation corresponds to a curved edge. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

It should be understood that the particular order in which the operations in FIGS. 15A-15B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, 1600, 1700, and 1800) are also applicable in an analogous manner to method 1500 described above with respect to FIGS. 15A-15B. For example, the physical environments, features, and objects, virtual objects, inputs, user interfaces, views of the physical environment, and annotations described above with reference to method 1500 optionally have one or more of the characteristics of the physical environments, features, and objects, virtual objects, inputs, user interfaces, views of the physical environment, and annotations described herein with reference to other methods described herein (e.g., methods 700, 800, 900, 1000, 1600, 1700, and 1800). For brevity, these details are not repeated here.

FIGS. 16A-16E are flow diagrams illustrating method 1600 of scanning a physical environment and adding measurements corresponding to objects in captured media items of the physical environment in accordance with some embodiments. Method 1600 is performed at a computer system (e.g., portable multifunction device 100 (FIG. 1A), device 300 (FIG. 3A), or computer system 301 (FIG. 3B)) having a display generation component (e.g., a display, a projector, a heads up display or the like) (e.g., touch screen 112 (FIG. 1A), display 340 (FIG. 3A), or display generation component(s) 304 (FIG. 3B)) and one or more input devices (e.g., touch screen 112 (FIG. 1A), touchpad 355 (FIG. 3A), or input device(s) 302 (FIG. 3B)), optionally one or more cameras (e.g., optical sensor(s) 164 (FIG. 1A) or camera(s) 305 (FIG. 3B)), and optionally one or more depth sensing devices (e.g., one or more depth sensors such as time-of-flight sensor 220 (FIG. 2B)). Some operations in method 1600 are, optionally, combined and/or the order of some operations is, optionally, changed.

As described below, method 1600 displays a virtual measurement (e.g., of a distance, area, volume, etc.) (e.g., measurement segment 1242 in FIG. 12O), and a corresponding label (e.g., label 1244 in FIG. 12M), over at least a selected portion of a previously-captured media item such as an image. Displaying the virtual measurement and the corresponding label over a selected portion of the previously-captured media item provides visual feedback indicating dimensional information of the portion of the physical environment. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

The system displays (1602), via the display generation component, a representation of a first previously-captured media item (e.g., a previously-captured photograph or a frame of a previously-captured video, captured at a time prior to a time of the displaying) (e.g., the still view on user interface 1210-2 in FIG. 12C). The representation of the first previously-captured media item is associated with (e.g., includes) depth information corresponding to a physical environment in which the first media item was captured. In some embodiments, the previously-captured still image is stored in memory of the computer system and displayed in response to a user input indicating selection of the previously-captured still image (e.g., a user input corresponding to a thumbnail or other user interface element corresponding to the previously-captured still image, optionally in a collection of thumbnails or user interface elements corresponding to a plurality of previously-captured still images). In some embodiments, the previously-captured still image includes a representation of a physical environment that is independent from (e.g., different from) a simulated three-dimensional model of the physical environment.

While displaying the representation of the first previously-captured media item, the system receives (1604), via the one or more input devices, one or more first inputs corresponding to a request to display, in the representation of the first previously-captured media item, a first representation (e.g., measurement segment 1242 in FIG. 12O) of a first measurement corresponding to a first respective portion of the physical environment captured in the first media item (e.g., an edge of table 1206 in FIG. 12A). In some embodiments, the one or more inputs include an input corresponding to a request to add a first measurement point (e.g., first measurement point 1240 in FIG. 12J) at a first location, within the image, that is selected using a placement user interface element (e.g., a reticle such as reticle 1229 in FIG. 12D), an input corresponding to a request to move the placement user interface element relative to the image to select a second location within the image (e.g., an input corresponding to a request to perform one or more transformations such as panning or zooming the image behind the placement user interface element), and an input corresponding to a request to add a second measurement point (e.g., second measurement point 1246 in FIG. 12M) at the second location within the image (which, in some embodiments, adds a measurement segment that extends from the first location to the second location). In some embodiments, the one or more inputs include (e.g., only) a single input selecting a location in or a region of the image that corresponds to a distinct physical element represented in the image, such as a physical edge, surface, or object, which (e.g., automatically) adds a measurement that extends along the physical element (e.g., a measurement segment along an edge, two or more measurement segments along two or more edges, respectively, of a surface, and/or a measurement region over a surface). In some embodiments, the placement of the measurement is determined based on image analysis, optionally based on available depth data for the image, to identify edge(s), surface(s), and/or object(s).

In response to receiving the one or more first inputs corresponding to the request to display the first representation of the first measurement in the representation of the first previously-captured media item (1606), the system: displays (1608), via the display generation component, the first representation of the first measurement (e.g., a measurement segment or region such as measurement segment 1242 in FIG. 12O) over at least a portion of the representation of the first previously-captured media item that corresponds to the first respective portion of the physical environment captured in the representation of the first media item, based on the depth information associated with the first previously-captured media item (e.g., depth information that was captured concurrently with or in close temporal proximity to when the previously-captured media item was captured); and displays (1610), via the display generation component, a first label corresponding to the first representation of the first measurement (e.g., a text label) that describes the first measurement based (e.g., at least in part) on the depth information associated with the first previously-captured media item. In some embodiments, the first label indicates the length of a measurement segment. In some embodiments, the first label indicates the area of a measurement region.

In some embodiments, in response to receiving a zoom input (e.g., a pinch or de-pinch gesture on an input device, such as a touch-sensitive surface) corresponding to a request to perform a zoom operation (e.g., a zoom-in operation) on the representation of the first media item (1612), the system: rescales the representation of the first previously-captured media item (e.g., by enlarging or shrinking the representation of the first media item while maintaining aspect ratio), rescaling the first representation of the first measurement in accordance with the rescaling of the representation of the first previously-captured media item; and displays, via the display generation component, at least a portion of the rescaled representation of the first previously-captured media item and at least a portion of the rescaled first representation of the first measurement.

In some embodiments where the zoom input corresponds to a request to zoom into the representation of the previously-captured media item, the original representation of the previously-captured media item is replaced with a portion of the representation of the previously-captured media item (e.g., enlarging the representation of the media item results in only a portion of the enlarged representation being displayed), and the original first representation of the first measurement is replaced with at least a portion of the first representation of the first measurement based on the extent to which the (e.g., rescaled) portion of the representation of the previously-captured media item captures the first respective portion of the physical environment (e.g., in some circumstances, in accordance with zooming the representation of the previously-captured media item, the first respective portion of the physical environment is zoomed partially out of view, in which case the portion of the first representation of the first measurement is accordingly zoomed partially out of view). In some embodiments, the extent of the zoom is dependent on the displacement of the pinch zoom gesture, and the location of the portion of the representation to be enlarged is dependent on the location of the pinch zoom gesture. In some embodiments, while the enlarged representation of the media item is displayed, the system receives one or more user inputs to move (e.g., reposition) one or more portions of the (e.g., enlarged) first representation of the first measurement.

Displaying the rescaled representation of the first previously-captured media item together with the rescaled first representation of the first measurement in response to receiving a zoom input provides the user with increased control over view of the media item while automatically scaling the virtual measurement together with the media item. In particular, enabling the user to enlarge the representation of the media item enables a user to reposition representations of measurements, or portions thereof, more precisely. Providing additional control options, while reducing the number of inputs needed to perform an operation, and providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments (e.g., while displaying the representation of the previously-captured media item, including displaying the first representation of the first measurement), the system receives (1614) one or more second inputs corresponding to a request to display, in the representation of the first previously-captured media item, a second representation of a second measurement (e.g., measurement segment 1261 in FIG. 12FF) corresponding to a second respective portion of the physical environment captured in the first media item. In some embodiments, the one or more second inputs are similar to (e.g., the same type(s) of input(s) as) the one or more first inputs, and directed to a different location (e.g., a representation of a different object) within the representation of the media item. In some embodiments, in response to receiving the one or more second inputs corresponding to the request to display the second representation of the second measurement in the representation of the first previously-captured media item, the system: ceases to display the first representation of the first measurement (e.g., measurement segment 1242 in FIG. 12O) and the first label (e.g., label 1244 in FIG. 12M); displays, via the display generation component, the second representation of the second measurement (e.g., a measurement segment or region, such as measurement segment 1261 in FIG. 12FF) over at least a portion of the representation of the first previously-captured media item that corresponds to the second respective portion of the physical environment captured in the representation of the first media item; and displays, via the display generation component, a second label (e.g., label 1259 in FIG. 12FF) corresponding to the second representation of the second measurement (e.g., a text label) that describes the second measurement based on depth data associated with the first previously-captured media item. In some embodiments, the second label indicates the length of a measurement segment. In some embodiments, the second label indicates the area of a measurement region.

Ceasing to display the first representation of the first measurement and the first label and displaying the second representation of the second measurement and the second label, in response to receiving the one or more second inputs corresponding to the request to display the second representation of the second measurement, provides dimensional information of a different portion of the physical environment without cluttering the user interface with dimensional information that may no longer be of interest. Providing improved visual feedback without cluttering the user interface enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, however, instead of ceasing to display the first representation of the first measurement and the first label, the display generation component displays both representations of measurements and one or both labels (e.g., maintaining display of the first representation of the first measurement and optionally the first label while displaying the second representation of the second measurement and the second label), enabling multiple measurements to be made in the representation of the previously-captured media item.

In some embodiments, the one or more first inputs include (1616) an input corresponding to a request to add a measurement point at a respective location over the representation of the first previously-captured media item that is indicated by a placement user interface element (e.g., a placement indicator such as reticle 1229 in FIG. 12D) displayed over the representation of the first previously-captured media item, wherein the placement user interface element is displayed at a predefined location relative to the display generation component (e.g., the predefined location being fixed, without regard to which portion(s) of the physical environment are captured in the representation of the previously-captured media item). In some embodiments, in response to receiving a display-transformation input corresponding to a request to perform one or more transformations of (e.g., an input to zoom-in, zoom-out, pan, rotate, and/or perform other transformations on) the representation of the first previously-captured media item, concurrently with maintaining display of the placement user interface element at the predefined location relative to the display generation component (e.g., such that the placement indicator stays stationary with respect to the display generation component), the system displays, via the display generation component, the one or more transformations of the representation of the first previously-captured media item in accordance with the display-transformation input.

For example, if the display-transformation input corresponds to a request to zoom in or zoom out of the representation of the first previously-captured media item, the representation of the first media item is zoomed in or zoomed out, respectively, to an extent and relative to a location (e.g., the origin point relative to which the representation of the media item is rescaled by the zooming) determined based on the display-transformation input, without rescaling the placement user interface element directly based on the display-transformation input. In another example, if the display-transformation input corresponds to a request to pan the representation of the first previously-captured media item, the representation of the first media item is panned (e.g., a translation operation is performed) by an amount determined based on the display-transformation input, without changing a location of the placement user interface element in the user interface directly based on the display-transformation input. In some circumstances (e.g., where the display-transformation input corresponds to at least a request to pan the representation of the previously-captured media item), prior to panning the representation of the previously-captured media item, the location in the representation of the previously-captured media item that is indicated by the placement user interface element corresponds to a first location in the physical environment; and after panning the representation of the previously-captured media item, the location in the representation of the previously-captured media item that is indicated by the placement user interface element corresponds to a second location, different from the first location, in the physical environment.

Displaying the one or more transformations of the representation of the first previously-captured media item in accordance with the display-transformation input while concurrently maintaining the display of the placement user interface element at the predefined location relative to the display generation component provides the user with increased control over the location within a media item (e.g., an image) where measurement points will be added while maintaining predictability as to the location on the display where the user can expect to see the measurement points appear. Providing additional control options without cluttering the user interface with additional displayed controls and providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the first representation of the first measurement (e.g., measurement segment 1242 in FIG. 12T) corresponds (1618) to a first dimension of an object in the physical environment captured in the first media item (e.g., the height of a box captured in the media item), and, after receiving the one or more first inputs, the system displays one or more indications of measurements (e.g., visual indications 1248-1 and 1248-2 of FIG. 12U) corresponding to one or more additional dimensions (e.g., different from the first dimension) of the object based on depth data associated with the first previously-captured media item. In some embodiments, the computer system detects and measures the additional dimensions (e.g., automatically) without additional user input. In some embodiments, in response to a user input selecting the one or more indications (e.g., or any respective indication) (e.g., prompt 1247 in FIG. 12U), the system: displays, via the display generation component, representations of the measurements corresponding to the one or more additional dimensions of the object in combination with displaying the first representation of the first measurement (e.g., such that the measurements of all three dimensions of the box are displayed); and displays, via the display generation component, one or more additional labels corresponding to the representations of the measurements corresponding to the one or more additional dimensions, wherein the one or more additional labels describe the measurements corresponding to the one or more additional dimensions (e.g., the one or more additional labels are shown in addition to the first label, or alternatively, the first label is updated to describe all measurements).

Displaying the one or more indications of measurements corresponding to one or more additional dimensions of the object based on depth data associated with the first previously-captured media item, after receiving the one or more first inputs, provides the user with feedback about additional measurements that can be made for other automatically detected dimensions of the same object (e.g., that are likely also of interest to the user based on the user having already measured the object in one dimension). Providing improved visual feedback (e.g., automatically) when a set of conditions has been met enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the system displays (1620), via the display generation component, a respective visual indicator (e.g., dotted box 1266 in FIG. 12OO) associated with a respective portion of the physical environment that includes respective depth information (e.g., where a physical object such as a box in the physical environment has respective depth information, a visual indicator is displayed to alert a user of the depth information associated with the physical object). In some embodiments, in response to selection of the visual indicator by a user input (e.g., contact 1270 in FIG. 12PP), measurements of the physical object are displayed based on the depth information. Displaying the respective visual indicator associated with the respective portion of the physical environment that includes respective depth information provides visual feedback to the user that depth information associated with the physical object is available and that measurements can be made of the physical object. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, in response to receiving an input corresponding to a request to display a representation of a second previously-captured media item (e.g., a second previously-captured photograph or video), the system displays (1622), via the display generation component, the representation of the second previously-captured media item, including, in accordance with a determination that the second previously-captured media item is associated with (e.g., includes) depth information corresponding to at least a portion of the first respective portion of the physical environment (e.g., the same location in physical space to which the first measurement corresponds), displaying at least a portion of the first representation of the first measurement (e.g., and the first label) over the at least a portion of the first respective portion of the physical environment captured in the second previously-captured media item. In some embodiments, the first representation of the first measurement is displayed over the second previously-captured media item so as to correspond to the same location in physical space as in the first previously-captured media item. More generally, in some embodiments an input is received that corresponds to a request to display a second object (e.g., such as a representation of a different (e.g., previously-captured) media item, a three-dimensional model view, an orthographic view, etc.), and the second object is displayed in response, including displaying one or more annotations (e.g., drawing annotations, representations of measurements, virtual objects, etc.) from the first representation of the first previously-captured media item in the second object based on the one or more annotations corresponding to overlapping portions of the physical environments captured in the first representation of the first previously-captured media item and the second object.

Displaying a virtual measurement in a second media item (e.g., a second image) that captures some or all of the same portion of the physical environment to which the virtual measurement was added in the first media item enables the user to visualize virtual measurements in context when switching between different representations without requiring the user to repeat the process for adding the virtual measurements. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the system receives (1624) one or more inputs corresponding to a request to perform one or more transformations of the portion of the representation of the first previously-captured media item over which the first representation of the first measurement is displayed (e.g., an input corresponding to a request to shrink (e.g., zoom out) the portion of the representation of the first previously-captured media item and/or to pan or scroll the representation of the first previously-captured media item such that the portion of the representation of the first previously-captured media item moves partially out of view, or, in embodiments involving a live view of one or more cameras, an input corresponding to a request to zoom out or move the field of view of the one or more cameras such that the portion of the live view over which the first representation of the first measurement displayed shrinks and/or moves partially out of view). In some embodiments, in response to receiving the one or more inputs corresponding to the request to perform one or more transformations of the portion of the representation of the first previously-captured media item, the system: performs the one or more transformations of at least the portion of the representation of the first previously-captured media item (e.g., while maintaining display of the first representation of the first measurement over the transformed portion of the representation of the first previously-captured media item); and, in accordance with a determination that the one or more transformations performed in response to receiving the one or more inputs decrease a size of the portion of the representation of the first previously-captured media item to a size that is below a threshold size (e.g., such that the first representation of the first measurement correspondingly decreases to below a threshold displayed size), ceases to display the first label corresponding to the first representation of the first measurement.

In some embodiments, while the first representation of the first measurement is displayed, the first label corresponding to the first representation of the first measurement is displayed in accordance with a determination that the first representation of the first measurement corresponding to the first respective portion of the physical environment is displayed with a visual property (e.g., length or area) that is at least a threshold value (e.g., meets, or exceeds, a minimum threshold distance or area on the display). Stated another way, in some embodiments, in accordance with a determination that the one or more transformations performed in response to receiving the one or more inputs decrease a size of the portion of the representation of the first previously-captured media item to a size that is above the threshold size, the system maintains display of the first label corresponding to the first representation of the first measurement. In some embodiments, in accordance with a determination that the first representation of the first measurement corresponding to the first respective portion of the physical environment captured in the media item is displayed with a visual property (e.g., length or area) that is below the threshold value (e.g., below, or at or below, the minimum threshold distance or area on the display), the system forgoes displaying the first label.

In some embodiments, for any respective input corresponding to a request to display a representation of a measurement corresponding to a respective portion of the physical environment, the computer system displays the requested representation of a measurement and a corresponding label if the measurement meets a threshold measurement value; if the measurement does not meet the threshold measurement value, the computer system displays the requested representation of a measurement and forgoes displaying the corresponding label (e.g., or, alternatively, forgoes displaying both the requested representation of a measurement and the corresponding label).

Ceasing to display the label for a measurement of a media item when panning/scrolling or zooming of the media item has caused the representation of the measurement to be displayed at a size that is below a threshold size (e.g., due to panning/scrolling such that too little of the measurement segment remains displayed and/or zooming out too far such that the measurement segment has shrunk too small) provides visual feedback to the user indicating that the first measurement has reached a threshold display size and avoids cluttering the user interface with labels for measurements that are too small in relation to the remainder of the displayed media item. Providing improved visual feedback without cluttering the user interface enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the system receives (1626) an input corresponding to a request to enlarge (e.g., zoom-in) the portion of the representation of the first previously-captured media item over which the first representation of the first measurement (e.g., measurement segment 1261 in FIG. 12FF) is displayed, and, in response to receiving the input corresponding to the request to enlarge the portion of the representation of the first previously-captured media item over which the first representation of the first measurement is displayed: the system enlarges the representation of the first previously-captured media item, including the portion over which the first representation of the first measurement is displayed; and, in accordance with a determination that the displayed portion of the enlarged representation of the first previously-captured media item is enlarged above a predefined enlargement threshold (e.g., the user has zoomed in too much into the representation of the previously-captured media item so that the remaining displayed portion of the representation of the previously-captured media item is displayed at a zoom factor above a threshold zoom factor, or, stated another way, so that the remaining displayed portion of the representation of the previously-captured media item represents less than a threshold fraction, or percentage, of the entire representation of the previously-captured media item), the system ceases to display the first label (e.g., label 1259 in FIG. 12FF) (e.g., and in some embodiments ceasing to display all labels within the displayed portion of the enlarged representation of the first media item). In some embodiments, in accordance with a determination that the displayed portion of the enlarged first previously-captured media item is not enlarged above the predefined enlargement threshold, the system maintains display of the first label.

In some embodiments (e.g., while enlarging the representation of the first media item), the first representation of the first measurement is also enlarged (e.g., by a corresponding amount, such that display of the first representation of the first measurement over the corresponding portion of the representation of the first previously-captured media item is maintained during the zooming). For example, a representation of an object is enlarged in accordance with enlarging the representation of the first media item, and the representation of the measurement, corresponding to the object, is also enlarged so that the representation of the measurement of the object continues to be displayed over the (e.g., enlarged) representation of the object. In some embodiments, enlarging the representation of the first media item includes ceasing to display portions of the representation of the first media item that are enlarged beyond the display. Similarly, in some embodiments, enlarging the first representation of the first measurement includes ceasing to display portions of the first representation of the first measurement that are enlarged beyond the display.

Ceasing to display the first label in accordance with the determination that the media item has been enlarged such that the displayed portion of the enlarged representation of the first media item is enlarged above a threshold provides improved visual feedback to the user indicating that the representation of the first media item has reached a threshold degree of enlargement (e.g., a threshold zoom-in factor) and avoids cluttering the user interface with labels for measurements that are too large in relation to the displayed (e.g., zoomed-in) portion of the media item. Providing improved visual feedback without cluttering the user interface enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the first label (e.g., label 1244 in FIG. 12Y) corresponding to the first representation of the first measurement is (1628) displayed in a predetermined portion (e.g., display region) of the display generation component (e.g., displayed at the bottom of the display, as shown in FIG. 12Y). More generally, in some embodiments, one or more labels for respective representations of measurements (e.g., that is/are selected or with which the user is interacting) are displayed in the predetermined portion of the display generation component. Displaying the first label corresponding to the first representation of the first measurement in a predetermined portion of the display generation component provides measurement information in a consistent and predictable location in the user interface rather than requiring the user to visually search the user interface for measurement information. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the one or more first inputs include (1630) selection of a representation of an object (e.g., the representation of table 1206 in FIG. 12PP) (e.g., an object for which depth information is available) in the representation of the first previously-captured media item, and the first representation of the first measurement includes one or more measurements of (e.g., dimensional information of) the object. Displaying the one or more measurements of the object in response to the selection (e.g., by contact 1270 in FIG. 12PP) of the representation of the object provides information about (e.g., one or more measurements of) the object in response to a minimal number of inputs. Reducing the number of inputs needed to perform an operation enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the one or more first inputs include (1632) one input (e.g., only one input, such as contact 1270 in FIG. 12PP), and displaying the first representation of the first measurement over at least the portion of the representation of the first media item includes displaying a plurality of respective representations of measurements of a plurality of dimensions of an object over a portion of the representation of the first media item that includes a representation of the object (e.g., measurement segments 1271-1, 1271-2 and 1271-3, as shown in FIG. 12QQ). For example, if the object is a cuboid, a single selection of the representation of the cuboid in the first media item, such as a tap at a location on touch-sensitive surface that corresponds to the displayed cuboid, results in display of multiple dimensional measurements, such as height, width, and/or length, of the cuboid, as described herein with reference to FIGS. 12OO-12QQ, for example. In some embodiments, the device displays multiple dimensional measurements of the object in response to a request to display the first media item without additional inputs (e.g., dimensional measurements of objects with depth information are automatically displayed when the media item is displayed). Displaying multiple measurements of a plurality of dimensions of an object in response to one input reduces the number of inputs and amount of time needed to make multiple measurements of an object. Reducing the number of inputs needed to perform an operation enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the system receives (1634) an input corresponding to a request to display an orthographic view of the physical environment, and, in response to receiving the input corresponding to the request to display an orthographic view (e.g., a floor plan view) of the physical environment, the system displays, via the display generation component, the orthographic view (e.g., the top orthographic view on user interface 1210-9 in FIG. 12R) of the physical environment, including displaying, in the orthographic view, a representation of the first measurement at a location in the orthographic view that corresponds to the first respective portion of the physical environment. In response to a request to display an orthographic view of the physical environment, displaying both the orthographic view and virtual measurements that have been added in a previous view provides the user with a different type of view and thus more information about both the physical environment and added measurements without requiring the user to repeat the process for adding the virtual measurements. Providing improved visual feedback to the user enhances the operability of the system and makes the user-device interface more efficient (e.g., by helping the user to achieve an intended result and reducing user mistakes when interacting with the system) which, additionally, reduces power usage and improves battery life of the system by enabling the user to use the system more quickly and efficiently.

In some embodiments, while displaying the first representation of the first measurement over at least a portion of the representation of the first previously-captured media item that corresponds to the first respective portion of the physical environment captured in the representation of the first media item, the system receives (1636) an input corresponding to a request to display an exploded view of an object in the physical environment, and, in response to receiving the input corresponding to the request to display an object of the physical environment in an exploded view, the system displays, via the display generation component, a plurality of sub-components of the object separated from each other by more space than the sub-components are separated from each other in the physical space. Stated another way, the plurality of sub-components of the object are displayed in an exploded view in which elements of the object are displayed slightly separated by distance in space, and one or more elements are optionally labeled with measurements based on depth information about the object. In some embodiments, the exploded view is displayed as an orthographic view (e.g., a two-dimensional representation of the separated plurality of sub-components). In some embodiments, the exploded view is displayed as an image view (e.g., a photorealistic view, or alternatively a three-dimensional model view, of the separated plurality of sub-components). In some embodiments, the input corresponding to the request to display the exploded view includes a request to move a control element (e.g., slider thumb) of a slider user interface element, and the displacement of the control element on the slider corresponds to the extent of the exploded view (e.g., the degree of separation of the sub-components).

Displaying an exploded view of an object not only provides the user with a different type of view and thus more information about a physical object but also enables the user to visualize different pieces of the physical object individually and provides the user with more detailed information about these pieces. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the computer system includes one or more cameras (e.g., optical sensor(s) 164 (FIG. 1A) or camera(s) 305 (FIG. 3B)), and the system displays (1638), via the display generation component, a representation of at least a portion of a respective physical environment that is in a field of view of the one or more cameras (e.g., a live representation that changes as a field of view of the one or more cameras changes due to movement of the one or more cameras and/or movement of one or more objects in the field of view of the one or more cameras), wherein the representation of the portion of the respective physical environment that is in the field of view of the one or more cameras is associated with (e.g., includes) depth information corresponding to at least the portion of the respective physical environment. In some embodiments, while displaying the representation of the portion of the respective physical environment that is in the field of view of the one or more cameras, the system receives, via the one or more input devices, one or more third inputs corresponding to a request to display, in the representation of the portion of the respective physical environment that is in the field of view of the one or more cameras, a third representation of a third measurement corresponding to a respective portion of the respective physical environment. In some embodiments, in response to receiving the one or more third inputs corresponding to the request to display the third representation of the third measurement in the representation of the portion of the respective physical environment that is in the field of view of the one or more cameras, the system: displays, via the display generation component, the third representation of the third measurement over at least a portion of the representation of the portion of the respective physical environment that is in the field of view of the one or more cameras that corresponds to the respective portion of the respective physical environment; and displays, via the display generation component, a third label corresponding to the third representation of the third measurement that describes the third measurement based on the depth data that is associated with the representation of the portion of the respective physical environment that is in the field of view of the one or more cameras.

Displaying a virtual measurement on a live view of a physical environment enables a user to make contemporaneous measurements of a physical environment that the user is currently in. Providing additional control options and improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, displaying the representation of at least the portion of the respective physical environment includes (1640) updating the representation of the portion of the respective physical environment that is in the field of view of the one or more cameras to include representations of respective portions of the physical environment that are in (e.g., that enter) the field of view of the one or more cameras as the field of view of the one or more cameras moves. In some embodiments, while updating the representation of the portion of the respective physical environment that is in the field of view of the one or more cameras, the system displays, in the representation of the portion of the respective physical environment that is in the field of view of the one or more cameras, one or more indications of respective measurements (e.g., or alternatively in some embodiments, one or more representations of measurements, optionally with labels, such as the measurement segments in FIG. 12NN) corresponding to one or more physical objects that are in (e.g., that enter) the field of view of the one or more cameras as the field of view of the one or more cameras moves. Displaying indications of measurements while updating the live view of the physical environment as the cameras move automatically provides the user with additional information about the physical environment and indications of measurements that can be made as the user scans the physical environment with the cameras. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

It should be understood that the particular order in which the operations in FIGS. 16A-16E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, 1500, 1700, and 1800) are also applicable in an analogous manner to method 1600 described above with respect to FIGS. 16A-16E. For example, the physical environments, features, and objects, virtual objects, inputs, user interfaces, views of the physical environment, media items, and annotations (e.g., representations of measurements) described above with reference to method 1600 optionally have one or more of the characteristics of the physical environments, features, and objects, virtual objects, inputs, user interfaces, views of the physical environment, media items, and annotations (e.g., representations of measurements) described herein with reference to other methods described herein (e.g., methods 700, 800, 900, 1000, 1500, 1700, and 1800). For brevity, these details are not repeated here.

FIGS. 17A-17D are flow diagrams illustrating method 1700 of transitioning between displayed media items and different media items selected by a user for viewing in accordance with some embodiments. Method 1700 is performed at a computer system (e.g., portable multifunction device 100 (FIG. 1A), device 300 (FIG. 3A), or computer system 301 (FIG. 3B)) having a display generation component (e.g., a display, a projector, a heads up display or the like) (e.g., touch screen 112 (FIG. 1A), display 340 (FIG. 3A), or display generation component(s) 304 (FIG. 3B)) and one or more input devices (e.g., touch screen 112 (FIG. 1A), touchpad 355 (FIG. 3A), or input device(s) 302 (FIG. 3B)), optionally one or more cameras (e.g., optical sensor(s) 164 (FIG. 1A) or camera(s) 305 (FIG. 3B)), and optionally one or more depth sensing devices (e.g., one or more depth sensors such as time-of-flight sensor 220 (FIG. 2B)). Some operations in method 1700 are, optionally, combined and/or the order of some operations is, optionally, changed.

As described below, method 1700 displays an animated transition from a representation of a first previously-captured media item to a representation of a second previously-captured media item, based on a difference between the first viewpoint of the first previously-captured media item and the second viewpoint of the second previously-captured media item, thus providing a user with visual feedback that not only indicates that a transition is taking place between two previously-captured media items representing two different physical environments but also enables the user to more quickly ascertain the relationship between the viewpoints from which each media item was captured relative to each other and to the physical environment. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

The system displays (1702), via the display generation component, a representation of a first previously-captured media item (e.g., an RGB image such as media item 1326 in user interface 1314 in FIG. 13K) that includes a representation of a first physical environment (e.g., a first portion of physical environment 1300) from a first viewpoint (e.g., indicated by camera location 1303-5 and field of view 1305-5).

The system receives (1704), via the one or more input devices, an input (e.g., a swiping gesture on a touch-sensitive display, such as the rightward swipe by contact 1330 in FIG. 13L) corresponding to a request to display a representation of a second previously-captured media item (e.g., another RGB image such as media item 1332 in FIG. 13N) that includes a representation of a second physical environment (e.g., a second portion of physical environment 1300) from a second viewpoint (e.g., indicated by camera location 1303-4 and field of view 1305-4 in FIG. 13N). In some embodiments, the request to display the representation of the second previously-captured media item is a request to replace display of the representation of the first previously-captured media item with the representation of the second previously-captured media item. In some embodiments, the representations of the first and the second previously-captured media items are still images (e.g., or initial frames of videos) taken from different viewpoints (e.g., different perspectives).

In response to receiving the input corresponding to the request to display the representation of the second previously-captured media item (1706): in accordance with a determination that one or more properties (e.g., determined location of the device in the physical environment, visible portion of the physical environment, viewpoint of the physical environment, capture time or timestamp, etc.) of the second previously-captured media item meet proximity criteria with respect to one or more corresponding properties (e.g., physical environment, viewpoint, timestamp, etc., respectively) of the first previously-captured media item (1708): the system displays (1710) an animated transition (e.g., the animated transition shown in FIG. 13M) from the representation of the first previously-captured media item to the representation of the second previously-captured media item that is determined based on a difference between the first viewpoint of the first previously-captured media item and the second viewpoint of the second previously-captured media item (e.g., in accordance with a determination that there is a first difference between the first viewpoint of the first previously-captured media item and the second viewpoint of the second previously-captured media item, the animated transition has a first appearance and in accordance with a determination that there is a second difference between the first viewpoint of the first previously-captured media item and the second viewpoint of the second previously-captured media item that is different from the first difference, the animated transition has a second appearance that is different from the first appearance).

In some embodiments, the proximity criteria include an environment overlap requirement, requiring that at least a portion of the first physical environment represented in the first still image and at least a portion of the second physical environment represented in the second still image correspond to a same portion of a same physical environment (optionally requiring at least a threshold degree or amount of overlap). In some embodiments, the proximity criteria include a viewpoint proximity requirement, requiring that the first viewpoint (e.g., camera position) from which the first image was captured and the second viewpoint (e.g., camera position) from which the second image was captured are within a predefined threshold distance from each other. In some embodiments, the proximity criteria include a capture time proximity requirement, requiring that the first image and the second image were captured within a predefined threshold amount of time from each other (e.g., a timestamp corresponding to a time of capture of the first image is within the predefined threshold amount of time from a timestamp corresponding to a time of capture of the second image). In some embodiments, the proximity criteria include any combination of (e.g., two or more of) the above-discussed requirements, optionally without regard to whether any requirements not included in the proximity criteria are met (e.g., the proximity criteria include the viewpoint proximity requirement optionally without regard to whether the environment proximity requirement is met (e.g., without regard to whether the first image includes a representation of any portion of a physical environment that is also represented in the second image)). One of ordinary skill in the art will recognize that the requirement(s) included in the proximity criteria are not limited to those discussed above.

In some embodiments, the animated transition includes one or more transformations (e.g., rotating in FIGS. 13J and 13M, zooming in FIGS. 13W-13X, and/or translating in FIGS. 13AA-13CC) of the first previously-captured media item based on the difference between the first viewpoint and the second viewpoint. In some embodiments, the animated transition includes one or more transformations (e.g., rotating, zooming, and/or translating, optionally corresponding to transformations to the first previously-captured media item) of the second previously-captured media item based on the difference between the first viewpoint and the second viewpoint. In some embodiments, transitioning from the first still image to the second still image involves any combination of: translating (e.g., a shift in perspective from the first viewpoint to the second viewpoint such that the first still image appears to move out of the field of view of the display generation component and the second still image appears to move into the field of view of the display generation component in a direction opposite the first vector); zooming (e.g., a shift in perspective from the first viewpoint to the second viewpoint that appears as movement toward or away from a subject in the first still image that appears closer or further, respectively, in the second still image); rotating (e.g., where the second viewpoint, with respect to a subject that appears in both the first and second still images, is rotated relative to the first viewpoint with respect to that subject in the first still image), and/or otherwise distorting the first still image to simulate movement toward the second viewpoint of the second still image (e.g., to simulate the changes in view during movement in physical space from the first viewpoint to the second viewpoint). Example transformations, any combination of which could be included in the animated transition between two media items, are described in more detail herein with respect to operations 1714, 1716, 1718, and 1720 and FIGS. 13J, 13M, 13P-13Q, 13W-13X, and 13AA-13CC.

In some embodiments, in response to receiving the input corresponding to the request to display the representation of the second previously-captured media item (1706): in accordance with a determination that the one or more properties of the second previously-captured media item do not meet the proximity criteria with respect to the one or more corresponding properties of the first previously-captured media item (1712): the system displays the representation of the second previously-captured media item without displaying an animated transition from the representation of the first previously-captured media item to the representation of the second previously-captured media item that is determined based on a difference between the first viewpoint of the first previously-captured media item and the second viewpoint of the second previously-captured media item (e.g., a perspective-based animated transition is not displayed when switching between media item 1332 in FIG. 13O and media item 1337 in FIG. 13R because media items 1332 and 1337 do not meet the proximity criteria). In some embodiments, the display generation component displays a different transition that is not a viewpoint-based transition, such as a slide-show style transition (e.g., the transition in FIGS. 13P-13Q is not a perspective-based animated transition). In some embodiments, the display generation component does not display any transition from the representation of the first previously-captured media item to the representation of the second previously-captured media item.

In some embodiments, the determination that the one or more properties of the second previously-captured media item do not meet the proximity criteria with respect to the one or more corresponding properties of the first previously-captured media item include a determination that the first and second previously-captured media items overlap by less than a threshold amount (e.g., determined based on a degree of overlap between the first physical environment and the second physical environment). In some embodiments, the determination that the one or more properties of the second previously-captured media item do not meet the proximity criteria with respect to the one or more corresponding properties of the first previously-captured media item includes a determination that the first and the second previously-captured media items were not captured within a predefined threshold distance from each other. In some embodiments, the determination that the one or more properties of the second previously-captured media item do not meet the proximity criteria with respect to the one or more corresponding properties of the first previously-captured media item includes a determination that the first and the second previously-captured media items were not captured within a predefined threshold amount of time from each other. In some embodiments, the determination that the one or more properties of the second previously-captured media item do not meet the proximity criteria with respect to the one or more corresponding properties of the first previously-captured media item includes a determination that the first and the second previously-captured media items were not captured in the same camera session.

Displaying the representation of the second previously-captured media item without displaying an animated transition from the representation of the first previously-captured media item to the representation of the second previously-captured media item in accordance with the determination that the one or more properties of the second previously-captured media item do not meet the proximity criteria provides improved visual feedback to the user indicating that the proximity criteria are not met (e.g., the two media items were captured too far apart in time or space) and avoids displaying an animated transition that may be inaccurate or disorienting due to insufficient information about the physical environment being available (e.g., where information about portions of the physical environment between the first and second viewpoints is unavailable). Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

Referring again to operation 1710, in some embodiments, displaying the animated transition includes (1714) gradually fading one or more visual properties of the representation of the first previously-captured media item. In some embodiments, where the first representation of the previously-captured media item and the second representation of the previously-captured media item are both RGB (e.g., and in some embodiments photorealistic) images, during the animated transition, colors, textures, hues, and other visual properties of the first representation gradually fade to show only dimensional information (e.g., in black-and-white or grayscale) during the animated transition. Gradually fading one or more visual properties of the representation of the first previously-captured media item during the animated transition provides improved visual feedback to the user by indicating that a transition between media items is taking place and orients the user to the viewpoint of the second media item more quickly (e.g., by emphasizing major features in the media items and omitting excessive detail during the transition). Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the difference between the first viewpoint and the second viewpoint includes (1716) forward or backward movement (e.g., movement of the camera or viewer in a z-direction relative to the first previously-captured media item) from the first viewpoint to the second viewpoint, and displaying the animated transition includes simulating movement along a vector that extends from (e.g., starts at) the first viewpoint to (e.g., ends at) the second viewpoint at least in part by rescaling the representation of the first previously-captured media item (e.g., in a first manner, such as zooming in for forward movement from the first viewpoint, or zooming out for backward movement from the first viewpoint, and, in some embodiments, optionally rescaling the representation of the second previously-captured media item in the same first manner (e.g., zooming in for forward movement toward the second viewpoint, or zooming out for backward movement toward the second viewpoint)) while progressively ceasing to display the representation of the first previously-captured media item and progressively displaying the representation of the second previously-captured media item (e.g., the transition shown in FIG. 13W-13X).

For example, where the change in viewpoint corresponds to backward movement from the first viewpoint to the second viewpoint (e.g., such that the representation of the first media item corresponds to a subset of the field of view from the second viewpoint), the animated transition includes shrinking (e.g., scaling down, optionally maintaining aspect ratio) the representation of the first media item and, optionally, shrinking the representation of the second media item from a partial view of the representation of the second media item (e.g., the portion that corresponds to the first viewpoint) to a full view of the representation of the second media item. In another example, where the change in viewpoint corresponds to forward movement from the first viewpoint to the second viewpoint, the animated transition includes enlarging (e.g., scaling up, optionally maintaining aspect ratio) the representation of the first media item and, optionally, enlarging the representation of the second media item from a zoomed-out view of the representation of the second media item (e.g., such that the representation of the second media item occupies only a portion of the display and overlaps with a corresponding portion of the representation of the first media item) to a full-display view of the representation of the second media item.

Displaying an animated transition that includes rescaling of the first media item while progressively replacing the first media item with the second media item provides visual feedback indicating to the user that the viewpoint from which the second media item was captured corresponds to forward or backward movement within the physical environment from the viewpoint from which the first media item was captured. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the difference between the first viewpoint and the second viewpoint includes (1718) rotation from the first viewpoint to the second viewpoint (e.g., corresponding to rotation of a camera about its roll axis (a z-axis relative to the first previously-captured media item), similar to a person tilting his head left or right, resulting for example in rotation of a horizon line relative to the edges of the field of view of the camera, such as the difference between the camera viewpoints of media items 1315 (FIG. 13H) and 1326 (FIG. 13K); rotation of the camera about its pitch axis (an x-axis relative to the first previously-captured media item), similar to a person raising or lowering his head to look up or down; and/or rotation of the camera about its yaw axis (a y-axis relative to the first previously-captured media item), similar to a person turning his head to look left or right, such as the difference between the camera viewpoints of media items 1326 and 1332). In some embodiments, displaying the animated transition includes rotating and/or skewing the representation of the first previously-captured media item from a first view associated with the first viewpoint of the representation of the first previously-captured media item to a second view associated with the second viewpoint of the representation of the second previously-captured media item (optionally while progressively ceasing to display the representation of the first previously-captured media item and progressively displaying the representation of the second previously-captured media item). In some embodiments, while progressively displaying the representation of the second previously-captured media item, the representation of the second previously-captured media item is (e.g., also) rotated and/or skewed from a view associated with the first viewpoint to a view associated with the second viewpoint (e.g., as in the transition in FIG. 13J from media item 1315 to media item 1326, and in the transition in FIG. 13M from media item 1326 to media item 1332).

Displaying an animated transition, from a first media item to a second media item, that includes rotation of the first media item provides visual feedback indicating to the user that the viewpoint from which the second media item was captured is rotated in the physical environment relative to the viewpoint from which the first media item was captured. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the difference between the first viewpoint and the second viewpoint includes (1720) lateral movement (e.g., of a camera or viewer) from the first viewpoint to the second viewpoint (e.g., corresponding to physical displacement of the camera in physical space while keeping the lens at a constant angle (translation along an x-axis and/or a y-axis relative to the first previously-captured media item), such as the difference between the camera viewpoints of media items 1348 and 1354), and displaying the animated transition includes shifting (e.g., translation of) the representation of the first previously-captured media item laterally by an amount (e.g., and in a direction) based on the lateral movement from the first viewpoint to the second viewpoint (optionally while progressively ceasing to display the representation of the first previously-captured media item and progressively displaying the representation of the second previously-captured media item) (e.g., the transition in FIGS. 13AA-13CC). In some embodiments (e.g., while progressively displaying the representation of the second previously-captured media item), the representation of the second previously-captured media item is (e.g., also) shifted laterally by an amount based on the difference between the first viewpoint and the second viewpoint. For example, where the second viewpoint is to the right of the first viewpoint, the first previously-captured media item is shifted leftward from the center of the display, appearing to move "off of" the display toward the left, while the second previously-captured media item is shifted leftward toward the center of the display, appearing to move "onto" the display from the right, optionally.

In some embodiments, the shifting in the animated transition is in a direction that is based on the difference between the first viewpoint and the second viewpoint without regard to a direction of the input corresponding to the request to display the representation of the second previously-captured media item. For example, although the input may include a leftward swipe gesture, if the second viewpoint is to the left of the first viewpoint, the animated transition includes rightward shifting of the first and second previously-captured media items without regard to the direction of the input (leftward in this example), such that the first previously-captured media item is shifted rightward from the center of the display, appearing to move "off of" the display toward the right, while the second previously-captured media item is shifted rightward toward the center of the display, appearing to move "onto" the display from the left, so as to simulate movement from the first viewpoint to the second viewpoint.

Displaying an animated transition, from a first media item to a second media item, that includes lateral translation of the first media item provides visual feedback indicating to the user that the viewpoint from which the second media item was captured is laterally shifted in the physical environment (e.g., to the side of) the viewpoint from which the first media item was captured. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

Referring again to operation 1712, in some embodiments, the determination that the one or more properties of the second previously-captured media item do not meet the proximity criteria with respect to the one or more corresponding properties of the first previously-captured media item includes (1722) a determination that an amount of time between a time of capture of the first previously-captured media item (e.g., as indicated by a timestamp associated with the first previously-captured media item) and a time of capture of the second previously-captured media item (e.g., as indicated by a timestamp associated with the first previously-captured media item) is greater than (alternatively, greater than or equal to) a predefined threshold amount of time. Forgoing displaying the animated transition if the amount of time between the time of capture of the first previously-captured media item and the time of capture of the second previously-captured media item is greater than a predefined threshold amount of time provides improved visual feedback to the user by indicating that the proximity criteria are not met (e.g., the two media items were captured too far apart in time) and avoids displaying an animated transition that may be incomplete or disorienting due to insufficient or inaccurate information about the physical environment being available (e.g., due to limitations in visual odometry resulting in inaccurate capture or assessment of the physical environment when camera capture is temporally interrupted or takes place too far apart in time). Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the determination that the one or more properties of the second previously-captured media item (e.g., media item 1358 in FIG. 13HH) do not meet the proximity criteria with respect to the one or more corresponding properties of the first previously-captured media item (e.g., media item 1354 in FIG. 13EE) includes (1724) a determination that a first camera session in which the first previously-captured media item was captured is different from a second camera session in which the second previously-captured media item was captured. In some embodiments, a camera capture session is initiated when camera application user interface is initially displayed in response to a user input requesting display of the camera application user interface, and concludes when the camera application user interface is dismissed (e.g., without any intervening dismissal of camera application user interface). One or more media items can be captured and/or recorded during the camera capture session. Forgoing displaying the animated transition in accordance with a determination that the first camera session in which the first previously-captured media item was captured is different from the second camera session in which the second previously-captured media item was captured provides improved visual feedback to the user by avoiding displaying an animated transition that may be incomplete or disorienting due to insufficient or inaccurate information about the physical environment being available (e.g., due to limitations in visual odometry that require continual viewing by a camera of a physical environment, resulting in inaccurate assessment of the physical environment when camera capture is interrupted when a camera session is ended). Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the determination that the one or more properties of the second previously-captured media item (e.g., media item 1358 in FIG. 13HH) do not meet the proximity criteria with respect to the one or more corresponding properties of the first previously-captured media item (e.g., media item 1354 in FIG. 13EE) includes (1726) a determination that a distance between a location of capture (e.g., as indicated by a geographical location identifier, such as GPS coordinates, associated with the first previously-captured media item) of the first previously-captured media item and a location of capture (e.g., as indicated by a geographical location identifier associated with the second previously-captured media item) of the second previously-captured media item is greater than (alternatively, greater than or equal to) a predefined threshold distance. Forgoing displaying the animated transition in accordance with a determination that the distance between the location of capture of the first previously-captured media item and the location of capture of the second previously-captured media item is greater than the predefined threshold distance provides the user with improved visual feedback indicating that the proximity criteria are not met (e.g., the two media items were captured too far apart in space), and avoids displaying an animated transition that may be inaccurate or disorienting due to information about portions of the physical environment between the first and second viewpoints being unavailable. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the determination that the one or more properties of the second previously-captured media item do not meet the proximity criteria with respect to the one or more corresponding properties of the first previously-captured media item (e.g., media item 1332 in FIG. 13O) includes (1728) a determination that an amount of spatial overlap between the first physical environment represented in the first previously-captured media item and the second physical environment represented in the second previously-captured media item (e.g., media item 1337 in FIG. 13R) is less than a predefined threshold amount of spatial overlap. In some embodiments, the amount of spatial overlap is determined by comparing depth information (e.g., depth information included in the first media item) indicative of the first physical environment represented in the first media item with depth information (e.g., depth information included in the second media item) indicative of the second physical environment represented in the second media item. For example, a portion of the second previously-captured media item is mapped to a portion of the first previously-captured media item during the determination of the amount of spatial overlap.

Forgoing displaying the animated transition in accordance with a determination that the amount of spatial overlap between the first physical environment represented in the first previously-captured media item and the second physical environment represented in the second previously-captured media item is less than the predefined threshold amount of spatial overlap provides improved visual feedback to the user indicating that the proximity criteria are not met (e.g., the two media items were captured too far apart in space) and avoids displaying an animated transition that may be inaccurate or disorienting due to information about portions of the physical environment between the first and second viewpoints being unavailable (e.g., if at most the lower right corner of the first media item overlaps with the upper left corner of the second media item, information about the physical environment to the right of the portion captured by the first media item and above the portion captured by the second media item would be missing, and similarly information about the physical environment below the portion captured by the first media item and to the left of the portion captured by the second media item would also be missing). Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, in accordance with a determination that one or more first additional media items (e.g., different from the first previously-captured media item) have been captured at one or more first locations in the first physical environment, the system displays (1730), in the representation of the first previously-captured media item, one or more first indicators (e.g., visual indicator 1317 in FIG. 13H) indicating the one or more first locations in the first physical environment. In some embodiments, in accordance with a determination that one or more second additional media items (e.g., different from the second previously-captured media item; optionally, the one or more second additional media items include one or more of the first additional media items) have been captured at one or more second locations in the second physical environment, the system displays, in the representation of the second previously-captured media item, one or more second indicators indicating the one or more second locations in the second physical environment. In some embodiments, the indicators are displayed as partially transparent so as not to completely obscure portions of the representation of the respective media item over which the indicators are displayed. Displaying, in a respective representation of a media item, one or more indicators indicating location(s) where additional media item(s) have been captured provides improved visual feedback to the user indicating additional previously-captured media items captured from additional viewpoints from which the user may explore the physical environment. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, while displaying the representation of the first previously-captured media item, the system displays (1732) a virtual object (e.g., a virtual textbox, a virtual character, a virtual sticker, etc.) over a portion of the representation of the first previously-captured media item corresponding to a portion of the first physical environment (e.g., before receiving an input corresponding to a request to display the representation of the second previously-captured media item). In some embodiments, the virtual object (e.g., annotation 1344, FIG. 13T) is displayed in response to one or more user inputs (e.g., contact 1342, FIGS. 13S-13T). For example, a user activates an "add virtual object" graphical user interface element to select and place one or more virtual objects in the representation of the first previously-captured media item (e.g., in accordance with depth information associated with the first media item). In some embodiments, in response to (e.g., subsequently) receiving the input corresponding to the request to display the representation of the second previously-captured media item: in accordance with a determination that the portion of the first physical environment is included in the second physical environment, the system displays the virtual object over a portion of the representation of the second previously-captured media item corresponding to the portion of the first physical environment (e.g., such that the virtual object appears to stay stationary with respect to the physical environment in the representations of the first and second media items and during the animated transition between the first and second media items); and, in accordance with a determination that the portion of the first physical environment is not included in the second physical environment, the system forgoes displaying the virtual object over (e.g., any portion of) the representation of the second previously-captured media item. For example, annotation 1344 over media item 1337 in FIG. 13V is also displayed over media item 1348 in FIG. 13Y so as to correspond to the same portion of physical environment 1300.

In some embodiments, the determination that the portion of the first physical environment is included in the second physical environment includes a determination that there is at least a threshold amount of overlap between the first physical environment, which was captured in the representation of the first previously-captured media item, and the second physical environment, which was captured in the representation of the second previously-captured media item, and that the virtual object corresponds to physical space that is at least partially within the overlapping region (e.g., media item 1337 (shown in FIGS. 13T-13V) and media item 1348 (shown in FIGS. 13W-13CC) have a threshold amount of overlap, and media item 1348 includes a representation of the same portion of physical environment 1300 that is represented in media item 1337 and to which annotation 1344, see FIG. 13T, was added). In some embodiments, determining that there is at least a threshold amount of overlap between the first physical environment and the second physical environment is based on depth information associated with (e.g., included in, and/or corresponding to a three-dimensional model of) the first and the second previously-captured media items. In some embodiments, the system forgoes displaying the virtual object over the representation of the second previously-captured media item due to the representation of the second previously-captured media item not including the portion of the physical environment that "includes" the virtual object (e.g., that includes the physical space corresponding to the virtual object). In some embodiments, determining that the second previously-captured media item does not include the portion of the physical environment that includes the virtual object is performed at least in part by comparing depth information associated with (e.g., included in) the first and the second previously-captured media items.

Displaying the virtual object over the representation of the second previously-captured media item, in accordance with a determination that a portion of the first physical environment having the virtual object is included in the second physical environment, and forgoing displaying the virtual object over the representation of the second previously-captured media item if such overlap between the first and second physical environments is not present, provides improved visual feedback to the user by maintaining the virtual object at a consistent location and orientation relative to the corresponding physical environment with an appearance that is adjusted for the particular viewpoint of a respective media item, to help the user accurately visualize the virtual object in context in the corresponding physical environment. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, displaying the animated transition from the representation of the first previously-captured media item to the representation of the second previously-captured media item includes (1734) transforming (e.g., rotating, zooming, and/or translating) the virtual object displayed over the portion of the representation of the first previously-captured media item in accordance with one or more transformations of the first previously-captured media item (e.g., the virtual object is transformed in a manner similar to the first previously-captured media item such that the virtual object appears to continue to be displayed over the portion of the representation of the first previously-captured media item that corresponds to the portion of the first physical environment as the transformation(s) of the first previously-captured media item is displayed). For example, annotation 1344 is zoomed (e.g., rescaled) and translated during the animated transition (shown in FIGS. 13V to 13Y) from media item 1337 to media item 1348, because the animated transition includes zooming and rescaling of media item 1337.

In some embodiments, displaying the animated transition from the representation of the first previously-captured media item to the representation of the second previously-captured media item includes, in accordance with the determination that the portion of the first physical environment is included in the second physical environment, transforming the virtual object displayed over the portion of the representation of the second previously-captured media item in accordance with one or more transformations of the second previously-captured media item (e.g., the virtual object is transformed in a manner similar to the second previously-captured media item such that the virtual object appears to continue to be displayed over the portion of the representation of the second previously-captured media item that corresponds to the portion of the first physical environment as the transformation(s) of the second previously-captured media item is displayed). In some embodiments, displaying the virtual object over the portion of the representation of the second previously-captured media includes displaying the virtual object with a second appearance, different from a first appearance with which the virtual object is displayed over the portion of the representation of the first previously-captured media item, based on the difference between the first viewpoint of the first previously-captured media item and the second viewpoint of the second previously-captured media item (e.g., due to rotating, zooming, or translation).

Transforming the virtual object while it is displayed over the first (and second) physical environments in accordance with one or more transformations of the representation of the first physical environment during the animated transition provides improved visual feedback to the user indicating the change of viewpoint from the first viewpoint to the second viewpoint and maintains the virtual object at a consistent location and orientation relative to the corresponding physical environment with an appearance that is adjusted not only for the particular viewpoint of a respective media item but also for the simulated viewpoint(s) during an animated transition between two media items. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the first previously-captured media item (e.g., media item 1315 in FIG. 13I) and the second previously-captured media item (e.g., media item 1326 in FIG. 13K) are (1736) two consecutively-captured media items in a time series (e.g., captured one after another in the same capturing session), and in some embodiments the input corresponding to the request to display the representation of the second previously-captured media item is a swipe gesture on a respective input device of the one or more input devices. Displaying the second previously-captured media item in response to a swipe gesture on the respective input device enables display of a different previously-captured media (e.g., one that was captured immediately before or after the currently-displayed media item) using a single, intuitive gesture. Reducing the number of inputs needed to perform an operation enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the first previously-captured media item was (1738) captured by a first user and the second previously-captured media item was captured by a second user (e.g., the same user or a different user from the user that captured the first previously-captured media item). In some embodiments, the first and the second previously-captured media items are both captured by a first user using an image capturing device (e.g., camera). Alternatively, the first previously-captured media item is captured by the first user and the second previously-captured media item is captured by a second user using a different image capturing device (e.g., camera). In some embodiments, the second user shares the second previously-captured media item with the first user (e.g., over a wired or wireless network connecting the image capturing devices or other respective electronic devices on which the respective media items are stored). Displaying the animated transition between media items captured by different users enables exploration of a physical environment from different viewpoints without requiring those media items to have been captured by the same computer system in response to inputs from the user that is using the computer system. Reducing the number of inputs needed to perform an operation enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

It should be understood that the particular order in which the operations in FIGS. 17A-17D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, 1500, 1600, and 1800) are also applicable in an analogous manner to method 1700 described above with respect to FIGS. 17A-17D. For example, the physical environments, features, and objects, virtual objects, inputs, user interfaces, views of the physical environment, media items, and animated transitions described above with reference to method 1700 optionally have one or more of the characteristics of the physical environments, features, and objects, virtual objects, inputs, user interfaces, views of the physical environment, media items, and animated transitions described herein with reference to other methods described herein (e.g., methods 700, 800, 900, 1000, 1500, 1600, and 1800). For brevity, these details are not repeated here.

FIGS. 18A-18B are flow diagrams illustrating method 1800 of viewing motion tracking information corresponding to a representation of a moving subject in accordance with some embodiments. Method 1800 is performed at a computer system (e.g., portable multifunction device 100 (FIG. 1A), device 300 (FIG. 3A), or computer system 301 (FIG. 3B)) having a display generation component (e.g., touch screen 112 (FIG. 1A), display 340 (FIG. 3A), or display generation component(s) 304 (FIG. 3B)) and one or more cameras (e.g., optical sensor(s) 164 (FIG. 1A) or camera(s) 305 (FIG. 3B)), and optionally one or more depth sensing devices (e.g., one or more depth sensors such as time-of-flight sensor 220 (FIG. 2B)). Some operations in method 1800 are, optionally, combined and/or the order of some operations is, optionally, changed.

As described below, method 1800 displays an annotation corresponding to the movement of an anchor point on a subject in real time as the subject moves, thereby providing improved visual feedback that makes it easier to track the movement of a point of interest on the subject. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

The system displays (1802), via the display generation component, a representation of a field of view (e.g., a live view) of the one or more cameras. The representation of the field of view (e.g., representation 1406 in FIG. 14A) includes a representation of a first subject (e.g., a live, animate subject, such as a person) (e.g., subject 1402 in FIG. 14A) that is in a physical environment in the field of view of the one or more cameras, and a respective portion of the representation of the first subject in the representation of the field of view corresponds to (e.g., includes a representation of) a first anchor point on the first subject (e.g., the anchor point is a point on or portion of the subject that has been selected for movement tracking). In some embodiments, the respective region of the representation of the field of view that corresponds to the anchor point on the first subject is determined using image analysis on the representation of the field of view, optionally based on available depth data that corresponds to the representation of the field of view. In some embodiments, the anchor point on the first subject is selected based on user selection (e.g., by contact 1421 in FIG. 14D) of a respective region of the representation of the field of view (e.g., selection of the representation of subject 1402's wrist in representation 1406 in FIG. 14D). In some embodiments, the anchor point does not move relative to the first subject, even as the first subject moves (e.g., subject 1402's wrist remains the anchor point, even as subject 1402 moves, optionally until a different anchor point is selected).

While displaying the representation of the field of view (1804), the system updates (1806) the representation of the field of view over time based on changes in the field of view. The changes in the field of view include movement of the first subject that moves the first anchor point (e.g., relative to the field of view of the one or more cameras), and, while the first anchor point moves along a path in the physical environment, the respective portion of the representation of the first subject corresponding to the first anchor point changes along a path (e.g., as indicated by annotation 1422 in FIGS. 14E-14G) in the representation of the field of view that corresponds to the movement of the first anchor point. In addition, while displaying the representation of the field of view (1804), the system displays (1808), in the representation of the field of view (e.g., superimposed over at least a portion of the representation of the field of view), an annotation (e.g., a line segment or curve such as annotation 1422 in FIGS. 14E-14G) corresponding to at least a portion of the path of the respective portion of the representation of the first subject corresponding to the first anchor point. In some embodiments, the path includes a plurality (e.g., a series) of locations in the representation of the field of view, and the annotation is concurrently displayed over at least two of the locations. In some embodiments, the display of the representation of the field of view, including the annotation, is updated (in real time) as the changes in the field of view occur (e.g., as the first anchor point moves along the path in the physical environment).

In some embodiments, one or more visual properties of the annotation are varied to represent one or more properties of the corresponding movement of the anchor point. For example, as described herein with reference to annotation 1422 in FIGS. 14E-14G, a first visual property (e.g., color, width, etc.) of a respective region of the annotation represents a first value of a first property (e.g., position, speed, acceleration, etc.) of the corresponding movement of the anchor point. In some embodiments, a respective visual property of the annotation varies along the annotation as the value of the corresponding movement property varies as the anchor point moves (e.g., the color and/or width of the annotation changes along the length of the annotation to represent changes in speed of movement of the anchor point).

In some embodiments, while displaying the annotation, the system displays (1810) a graph (e.g., graph(s) 1436 in FIG. 14X) of one or more properties of the movement of the anchor point (e.g., position, speed, acceleration, etc. with respect to another property such as time). In some embodiments, the graph is updated (e.g., additional graph points are progressively added in real time) as the changes in the field of view occur (e.g., as the anchor point moves). Displaying a graph of one or more properties of the movement of the anchor point while displaying the annotation provides additional information about different properties (e.g., position, speed, acceleration, etc.) of the movement of the anchor point, without requiring the user to navigate to a different user interface to view this information. Providing improved visual feedback with fewer user inputs enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the system stores (1812) (e.g., in a non-transitory computer readable storage medium that is optionally part of the computer system) media (e.g., a video such as video 1425 in FIG. 14I) that includes the representation of the field of view during at least a portion of the updating of the representation of the field of view over time based on the changes in the field of view that include the movement of the first subject that moves the anchor point. In some embodiments, the stored media includes the annotation corresponding to at least a portion of the path of the respective portion of the representation of the first subject corresponding to the first anchor point (e.g., the annotation that tracks at least a portion of the movement of the first anchor point, such as annotation 1422 in FIGS. 14K-14M). In some embodiments, where a graph is also displayed (e.g., as described above with reference to operation 1810), the graph is updated (e.g., additional graph points are progressively added) as the recording is replayed (e.g., the displayed portion of the graph corresponds to the replayed portion of the recording, and optionally the graph does not include any portion corresponding to any portion of the recording that has not yet been replayed). Recording the movement of a subject as well as the annotation corresponding to the movement of the anchor point on the subject provides the user with improved visual feedback (e.g., annotated movement of anchor points) and the option to replay the recording at a later time without requiring repeated live viewing and analysis of the subject's movement. Providing additional control options and improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, displaying the representation of the field of view that includes the representation of the first subject includes (1814) displaying a virtual model (e.g., humanoid model 1438 in FIG. 14EE, or skeletal model 1440 in FIG. 14LL) corresponding to the first subject (e.g., in place of a live view of the first subject that is being captured by the one or more cameras, optionally without replacing elements other than the first subject that are in the live view, such that the virtual model appears in place of the first subject in the physical environment). In some embodiments, the virtual model is a humanoid model (e.g., an avatar, emoji, or skeletal model) that can be animated (e.g., based on movement of the first subject). In some embodiments, the virtual model has the appearance of the first subject (e.g., the appearance of the first subject as captured by the one or more cameras is mapped or projected onto the virtual model). In some embodiments, the virtual model has an appearance that is different from that of the first subject (e.g., an avatar, emoji, or skeletal model). In some embodiments, the movement of the first subject is detected as being associated with a particular activity (e.g., swinging a club or racket), and the virtual model is a predetermined model for the detected activity (e.g., a virtual model that is associated with predefined behaviors that are commonly or likely to be performed while playing sports). Displaying a virtual model corresponding to a subject instead of a live view of the subject provides improved visual feedback to the user indicating that the subject has been identified and modeled, and in some cases, reduces the level of detail in the user interface so that the annotation corresponding to the movement of the anchor point on the subject is more prominent and thus more easily perceived. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the first anchor point is (1816) one of a plurality of anchor points on the first subject, the virtual model (e.g., skeletal model 1440 in FIG. 14LL) includes a plurality of corresponding virtual anchor points, and displaying the virtual model corresponding to the first subject includes displaying the virtual model such that the virtual anchor points on the virtual model correspond respectively to (e.g., are superimposed over) the plurality of anchor points on the first subject (e.g., including updating display of the virtual model so that the virtual anchor points continue to correspond respectively to the plurality of anchor points on the first subject as the first subject moves). Displaying the virtual model such that multiple anchor points on the virtual model are displayed over respective corresponding anchor points on the subject (e.g., such that the virtual model is superimposed over and fitted as closely as possible over the subject), even as the subject moves, provides improved visual feedback indicating to the user that the subject has been identified and modeled, and, in some cases, reduces the level of detail in the user interface so that the annotation corresponding to the movement of the anchor point on the subject is more prominent and thus more easily perceived. Providing improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

In some embodiments, the displayed representation of the field of view (e.g., that is displayed and updated during the movement of the first subject that moves the first anchor point) is (1818) based on a first perspective of the one or more cameras. In some embodiments, concurrently with displaying the representation of the field of view (e.g., representation 1406 in FIG. 14QQ) based on the first perspective of the one or more cameras and updating the representation of the field of view over time based on the changes in the field of view (e.g., from the first perspective of the one or more cameras), the system displays a second view (e.g., top view representation 1456 in FIG. 14QQ) that corresponds to a second perspective of the physical environment that is different from the first perspective of the one or more cameras (e.g., the second perspective is not a perspective view that the one or more cameras have of the first subject, for example where the first perspective of the one or more cameras is a front view of the first subject, and the second perspective is a side view or an overhead view of the first subject). In some embodiments, the second view includes a second representation of the first subject (e.g., from the second perspective) and a second annotation corresponding to at least a portion of the path of the anchor point in the physical environment (e.g., the path of the anchor point as it would have been seen from the second perspective that is determined or calculated based on depth information gathered by the device from the first perspective) (e.g., annotation 1462, FIGS. 14RR-14SS).

In some embodiments, the second view is generated based on depth information about the first subject and physical environment obtained in combination with displaying and updating the representation of the field of view based the movement of the first subject). In some embodiments, the second view is generated at least in part using a virtual model that corresponds to the first subject (e.g., replaces a live view of the first subject from the first perspective). In some embodiments, only partial information (e.g., less than a 360-degree view) about the first subject is available from the perspective of the one or more cameras, and information about the first subject from other perspectives (e.g., information about the far side of the first subject) is not available from the perspective of the one or more cameras; the virtual model provides a representation of the first subject that can be presented from multiple other perspectives besides that of the one or more cameras (e.g., and that can be animated for the other perspectives according to movement of the first subject that is detected from the perspective of the one or more cameras). In some embodiments, concurrently with displaying the representation of the field of view based on the first perspective, any number of additional views from distinct respective perspectives is displayed (e.g., the second view from the second perspective, a third view from a distinct third perspective, etc.).

Simultaneously displaying multiple views of the subject from different perspectives, and corresponding annotations for the movement of the subject from those perspectives, provides the user with multiple types of information about the movement of the subject, without requiring the user to navigate between different user interfaces to view each different type of information, and without requiring repeated viewing and analysis of the subject's movement from each different perspective. Providing additional control options for improved visual feedback enhances the operability of the system and makes the user-device interface more efficient (e.g., by helping the user to achieve an intended result and reducing user mistakes when interacting with the system), which, additionally, reduces power usage and improves battery life of the system by enabling the user to use the system more quickly and efficiently.

It should be understood that the particular order in which the operations in FIGS. 18A-18B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, 1500, 1600, and 1700) are also applicable in an analogous manner to method 1800 described above with respect to FIGS. 18A-18B. For example, the physical environments, features, and objects, virtual objects, inputs, user interfaces, views of the physical environment, and annotations described above with reference to method 1800 optionally have one or more of the characteristics of the physical environments, features, and objects, virtual objects, inputs, user interfaces, views of the physical environment, and annotations described herein with reference to other methods described herein (e.g., methods 700, 800, 900, 1000, 1500, 1600, and 1700). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system with a display generation component, an input device, and one or more cameras that are in a physical environment:
  capturing, via the one or more cameras, information indicative of the physical environment, including information indicative of respective portions of the physical environment that are in a field of view of the one or more cameras as the field of view of the one or more cameras moves, including identifying a plurality of structural features and one or more non-structural objects within the physical environment, wherein the respective portions of the physical environment include a plurality of primary features of the physical environment corresponding to the plurality of structural features identified within the physical environment and one or more secondary features of the physical environment corresponding to the one or more non-structural objects identified within the physical environment; and
  after capturing the information indicative of the physical environment, displaying a user interface, including concurrently displaying:
    graphical representations of the plurality of primary features that are generated with a first level of fidelity in accordance with the identification of the plurality of structural features as the plurality of primary features; and
    one or more graphical representations of the one or more secondary features that are generated with a second level of fidelity in accordance with the identification of the one or more non-structural objects as the one or more secondary features, wherein the second level of fidelity is lower than the first level of fidelity.

2. The method of claim 1, wherein the one or more graphical representations of the one or more secondary features that are generated with the second level of fidelity include one or more icons representing the one or more secondary features.

3. The method of claim 1, wherein the one or more graphical representations of the one or more secondary features include respective three-dimensional geometric shapes outlining respective regions in the user interface that correspond to portions of the physical environment occupied by the one or more secondary features of the physical environment.

4. The method of claim 1, wherein the one or more graphical representations of the one or more secondary features include predefined placeholder furniture.

5. The method of claim 1, wherein the one or more graphical representations of the one or more secondary features include computer aided design (CAD) representations of the one or more secondary features.

6. The method of claim 1, wherein the one or more graphical representations of the one or more secondary features are partially transparent.

7. The method of claim 1, wherein the plurality of primary features of the physical environment generated with the first level of fidelity include one or more walls and/or one or more floors.

8. The method of claim 1, wherein the plurality of primary features of the physical environment generated with the first level of fidelity include one or more doors and/or one or more windows.

9. The method of claim 1, wherein the one or more secondary features of the physical environment generated with the second level of fidelity include one or more pieces of furniture.

10. The method of claim 1, wherein the one or more secondary features include one or more building automation devices, and the one or more graphical representations of the one or more secondary features include graphical indications that the graphical representations of the one or more secondary features correspond to the one or more building automation devices.

11. The method of claim 10, including:
in response to receiving an input at a respective graphical indication that corresponds to a respective building automation device, displaying at least one control for controlling at least one aspect of the respective building automation device.

12. The method of claim 1, wherein:
the user interface includes a first view of the physical environment and a first user interface element, wherein the first view of the physical environment is displayed in response to activation of the first user interface element;
the user interface includes a second user interface element, wherein a second view of the physical environment, different from the first view, is displayed in response to activation of the second user interface element; and
the user interface includes a third user interface element, wherein a third view of the physical environment, different from the first view and from the second view, is displayed in response to activation of the third user interface element.

13. The method of claim 1, wherein identifying the plurality of structural features includes identifying the plurality of structural features in accordance with the plurality of structural features being non-movable features within the physical environment and identifying the one or more non-structural objects includes identifying particular objects in accordance with the particular objects being movable objects.

14. The method of claim 1, including:
displaying the graphical representations of the plurality of primary features with the first level of fidelity in accordance with the plurality of primary features corresponding to one or more walls, one or more floors, one or more ceilings, one or more doors, and/or one or more windows; and displaying the graphical representations of the one or more secondary features with the second level of fidelity in accordance with the one or more secondary features corresponding to one or more pieces of furniture.

15. A computer system, comprising:
a display generation component;
an input device;
one or more cameras that are in a physical environment;
one or more processors; and
memory storing one or more programs, wherein the one or more programs are configured to be executed by the one or more processors, the one or more programs including instructions for:
capturing, via the one or more cameras, information indicative of the physical environment, including information indicative of respective portions of the physical environment that are in a field of view of the one or more cameras as the field of view of the one or more cameras moves, including identifying a plurality of structural features and one or more non-structural objects within the physical environment, wherein the respective portions of the physical environment include a plurality of primary features of the physical environment corresponding to the plurality of structural features identified within the physical environment and one or more secondary features of the physical environment corresponding to the one or more non-structural objects identified within the physical environment; and
after capturing the information indicative of the physical environment, displaying a user interface, including concurrently displaying:
graphical representations of the plurality of primary features that are generated with a first level of fidelity in accordance with the identification of the plurality of structural features as the plurality of primary features; and
one or more graphical representations of the one or more secondary features that are generated with a second level of fidelity in accordance with the identification of the one or more non-structural objects as the one or more secondary features, wherein the second level of fidelity is lower than the first level of fidelity.

16. The computer system of claim 15, wherein the one or more graphical representations of the one or more secondary features that are generated with the second level of fidelity include one or more icons representing the one or more secondary features.

17. The computer system of claim 15, wherein the one or more graphical representations of the one or more secondary features include respective three-dimensional geometric shapes outlining respective regions in the user interface that correspond to portions of the physical environment occupied by the one or more secondary features of the physical environment.

18. The computer system of claim 15, wherein the one or more graphical representations of the one or more secondary features include predefined placeholder furniture.

19. The computer system of claim 15, the one or more graphical representations of the one or more secondary features include computer aided design (CAD) representations of the one or more secondary features.

20. The computer system of claim 15, wherein the one or more graphical representations of the one or more secondary features are partially transparent.

21. The computer system of claim 15, wherein the plurality of primary features of the physical environment generated with the first level of fidelity include one or more walls and/or one or more floors.

22. The computer system of claim 15, wherein the plurality of primary features of the physical environment generated with the first level of fidelity include one or more doors and/or one or more windows.

23. The computer system of claim 15, wherein the one or more secondary features of the physical environment generated with the second level of fidelity include one or more pieces of furniture.

24. The computer system of claim 15, wherein the one or more secondary features include one or more building automation devices, and the one or more graphical representations of the one or more secondary features include graphical indications that the graphical representations of the one or more secondary features correspond to the one or more building automation devices.

25. The computer system of claim 24, wherein the one or more programs include instructions for:
in response to receiving an input at a respective graphical indication that corresponds to a respective building automation device, displaying at least one control for controlling at least one aspect of the respective building automation device.

26. The computer system of claim 15, wherein:
the user interface includes a first view of the physical environment and a first user interface element, wherein the first view of the physical environment is displayed in response to activation of the first user interface element;
the user interface includes a second user interface element, wherein a second view of the physical environment, different from the first view, is displayed in response to activation of the second user interface element; and
the user interface includes a third user interface element, wherein a third view of the physical environment, different from the first view and from the second view, is displayed in response to activation of the third user interface element.

27. The computer system of claim 15, wherein identifying the plurality of structural features includes identifying the plurality of structural features in accordance with the plurality of structural features being non-movable features within the physical environment and identifying the one or more non-structural objects includes identifying particular objects in accordance with the particular objects being movable objects.

28. The computer system of claim 15, wherein the one or more programs include instructions for:
displaying the graphical representations of the plurality of primary features with the first level of fidelity in accordance with the plurality of primary features corresponding to one or more walls, one or more floors, one or more ceilings, one or more doors, and/or one or more windows; and
displaying the graphical representations of the one or more secondary features with the second level of fidelity in accordance with the one or more secondary features corresponding to one or more pieces of furniture.

29. A non-transitory computer readable storage medium storing one or more programs, the one or more programs comprising instructions that, when executed by a computer system that includes a display generation component, an input device, and one or more cameras that are in a physical environment, cause the computer system to:

capture, via the one or more cameras, information indicative of the physical environment, including information indicative of respective portions of the physical environment that are in a field of view of the one or more cameras as the field of view of the one or more cameras moves, including identifying a plurality of structural features and one or more non-structural objects within the physical environment, wherein the respective portions of the physical environment include a plurality of primary features of the physical environment corresponding to the plurality of structural features identified within the physical environment and one or more secondary features of the physical environment corresponding to the one or more non-structural objects identified within the physical environment; and after capturing the information indicative of the physical environment, display a user interface, including concurrently displaying:

graphical representations of the plurality of primary features that are generated with a first level of fidelity in accordance with the identification of the plurality of structural features as the plurality of primary features; and one or more graphical representations of the one or more secondary features that are generated with a second level of fidelity in accordance with the identification of the one or more non-structural objects as the one or more secondary features, wherein the second level of fidelity is lower than the first level of fidelity.

30. The non-transitory computer readable storage medium of claim 29, wherein the one or more graphical representations of the one or more secondary features that are generated with the second level of fidelity include one or more icons representing the one or more secondary features.

31. The non-transitory computer readable storage medium of claim 29, wherein the one or more graphical representations of the one or more secondary features include respective three-dimensional geometric shapes outlining respective regions in the user interface that correspond to portions of the physical environment occupied by the one or more secondary features of the physical environment.

32. The non-transitory computer readable storage medium of claim 29, wherein the one or more graphical representations of the one or more secondary features include predefined placeholder furniture.

33. The non-transitory computer readable storage medium of claim 29, the one or more graphical representations of the one or more secondary features include computer aided design (CAD) representations of the one or more secondary features.

34. The non-transitory computer readable storage medium of claim 29, wherein the one or more graphical representations of the one or more secondary features are partially transparent.

35. The non-transitory computer readable storage medium of claim 29, wherein the plurality of primary features of the physical environment generated with the first level of fidelity include one or more walls and/or one or more floors.

36. The non-transitory computer readable storage medium of claim 29, wherein the plurality of primary features of the physical environment generated with the first level of fidelity include one or more doors and/or one or more windows.

37. The non-transitory computer readable storage medium of claim 29, wherein the one or more secondary features of the physical environment generated with the second level of fidelity include one or more pieces of furniture.

38. The non-transitory computer readable storage medium of claim 29, wherein the one or more secondary features include one or more building automation devices, and the one or more graphical representations of the one or more secondary features include graphical indications that the graphical representations of the one or more secondary features correspond to the one or more building automation devices.

39. The non-transitory computer readable storage medium of claim 38, wherein the one or more programs include instructions that, when executed by the computer system, cause the computer system to:

in response to receiving an input at a respective graphical indication that corresponds to a respective building automation device, display at least one control for controlling at least one aspect of the respective building automation device.

40. The non-transitory computer readable storage medium of claim 29, wherein:

the user interface includes a first view of the physical environment and a first user interface element, wherein the first view of the physical environment is displayed in response to activation of the first user interface element;

the user interface includes a second user interface element, wherein a second view of the physical environment, different from the first view, is displayed in response to activation of the second user interface element; and the user interface includes a third user interface element, wherein a third view of the physical environment, different from the first view and from the second view, is displayed in response to activation of the third user interface element.

41. The non-transitory computer readable storage medium of claim 29, wherein identifying the plurality of structural features includes identifying the plurality of structural features in accordance with the plurality of structural features being non-movable features within the physical environment and identifying the one or more non-structural objects includes identifying particular objects in accordance with the particular objects being movable objects.

42. The non-transitory computer readable storage medium of claim 29, wherein the one or more programs include instructions that, when executed by the computer system, cause the computer system to:

display the graphical representations of the plurality of primary features with the first level of fidelity in accordance with the plurality of primary features corresponding to one or more walls, one or more floors, one or more ceilings, one or more doors, and/or one or more windows; and display the graphical representations of the one or more secondary features with the second level of fidelity in accordance with the one or more secondary features corresponding to one or more pieces of furniture.

\* \* \* \* \*